(12) United States Patent
Miyazaki et al.

(10) Patent No.: US 6,879,096 B1
(45) Date of Patent: Apr. 12, 2005

(54) IMAGE FORMATION APPARATUS

(75) Inventors: Toshihiko Miyazaki, Kanagawa (JP); Takeo Ono, Kanagawa (JP); Hideaki Mitsutake, Kanagawa (JP); Mitsutoshi Hasegawa, Kanagawa (JP); Eiji Yamaguchi, Kanagawa (JP); Shuji Yamada, Kanagawa (JP); Yasuyuki Todokoro, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 09/705,957

(22) Filed: Nov. 6, 2000

Related U.S. Application Data

(63) Continuation of application No. PCT/JP00/01347, filed on Mar. 6, 2000.

(30) Foreign Application Priority Data

Mar. 5, 1999 (JP) .............................. 11-103035
Apr. 5, 1999 (JP) .......................... 11-098232

(51) Int. Cl.$^7$ ................................. H01J 1/62
(52) U.S. Cl. ................. 313/495; 313/292; 313/422
(58) Field of Search ................ 313/493, 309, 313/310, 311, 336, 351, 495, 496, 497, 422, 326, 292, 282, 238, 257, 258, 250

(56) References Cited

U.S. PATENT DOCUMENTS

| | | | |
|---|---|---|---|
| 4,445,132 A | * 4/1984 | Ichikawa et al. | ............. 257/72 |
| 5,591,061 A | 1/1997 | Ikeda et al. | .................... 445/3 |
| 5,614,781 A | * 3/1997 | Spindt et al. | ............... 313/422 |
| 5,679,043 A | 10/1997 | Kumar | ......................... 445/24 |
| 5,716,618 A | 2/1998 | Tomida et al. | ........... 427/126.1 |
| 5,763,997 A | 6/1998 | Kumar | ...................... 313/495 |
| 5,905,335 A | * 5/1999 | Fushimi et al. | ............ 313/495 |
| 6,060,113 A | 5/2000 | Banno et al. | ................. 427/78 |
| 6,123,876 A | 9/2000 | Kobayashi et al. | ....... 252/519.2 |
| 6,541,900 B1 | * 4/2003 | Ando | .......................... 313/292 |
| 6,603,254 B1 | * 8/2003 | Ando | ......................... 313/495 |

FOREIGN PATENT DOCUMENTS

| | | |
|---|---|---|
| EP | 660357 A1 | 6/1995 |
| EP | 0 725 418 A1 | 8/1996 |
| EP | 0851458 | 7/1998 |
| JP | 64-31332 | 2/1989 |
| JP | 7-235255 | 9/1995 |
| JP | 7-302558 | 11/1995 |
| JP | 8-22782 | 1/1996 |
| JP | 8-022782 | 1/1996 |
| JP | 8-241667 | 9/1996 |
| JP | 8-273521 | 10/1996 |
| JP | 8-277294 | 10/1996 |
| JP | 9-69334 | 3/1997 |
| JP | 9-293462 | 11/1997 |
| JP | 10-144203 | 5/1998 |
| JP | 10-188861 | 7/1998 |
| JP | 10-188863 | 7/1998 |
| JP | 2854532 | 11/1998 |
| JP | 10-302676 | 11/1998 |
| JP | 11-31332 | 2/1999 |

* cited by examiner

Primary Examiner—Edward J. Glick
Assistant Examiner—Elizabeth Keaney
(74) Attorney, Agent, or Firm—Fitzpatrick, Cella, Harper & Scinto

(57) ABSTRACT

An image formation apparatus is disclosed which includes, within an enclosure configured by a pair of substrates placed face to face and an external frame placed between the substrates, an electron source placed on one of the pair of substrates, an image formation material placed on the other substrate, and spacers placed between the substrates, characterized in that the spacers and the external frame is conductive and device is provided for electrically connecting the spacers and the external frame so that the equipotential surfaces between the spacers and the external frame are quasi-parallel when driven.

8 Claims, 181 Drawing Sheets

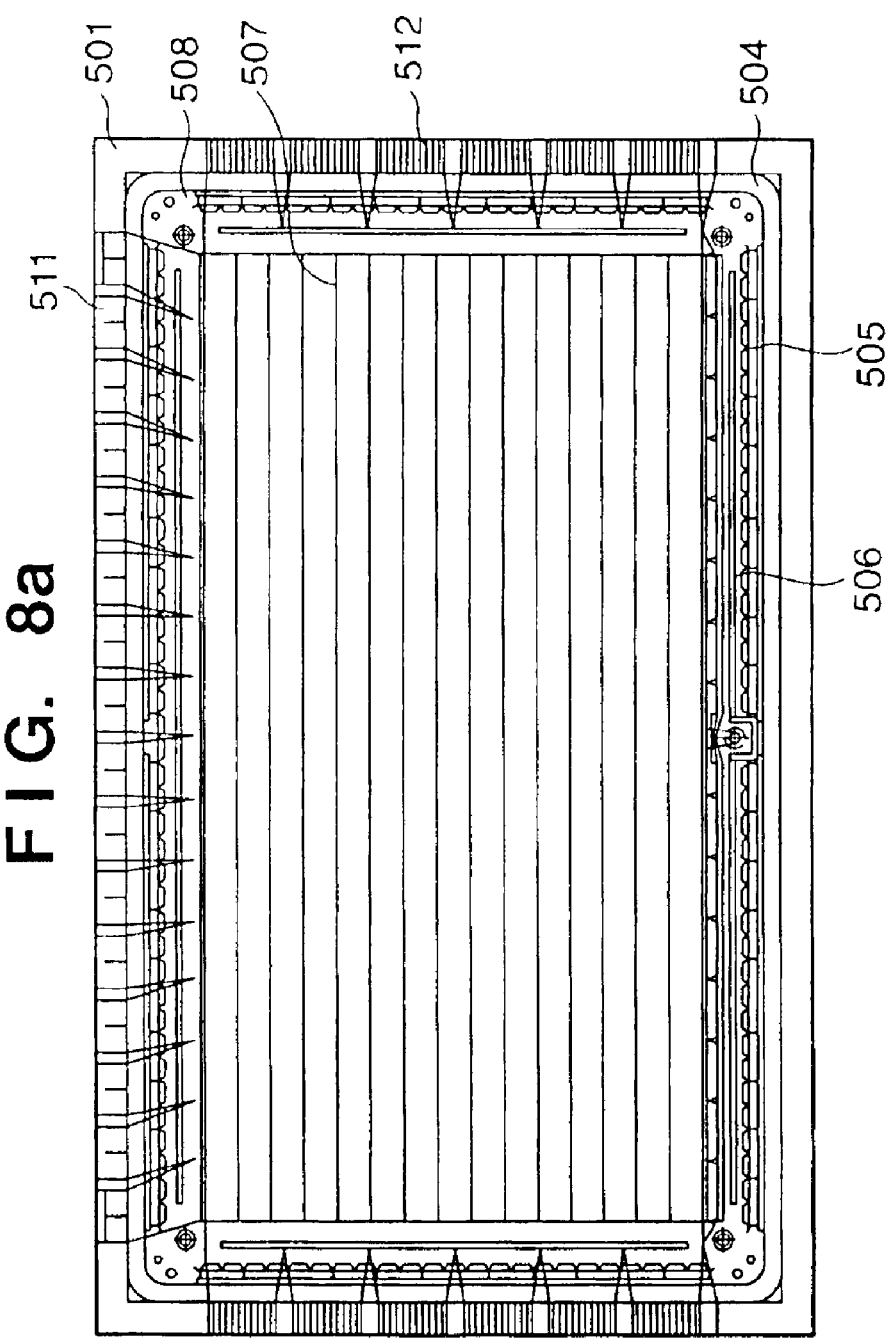
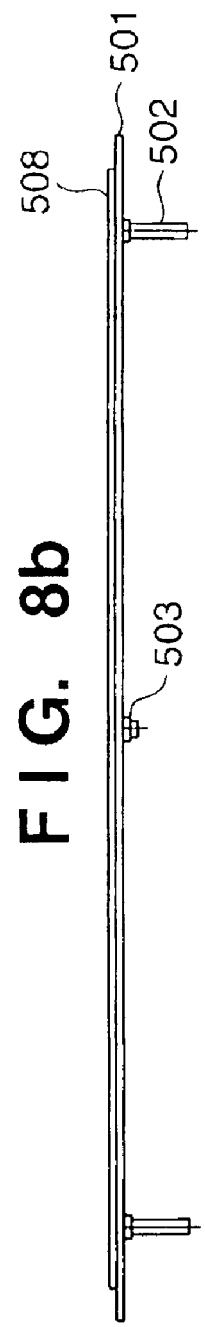
FIG. 8a
FIG. 8b

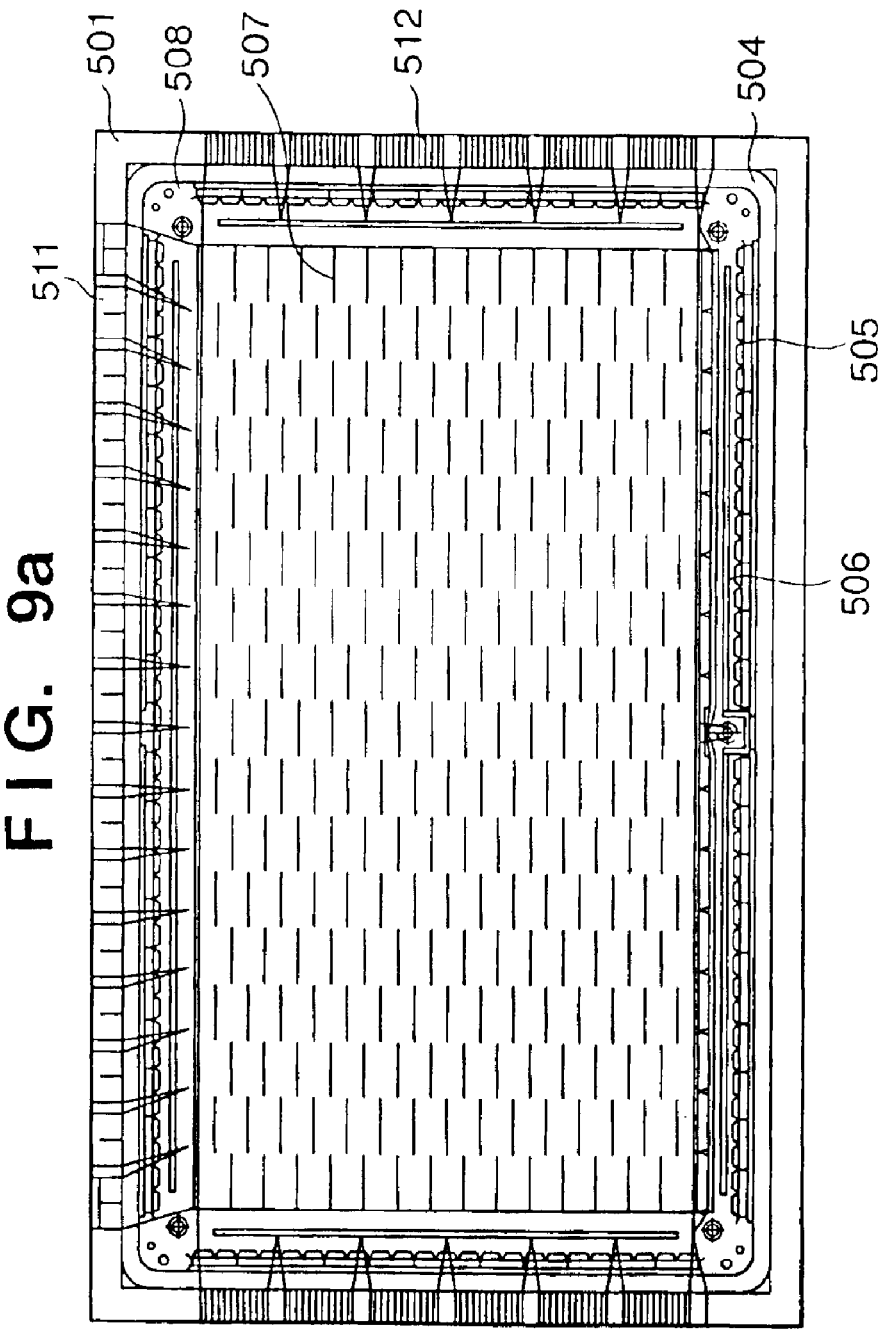
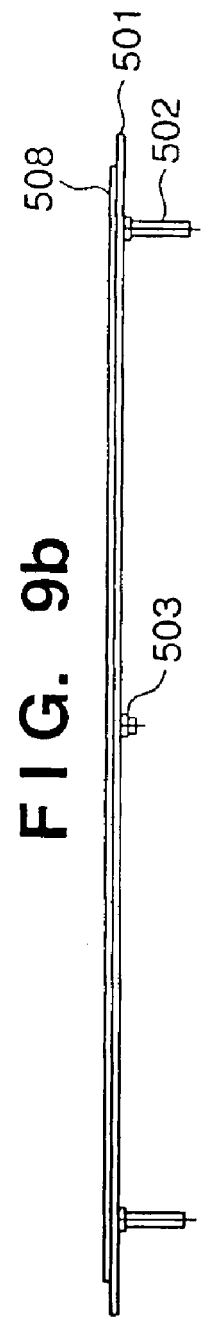
FIG. 9a
FIG. 9b

FIG. 43
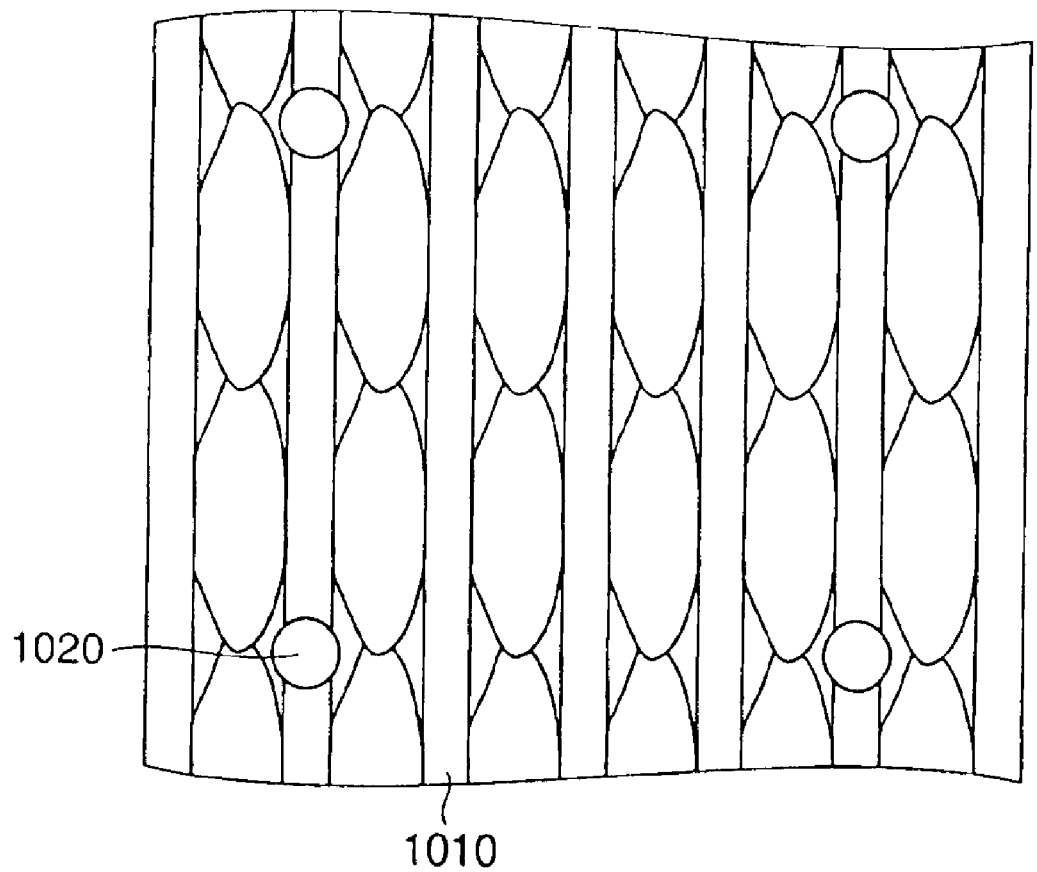
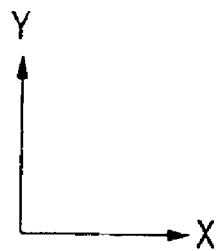

F I G. 52
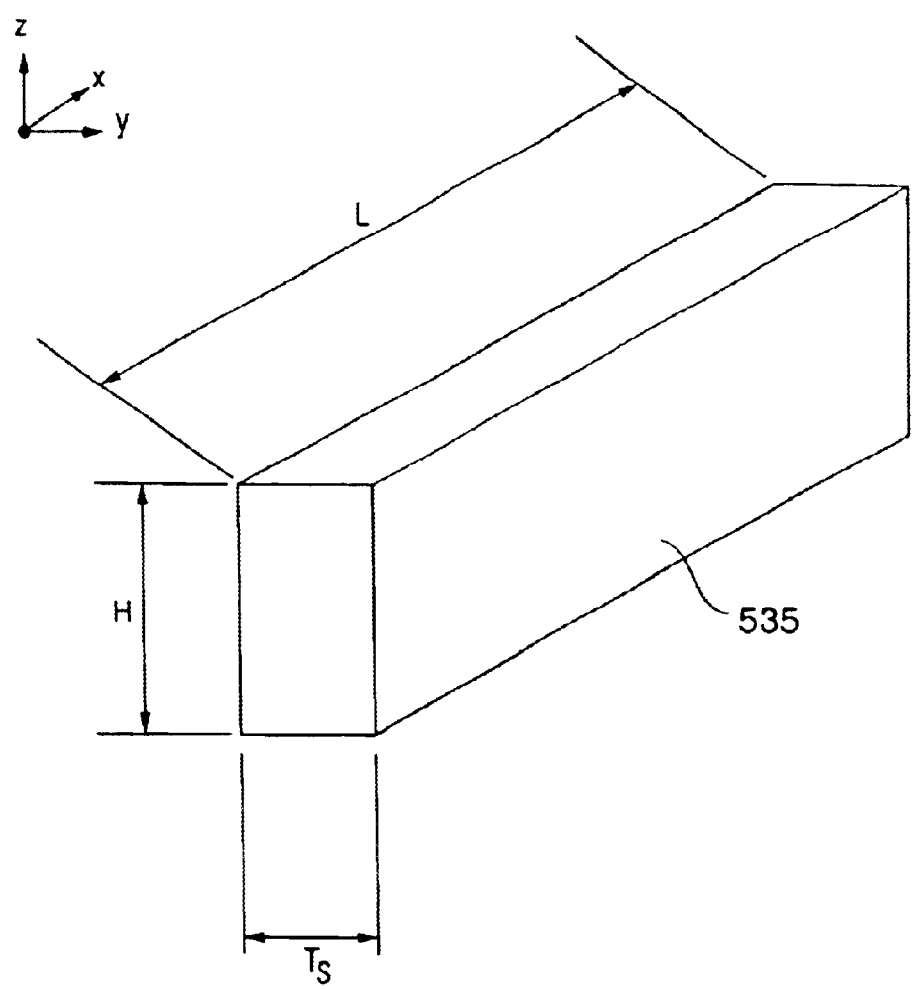

F I G. 59
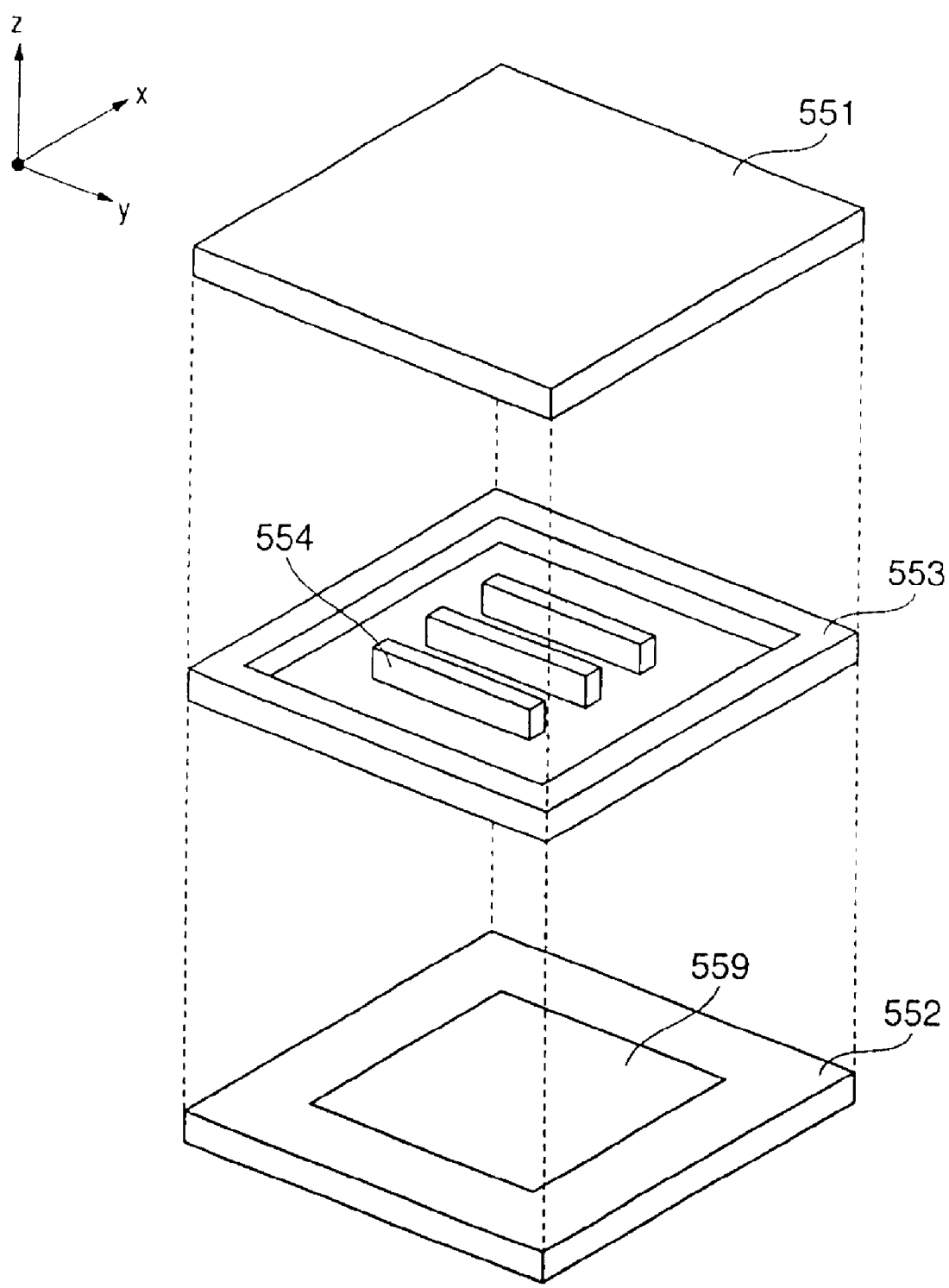

F I G. 113
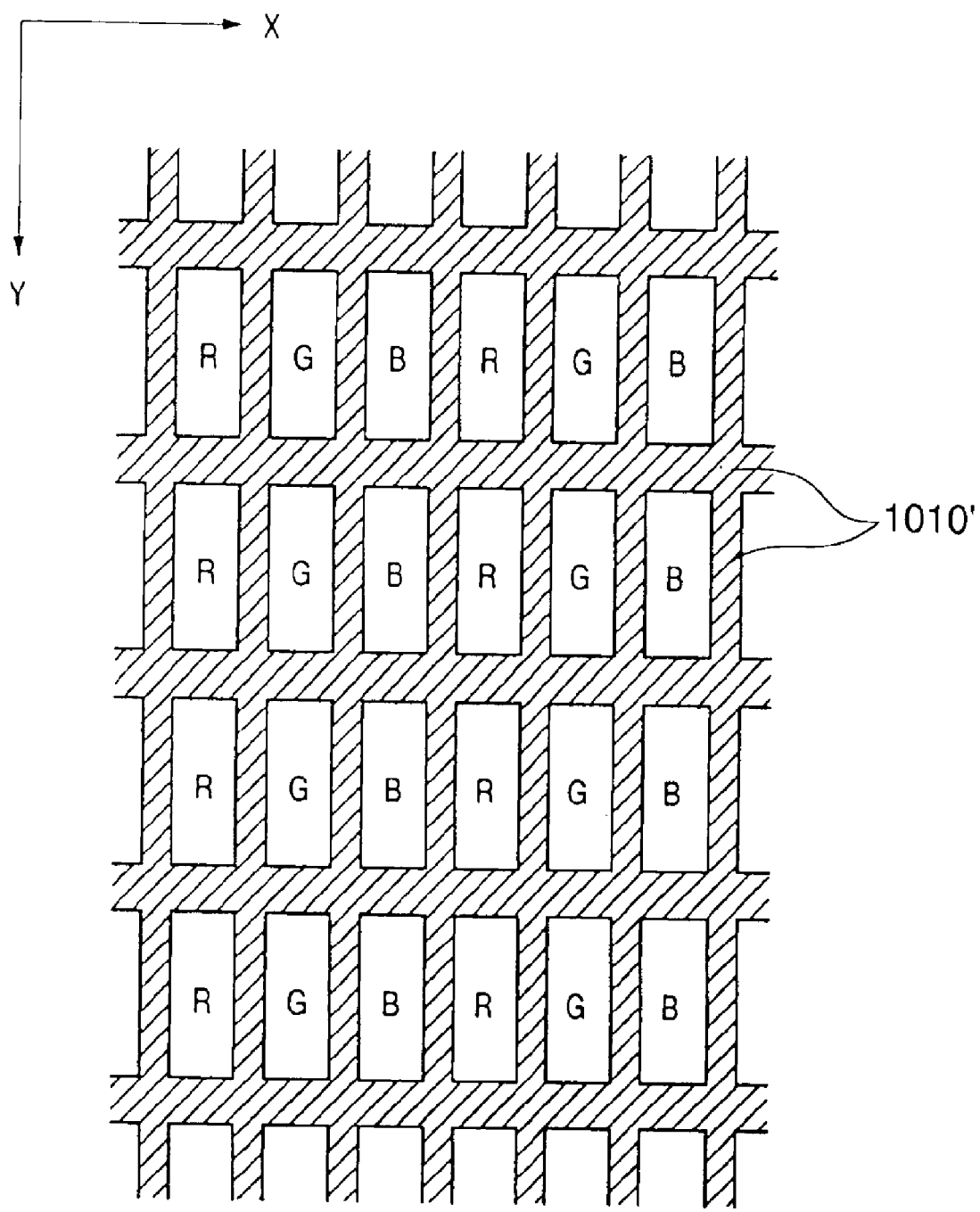

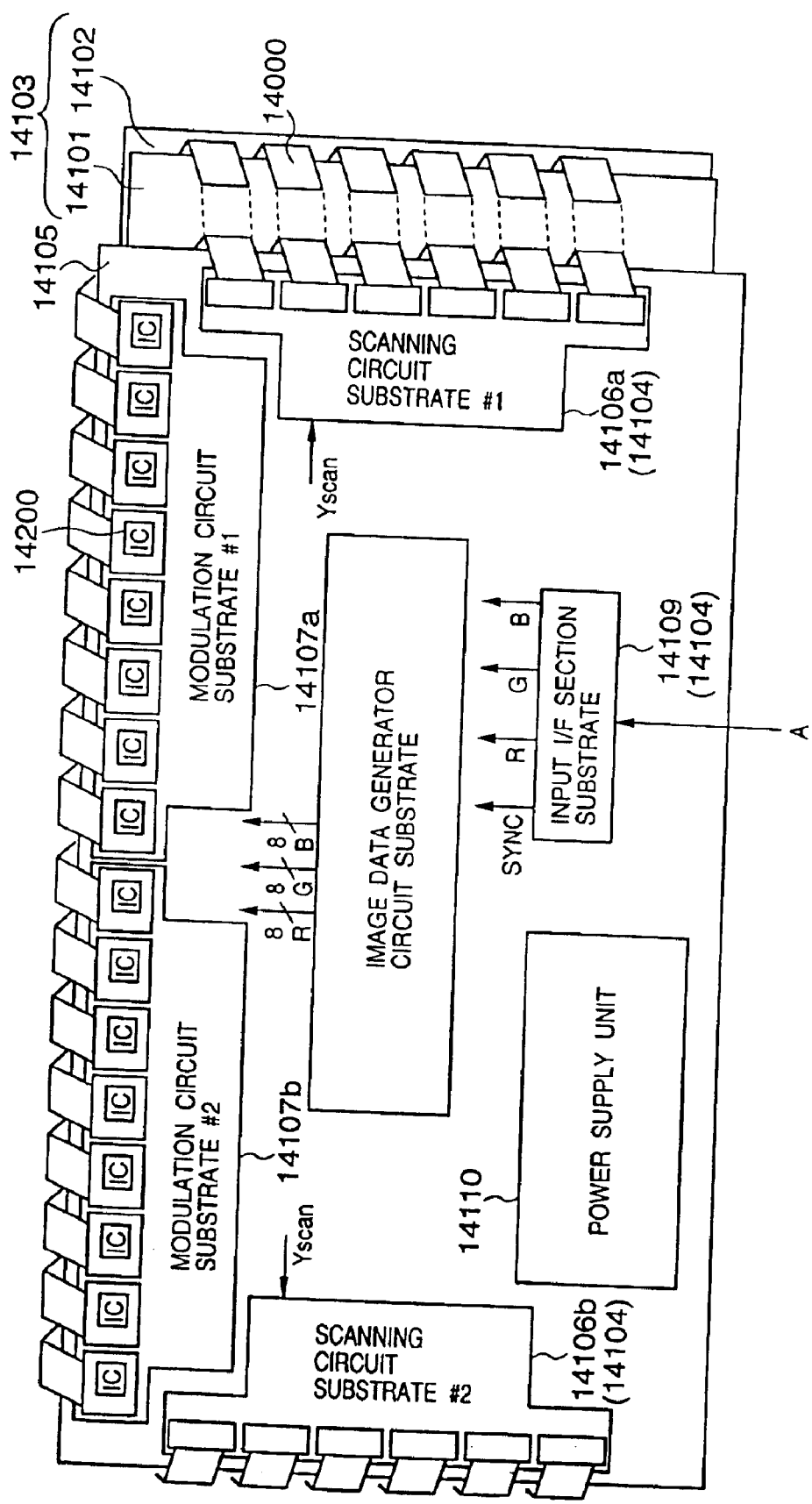

IMAGE FORMATION APPARATUS

This application is a continuation of International Application No. PCT/JP00/01347, filed Mar. 6, 2000, which claims the benefit of Japanese Patent Application Nos. 11-103035, filed Mar. 5, 1999 and 11-098232, filed Apr. 5, 1999.

TECHNICAL FIELD

The present invention relates to an image formation apparatus provided with an electron beam source substrate and a light-emitting display plate placed face to face that forms an image by supplying electrons emitted from the electron beam source substrate according to image information to the light-emitting display plate.

BACKGROUND ART

Image display apparatuses equipped with an electron emission cathode of various configurations are conventionally proposed. As an example, the one having a structure whose cross-sectional view is shown in FIG. 1 is known. The display apparatus shown in FIG. 1 is a full-color display apparatus and has multiple stripe-shaped anode electrodes 11106 provided on the inner surface of an anode substrate 11101 and on the anode electrodes 11106 are formed surfaces on which fluorescent materials that emit R, G and B lights are sequentially deposited. On the other hand, on a cathode substrate 11102 facing the anode substrate 11101 are provided FEC arrays 11105 made up of multiple electron emission cathodes (FEC). From these FEC arrays 11105, electrons are emitted in an electric field and these electrons emitted are captured by the anode electrodes 11106 and electrons are supplied to fluorescent materials deposited thereon, thus emitting light. Emission of electrons is generally controlled by this apparatus on the FEC arrays 11105 side and electrons emitted from the FEC arrays 11105 are emitted toward the anode substrate 11104 placed opposite thereto at a predetermined distance kept by a column 11104.

To enable an operation involved in the above-described emission of electrons, this apparatus has a space formed to be in a predetermined degree of vacuum between the anode substrate 11101 and cathode substrate 11102 and the peripheral section of these substrates is sealed with a sealing material 11103 to maintain this degree of vacuum.

The distance t between the anode substrate 11101 and cathode substrate 11102 is set, for example, to several hundred μm and a voltage applied to the anode electrodes 11106 is set, for example, to several hundred V. Moreover, the anode electrodes 11106 are connected to a display control apparatus outside the display apparatus through anode leading electrodes, which are not shown in the figure, and a voltage is applied to the anode electrodes 11106 by the display control apparatus at predetermined timing. Furthermore, cathode electrodes and gate electrodes of the FEC arrays 11105 are also connected to the display control apparatus outside the display apparatus through cathode leading electrodes and gate leading electrodes, which are not shown in the figure and a voltage is applied to these electrodes by the display control apparatus at predetermined timing.

The electron emission section of the above-described image display apparatus is formed by FEC arrays, but various configurations of electron emission devices placed on the electron emission section are proposed. For example, a surface-conduction electron emission device has a simple structure and is easy to manufacture, and therefore has an advantage of making it possible to arrange an array of multiple devices over a large area. Therefore, various applications taking advantage of this feature are under study. An example of this is application to a charge beam source and an image formation apparatus such as a display apparatus, etc. An example of arranging multiple surface-conduction electron emission devices is an electron beam source obtained by arranging surface-conduction electron emission devices in parallel and arranging multiple lines with both ends of individual devices connected with a wire (e.g., the Japanese Patent Laid-Open No. 1-1031332 by the applicant of the present application).

With regard to an image formation apparatus such as a display apparatus, a flat type display apparatus using liquid crystal device (LCD) has been widely spreading in recent years instead of a CRT-based one. However, the one using LCD is not of a self light-emitting type and has a problem of requiring a backlight, etc., and therefore a display apparatus of a self light-emitting type is needed.

A display apparatus combining the electron beam source with such multiple surface-conduction electron emission devices arranged and fluorescent materials that emit visible light by means of electrons emitted from this electron beam source can be relatively easily manufactured even with a large screen and can furthermore provide an excellent self light-emitting display apparatus with high-definition display, and therefore it is also desirable from the standpoint of providing a self light-emitting display apparatus.

DISCLOSURE OF INVENTION

It is an object of the present invention to provide an image formation apparatus capable of satisfying large-screen requirements and having a high display-quality configuration.

In order to attain the above object, the present invention includes the following characteristic aspects:

An aspect of the image formation apparatus of the present invention is an image formation apparatus comprising, within an enclosure configured by a pair of substrates placed face to face and an external frame placed between the substrates above, an electron beam source placed on one of the pair of substrates, an image formation material placed on the other substrate and spacers placed between the substrates above, characterized in that the spacers and external frame have conductivity and means for electrically connecting the spacers and the external frame is provided so that the electric equipotential surfaces between the spacers and the external frame are quasi-parallel when the apparatus is driven.

Another aspect of the image formation apparatus of the present invention is an image formation apparatus comprising, within an enclosure configured by a pair of substrates placed face to face and an external frame placed between the substrates above, an electron beam source placed on one of the pair of substrates, an image formation material placed on the other substrate and spacers placed between the substrates above, characterized in that the spacers and external frame have conductivity, a quasi-equal electric potential V1 is applied to the top end of the spacer and the top end of the external frame when the apparatus is driven and a quasi-equal electric potential V2, which is different from the potential V1 is applied to the bottom end of the spacer and the bottom end of the external frame.

An aspect of the electron beam source substrate of the present invention is an electron beam source substrate comprising a plurality of electron emission devices wired in matrix on a substrate with a plurality of row-direction wires and a plurality of column-direction wires, characterized in that each of the plurality of electron emission devices is surrounded by the row-direction wires and column-direction wires, and the wiring width in a non-crossing area of the row-direction wires and column-direction wires is wider than the wiring width in a crossing area of the row-direction wires and column-direction wires.

Another aspect of the image formation apparatus of the present invention is an image formation apparatus comprising an electron beam source substrate equipped with a plurality of electron emission devices wired in matrix on a substrate with a plurality of row-direction wires and a plurality of column-direction wires and an image formation material that forms images by radiation of electrons emitted from the plurality of electron emission devices, characterized in that each of the plurality of electron emission devices is surrounded by the row-direction wires and column-direction wires, and the wiring width in a non-crossing area of the row-direction wires and column-direction wires is wider than the wiring width in a crossing area of the row-direction wires and column-direction wires.

Another aspect of the image formation apparatus of the present invention is an image formation apparatus comprising a substrate with a plurality of wires connecting electron emission devices, a substrate with an image formation material that forms images by radiation of electrons emitted from the electron emission devices, spacers placed between the substrates and getters, characterized in that the spacers are placed on the wires and the getters are placed on the wires without the spacers.

Another aspect of the image formation apparatus of the present invention is an image formation apparatus comprising a substrate with a plurality of wires connecting electron emission devices, a substrate with an image formation material that forms images by radiation of electrons emitted from the plurality of electron emission devices, a plurality of spacers placed between the substrates and getters, characterized in that the plurality of spacers is placed on the wires and the getters are placed on the wires between the plurality of spacers.

Another aspect of the image formation apparatus of the present invention is an image formation apparatus comprising a substrate with wires connecting electron emission devices, a substrate with an image formation material that forms images by radiation of electrons emitted from the electron emission devices and spacers placed between the substrates, characterized in that the wires have an arch-shaped cross section and the spacers are placed on the wires and the corner of the end face that has contact with the wire is rounded.

Another aspect of the image formation apparatus of the present invention is an image formation apparatus comprising a substrate with wires connecting electron emission devices, a substrate with an image formation material that forms images by radiation of electrons emitted from the electron emission devices and spacers placed between the substrates, characterized in that the image formation material has a non-light-emitting material with an arch-shaped cross section and the spacers are placed on the non-light-emitting material and the corner of the end face that is in contact with the non-light-emitting material is rounded.

Another aspect of the electron beam source substrate is an electron beam source substrate comprising a plurality of electron emission devices wired in matrix on a substrate with a plurality of row-direction wires and a plurality of column-direction wires, characterized in that there is a potential regulation section in a non-crossing area of the row-direction wires and column-direction wires. Another aspect of the image formation apparatus of the present invention is an image formation apparatus comprising an electron beam source substrate equipped with a plurality of electron emission devices wired in matrix on a substrate with a plurality of row-direction wires and a plurality of column-direction wires and an image formation material that forms images by radiation of electrons emitted from the plurality of electron emission devices, characterized in that there is a potential regulation section in a non-crossing area of the row-direction wires and column-direction wires.

Another aspect of the image formation apparatus of the present invention is an image formation apparatus comprising a first substrate with an electron beam source and a second substrate with a fluorescent material coated with metal backing and non-light-emitting material placed facing the electron beam source, characterized in that the fluorescent material and the non-light-emitting material have a thickness different to each other and means for applying a potential close to the potential applied when the apparatus is driven to the side where the electron beam source is placed on the first substrate is provided on the side opposite to the side of the second substrate where the fluorescent material and the non-light-emitting material are placed.

Another aspect of the image formation apparatus of the present invention is an image formation apparatus comprising a fluorescent material, a metal backing that covers the fluorescent material and a high-voltage leading terminal electrically connected to the metal backing, placed on a substrate, characterized in that a relay conductive film strip that connects between the metal backing and the high-voltage leading terminal is provided.

Another aspect of the image formation apparatus of the present invention is an image formation apparatus comprising an electron beam source substrate with an electron beam source, a fluorescent material, a metal backing that covers the fluorescent material and a high-voltage leading terminal electrically connected to the metal backing placed opposite to the electron beam source substrate, characterized in that the image formation substrate is provided with a relay conductive film strip that connects between the metal backing and the high-voltage leading terminal.

Another aspect of the image formation apparatus of the present invention is an image formation apparatus comprising, an enclosure containing an electron beam source substrate with an electron beam source, an image formation substrate with an image formation material that forms images by radiation of electrons emitted from the electron beam source and a cabinet with a support section for the enclosure, characterized in that the support section supports the electron beam source substrate without the image formation substrate.

Another aspect of the image formation apparatus of the present invention is an image formation apparatus comprising a substrate with a plurality of wires connecting electron emission devices, a substrate with an image formation material that forms images by radiation of electrons emitted from the electron emission devices and a plurality of spacers placed between the substrates, characterized in that the plurality of spacers are placed on the wires discretely so that the number of wires between the spacers falls within the range of 5 to 50.

Another aspect of the image formation apparatus of the present invention is an image formation apparatus comprising, within an enclosure configured by a pair of substrates placed face to face and an external frame placed between the substrates above, an electron beam source and an image formation material that forms images by radiation of electrons emitted from the electron emission device, characterized in that the external frame is formed by die punching.

Another aspect of the image formation apparatus of the present invention is an image formation apparatus comprising, within an enclosure configured by a pair of substrates placed face to face and an external frame placed between the substrates above, an electron beam source and an image formation material that forms images by radiation of electrons emitted from the electron emission device, characterized in that the corners of the external frame have an arc shape inside and outside the enclosure and the arc shape has different curvatures inside and outside the enclosure.

An aspect of the electron beam source substrate is an electron beam source substrate comprising electron beam emission devices, wires connected to the electron beam emission devices and getters, characterized in that the getters are placed on the wires and both the getters and wires have an arc-shaped cross-section.

Another aspect of the image formation apparatus of the present invention is an image formation apparatus comprising a substrate provided with electron beam emission devices, wires connected to the electron beam emission devices and getters, and an image formation material that forms images by radiation of electrons emitted from the electron emission devices placed in an enclosure, characterized in that the getters are placed on the wires and both the getters and wires have an arc-shaped cross-sectional shape.

Another aspect of the image formation apparatus of the present invention is an image formation apparatus comprising a display panel and a high-voltage power supply connected to the display panel, characterized in that the high-voltage power supply is placed below the center of gravity of the display panel.

Another aspect of the image formation apparatus of the present invention is an image formation apparatus comprising a first substrate with a fluorescent material and black material and a second substrate with electron emission devices placed face to face, characterized in that the black material is placed right above the electron emission section of the electron emission devices.

Another aspect of the electron beam source substrate of the present invention compressing:

a. A substrate;

b. An array of electrode pairs on a substrate configured by pairs of device electrodes placed along a plurality of rows and a plurality of columns;

c. A plurality of column wires on a substrate made up of column wires by means of screen printing, commonly connecting one of each electrode pair on the column provided on each column for each electrode pair;

d. A plurality of row wires insulated from the column wires on a substrate made up of row wires by means of screen printing, commonly connecting the other of each electrode pair on the row provided on each row for each electrode pair;

e. A plurality of column terminal sections extended from the plurality of column wires, by means of screen printing; and f. A plurality of row terminal sections extended from the plurality of row wires, by means of screen printing.

Another aspect of the image formation apparatus comprising:

a. An electron beam source substrate comprising a first substrate, an array of electrode pairs on the first substrate configured by pairs of device electrodes placed along a plurality of rows and a plurality of columns, an electron beam source placed between the pair of electrodes, a plurality of column wires on the first substrate made up of column wires commonly connecting one of each electrode pair on the column provided on each column for each electrode pair, and a plurality of row wires on the substrate that commonly connect the other of each electrode pair, insulate from the column wires, made up of a row wire of a wire width larger than that of the column wire provided for each electrode pair on each row;

b. An image formation substrate comprising a second substrate and an image formation material placed on the second substrate; and c. Spacers inserted between the electron beam source substrate and the image formation substrate and placed on the row wires.

An aspect of the image formation material of the present invention comprising:

a. An electron beam source substrate comprising a first substrate, an array of electrode pairs on the substrate configured by pairs of device electrodes placed along a plurality of rows and a plurality of columns, an electron beam source placed between the pair of electrodes, a plurality of column wires on the first substrate made up of column wires commonly connecting one of each electrode pair on the column provided on each column for each electrode pair, and a plurality of row wires on the first substrate that commonly connect the other of each electrode pair, insulate from the column wires, made up of a row wire of a wire width larger than that of the column wire provided for each electrode pair on each row; and b. An image formation material comprising a second substrate, an image formation material of a rectangular shape having a vertical long side in the observation direction placed on the second substrate along a plurality of rows and a plurality of columns and a shade material on the second substrate that covers the spaces between the rows and between the columns, characterized in that the image formation substrate has the distance between the plurality of adjacent rows wider than the distance between the plurality of adjacent columns.

Another aspect of the image formation apparatus of the present invention comprising:

a. An electron beam source substrate comprising a first substrate, an array of electrode pairs on the substrate configured by pairs of device electrodes placed along a plurality of rows and a plurality of columns, an electron beam source placed between the pair of electrodes, a plurality of column wires on the first substrate made up of column wires commonly connecting one of each electrode pair on the column provided on each column for each electrode pair, and a plurality of row wires on the first substrate that commonly connect the other of each electrode pair, insulate from the column wires, made up of a row wire of a wire width larger than that of the column wire provided for each electrode pair on each row; and b. An image formation substrate comprising a second substrate, an image formation material of a rectangular shape having a vertical long side in the observation direction placed on the second substrate along a plurality of rows and a plurality of columns and a shade material on the second substrate that covers the spaces between the plurality of adjacent rows and the distance between the plurality of adjacent columns, characterized in that the electron beam source is placed facing every distance between the plurality of columns.

Another aspect of the image formation apparatus of the present invention comprising:

a. An electron beam source substrate comprising a first substrate, an array of electrode pairs on the substrate configured by pairs of device electrodes placed along a plurality of rows and a plurality of columns, an electron beam source placed between the pair of electrodes, a plurality of column wires on the first substrate made up of column wires commonly connecting one of each electrode pair on the column provided on each column for each electrode pair, and a plurality of row wires on the first substrate that commonly connect the other of each electrode pair, insulate from the column wires, made up of a row wire of a wire width larger than that of the column wire provided for each electrode pair on each row; and b. An image formation substrate comprising a second substrate, an image formation material of a rectangular shape having a vertical long side in the observation direction placed on the second substrate along a plurality of rows and a plurality of columns and a shade material on the second substrate that covers the spaces between the plurality of adjacent rows and the distance between the plurality of adjacent columns; and c. Spacers inserted between the electron beam source substrate and the image formation substrate and placed on the row wires, characterized in that the electron beam sources are placed facing every distance between the plurality of columns.

Another aspect of the image formation apparatus of the present invention is an image formation apparatus with image formation substrates placed face to face via spacers, characterized in that the spacers are placed on wires connecting the electron beam sources, coated with a conduction film that is electrically connected to the wires, and the height of the top end of the conduction film is equal to or lower than the height at which the potential is higher by 2 Kv than the electron beam source potential in a potential distribution between the electron beam source potential while the electron beam source is emitting electrons and the acceleration potential given on the image formation substrate side.

BRIEF DESCRIPTION OF DRAWINGS

FIG. 8a is a top view of the display panel used in the image formation apparatus of the present invention viewed from the face plate side;

FIG. 8b is a side view of the display panel shown in FIG. 8a;

FIG. 9a is a top view of another exemplar display panel used in the image formation apparatus of the present invention viewed from the face plate side;

FIG. 9b is a side view of the display panel shown in FIG. 9a;

FIG. 42b is a schematic view showing the shape of light emission (visible light) when an emitted electron beam hits the anode substrate in FIG. 41a.

FIG. 43 is a schematic diagram showing another exemplar trajectory area of electrons;

FIG. 52 is a perspective view showing an exemplar spacer;

FIG. 59 is a developed perspective view of the airtight container used in the image formation apparatus of the present invention;

FIG. 64c is a C–C' cross-sectional view of FIG. 64a;

FIG. 67b is a partial cross-sectional view of the display panel section shown in FIG. 67a;

FIG. 70b is an enlarged plan view of the electron beam sources shown in FIG. 70a;

FIG. 71b is an enlarged plan view of the electron beam sources shown in FIG. 70a;

FIG. 78b is an enlarged plan view of the electron beam sources shown in FIG. 78a;

FIG. 80b is an A–A' cross-sectional view of FIG. 80a;

FIG. 93a is a partially enlarged view of the display panel section in FIG. 92;

FIG. 93b is a partially enlarged view of FIG. 93a;

FIG. 97 is a cross-sectional view of the image formation apparatus having the wiring structure shown in FIG. 95 and FIG. 96;

FIG. 98 is an enlarged plan view showing another exemplar structure of the wiring terminal section of the electron beam sources used in the image formation apparatus of the present invention;

FIG. 99 is an enlarged plan view showing another exemplar structure of the wiring terminal section of the electron beam sources used in the image formation apparatus of the present invention;

FIG. 100 is an enlarged plan view showing another exemplar structure of the wiring terminal section of the electron beam sources used in the image formation apparatus of the present invention;

FIG. 101 is an enlarged plan view showing another exemplar structure of the wiring terminal section of the electron beam sources used in the image formation apparatus of the present invention;

FIGS. 102a–102d are manufacturing process diagrams to explain another manufacturing procedure of the electron beam sources used in the image formation apparatus of the present invention;

FIG. 103 is a cross-sectional view showing a configuration of a metal backing of the face plate used in the image formation apparatus of the present invention;

FIGS. 104a–104d are manufacturing process diagrams to explain a manufacturing procedure of the metal backing of the face plate used in the image formation apparatus of the present invention;

FIGS. 105a–105e are manufacturing process diagrams to explain another manufacturing procedure of the metal backing of the face plate used in the image formation apparatus of the present invention;

FIGS. 106a–106d are manufacturing process diagrams to explain another manufacturing procedure of the metal backing of the face plate used in the image formation apparatus of the present invention;

FIGS. 107a–107b are enlarged plan views schematically showing an exemplar configuration of black matrix of the face plate used in the image formation apparatus of the present invention;

FIGS. 108a–108d are manufacturing process diagrams to explain another manufacturing procedure of the metal backing of the face plate used in the image formation apparatus of the present invention;

Figure 109A:
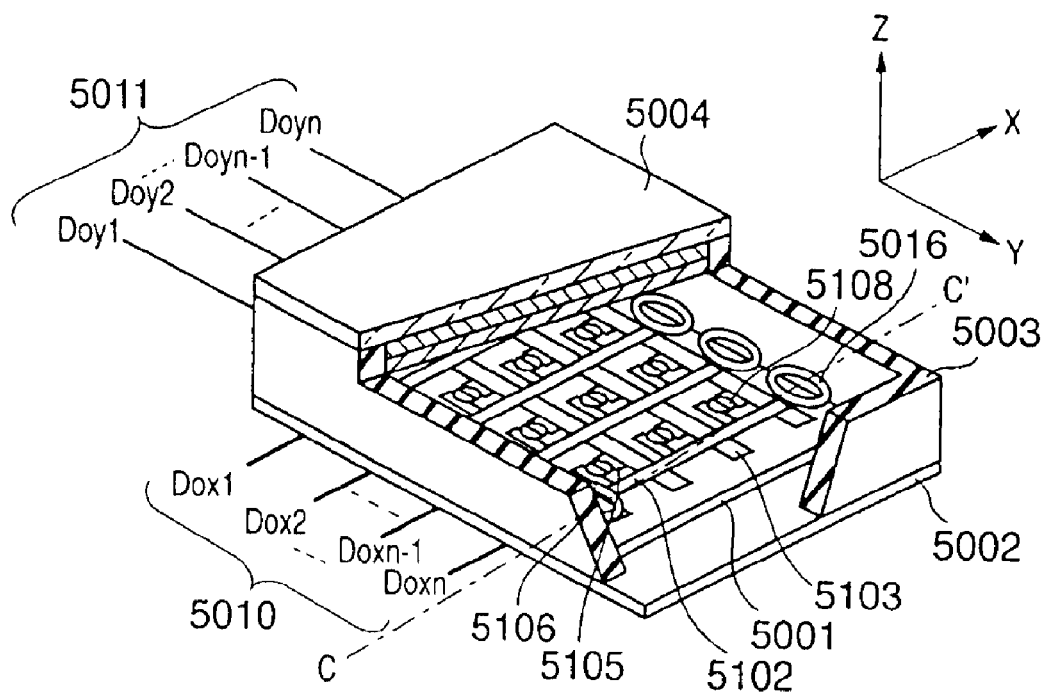
Figure 109B:
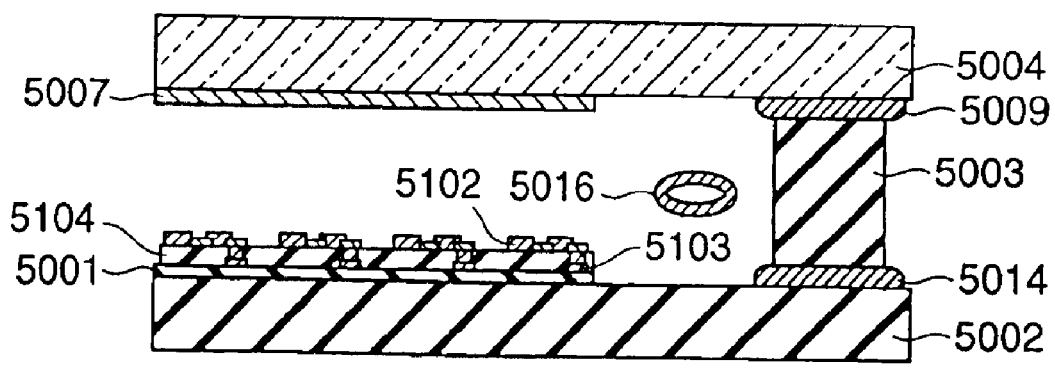
Figure 110A:
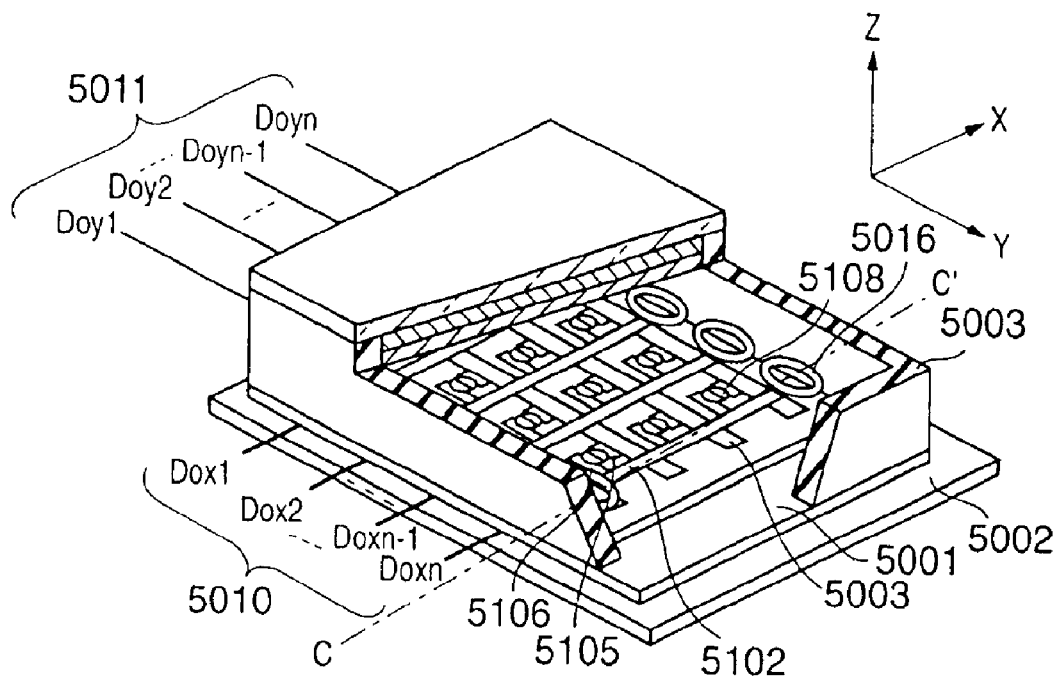
Figure 110B:
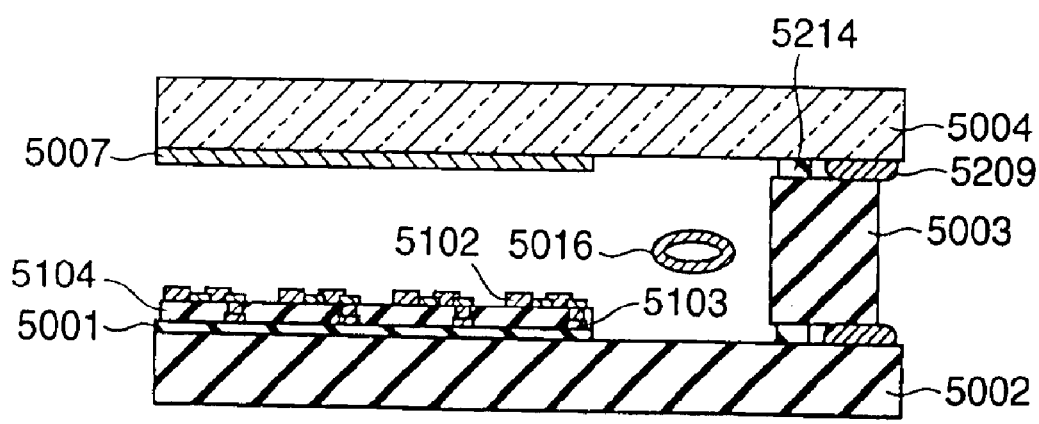
Figure 111:
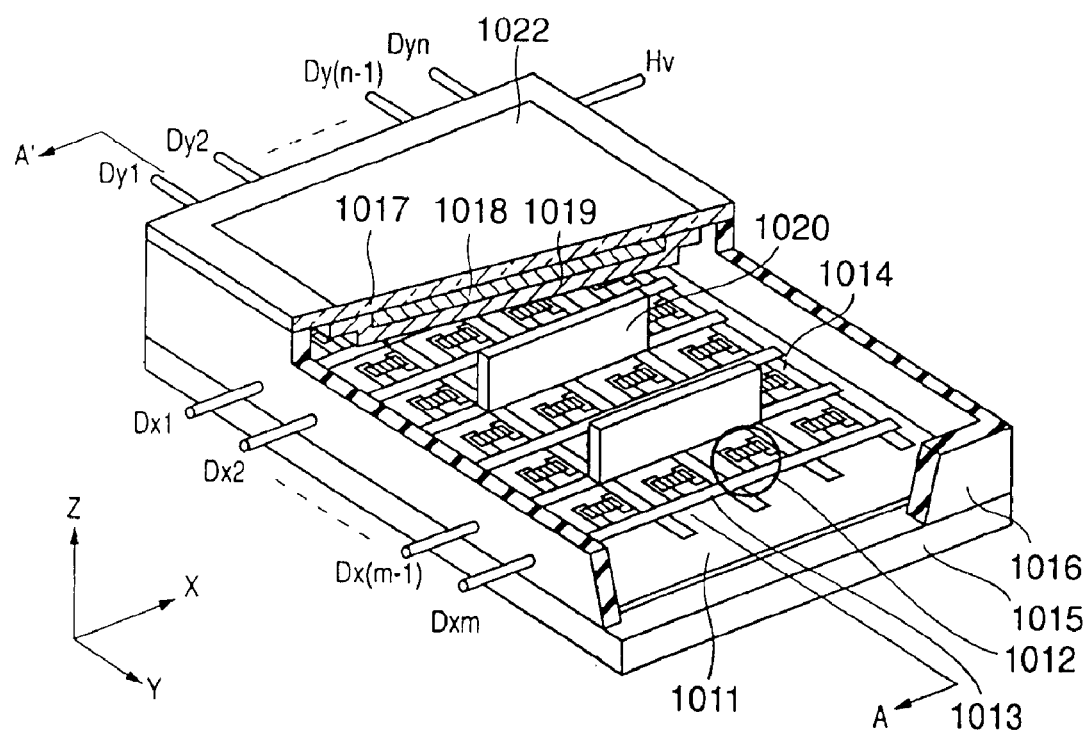
Figure 112A:
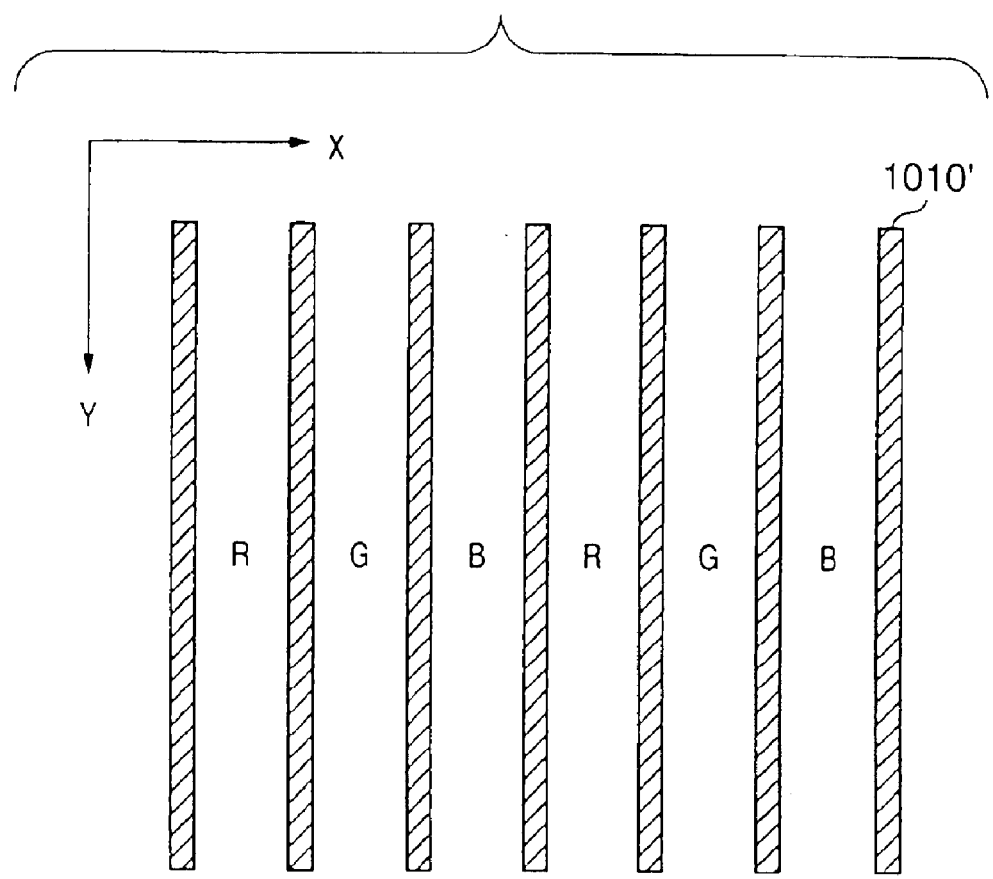
Figure 112B:
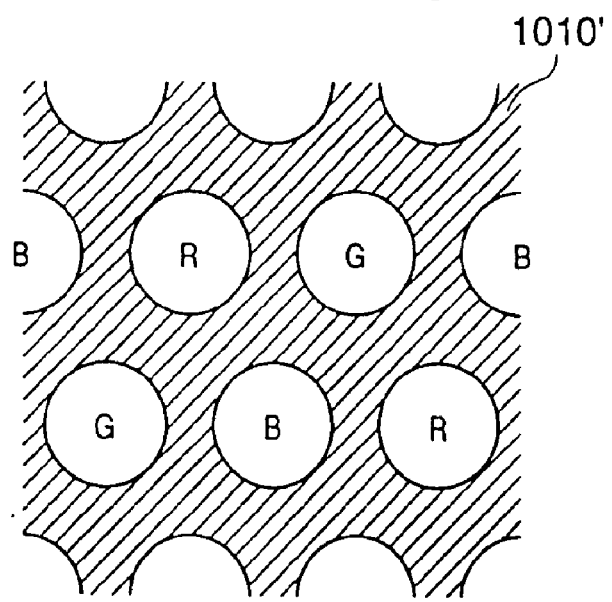
Figure 114:
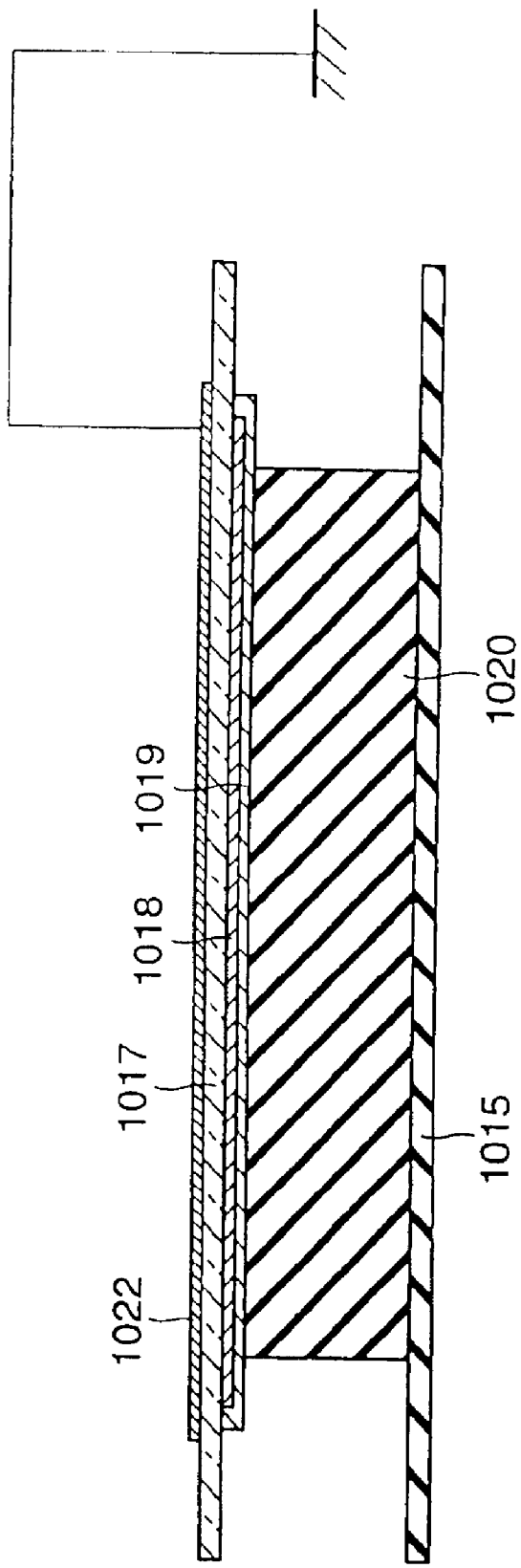
Figure 115:
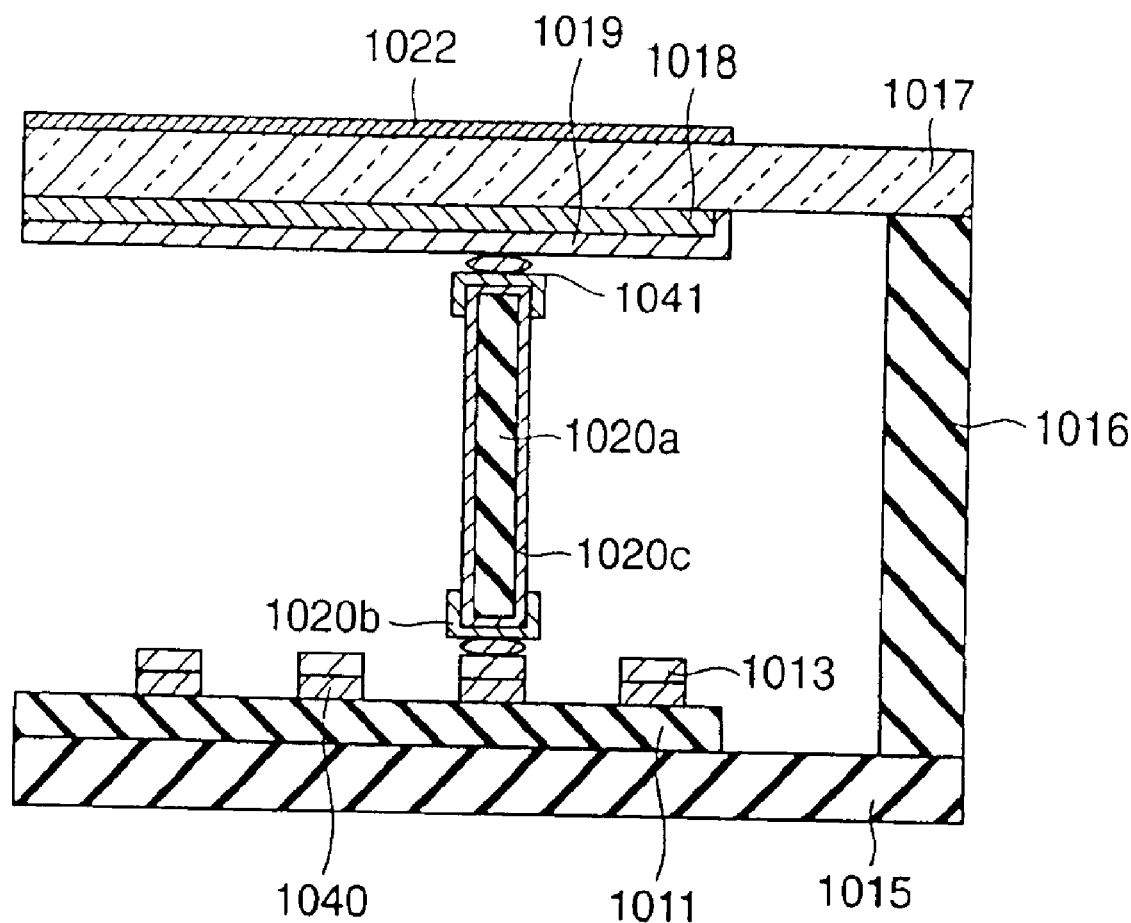
Figure 116:
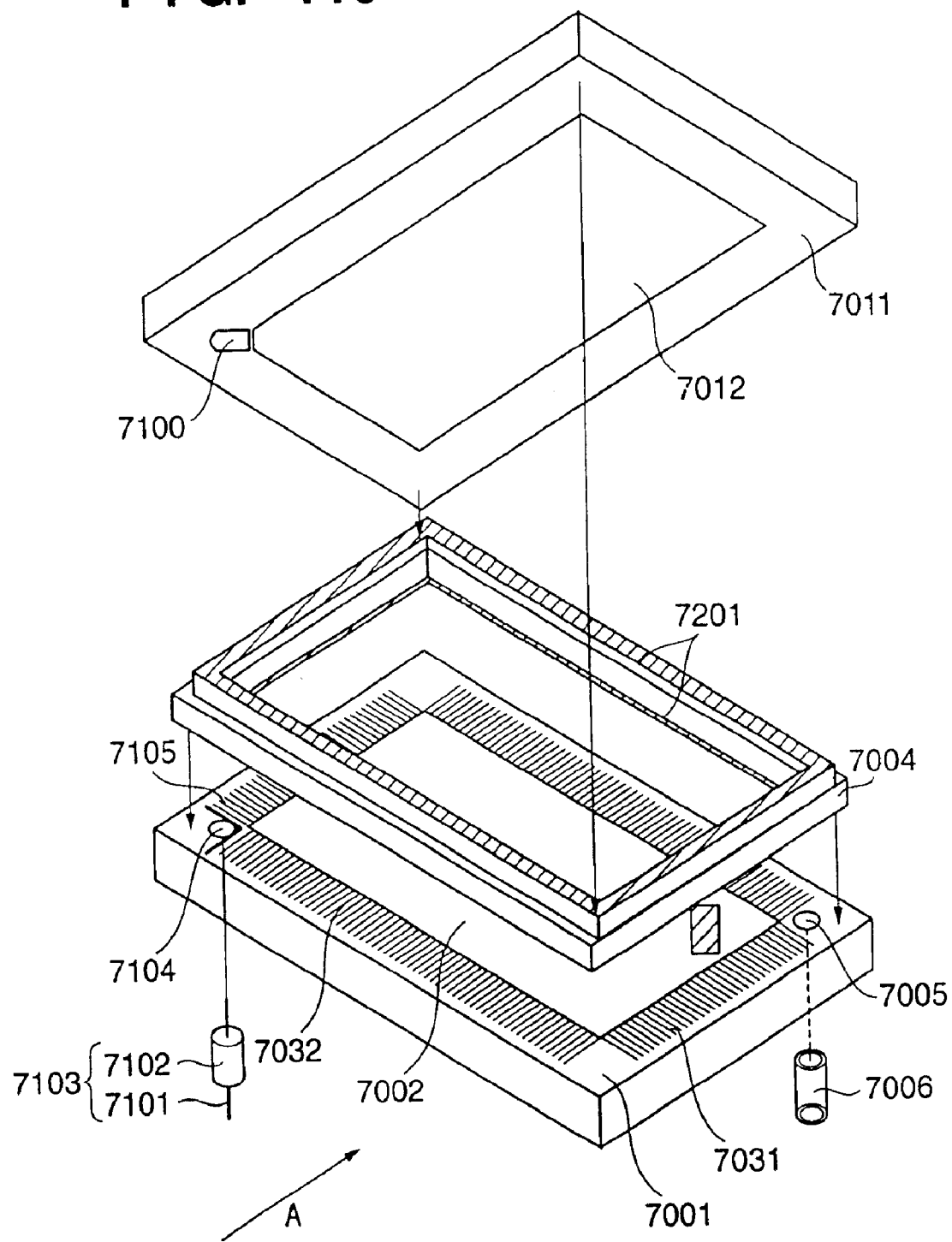
Figure 117:
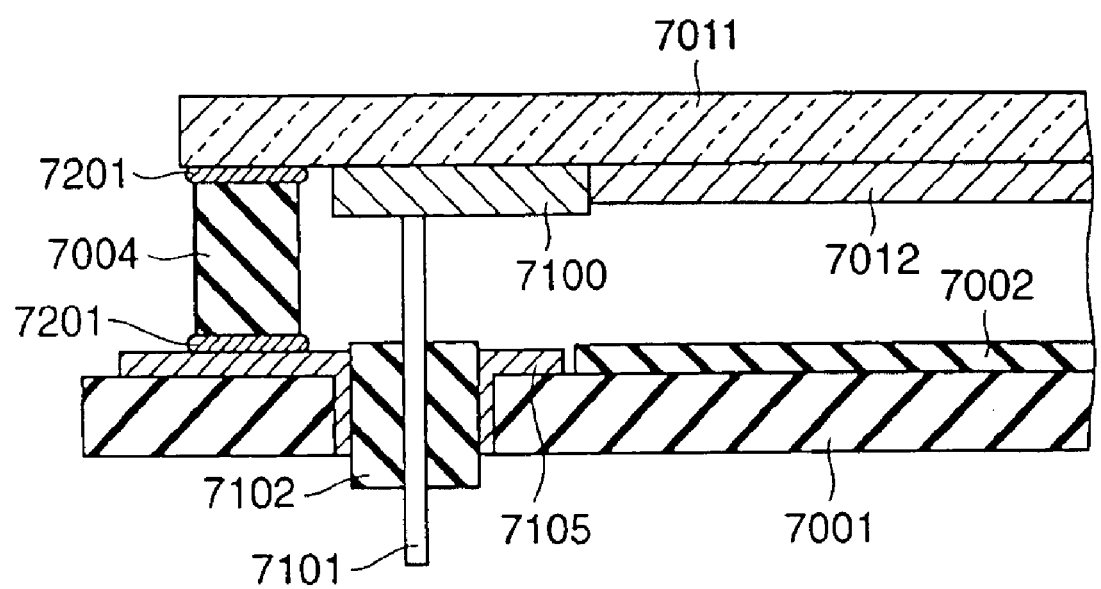
Figure 119:
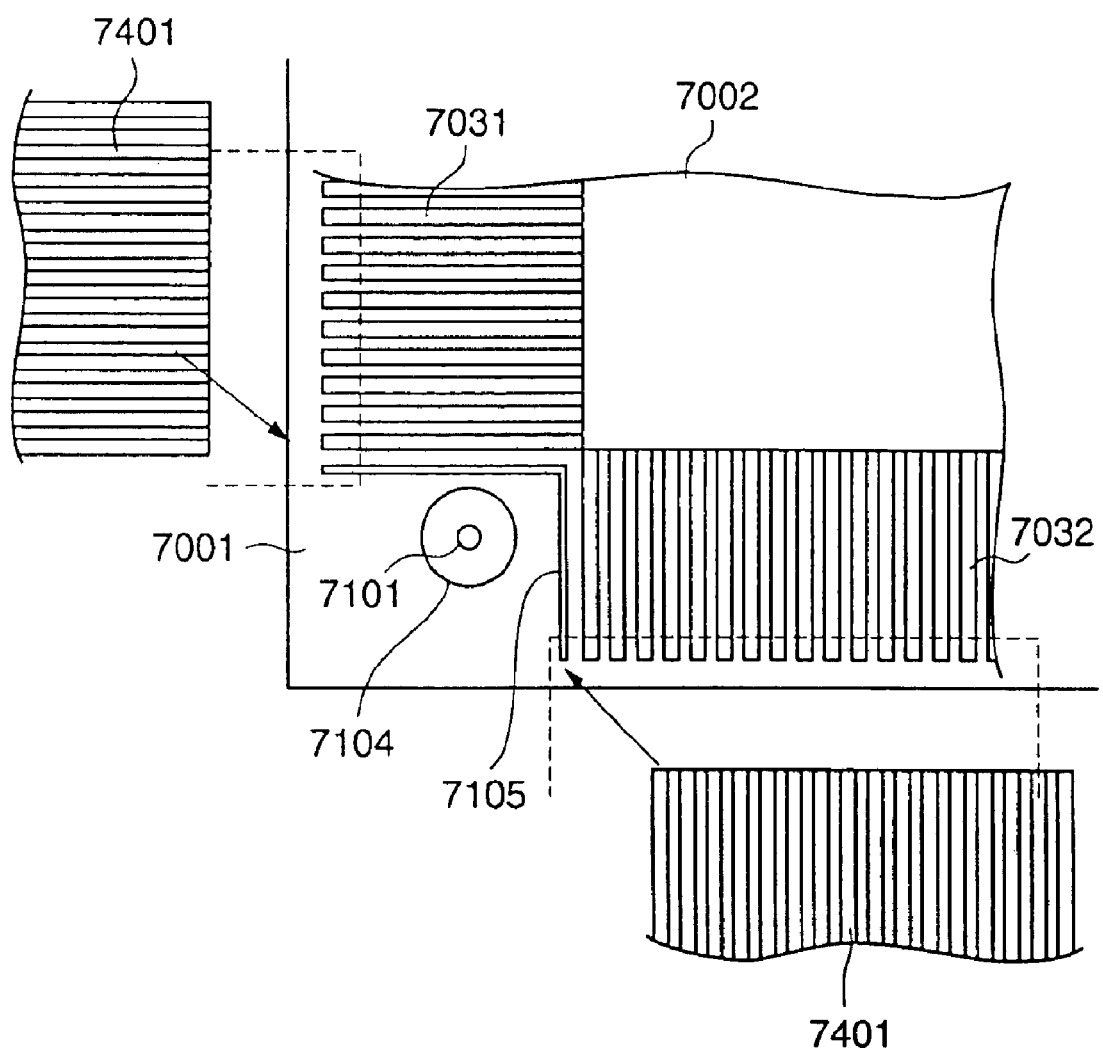
Figure 120:
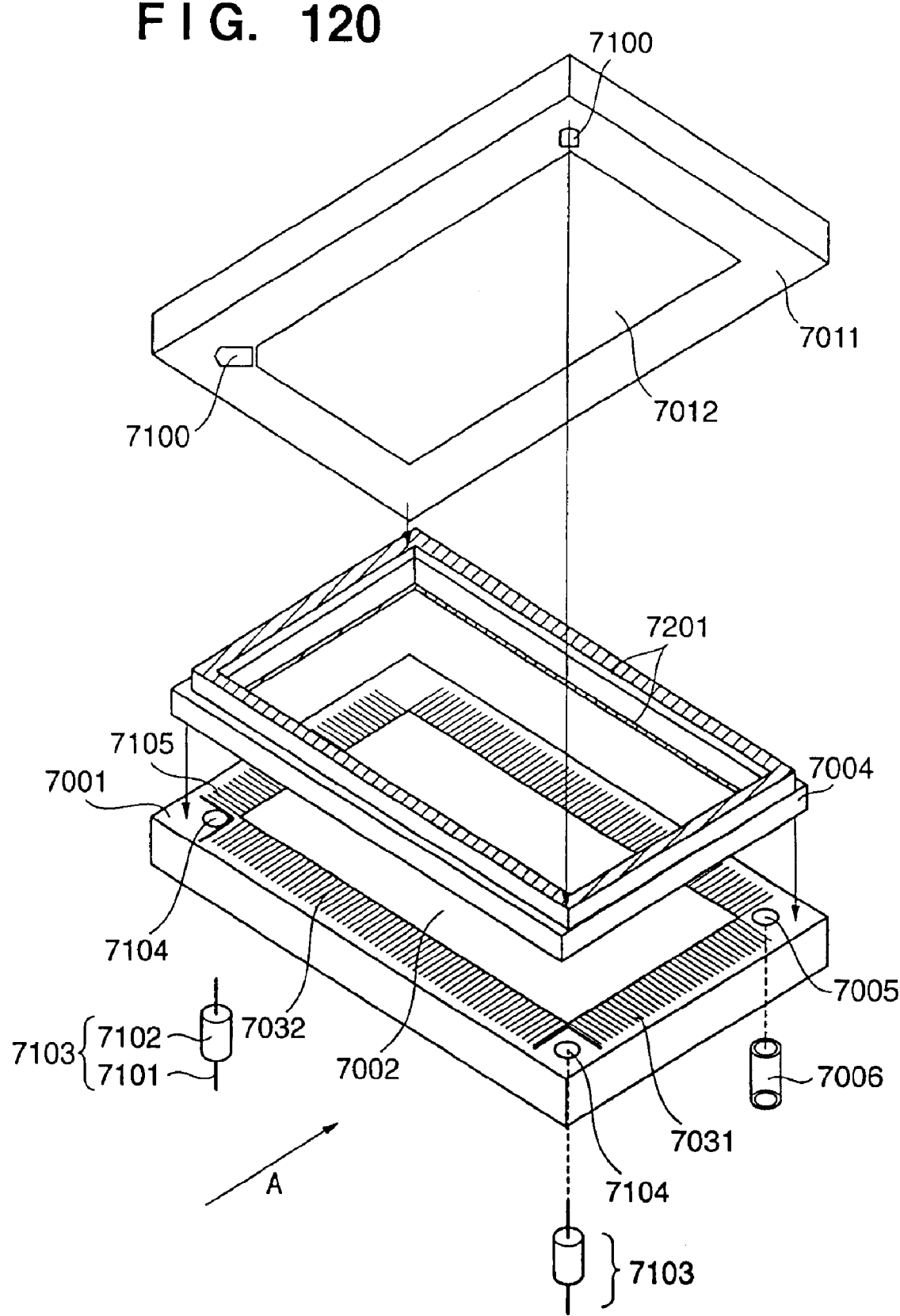
Figure 121A:
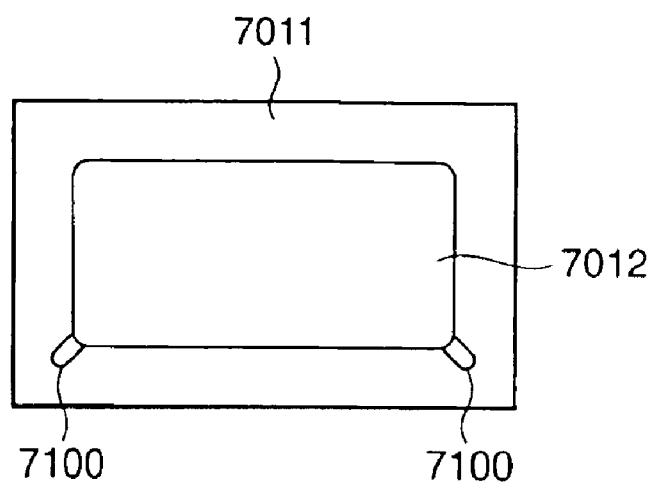
Figure 121B:
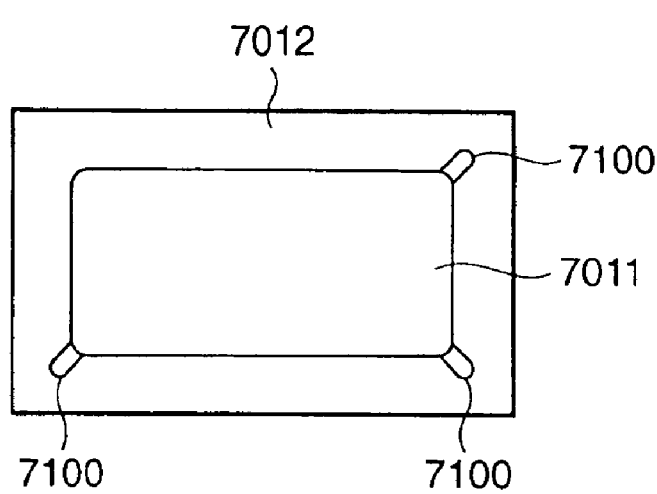
Figure 121C:
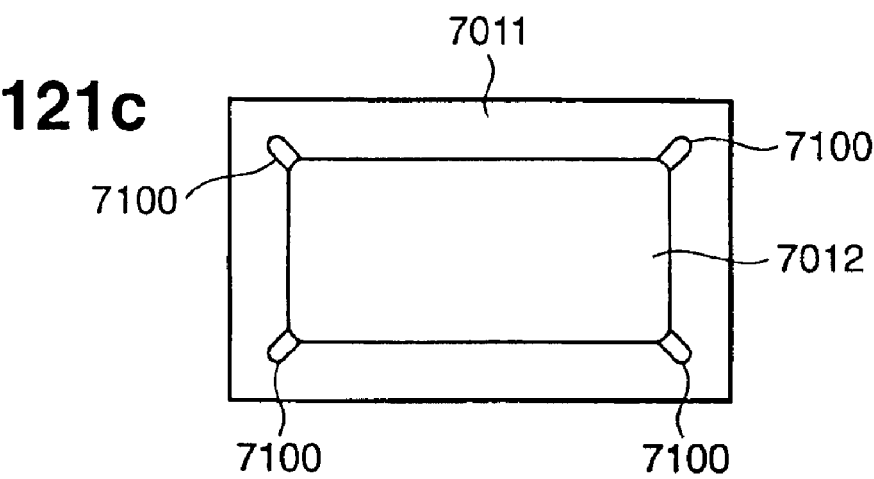
Figure 122:
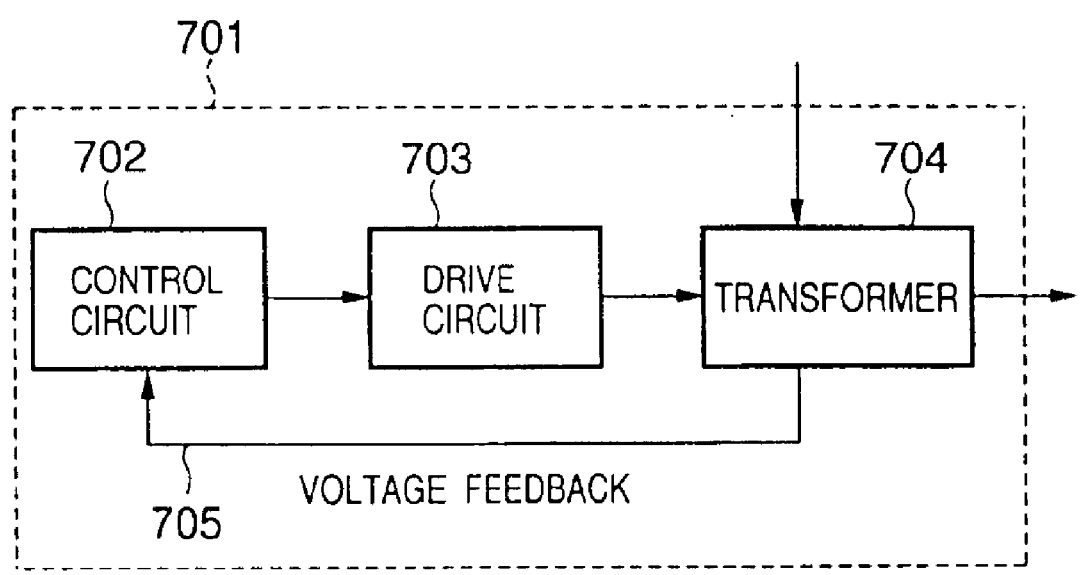
Figure 123C:
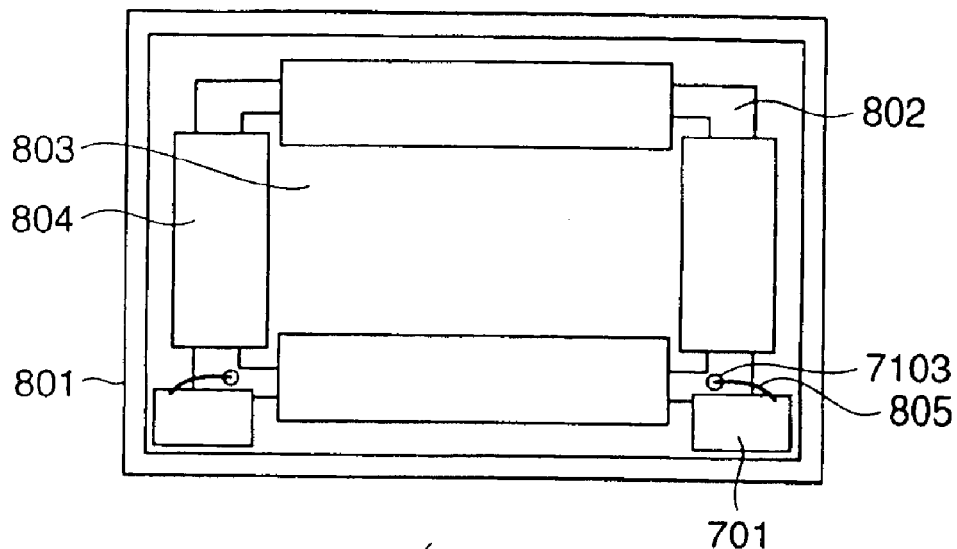
Figure 123A:
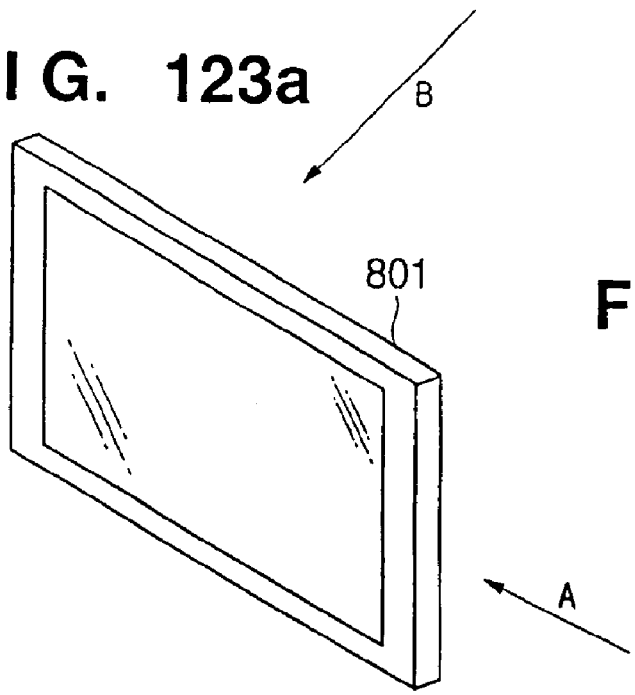
Figure 123B:
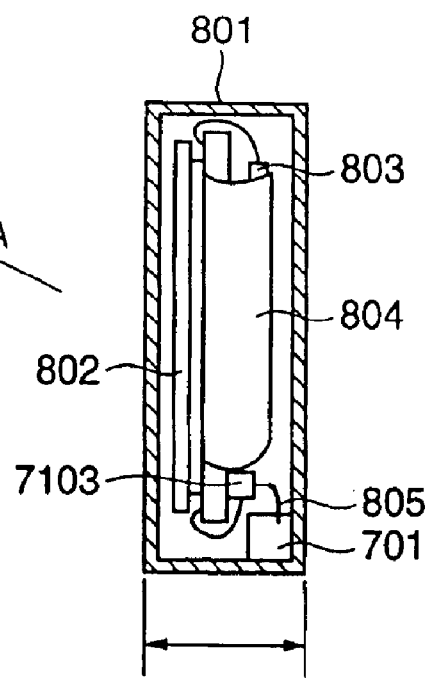
Figure 124A:
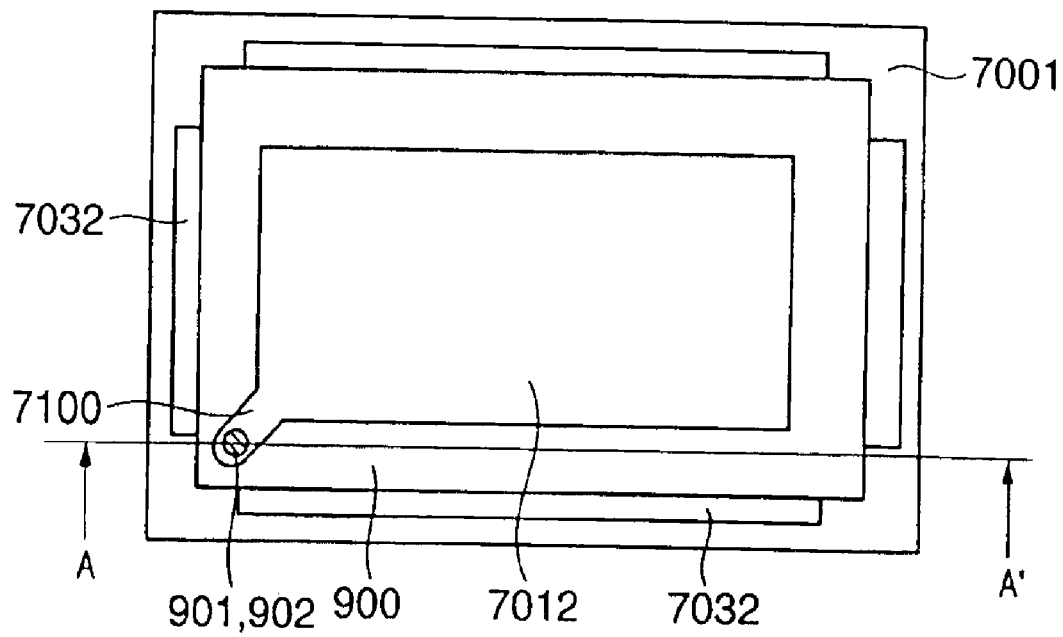
Figure 124B:
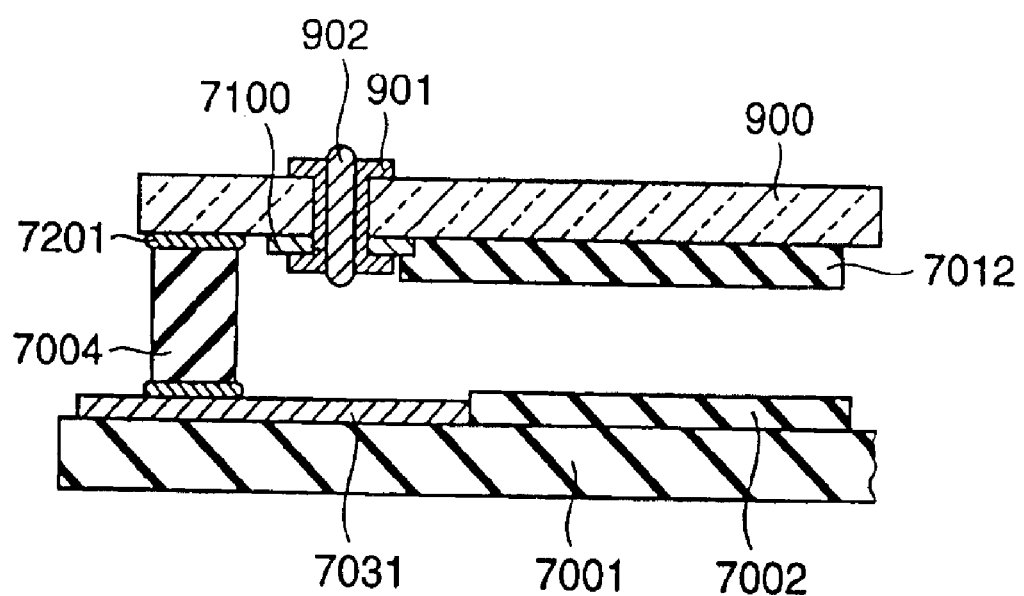
Figure 126A:
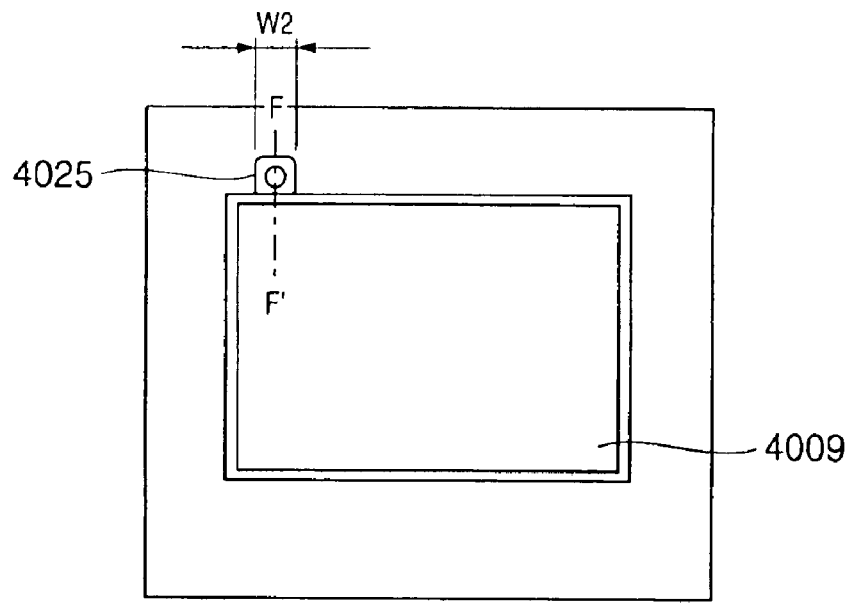
Figure 126B:
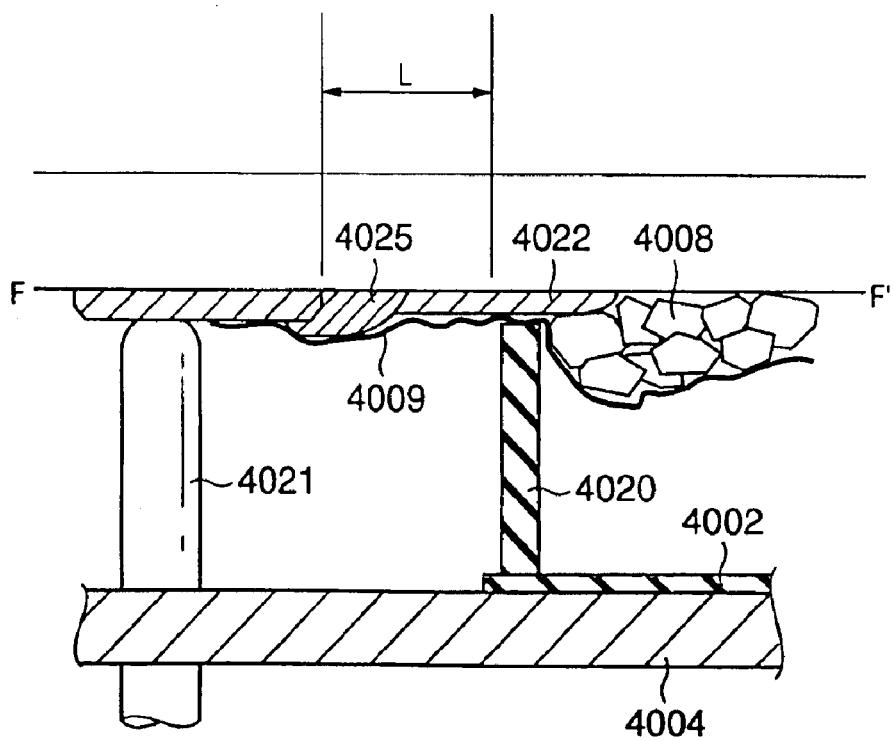
Figure 127:
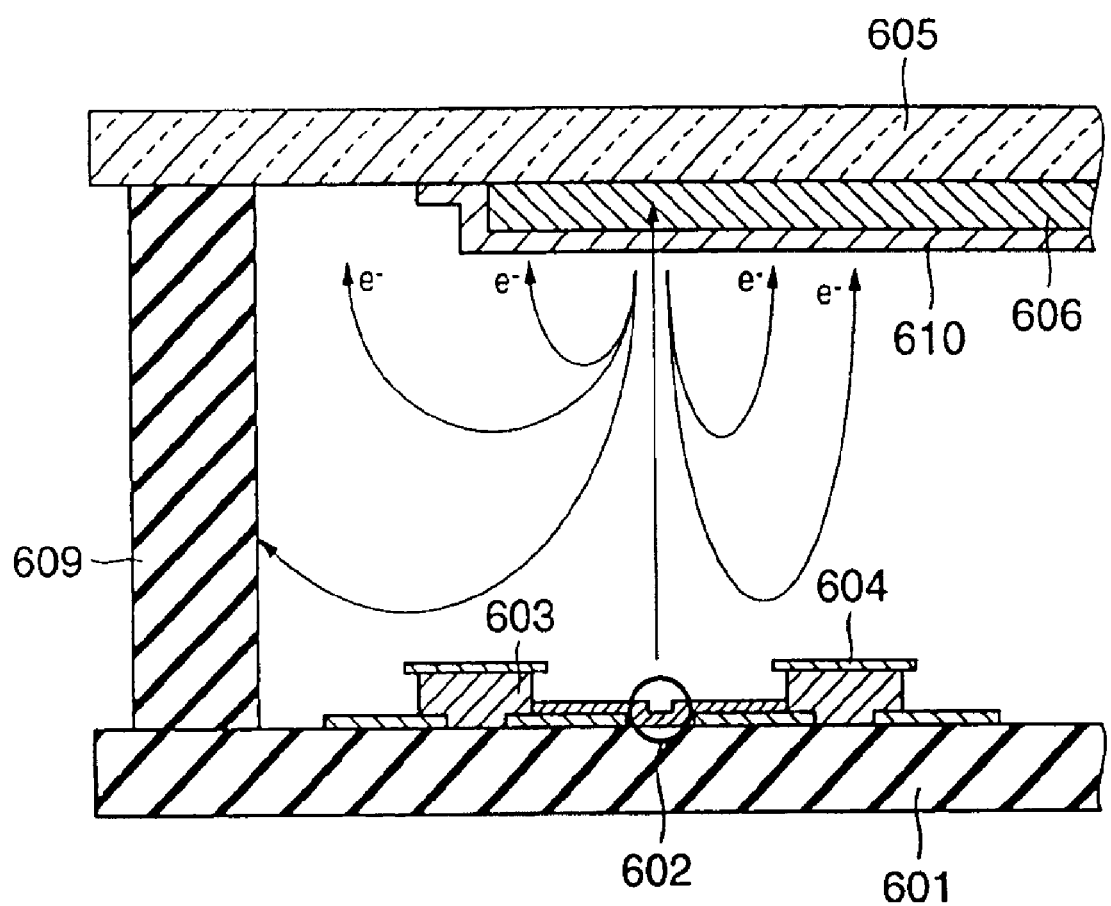
Figure 128:
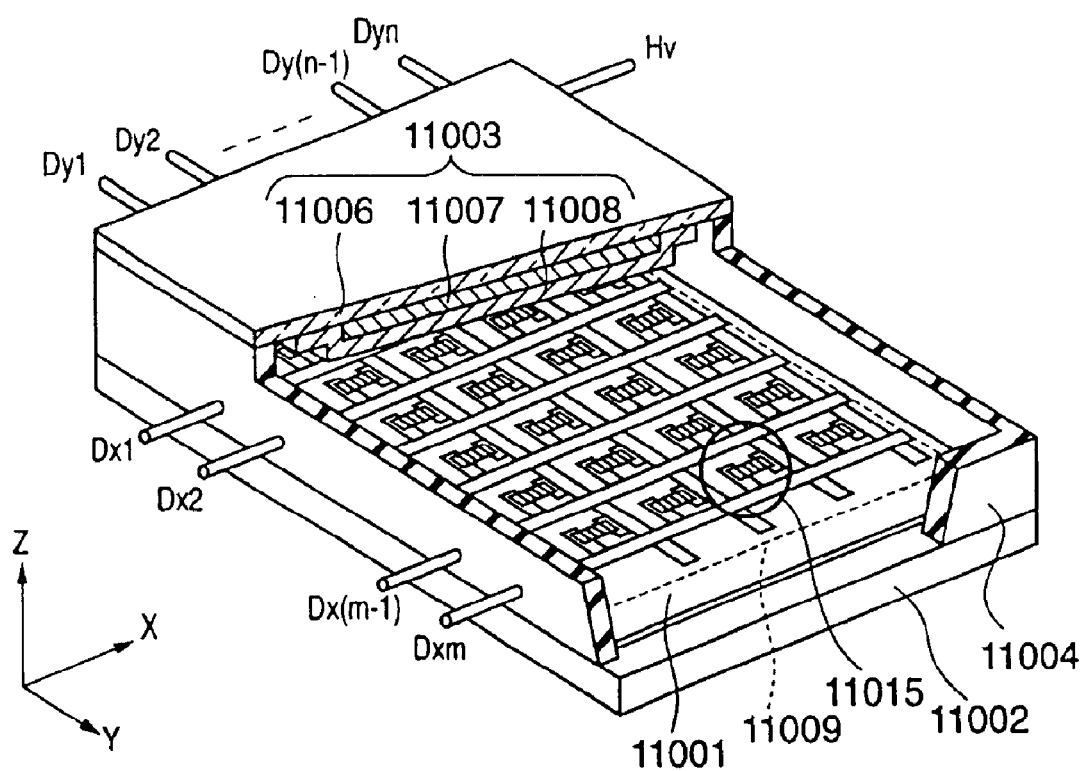
Figure 129:
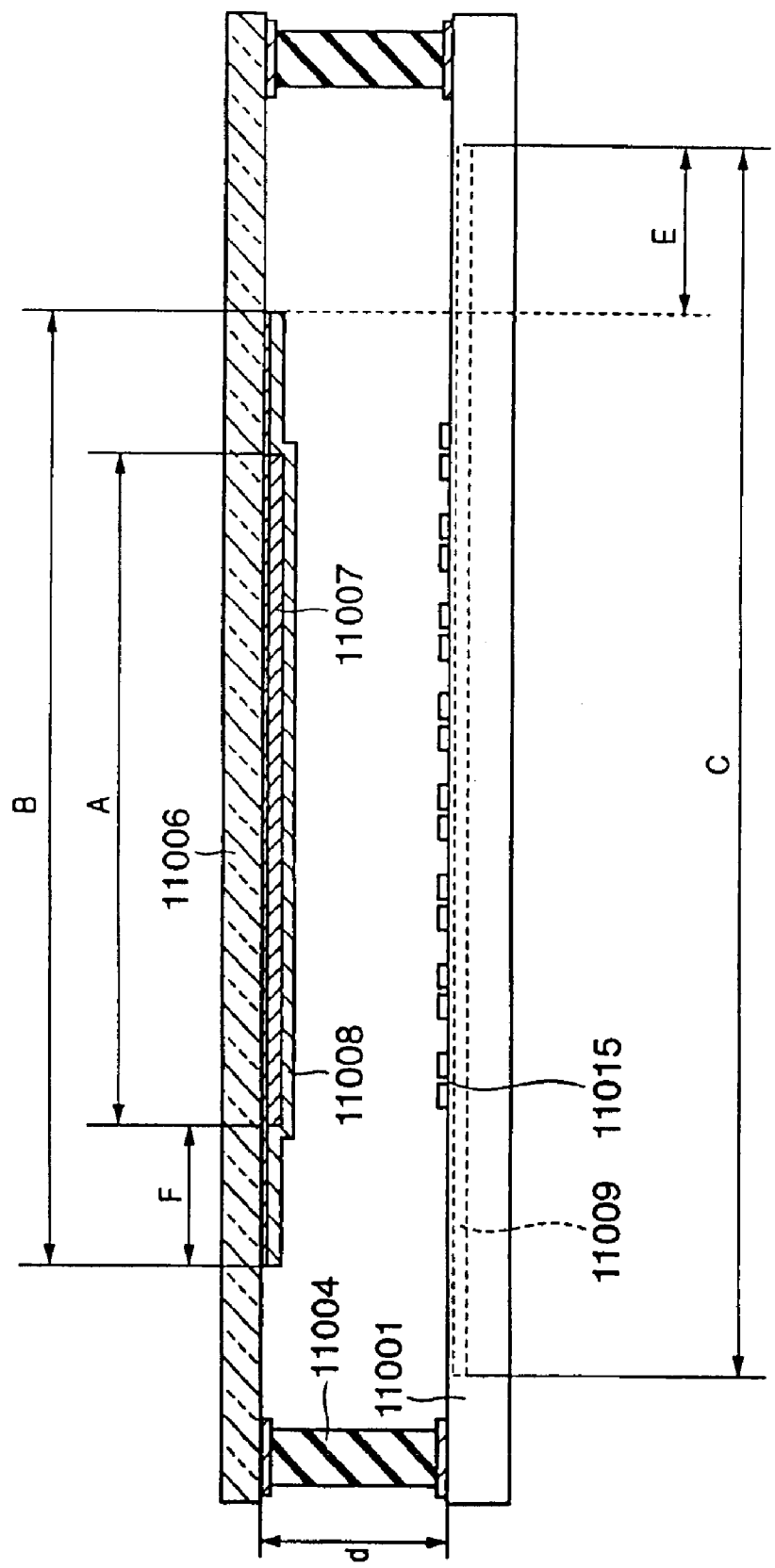
Figure 130A:
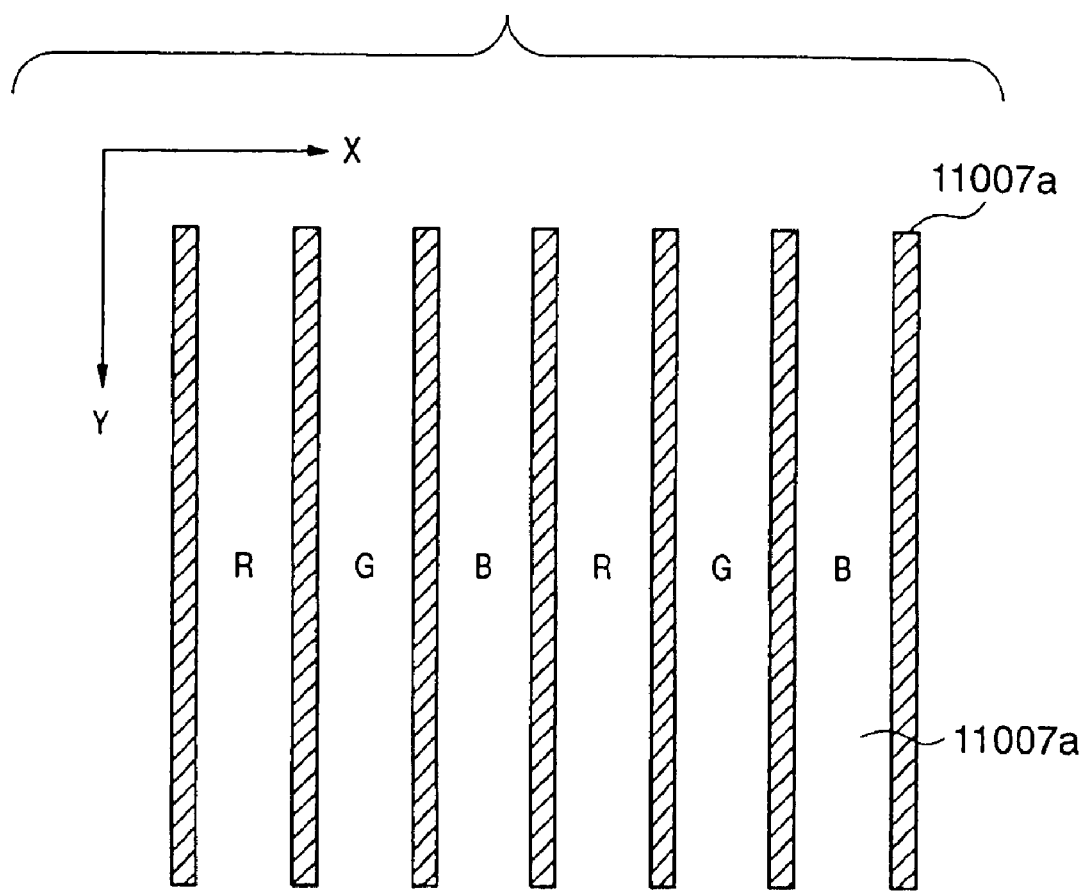
Figure 130B:
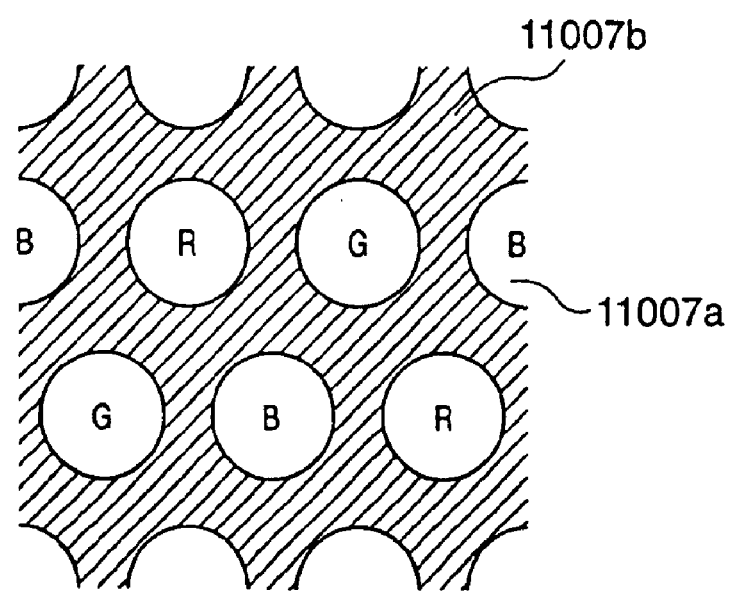
Figure 131:
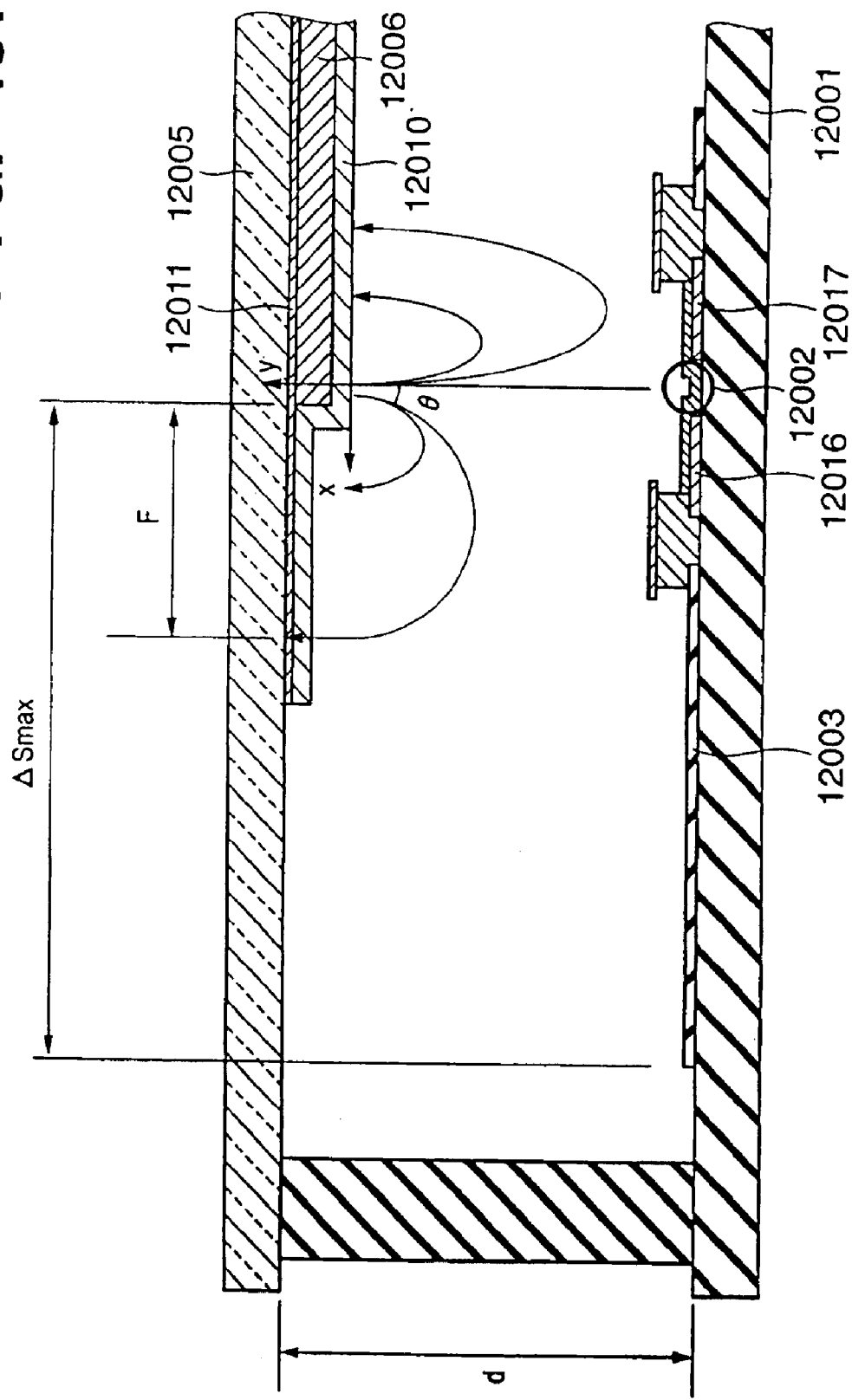
Figure 132:
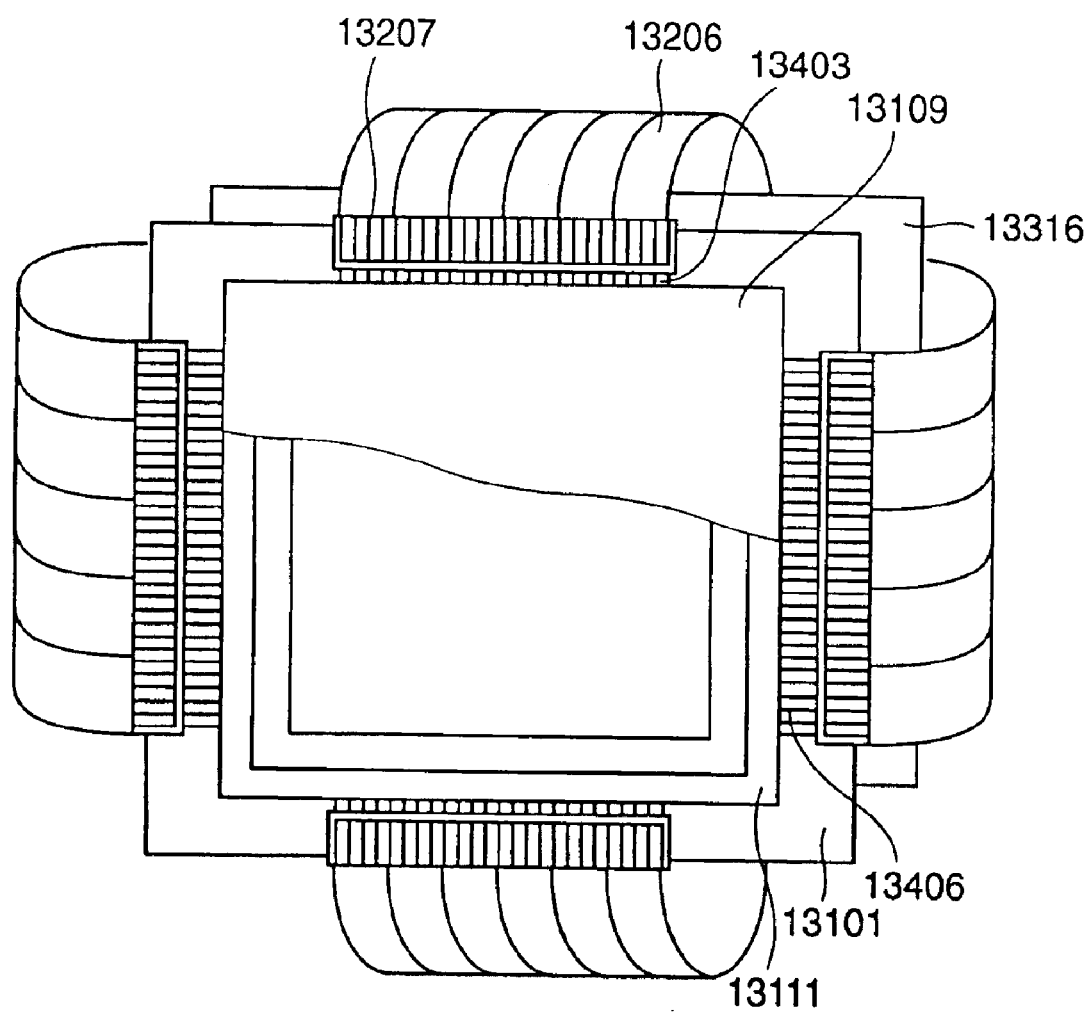
Figure 133:
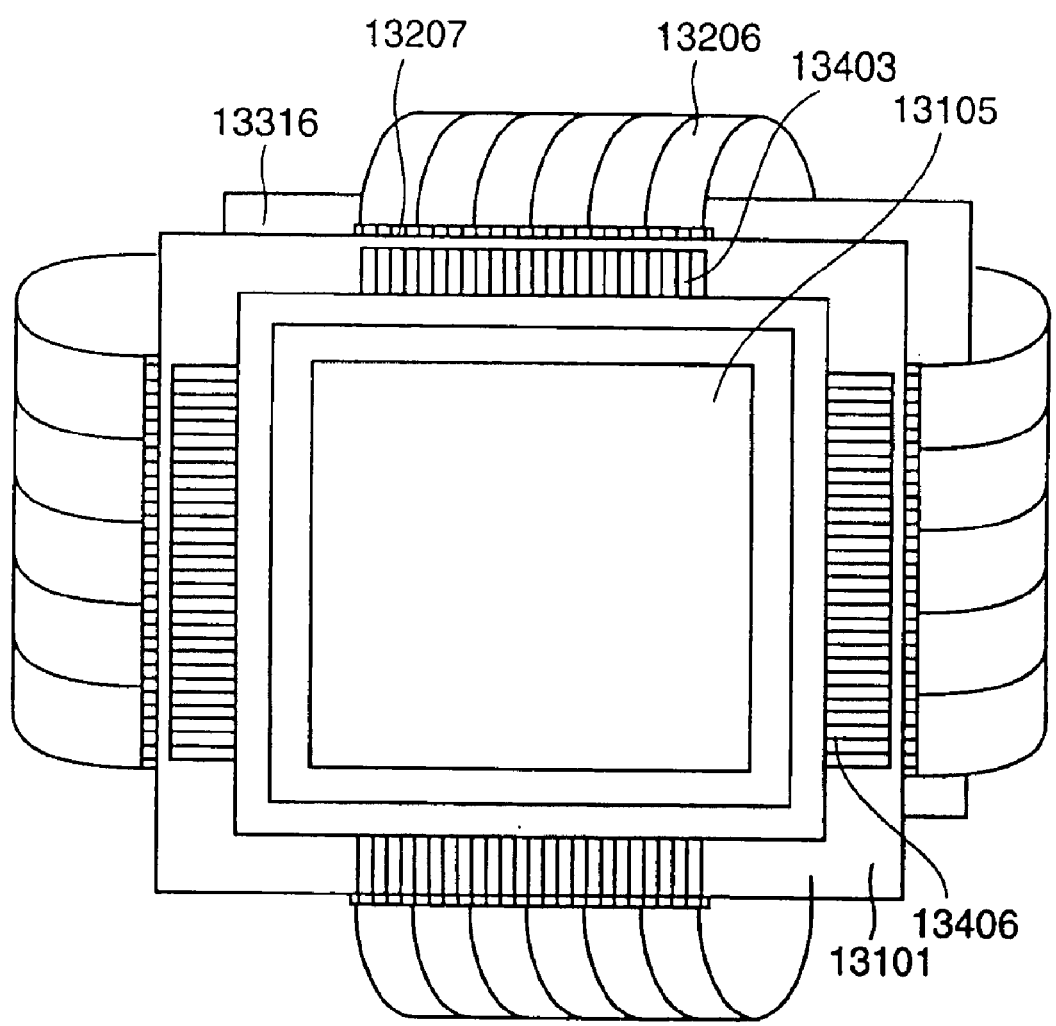
Figure 134A:
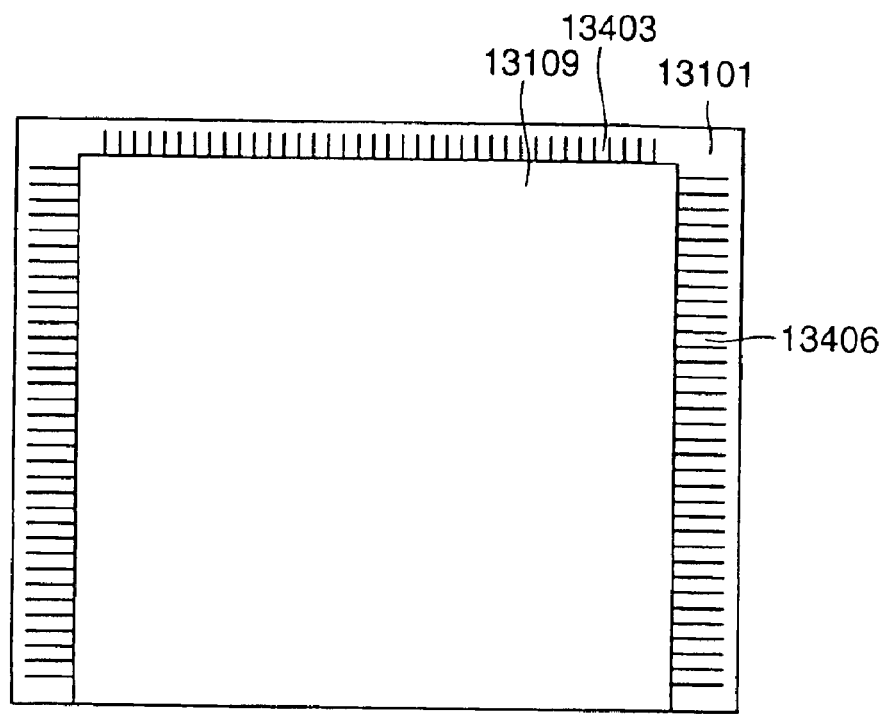
Figure 134B:
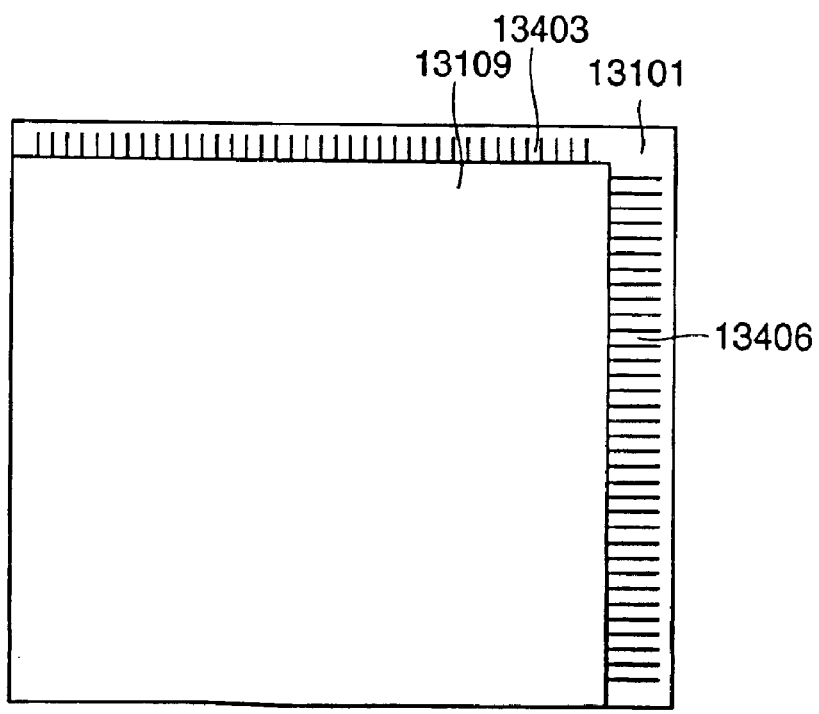
Figure 135:
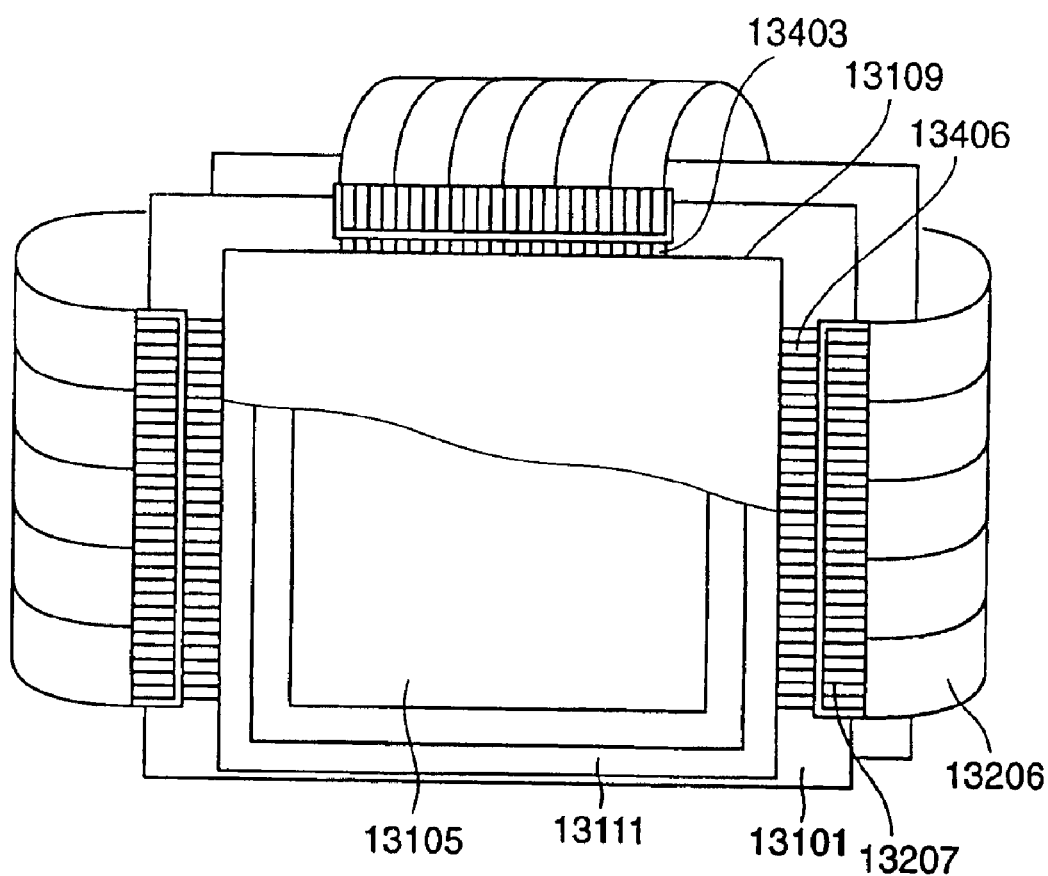
Figure 136:
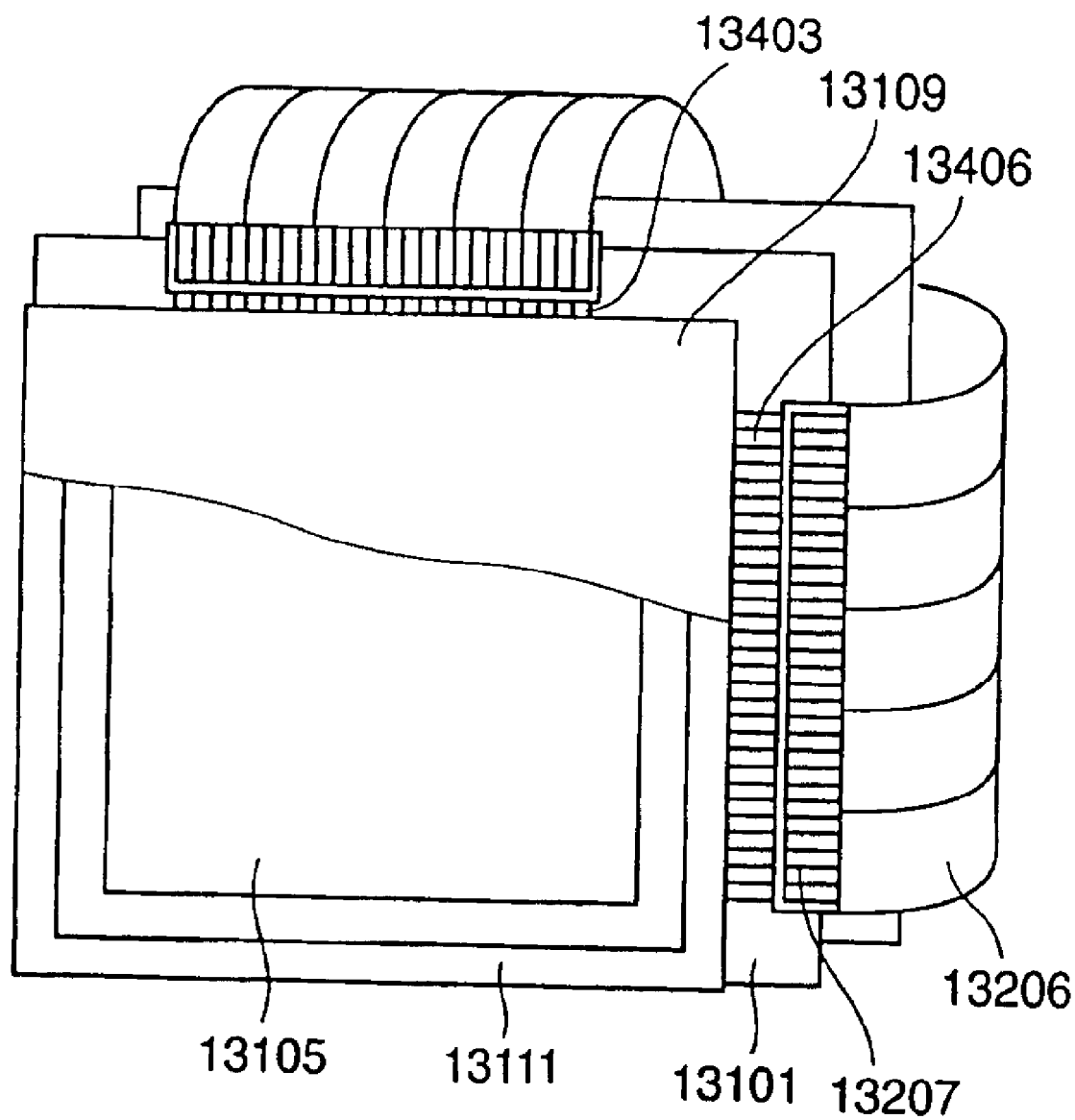
Figure 137:
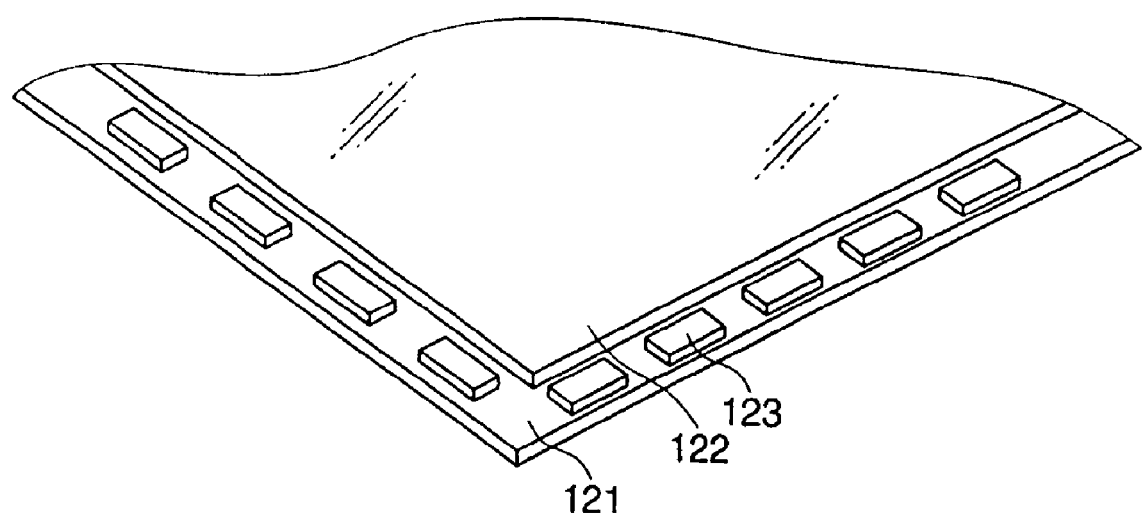
Figure 138:
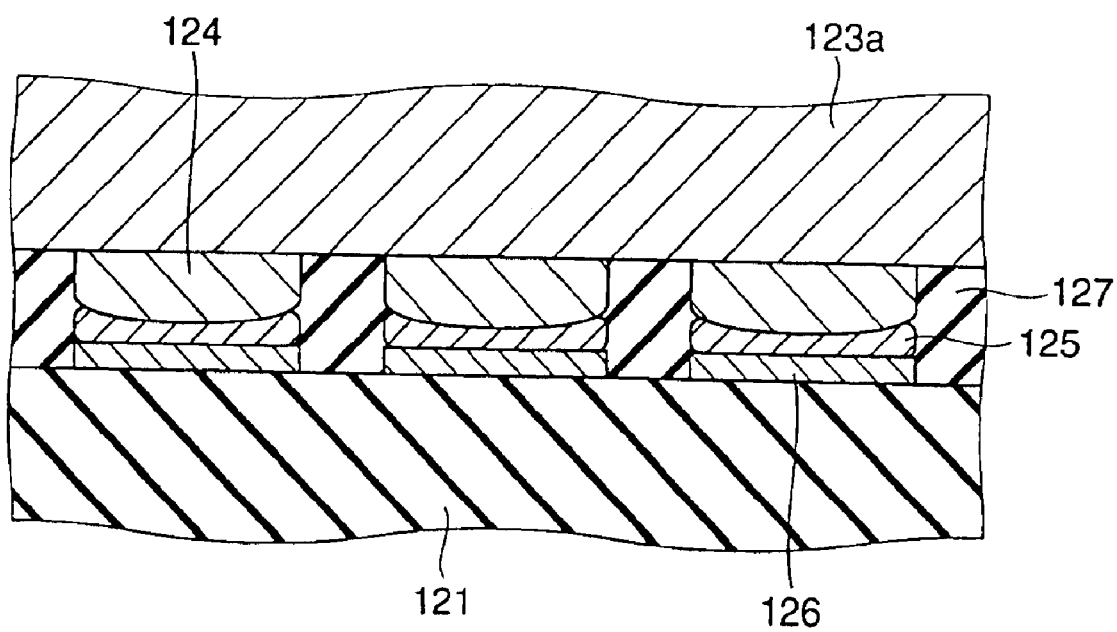
Figure 139:
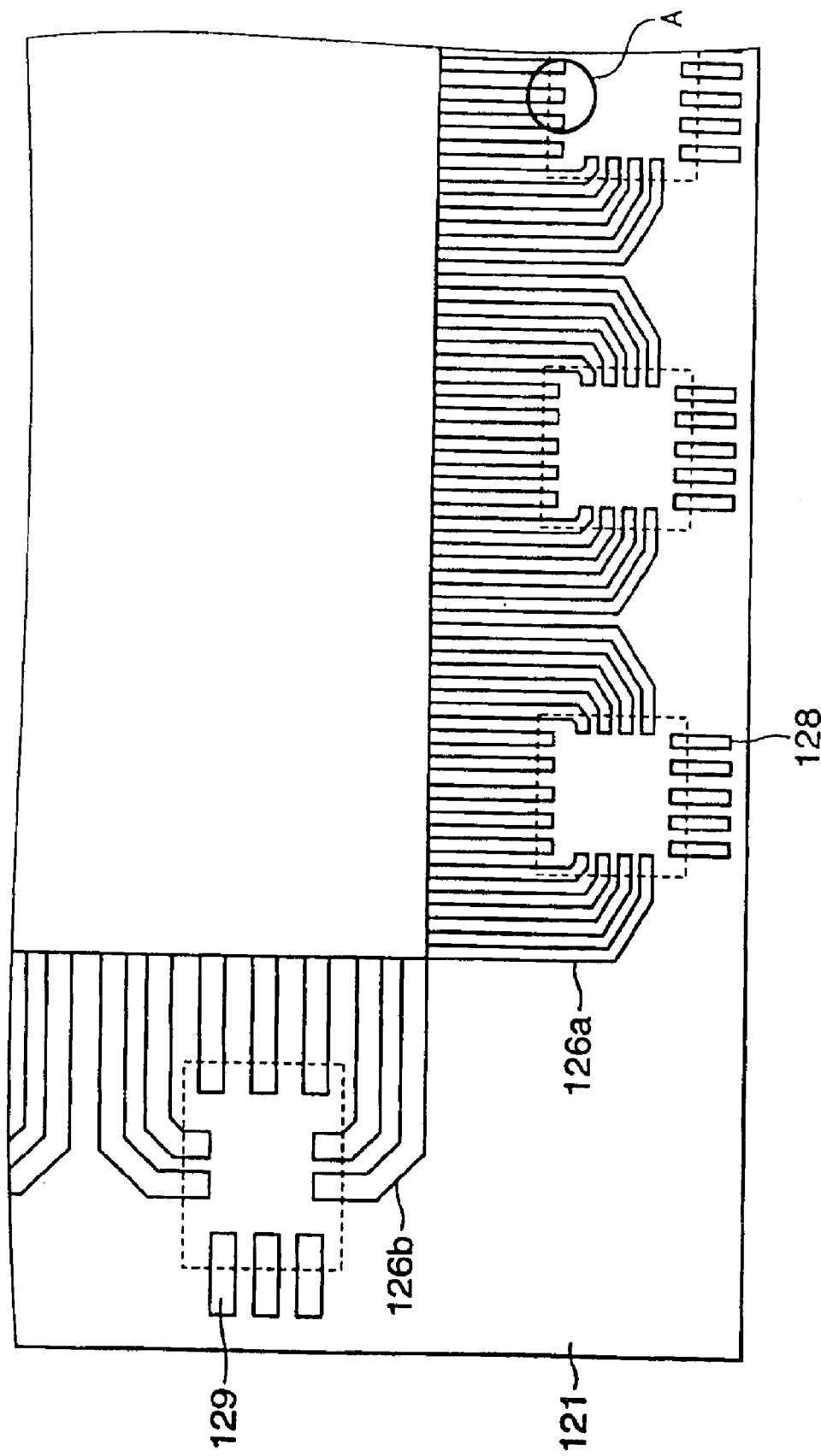
Figure 140:
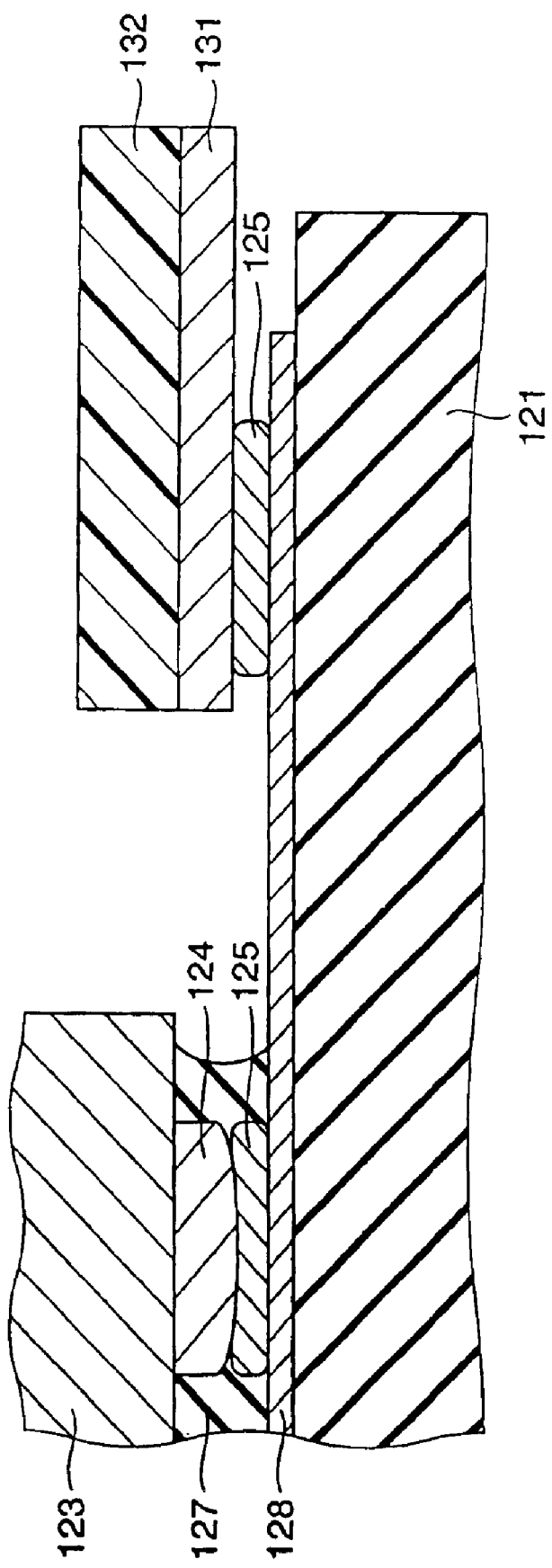
Figure 141A:
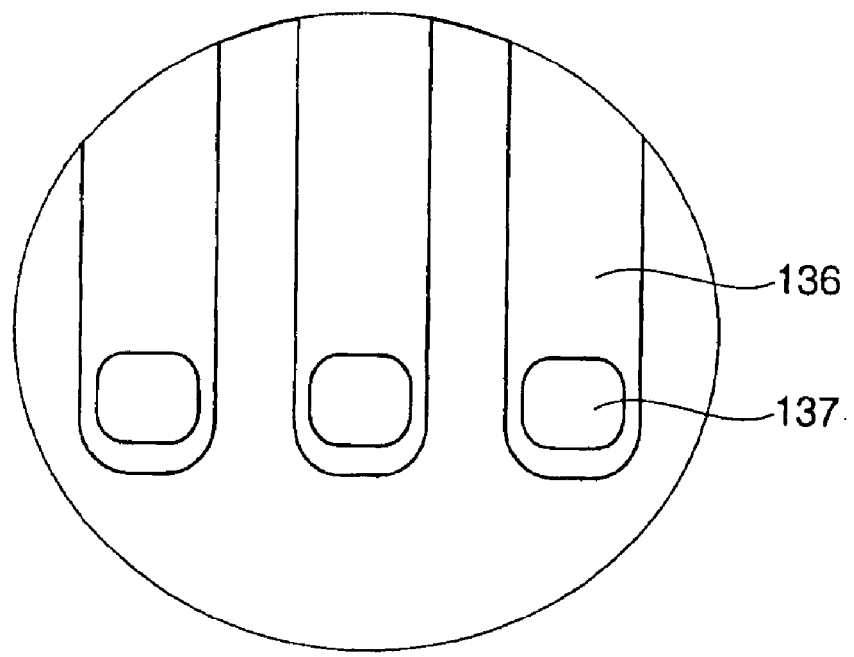
Figure 141B:
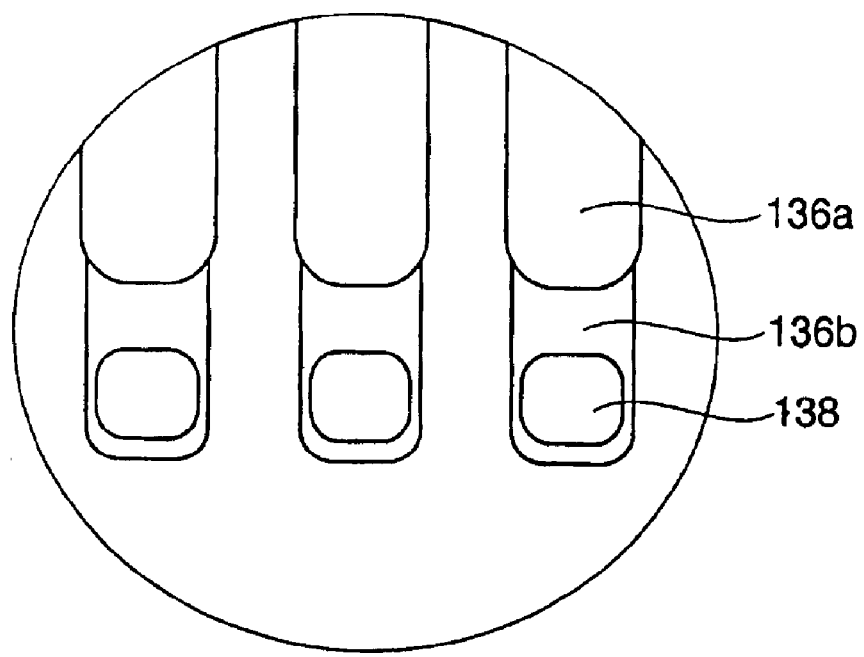
Figure 143:
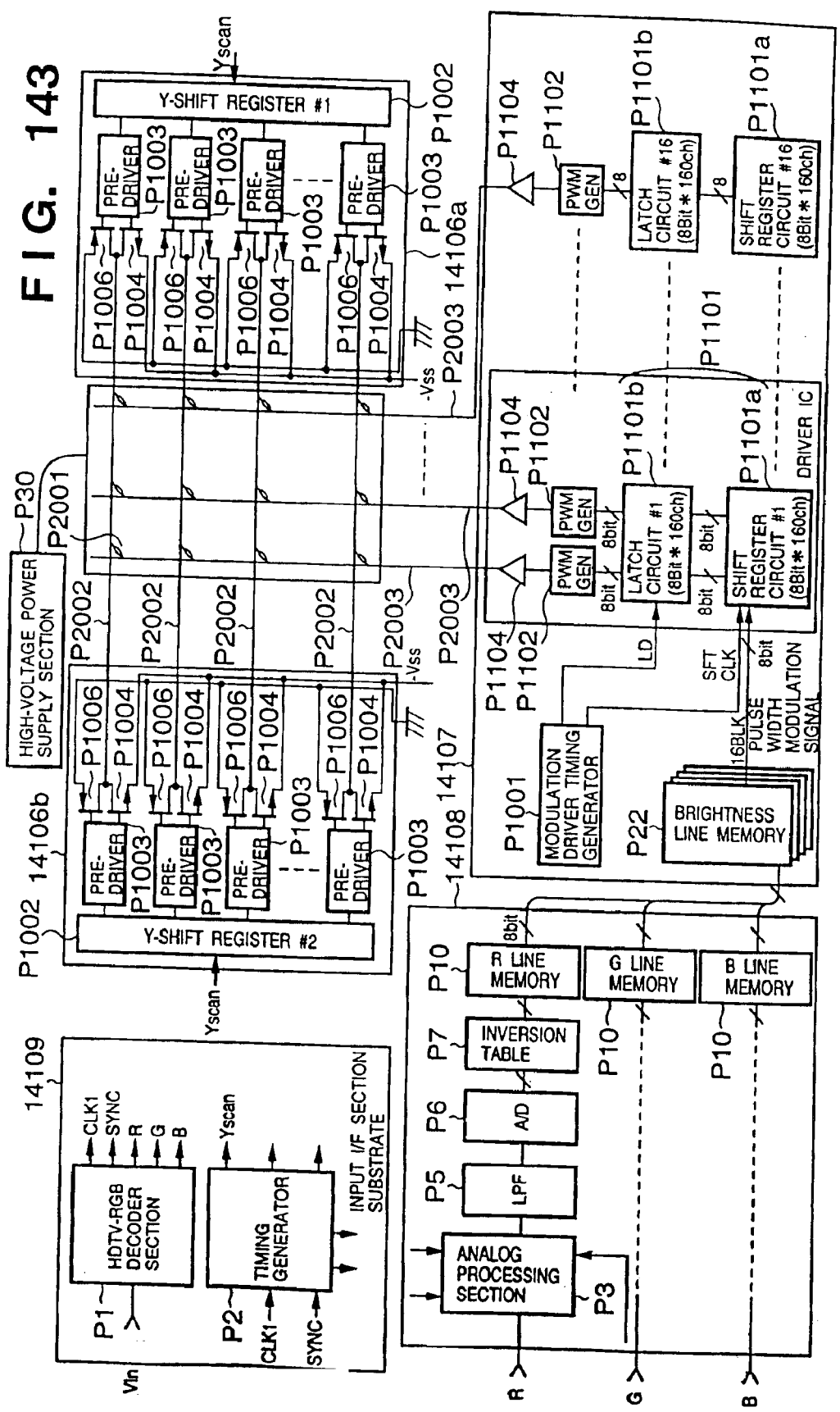
Figure 144:
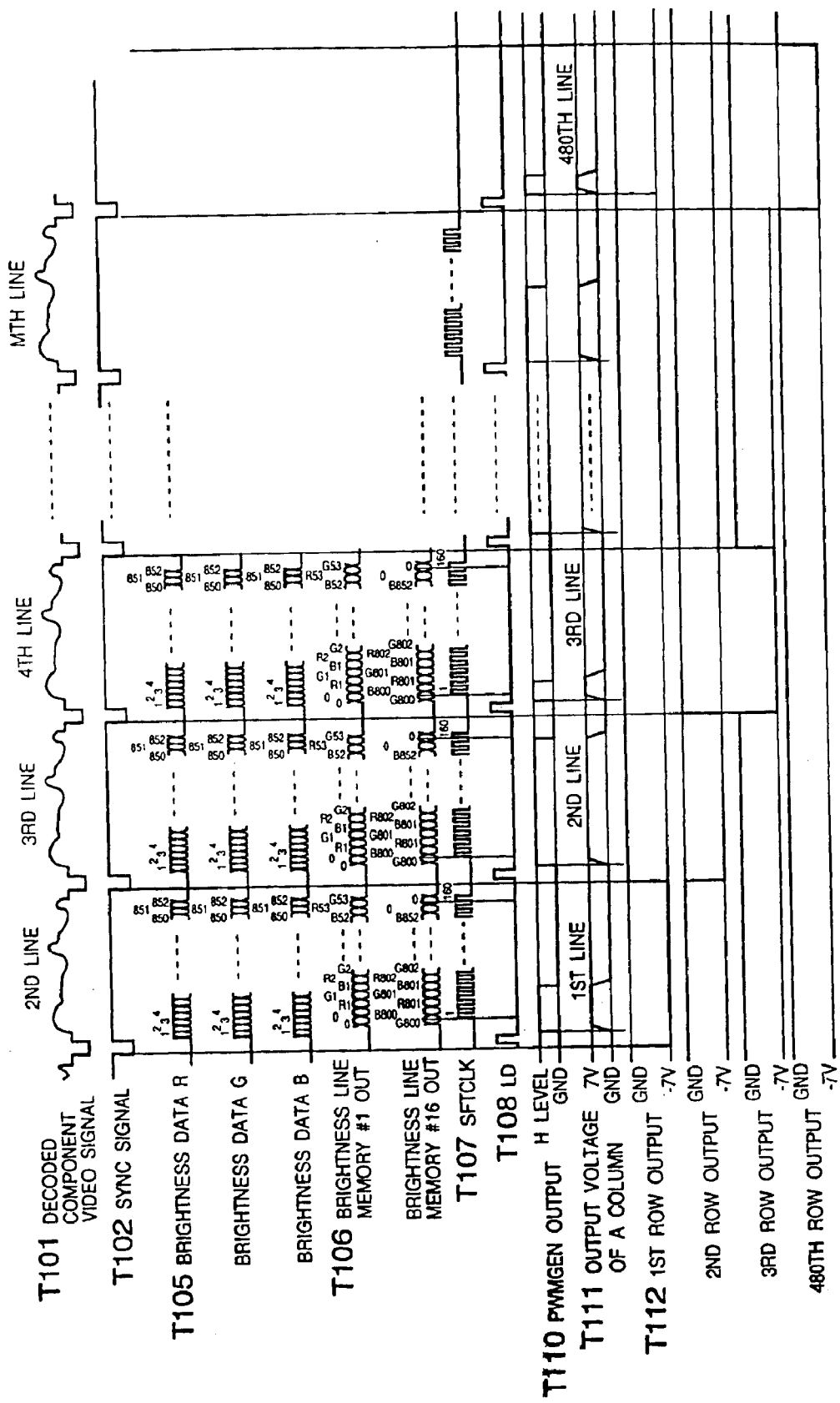
Figure 145:
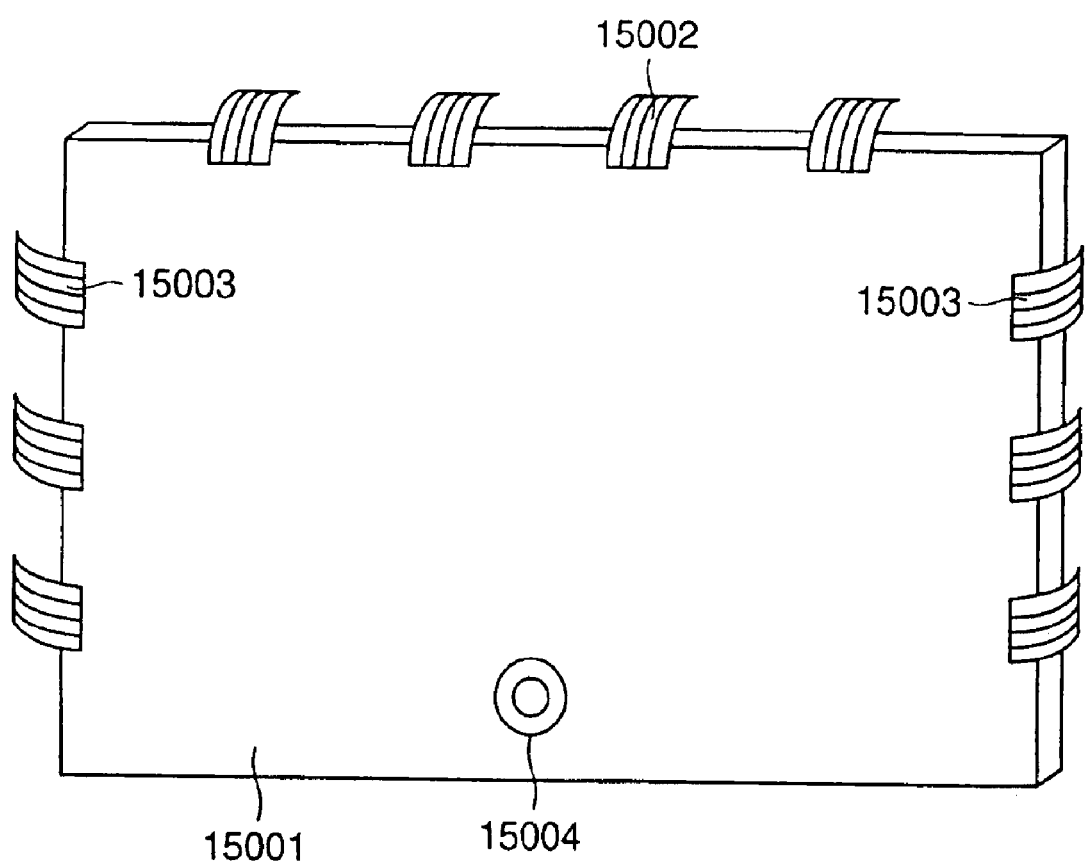
Figure 146:
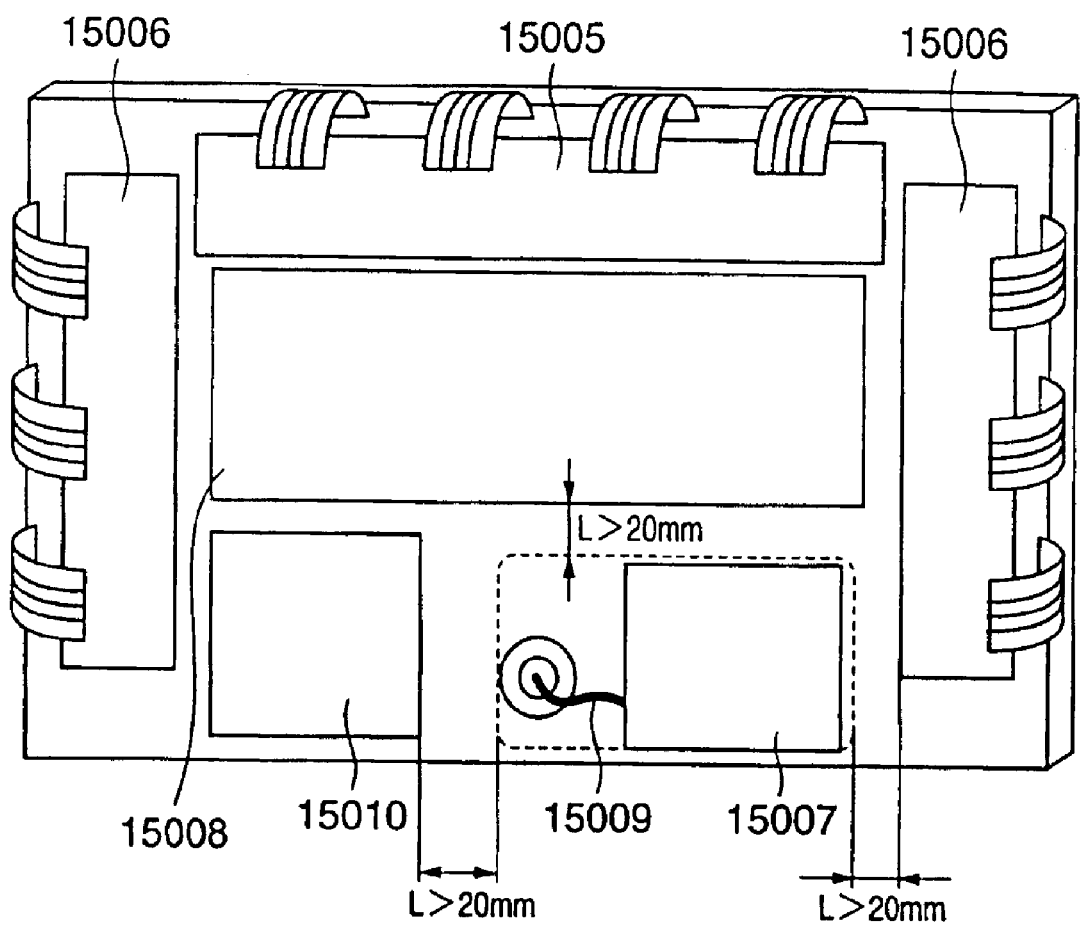
Figure 147:
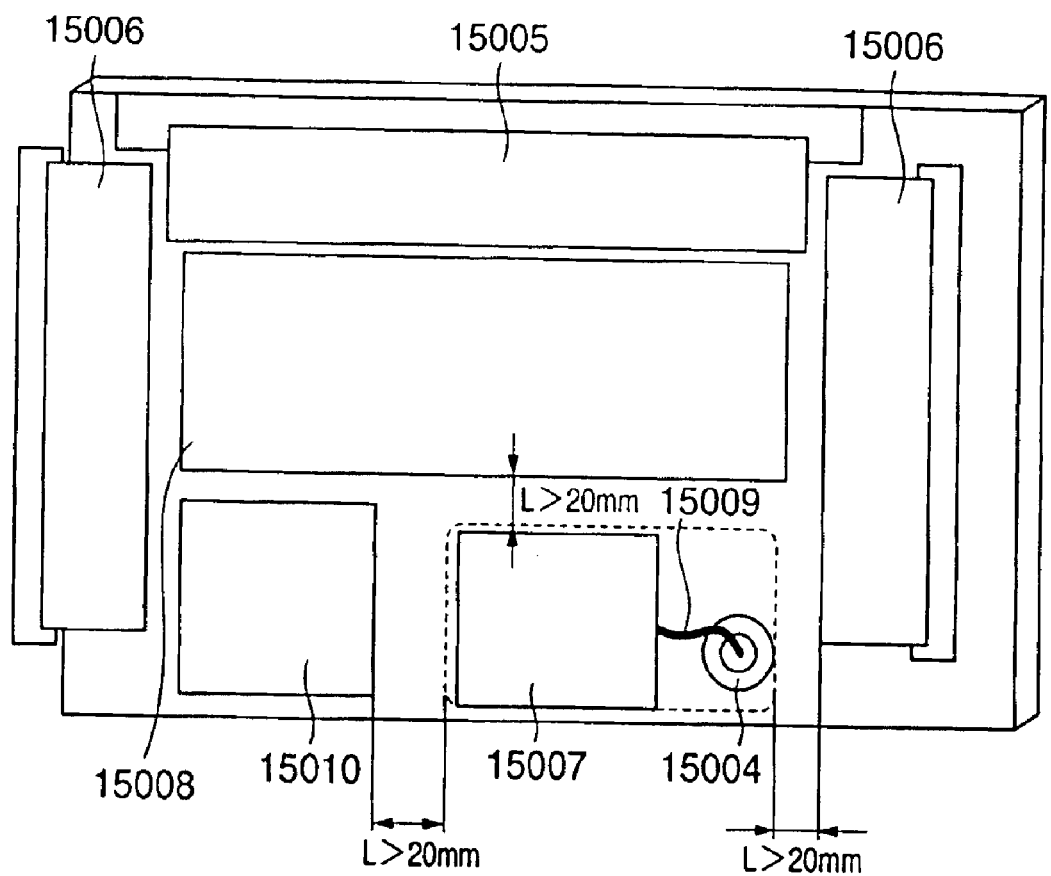
Figure 148:
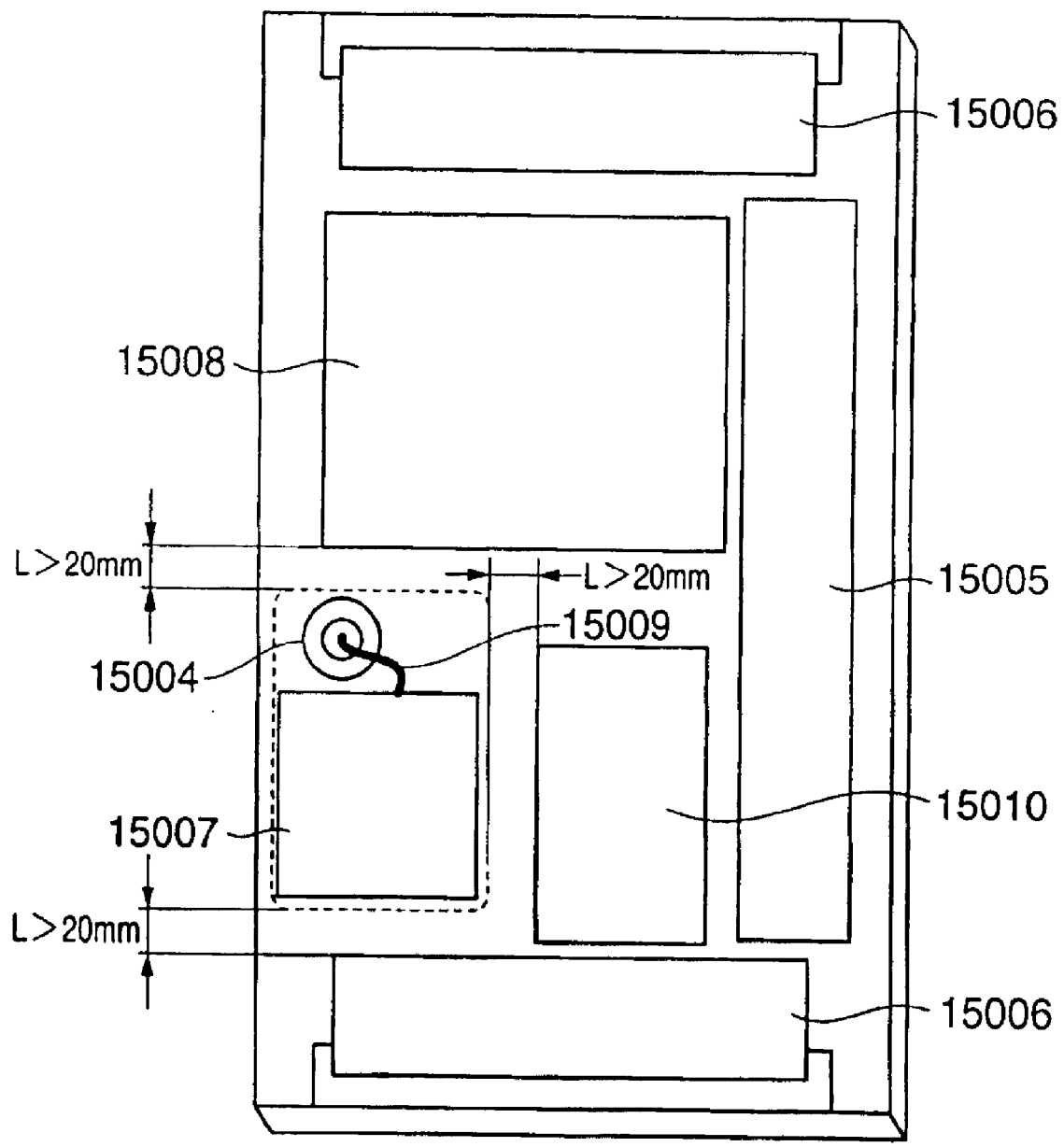
Figure 149:
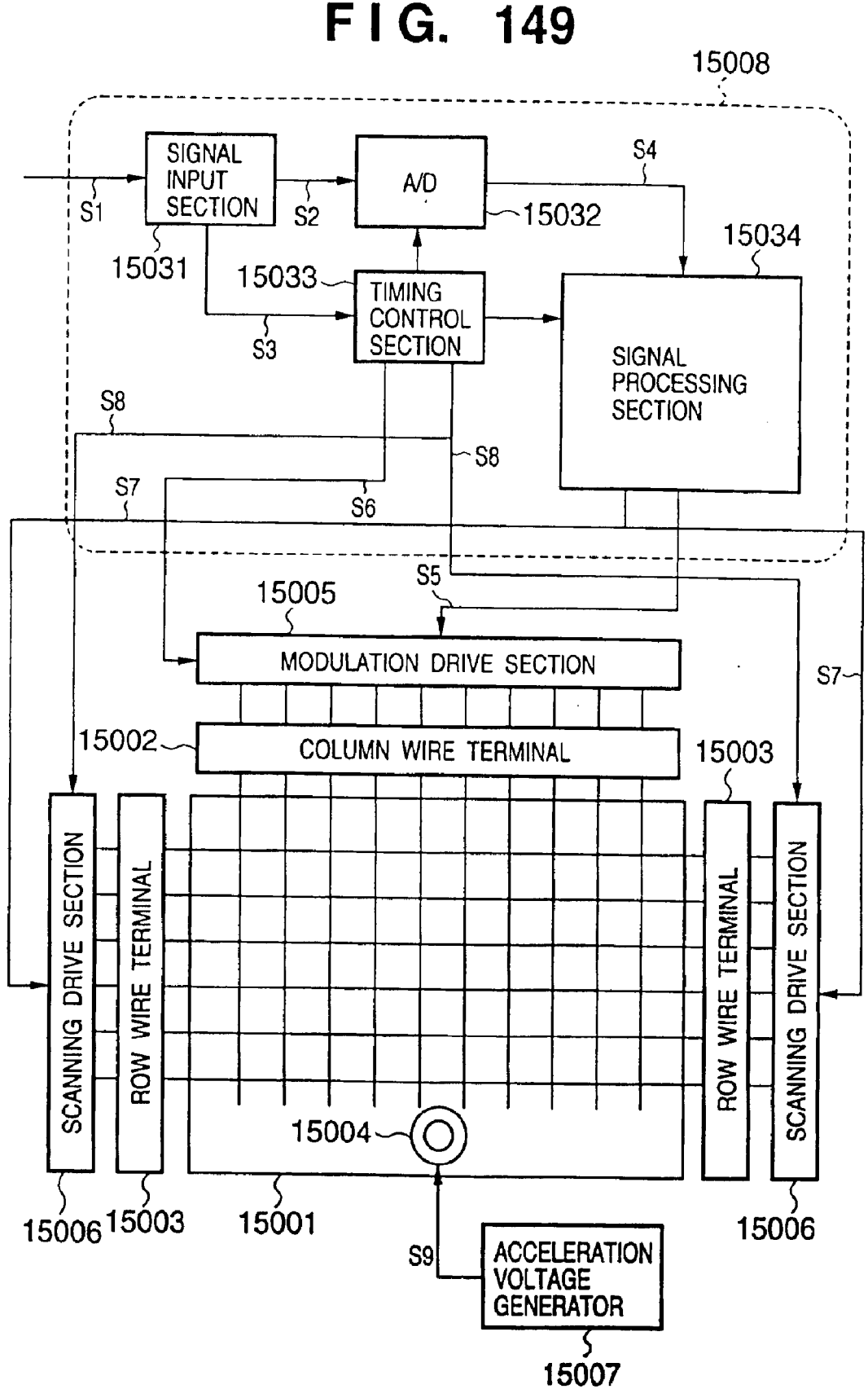
Figure 150:
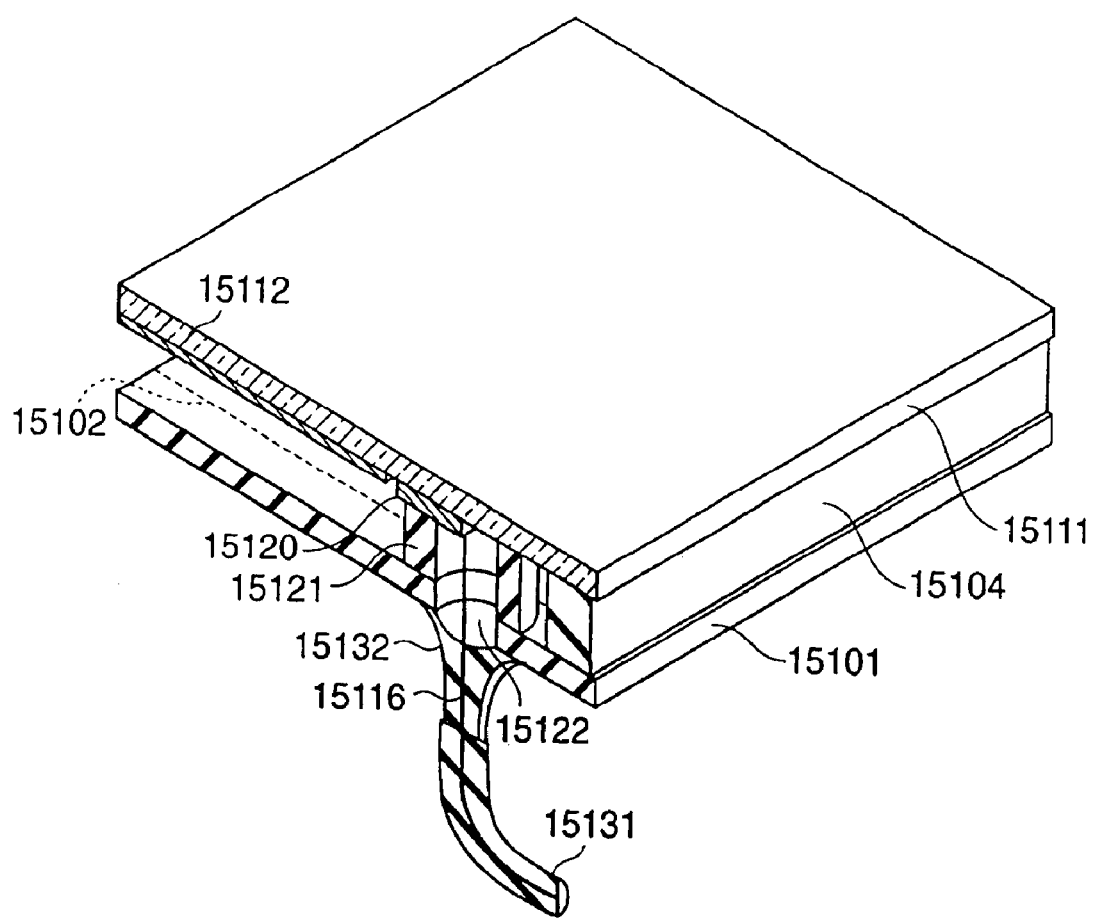
Figure 151:
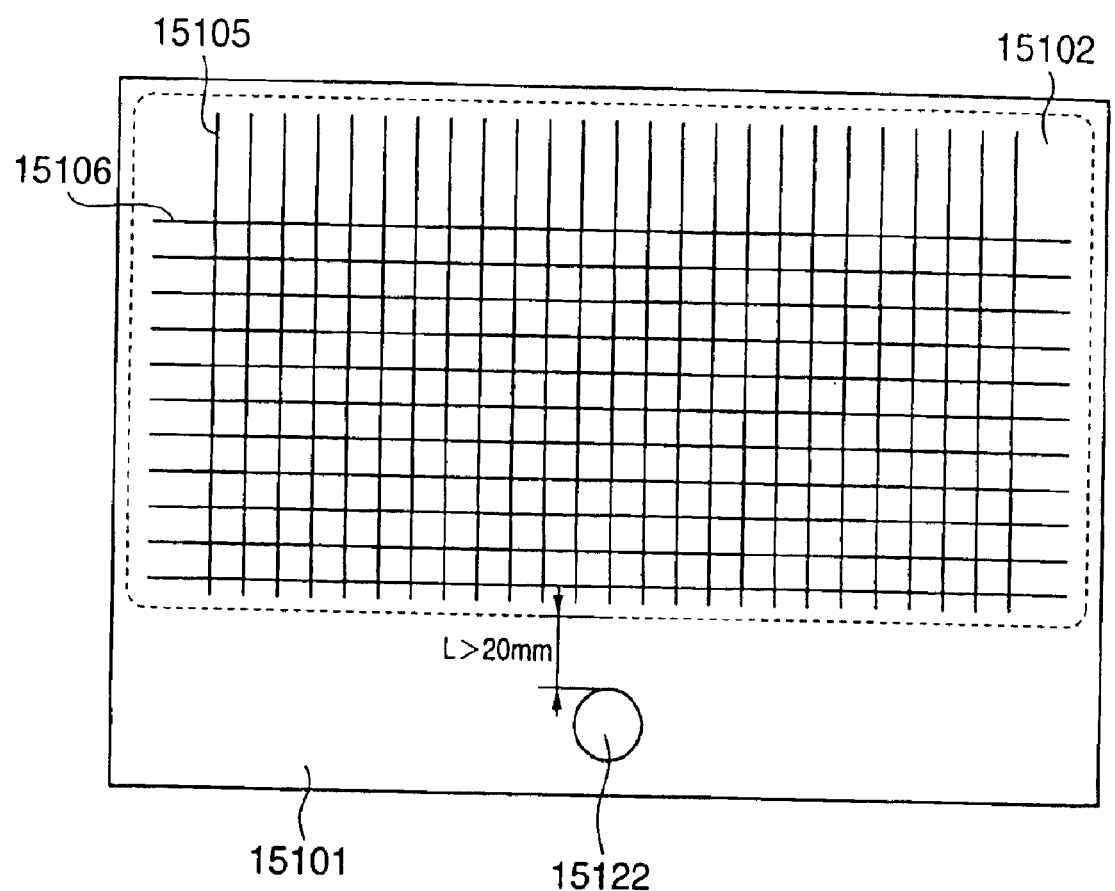
Figure 152:
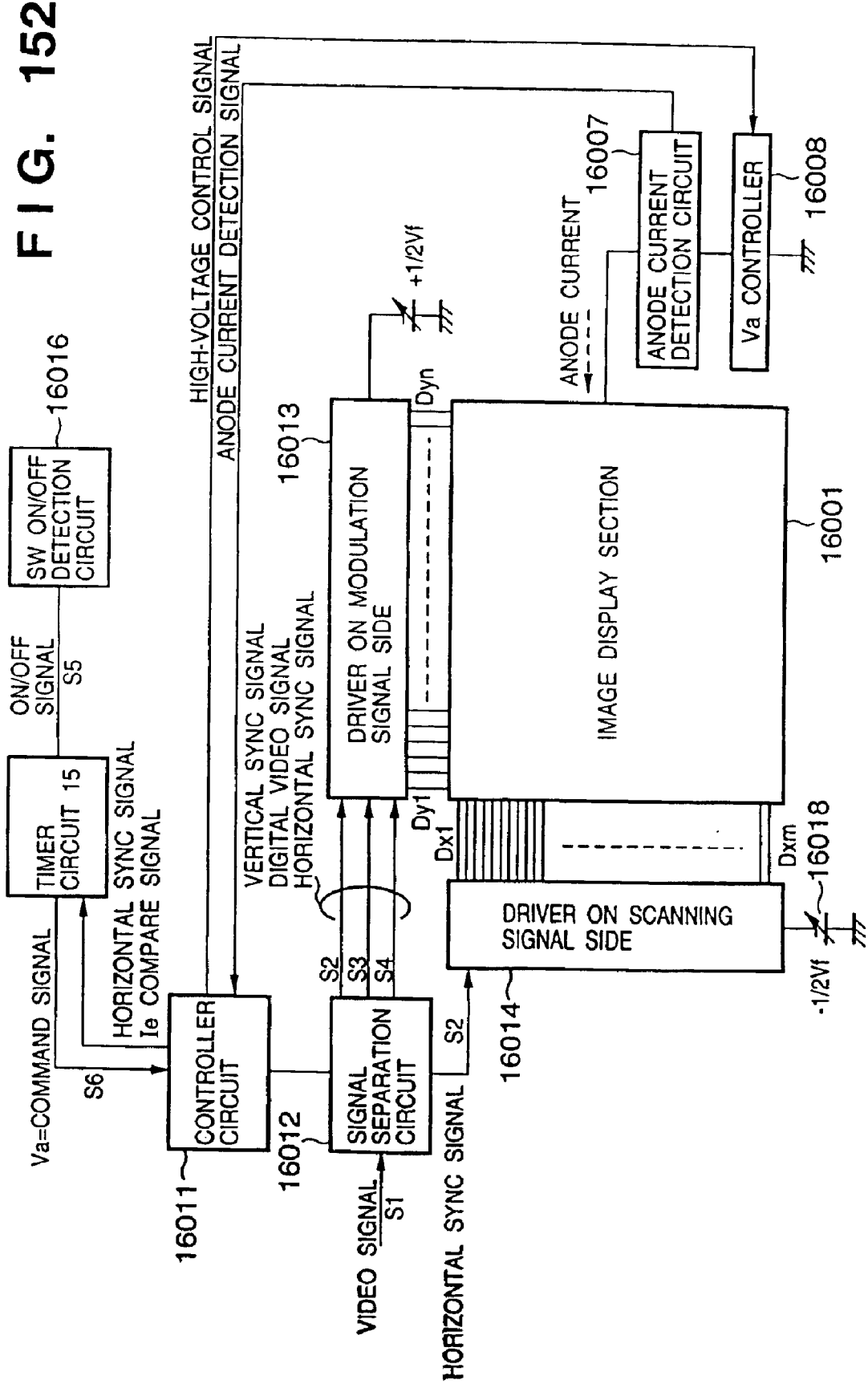
Figure 153:
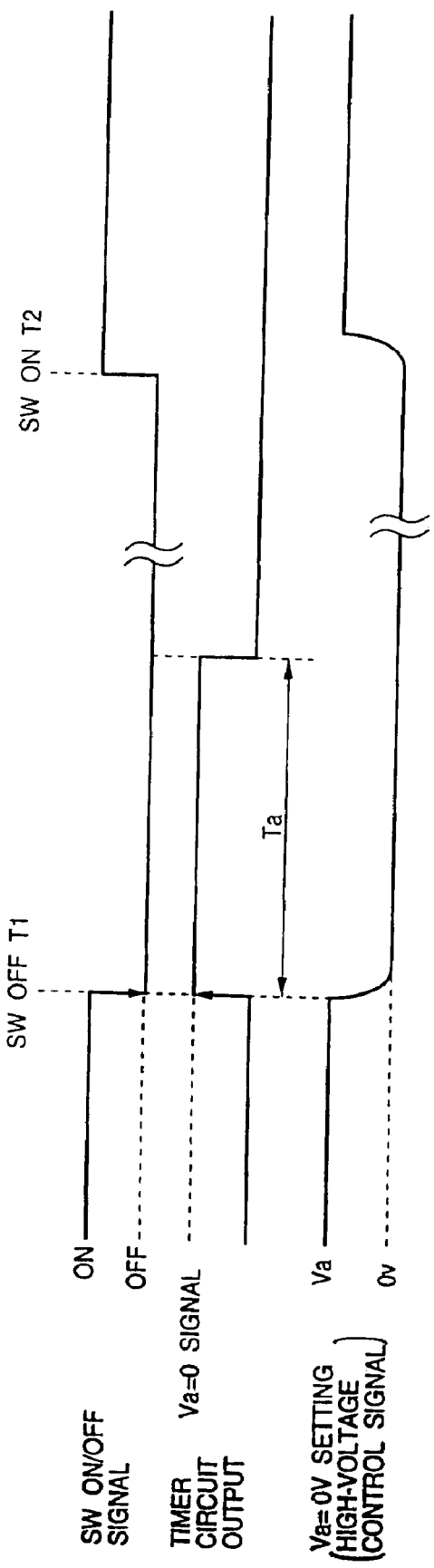
Figure 154:
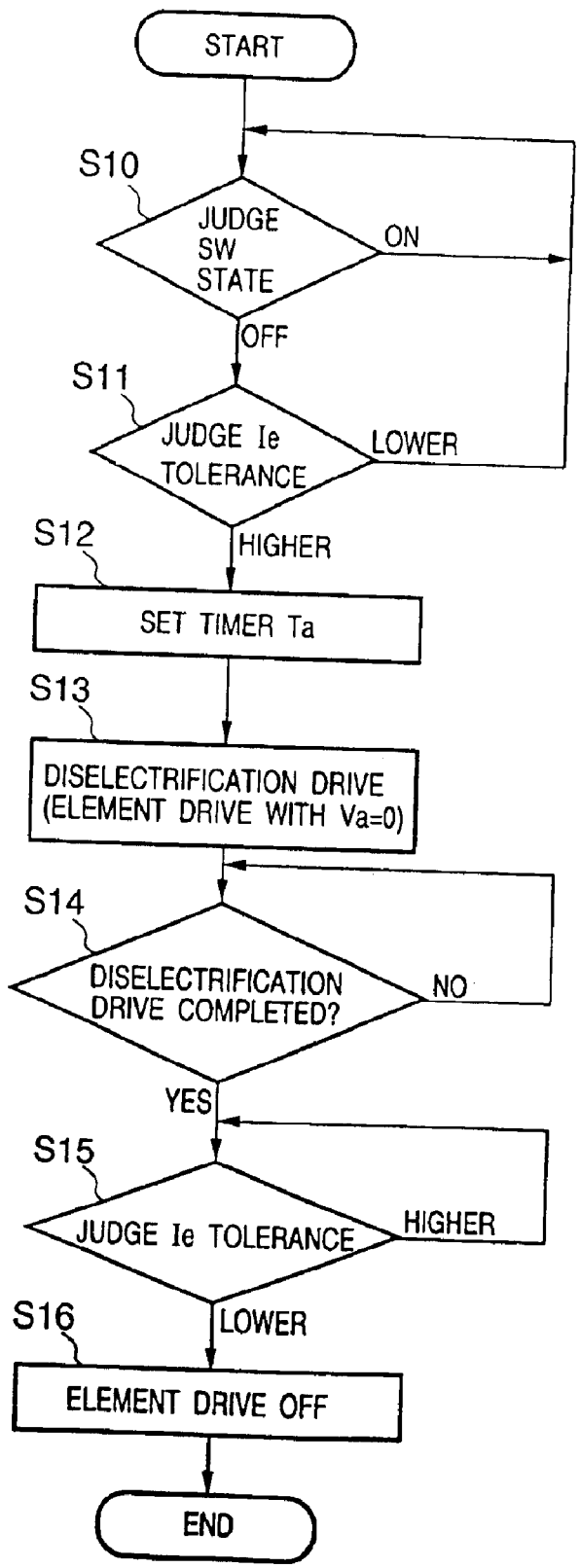
Figure 155:
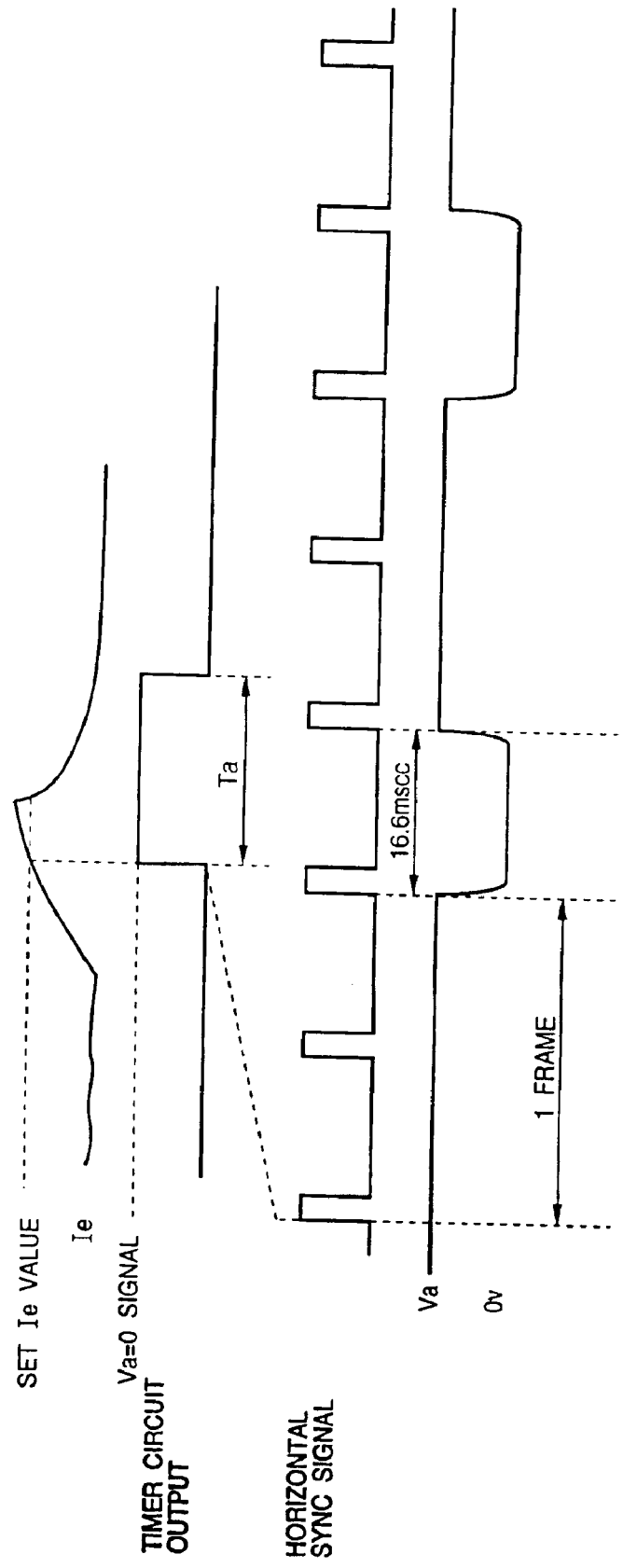
Figure 156:
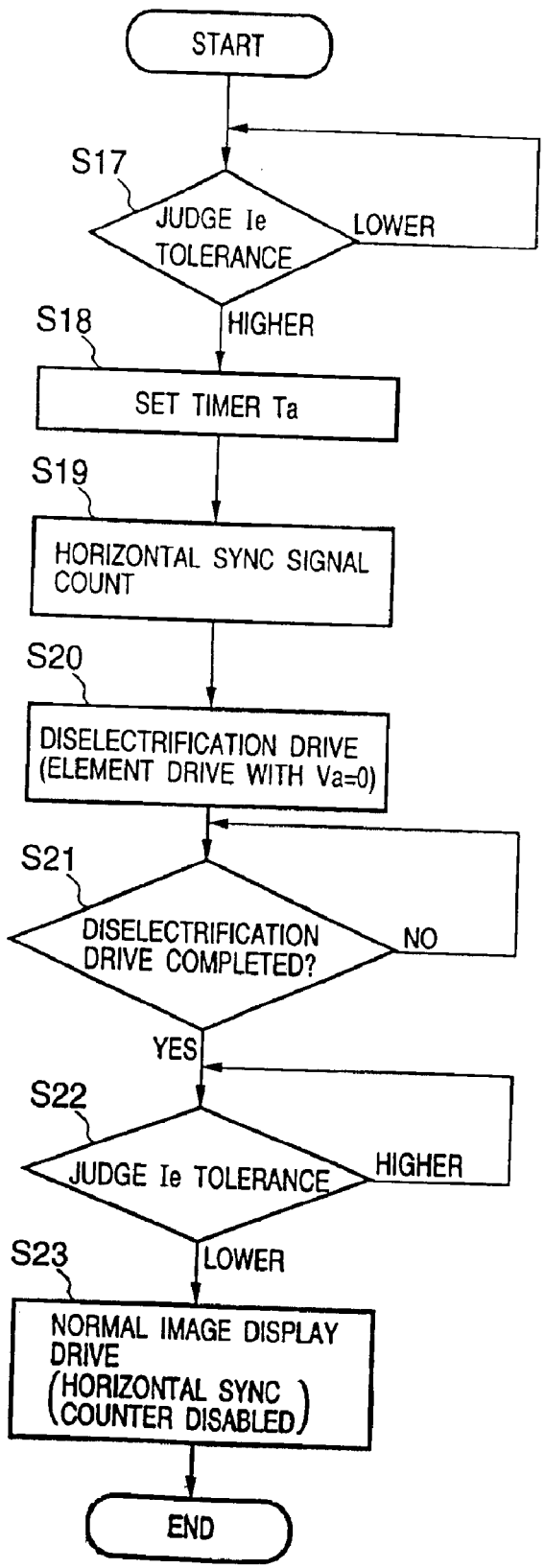
Figure 157:
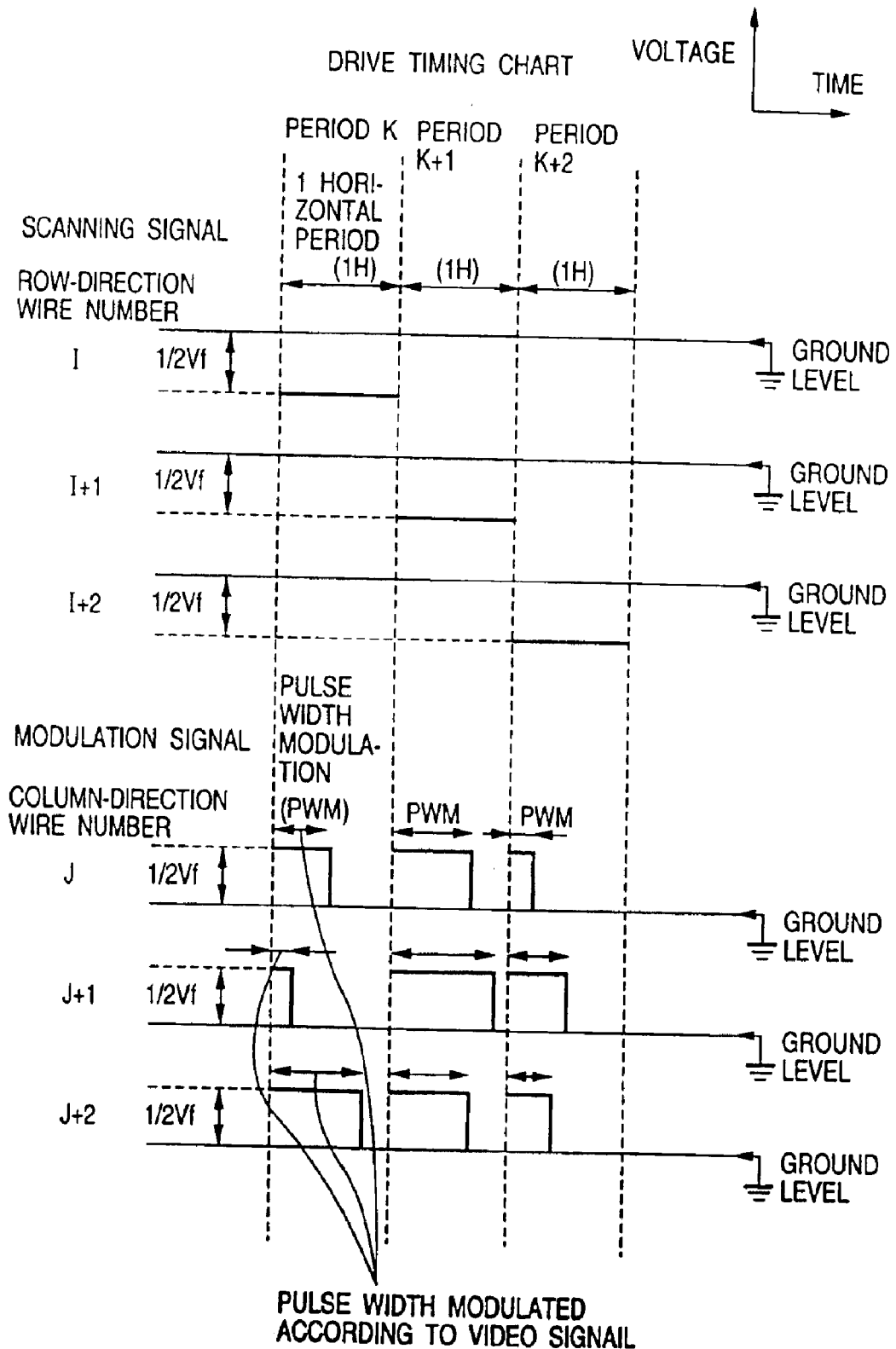
Figure 158:
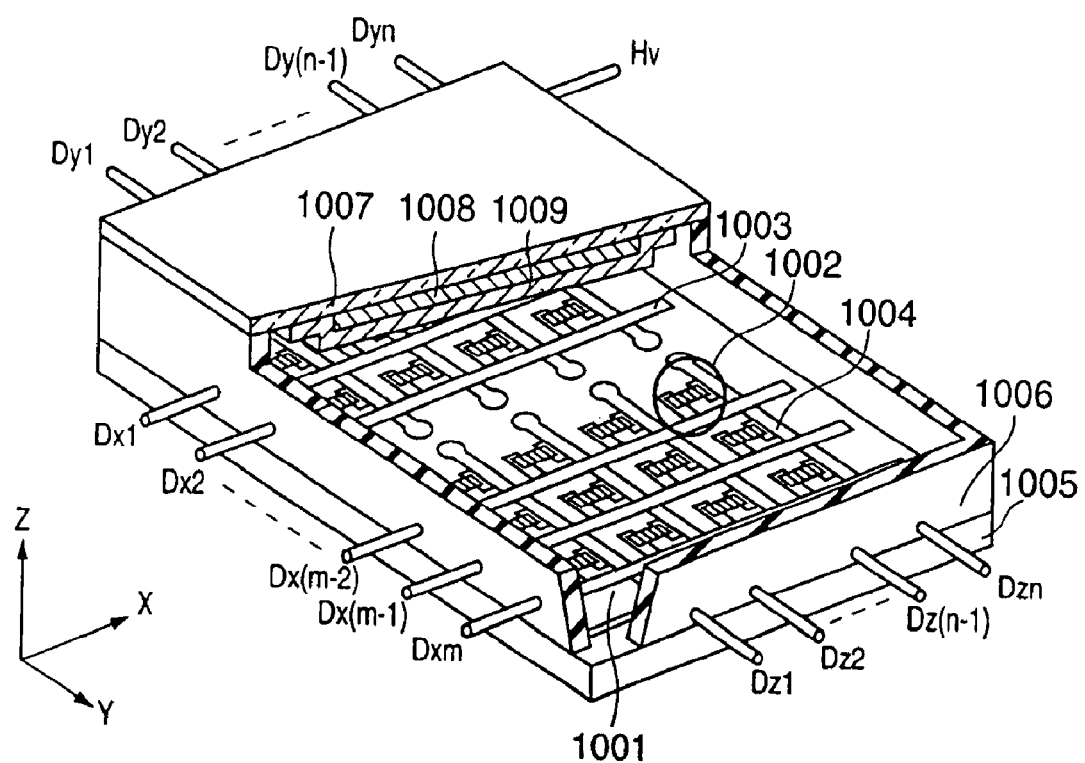
Figure 160:
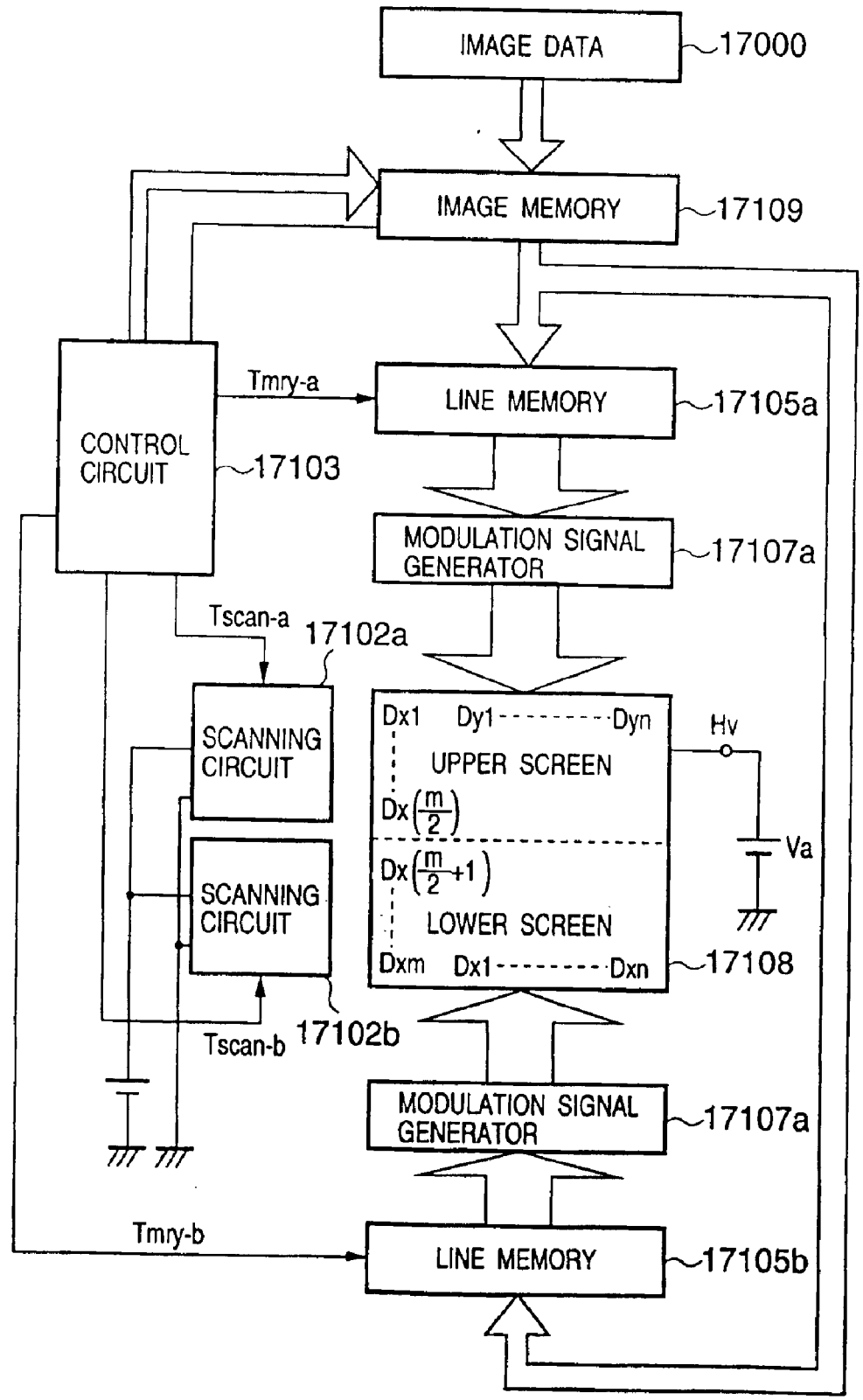
Figure 161A:
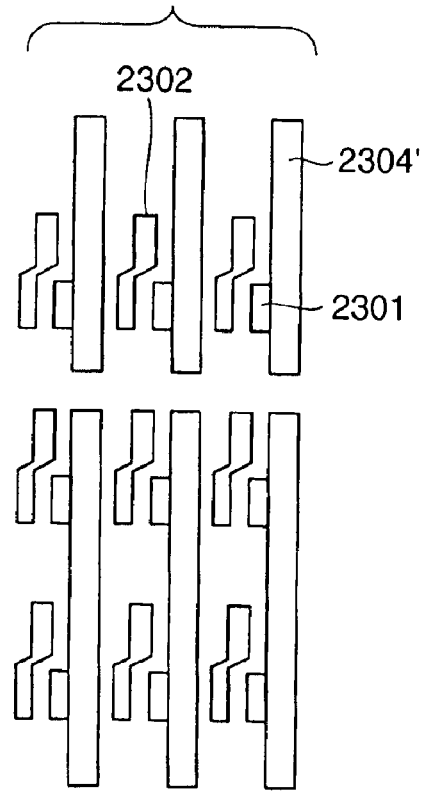
Figure 161B:
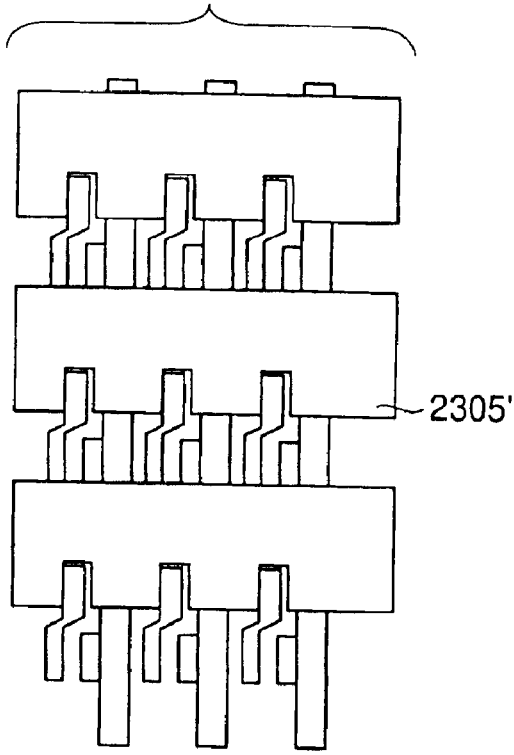
Figure 161C:
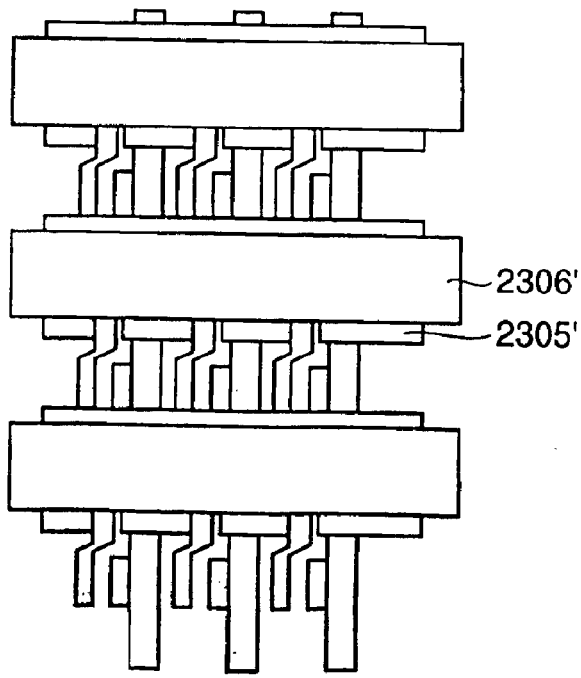
Figure 162B:
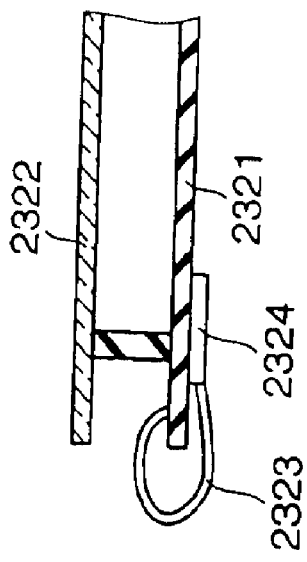
Figure 162A:
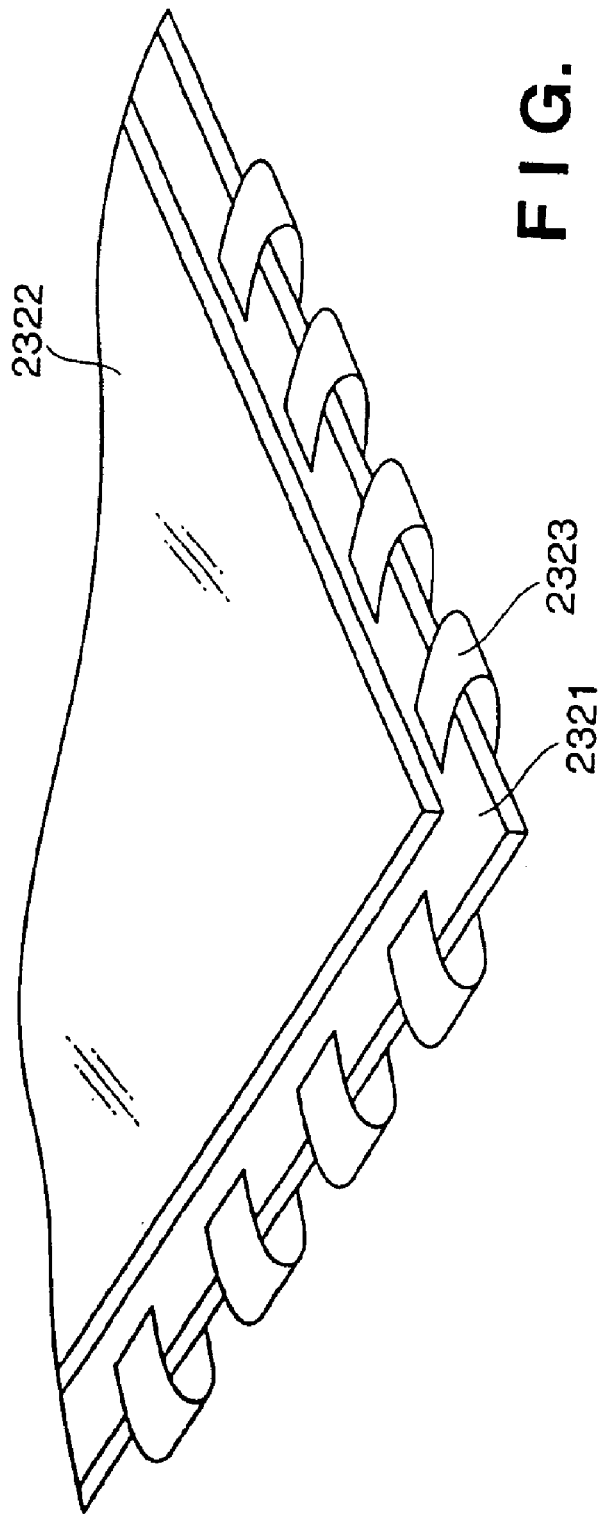
Figure 163:
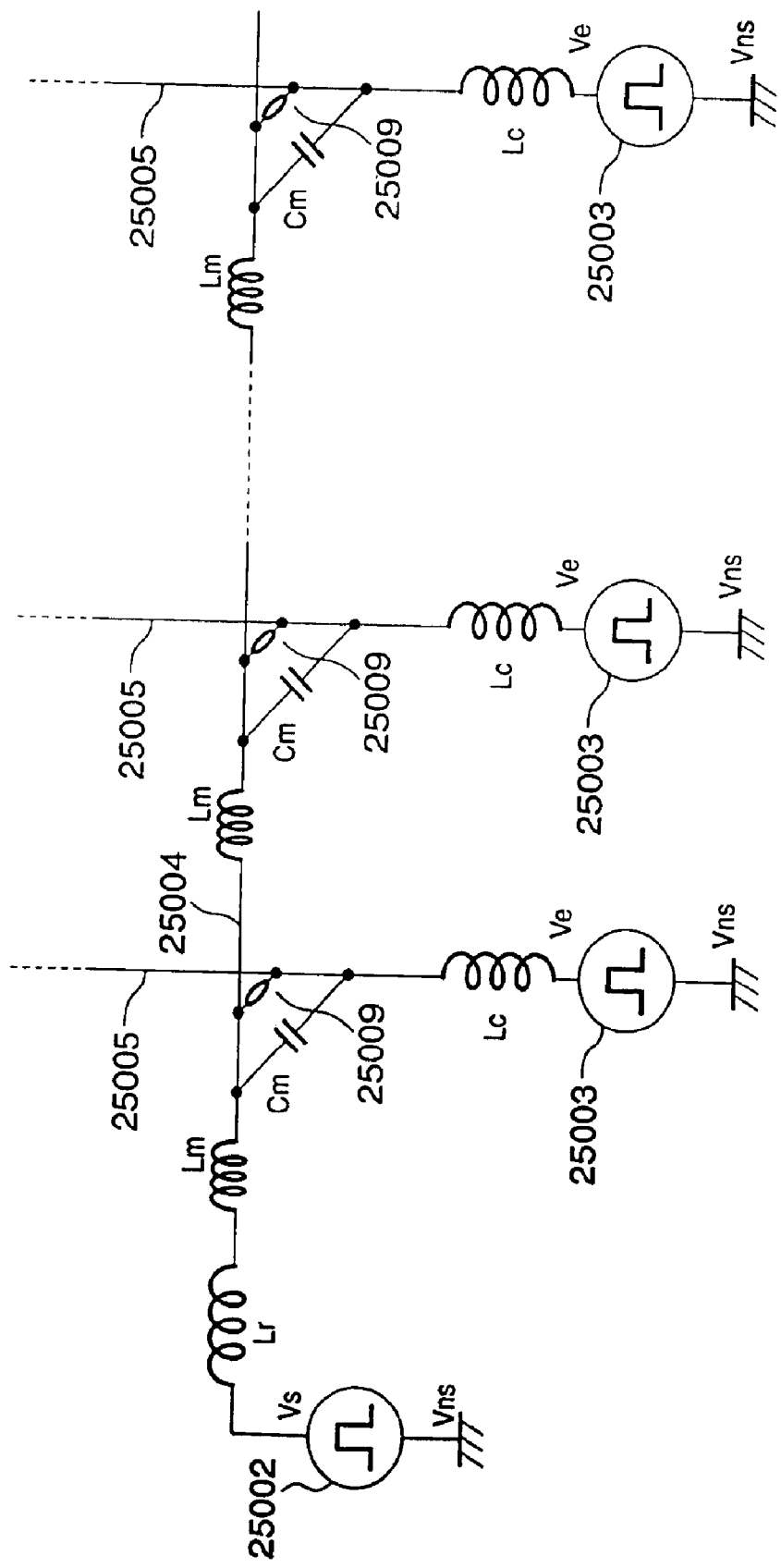
Figure 164:
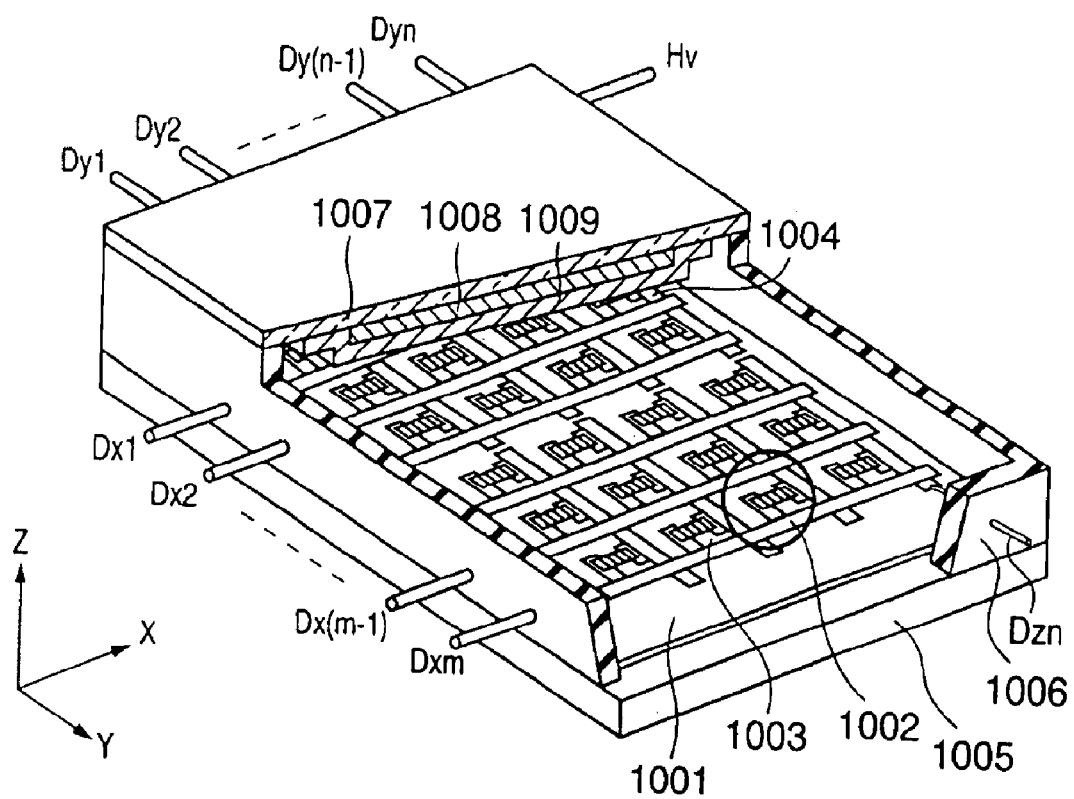
Figure 165:
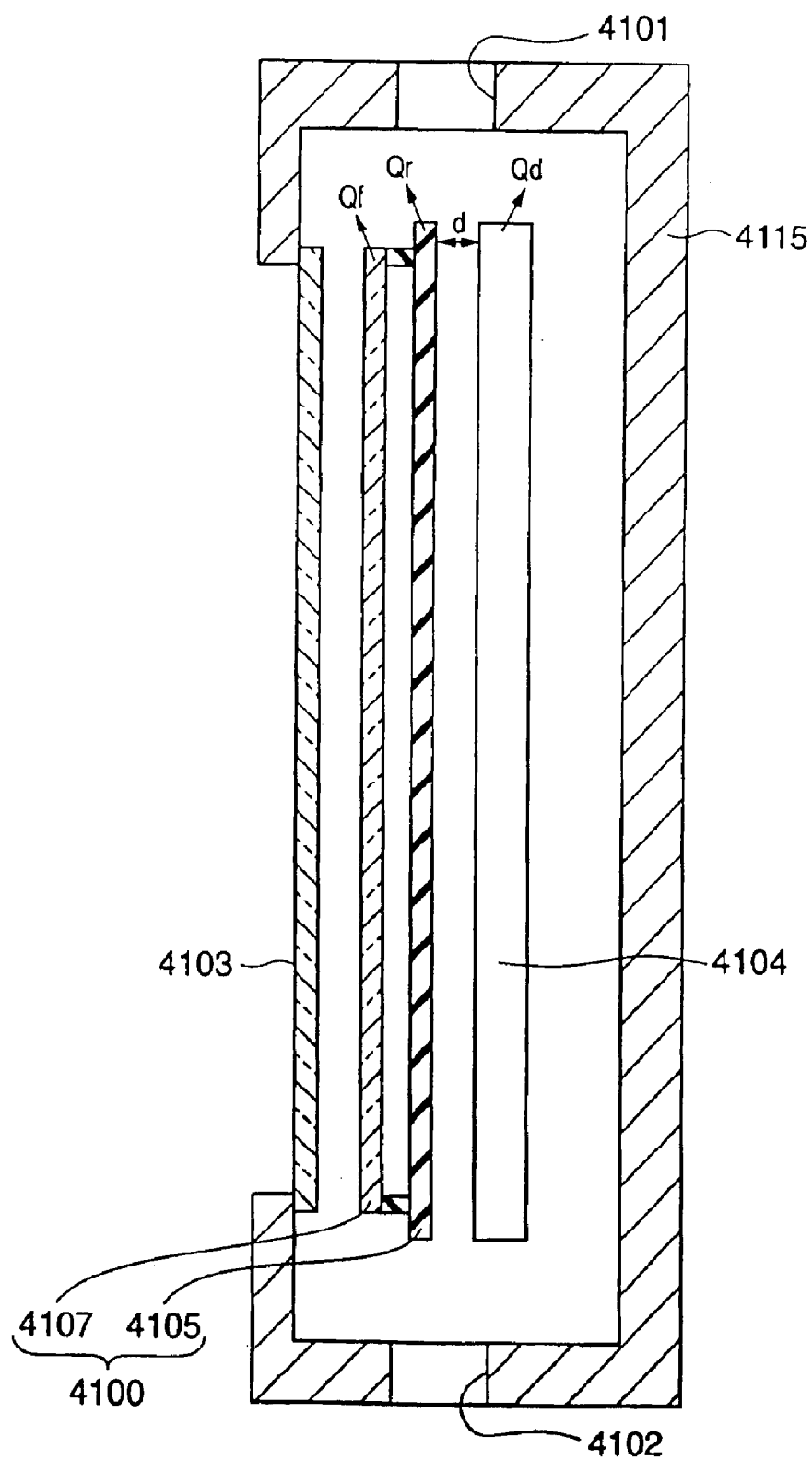
Figure 166:
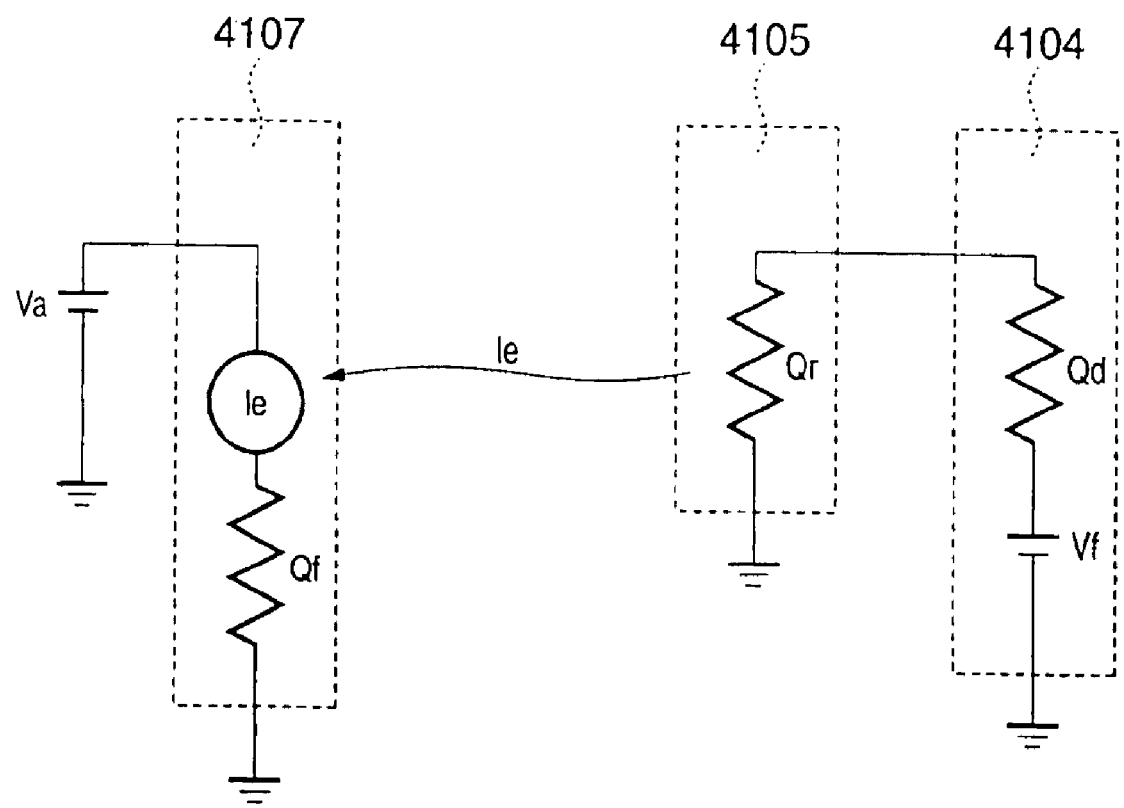
Figure 167:
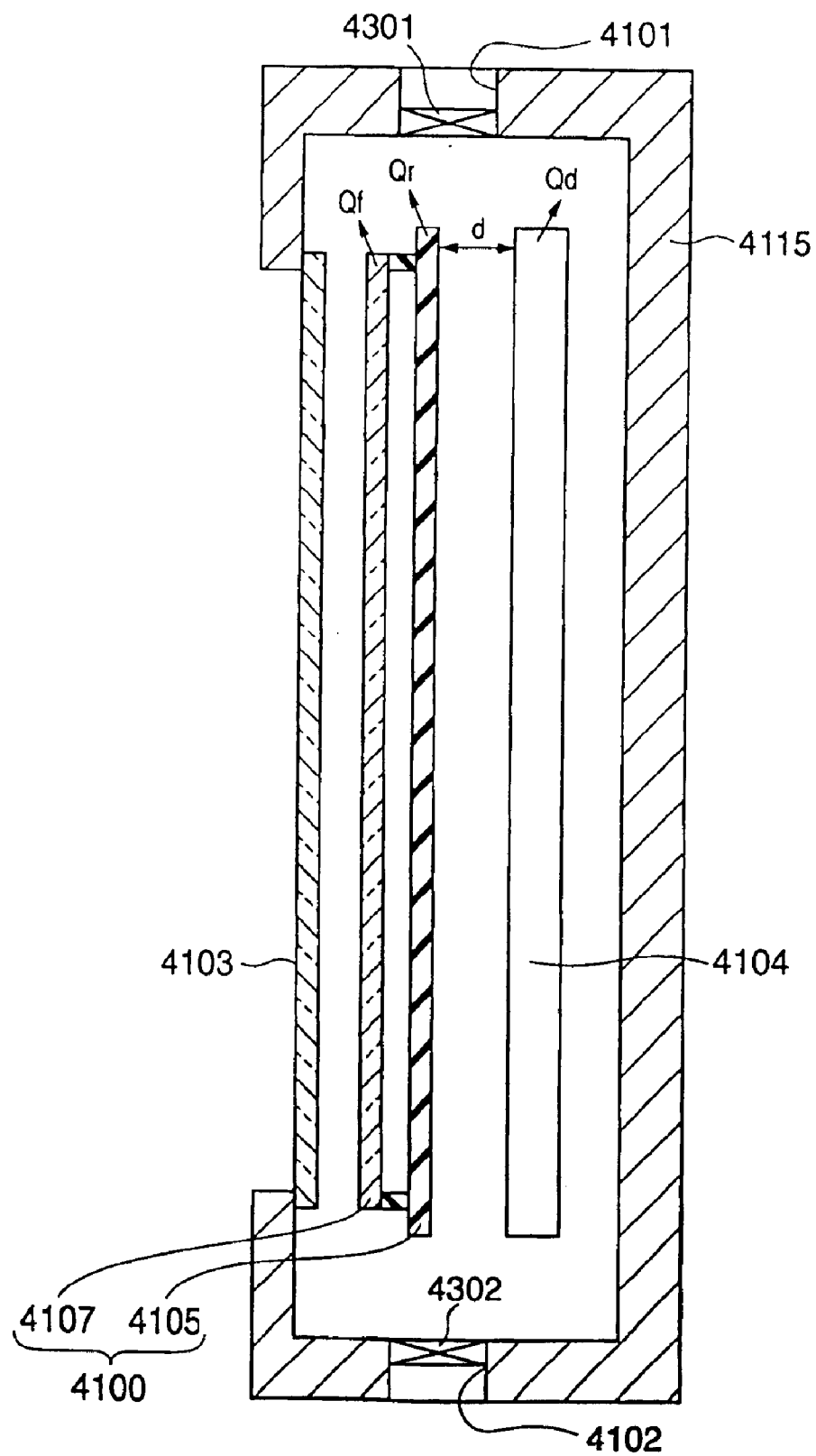
Figure 168:
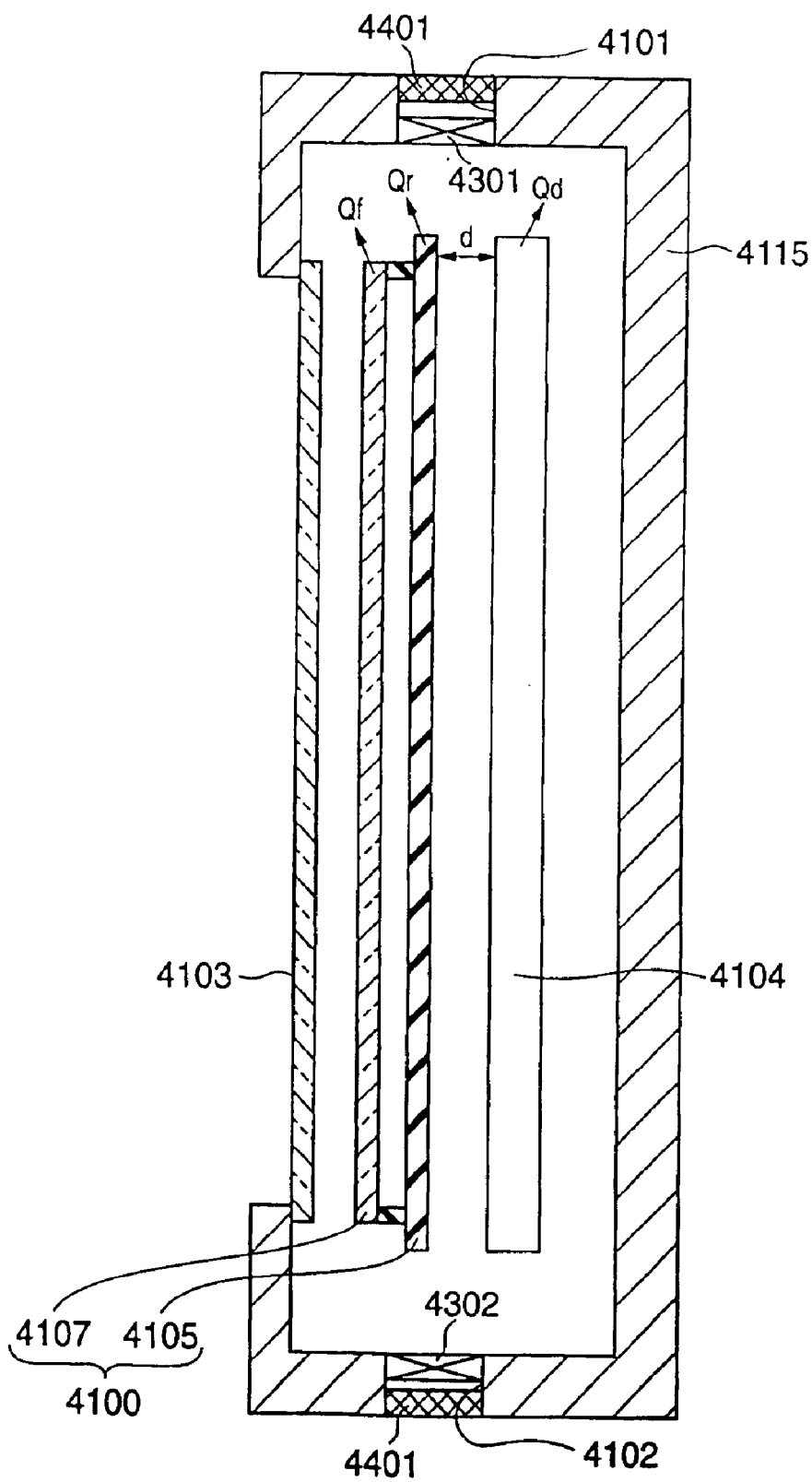
Figure 169:
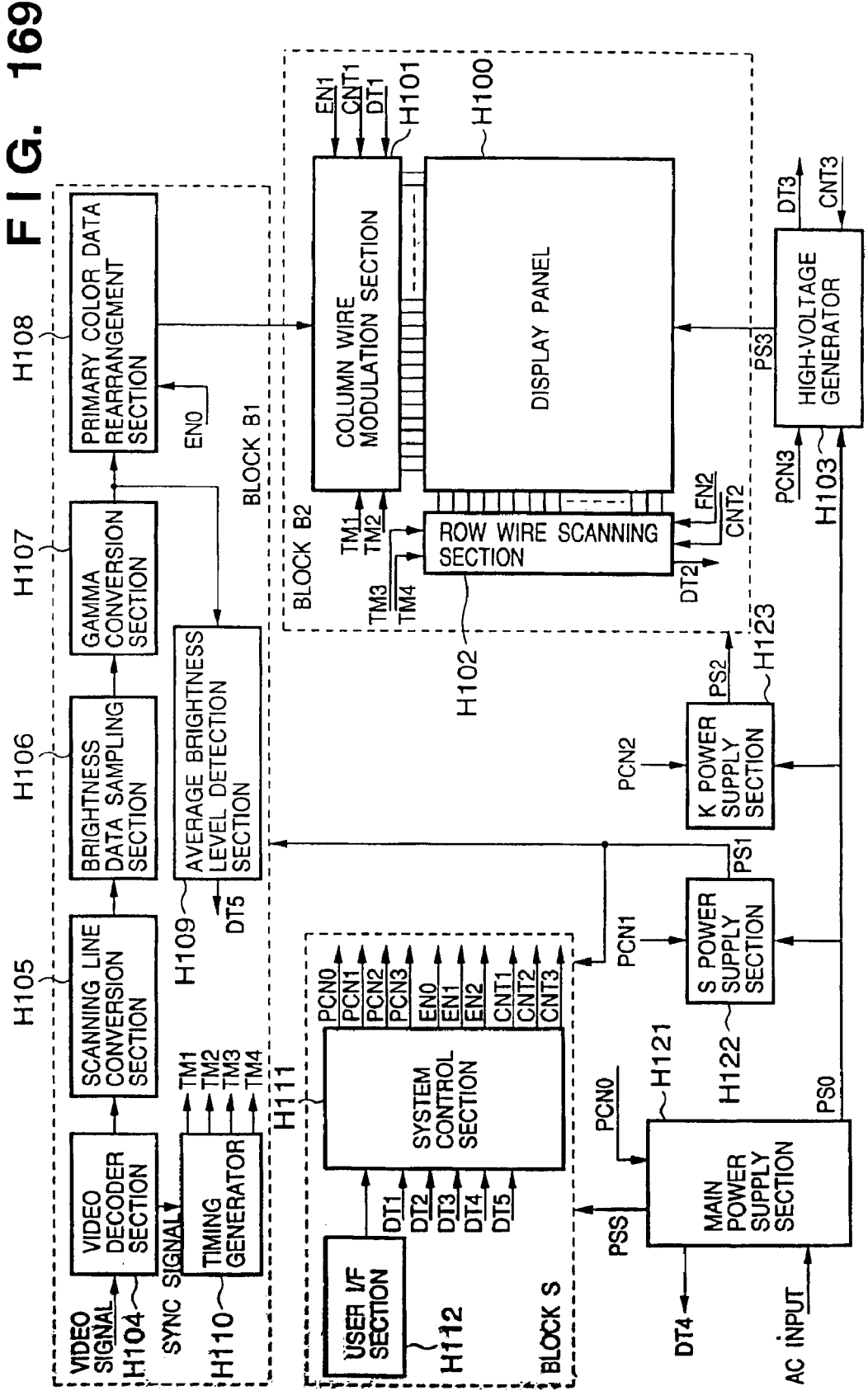
Figure 170:
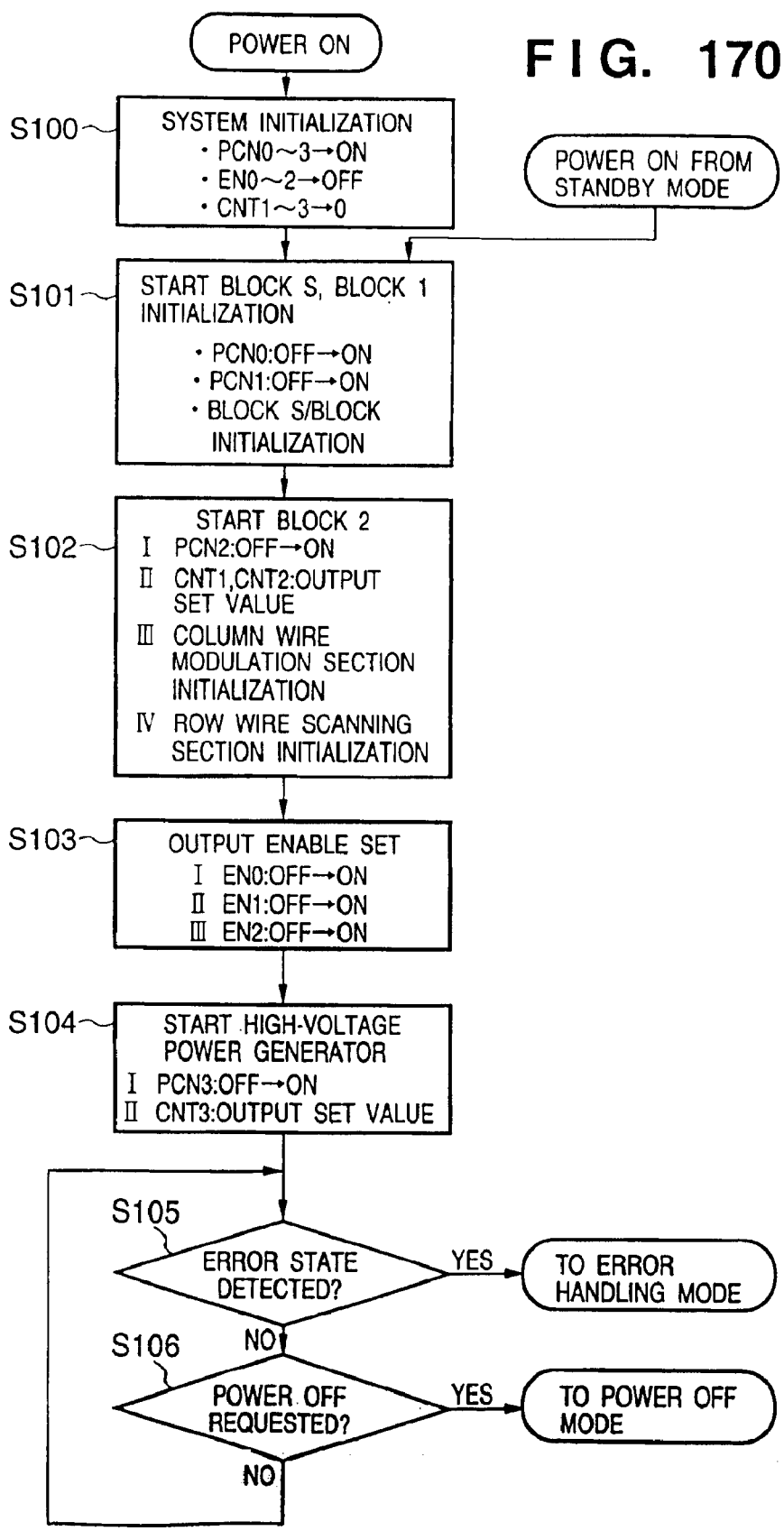
Figure 171:
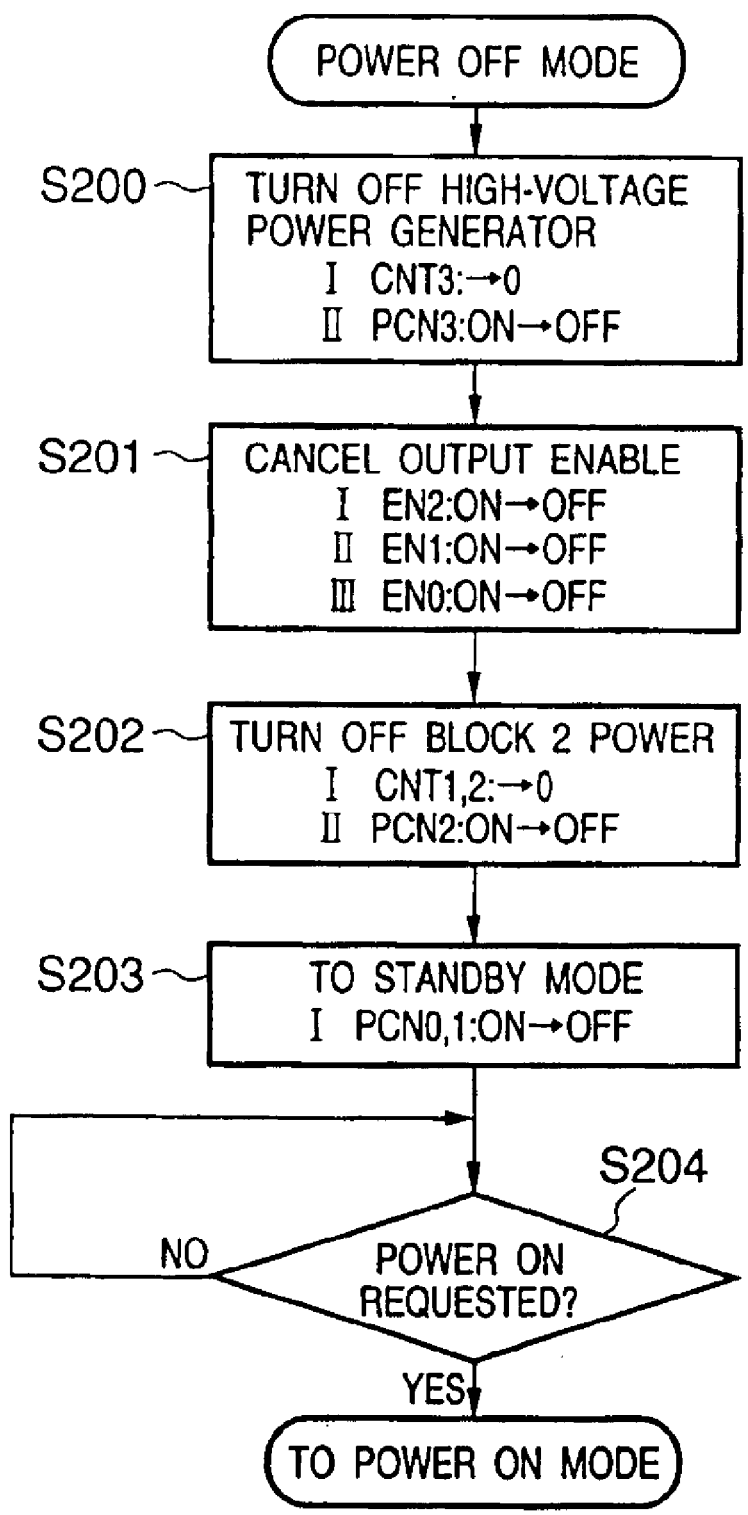
Figure 172:
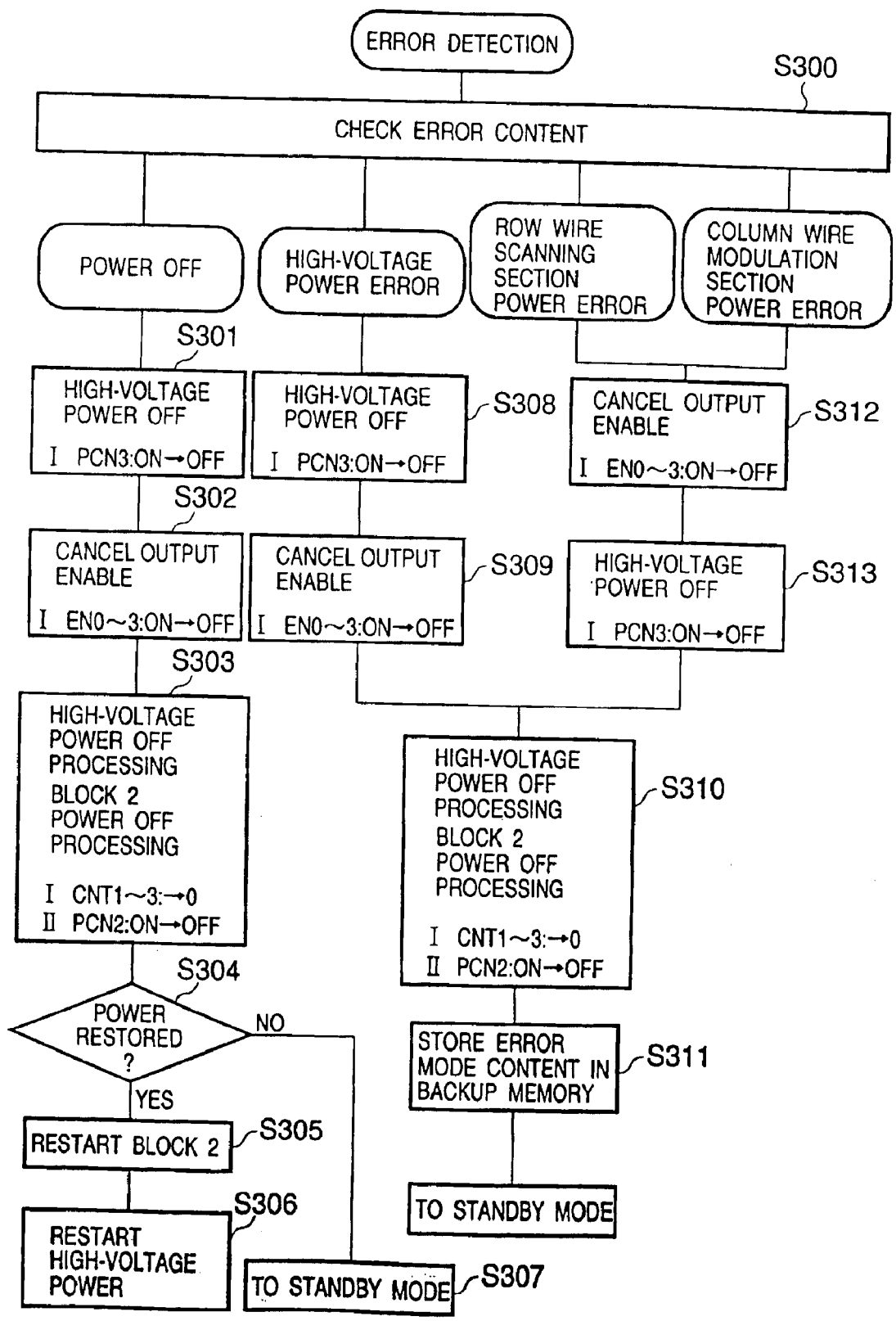
Figure 173:
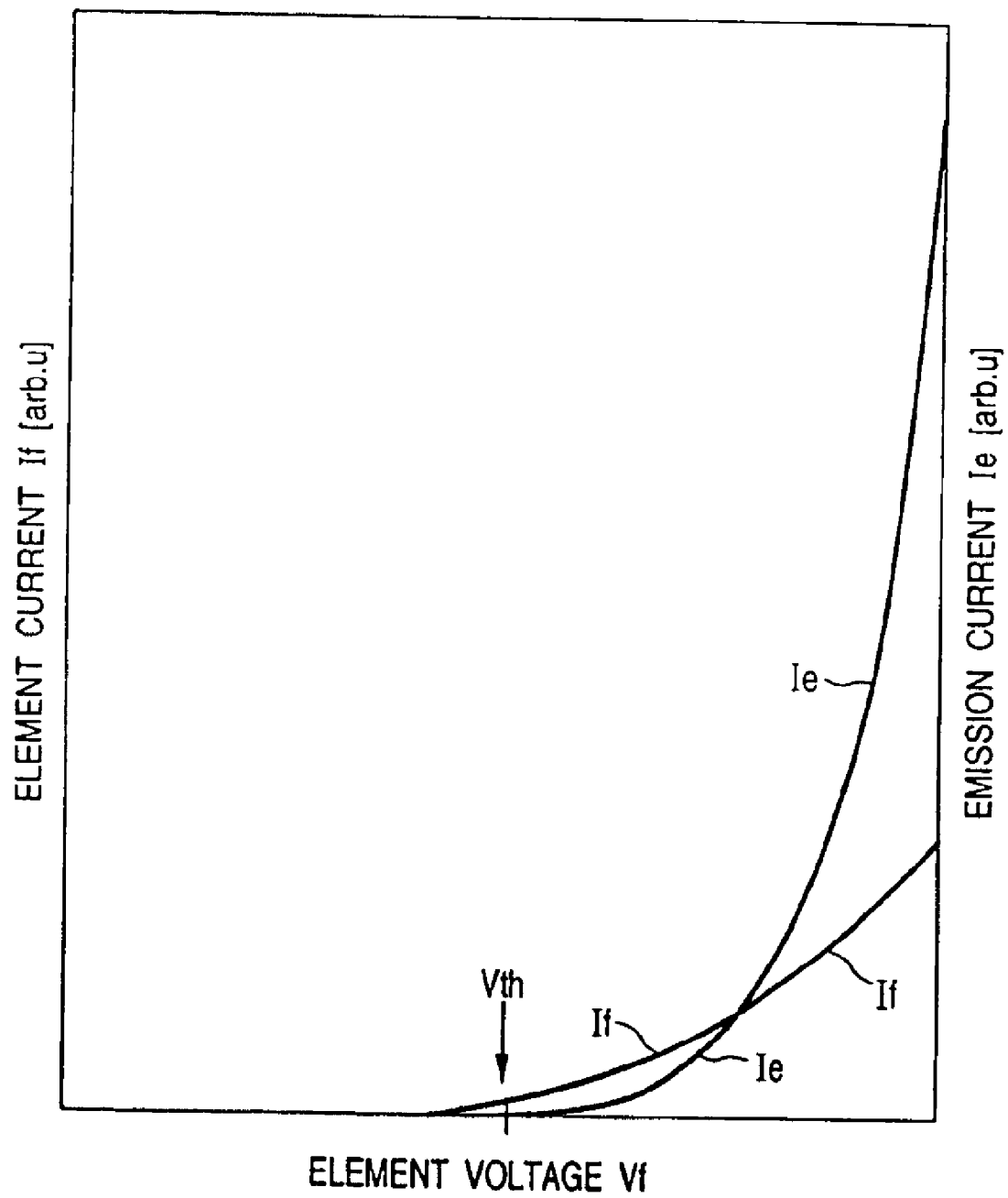
Figure 174:
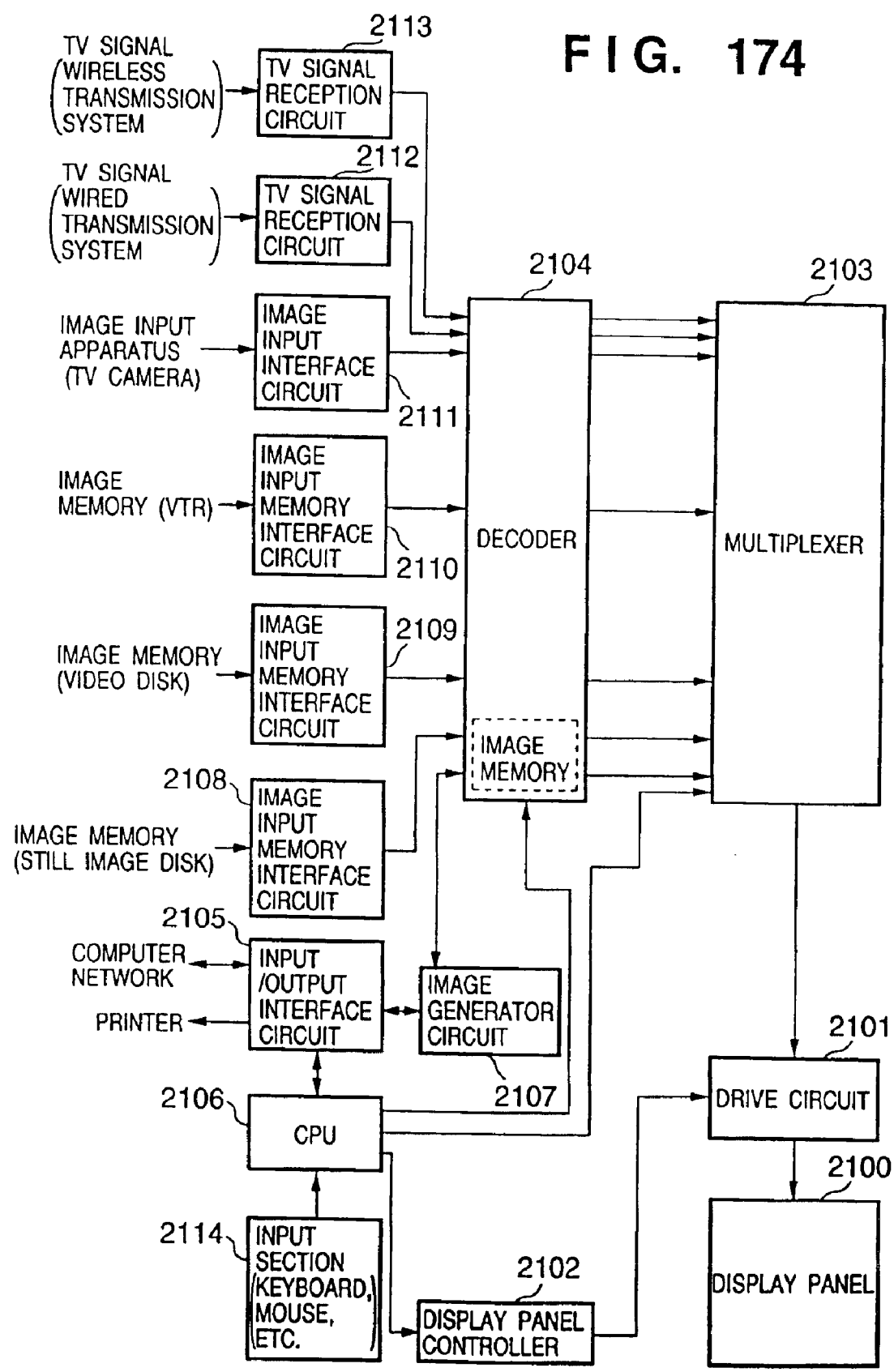
Figure 175:
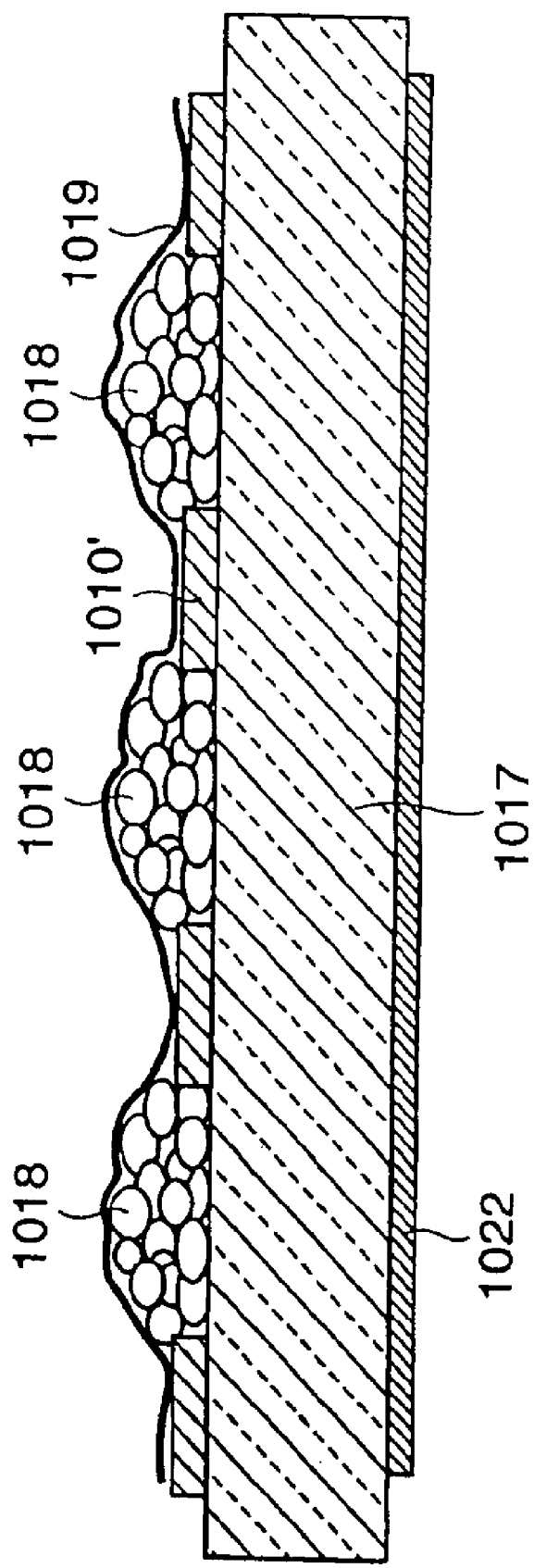
Figure 176A:
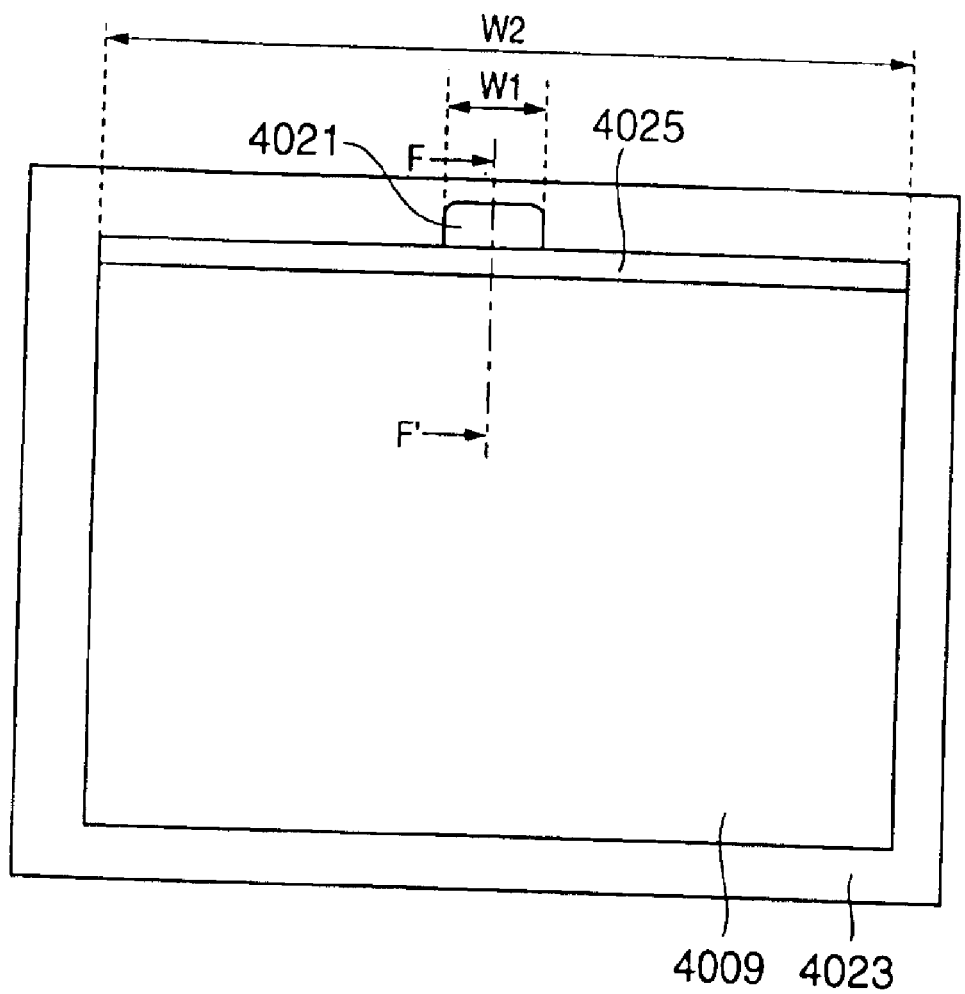
Figure 176B:
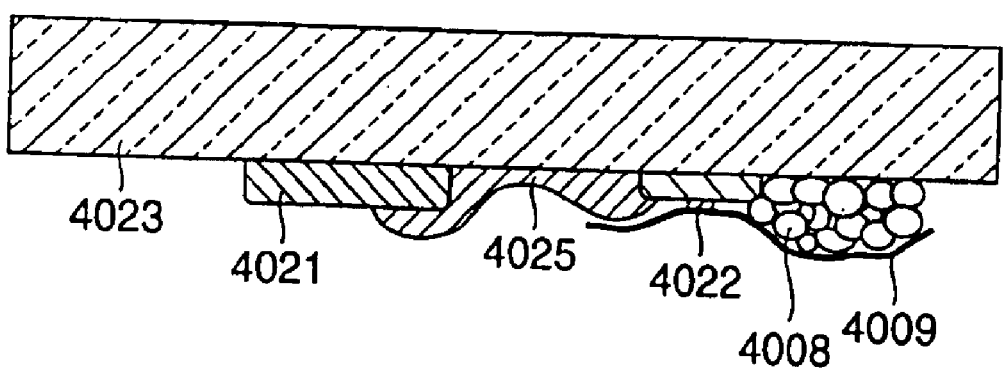
Figure 177:
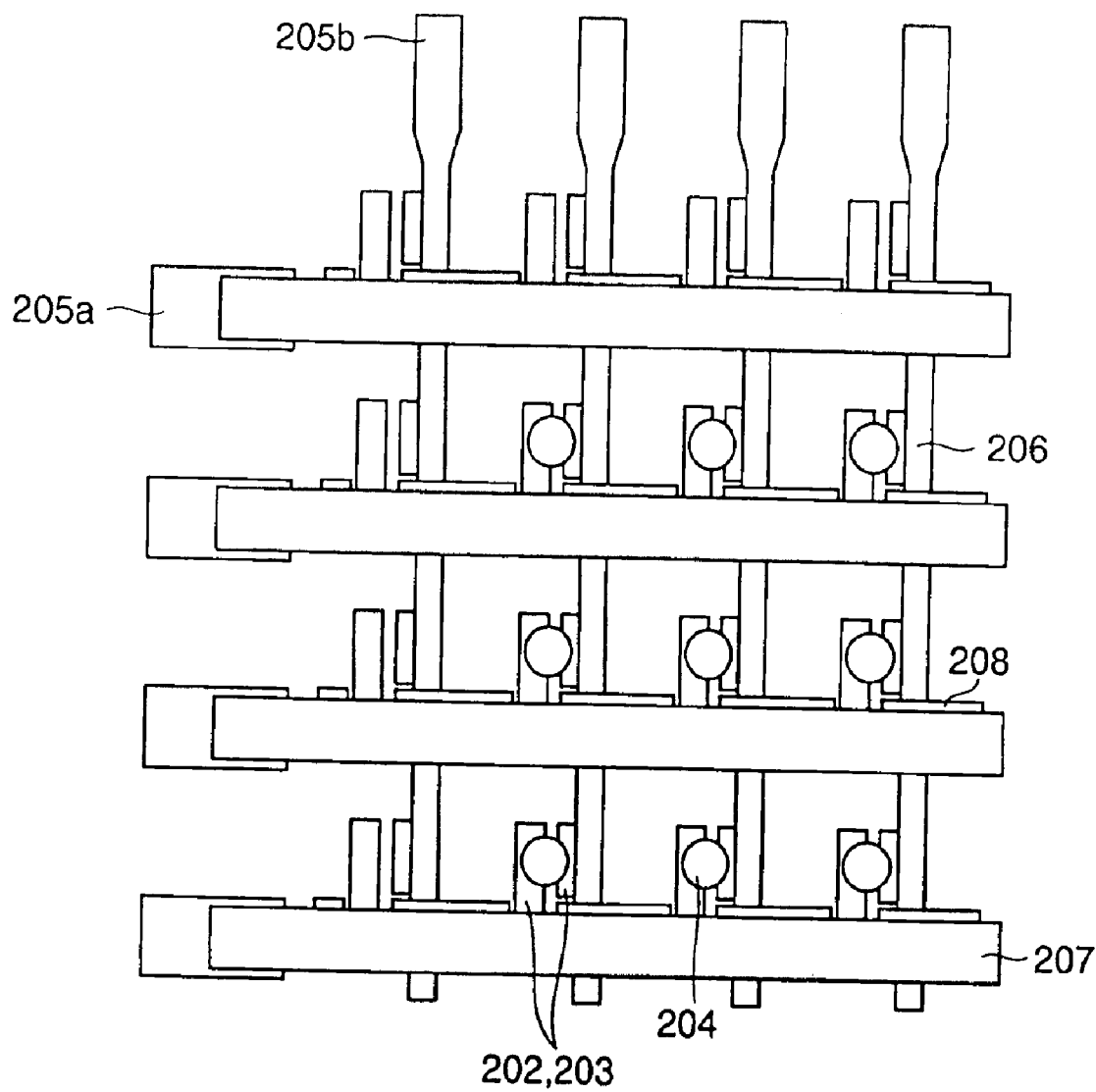
Figure 178:
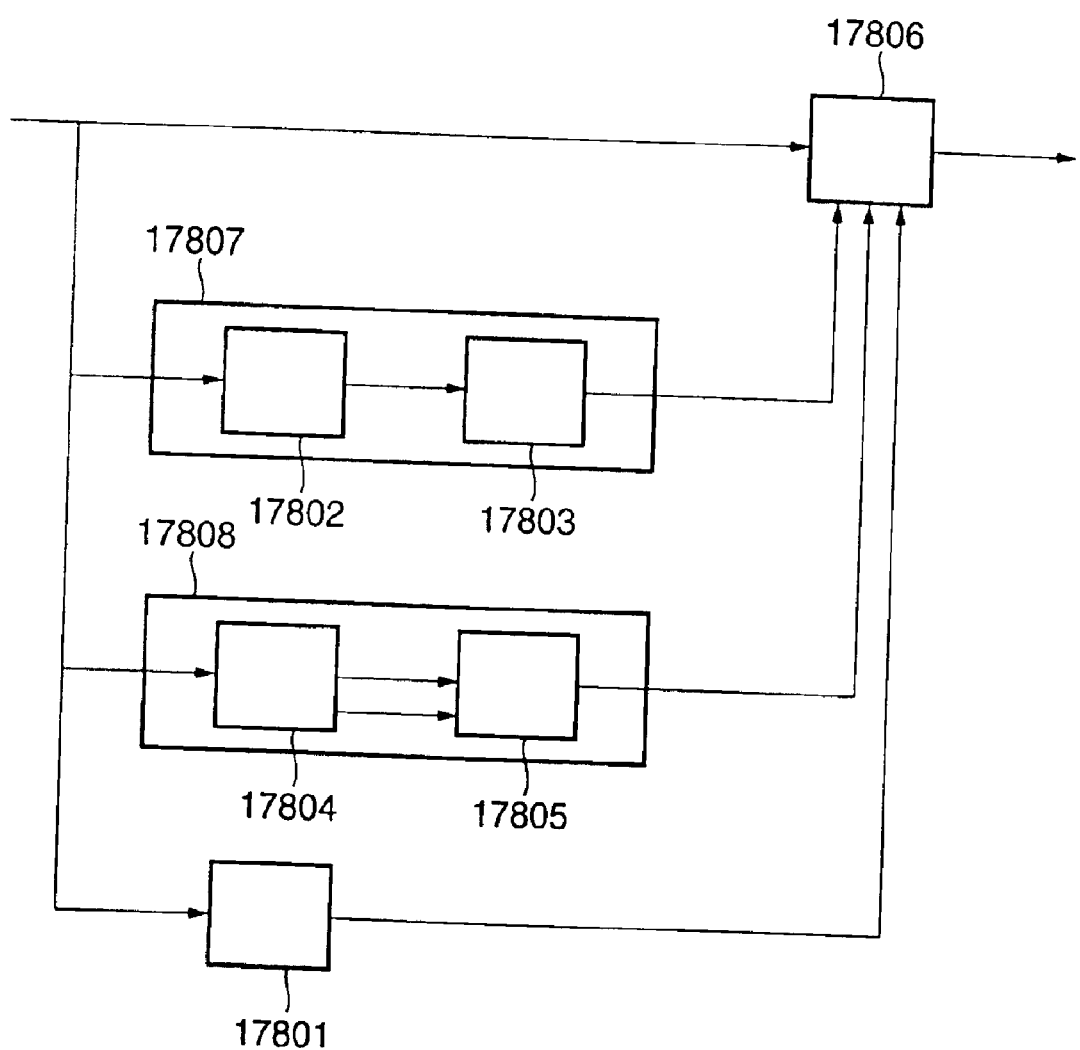

FIG. 109a is a partially cut out perspective view of the display panel section of the image formation apparatus, another example of the present invention;

FIG. 109b is a partial cross-sectional view of the display panel section shown in FIG. 109a;

FIG. 110a is a partially cut out perspective view of the display panel section of the image formation apparatus, another example of the present invention;

FIG. 110b is a partial cross-sectional view of the display panel section shown in FIG. 110a;

FIG. 111 is a partially cut out perspective view of the display panel section of the image formation apparatus, another example of the present invention;

FIGS. 112a–112b are enlarged plan views schematically showing another exemplar configuration of black matrix of the face plate used in the image formation apparatus of the present invention;

FIG. 113 is an enlarged plan view schematically showing an example of arrangement pattern of fluorescent materials of the face plate used in the image formation apparatus of the present invention;

FIG. 114 is a cross-sectional view showing a configuration of the face plate of the display panel section of the image formation apparatus, another example of the present invention;

FIG. 115 is a partial cross-sectional view of the display panel section of the image formation apparatus, another example of the present invention;

FIG. 116 is a developed perspective view of the display panel section of the image formation apparatus, another example of the present invention;

FIG. 117 is a partial cross-sectional view of the anode terminal section viewed from the direction shown by arrow A in FIG. 116;

FIGS. 118a–118e are process diagrams schematically showing a manufacturing procedure of the rear plate substrate;

FIG. 119 is a plan view showing a peripheral part of the anode terminal section of the rear plate;

FIG. 120 is a developed perspective view of the display panel section of the image formation apparatus, another example of the present invention;

FIGS. 121a–121c are schematic views showing an example of formation of leading wires of the face plate;

FIG. 122 is a block diagram showing a configuration of a high voltage power supply section that supplies a high voltage;

FIG. 123a is an external view of the display panel with the components shown in FIG. 121 and FIG. 122 assembled into the apparatus;

FIG. 123b is a cross-sectional view showing a configuration of the cabinet interior viewed from the direction shown by arrow A in FIG. 123a;

FIG. 123c is a configuration diagram of the cabinet of the display panel in FIG. 123a with the rear plate removed viewed from the direction shown by arrow B;

FIG. 124a is a plan view of the vacuum panel viewed from the face plate side;

FIG. 124b is a cross-sectional structural view of a peripheral section of a high-voltage terminal structural section viewed from the A–A' direction in FIG. 124a;

FIGS. 125a–125g are process diagrams showing a manufacturing procedure of a high-voltage power supply leading wire;

FIG. 126a is a plan view of an electrode section;

FIG. 126b is an F–F' cross-sectional view of FIG. 126a;

FIG. 127 is a schematic view showing trajectories of back-scattering electron beams;

FIG. 128 is a developed perspective view of the display panel section of the image formation apparatus, another example of the present invention;

FIG. 129 is a cross-sectional view of the image formation apparatus shown in FIG. 128 viewed from the Y-direction;

FIGS. 130a–130b are enlarged plan views schematically showing another exemplar configuration of black matrix of the face plate used in the image formation apparatus of the present invention;

FIG. 131 is an enlarged cross-sectional view of the main section of the face plate used in the image formation apparatus of the present invention;

FIG. 132 is a front view of the image display apparatus, another example of the present invention;

FIG. 133 is a front view of the image display apparatus, another example of the present invention;

FIG. 134a is a schematic view showing one side of the rear plate matched with one side of the face plate;

FIG. 134b is a schematic view showing two sides of the rear plate matched with two sides of the face plate;

FIG. 135 is a front view of the image display apparatus, another example of the present invention;

FIG. 136 is a front view of the image display apparatus, another example of the present invention;

FIG. 137 is an enlarged perspective view schematically showing the main section of the display panel section of the image display apparatus, another example of the present invention;

FIG. 138 is a cross-sectional view of the part that connects a drive IC to the wiring terminal section;

FIG. 139 is a schematic view showing a layout of the extraction electrode section;

FIG. 140 is a cross-sectional view showing an example of the electrode structure of the electron beam sources used in the image display apparatus of the present invention;

FIGS. 141a–141b are partially enlarged views showing an exemplar configuration of the wiring terminal section on the column side of part A shown in FIG. 139;

FIG. 142 is a schematic view showing a substrate layout of the electric circuit substrate of the drive electrical circuit section used in the image display apparatus of the present invention;

FIG. 143 is a functional block diagram of the drive electrical circuit section used in the image display apparatus of the present invention;

FIG. 144 is a timing chart to explain the operation of the drive electrical circuit section shown in FIG. 143;

FIG. 145 is a schematic view showing a layout of a connector on the rear plate side of the display panel used in the image display apparatus of the present invention;

FIG. 146 is a schematic view showing a layout example when the control section, drive section and power supply section, etc. are mounted on the display panel shown in FIG. 145;

FIG. 147 is a schematic view showing another layout example when the control section, drive section and power supply section, etc. are mounted on the display panel shown in FIG. 145;

FIG. 148 is a schematic view showing another layout example when the control section, drive section and power supply section, etc. are mounted on the display panel shown in FIG. 145;

FIG. 149 is a block diagram showing an outlined configuration of the part that performs processing to display images;

FIG. 150 is a perspective view showing a mounting structure of an acceleration voltage terminal and a positional relationship between a row wire, column wire and acceleration electrode;

FIG. 151 is a front view of the rear plate of the display panel;

FIG. 152 is a block diagram showing a configuration of another image display apparatus of the present invention;

FIG. 153 is a timing chart to explain a diselectrification drive operation applied to the image display apparatus of the present invention;

FIG. 154 is a flow chart when diselectrification drive is performed by sequence processing;

FIG. 155 is a timing chart when diselectrification drive is performed while an image is being displayed;

FIG. 156 is flow chart when diselectrification drive is performed by sequence processing while an image is being displayed;

FIG. 157 is a timing chart showing drive timing of the image display section of the image display apparatus of this embodiment;

FIG. 158 is a perspective view of the display panel;

FIGS. 159a–159e are process diagrams showing a procedure for manufacturing multi-electron beam sources;

FIG. 160 is a block diagram showing an exemplar configuration of the drive circuit that drives the display panel;

FIGS. 161a–161c are process diagrams showing a procedure for manufacturing multi-electron beam sources;

FIG. 162a is a partially enlarged view of the image display panel used in the image display apparatus of this embodiment;

FIG. 162b is a partial cross-sectional view of the display panel shown in FIG. 162a;

FIG. 163 illustrates an equivalent circuit of the multi-electron beam sources of the display panel;

FIG. 164 is a partial cut out perspective view of the display panel section of the display panel section of the image formation apparatus, another example of the present invention;

FIG. 165 is a cross-sectional view of the display panel section of the image formation apparatus, another example of the present invention;

FIG. 166 is a schematic view to explain temperature control of the face plate and rear plate;

FIG. 167 is a cross-sectional view of the display panel section of the image formation apparatus, another example of the present invention;

FIG. 168 is a cross-sectional view of the display panel section of the image formation apparatus, another example of the present invention;

FIG. 169 is a block diagram of the panel drive circuit;

FIG. 170 is a flow chart showing a processing procedure for powering-on;

FIG. 171 is a flow chart showing a processing procedure for powering-off;

FIG. 172 is a flow chart showing a processing procedure in the event of an abnormality;

FIG. 173 is a characteristic diagram showing a drive voltage vs. electron emission quantity characteristic of an electron emission device;

FIG. 174 is a block diagram showing an exemplar multi-function display apparatus to which the configuration of the image formation apparatus of the present invention is applied;

FIG. 175 is a cross-sectional view showing a cross-sectional shape of the face plate;

FIG. 176a is a plan view of the electrode section of the display panel used in the image formation apparatus of the present invention;

FIG. 176b is an F–F' cross-sectional view of FIG. 176a;

FIG. 177 is an enlarged view of the electron beam source substrate before electrification forming step; and FIG. 178 is a block diagram showing an example of an interlace-progressive conversion (IP conversion) circuit used in the image formation apparatus of the present invention.

DETAILED DESCRIPTION OF THE PREFERRED EMBODIMENTS

Figure 1:
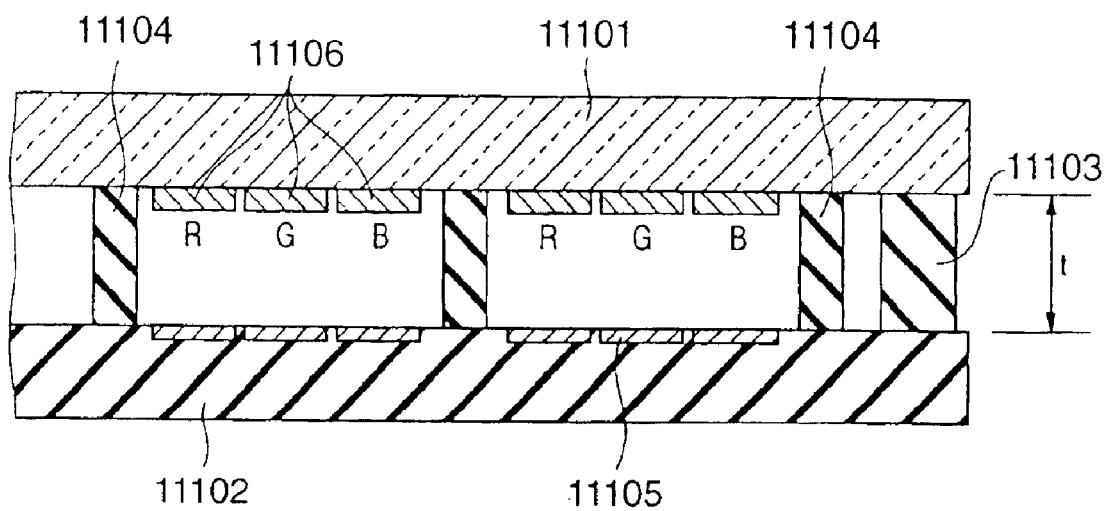
FIG. 1 is a cross-sectional view showing a configuration of a conventional image display apparatus equipped with an electron emission cathode.
Figure 2:
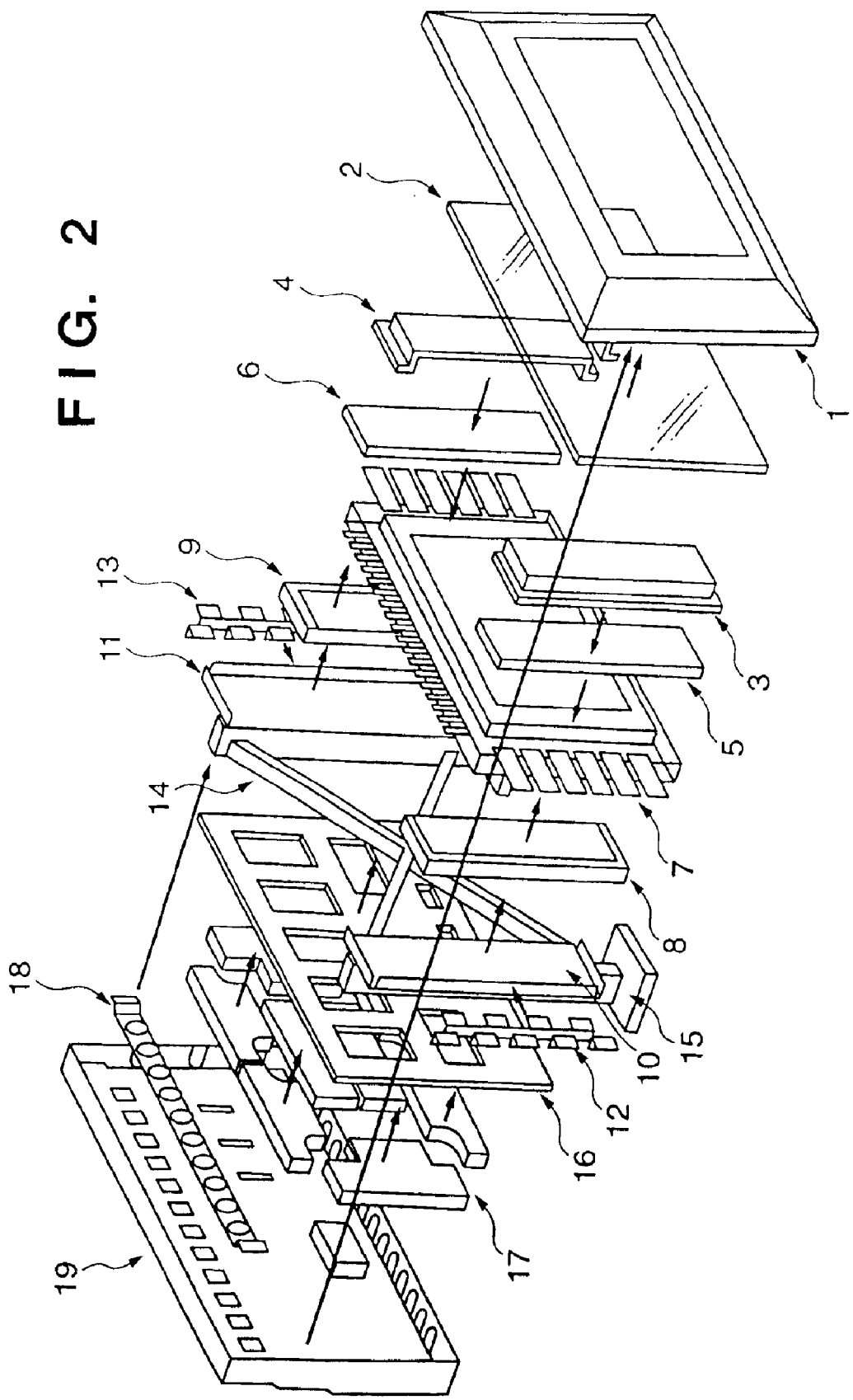
FIG. 2 is a developed assembly view of an image formation apparatus, an example of the present invention.

An example of the image formation apparatus of the present invention is shown in FIG. 2. FIG. 2 is a developed assembly diagram of the image formation apparatus and shows typical components. Reference numeral 1 denotes a front cover made of metal or resin, etc. to protect the interior of the product from dust, etc.; 2, a light-transmittable front protector made of resin or glass with low-reflection treatment, which is fixed to the inside of the front cover 1 by a fixing means during assembly to protect the interior of the product from dust, etc. Reference numeral 3 denotes a top left plate; and 4, a top right plate, both of which are configured by metal plates, etc. having rigidity to sandwich and support an image display panel 7, which will be described later. Reference numeral 5 denotes a front left heat insulator; and 6, a front right heat insulator, both of which are made of foaming resin or rubber to provide heat insulative and cushioning effect for the part to sandwich and support the image display panel 7, which will be described later. Reference numeral 7 is the image display panel, a self light-emitting type image display apparatus called "SED", which is a vacuum container made up of two glass sheets and a frame whose peripheral section is provided with a plurality of flexible cables. Reference numeral 8 denotes a back left heat insulator; and 9, a back right heat insulator, which sandwich and support the image display panel 7 from the backside. These heat insulators can be made of the same material as that for the aforementioned front right and left heat insulators 5 and 6.

Reference numeral 10 denotes a bottom left plate; and 11, a bottom right plate, which sandwich and support the image display panel 7 from the backside. These bottom left plate 10 and bottom right plate 11 are made of the same material as that for the top left plate 3 and top right plate 4, and the bottom left plate 10 and the top left plate 3, and the bottom right plate 11 and the top right plate 4 are fixed to each other by fixing means such as screws.

The top left plate 3, bottom left plate 10, top right plate 4, bottom right plate 11 and heat insulators 5, 6, 8 and 9 make up a support section.

Though details will be given later, the display panel is made up of a face plate (image formation substrate or fluorescent material substrate) having a light-emitting material such as fluorescent material and a rear plate (electron beam source substrate) having an electron beam source configured by a plurality of electron emission devices, both of which are placed face to face. Since the rear plate requires an extraction section such as wires, etc. to drive the electron beam source, the rear plate is bigger than the face plate. For this reason, it is desirable that the support section only support the rear plate. For simplicity of attachment/detachment of the support section, it is further desirable that the support section support the area where the rear plate and the face plate do not overlap.

As described above, the rear plate is provided with the drive wire extraction section. Furthermore, the extraction section is provided with a flexible cable to connect a drive circuit. For this reason, it is desirable that the above-described support section support not only the rear plate but also the flexible cable.

Reference numeral 12 denotes a left stopper of the flexible cable and reference numeral 13 is a right stopper, both of which not only sandwich and support the image display panel 7 but also connect and fix the top left plate 3 and the bottom left plate 10, and the top right plate 4 and the bottom right plate 11. These stoppers 12 and 13 are made of a material with rigidity such as metal and are provided with cable guides in a staggered arrangement to pass the flexible cable of the image display panel 7. Reference numeral 14 is an X-figured frame (X frame) and made of metal having predetermined rigidity such as aluminum. This X frame is provided with a screw fixing section for the aforementioned front cover 1, fixing sections for the bottom left plate 10 and bottom right plate 11, fixing sections for a stand unit 15 and board mounting plate 16, which will be described later.

Reference numeral 15 denotes a stand unit whose interior is made of metal with rigidity and weight and whose exterior is made of resin with good appearance or a metallic thin plate and is screwed to the X frame 14 for the purpose of supporting the entire image formation apparatus. Reference numeral 16 denotes a board mounting plate and is a resin or metal thin plate provided with a plurality of printed circuit board fixing sections and fixed to the aforementioned X frame 14 by fixing means such as screws. Reference numeral 17 denotes an electric mounting board equipped with an electric circuit, etc. to display images on the image display panel 7 and is made up of a power supply section, a signal input section, a signal control section, a panel drive section, etc. each of which is made up of a printed circuit board with electronic devices mounted thereupon and connected to each other via electric cables, etc. Reference numeral 18 denotes a fan unit to dissipate heat generated from the aforementioned image display panel 7 and electric mounting board 17 out of the cabinet, is made of a fan and a fixing material, and fixed to the aforementioned X frame 14 by fixing means such as screws. Reference numeral 19 denotes a back cover and is made of a metal or resin thin plate having heat radiation openings and protects the interior of the product from foreign matters such as dust.

Figure 3:
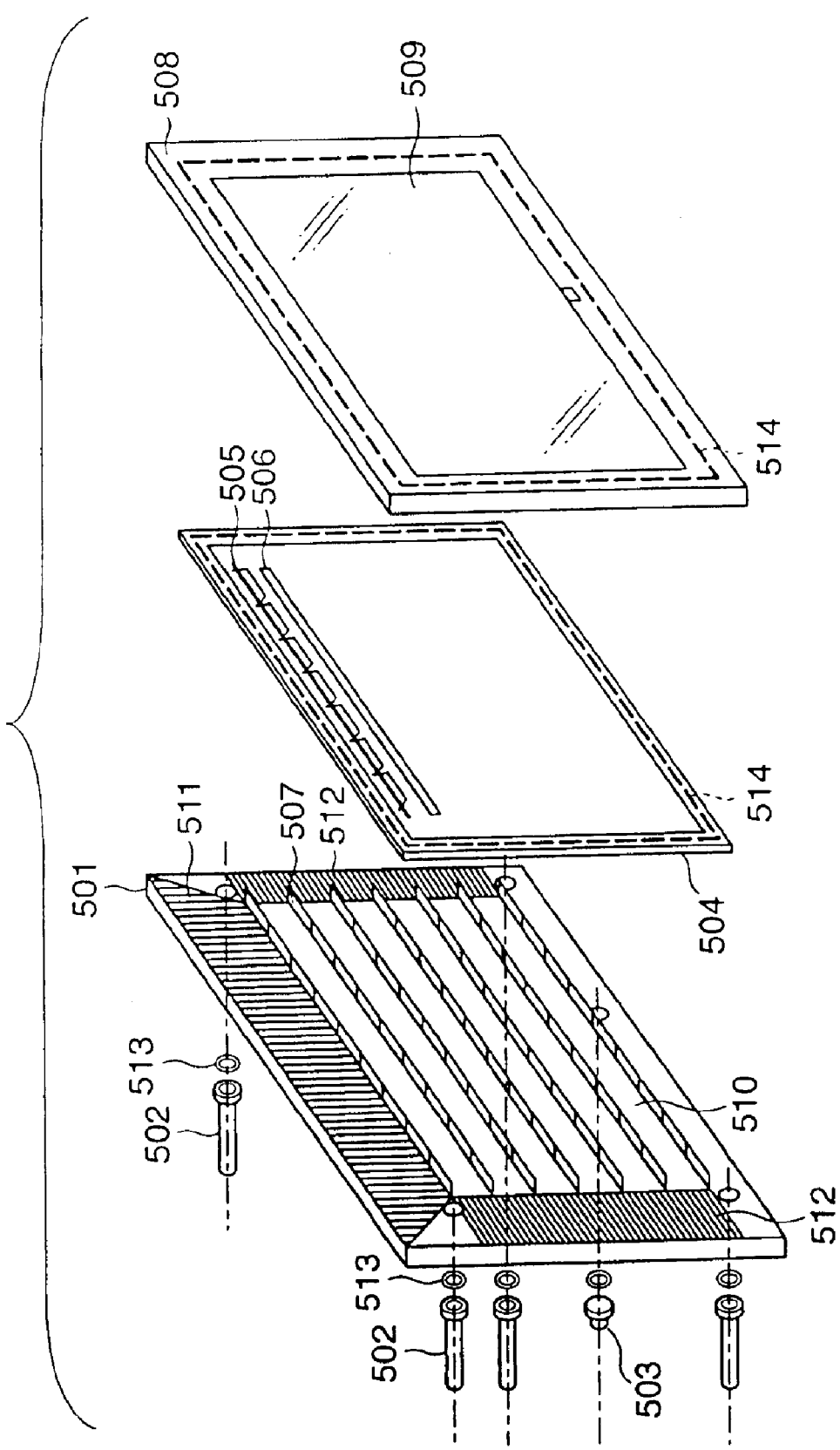
FIG. 3 is a developed assembly view of a display panel section used in the image formation apparatus of the present invention.
Figure 4:
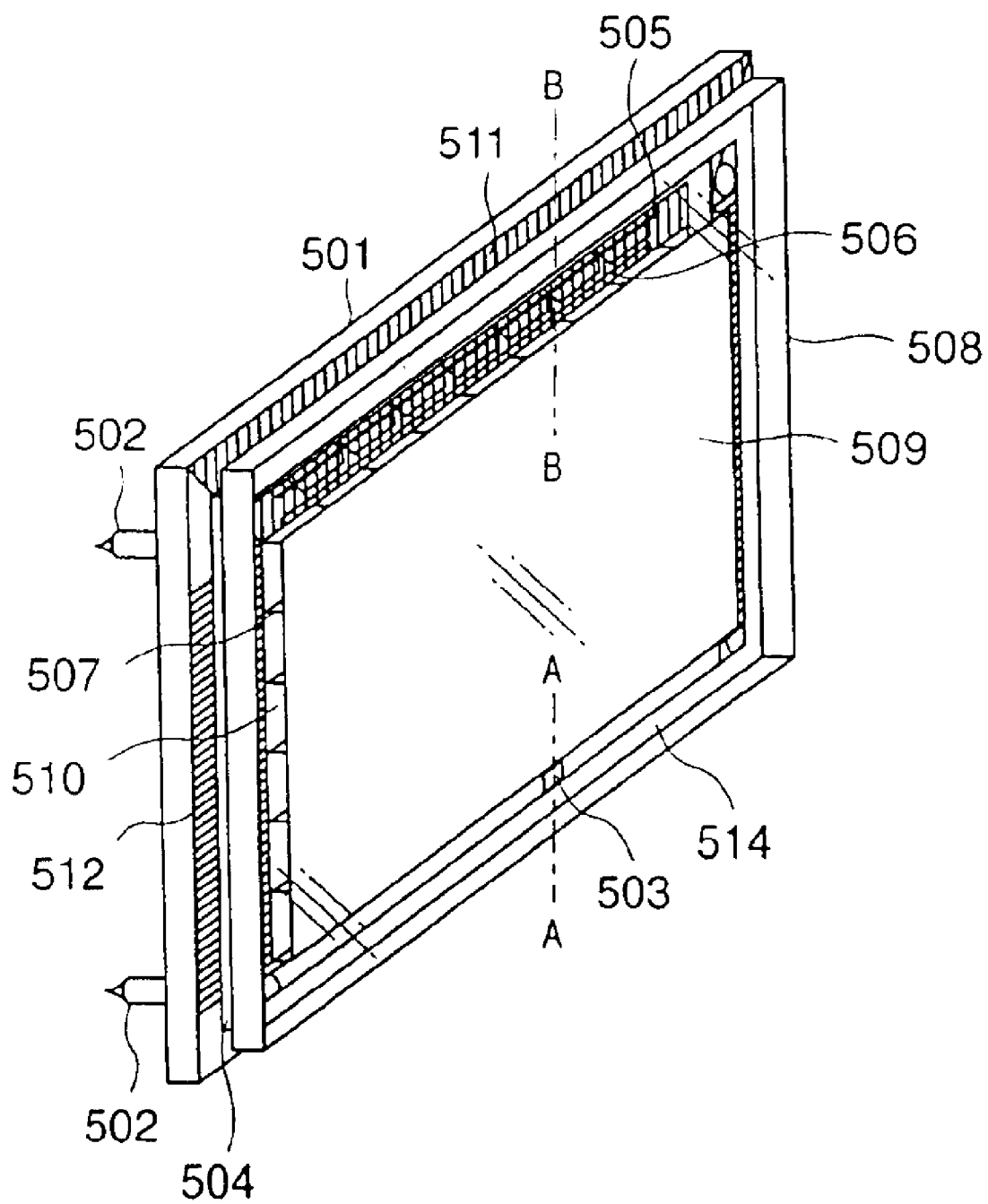
FIG. 4 is a perspective view showing the display panel section shown in FIG. 3 as assembled.

FIG. 3 shows a developed view of an example of the display panel section and FIG. 4 shows an assembled view. Reference numeral 501 denotes the rear plate made up of a glass plate, etc.; 502, exhaust pipes to exhaust air inside the panel to a vacuum; 503, a high voltage terminal to apply a high voltage to the image formation section; 5044, an external frame (frame material) to support the peripheral regions of the panel; 505, a getter to adsorb a gas in the panel; 506, a peripheral support that supports an atmospheric pressure between the external frame and the image formation section; 507, a spacer to provide resistance against the atmospheric pressure applied to the interior of the image formation section; 508, the face plate made of a glass plate; 509, the image formation section made up of an extraction electrode, a black stripe (mask material made of a low-resistance material), a fluorescent material and a metal backing (metal film); 510, an electron beam source substrate on which a plurality of electron emission devices are formed; 511, Y-extraction wires to extract Y-direction wires from the electron beam source area to the outside; 512, X-extraction wires to extract X-direction wires from the electron beam source area to the outside; 513, sheet frits, which are temporarily baked frits in a sheet form to bond the exhaust pipes and high-voltage terminals; and 514, frits to bond the external frame with the rear plate and the face plate.

Figure 5:
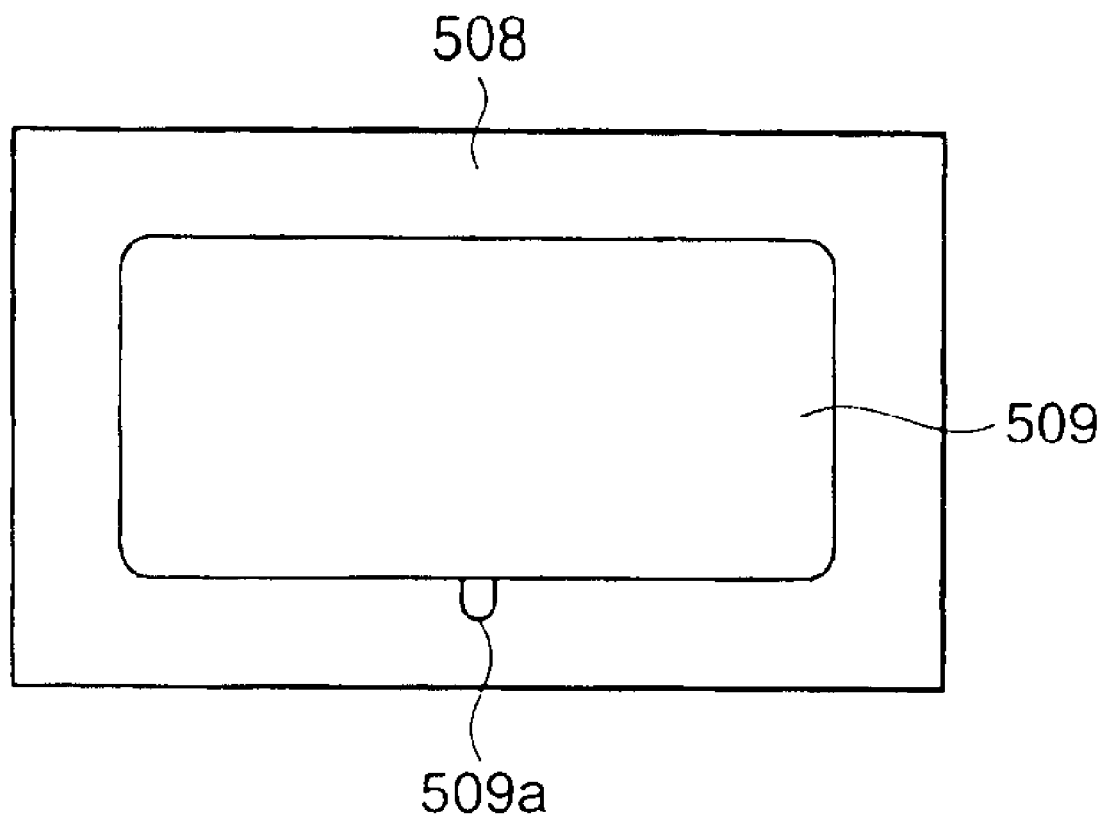
FIG. 5 is a plan view of the face plate shown in FIG. 4.
Figure 6:
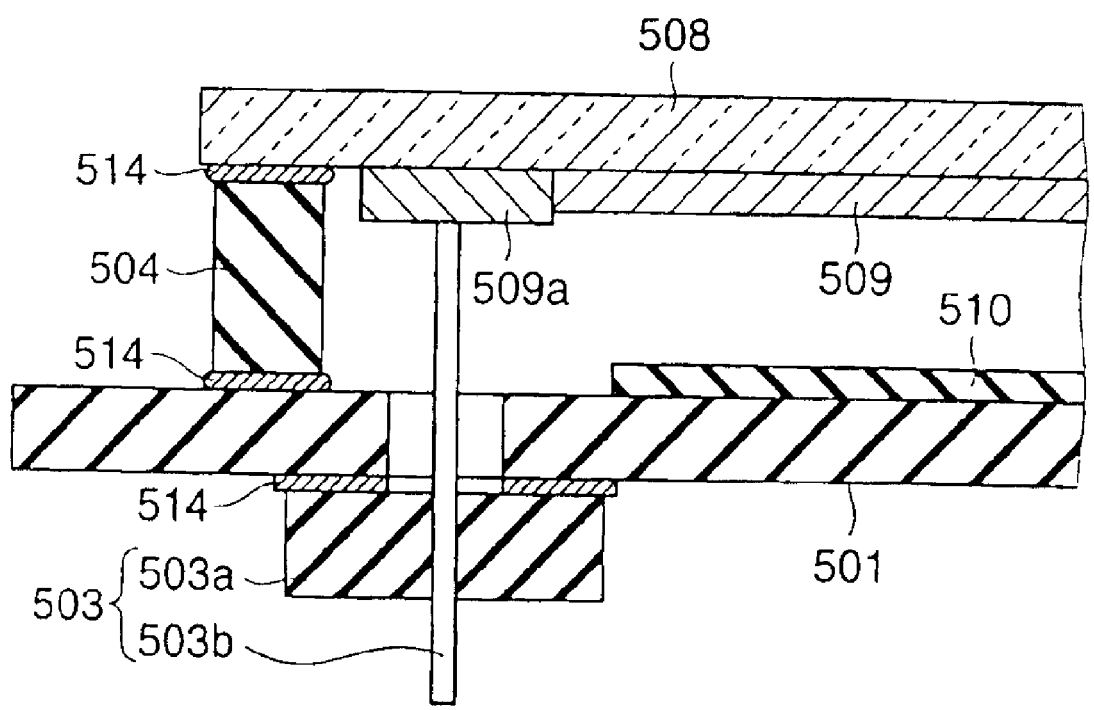
FIG. 6 is an A—A cross-sectional view of FIG. 4.
Figure 7:
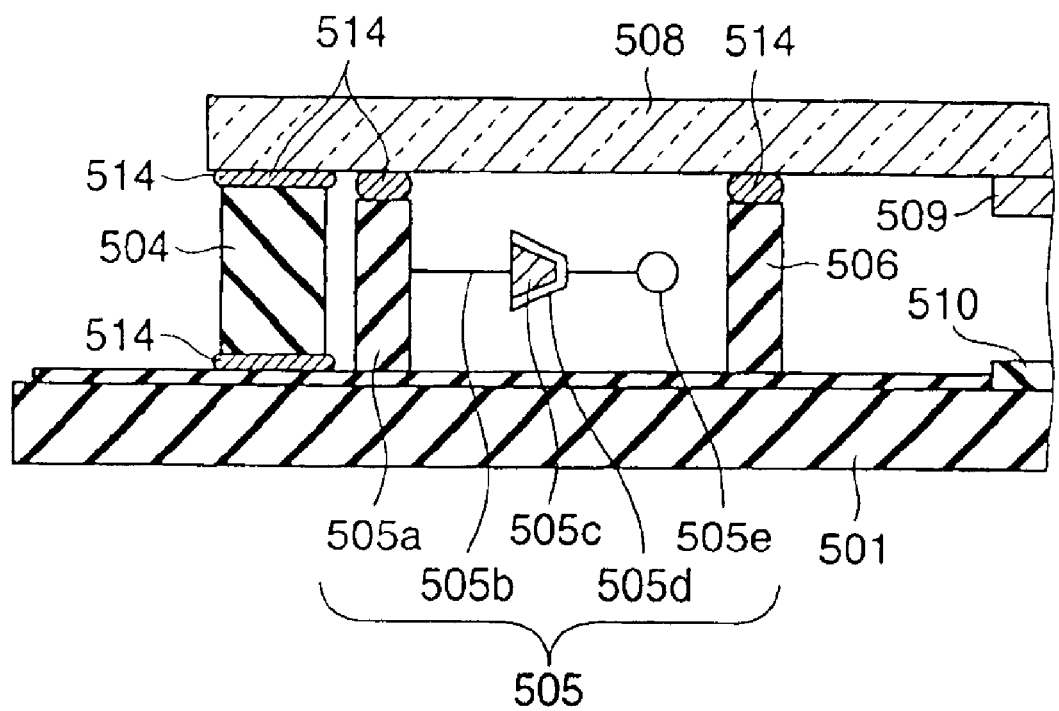
FIG. 7 is a B—B cross-sectional view of FIG. 4.

FIG. 5 is a plan view of the face plate 508 in FIG. 4 to explain the high-voltage terminal extraction section. FIG. 6 is an A—A cross-sectional view of FIG. 4 and is a drawing to explain the high-voltage terminal section. Reference numeral 509a denotes an extraction section formed on the face plate 508. Reference numeral 503a denotes an insulator and 503b denotes a lead-in wire made of a conductive material, and these make up the high-voltage terminal 503. The lead-in wire 503b of this high-voltage terminal 503 is electrically connected to the extraction section 509a formed on the face plate 508 FIG. 7 is a B—B cross-sectional view of FIG. 4 to explain the getter and peripheral support. Reference numeral 505a denotes a getter support; 505b, a support wire; 505c, a getter material; 505d, a getter frame; and 505e, a getter loop, which make up the getter 505.

FIG. 8 schematically illustrates an example of a spacer layout provided on the display panel, FIG. 8a is a top view of the display panel viewed from the face plate side and FIG. 8b is a side view. In this example, multiple spacers are placed in parallel.

FIG. 9 schematically illustrates another example of a spacer layout provided on the display panel, FIG. 9a is a top view of the display panel viewed from the face plate side and FIG. 9b is a side view. In this example, spacers are placed in a staggered arrangement.

Figure 10:
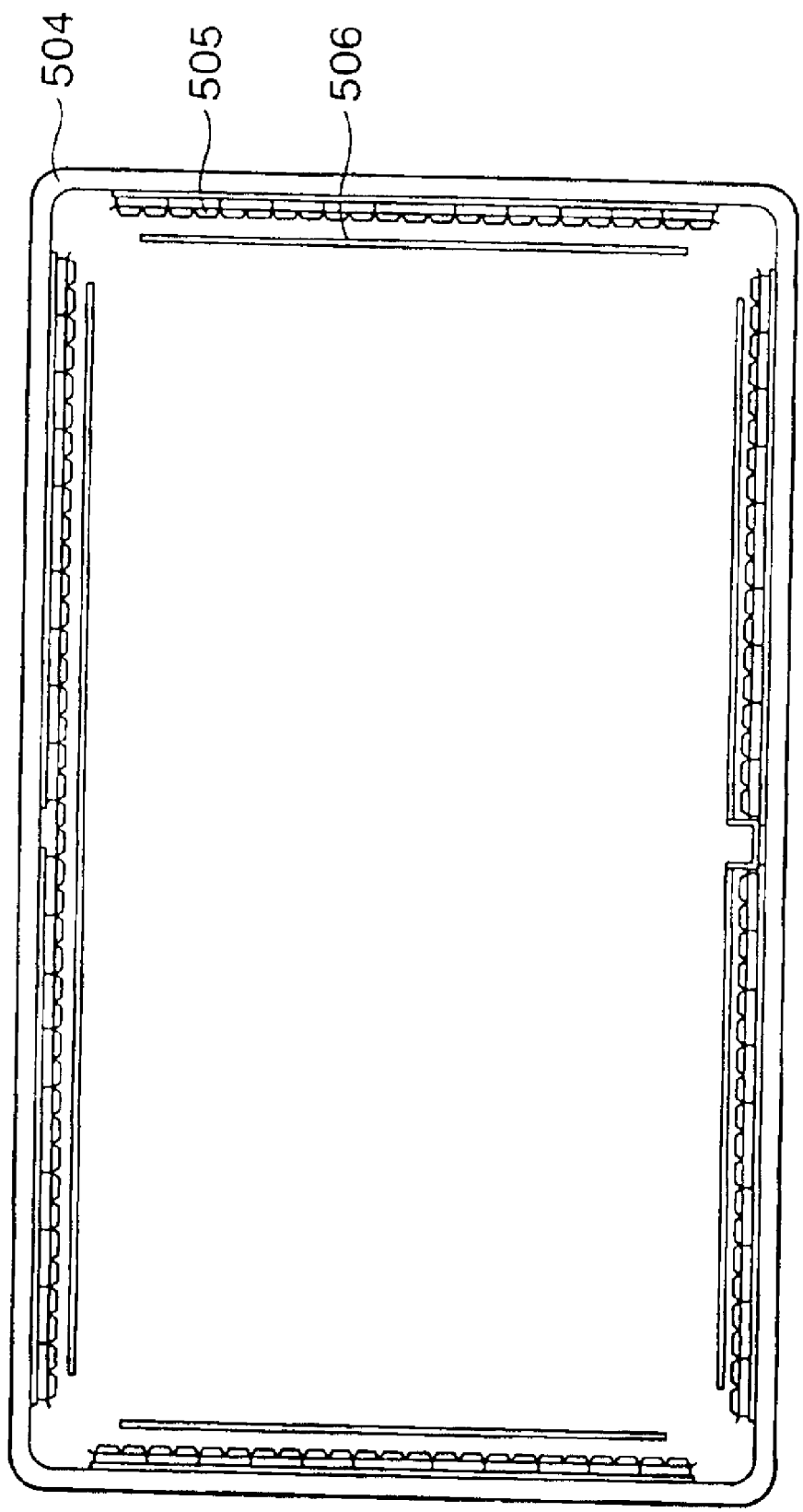
FIG. 10 is a top view of an external frame provided with line getters and peripheral supports used in the image formation apparatus of the present invention.
Figure 17:
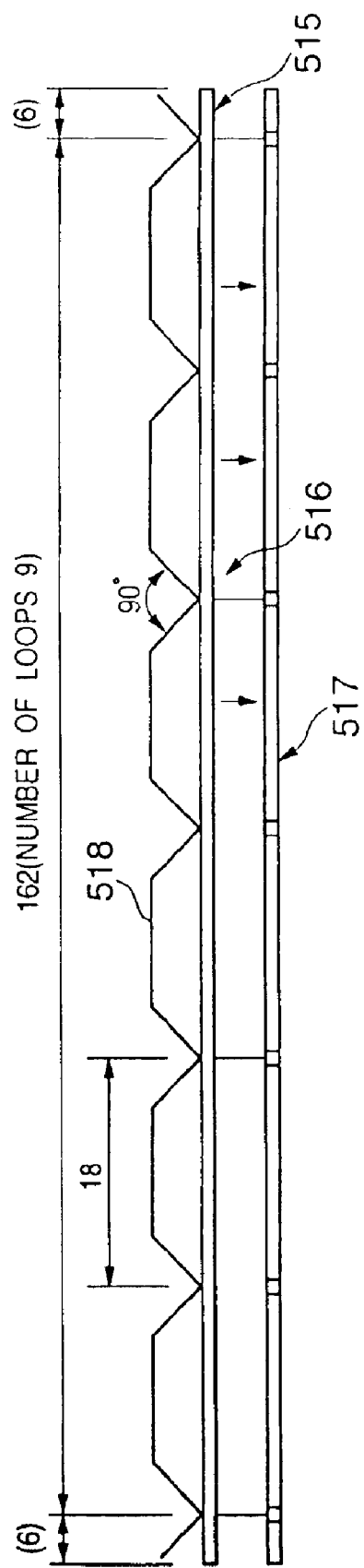
FIG. 17 is a side view of a line getter.

FIG. 10 shows an external frame provided with line getters and peripheral support 506 and FIG. 17 shows a configuration of the line getter. This line getter 515 is set up as follows: First, a line getter made of Ba, etc. is cut to a predetermined length to create a getter wire 515 and a Ni wire (frame wire 518), etc. is molded by folding, etc. in such a way that the Ni wire after folding becomes as long as the getter wire in the non-evaporated direction and spot-welded at appropriate intervals, and in this way Ni wires and getter wires 515 form a plurality of loops. This loop structure can be fixed by welding the loop structure to a metallic wire which is buried in a long, slender columnar glass support material and protruding from there. In the example in FIG. 17, the line getter 515 is fixed to a GM support (rib) 517 with a support wire 516.

Figure 11:
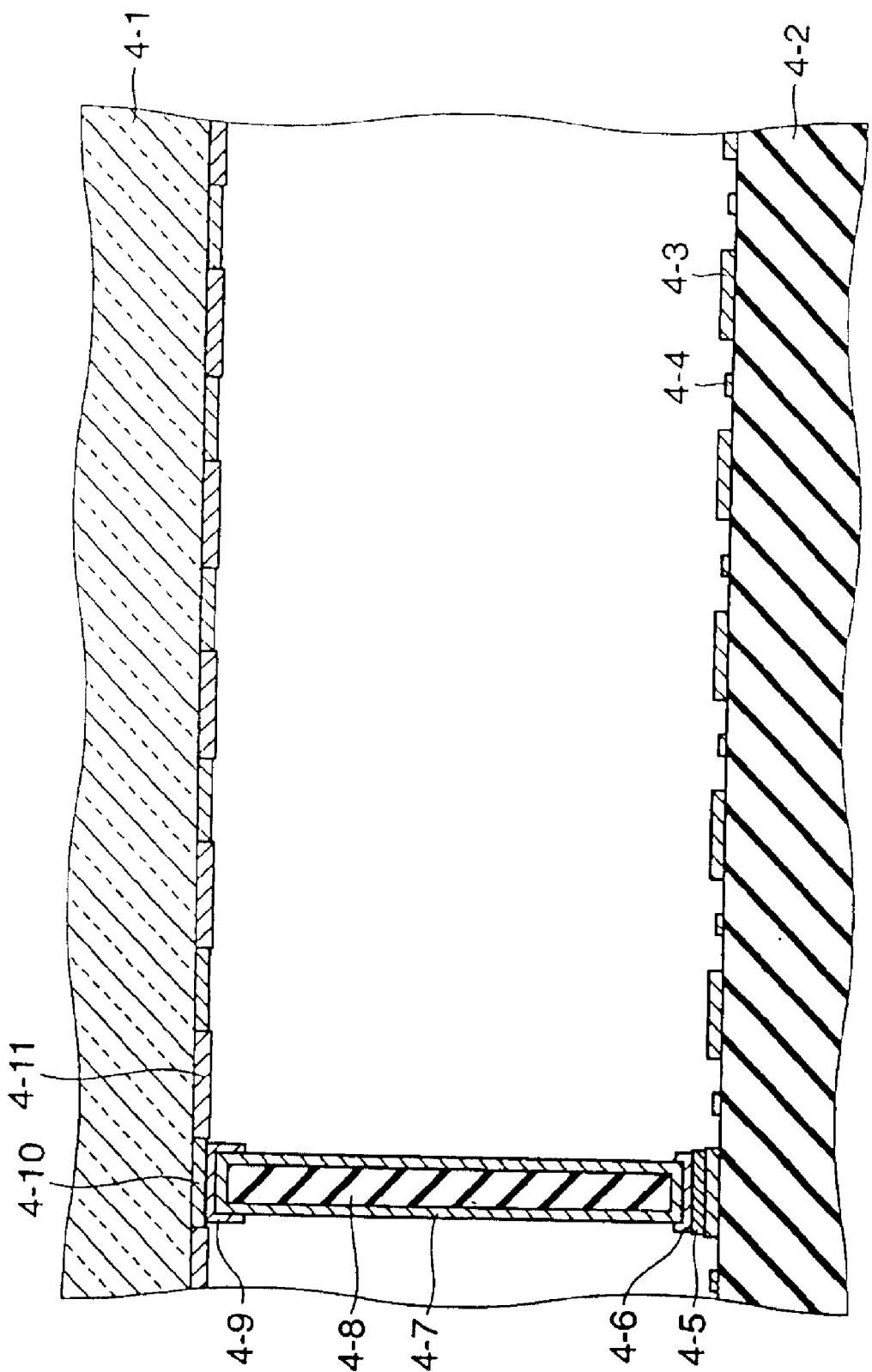
FIG. 11 is a cross-sectional view of another exemplar display panel used in the image formation apparatus of the present invention viewed from the direction orthogonal to the longitudinal direction of a spacer.

FIG. 11 is a cross-sectional view of the display panel orthogonal to the longitudinal direction of the spacer and reference numeral 4-1 denotes a face plate substrate; 4-2, a rear plate substrate; 4-3, row-direction wire (upper wire); 4-4, an electron emission section; 4-5, a conductive frit; 4-6, a rear plate side spacer electrode; 4-7, a high-resistance film; 4-8, a spacer substrate; 4-9, a rear plate side spacer electrode; 4-10, a black stripe; and 4-11, a green fluorescent material. An electron emitted from the electron emission section 4-4 is accelerated by an acceleration voltage applied to a metal backing (not shown) formed on the face plate substrate 4-1 and collides with the fluorescent material 4-11 placed just above the electron emission section 4-4, causing the fluorescent material to emit green light.

Figure 12:
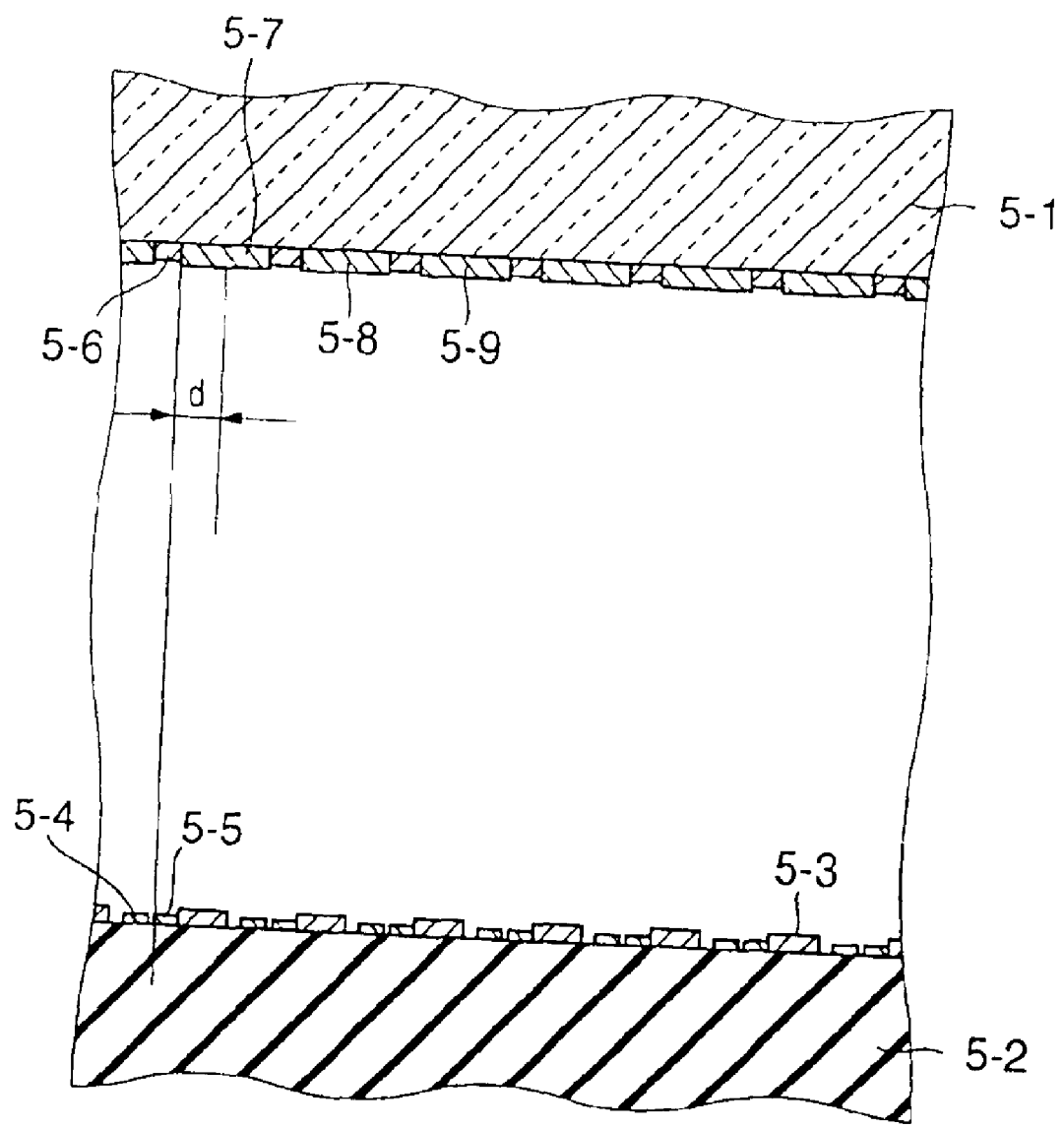
FIG. 12 is a cross-sectional view of another exemplar display panel used in the image formation apparatus of the present invention viewed from the direction parallel to the longitudinal direction of spacers.

FIG. 12 is a cross-sectional view of the display panel in the direction parallel to the longitudinal direction of the spacer. Reference numeral 5-1 denotes a face plate substrate; 5-2, a rear plate substrate; 5-3, a column-direction wire (lower wire); 5-4, a negative side device electrode; 5-5, a positive side device electrode; and 5-6, a black stripe. Reference numeral 5-7 denotes a blue fluorescent material; 4-8, a red fluorescent material; and 4-9, a green fluorescent material. In this cross-sectional direction, an electron emitted from the electron emission section (not shown) is accelerated by an acceleration voltage applied to a metal backing (not shown) formed on the face plate substrate 5-1 and collides with the color fluorescent materials 5-7 to 5-9, causing the fluorescent materials to emit light. At this time, electrons are deflected toward the positive side device electrode 5-5, and therefore the fluorescent materials are placed at positions shifted (d) from the position right above the emission sections formed between the device electrodes.

Figure 62:
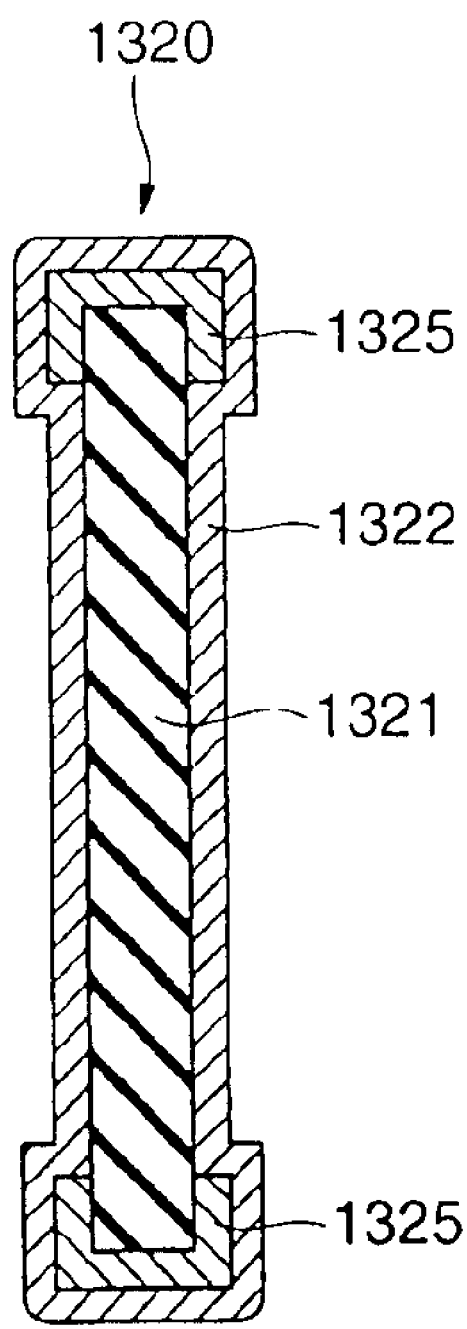
FIG. 62 is a cross-sectional view showing an exemplar spacer used in the display panel of the image formation apparatus of the present invention.

The spacer shown in FIG. 11 is provided with a spacer electrode outside the high-resistance film. As a configuration of this spacer surface, the configuration shown in FIG. 62 is also used favorably. The spacer 1320 shown in FIG. 62 has low resistance films 1325 formed on the section (top end face) of the insulative base 1321 that contacts the face plate and the section (bottom end face) that contacts the rear plate and a high-resistance film 1322 is formed to cover the entire side of the base.

FIGS. 13A to 13E and FIG. 14 show the process of formation of electron emission devices on the electron beam source substrate. Hereinafter, the method of manufacturing this substrate with reference to these figures will be explained.

First, an example of the method of manufacturing the electron emission substrate panel of the present invention will be explained with reference to FIG. 13. First, a conductive film made of a metallic material is formed on a well cleaned substrate 529 and the pattern is subjected to micro processing using photolithograph to form multiple pairs of device electrodes 521 and 522. Here, the substrate 529 can be silica glass, glass with reduced impurity content such as Na, soda lime glass, substrate with $SiO_2$ that is formed by a sputter method or CVD method, laminated on a soda lime glass, ceramics such as alumina, and the like.

Figure 13A:
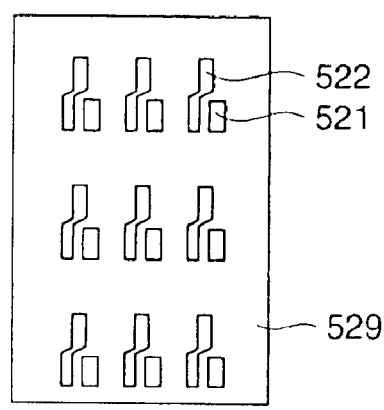
FIGS. 13a–13e are process diagrams showing the procedure for forming electron emission devices on an electron beam source substrate applied to the image formation apparatus of the present invention.

As the method of forming the device electrodes 521 and 522, it is possible to select from among various methods such as forming a film by a vacuum-based method such as vacuum deposition method, sputtering method and plasma SVD method, then patterning by a lithography method and etching or offset-printing MO paste containing organic metals using glass recessed plate. The material for the device electrodes 521 and 522 can be anything if it has conductivity, for example, metal or alloy such as Ni, Cr, Au, Mo, W, Pt, Ti, Al, Cu, Pd or printing conductor configured by metal or metal oxide such as Pd, Ag, Au, $RuO_2$, Pd—Ag and glass, semiconductor material such as polysilicon, and transparent conductor such as $In_2O_3$—$SnO_2$ (FIG. 13a)

Figure 13B:
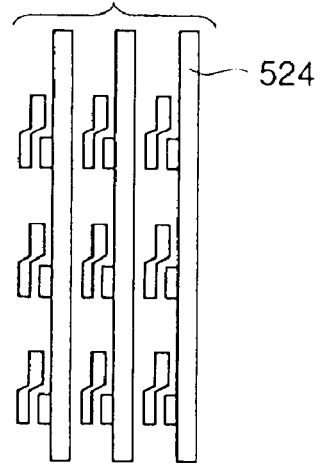

Then, a conductive paste is formed by printing as the Y-direction wire 524. At this time, the Y-direction wire 524 is formed in such a way as to connect to the device electrode 522. The wire with thick coating is more advantageous because it is possible to reduce electrical resistance. For this reason, it is desirable to use a thick film printing method, especially screen printing method and it is possible to use conductive paste such as Ag, Au, Cu and Ni. In the case where patterning with higher resolution is required, a rough pattern is formed using photo-sensitive paste by means of screen printing, then exposed and developed, and in this way it is possible to obtain optimal wires. After a desired pattern is formed, to eliminate a vehicle component in the paste, the pattern is baked at a temperature (400 to 650° C.) according to a thermal characteristic of the paste and of the glass substrate used (FIG. 13b).

Figure 13C:
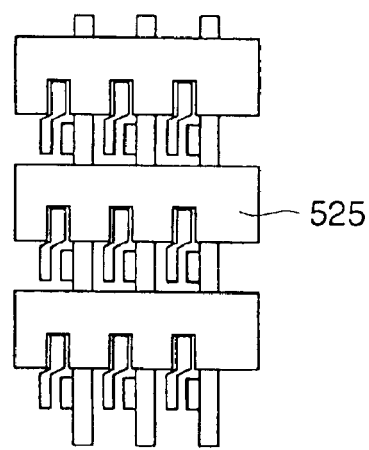

Then, an inter-layer insulation film 525 is formed on the intersections between the X-direction wires and Y-direction wires. This inter-layer insulation film is made of glass materials including, for example, lead oxide as a main component, such as mixture of components appropriately selected from among PbO, $B_2O_3$, ZnO, $Al_2O_{31}$ $SiO_2$, etc. The thickness of the inter-layer insulation film is not limited if insulativity can be secured at least. The thickness is normally 10 to 100 $\mu$m, preferably 20 to 50 $\mu$m. This inter-layer insulation film is formed by applying paste made up of a mixture of frit glass whose main component is lead oxide, appropriate polymers such as ethyl cellulose and organic solvents and vehicles to predetermined positions by means of screen printing and then baking (FIG. 13c). Since the inter-layer insulation film only needs to be applied to at least the intersections between the Y-direction wires and X-direction wires, its shapes are not limited to those in FIG. 13.

Figure 13D:
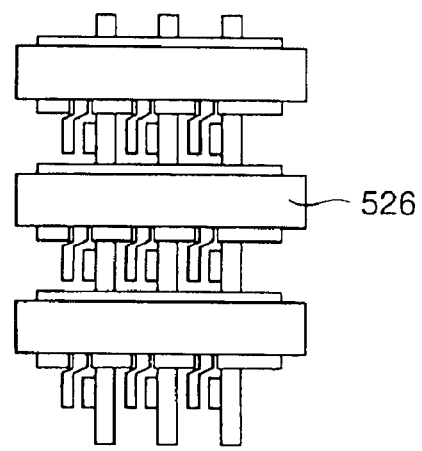
Figure 13E:
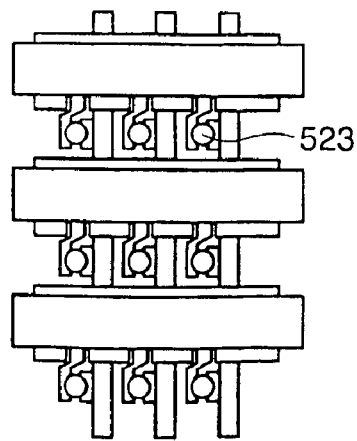

Then, the X-direction wires 526 are formed on the inter-layer insulation film. Since it is also advantageous that the electrical resistance of these wires be reduced, it is desirable to use a thick film printing method capable of forming a thick film. Thus, as in the case of the formation of the Y-direction wires, wires are formed using conductive paste according to a screen printing method and then baked. At this time, each wire is connected to the device electrode 522 (FIG. 13d). Then, a conductive thin film 523 is formed. Specific examples of the material thereof include metals such as Pt, Ru, Ag, Au, Ti, In, Cu, Cr, Fe, Zn, Sn, Ta, W and Pd, etc., oxides such as PdO, $SnO_2$, $In_2O_3$, PbO, $Sb_2O_3$, etc., borides such as $HfB_2$, $ZrB_2$, $LaB_6$, $CeB_6$, $YB_4$, $GdB_4$, etc., carbides such as TiC, ZrC, HfC, TaC, SiC, WC, etc., nitrides such as TiN, ZrN, HfN, etc., semiconductors such as Si and Ge, etc., carbon, AgMg, NiCu, Pb, Sn, etc., which are made up of a fine particle film. The fine particle film referred to here is a film made up of a congregate of a plurality of fine particles and a film whose micro structure is not only in a state in which fine particles are individually scattered but also in a state in which fine particles are adjacent to each other or overlapping one atop another (including island state)

Figure 14:
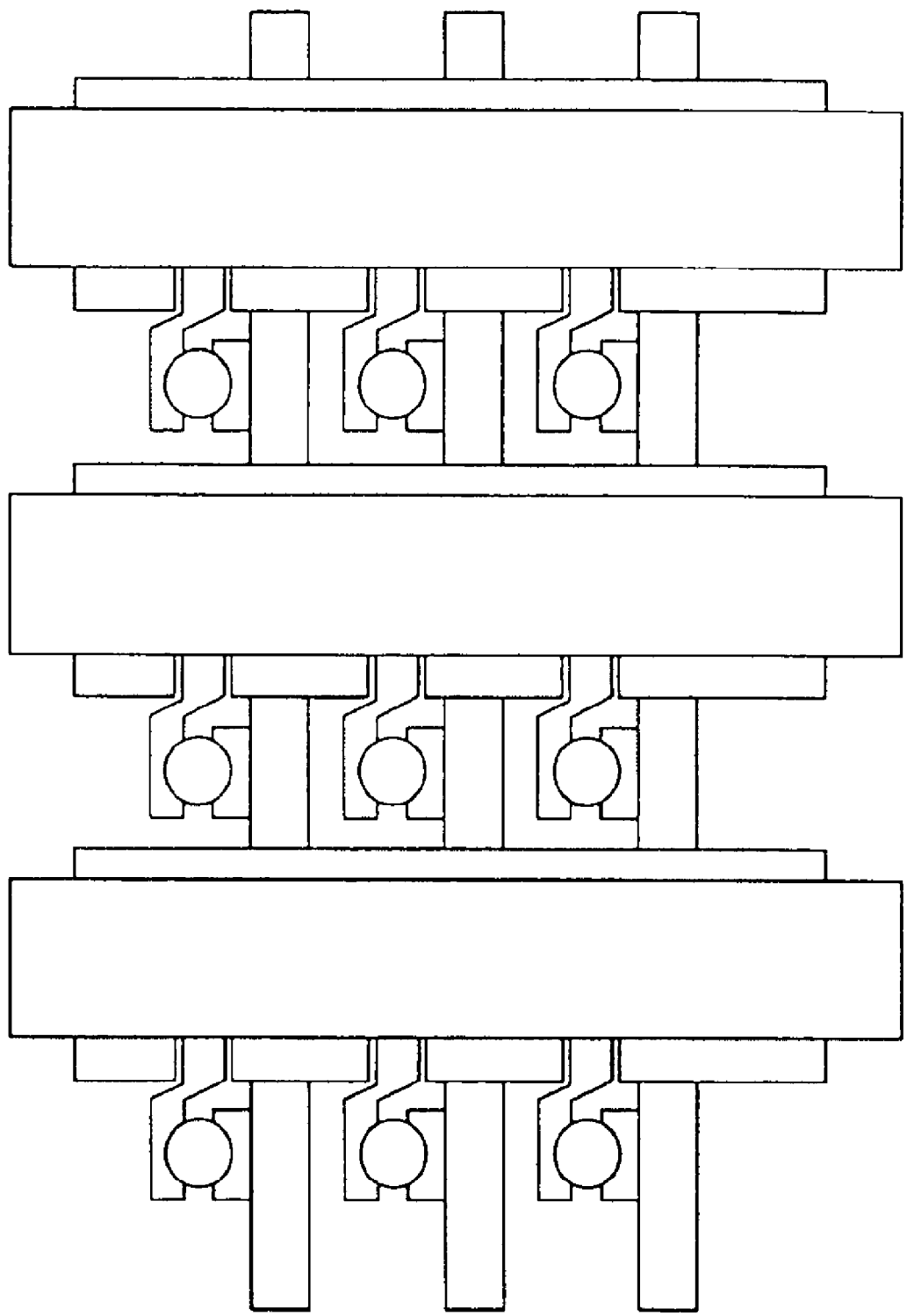
FIG. 14 is a schematic diagram of the electron beam source substrate used in the image formation apparatus of the present invention.

A bubble-jet system is a means often used for forming thin films for formation of these electron emission sections. This is because the bubble-jet system has many advantages; the principle and configuration are very simple and it is easy to speed up the operation and reduce the size of droplets, etc. In reality, a conductive thin film is formed with fine particles such as metals and metal oxides by giving a solution of organic metal compounds including the aforementioned conductive materials as droplets only at a predetermined position, drying and then thermally decomposition the organic metal compounds through heat treatment (FIG. 14).

As the electron emission devices used for the present invention, it is desirable to use those electron emission devices having a layer of low-effective work function material, for example, a carbon layer, which is a layer including carbon. This can be obtained by the activation process disclosed in the U.S. Pat. No. 5,591,061 and Japanese Patent No. 2854532, etc. Especially, a carbon layer including graphite is ideally used.

On the other hand, as the layer of low-effective work function material, the amorphous diamond film and CVD diamond film disclosed in the U.S. Pat. Nos. 5,679,043 and 5,763,997, etc. can also be used. These are also a kind of carbon layer.

Figure 15:
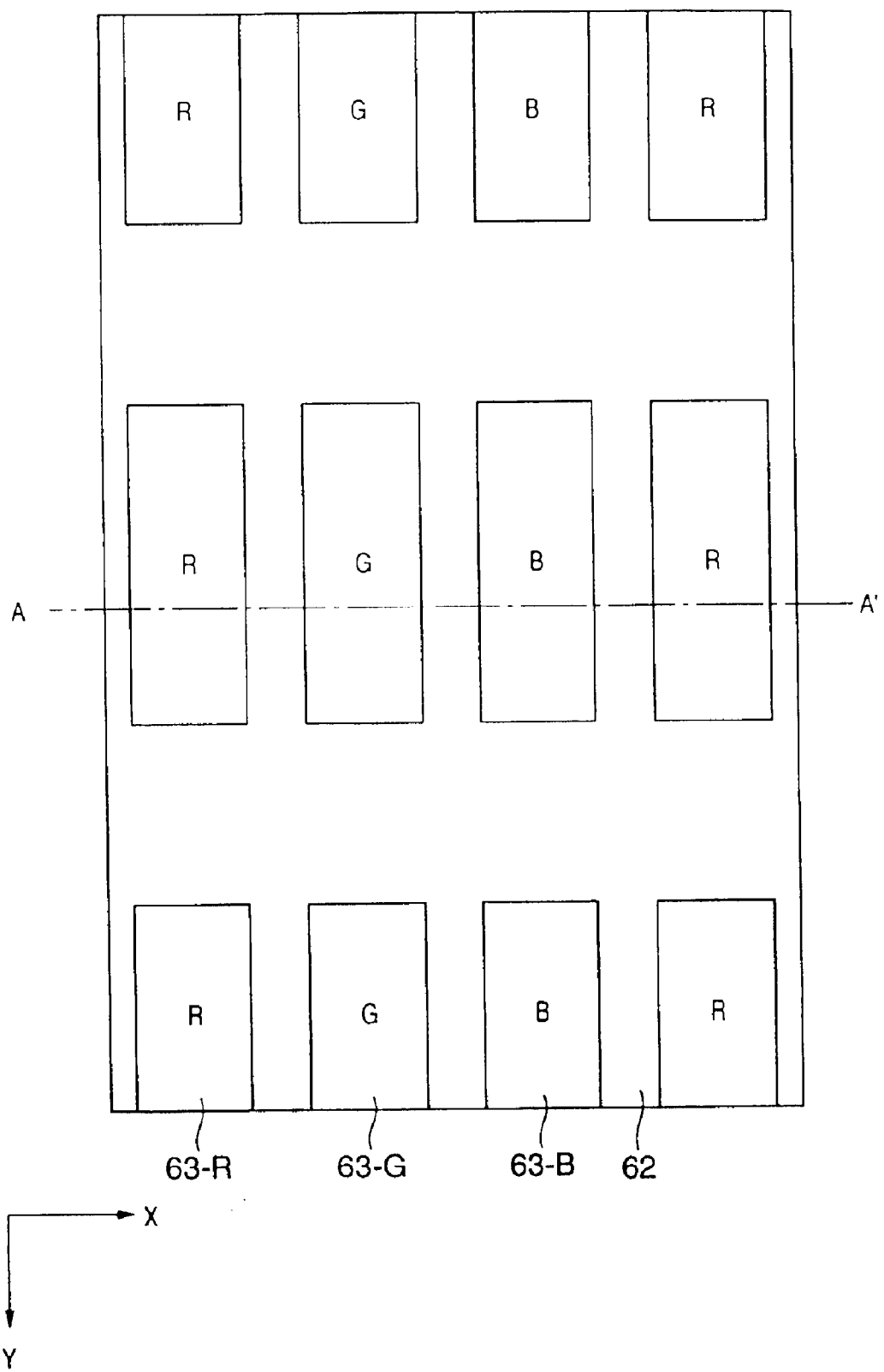
FIG. 15 is a plan view of the face plate used in the image formation apparatus of the present invention viewed from the rear plate side.
Figure 16:
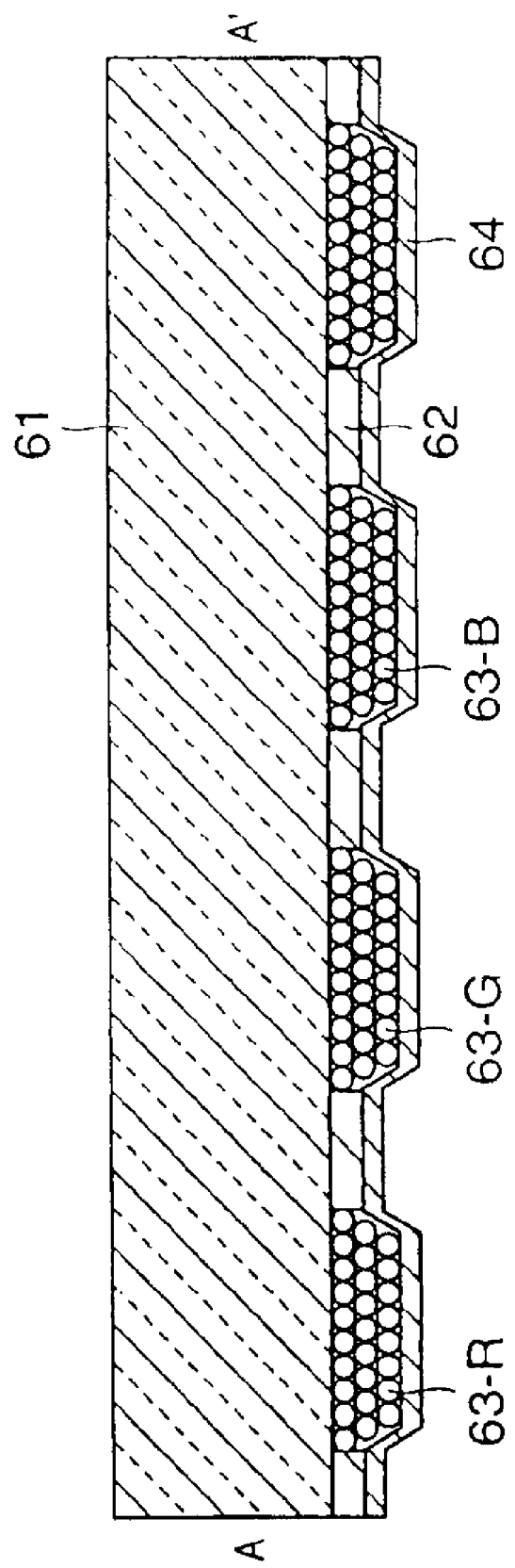
FIG. 16 is an A–A' cross-sectional view of FIG. 15.

FIG. 15 is a top view of the face plate viewed from the rear plate side and FIG. 16 is an A–A' cross-sectional view of FIG. 15. The face plate shown in these figures can be obtained, for example, as follows. First, a grid-like black matrix 62 is formed by screen printing on a substrate 61 made of soda lime glass (blue-plate glass) with atmospheric pressure resistance or high distortion point glass with almost the same coefficient of thermal expansion as that of a soda lime glass using glass paste including inorganic black pigment. As the material for the black matrix, a material having conductivity such as paste containing carbon can also be used. Then, fluorescent material patterns of three primary colors of R, G and B (63-R, 63-G, 63-B) are formed on the openings of the black matrix 62 using screen printing. Then, after burning organic binders in the printing paste (e.g., at 430° C.), filming processing (process of forming an acryl-based thin film on fluorescent materials) normally used for CRTs, etc. is performed and an aluminum thin film, for example, of 1000 Å to 20000 Å in thickness is formed by vapor deposition. Then, the glass substrate is baked at 430° C. to burn the acryl-based thin film between the aluminum thin film and fluorescent materials and a metal backing 64 made of an aluminum thin film of 1000 Å to 2000 Å in thickness is formed.

It is possible to use various configurations of the image display panel in the image formation apparatus above. For example, the one with the configuration shown in FIG. 18 can be used. This display panel is configured by placing a surface conduction type electron beam source substrate in a rear plate 4005 made of a glass material with atmospheric pressure resistance, a support frame (frame material) 4007 and a face plate 4000, bonding predetermined joints of the components, and sealing the space formed between the rear plate 4005 and the face plate 4000. Frit glass, etc. is used for this sealing. Inside the face plate 4000 are a metal backing 4006 (details are not shown) and a fluorescent material 4008 and a high-voltage terminal 4011 connected to the metal backing 4009 is led out of the image formation apparatus and a high-voltage power supply 4010 is connected to this high-voltage terminal. Furthermore, column-direction wires 4003 and row-direction wires 4004 formed on the surface conduction type electron beam source substrate 4001 are connected to the X-direction terminal DX1, etc. and Y-direction terminal DY1, etc., that extend toward outside the image formation apparatus, respectively, and images are displayed on the face plate by controlling emission of electrons from the electron emission devices 4002 using these wires according to image information. Here, if the electron beam source substrate has sufficient strength, the electron beam source substrate can also have the function as the rear plate.

Hereinafter, examples with different configurations used in the present invention will be explained.

(First Configuration)

The interior of the display panel is sealed and shut out from the outside so as to maintain a predetermined degree of vacuum as described above. It is general practice to further place getters in order to maintain this internal degree of vacuum. Moreover, there are cases where it is necessary to adopt various means and methods to secure sufficient resistance of the display panel itself against the atmospheric pressure when producing a vacuum inside. In such cases, spacers can be placed between the rear plate and face plate for the purpose of enhancing structural strength, thus improving strength against the atmospheric pressure.

Figure 26:
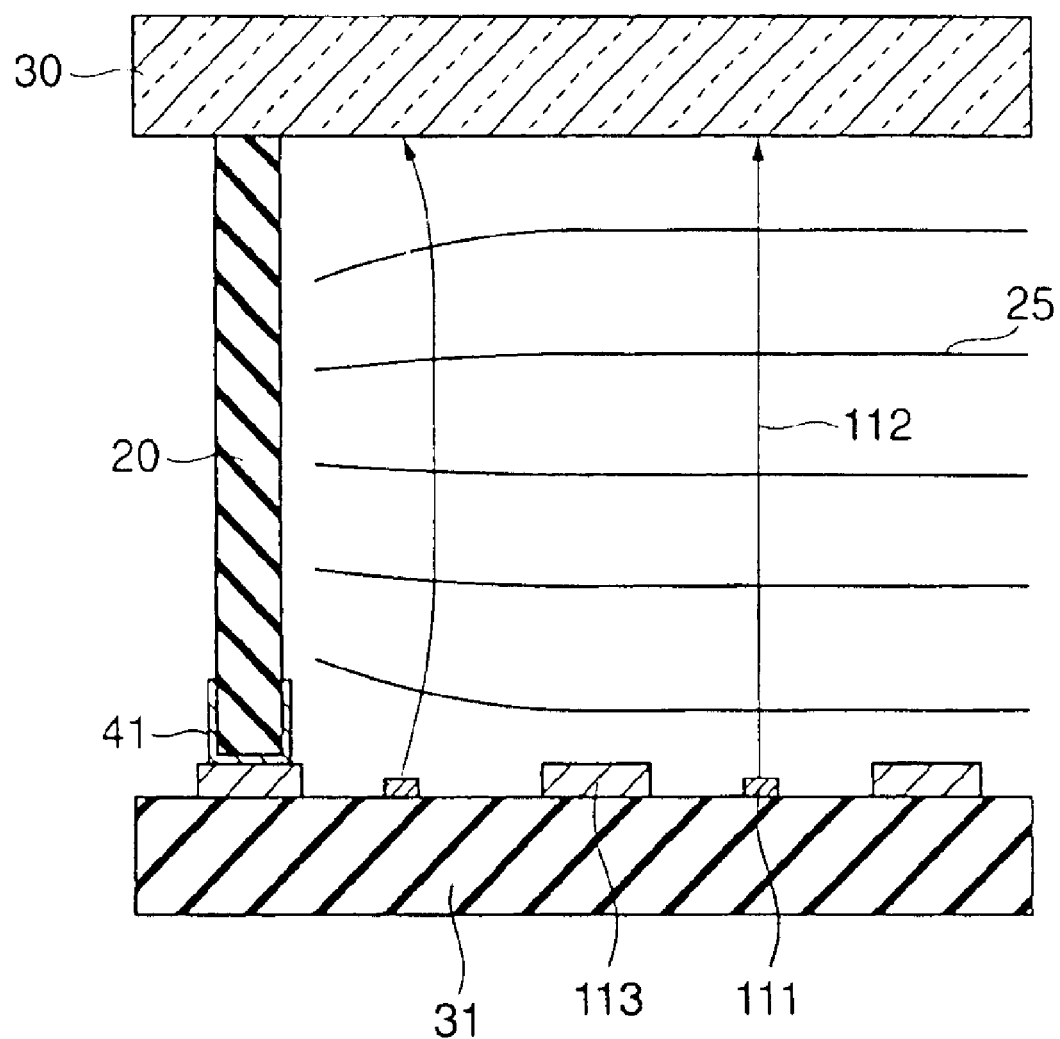
FIG. 26 is a schematic view showing influences of spacers on emitted electrons.

First, the relationship between this spacer and electrons emitted from an electron emission device will be explained using FIG. 26. In FIG. 26, reference numeral 30 denotes a face plate; 20, a spacer; 41, a spacer electrode; 113, a wire; 111, an electron emission section; 31, a rear plate substrate on which an electron beam source is formed; 112, an electron trajectory; and 25, an equipotential line. Electrons are attracted toward the spacer when the spacer 20 is charged. The spacer electrode 41 is formed on the spacer 20 to adjust the potential close to the electron emission section 111 near the spacer, and in this way it is possible to lead the trajectory of electrons near the electron emission section in a direction repelling the spacer 20 to allow electrons to arrive at the normal position of the face plate 30.

Thus, as an example of placement of such a spacer and getter, this configuration places the getter material on the wire electrode and avoids the support material from being placed on the getter. Such examples will be described below.

EXAMPLE 1

Figure 19:
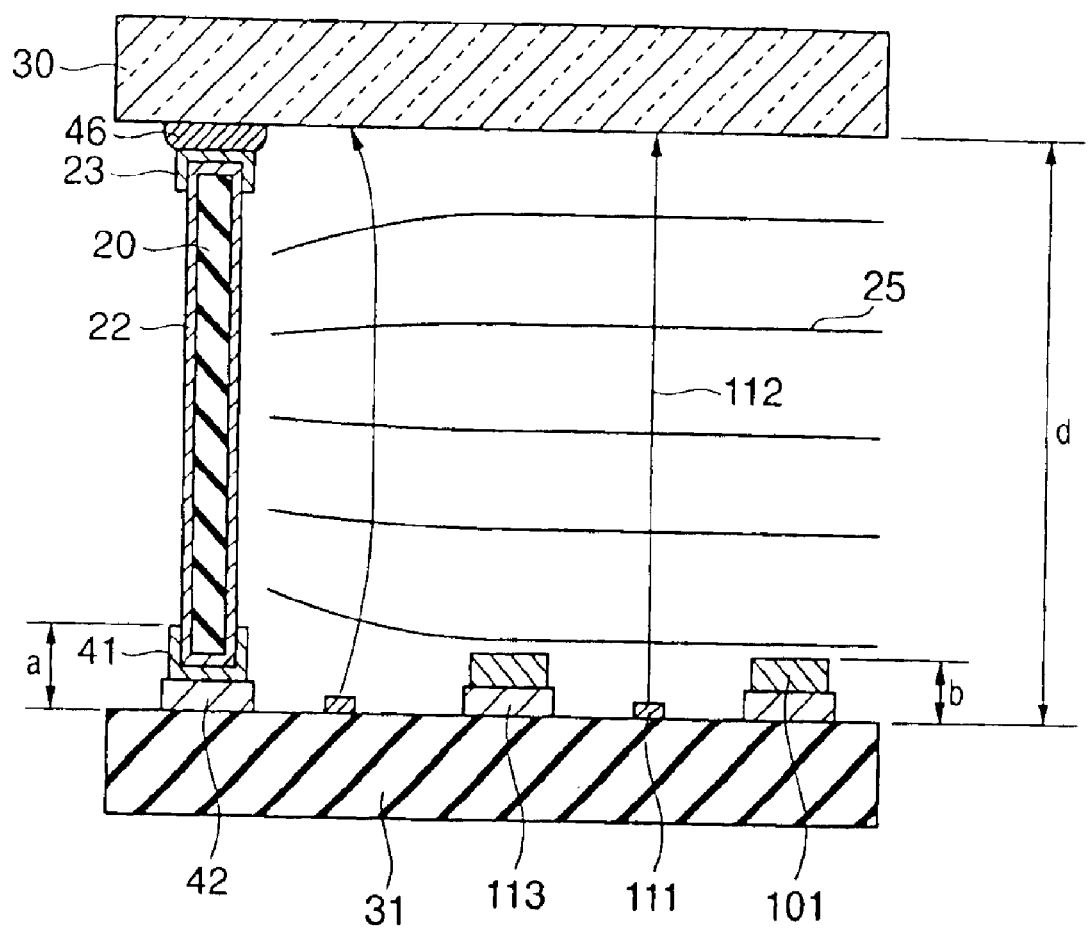
FIG. 19 is a partial cross-sectional view of the display panel section of the image formation apparatus, another example of the present invention.

An Example 1 of the First Configuration will be explained using FIG. 19. In FIG. 19, reference numeral 42 denotes a wire connected to the spacer; 22, a high-resistance film formed so as to cover the entire side of the spacer base; 23, a spacer electrode made of a low-resistance film formed on the spacer on the section that contacts to the face plate 30 (top end face); and 46, a joint. In FIG. 19, the face plate (fluorescent material and metal backing, etc. are omitted in FIG. 19) 30, spacer 20, spacer electrode 41 formed on the electron beam source substrate side, wire 113, electron emission section 111, rear plate substrate 31 on which an electron beam source is formed, electron trajectory 112, equipotential line 25 and getter 101 have the same configurations as those shown in FIG. 26. To adjust the electron trajectory of electrons attracted by the charged spacer 20, height "a" of the electrode 41 formed on the spacer is made larger than height "b" up to the top face of the getter. The size of "a" can be arbitrarily selected depending on height "b" up to the top face of the getter, structure of the image formation apparatus, drive conditions, and antistatic capacity of the high-resistance film, but adjusting the electron trajectory against attraction of electrons toward the spacer 20 due to charging at least requires a>b. Furthermore, $0 \leq a-b \leq 100$ μm is desirable. However, in a situation in which charging of the spacer can be eliminated, it is possible to select a quasi-equal value for "a" and "b". Moreover, it is also possible to select an arbitrary value for height "b" up to the top surface of the getter. Furthermore, it is possible to apply various manufacturing methods such as sputter formation and thermal spray formation, etc.

This configuration avoids forming a getter at the location of the spacer, thus preventing the surface from being covered with the spacer, making it possible to increase the exposed area per a unit length and improve the utilization rate of raw materials. Moreover, the spacer applies no force to the getter 101, producing an effect that destruction or missing of the getter is not likely to occur in the spacer assembly process or after evacuation. Furthermore, since the electron trajectory is generally strongly affected by the electric field on the electron beam source substrate side of the spacer, avoiding forming the getter below the spacer also has an effect of being able to apply a getter manufacturing method that is hard to control height precisely.

This configuration makes it easier to form a getter film inside the display area of the image formation apparatus without producing disturbance of the electron trajectory near the spacer, making it possible to provide a high-quality image formation apparatus with less time variation of brightness (reduction with time) and less beam deviation.

Various methods can be applied to adjust the electron trajectory near the electron emission section. In addition to the above-described method of increasing the height of the spacer electrode, it is also possible to increase the height of the wires connected to the spacers. It is possible to form all the wires by one operation using a high precision formation method such as patterning using a photolithography method or screen printing to the electron beam substrate. Using this method allows the deviation relative to the electron emission section to be reduced.

As the wire material, various conductive materials can be used. For example, in the case where wires are formed using a screen printing method, a material combining metal and glass paste can be used, while a plating bath material can be used in the case where metal is precipitated using a plating method. With respect to the protuberant wiring section near the section that contacts the spacer, if the section whose height is to be adjusted is electrically connected to the section formed below, it is possible to form the portion having the same height as other wires by one operation using a method similar to that for other wires and use a different manufacturing method only for the portion whose height is to be adjusted. As the spacer shape, various shapes such as a cylindrical shape can be used in addition to a tabular shape.

Figure 18:
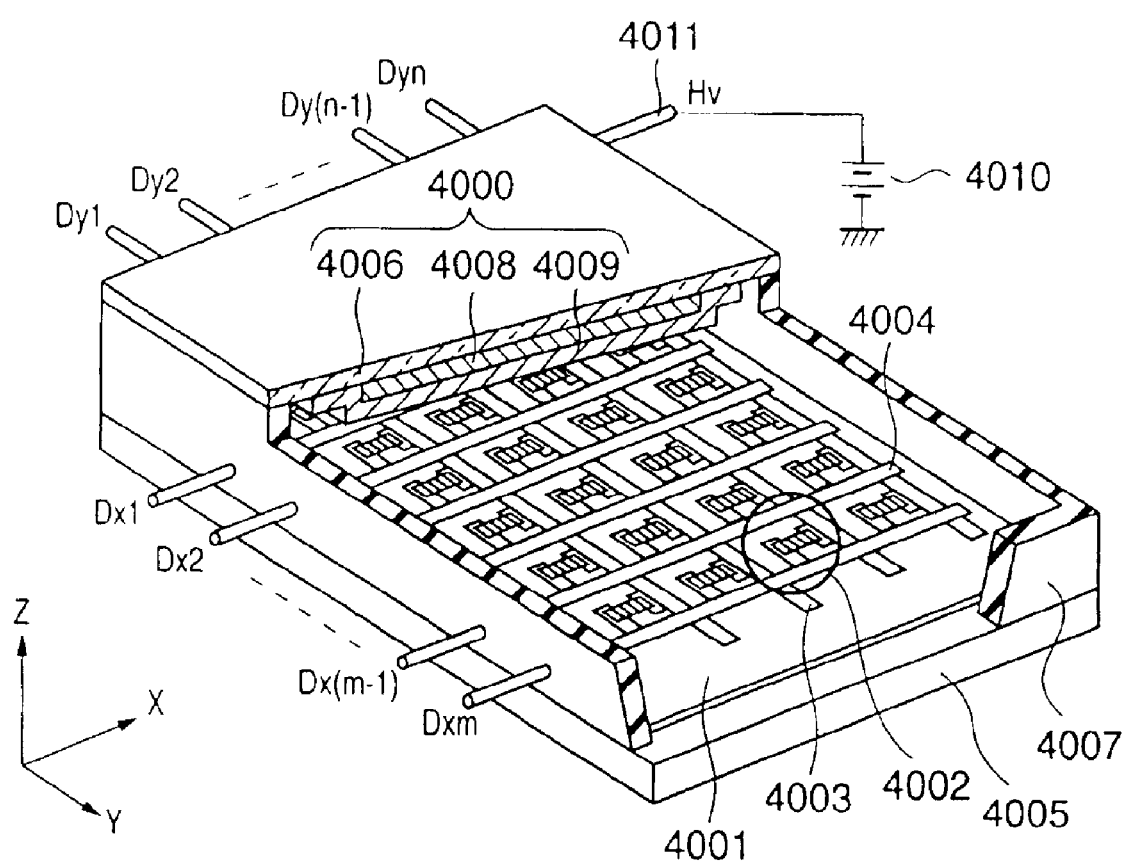
FIG. 18 is a partially cut out perspective view of the image display panel section of the image formation apparatus, an example of the present invention.
Figure 20:
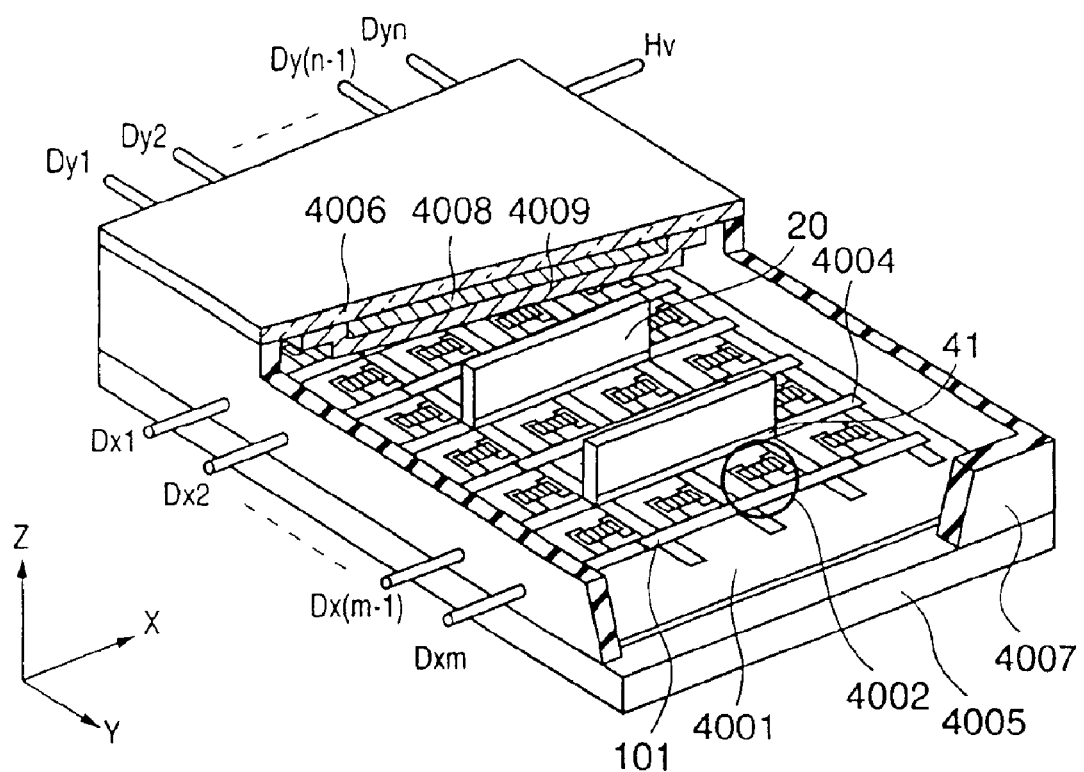
FIG. 20 is a partially cut out perspective view of the image display panel section of the image formation apparatus, another example of the present invention.

FIG. 20 is a perspective view of the display panel using this example and part of the panel is cut out to show the internal structure. In the figure, components having the same configuration as that shown in FIG. 18 are assigned the same reference numerals. In this example, too, the rear plate 4005, side wall 4007 and face plate 4006 form an airtight container to keep the interior of the display panel to a vacuum.

The configuration in FIG. 19 can be obtained, for example, as follows. After forming a column-direction wire (not shown) and insulation layer (not shown) on the electron beam source substrate 31, Ag paste is applied using a screen printing method and the wire 113 (row-direction wire) is formed. Each wiring width is set to 300 μm. The thickness of the spacer 20 is set to 220 μm and the spacer electrode 41 is formed so that the thickness becomes 0.2 μm The getter 101 used in this example is formed as follows. Getter formation is performed after wire formation. A non-evaporation type getter film is formed on the row-direction wire 113 using a mask according to a reduced pressure plasma thermal spray method. The getter film is formed in an atmosphere of low-pressure argon and HS-405 (325 mesh) powder, which is an alloy with a composition of Zr—V—Mn—Al manufactured by Japan Getters Incorporated is used as the getter material. The film thickness of the getter material formed in this example is about 40μ on average. It is desirable that the getter 101 formation area be equal to or slightly smaller than the width of the spacer. This is to prevent the getter from sticking out of the wire, causing the electron trajectory to deviate a great deal and it is possible to select an arbitrary value.

Figure 21:
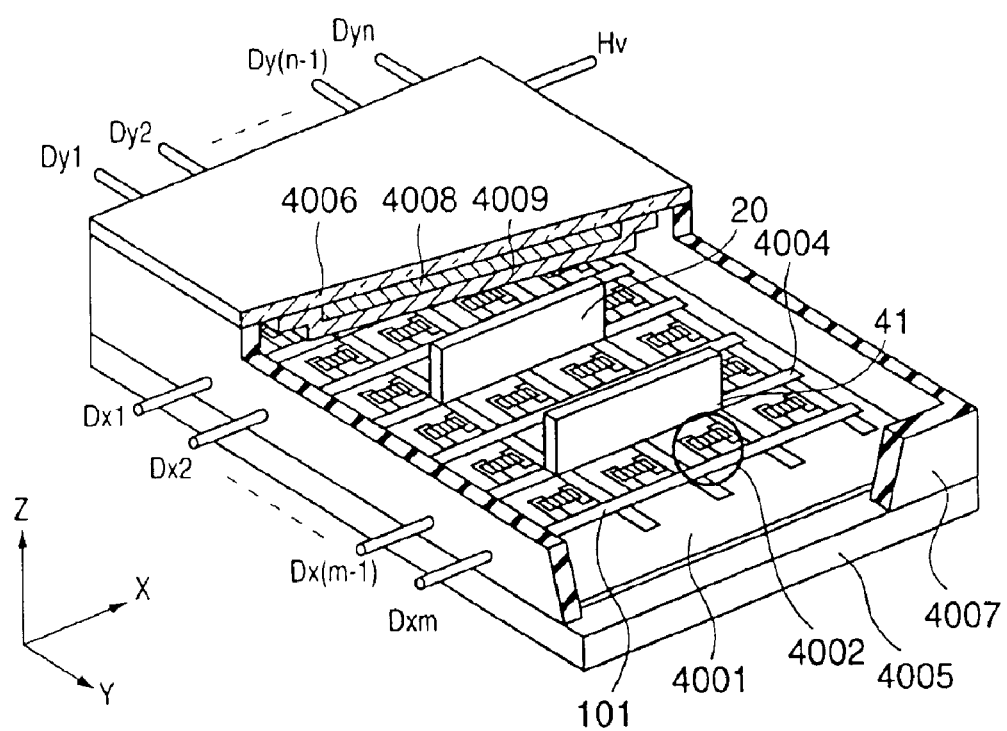
FIG. 21 is a partially cut out perspective view of the image display panel section of the image formation apparatus, another example of the present invention.

In this example, the getter is formed with a length quasi-equal to the length of the spacer, but it is also possible to form the getter in an area without the spacer on the wires on which the spacer is placed. This is shown in FIG. 21. In FIG. 21, the same components as those in FIG. 18 are assigned the same reference numerals. In this display panel example, the spacers 20 are placed at predetermined positions on the surface conduction type electron beam source substrate 4001 on which row-direction wires and column-direction wires are formed. No getter is formed beneath the spacers 20. This example is used when large-capacity getters are required.

EXAMPLE 2

Figure 22:
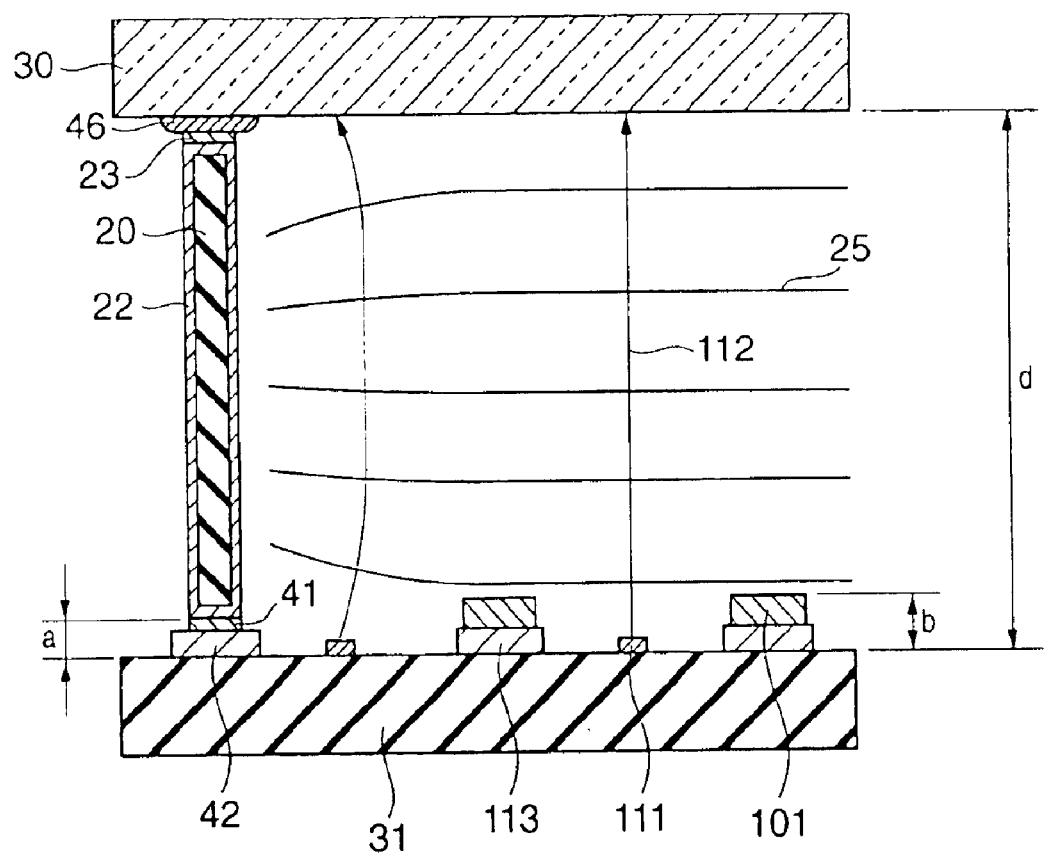
FIG. 22 is a partial cross-sectional view of the image display panel section of the image formation apparatus, another example of the present invention.

A cross-sectional view of the panel of this example is shown in FIG. 22. In this example, the electrode 42 of the spacer 20 on the electron beam source substrate side is only formed on the end face of the spacer and the electron trajectory is adjusted by elevating the height of the wire 42 on which the spacer is placed. The other configurations are the same as those in Example 1.

Here, the method of forming the row-direction wire 42 will be explained. In this example, after forming a column-direction wire (not shown) and insulation layer (not shown) on the electron beam source substrate 31, Ag paste is applied using a screen printing method and the row-direction wire 113 is formed. Furthermore, the row-direction wire 42 connected to the spacer is formed in the same way as for other row-direction wire 113 and then by printing multiple layers only on the wiring section with a different screen. In this example, after each row-direction wire 113 is formed with a thickness of 20 μm, the row-direction wire 42 is formed by applying printing three times more. In this case, an amount of 25 μm adjusted in height is obtained. Moreover, the width of each wire is set to 300 μm. Moreover, the thickness of the spacer 20 is set to 250 μm and the thickness of the spacer electrode 41 formed on the terminal section is set to 1 μm. The electrode is applied to the end face using a dispenser and the spacer electrode 41 is formed by applying Ag paste of approximately 150 μm in width and baking it at 450° C.

In this example, the size of device pitch is set to 680 μm in the row direction and 300 μm in the column direction. "a" and "b" denote heights including the column-direction wire and the thickness of the insulation layer, and in this example, the size of "a" is 95 μm and the size of "b" is 65 μm supposing the thickness of the getter 101 is 35 μm.

EXAMPLE 3

Figure 23:
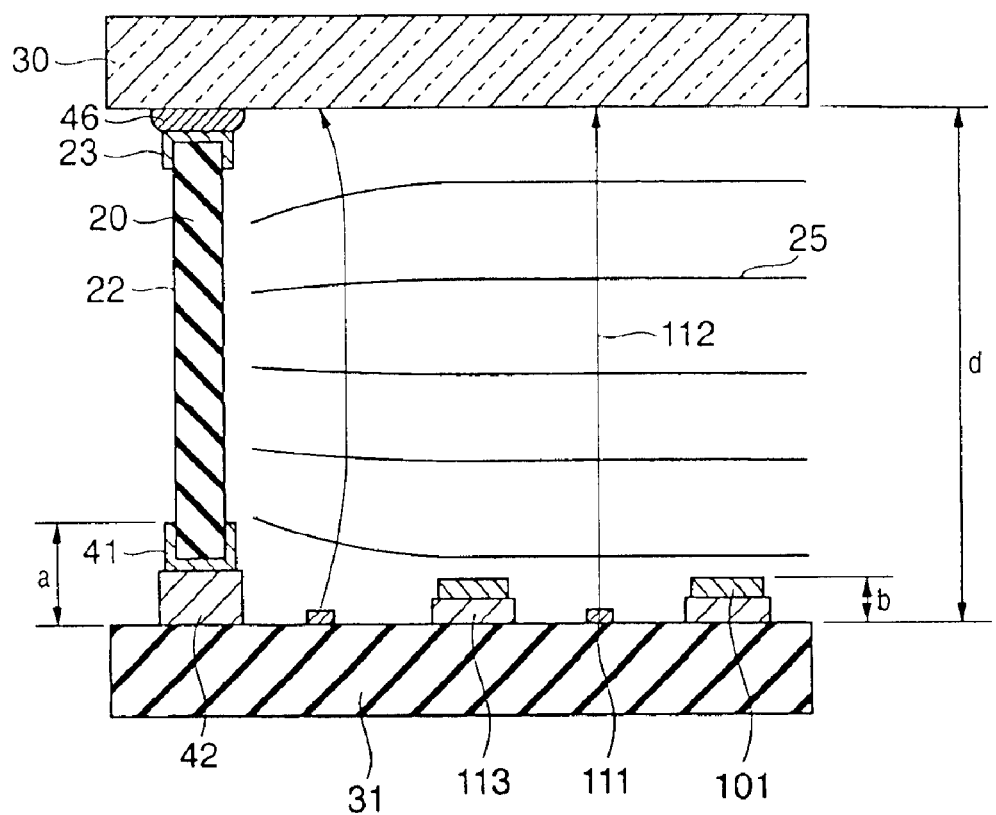
FIG. 23 is a partial cross-sectional view of the image display panel section of the image formation apparatus., another example of the present invention.

FIG. 23 shows an Example 3 of the First Configuration. The configuration of this example is the same as the configuration of the Example 1 except that no high-resistance film is provided on the surface 22 of the spacer 20. In this example, the size of device pitch is set to 800 μm in the row direction and 600 μm in the column direction. The heights of the spacer electrodes 41 and 23 are both set to 180 μm and the size of "a" is set to 230 μm and the size of "b" is 100 μm supposing the thickness of the getter 101 is 50 μm.

EXAMPLE 4

Figure 24:
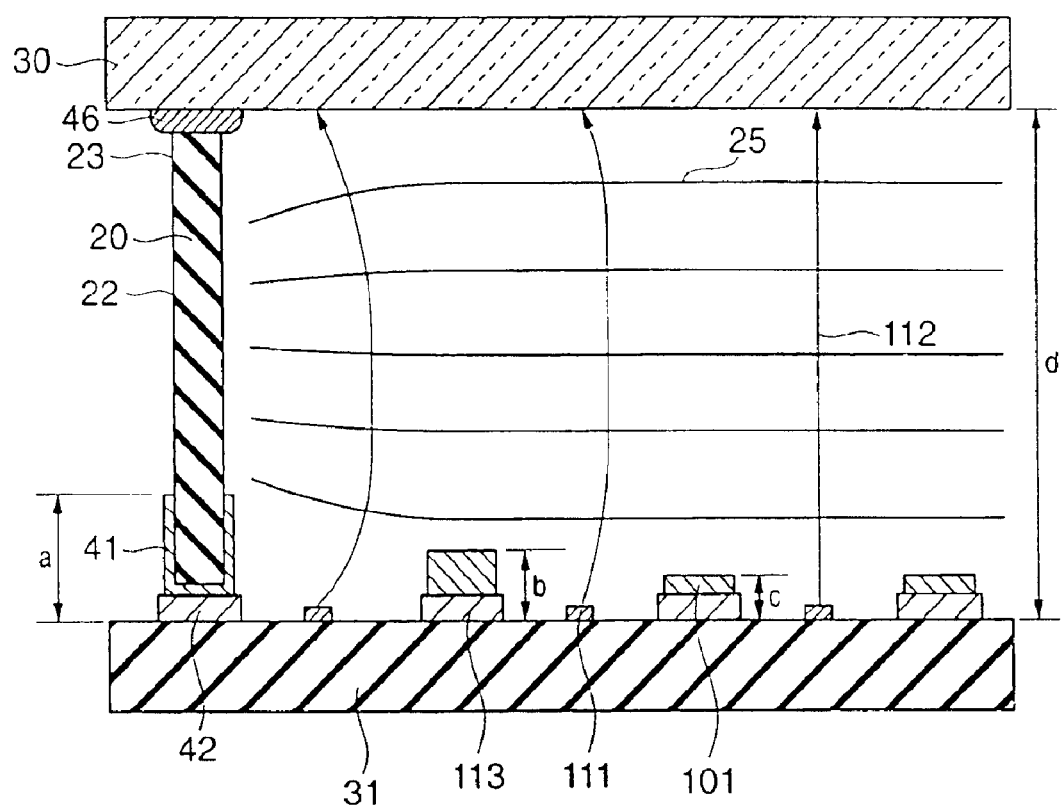
FIG. 24 is a partial cross-sectional view of the image display panel section of the image formation apparatus, another example of the present invention.

FIG. 24 shows an Example 4 of the First Configuration. The configuration of this example is the same as the configuration of the Example 1 except that no high-resistance film and no spacer electrode on the face plate side is provided for the spacer 20. In this example, an insulative frit without conductive fillers is used for the joint section 46. Furthermore, in this example, the thickness of the getter formed on the row-direction wire 113 adjacent to the spacer is greater than other wires. This configuration makes it possible to adjust the electron trajectory of electrons emitted from the electron beam source adjacent to the spacer and the electron beam source adjacent thereto.

In this example, the size of device pitch is set to 800 μm in the row direction and 450 μm in the column direction. The height of the spacer electrode 41 is set to 600 μm and the size of "a" is set to 650 μm and the size of "b" is 150 μm supposing the thickness of the getter adjacent to the spacer is 100 μm and the size of "c" is set to 100 μm supposing the thickness of other getters is 50 μm.

EXAMPLE 5

Figure 25:
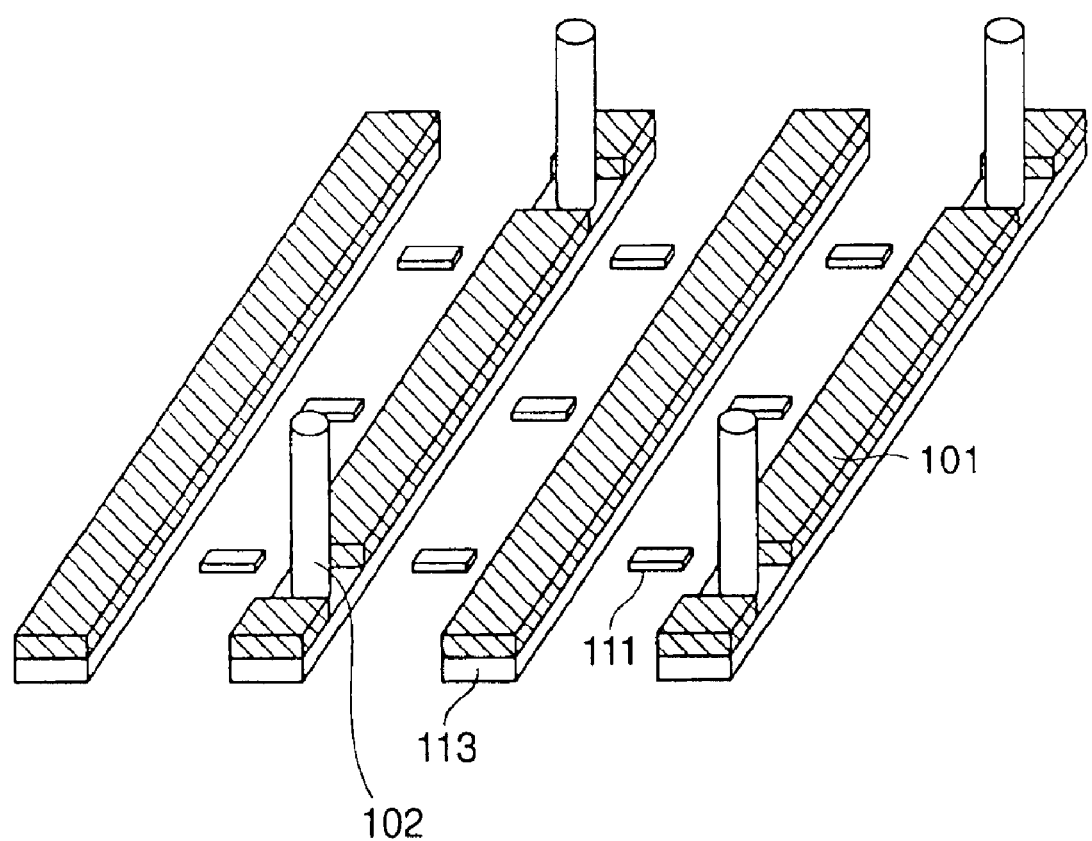
FIG. 25 is a perspective view showing an arrangement structure of spacers used in the image formation apparatus of the present invention.

FIG. 25 shows an Example 5. The configuration of this example is the same as the configuration of the Example 1 except that columnar spacers 102 are used. Though not shown in the figure, the spacers 102 are provided with a spacer electrode and high-resistance film and the spacers are formed as follows:

With regard to the manufacturing method of the spacer electrode, Ag paste is spread to a uniform thickness on a flat plate using a bar coater. Then, the Ag paste, which is an electrode material, is transferred to the column side by pressing the end face of the columnar spacer onto this spread Ag paste. After drying this column at 120° C., the column is turned upside down and the same Ag paste is transferred likewise and after drying, electrodes are formed at the top and bottom of the column by baking for 2 hours at 450° C. Moreover, a high-resistance film is formed on the entire surface of the spacer 102 by applying sputtering similar to that in the Example 1 twice. Other components such as the getter 101 are formed using the same method as that in the Example 1.

In this example, the size of device pitch is set to 550 μm in the row direction and 250 μm in the column direction. The heights of the spacer electrodes (not shown) on the electron beam source substrate side and on the face plate side are both set to 60 μm and the thickness of the getter is set to 40 μm.

When the image formation apparatus has the above configuration in which the panel inner thickness d is 1.4 mm and acceleration voltage is 6 kV, this example can provide an extremely high-quality image with less characteristic deterioration and no color shift.

The above-described First Configuration makes it possible to provide a high-quality image apparatus with less characteristic deterioration with no brightness variation, no color shift by placing getters within the screen area and placing spacers where there is no getter. Furthermore, similar effects can be produced with an electron generation apparatus making up a multiple planar electron beam source without specifying electron beam irradiation targets.

(Second Configuration)

The above-described First Configuration can be further configured as follows.

Figure 27:
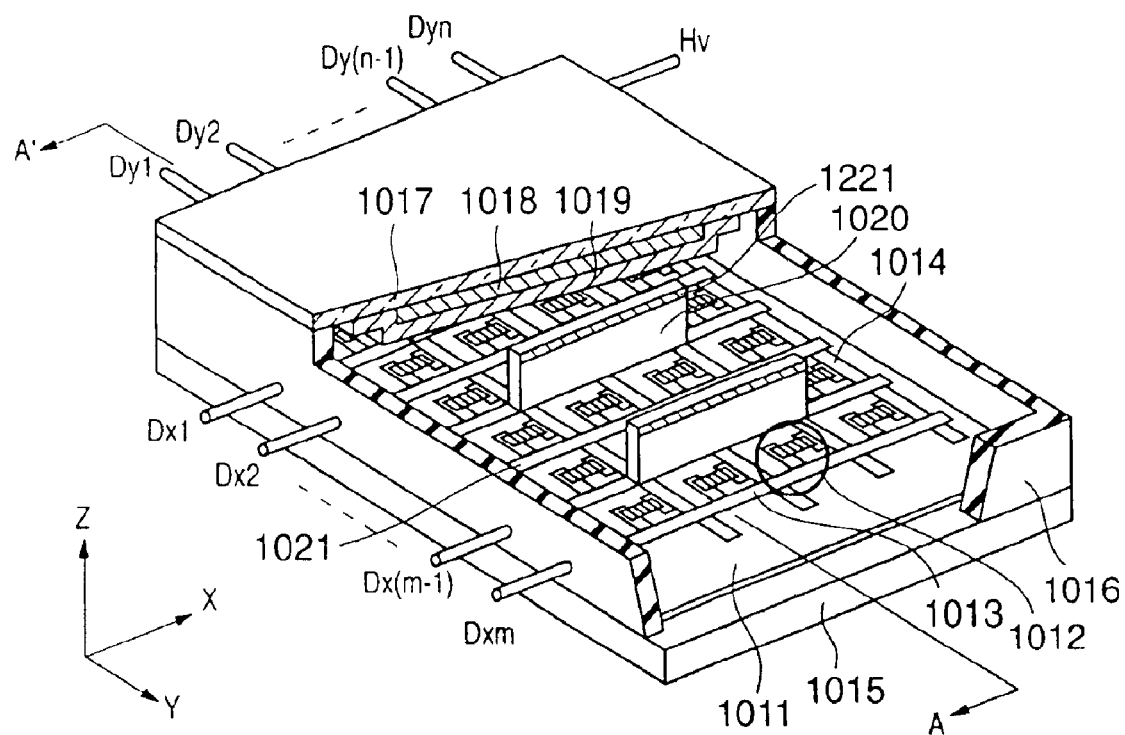
FIG. 27 is a partially cut out perspective view of the display panel section of the image formation apparatus, another example of the present invention.
Figure 28:
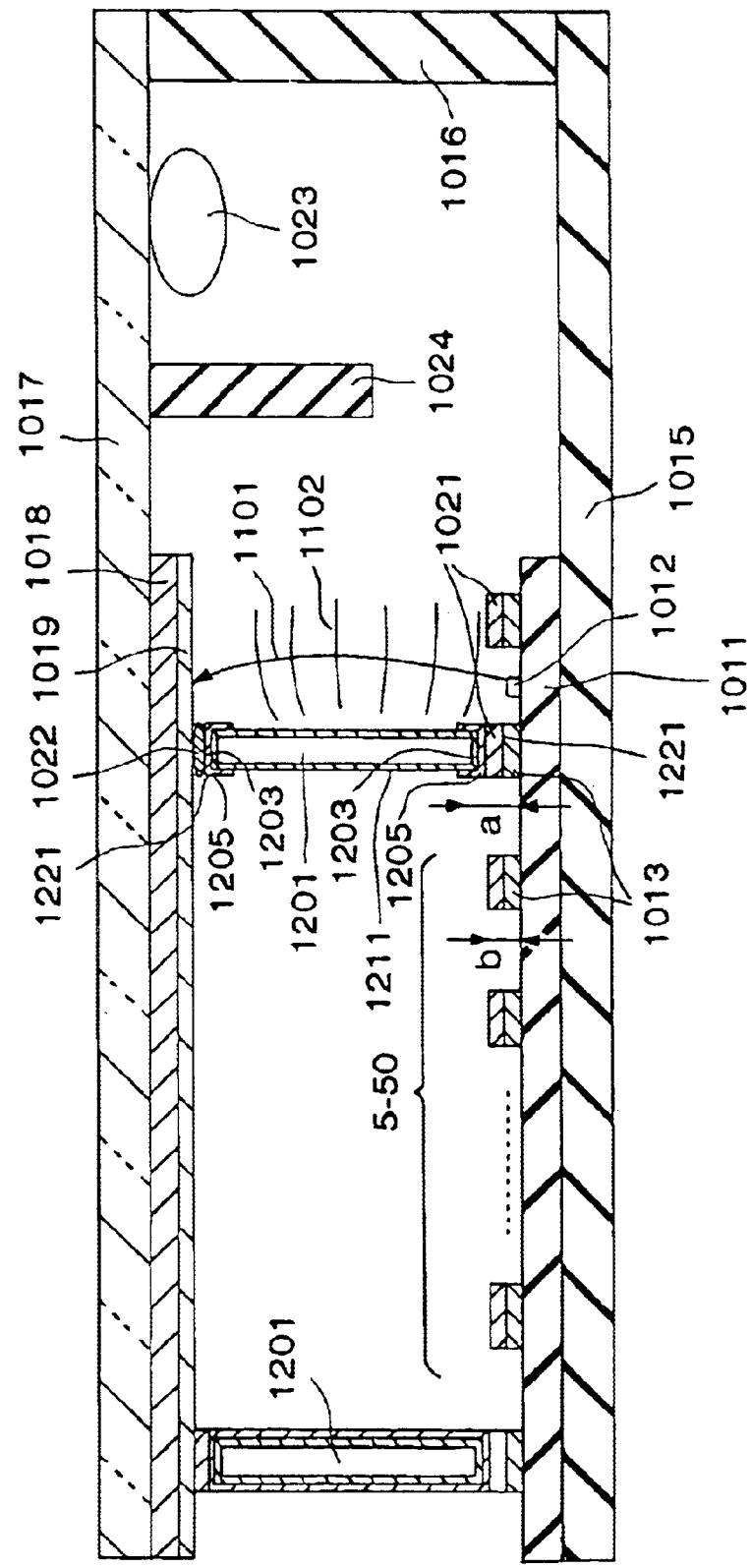
FIG. 28 is an A–A' cross-sectional view of FIG. 27.

FIG. 27 is a perspective view of a display panel to which a Second Configuration of the present invention is applied and part of the panel is cut out to show the internal structure. FIG. 28 is a schematic view of the A–A' cross-section of FIG. 27. In FIG. 28, reference numerals assigned to components are the same as those in FIG. 27. In the Figs, reference numeral 1015 denotes a rear plate; 1016, a side wall (support frame); 1017, a face plate, and the rear plate 1015, side wall 1016 and face plate 1017 form an enclosure (sealed container) to keep the interior of the display panel to a vacuum. Furthermore, the interior of the sealed container is provided with spacers 1020 to support an atmospheric pressure.

A fluorescent material film 1018 and metal backing 1019 are formed on the face plate 1017. A substrate 1011 is fixed to the rear plate 1015 and N×M cold cathode devices 1012, which are wired with M row-direction (X-direction) wires 1013 and N column-direction (Y-direction) wires 1014, are formed on this substrate 1011.

Reference numeral 1021 denotes a non-evaporation type getter formed on the row-direction wire 1013 on which the spacer 1020 is placed; 1022, an adhesive that bonds the face plate 1017 and the spacer 1020 via the metal backing; 1101, an electron trajectory of electrons emitted from the electron emission device 1012 near the spacer; and 1102, equipotential lines near the spacer.

The spacer 1020 is made up of a thin-plate insulative material 1201 coated with high-resistance film 1211, and the side of the spacer contacting the inner side (metal backing 1019) of the face plate 1017 and the side 1203 of the spacer contacting the surface of the substrate 1011 (row-direction wire 1013) are coated with a low-resistance film 1221. The thin-plate spacer 1020 is placed in row direction (X-direction). The high-resistance film 1211 is electrically connected to the row-direction wire 1013 via the low-resistance film 1221 and non-evaporation type getter 1021 on the substrate 1011 side, and electrically connected to the metal backing 1019 via the low-resistance film 1221 and adhesive 1022 on the face plate 1017 side.

It is desirable that at least 5 to 50 row-direction wires be placed between the row-direction wires on which the above-described spacers are placed.

The non-evaporation type getter 1021 and adhesive 1022 have a cushioning function between the wire 1013, metal backing 1019 and spacer 1020 when the spacer 1020 has a mechanical and electrical contact with the wire 1013 or metal backing 1019.

This configuration provides an effect of preventing the extremely thin metal backing 1019 from peeling or being torn, an effect of preventing the resistance of the wire 1013, which is required to have small specific resistance, from increasing due to cracks or an effect of preventing the spacer made of a brittle material from being damaged, etc.

The non-evaporation type getter 1021 and adhesive 1022 can have the above-described cushioning effect for both the face plate 1017 side and the substrate 1011 side that makes up the electron beam source.

Furthermore, the above cushioning effect is naturally effective in an area other than the image display area (e.g., the wire extraction section).

Moreover, from the standpoint of control of the electron trajectory near the spacer, in order to adjust the trajectory of electrons attracted by the positively charged spacer 1020, height "a" of the electrode 1221 formed on the spacer 1020 is set to be greater than height "b" up to the top surface of the getter (up to the top surface of the wire if there is no getter). The size of "a" can be arbitrary selected depending on height "b" up to the top surface of the getter, the structure of the image formation apparatus, drive conditions, antistatic capacity of the high-resistance film, but adjusting the electron trajectory against electrons being attracted to the charged spacer 1020 requires at least a>b. However, under a circumstance under which it is possible to eliminate charging of the spacer, a quasi-equal value can be selected for "a" and "b". It is also possible to select an arbitrary value for height "b" up to the top surface of the getter.

Here, it is desirable that the height of the top end of the electrode 1221 formed for the spacer 1020 exceed the top surface of the electron emission section of the electron emission device. On the other hand, supposing the potential distribution between the potential of the electron emission device when electrons are emitted from the electron emission device and the potential at the acceleration electrode is uniform, it is preferable to control the upper limit of the height of the electrode to such a height that the potential on the acceleration electrode side becomes by 2 kV higher than the potential at the electron emission section. Here, the potential of the electron emission section when electrons are emitted refers to a higher one of the potentials applied to the electron emission section. The electrode 1221 formed on the spacer is not limited to the one that wraps the side of the spacer as shown in FIG. 28, but can also be one that is formed only on the end face that contacts the wire. In this case, the height of the top end of the electrode formed on the spacer above refers to the height of the contacting surface between the electrode and the base formed on the spacer. After such an electrode (resistance film) is formed on the spacer, the above condition is also ideally applicable to a case where a high-resistance film with higher sheet resistance than the electrode is formed.

This configuration makes it easier to form a getter film in the display area of the image formation apparatus without producing disturbance of the electron trajectory near the spacer, providing a high-quality image formation apparatus with less time variation of brightness (reduction with time) and less beam shift. Moreover, the spacer is available in various forms in addition to a tabular form, such as a columnar form. Glass is suitable as the material of the spacer. An appropriate height of the spacer is 0.5 mm to 5 mm.

As shown in FIG. 28, there is a case where an auxiliary getter 1023 is placed in the enclosure as an auxiliary pump to keep the interior of the enclosure to a vacuum. In this case, it is possible to provide a shield 1024 between the auxiliary getter 1023 and the area including the electron emission device 1012, wires 1013 and 1014 and the metal backing 1019 with a film thickness of 500 Å to 5000 Å constituting anode electrode (using a metal film such as aluminum, copper and silver) for the purpose of preventing the getter material from scattering into the image display area, causing electrical short-circuit between the electrodes. If the getter 1021 formed in the image display area alone can sufficiently keep the interior of the enclosure to a vacuum, the auxiliary getter 1023 and shield 1024 need not be formed. The film thickness of the metal backing 1019 is thin enough to allow electrons to penetrate.

EXAMPLE 1

Figure 29:
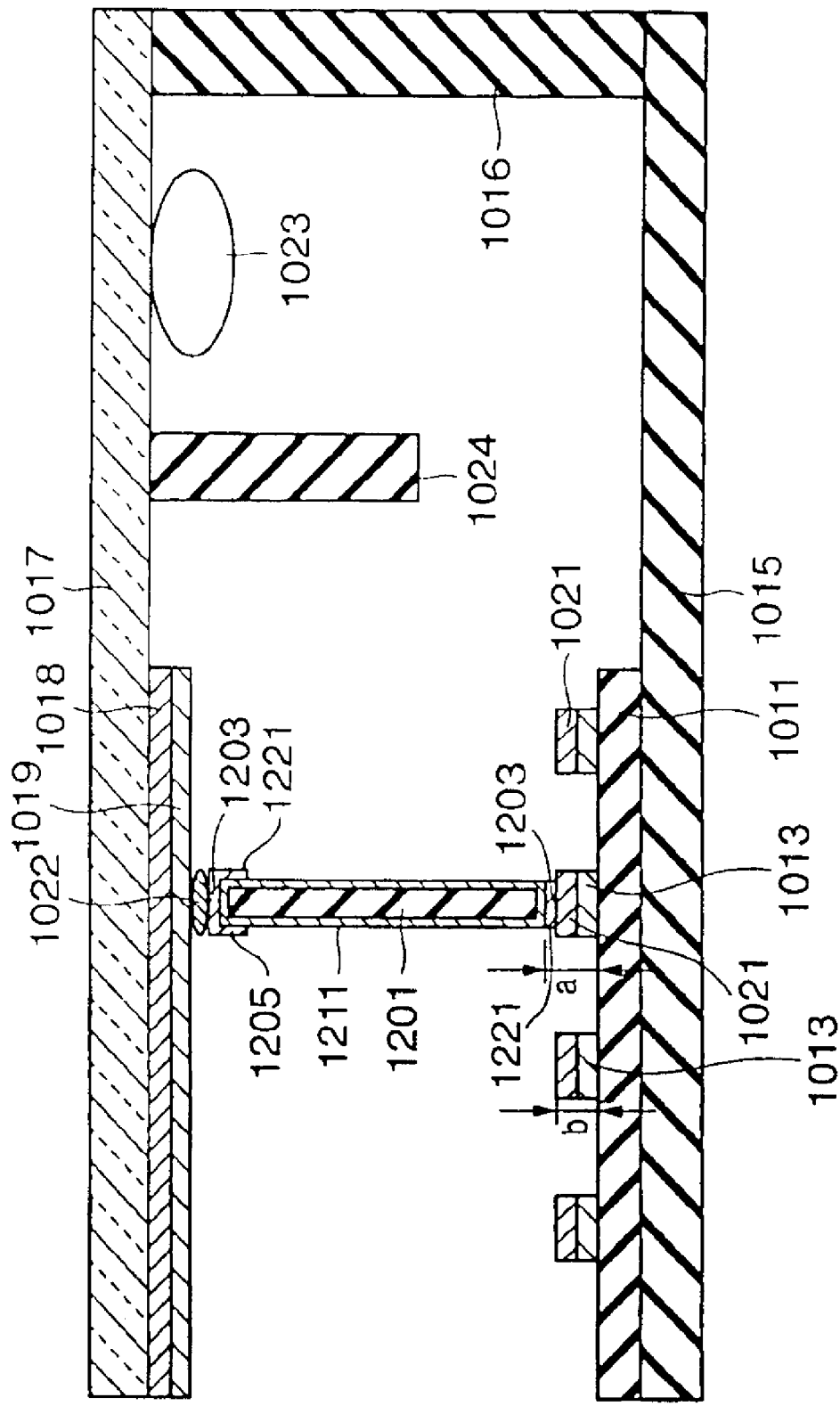
FIG. 29 is a partial cross-sectional view of the display panel section of the image formation apparatus, another example of the present invention.
Figure 30:
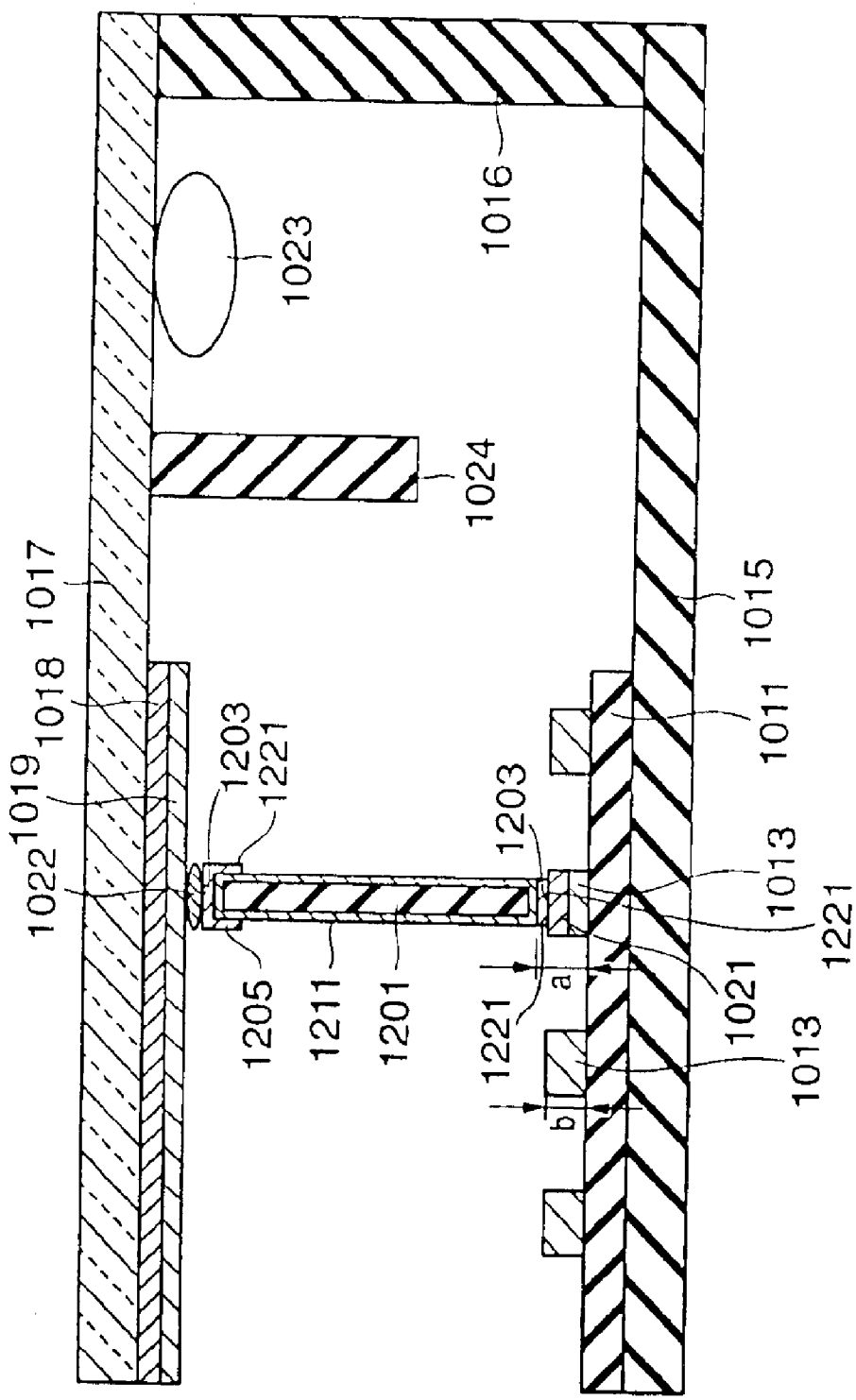
FIG. 30 is a partial cross-sectional view of the display panel section of the image formation apparatus, another example of the present invention.

Here, details of the getter and spacer, which are the most distinctive characteristics of the present invention, will be given. FIG. 29 and FIG. 30 are drawings to explain examples of the Second Configuration described above and are the cross-sectional views of the display panel making up the electron beam apparatus. The low-resistance film 1221 of the spacer 1020 is created with aluminum to a thickness of approximately 0.1 $\mu$m using a mask jig according to a sputtering method and formed on the face plate 1017 side and electron beam source substrate 1011 side. The low-resistance film 1221 on the electron beam substrate 1011 side is only formed on the surface 1203 that contacts the electron beam substrate 1011. Then, as the high-resistance film 1211, a film made of W—Ge alloy nitride is formed to a thickness of approximately 0.2 $\mu$m according to an reactive sputtering method by which a W target and Ge target are sputtered simultaneously in a Ar—$N_2$ mixed gas. At this time, the sheet resistance of the high-resistance film 1211 is approximately the tenth power of 10 [$\Omega$/□]. A study by the authors, et al. confirms that the film of W—Ge alloy nitride with conductivity has an excellent antistatic characteristic.

In this example, the non-evaporation type getters 1021 (200 $\mu$m wide, 40 $\mu$m thick) are formed having the quasi-same length as that of the row-direction wire on all the row-direction wires 1013.

Furthermore, after the column-direction wires (not shown) and insulation layers (not shown) are formed on the electron beam source substrate 1011, Ag paste is applied according to a screen printing method and row-direction wires 1013 (20 $\mu$m thick) are formed in this example. Each wire is formed to a width of 300 $\mu$m. The row-direction pitch of the electron emission device 1012 is set to 630 $\mu$m and the column-direction pitch is set to 305 $\mu$m.

In this example, the spacer 1020 is placed by assembling the electron beam source substrate 1011 and the face plate 1017 after fixing the spacer 1020 to the face plate 1017 with the adhesive 1022. As the adhesive 1022, a spherical glass insulative filler with metal plating applied then scattered into frit glass is used to electrically connect the face plate 1017 and low-resistance film 1221 on the face plate side and to fix the spacer 1020.

EXAMPLE 2

This example adopts a configuration shown in FIG. 14 with the row-direction wires in Example 1 made wider than the column-direction wires. In addition a spacer is placed on the row-direction wires.

Scanning signals are input to the row-direction wires to display images. For this reason, this example uses row-direction wires wider than column-direction wires to reduce the resistance of the row-direction wires. Moreover, it is possible to reduce the precision required for alignment of the spacer compared with Example 1.

As a configuration of fluorescent material films of the face plate of the image formation apparatus formed, this example uses the one shown in FIG. 15. As shown in the figure, each color fluorescent material has an oblong rectangular shape. As an arrangement of three primary colors, fluorescent materials of the same color are placed in the column direction (Y direction in the figure) and fluorescent materials of three primary colors are placed repeatedly in the row direction (X direction) in order of R, G and B. A black matrix is used as the light shield material and the pitch between adjacent fluorescent materials of the same color (Y direction in the figure) is made wider than the pitch between adjacent fluorescent materials of different colors (X direction in the figure) and the same arrangement on the rear plate side is used. That is, the row-direction wires are placed right below the area of the wider light shield materials. Spacers are placed in contact with the area of the wider light shield materials. The rest of the structure is the same as that in the Example 1 of the Second Configuration.

The configuration above can implement an image formation apparatus with a greater area and higher brightness in this example.

(Third Configuration)

The following configuration can be used to fix spacers.

(In the Case of Fixing Spacers to Rear Plate)

On the rear plate, matrix or ladder figured wires are formed to drive devices on the rear plate. When spacers are fixed to the rear plate, the spacers are fixed onto the wires using frit glass, etc. At this time, contact between the spacers and face plate is made via a black stripe.

(In the Case of Fixing Spacers to Face Plate)

When spacers are fixed to the face plate, the spacers are fixed to the black stripe using frit glass, etc. as in the case of the rear plate. Contact between the spacers and rear plate is made via a wire.

(Cross Section of Wire and Black Stripe)

Wires and black stripes are formed using techniques such as printing and photolithography and have a cross section of a fan, semicylindrical or rectangular shape and have contact with spacers at vertices, on a line or plane.

(Allowable Range of Spacer Deviation)

Figure 31:
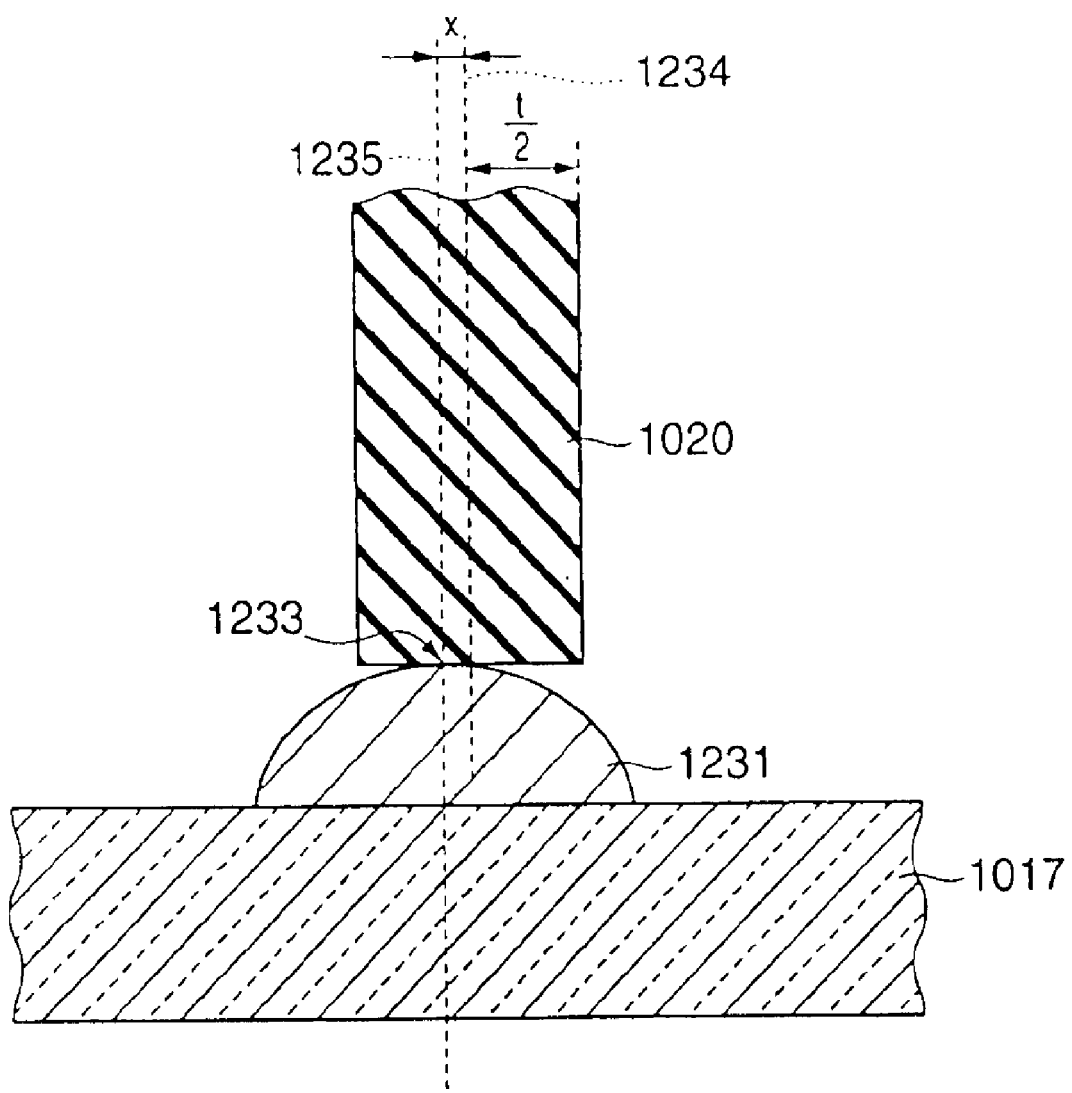
FIG. 31 is a schematic diagram to explain an allowable range of positional deviation of a spacer.

In the case where wires and black stripes have a convex cross section, the spacers are connected to the rear plate or face plate or both via wires and black stripes as described above, but there can be discrepancy in positions between the wires and black stripes on which the spacers are placed and the spacers. As a result, the corner of a spacer may touch the stand depending on the amount of deviation of the spacer, and therefore the allowable range of deviation is set as shown in FIG. 31.

Suppose a deviation between a normal 1235 drawn from a vertex of the stand 1231 placed on the rear plate 1230 (or face plate) (here, a contact 1233 between the spacer 1020 and stand 1231) and the spacer center axis 1234 is x and the thickness of the spacer 1020 is t, and $$x<t/2$$

(Allowable Range of Spacer Inclination)

Figure 32:
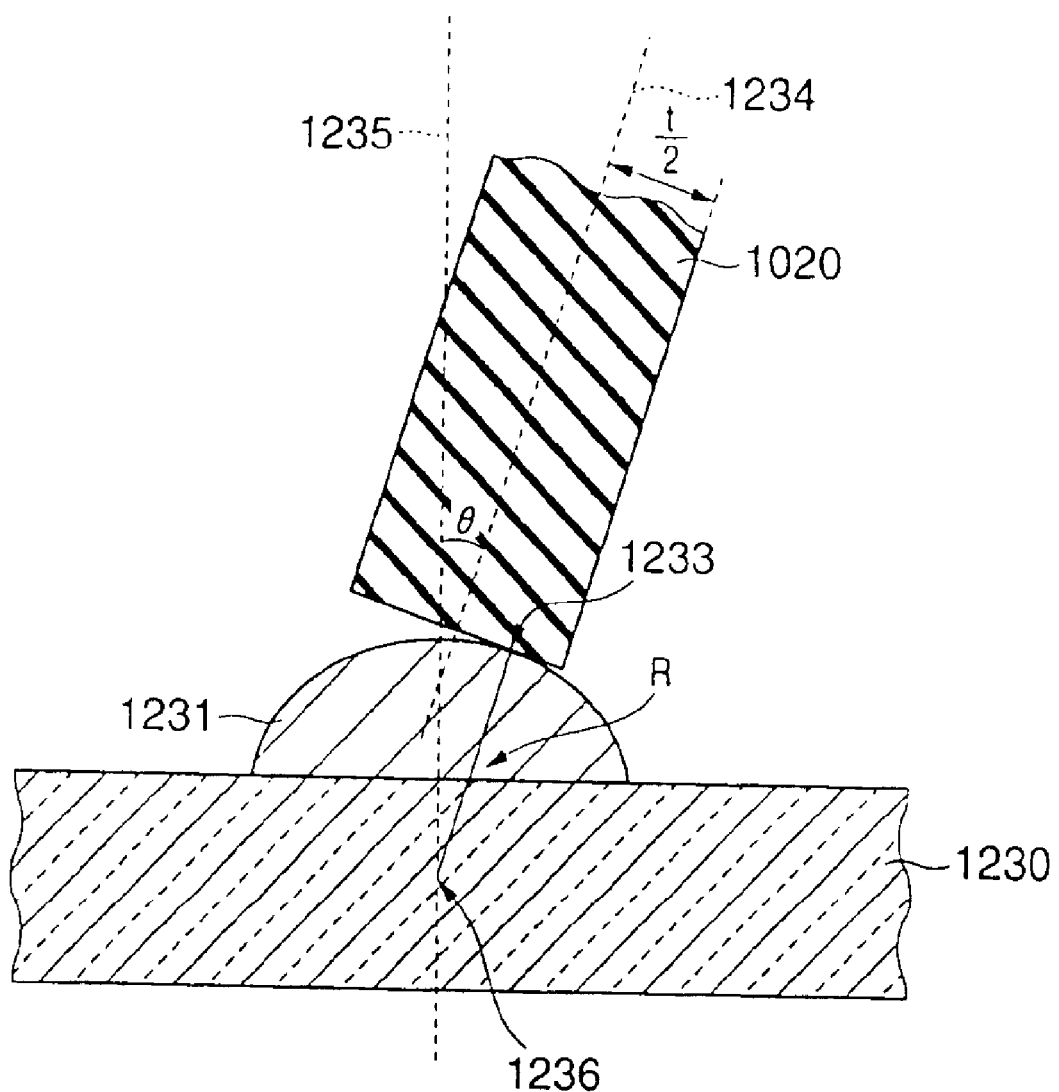
FIG. 32 is a schematic diagram to explain an allowable range of inclination of a spacer.

What matters with the spacer 1020 is not only deviation but also inclination. Certain inclination of the spacer 1020 with respect to the stand 1231 can overload and damage the corners. For this reason, the inclination is limited to within the following allowable range as shown in FIG. 32.

Suppose the thickness of the spacer 1020 is t, radius of curvature of the stand 1231 with a curvature center 1236 is R and the inclination of the spacer 1020 is θ, then, $$R \sin \theta < t/2$$

(Allowable Range of Spacer Deviation and Inclination)

Figure 33:
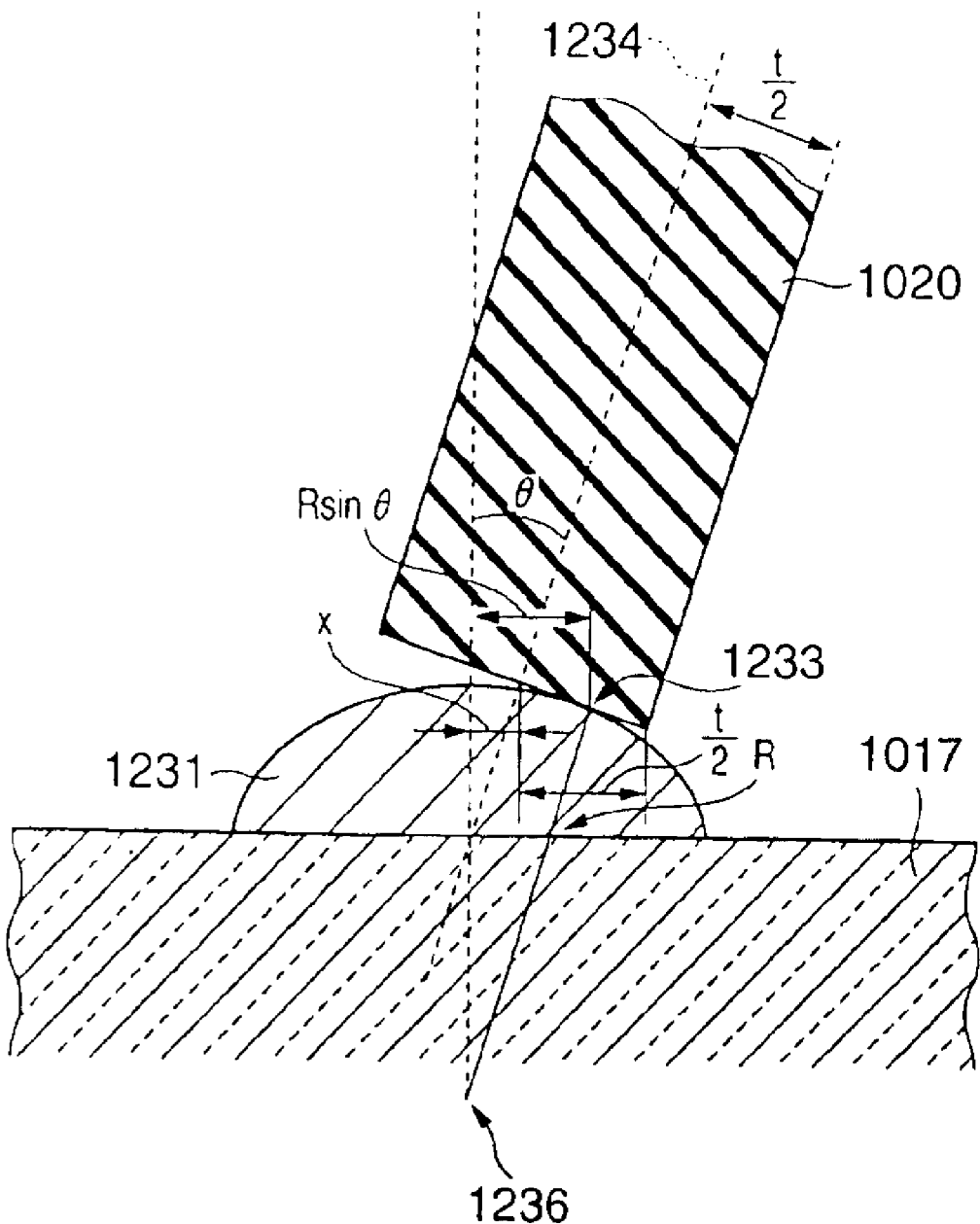
FIG. 33 is a schematic diagram to explain an allowable range of positional deviation and inclination of a spacer.

Moreover, there is a case where both deviation and inclination occur. In such a case, it is desirable to limit the inclination to within the following allowable range as shown in FIG. 33.

Suppose the thickness of the spacer 1020 is t, radius of curvature of the stand 1231 with a curvature center 1236 is R and the inclination of the spacer 1020 is θ, and the direction of inclination of the spacer 1020 with respect to the plane of the face plate 1017 (or rear plate) is the X-axis and deviation of the spacer 1020 on the stand 1231 is x. When a contact 1233 between the spacer 1020 and the stand 1231 is greater along the X-axis direction than the center of thickness of the spacer 1020, if $$R \sin |\theta| < x + t/2$$

then, the spacer corner does not contact the stand.

Figure 34:
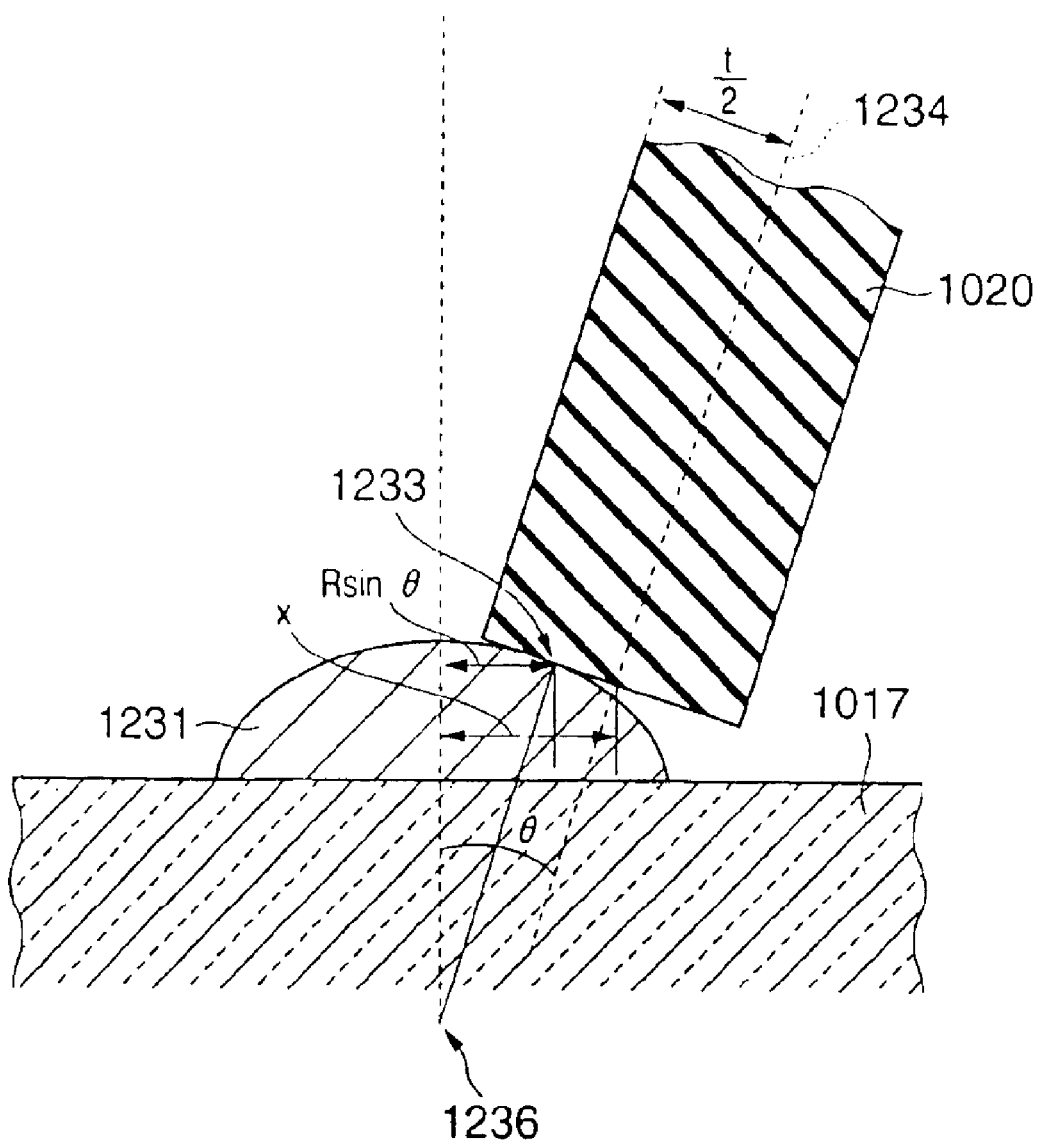
FIG. 34 is a schematic diagram showing an example of an allowable range of positional deviation and inclination of a spacer.

Suppose the thickness of the spacer 1020 is t, radius of curvature of the stand 1231 is R and the inclination of the spacer 1020 is θ, and the direction of inclination of the spacer 1020 with respect to the plane of the rear plate 1230 is the X-axis and deviation of the spacer 1020 on the stand 1231 is x. When the contact 1233 between the spacer 1020 and the stand 1231 is between the center of thickness of the spacer and a vertex of the stand 1231, if $$R \sin |\theta| > x - t/2$$

then, it is possible to avoid the spacer corner from touching the stand (see FIG. 34).

(Providing R for Spacer)

In addition to suppressing deviation and inclination of the spacer 1020, it is also possible to round the corner of the spacer 1020 and reduce concentration of load. It is desirable that R of the corner of the spacer 1020 be at least 10 μm and it is desirable to use appropriate R according to the strength of the spacer 1020, width and curvature of the wires and the black stripe, etc.

(Stand Having Flat Area Wider than Spacer)

Figure 36:
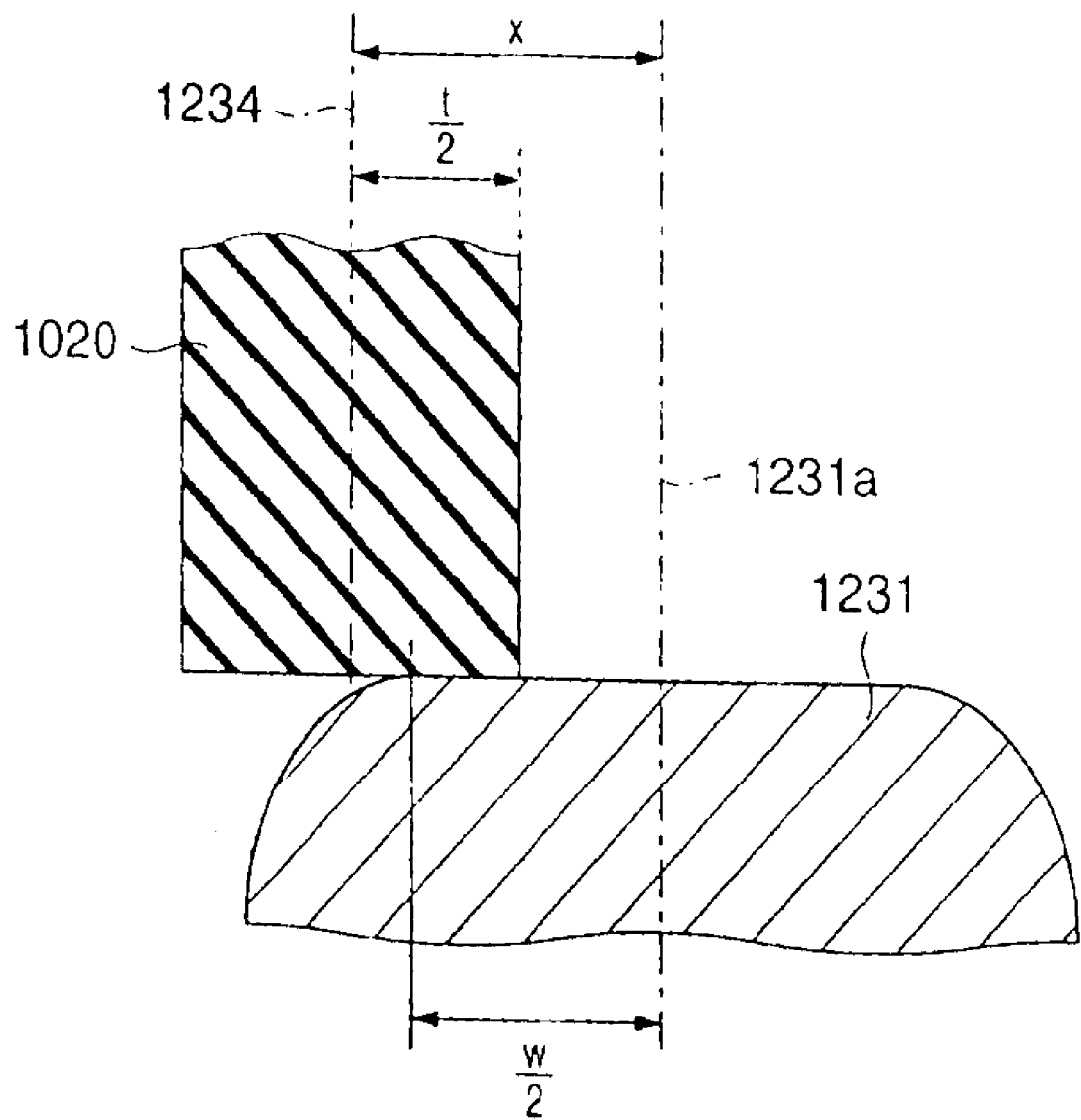
FIG. 36 is a schematic diagram to explain an allowable range of positional deviation of a spacer in the case of a stand having a flat surface wider than the spacer.

In the case of the stand 1231 with the flat area that contacts the spacer 1020 having a wider surface than the spacer 1020, suppose the thickness of the spacer 1020 when the spacer 1020 is placed perpendicular to the stand is t, deviation of the spacer 1020 is x and width of the flat area of the stand 1231 is w. If the center of the spacer 1020 is deviated from the stand 1231, it is possible to suppress interference between the corner of the spacer 1020 and the stand 1231 under the following condition (see FIG. 36).

$$x < w/2 + t/2$$

It is possible to suppress damage of the spacer due to an atmospheric pressure by satisfying the above-described conditions.

Examples of the above-described Third Configuration will be shown below.

EXAMPLE 1

Setting Tolerance of Tilt and Positional Deviation

In this example, the above mentioned display panel shown in FIG. 27 was produced.

(1) Producing Electron Source First, the row direction wiring 1013, the column direction wiring 1014, the interelectrode insulating layer, the device electrode of the surface conductive electron emission device 1012, and the conductive film were formed on the substrate 1011 (refer to FIG. 27).

(2) Producing Spacer Substrate

Then, a spacer 1 (40 mm×2 mm×0.2 mm) made of an insulating material of soda-lime glass was produced.

(3) Forming High Resistance Film and Electrode Film of Spacer

In the four areas (the top and reverse sides of each of the 40×2 and 40×0.2 areas) in the image area of the air-tight container on the surface of the spacer was formed a high resistance film 1211 described later, and a conductive film was formed on the two areas (both sides of 40×0.2) touching the face plate and the rear plate, and on the area (40×0.1) at the height of up to 0.1 mm from the side touching the face plate and the rear plate of the 40×2 areas. As a high resistance film, a Cr—Al alloy nitride film (200 nm thick, approximately $1 \times 10^9 [\Omega/\square]$) formed by simultaneously spattering the Cr and Al targets using high frequency power supply was used. The conductive film was used to ensure the electric connection between a high resistance film formed by a spacer and a face plate, and between a high resistance film and a rear plate, and was also used to control the electric field around the spacer and to control the orbit of the electron beam from the electron emission device.

(4) Assembly of Face Plate and Spacer

Figure 37:
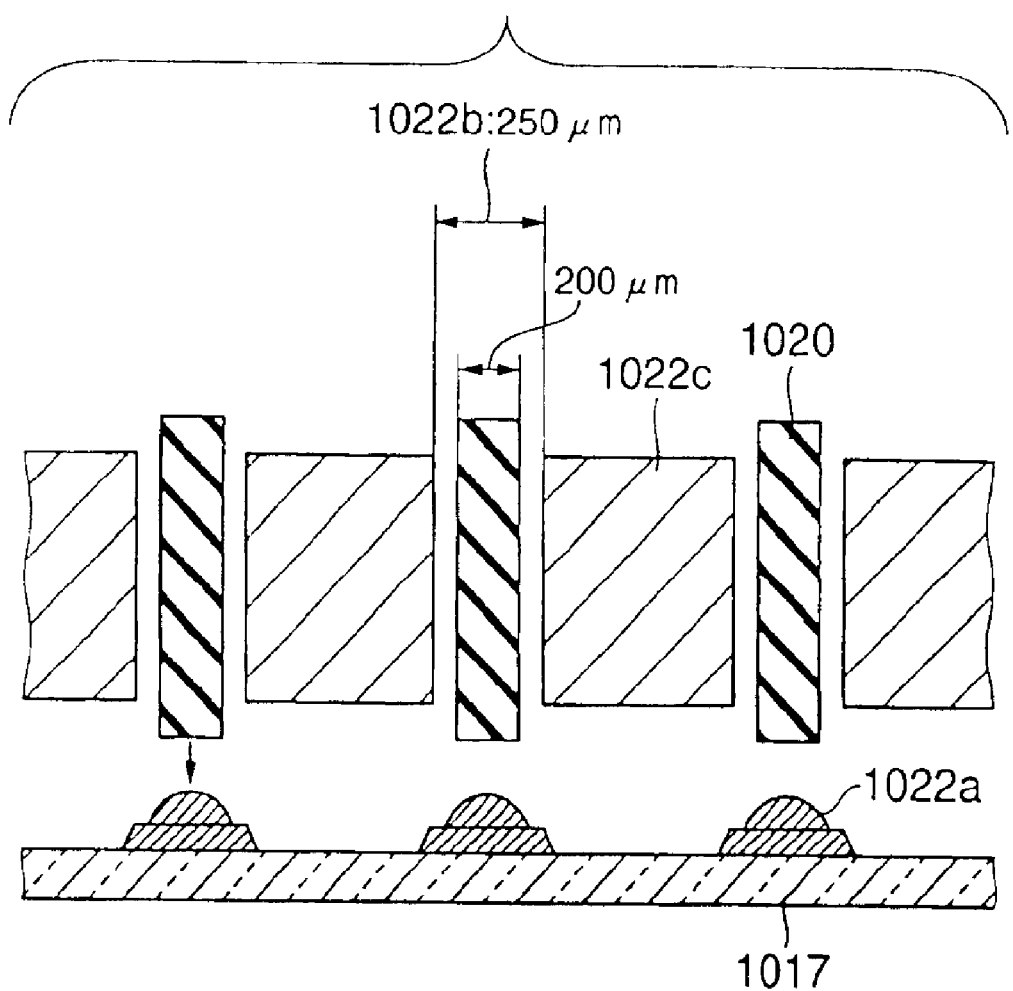
FIG. 37 is a schematic diagram showing an example of assembling a spacer onto the face plate.

The process of assembling a face plate and a spacer will be described below by referring to FIG. 37. A frit 1022a was applied to the portion where the spacer 1020 was to be placed on the face plate 1017. Then, at the place where the spacer 1020 was to be placed, a jig 1022c having a groove 1022b a little larger than the spacer was aligned with the face plate 1017. Then, the spacer 1020 was inserted in the groove 1022b of the jig 1022c, and a heating process was performed to fix the spacer 1020 by the frit 1022a. The groove of the jig used here was set to 250 μm wide in consideration of the width of the spacer, the thickness of the film on the surface of the spacer, etc.

(5) Face Plate and Rear Plate Sealing

Next, the face plate 1017 to which the spacer was fixed was fixed to the rear plate 1015. The frit glass was applied to the joint portion between the rear plate 1015 and the side panel 1016, and the joint portion between the face plate 1017 and the side panel 1016. Then, the rear plate 1015 was applied to the face plate 1017 through the side panel 1016, and sealed thereto by baking them at the temperature of 400° C. to 500° C. in the atmospheric pressure for 10 minutes or more.

(6) Relationship Between Fixed Rear Plate and Spacer

Figure 38:
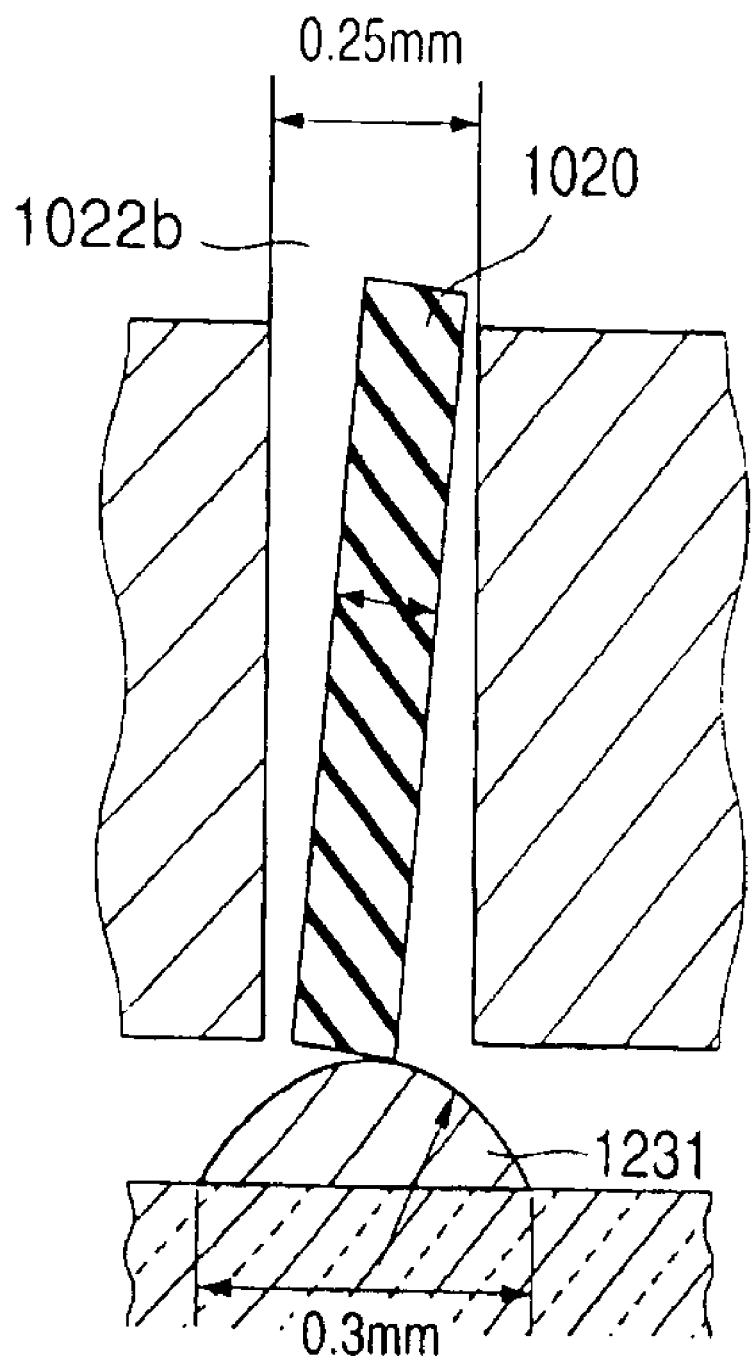
FIG. 38 is a schematic diagram showing a range of inclination of a spacer.

In this present embodiment, as shown in FIG. 38, the spacer 1020 is 0.2 mm thick and 2 mm high, the groove 1022b of the jig is 0.25 mm wide, the wiring of the rear plate 1015 is 0.3 mm wide, and the curvature of the wiring is R=0.5 mm. Therefore, the maximum deviation of the spacer 1020 is 0.025 mm, and the maximum tilt is 0.025 rad. Since the tilt is 0 with the maximum deviation, x<t/2 is satisfied. With the maximum tilt, $R \sin |\theta| < x + t/2$ is satisfied on the condition that the contact portion between the spacer and the setting stand is larger in the x axis direction than at the center of the thickness of the spacer. Therefore, the corner of the spacer does not touch the wiring.

(7) Electron Source Process and Sealing

The airtight container completed as described above was exhausted by a vacuum pump through an exhaust pipe, and after a sufficient vacuum level was reached, power was supplied to each device through the row direction wiring electrode 1013 and the column direction wiring electrode 1014 via external container terminals Dx1 to Dxm and Dy1 to Dyn, to perform the above mentioned electrification forming and activating processes, thereby producing a multi-electron beam source. Then, at the vacuum level of approximately $1 \times 10^{-6}$ [Torr], the exhaust pipe not shown in the attached drawings was fused by heating it by a gas burner, thereby to seal the housing (airtight container). Finally, to maintain the vacuum after the sealing, a getter process was performed.

(8) Image Forming

In the display panel completed as described above, an electron was emitted by applying a scan signal and a modulation signal by the signal generation means not shown in the attached drawings to each of the cold cathode devices (surface conductive electron emission devices) 1012 through the external container terminals Dx1 to Dxm and Dy1 to Dyn, and high voltage was applied to the metal backing 1019 through the high voltage terminal Hv, thereby accelerating the emission electron beam so that, an electron bombard against the fluorescent film 1018, and a fluorescent material of each color was excited and emitted light. Thus, an image was displayed. The voltage Va applied to the high voltage terminal Hv was 3 [kV] to 10 [kV], and the voltage Vf applied to each of the wirings 1013 and 1014 was 14 [V].

At this time, emission spots in a string were arranged at equal intervals in a two-dimensional array including an emission spot by an electron emitted from the cold cathode device 1012 near the spacer 1020, thereby displaying a clear and easily reproducible color image.

As described above, the maximum values of the position deviation and the tilt of the spacer on wiring were set, and the assembling process was performed in the set range, thereby avoiding the damage of the spacer by the atmospheric pressure without the corner of the spacer touching other portions.

EXAMPLE 2

Figure 39:
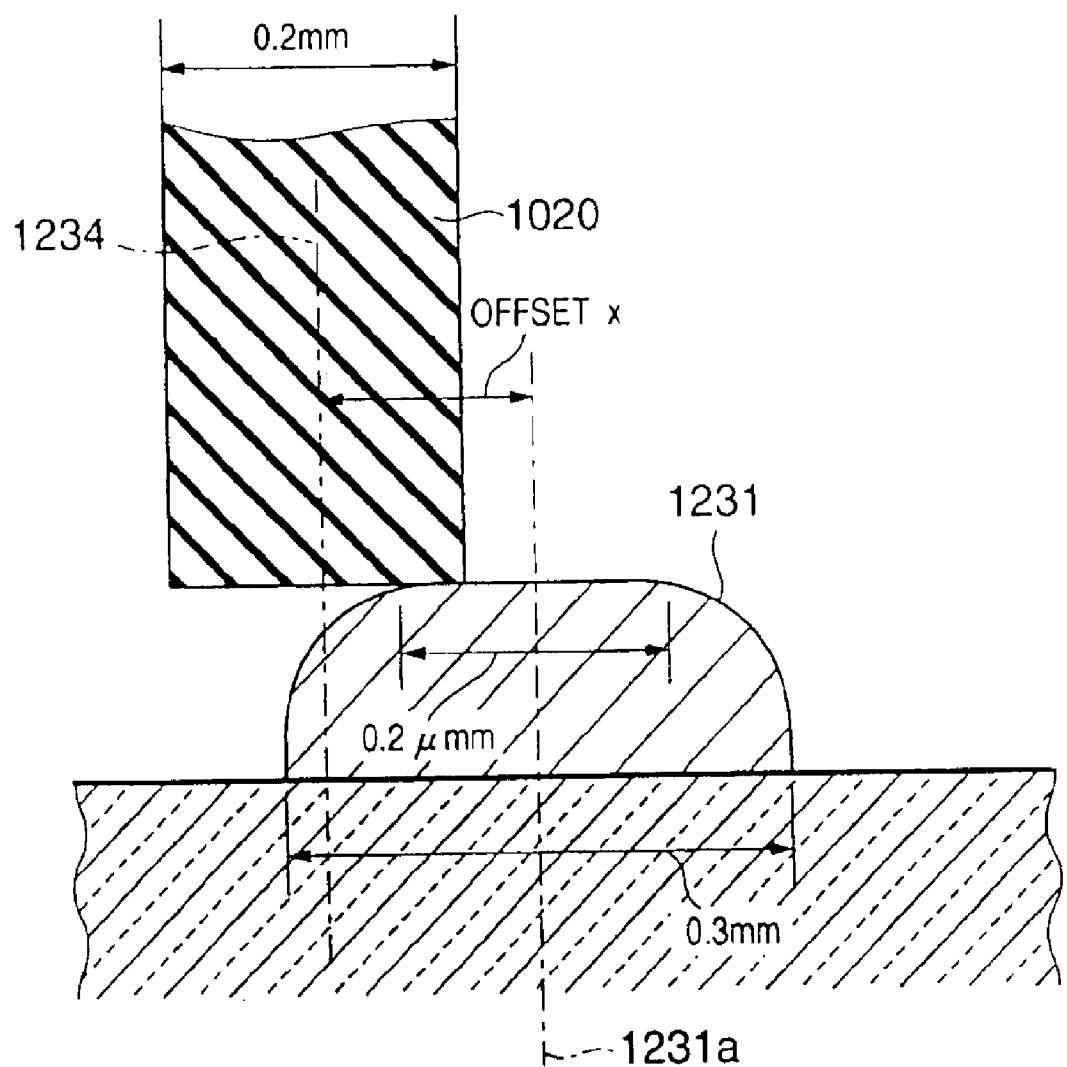
FIG. 39 is a schematic diagram showing a placement example of a spacer on a wire with a flat surface wider than the spacer.

Wiring Having an Area Wider than Spacer) As shown in FIG. 39, the arrangement of a spacer on the wiring having an area wider than the spacer will be described according to this example. The conditions of the spacer and the assembling process are the same as those of the first example of the third configuration described above. That is, in this example, the spacer 1020 is 0.2 mm thick and 2 mm high, the groove of the jig is 0.5 mm wide, and the wiring of the rear plate is 0.3 mm wide, the plane of the wiring is W=0.2 mm wide (allowance of the deviation of the spacer). The conditions satisfy x<W/2+t/2. Therefore, the damage of the spacer by the atmospheric pressure can be avoided without the corner of the spacer touching other portions.

As described above, since the display panel to which the conditions based on the present invention were applied did not damage the spacer, the strength of the structure could be prevented from being lowered, thereby successfully maintaining the vacuum level. As a result, a high-quality image could be displayed with high luminous intensity.

(Fourth Configuration)

The inside of the display panel can also be configured as follows.

Figure 40C:
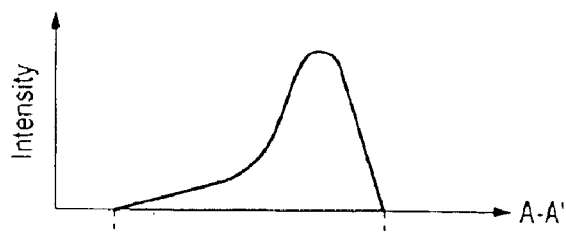
FIG. 40c is an intensity distribution diagram showing an intensity variation on an A–A' cross-section of FIG. 40b.
Figure 40B:
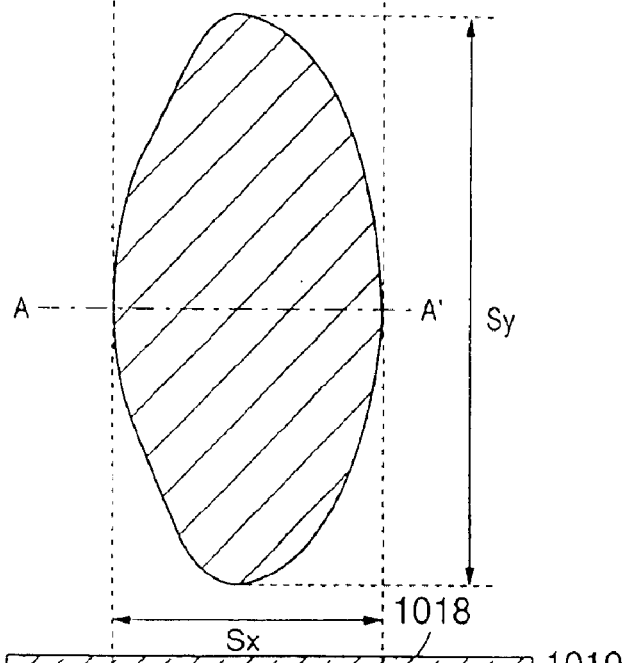
FIG. 40b is a schematic diagram showing the shape of an electron beam on the anode substrate of the electron beam emitted from a surface conduction type electron emission device.
Figure 40A:
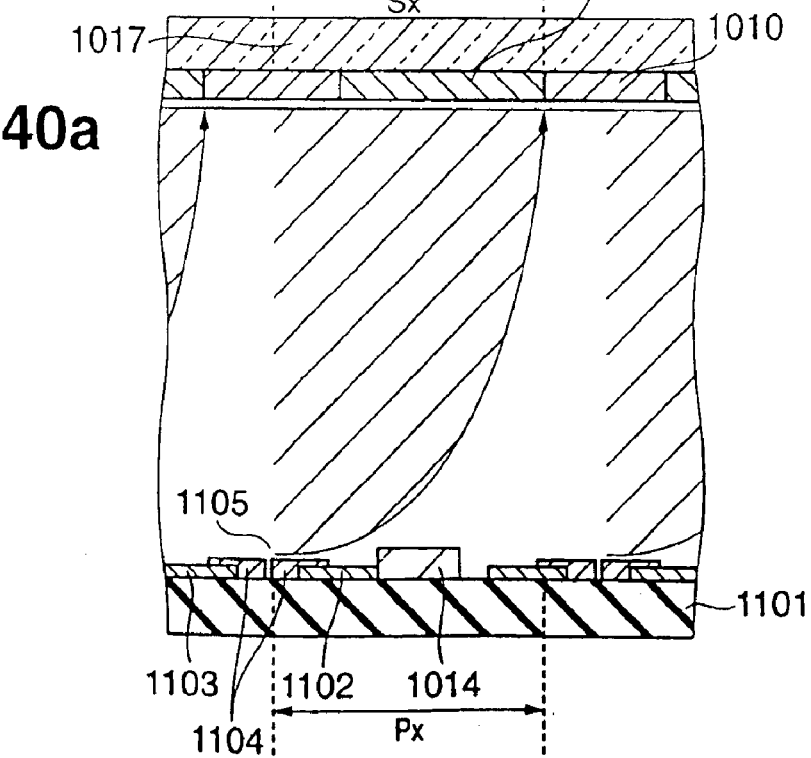
FIG. 40a is a cross-sectional view of a cathode substrate and anode substrate.

This configuration can also be basically designed as described above by referring to FIG. 27. The electron beam emitted from the surface conductive electron emission device in the configuration of the inside of the display panel of the image display device to which the present configuration is applied takes the orbit as shown above in FIG. 23. FIG. 40a is a schematic sectional view of a type of cathode substrate and anode substrate. FIG. 40b shows a type of the shape of an electron beam on the anode substrate of the electron beam emitted from the surface conductive electron emission device. FIG. 40c shows the distribution of the intensity along A–A' shown in FIG. 40b.

Each electron emission device is arranged in a matrix in the row direction and the column direction at intervals of Px and Py, and the voltage application direction is parallel to the row direction. In the example shown in FIG. 40, Vf is applied with the electrode 1102 set as a high potential side. The beam radii Sx and Sy on the anode substrate of the electron beam emitted from the electron emission device (device length: L) satisfy the following relation equations (I) and (II).

$$Sx = Kx \times 2d \ (Vf/Va)^{1/2} \ [Kx: 0.8 \leq Kx < 1.0] \quad \text{(I)}$$

$$Sy = L + 2Ky \times 2d \ (Vf/Va)^{1/2} \ [Ky: 0.85 \leq Ky \leq 0.9] \quad \text{(II)}$$

where the distribution of the strength of the electron beam is biased toward the high potential side in the voltage application direction as shown in FIGS. 40B and 40C, and the shape of the beam is oval having higher intensity at a farther portion from the electron emission unit. Therefore, to maximize the amount of emission of an electron beam to a fluorescent object with high uniformity, the positional relationship between the source of an electron and the corresponding fluorescent object can be optimized by setting the electron emission unit at a distance of Sx from the farther end of the corresponding fluorescent object from the electron emission unit. Thus, although a part of the emitted electron is rejected by a black stripe 1010, the amount of electron for the fluorescent object can be maximized. As a result, high intensity can be obtained, the fluctuation from positional deviation can be lower, and the uniformity can be enhanced.

A cylindrical spacer is mounted on the black stripe by setting the positional relationship between the source of an electron and a corresponding fluorescent object as described above. With the configuration, the cylindrical spacer does not interferes the emission of light. Therefore, a high quality image can be displayed.

(Position and Shape of a Cylindrical Spacer)

Figure 41A:
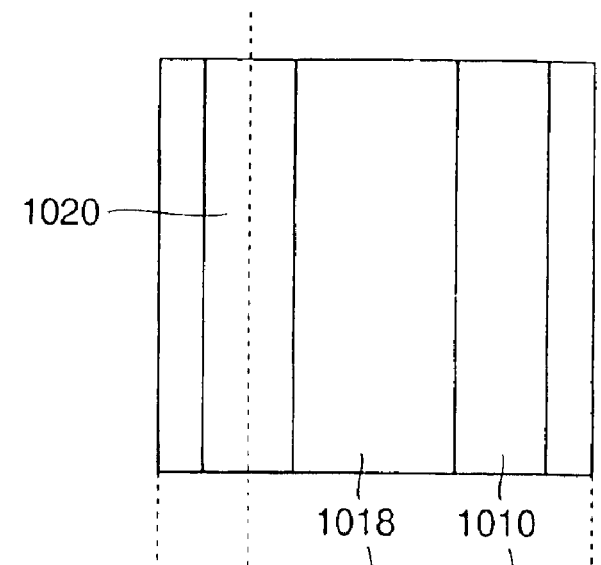
FIG. 41a is a top view of the anode substrate.
Figure 41B:
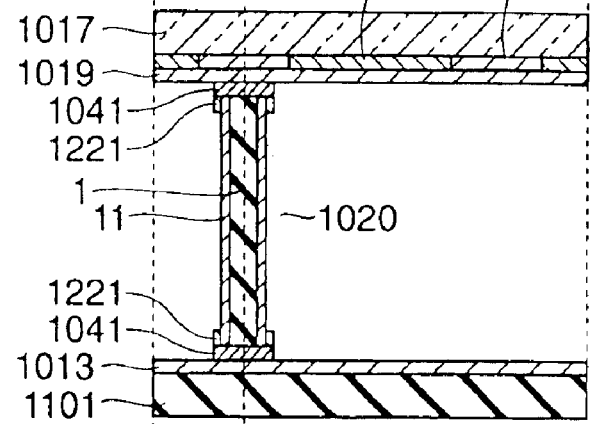
FIG. 41b is a side view of the interior of the image formation apparatus, another example of the present invention.
Figure 41C:
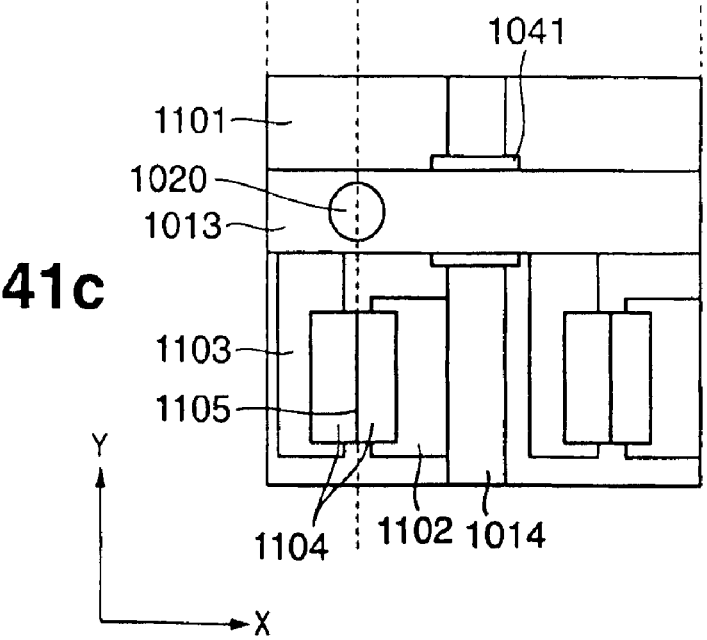
FIG. 41c is a top view of the cathode substrate.

The position of a cylindrical spacer is described below by referring to FIG. 41. FIG. 41a is a top view of an anode substrate. FIG. 41b is a side view of the inside of the image forming device. FIG. 41c is a top view (vacuum side) of a cathode substrate. In this example, the spacer 1020 is a cylindrical spacer, and is arranged at a non-emission position of a primary electron beam emitted from the electron emission unit. Practically, the electron beam emitted from the electron emission unit reaches an anode substrate while being biased toward a high potential side in the voltage application direction and gradually spreading in the vacuum. Therefore, the cylindrical spacer is not directly exposed to the primary electron beam if it is arranged at a position where no electron beams are emitted on the anode substrate. Therefore, the influence of the electron beam on the cylindrical spacer can be minimized. With the configuration, the spacer does not affect a displayed image, thereby realizing a high quality image. The non-emission position of a primary electron beam emitted from the electron emission device is located at a substantially central position between electron emission devices adjacent to each other in the Y direction. Especially when the position is at an equal distance from the devices, it is a desired position in realizing high precision.

If the position is on the line of two electron emission devices adjacent in the Y direction, the cylindrical spacer is located between two electron beams emitted from the electron emission devices adjacent in the x direction. Therefore, the spacer can be mounted without interfering any electron beam although it is encompassed by four electron beams. With the configuration, the influences of charging by electron beams can be minimized, thereby improving the yield of the spacer. Furthermore, the equalization in intensity among picture elements can be improved, and a high quality image can be displayed.

There is a black stripe 1010 on the anode substrate immediately above the electron emission unit 1105, and the cylindrical spacer 1020 is mounted on the anode substrate and the black stripe 1010. Thus, the cylindrical spacer 1020 is connected to the anode substrate through the black stripe 1010, and to the cathode substrate through an X direction wiring. The connection is not viewed from outside, but firmly fixed. Furthermore, the a small electric current flowing through the antistatic high resistance film can be discharged when it is formed on the surface of the spacer. As a result, the cylindrical spacer does not affect an image, thereby providing a high quality image.

Figure 42A:
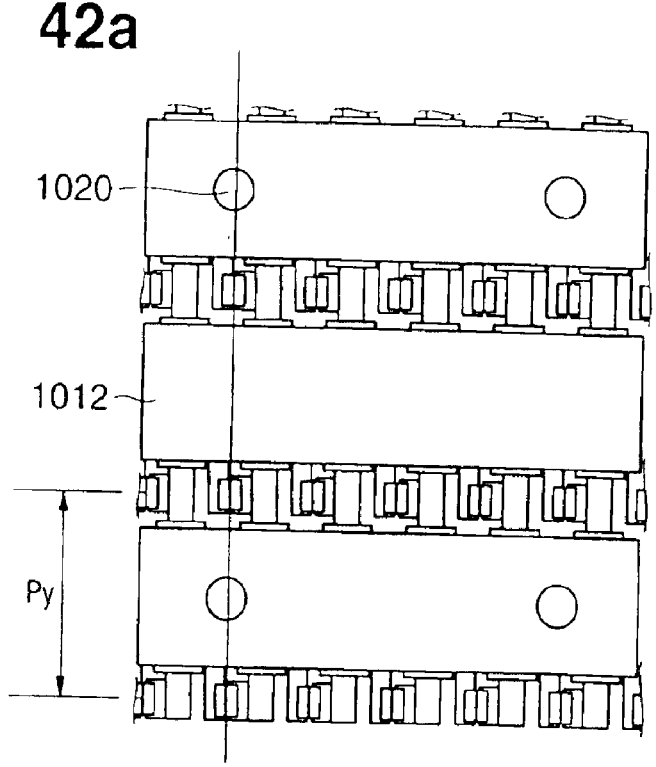
FIG. 42a is a top view of the cathode substrate.
Figure 42B:
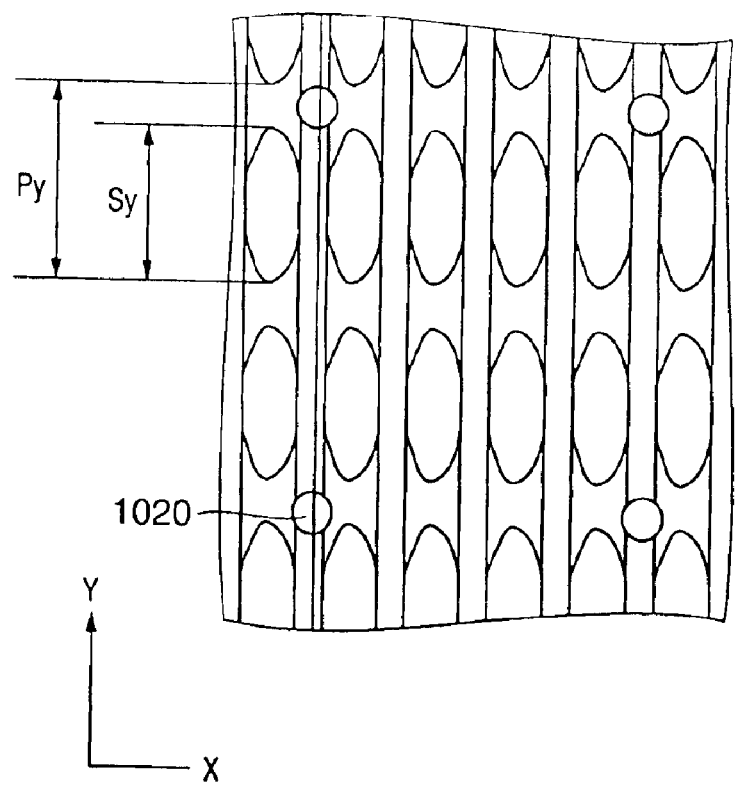

FIG. 42 shows a case in which the interval Py of the electron emission devices adjacent in the Y direction is larger than the Y direction beam radius Sy of the electron beam on the anode substrate. FIG. 42a is a top view of the cathode substrate, and shows a multi-electron source. FIG. 42b shows a type of the appearance of the visible light when the electron beam emitted from the multi-electron source shown in FIG. 41a bombard the anode substrate. As shown in these drawings, when an electron beam is contained in a pixel in the vertical direction, and there is an area not accessible by an electron beam in the vertical direction, the cylindrical spacer 1020 is mounted in the area of (Py-Sy) wide. In this case, it is desired that the contact area with the cylindrical spacer 1020 exists on the same line as the electron emission device adjacent in the Y direction.

FIG. 43 shows another example of a trajectory area of an electron. FIG. 43 shows a type of the appearance of a visible light when the electron beam emitted from the multi-electron source bombard the anode substrate when the interval Py of the electron emission devices adjacent to each other in the Y direction is equal to or smaller than the radius Sy of the beam in the Y direction on the anode substrate of the electron beam. In this case, the electron beams from the electron emission devices adjacent in the Y direction overlap each other on the fluorescent object, it is desired that the shape of the spacer is cylindrical. When the electron beams are on the same line as the electron emission devices adjacent in the Y direction, the electron beams can be protected from being interfered by locating the cylindrical spacer exactly between the electron beams emitted from the electron emission devices adjacent in the X direction. As a result, a high-quality image can be displayed.

(Spacer Coated Layer: Common)

In the structure near the cylindrical spacer with the configuration shown in FIG. 40, the spacer 1020 has the high resistance film 1211 as antistatic means formed on the surface of the insulating material 1201, and has the low resistance film 1221 formed such that electric connections can be made to the inside (metal backing 1019, etc.) of the face plate 1017, and to the surface (the row direction wiring 1013 or the column direction wiring 1014) of the substrate 1101. A necessary number of the spacers 1020 are mounted and at necessary intervals to attain the above mentioned purpose, and are fixed inside the face plate and on the surface of the substrate 1101 with an adhesive material 1041. The high resistance film 1211 is formed at least on the area exposed in the vacuum in an airtight container on the surface of the insulating material 1201, and is electrically connected to the inside (metal backing 1019, etc.) of the face plate 1017 and to the surface (row direction wiring 1013 or column direction wiring 1014) of the substrate 1101 through the low resistance film 1221 and the adhesive material 1041 on the cylindrical spacer 1020. According to the aspect described below, the cylindrical spacer 1020 is electrically connected to the row direction wiring 1013.

It is necessary that the spacer 1020 is an insulator to stand the high voltage applied between the row direction wiring 1013 and the column direction wiring 1014 on the substrate 1101 and the metal backing 1019 inside the face plate 1017, and a conductor to keep the surface of the spacer 1020 antistatic.

The insulating material 1201 of the spacer 1020 can be quartz glass, glass with a smaller content of impurities such as Na, etc., soda-lime glass, a ceramic material, etc. such as alumina, etc. The shape of the section of the spacer 1020 can be set a polygonal, circular etc, such that the length (distance in the support direction between the cathode substrate and the anode substrate) of cylinders is sufficiently larger than the length of the diagonal line of the shape. It is desired that the ratio (aspect ratio) of the length of the diagonal line of the sectional shape and the length of the spacer 1020 is 1:10 to 1:1000. For example, a spacer of 1 mm long and 100 $\mu$m×50 $\mu$m of rectangular sectional shape, a spacer of 2 mm long and 100 $\mu$m in diameter of cylinder, etc. are appropriate.

Figure 44A:
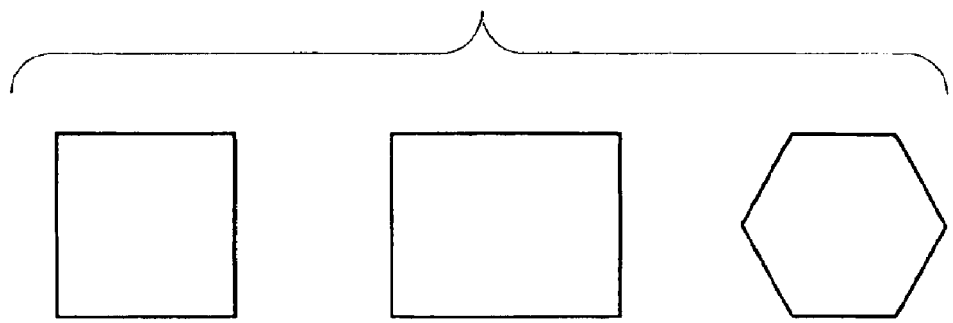
FIGS. 44a–44c are schematic diagrams showing an example of the cross-sectional shape of a spacer.

The sectional shape of the spacer 1020 can be polygonal such as square, rectangular, diamond, hexagonal, circular, etc. as shown in FIG. 44a to guarantee sufficient intensity, and have an area to mount the cathode substrate and the anode substrate on.

Figure 44B:
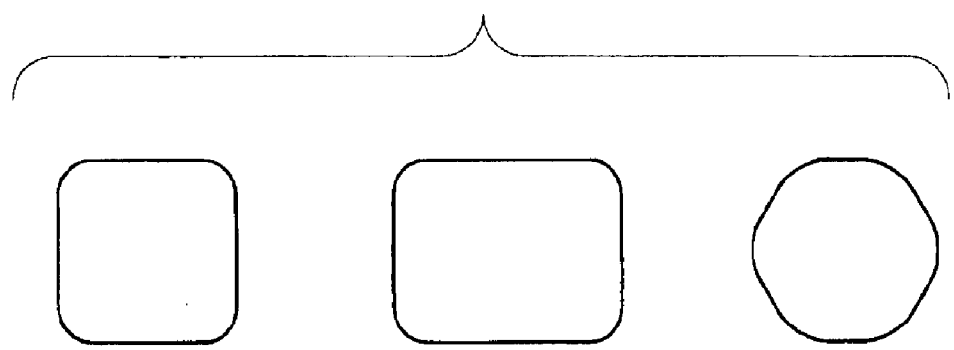
Figure 44C:
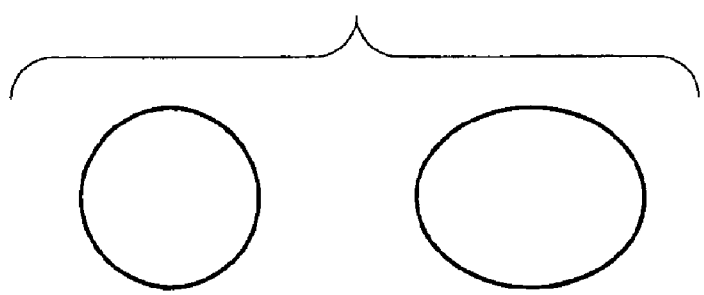

It is desired that the sectional shape is formed by curves such as polygonal cylinders without corners as shown in FIG. 44b, or cylinders having circular and oval cross-sections without portions for concentrating electric fields as shown in FIG. 44c. Especially, since a round cross-sectional cylinder is symmetric, it can be easily produced with a larger allowance range for the connection direction and positional deviation when it is mounted.

The electric current obtained by dividing the accelerating voltage Va to be applied to the face plate 1017 (metal backing 1019, etc.) on the high potential side by the resistance value Rs of the high resistance film 1211 which is an antistatic film flows through the high resistance film 1211 forming the spacer 1020. The resistance value Rs of the spacer 1020 is to be set in a desired range in consideration of antistatic properties and power consumption. From the viewpoint of the antistatic properties, the surface resistance [R/□] is desired to be equal to or smaller than $10^{12}\Omega$. To obtain a sufficient antistatic effect, the value is furthermore desired to be equal to or smaller than $10^{12}\Omega$. Since the lower limit of the surface resistance depends on the space shape and the voltage applied between the spacers, it is desired to be equal to larger than $10^{5}\Omega$. The desired thickness t of the antistatic film formed on the insulating material is in the range of 10 nm to 1 μm. Especially, it also depends on the surface energy of the material, the contact to the substrate, and the substrate temperature, but it is desired that the thickness of the film is 50 to 500 nm from the viewpoint of the film generating time, reproducibility, the stress of the film. Considering the surface resistance [R/□]ρ/t, and the desired range of the above mentioned [R/□] and t, the specific resistance ρ of the antistatic film is desired to be 0.1 [Ωcm] to $10^{8}$ [Ωcm]. Furthermore, to realize the desired range of the surface resistance and the thickness, ρ is desired to be $10^{2}$ Ωcm to $10^{6}$ Ωcm.

For example, a metal oxide can be used as the material of the high resistance film 1211 having the antistatic properties. In the metal oxide, chrome-, nickel-, and copper-oxide are desired, because these oxides are relatively small in secondary electronic emission efficiency, and can be sufficiently antistatic although an electron emitted from the cold cathode device 1012 reaches the spacer 1020. As an object other than a metal oxide, carbon is small in secondary electron emission efficiency, and is desired. Especially, amorphous carbon is highly resistant, and can be controlled to be set to a desired value of the resistance on the surface of a spacer.

The low resistance film 1221 forming the cylindrical spacer 1020 is applied to electrically connect the high resistance film 1211 to the face plate 1017 (metal backing 1019, etc.) on the high potential side and the substrate 1101 (wirings 1013, etc.) on the low potential side. Therefore, the plurality of functions listed below can be obtained.

1. The high resistance film 1211 is electrically connected to the face plate 1017 and the substrate 1101.

As described above, the high resistance film 1211 is applied to provide the antistatic properties for the surface of the spacer 1020. However, when the high resistance film 1211 is connected to the face plate 1017 (metal backing 1019, etc.) and the substrate 1101 (wirings 1013, 1014, etc.) directly or through the adhesive material 1041, large contact resistance arises on the surface of the connection portion, thereby possibly preventing the electric charge generated on the spacer from being removed rapidly. To avoid this, the connection area or the side of the spacer 1020 touching the face plate 1017, the substrate 1101, and the adhesive material 1041 are provided with the low resistance film 21.

2. The potential distribution of the high resistance film 11 is leveled.

The electron emitted from the cathode device 1012 forms an electronic orbit based on the potential distribution formed between the face plate 1017 and the substrate 1101. To prevent the disturbance in the electronic orbit near the cylindrical spacer 1020, it is necessary to control the entire distribution of the potential of the high resistance film 1211. When the high resistance film 1211 is connected to the face plate 1017 (metal backing 1019, etc.) and the substrate 1101 (wirings 1013, 1014, etc.) directly or through the adhesive material 1041, the contact resistance on the surface of the connection point causes an uneven connection state, thereby possibly outputting a value of the potential distribution of the high resistance film 1211 different from a desired value. To avoid this, the cylindrical spacer 1020 provides a low resistance layer on the entire area at the end of the spacer touching the face plate 1017 and the substrate 1101, and a desired potential is applied to the low resistance layer, thereby controlling the potential of the entire high resistance film 1211.

3. The orbit of an emitted electron is controlled.

An electron emitted from the cold cathode device 1012 forms an electronic orbit based on the potential distribution formed between the face plate 1017 and the substrate 1101. The electron emitted from the cold cathode device near the spacer may be restricted (change in wiring, device position, etc.) when a spacer is mounted. In this case, it is necessary to irradiate an electron at a desired position on the face plate 1017 by controlling the orbit of an emitted electron to generate an image without distortion or unevenness. A desired property can be set in the potential distribution near the cylindrical spacer 1020, and the orbit of an emitted electron can be controlled by providing a low resistance layer on the side of the area touching the face plate 1017 and the substrate 1101.

The low resistance film 1221 can be a material having a resistance value substantially lower than that of the high resistance film 1211, and can be appropriately selected from among the metal or alloy such as Ni, Cr, Au, Mo, W, Pt, Ti, Al, Cu, Pd, etc.

It is necessary for the adhesive material 1041 to be conductive so that the cylindrical spacer 1020 can be electrically connected to the row direction wiring 1013 and the metal back 1019. That is conductive adhesive, frit glass provided with a metal particles, and conductive fillers is appropriate.

Figure 45A:
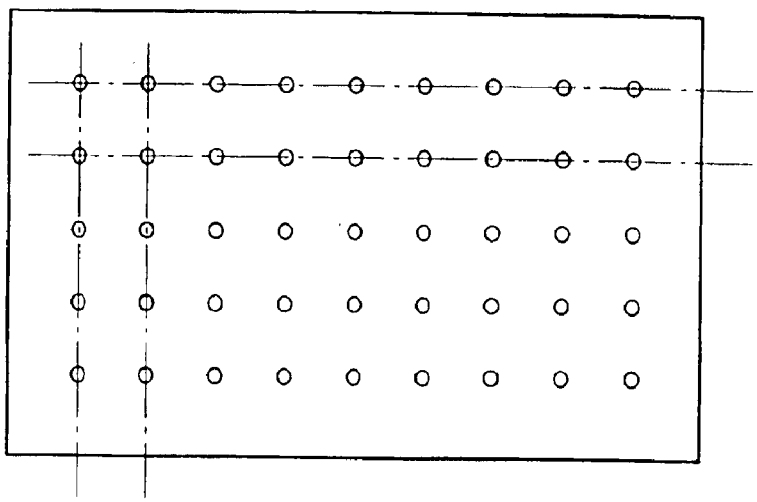
FIGS. 45a–45c are schematic diagrams showing a macroscopic exemplar arrangement of columnar spacers.
Figure 45B:
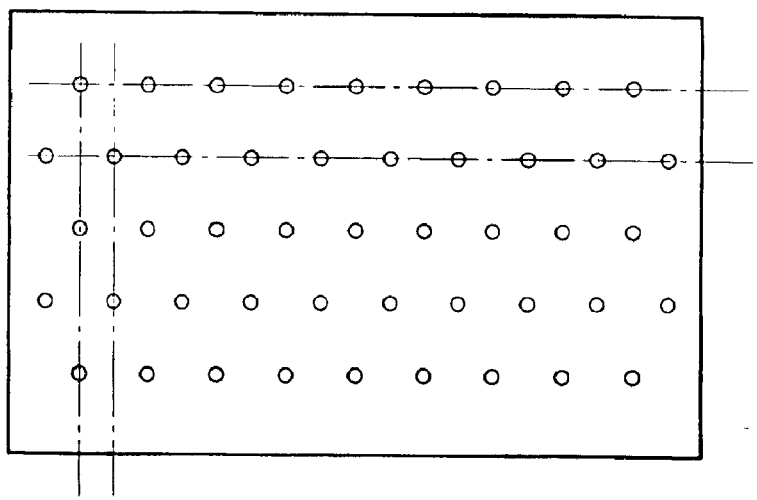
Figure 45C:
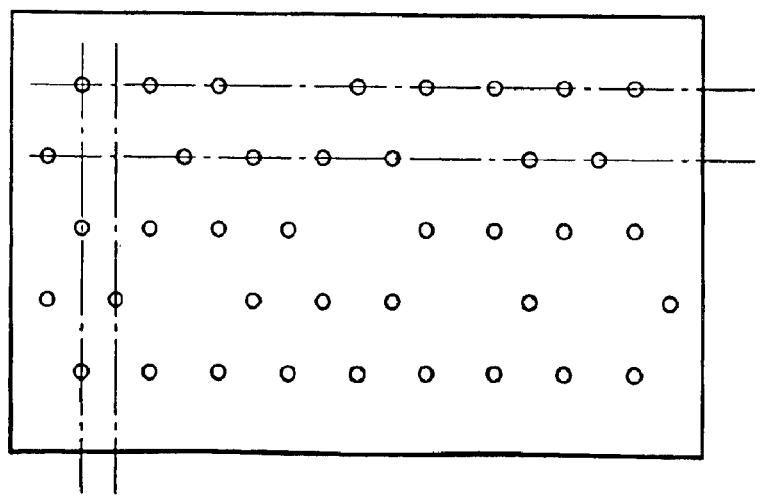

FIGS. 45a to 45c show the entire array of the spacers 1020. In the example shown in FIG. 44a, the spacers are regularly arranged as grid points. In the example shown in FIG. 44b, rows of spacers adjacent to each other in the Y direction are shifted by half pitch to each other. In the example shown in FIG. 45c, the spacers are regularly arranged, but some spacers are not arranged. Otherwise, the spacers can be arranged at random. It is important that the spacers support the atmospheric pressure, and maintain uniform intensity without interfering electronic beams.

(Fifth Configuration)

When spacers are used as a display panel, the arrangement of the spacers can be designed as follows in each of the examples described below.

EXAMPLE 1

Figure 46:
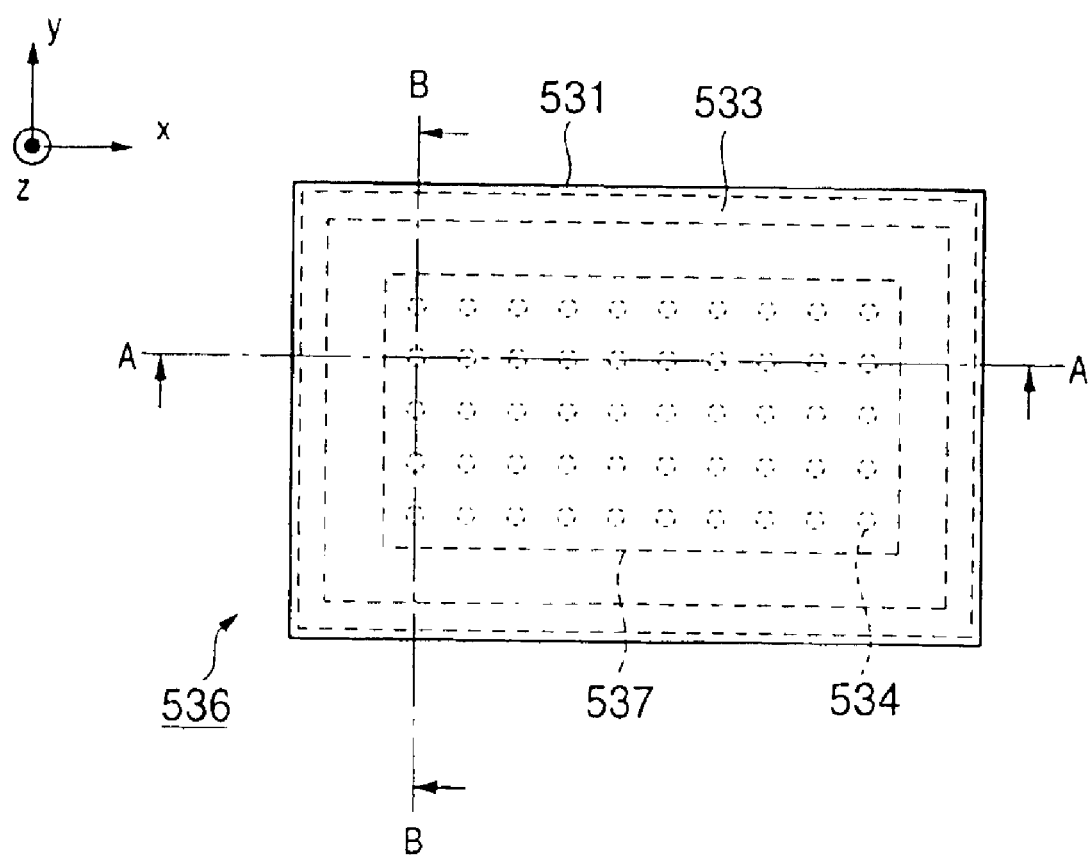
FIG. 46 is a schematic view of a vacuum container of a flat display.
Figure 47:
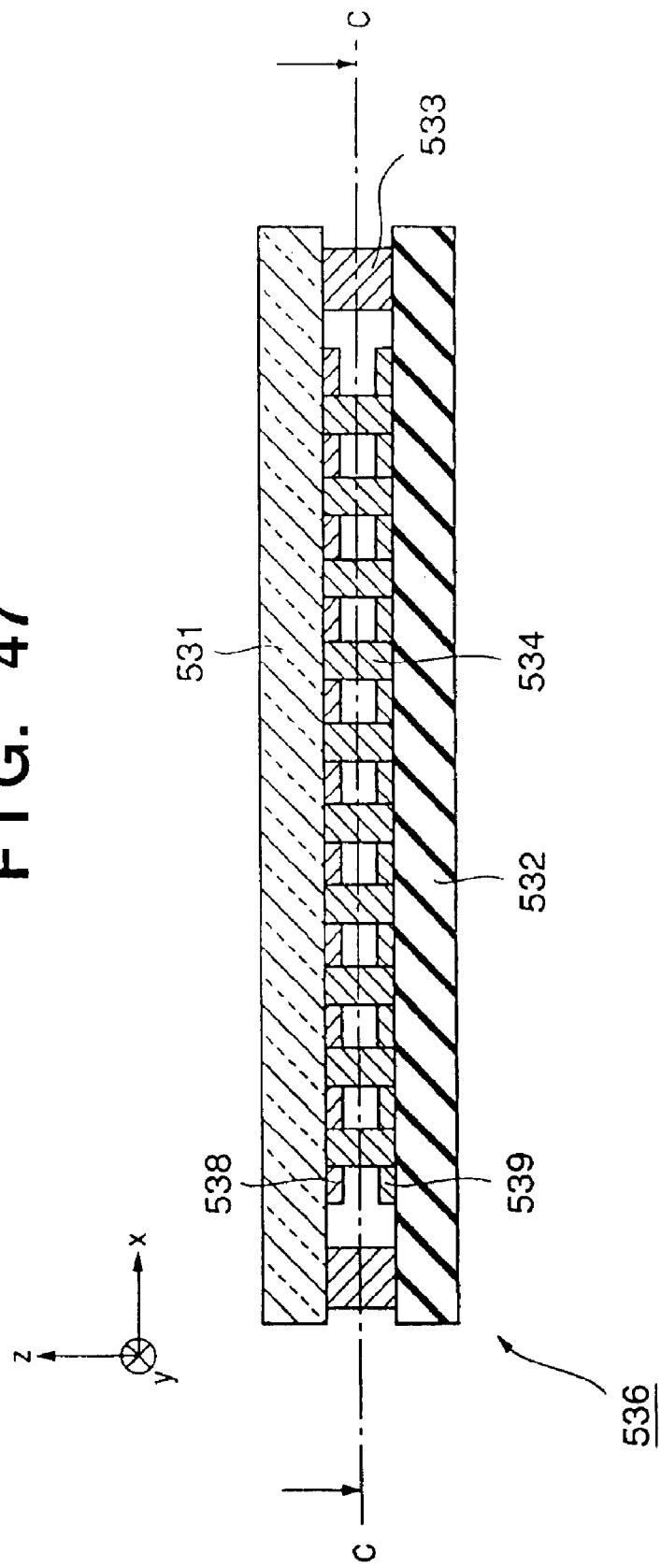
FIG. 47 is an A—A cross-sectional view of FIG. 46.
Figure 48:
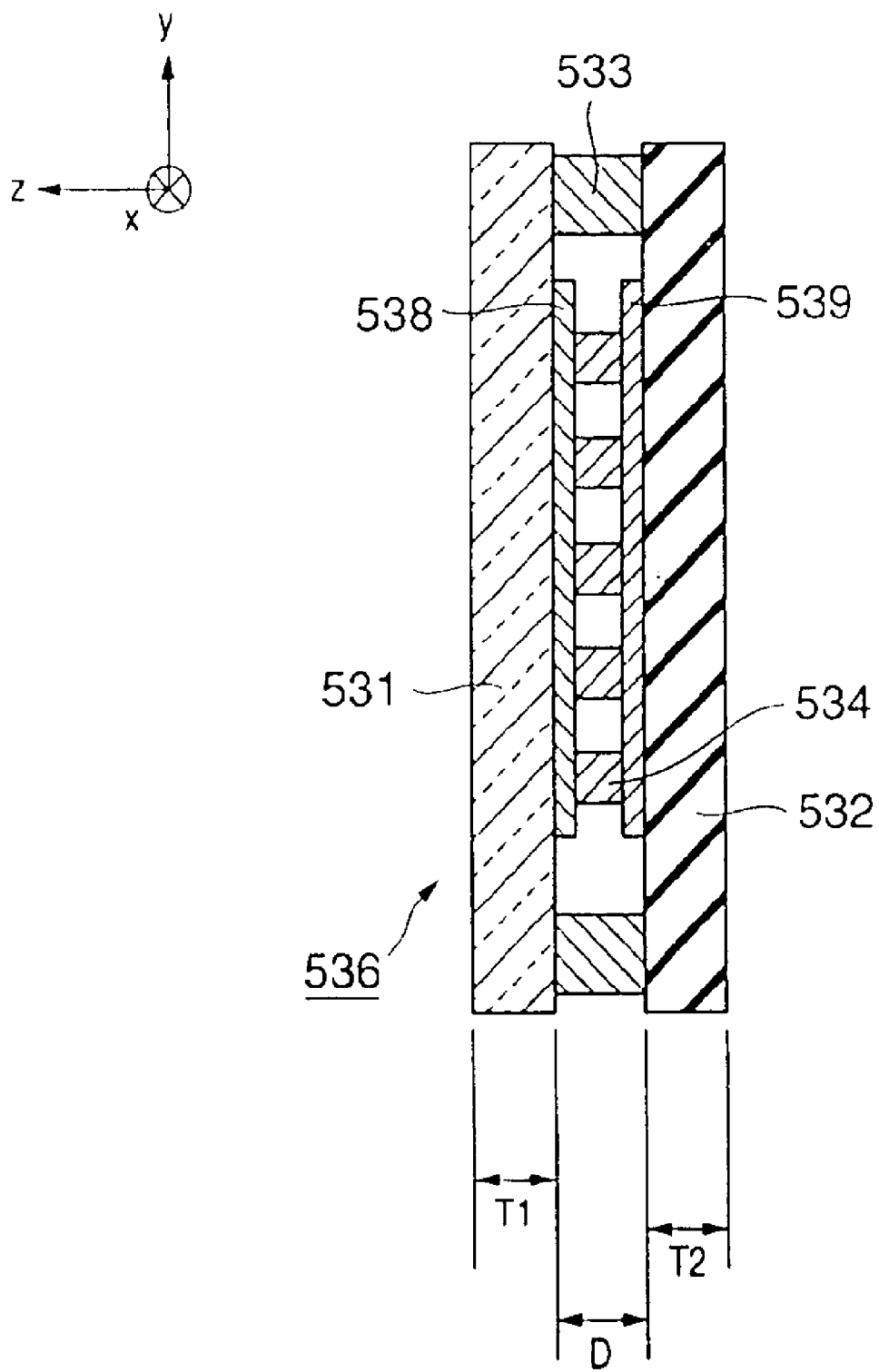
FIG. 48 is a B—B cross-sectional view of FIG. 46.
Figure 49:
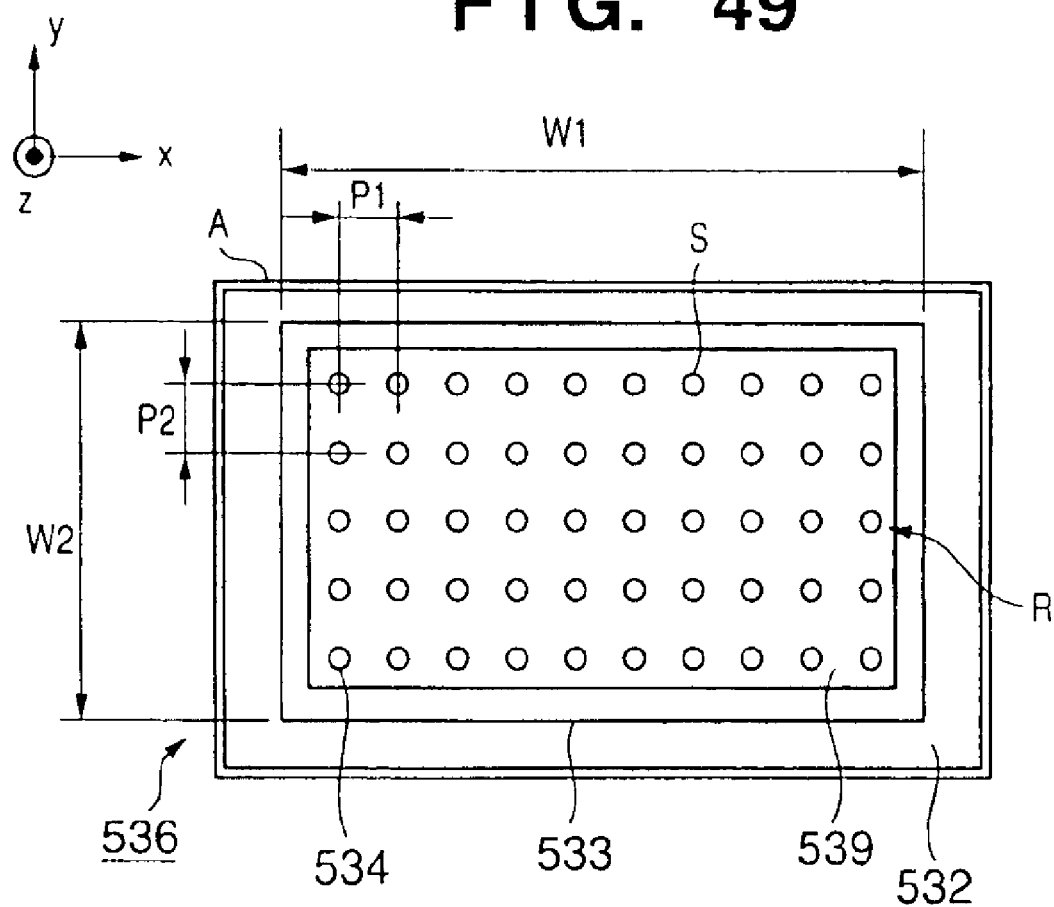
FIG. 49 is a C—C cross-sectional view of FIG. 47.
Figure 50:
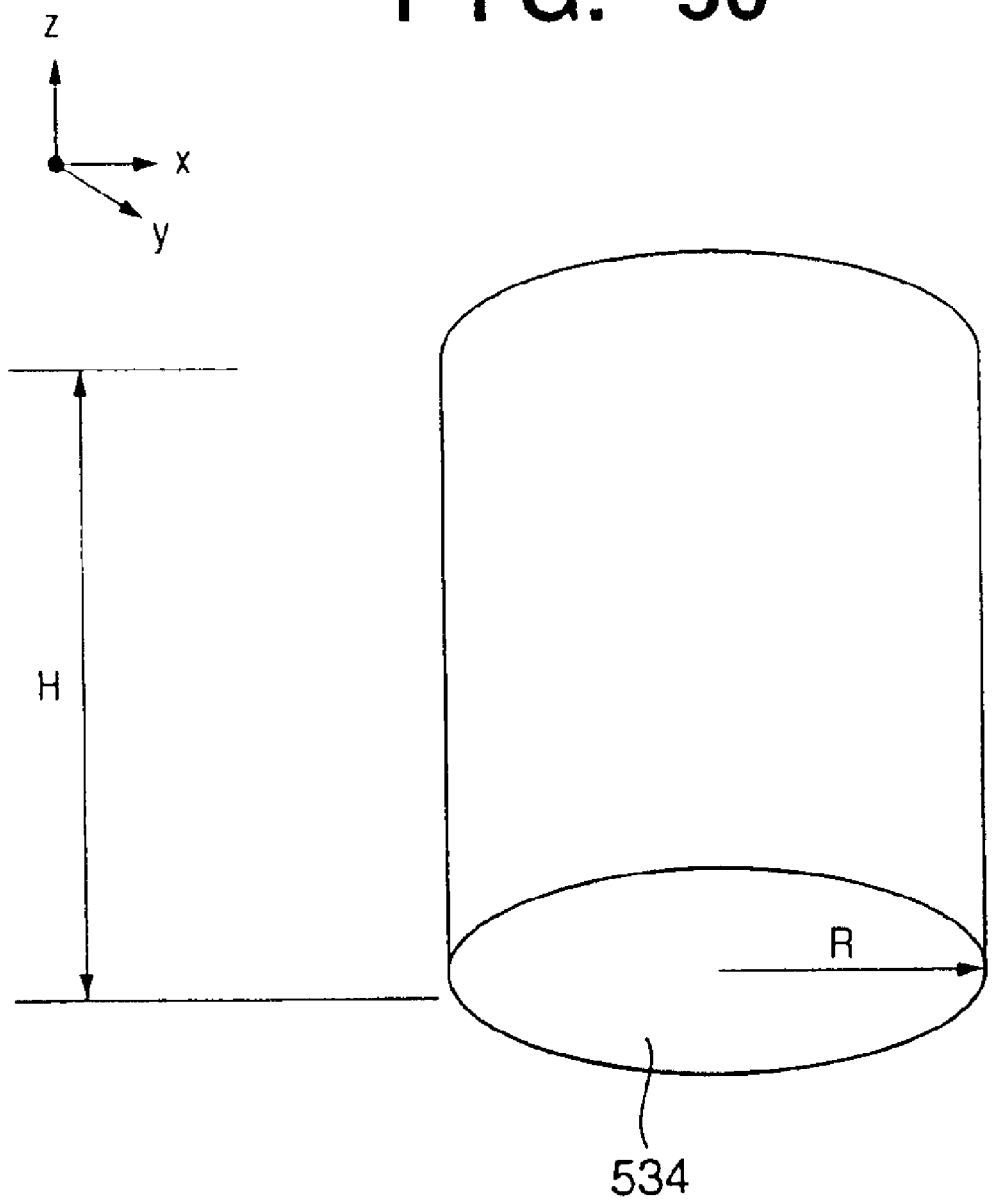
FIG. 50 is a perspective view showing an exemplar spacer.

FIGS. 46 to 50 show examples of the vacuum containers to which the fifth configuration is applied. FIG. 46 shows the outline of the vacuum container of a flat panel display. FIG. 47 is a sectional view along A—A shown in FIG. 46. FIG. 48 is a sectional view along B—B shown in FIG. 46. FIG. 49 is a sectional view along C—C shown in FIG. 47. FIG. 50 is a perspective view of a spacer.

In each of FIGS. 46 to 50, reference numeral 531 denotes a front substrate (T1=2.8 mm thick), reference numeral 532 denotes a rear substrate (T2=2.8 mm thick) mounted opposite the front substrate 531, reference numeral 533 denotes a frame mounted between two substrates and adhered airtightly. The distance D between the two substrates is 2 mm. The frame 533 is W1=112 mm long inside in the x direction, and W2=52 mm long inside in the y direction. The frame 533 is airtightly adhered to the front substrate 531 and the rear substrate 532 with the frit glass (not shown in the drawings). A cylindrical spacer 534 is mounted between two substrates, and its cross-section is circular (R=0.1 mm in radius, and H=2 mm high). A total of 50 spacers are arranged at intervals of P1=P2=12 mm in a square grid form.

The front substrate 531, the rear substrate 532, the frame 533, and the cylindrical spacer 534 are soda lime glass. These components form a vacuum container 536.

A surface conductive electron emission device 539 is provided on the rear substrate 532, and emits an electron. The rear substrate 532 is provided with a fluorescent object 538 emitting a light by receiving an electron to display an image. Reference numeral 537 denotes an image display area (120 mm×67 mm), and an image is formed by the light emission of the fluorescent object 538 in the area.

In FIG. 49, A indicates an area inside the frame 533 shown in the sectional view along C—C shown in FIG. 47. Since A=W1×W2, the area is 5824 $mm^2$. S indicates a total sectional area of spacers obtained by adding up the cross-sections of 50 cylindrical spacers 534, that is, S=50×π×$R^2$. Therefore, S=1.57 $mm^2$, where the support efficiency η is expressed by the ratio S/A of 0.027%.

It is desired that the above mentioned S/A is 0.018% to 7.8%. Since the S/A according to this example is 0.027%, it is acceptable.

Now, the procedure of producing a flat panel image display device using the vacuum container 536 will be described.

First, the rear substrate 532 provided with the electron emission device 539, etc. is set on a hot plate with the electron emission portion 533 mounted upward. The frit glass is applied with a dispenser at the position where the cylindrical spacer 534 is placed. Using an exclusive jig, the cylindrical spacer 534 is arranged on the frit glass, and then heated so that the cylindrical spacer 534 is adhered to the rear substrate 532.

Then, a frame 533 to which the frit glass is applied in advance to the top and the bottom is set on the rear substrate 532. Then, the front substrate 531 on which the fluorescent object 538, etc. is provided is aligned and fixed such that the fluorescent object 538 can be set facing the electron emission device 539. On the aligned substrate, a hot plate is placed, heated with a load up to the adhesion temperature of the frit glass, and then cooled down, thereby producing an airtight vacuum container.

Although not shown, an exhaust pipe is adhered to the rear substrate 532 or the front substrate 531. Then, using the exhaust pipe, the inside air is discharged by an external vacuum pump to make a vacuum of about $10^{-6}$ torr. Then, the electron emission device 539 is connected to an external drive substrate, etc. and power is supplied to provide the function of emitting an electron. Furthermore, a drive voltage is applied to the electron emission device 539 to emit an electron, and a high voltage of 3 kV to 15 kV is applied between the fluorescent object 538 and the electron emission device 539 to accelerate an emitted electron to the fluorescent object 538 to be fluorescent. The light pass through the front substrate 531. When the front substrate 531 is viewed from outside, an image higher in quality than in the conventional technology is displayed on the image display area 537, thereby attaining the purpose of this example.

EXAMPLE 2

Figure 51:
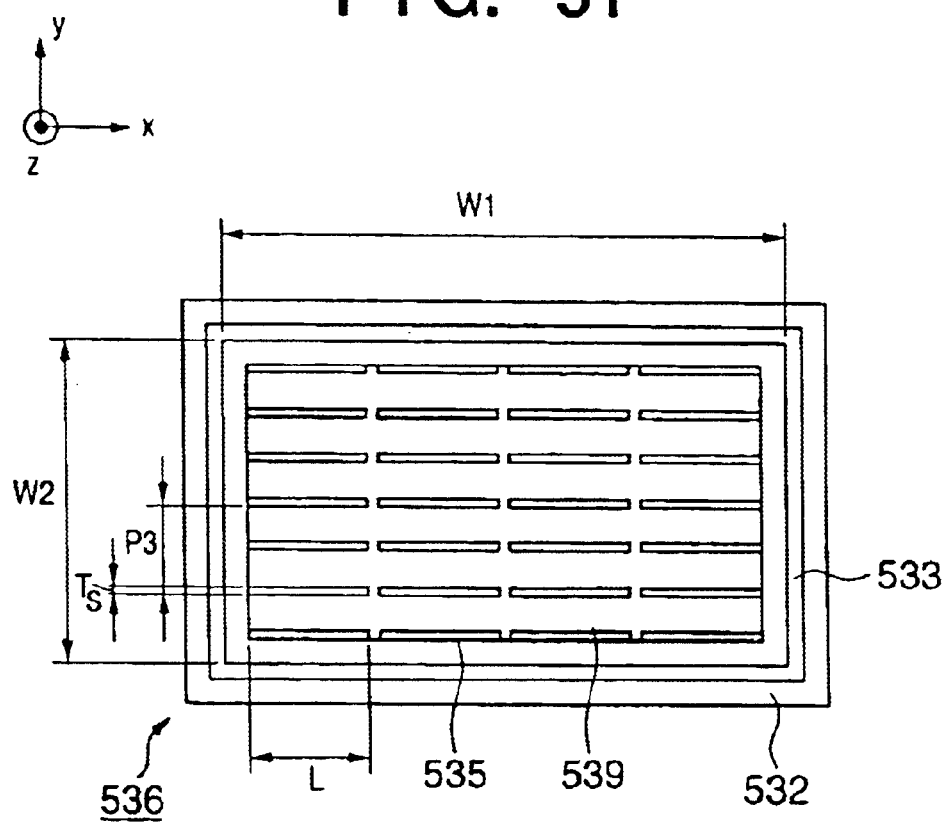
FIG. 51 is a cross-sectional view of the vacuum container of the flat display viewed from a side.

FIGS. 51 and 52 show other examples of the vacuum containers to which the fifth configuration is applied. FIG. 51 is a sectional view of the vacuum container of the flat panel display viewed from the side, and corresponds to the first example of the fifth configuration shown in FIG. 49. FIG. 52 is a perspective view of the spacer.

The vacuum container 536 shown in FIG. 51 is almost the same as that shown in FIG. 49 except a plate spacer 535 replacing the cylindrical spacer 534. The rear substrate (T2=2.8 mm thick) 532 is positioned opposite the front surface (T1=2.8 mm thick) 531 at intervals of D=2 mm. Between the substrates, the airtightly adhered frame 533 is mounted. The area inside the frame 533 is W1=820 mm in the x direction, and W2=500 mm in the y direction. The frame 533 is airtightly adhered to the front substrate 531 and the rear substrate 532 with the frit glass (not shown). The plate spacer 535 is one of the spacers having rectangular cross sections, and is L=40 mm long in the x direction, Ts=0.2 mm long in the y direction, and H=1.8 mm high. It is provided between two substrates. The array of the plate spacer 535 is equal to or smaller than 0.1 mm (substantially continuous) in interval in the x direction, P3=27.072 mm in interval in the y direction, arranged evenly and continuously, and 288 in number. In FIG. 51, the number of the plate spacers 535 is omitted. These components form the vacuum container 536. The front substrate 531, the rear substrate 532, the frame 533 and the plate spacer 535 are soda lime glass.

A surface conductive electron emission device 539 is provided on the rear substrate 532, and emits an electron. The front substrate 532 is provided with a fluorescent object 538 emitting a light by receiving an electron to display an image. The image display area 537 is 720.792 mm×406.08 mm, and an image is formed by the light emission of the fluorescent object 538 in the area.

In FIG. 51, A indicates an area inside the frame 533 shown in the sectional view along C—C shown in FIG. 47. A=W1×W2=4.10×$10^5$ $mm^2$, and S indicates a total sectional area of 288 (=n) plate spacers 535. S=n×Ts×L=2.30×$10^3$ $mm^2$. The support efficiency η is expressed by 0.56%, and this is a vacuum container with a desired configuration.

Now, the procedure of producing a flat panel image display device using the vacuum container 536 will be described.

First, the rear substrate 532 provided with the electron emission device 539, etc. is set on a hot plate with the frame 533 mounted upward. The frit glass is applied with a dispenser at the position where the plate spacer 535 is placed. Using an exclusive jig, the plate spacer 535 is arranged on the frit glass, and then heated so that the plate spacer 535 can be adhered to the rear substrate 532.

Then, a frame 533 to which the frit glass is applied in advance to the top and the bottom in the z direction is set on the rear substrate 532. Then, the front substrate 531 on which the fluorescent object 538, etc. is provided is aligned and fixed such that the fluorescent object 538 can be set opposite the electron emission device 539. On the aligned substrate, a hot plate is placed, heated with a load up to the adhesion temperature of the frit glass, and then cooled down, thereby producing an airtight vacuum container.

Although not shown, an exhaust pipe is adhered to the rear substrate 532 or the front substrate 531. Then, using the exhaust pipe, the inside air is discharged by an external vacuum pump to make a vacuum of about $10^{-6}$ torr. Then, the electron emission device 539 is connected to an external drive substrate, etc. to perform a circuit process and realize the function of emitting an electron. Furthermore, a drive voltage is applied to the electron emission device 539 to emit an electron, and a high voltage of 3 kV to 15 kV is applied between the fluorescent object 538 and the electron emission device 539 to accelerate an emitted electron to the fluorescent object 108 to be fluorescent. The lights pass through the front substrate 531. When the front substrate 531 is viewed from outside, an image higher in quality than in the conventional technology is displayed on the image display area 537, thereby attaining the purpose of this example.

The panel spacers 535 can be arranged in a checkered form. In this case, the necessary number of spacers is 256, and S indicates a total cross-sectional area of spacers obtained by adding up the cross-sections of 256 plate spacers 535, that is, $S=2.05\times10^3$ mm$^2$. The support efficiency η is 0.50%. This is a vacuum container with a desired configuration.

Figure 53:
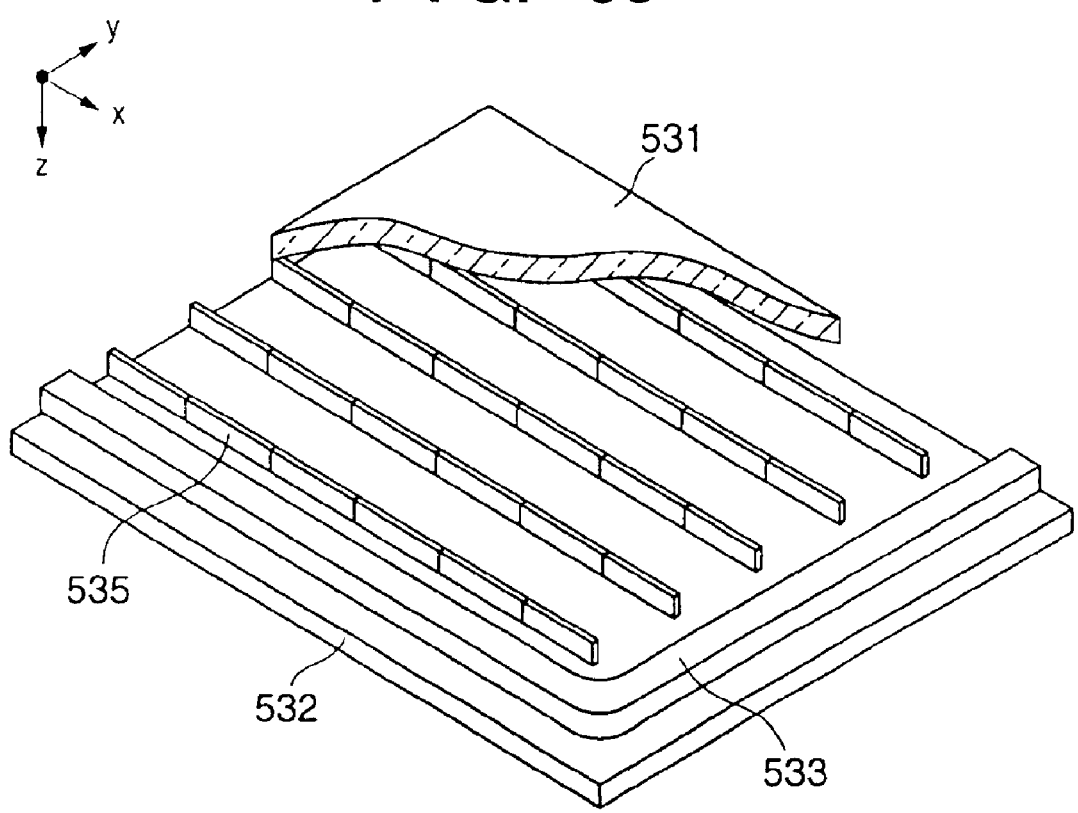
FIG. 53 is a schematic view showing an exemplar arrangement of spacers.
Figure 54:
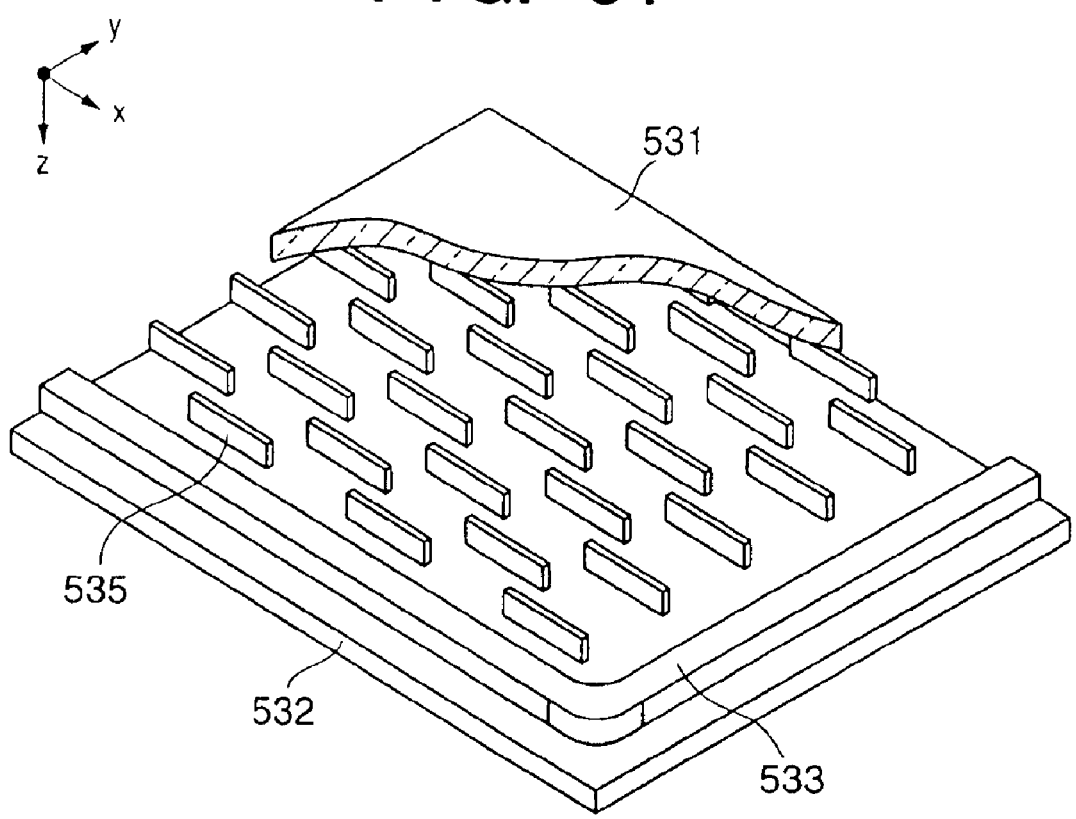
FIG. 54 is a schematic view showing another exemplar arrangement of spacers.

In addition, the vacuum container can be configured as shown in FIGS. 53 and 54. In FIG. 53, the rear substrate 532 (T2=2.8 mm thick) is positioned opposite the front substrate 531 (T1=2.8 mm thick) at intervals of substrate of 2 mm. Between the substrates, the airtightly adhered frame 533 is mounted. The frame 533 is W1=820 mm in the x direction, and W2=500 mm in the y direction. The frame 533 is airtightly adhered to the front substrate 531 and the rear substrate 532 with the frit glass (not shown). The plate spacer 535 with rectangular cross section is provided between the two substrates (40 mm long in the x direction, 0.2 mm long in the y direction, and 1.8 mm high in the z direction). The array of the plate spacer 535 is equal to or smaller than 0.1 mm (substantially continuous) in interval in the x direction, P3=27.072 mm in interval in the y direction, arranged evenly and continuously, and 288 in number. In FIG. 53, the number of the plate spacers 535 is omitted. The front substrate 531, the rear substrate 532, the frame 533 and the plate spacer 535 are soda lime glass.

FIG. 54 shows the configuration shown in FIG. 53 with the arrangement of the plate spacers 535 changed into the checkered form. In this case, the interval in the x direction is 2.55 mm, the interval in the y direction is 27.072 mm, and the number of spacers is 256.

In the configurations of the FIGS. 53 and 54, the corners of the frame 533 are rounded off. The curvature is, for example, 10 mm±1.0 mm for inside diameter, and 18 mm±1.0 mm for outside diameter. With these curvature, the frame 533 having the rounded corner portions can be applied for screens of 10 inches to large size such as 30 inches diagonally.

(Sixth Configuration)

The configuration of the frame member can be selected from various types. The features of the frame member will be described here.

Figure 55:
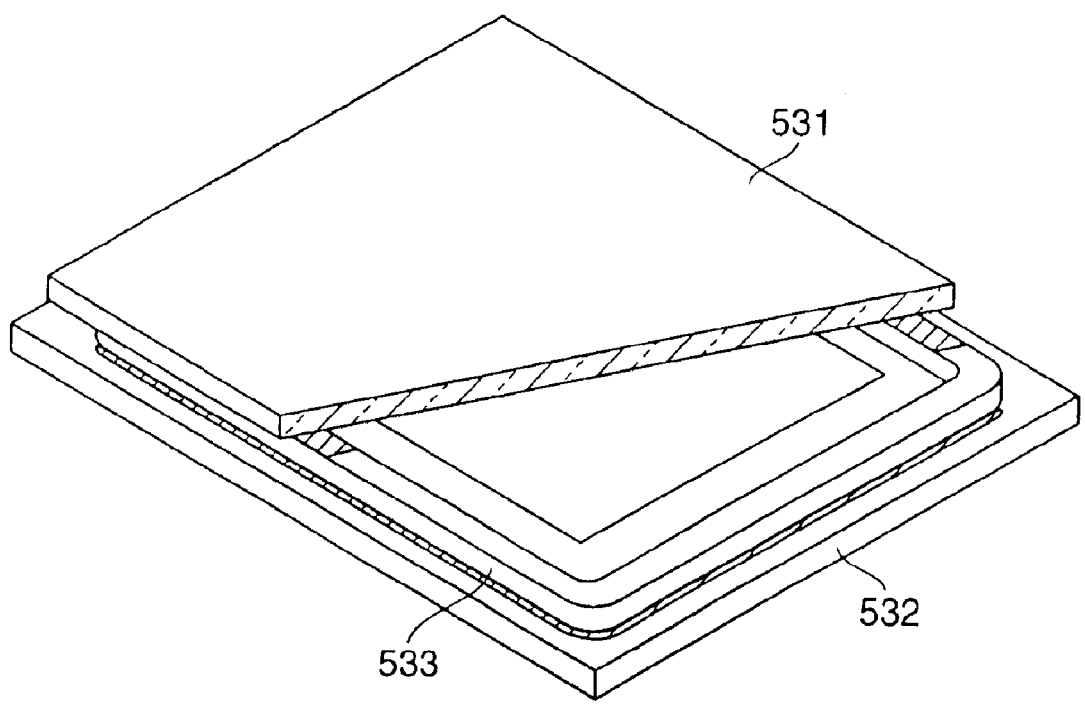
FIG. 55 is a schematic view showing an exemplar frame material used in the image formation apparatus of the present invention.

FIG. 55 shows an example of the frame member. The frame 533 is formed by a material having practically the same thermal expansivity as the front substrate 531 and the rear substrate 532. The front substrate 531, the rear substrate 532, and the frame 533 form a basic container. Both the inside and outside of the corners of the frame 533 is desired to be arc-shaped, but only the inside or outside, whichever is not limited to, can be arc-shaped. The curvature of the arc can be expressed for inside or outside. However, an inside or outside concentric circle having the curvature of 1 to 50 mm radius is desired in intensity. The frame 533 can be formed in various forming methods such as a curving process, a grinding process, a heating and pressing process, a bending process from a pole material, a punching out process, etc.

With the configuration, a color image forming device of 30 diagonal inch of the significant display area having the length-to-width (aspect) ratio of 3:4 is prepared.

Figure 56:
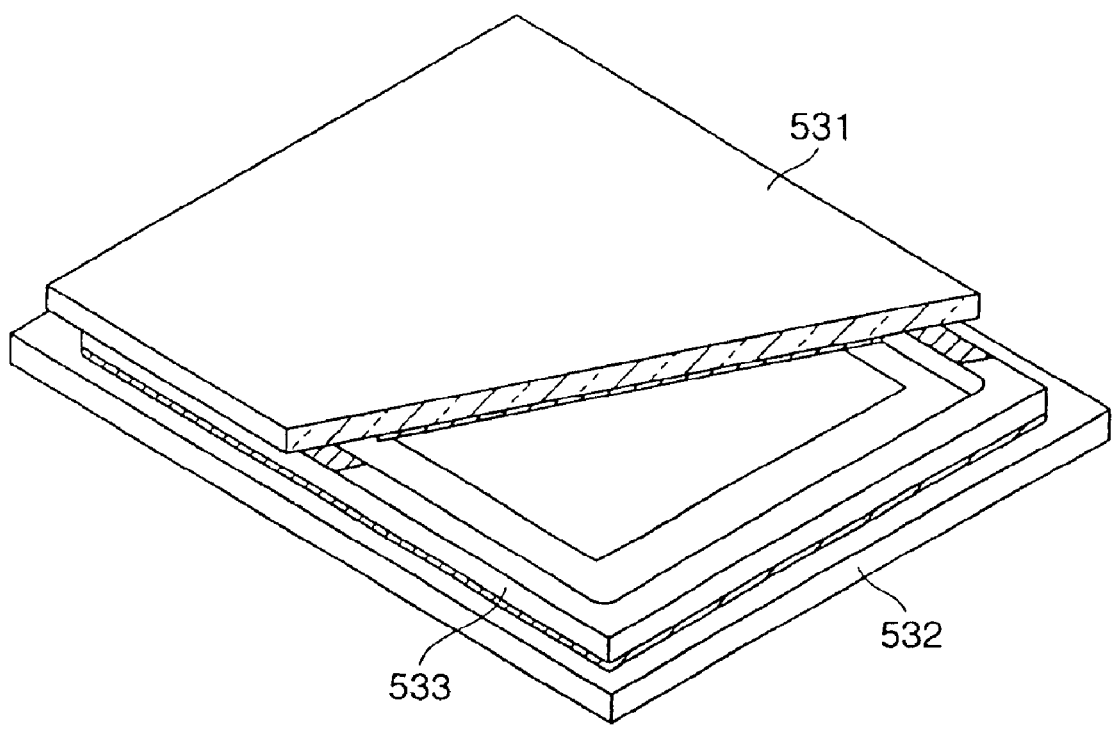
FIG. 56 is a schematic view showing another exemplar frame material used in the image formation apparatus of the present invention.

FIG. 56 shows another example of a frame member. In this example, the shape of the corner portions of the frame 533 is arc only inside the container. The frame 533 can be formed by grinding a soda lime material as 3.6 mm thick, 7 mm wide, 2±0.5 mm in corner inside curvature radius. Furthermore, glass paste having a low melting point is applied by a dispenser onto the joint area to the rear substrate 532, a drying process is performed, and then a preprocess (provisional sintering) is performed for 10 minutes at 380° C., thereby forming a low-melting point glass layer. The low-melting point glass is applied using LS-3081 of Nippon Electric Glass Co., Ltd. as paste as in the process of the front substrate 531.

Figure 57:
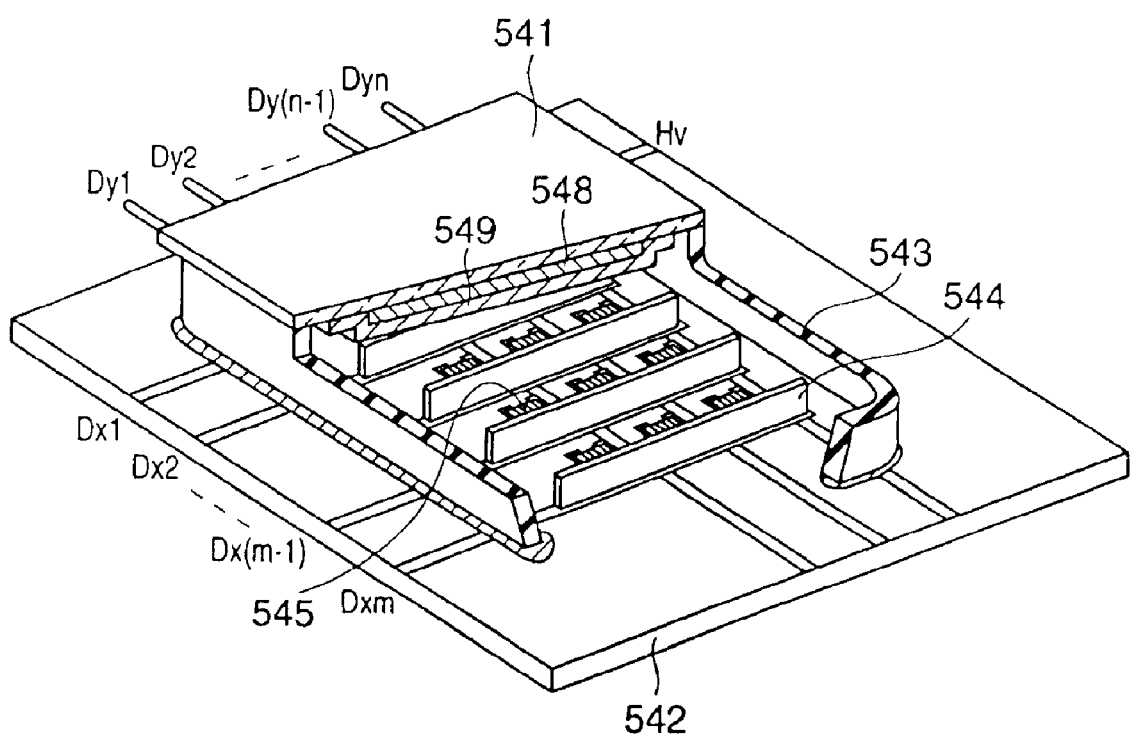
FIG. 57 is a partially cut out perspective view of the image display panel section of the image formation apparatus, another example of the present invention.

FIG. 57 shows an example of the image display panel to which the above mentioned frame member is applied. In this example, an electron source is formed on the rear plate 542 by arranging a matrix of surface conductive electron emission devices 545, and column direction wiring and row direction wiring are formed to control the emission of electrons from the electron emission device 545. A face plate 543 contains a fluorescent film 549 and a metal back 548 which is an accelerating electrode inside the glass substrate, and is arranged opposite the electron source of the rear plate 542 through a support frame 543 of an insulating material. A high voltage is applied from the power supply not shown between the electron source and the metal back 548. The x direction terminals Dx1 to Dxm and the y direction terminals Dy1 to Dyn extending outside the image display panel are respectively connected to the column direction wiring and the row direction wiring. Through the wiring, an image can be displayed on the face plate 541 by controlling the emission of electrons from the electron emission device 545 according to the image information. The face plate 541, the rear plate 542, and the support frame 543 are fixed to each other by frit glass, etc., to form an enclosure. Spacers 544 are provided at predetermined intervals between the face plate 541 and the rear plate 542. The corner portions of the support frame 543 is arc-shaped both inside and outside of the container.

A color image forming device of 10 diagonal inch of the significant display area having the length-to-width (aspect) ratio of 3:4 can be prepared by applying the configuration of the display panel described above. In this case, the frame can be formed as 1.6 mm thick, 13 mm wide, 10±1.0 mm in corner inside curvature radius, and 18±1.0 mm in corner outside curvature radius in the carving a soda lime glass material process. The arc-shaped corner portions are concentric both inside and outside. Furthermore, glass paste having a low melting point is applied by a dispenser onto the joint area to the rear plate, a drying process is performed, and then a preprocess (provisional sintering) is performed for 10 minutes at 380° C., thereby forming a low-melting point glass layer. The low-melting point glass is applied using LS-3081 of Nippon Electric Glass Co., Ltd. as paste as in the process of the face plate.

With the configuration according to the sixth configuration, a frame member can be easily formed integrally by setting as arc-shaped at least inside or outside the container the shape of the corner portions of the frame members supporting between and at the circumferential portions of the face plate and the rear plate. Therefore, the slow leak at the corner portions in the configuration of the divided frame member, or the damage (peel-off) can be reduced, and a reliable image forming device can be obtained with a high yield. Furthermore, by improving the intensity of the frame member itself, the system can be easily processed, thereby improving the productivity by simplifying the device, etc.

(Seventh Configuration)

The connecting portion of the configuration of the face plate, the support frame, and the rear plate can be designed as follows.

EXAMPLE 1

Figure 58:
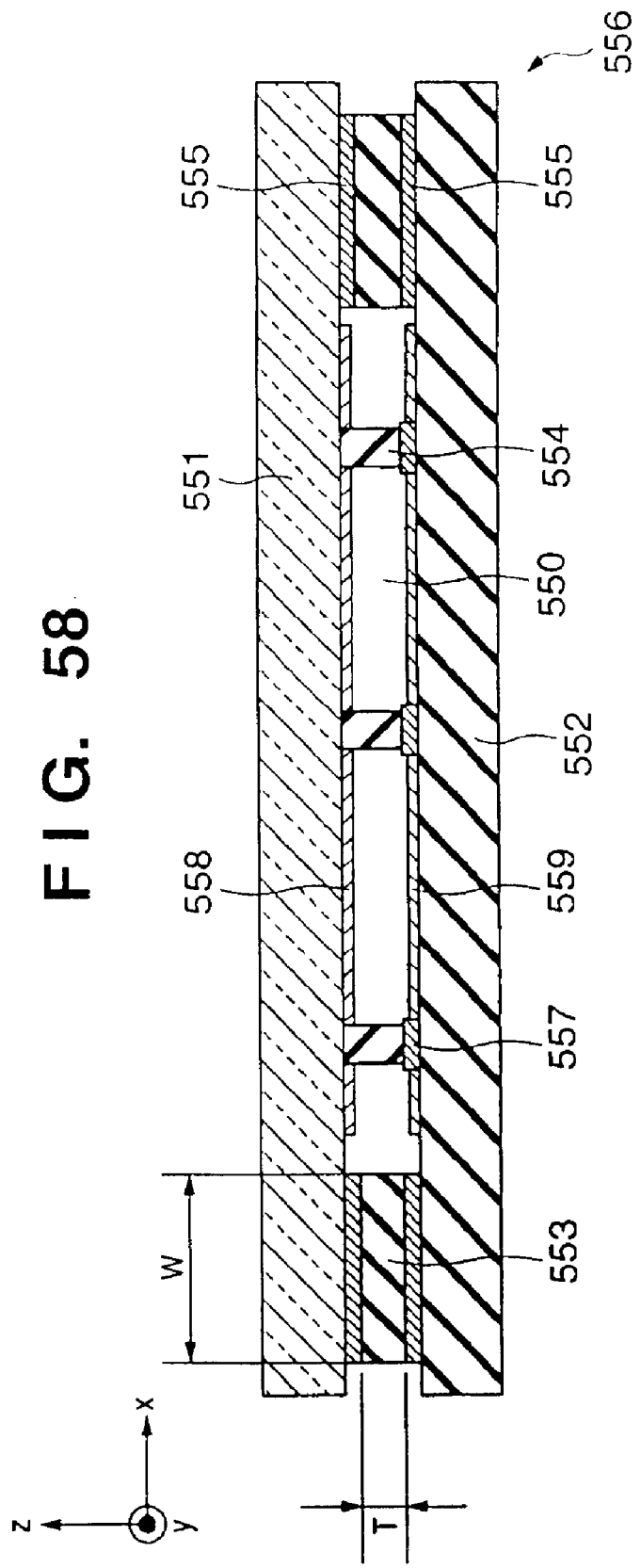
FIG. 58 is an outlined cross-sectional view of an airtight container used in the image formation apparatus of the present invention.

This example is an example of attaining the purpose of the present invention for generating a large screen of an image display device. FIGS. 58 and 59 show an example of the configuration. FIG. 58 is a schematic sectional view of an airtight container, and FIG. 59 is a decomposition and perspective view of an airtight container.

In FIGS. 58 and 59, reference numeral 551 denotes a front substrate (2.8 mm thick). Reference numeral 552 denotes a rear substrate (2.8 mm thick) placed opposite the front substrate 551. Reference numeral 553 denotes a frame airtightly adhered to the front substrate 551 and the rear substrate 553 with frit glass 555. The width W of the frame 553 is 3 mm, the thickness T is 1 mm, and the length-to-width ratio A is 3. The thickness of the frit glass 555 is 0.2 mm. Reference numeral 556 denotes an airtight container comprising the front substrate 551, the rear substrate 552, and the frame 553, and reference numeral 550 denotes an airtight space. The airtight container 556 is 900 mm in the x direction, 580 mm in the y direction, and 7 mm in the z direction.

Reference numeral 554 denotes a spacer for suppressing the deformation of the airtight container against the atmospheric pressure applied from outside when the airtight container 556 is made vacuum. The spacer 554 is 0.2 mm in the x direction, 40 mm in the y direction, and 1.2 mm in the z direction, and is fixed on one side with the first glass, which is further identified adjacent the spacer 554 by reference numeral 557 (0.2 mm thick). FIGS. 58 and 59 show only three spacers, but there actually are 250 spacers. The front substrate 551, the rear substrate 552, the frame 553, and the spacer 554 are made of soda lime glass.

Reference numeral 559 denotes a surface conductive electron emission device mounted on the rear substrate 552. Reference numeral 558 denotes a fluorescent object mounted on the front substrate, and becomes fluorescent by receiving an electron generated by the surface conductive electron emission device 559. The detailed technology about the surface conductive electron emission device 559 is disclosed by Japanese Patent Laid-Open No. 7-235255, etc.

Now, the method of producing the airtight container will be described.

First, the fluorescent object 558, etc. is formed on the front substrate 551. Then, the surface conductive electron emission device 559, etc. are provided on the rear substrate 552, and then the frit glass 555 and the frame 553 are laid on the rear substrate 552. Furthermore, the spacer 554 and the frit glass 557 are aligned using a jig, a hot plate heats the frit glass 555 up to the adhesion temperature while applying a load to the frame 553 and the spacer 554, the spacer is adhered, and then cooled. Then, the frit glass 555 and the front substrate 551 are put on the frame 553, fixed at an appropriate position using the jig, etc., the hot plate heats the frit glass 555 up to the adhesion temperature, and they are airtightly adhered with the frit glass 555 provided with the load. Then, they are cooled, and taken out of the hot plate, thereby completing the airtight container 556 provided with the airtight space 550.

Now, the method of producing the image display device using the airtight container 556 will be described.

First, the air in the airtight space 550 is discharged using an exhaust pipe (not shown) and is kept vacuum. Then, the surface conductive electron emission device 559 is connected with an external drive circuit (not shown), etc., and the surface conductive electron emission device 559 is electrically connected to function as an electron emission unit. Furthermore, by supplying power to display an image through an external drive circuit, the surface conductive electron emission device 559 emits an electron, and the emitted electron is given to the fluorescent object 558. As a result, an image can be displayed by the fluorescent object 558 becoming fluorescent, thereby completing the production of the image display device.

Next, the driving process is performed in the front emission condition with the maximum capacity, and although the temperature of the front substrate 551 and the rear substrate 552 rises no slow leak occurs in the frame 553 and the frit glass 555, and a stable airtight container and image display device can be obtained. Then the exhaust pipe (not shown) is cut off.

Then, the thickness T shown in FIG. 58 is set to 1 mm, on the above mentioned first condition, and the FEM analysis is performed on the frame in the range of the width of 1, 2, 5, 30, and 40 mm centering on the width W=3 mm of the frame 553. In this analysis, the determination standard is the peeling-off stress σ equal to or smaller than 12 MPa at which a crack which causes a slow leak will not occur. Furthermore, an image display device is produced by generating an airtight container using the frame 553 of W=2, 5, 30, and 40 mm wide. Then the driving process is performed with the maximum capacity, a slow leak is checked using a helium leak detector, and no slow leak is confirmed.

With an increasing value of the width W of the frame, a necessary load to heat and adhere the frame to the front substrate and the rear substrate using the frit glass 555 when an airtight container is produced also becomes large, thereby causing large consumption of a producing device and a higher cost. As a result, it is appropriate that the width W is equal to or smaller than 30 mm.

Table 1 shows the above mentioned results.

TABLE 1

Explanation of Example 1

| Item | Determination | | | | | | Determination standard |
|---|---|---|---|---|---|---|---|
| Width W [mm] | 1 | 2 | 3 | 5 | 30 | 40 | Measured value |
| Thickness T [mm] | 1 | 1 | 1 | 1 | 1 | 1 | Measured value |
| Width-to-thickness ratio A | 1 | 2 | 3 | 5 | 30 | 40 | W/T |
| FEM analysis | x | o | o | o | o | o | x: Stress σ > 12 Mpa<br>o: Stress σ ≦ 12 Mpa |
| Drive | x | o | o | o | o | o | x: No Example<br>o: No leak |
| Practicability | | o | o | o | o | Δ | Δ: Not practical<br>o: Practical |

According to this example, in the airtight container having a large screen and the image display device using it, the fact that a slow leak hardly occurs in a practical range if the width-to-thickness ratio of A the frame 553 is set as $2 \leq W \leq 30$ (W indicates the width of the frame), and $2 \leq A \leq 30$ has been proven by investigation and production.

In addition, the above mentioned ratio W/T is desired to be in the range from 1.5 to 30.

Furthermore, according to this example, the spacer 554 is 40 mm long and 0.2 mm thick. However, the shape and the size of the spacer is not limited to these values. For example, it can be 200 mm long and 0.1 mm thick, or can be a cylinder of 0.1 mm in radius.

When it is applied to a large screen of 30 inch in diagonal, for example, W=13 mm, T=1.3 mm, 0.3 mm thick frit, A=10 mm, 1.8 mm of spacer in the z direction, and 7.5 mm in capacity can be set.

EXAMPLE 2

According to this example, as in the first example with the above mentioned seventh configuration, the object to successfully realize an image display device with a large screen can be attained. The components of this example are almost the same as those of the first example except the size of the frame 553 and the spacer 554.

According to this example, the frame 553 is 12 mm in width W, 3 mm in thickness T, and the length-to-width ratio A of the frame is 4. In this connection, the length of the spacer 554 in the z direction is 3.2 mm. The frit glass 555 is 0.2 mm thick. The front substrate 551, the rear substrate 552, the frame 553, and the spacer 554 are glass having a high distortion point.

With these units, an airtight container is produced in the same method as the first example with the seventh configuration, and no slow leak is confirmed in the driving process with the maximum capacity.

Furthermore, with the width W=12 of the frame, an airtight container is produced with T=2 and 4 centering on T=3 mm to produce an image display device, and investigation and confirmation are performed as in the first example with the above mentioned seventh configuration. Table 2 shows the results. To change the thickness T, the length in the z direction of the spacer 554 is changed into 2.2 mm and 4.2 mm.

TABLE 2

Explanation of Example 2

| Item | Determination | | | Determination standard |
|---|---|---|---|---|
| Width W | 12 | 12 | 12 | Measured value |
| Thickness T | 2 | 3 | 4 | Measured value |
| Length-to-width ratio A | 6 | 4 | 3 | W/T |
| FEM analysis | ○ | ○ | ○ | x: Stress σ > 12 Mpa<br>○: Stress σ ≦ 12 Mpa |
| Drive | ○ | ○ | ○ | x: No Example<br>○: No leak |
| Practicability | ○ | ○ | ○ | Δ: Not practical<br>○: Practical |

According to this example, in the airtight container having a large screen and the image display device using it, the fact that a slow leak hardly occurs in a practical range if the frame 553 is set to the width W=12, and the length-to-width ratio A as $3 \leq A \leq 6$, has been proven by investigation and production.

With a 30 inch display unit, A=10, W=13, and T 1.3 can be set. With a 10 inch display unit, A 8.6, W=12, T=1.4 can be set.

(Eighth Configuration)

The joint portion of the face plate, the frame member, the rear plate can be designed as follows. The configuration includes a first conductive film from the area of the image forming material (fluorescent object) of the face plate to the joint area of the frame member, and a second conductive film from the joint area of the face plate on the frame member to the joint area of the rear plate on the frame member. This configuration can also include a third conductive film around the plurality of electron emission devices in the electron source substrate on the rear plate side and around the wiring. Furthermore, a conductive for electrically connecting the first conductive film with the second conductive film can be formed at the joint portion between the first and the second conductive films, and the face plate can be adhered to the frame member with conductive frit or adhesion.

Figure 60:
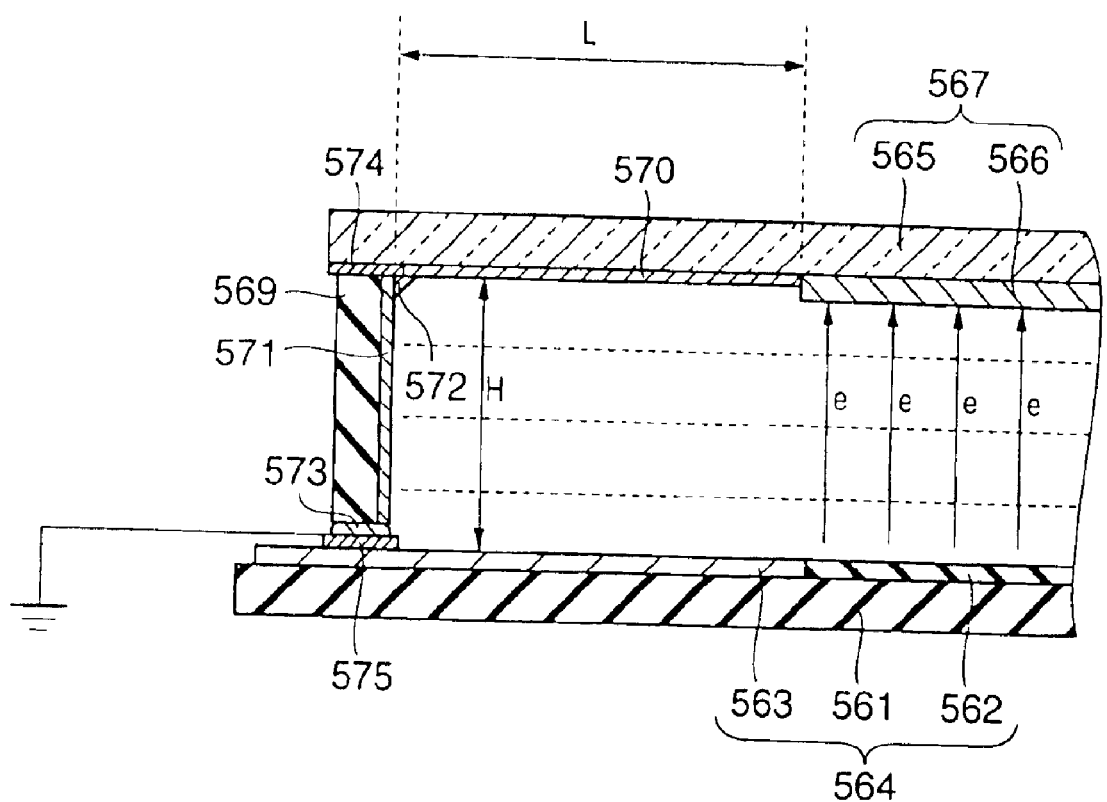
FIG. 60 is a partial cross-sectional view of the display panel section of the image formation apparatus, another example of the present invention.

FIG. 60 shows an example of the configuration of the eighth configuration. In this example, a first conductive film 570 is formed around the joint portion from an image forming material 566 on a face plate 567 (front substrate) to a frame unit 569. On the frame unit 569, a second conductive film 571 is formed from an joint portion with the face plate 567 to a joint portion with the rear plate (substrate) 564. The first conductive film 570 is electrically connected to the second conductive film 571 at the joint portion, and a conductive material 572 for guaranteeing the electrical connection can also be formed. Without the conductive material 572, the electrical connection can also be guaranteed using conductive frit glass obtained by mixing an adhesive material 574 with conductive filler such as Au, Ag, etc.

The joint portion between the second conductive film 571 and the rear plate 564 is desired to be maintained with the potential substantially equal to that detected when an electron source 562 is driven. For example, as shown in FIG. 60, an electrode 573 can be formed in contact with the conductive film at the end of the joint area with the rear plate 564 of the frame unit 569. In this case the electrode 573 is, for example, connected to the ground potential.

The first conductive film 570 is formed with the surface resistance Rs (sheet resistance) equal to or smaller than $10^{11}$ Ω/□. The sheet resistance Rs is a value obtained when the resistance value R as R=Rs (l/w) measured in the length direction of the film having the thickness of t, the width of w, and the length of 1. If the resistance rate if ρ, then Rs=ρ/t. The sheet resistance Rs is set in the above mentioned range because it is desired that the Rs is equal to or smaller than $10^{11}$ Ω/□ to be antistatic against the above mentioned ion, etc. It is desired that the sheet resistance of the second conductive film 571 is $10^8$ Ω/□ to $10^{11}$ Ω/□ also because it is desired that the Rs is equal to or smaller than $10^{11}$ Ω/□ to be antistatic against the ion, etc., and because that the Rs is equal to or larger than $10^8$ Ω/□ to reduce the power consumed by the electric current flowing through the second conductive film 571 when a high voltage is applied to the image forming material 566.

By appropriately setting the sheet resistance of the first conductive film 570 and the second conductive film 571 in the above mentioned range in consideration of the structure parameter around the frame unit 569, the disturbance of the electric field around the frame unit can be controlled. Assume that the value of the high voltage applied to the image forming material 566 is Va, the distance from the end point of the image forming material 566 to the joint portion to the frame unit is L, the height of the frame unit is H, and the sheet resistance values of the first and the second conductive films are Rs1 and Rs2. For example, to set the potential of Va/2 at the joint portion between the front substrate and the frame unit, Rs1/Rs2=H/L. In addition, if Rs1/Rs2 is set to the smallest possible value, the balanced parallel in electric field between the image forming material 566 and the electron source 562 can continue around the frame unit as shown in FIG. 60.

When substantially parallel equipotential planes are formed between the front substrate and the rear substrate as shown in FIG. 60, the distance between the frame unit and the image forming unit can be shortened without apparently affecting the orbit of an emitted electron. As a result, the ratio of the image display area to the entire display device can be preferably larger. To form above mentioned equipotential planes, the value of Rs1/Rs2 is set to a smallest possible value.

Furthermore, when a spacer is mounted between the front substrate and the rear substrate with the surface sheet resistance controlled, the sheet resistance of the surface of the frame unit is equal to that of the spacer. Furthermore, the first conductive film and the metal back are extended to the frame unit. With this configuration, the potential applied to the metal back is applied to the end portion (upper end) of the front substrate side of the spacer and the end portion (upper end) of front substrate side of the frame unit.

Furthermore, by setting an equal potential at the end portion (lower end) of the rear plate side of the frame and at the end portion (lower end) of the rear substrate side of the spacer, the surface of the frame unit and the surface of the spacer have substantially the same potential distribution.

With the above mentioned settings, substantially parallel equipotential planes can be formed between the front plate and the rear plate.

As a forming material of the above mentioned conductive film, a carbon material, metal oxide such as tin oxide, chrome oxide, ITO, etc., conductive materials dispersed into silicon oxide, etc. can be used. These materials are appropriate because they can easily form an even film over a large area.

The first conductive films 570 and 571 can be formed in the spattering method, the vacuum vapor deposition method, the application method, the electrical beam polymerizing method, the plasma method, the CVD method, etc. In any of these methods, a stable conductive film can be easily obtained.

Figure 61:
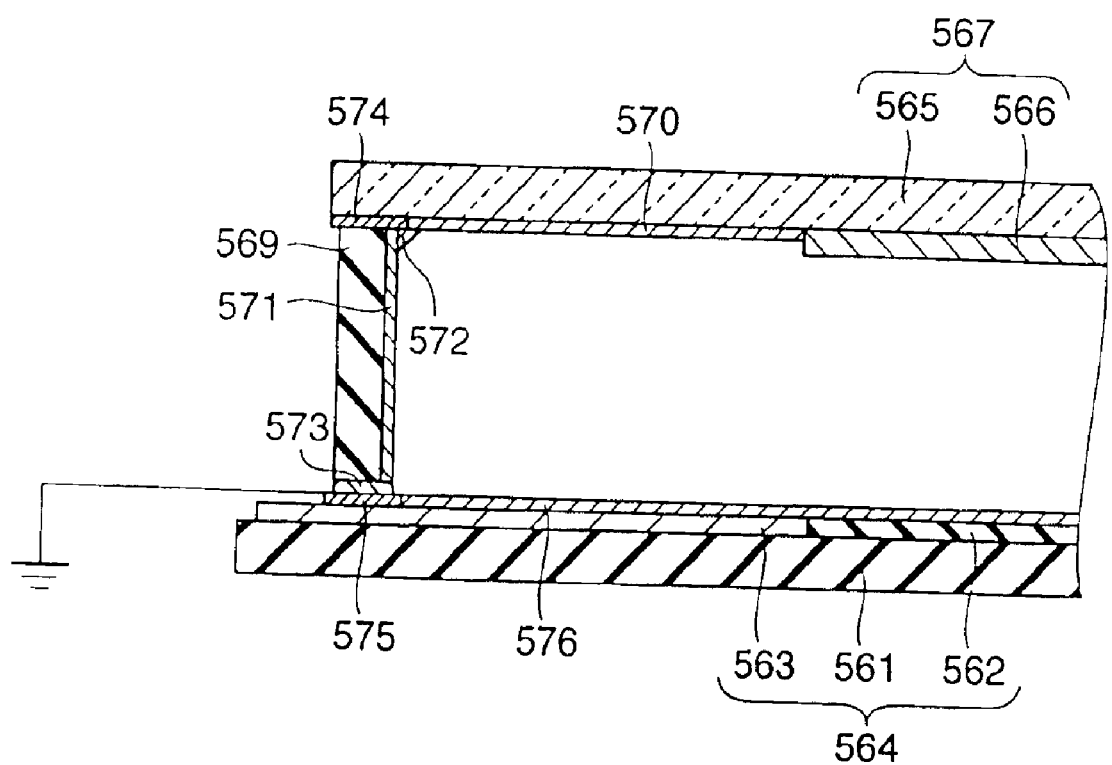
FIG. 61 is a partial cross-sectional view of the display panel section of the image formation apparatus, another example of the present invention.

FIG. 61 shows the second example of the display plate according to the present invention. In FIG. 61, the units also shown in FIG. 60 are assigned the same numbers. The image forming device shown in FIG. 61 is different from the image forming device shown in FIG. 60 in that a third conductive film 576 is formed at least on the surrounding insulating substrate of the electron source 562 and wiring 563 formed on the insulating substrate of glass, etc.

With the configuration, the third conductive film can be formed on the above mentioned rear plate in an area not provided with the conductive film and the electrode, for example, on the surface of the substrate 561 between the wiring in the x direction, between the wiring in the Y direction, and between respective electron emission devices. Since the third conductive film is electrically connected to the electrode potential, grand potential, etc. such that the potential can be close to that of the drive voltage of the electron emission device, the distortion and the fluctuation of the electronic beam orbit due to accumulation of electrical charge at the areas can be suppressed. It is desired that the sheet resistance of the third conductive film is equal to or smaller than $10^{11}$ $\Omega/\square$ from the viewpoint of aiming at antistatic properties, and it is also desired that it is equal to or larger than $10^8$ $\Omega/\square$ from the viewpoint of reserving each wiring and insulation between electrodes and reducing insignificant power consumption by a leak current. The material forming the third conductive film and the method of forming a film can be the same as the material and the method of the first and the second conductive films.

Since the third conductive film 576 is set to a resistance value for reserving the insulation between each wiring and electrode, the film can be formed on the entire rear substrate forming an electron source, or the third conductive film can be formed on the substrate 561 in advance, and the electron source 562 and the wiring 563 can be formed thereon.

Next, the joint portion produced, for example, in the configuration shown in FIG. 60 or 61 will be described. First the face plate 567 is produced as an image display portion. On one side of a glass substrate 565 of the face plate 567 is provided with a transparent electrode comprising an ITO in advance. The ITO film functions as the first conductive film according to the present invention, and the sheet resistance is $2\times10^3$ $\Omega/\square$.

The image forming material 566 is an image forming material, has stripes of fluorescent object for realizing a color, and first forms a black stripe so that the fluorescent film 566 can be produced by applying a fluorescent object of each color to the space area in the slurry method. As a material of the black stripe, a commonly used material mainly containing graphite is adopted. In addition, a metal back is provided on the surface of the fluorescent film 566 facing the electron source. The metal back is produced by performing smoothing process (normally referred to as a filming process) on the inside surface of the fluorescent film 566 after producing the fluorescent film 566, and then performing a vacuum vapor deposition of Al.

Then, the frame unit 569 is produced. The frame unit 569 is made of soda lime glass, and the second conductive film made of chrome oxide is generated by an electron beam assisted vapor deposition process. The sheet resistance is set to $3\times10^{10}$ $\Omega/\square$. Then, an electrode of an Al vapor deposition film is formed over the adhesion plane to be adhered to the rear substrate of the frame unit 569 and the end of the second conductive film.

As described above, the produced face plate 567 is mounted through the frame unit 569 3 mm above the rear substrate which is formed with a number of surface conductive electron emission devices, and the conductive frit glass obtained by mixing the filler of Au particles is applied to the joint portion between the face plate 567 and the frame unit 569, and normal (insulating) frit glass is applied between the frame unit 569 and the rear plate 564, and is then sintered for 10 minutes in the atmosphere at 410° C.

Furthermore, with the configuration using the third conductive film, first, the third conductive film is formed on the front plane on which the electron source of the above mentioned rear substrate is formed by RF magnetron sputtering. The used target is carbon and the film thickness is about 2 nm. The sheet resistance value at this time is $5\times10^8$ $\Omega/\square$ approximately. Then, after forming an image forming material comprising the fluorescent film 566 and the metal back, the first conductive film 570 comprising a carbon thin film is formed on the glass substrate around the image forming material. The first conductive film 570 is formed by spraying the solution obtained by dispersing the carbon dispersion material having the particle diameter of 0.1 μm in an organic solvent. The carbon dispersion material mainly contains graphite having an additive of $TiO_2$ to reduce the conductivity. After the application, a heating process is performed at 200° C. to stabilize the carbon thin film. The thus generated first conductive film is about 1 μm thick, and the sheet resistance is $2\times10^7$ Ω/□.

Furthermore, the frame unit 569 is produced. The frame unit 569 is made of soda lime glass, and the second conductive film comprising tin oxide is formed by the electron beam assisted vapor deposition process. The sheet resistance is set to $2\times10^{10}$ Ω/□. Then, an electrode of an Al vapor deposition film is formed over the adhesion plane to be adhered to the rear substrate of the frame unit 569 and the end of the second conductive film. In the above mentioned operation, the configuration using the first to third conductive films can be obtained.

(Ninth Configuration)

There can be various configurations as the configuration of the spacer itself. For example, the configuration shown in FIG. 62 can be adopted. Such a spacer has the following features.

PD glass has the thermal expansivity similar to that of the soda lime glass used for a face plate, a rear plate, and a frame member constituting an enclosure of the vacuum container. Therefore, a display panel hardly generates destruction or distortion during the display panel assembling process or the heating process in the vacuum process. In addition, the movement of the electric charge in the high electric field (several kV/mm) is considerably small than in the soda lime glass. Therefore, at a high voltage applied between the anode electrode on the face plate and the electron source on the rear plate, there is little discharge along the spacer or deterioration in the spacer material. Therefore, the reliability of the spacer material and the display panel can be greatly improved.

An electrode can be formed for two planes touching the face plate and the rear plate and/or a part of the side portion of the spacer in the following process.

(a) After a mask having an opening corresponding to a spacer electrode forming portion is aligned and set proximate to the spacer, it is set in the spattering film forming device.

(b) After evacuating the spattering film forming device, and a desired vacuum is attained, a desired target material is spattered with a desired ionized gas, and a desired material is applied as a film on the surface of the spacer.

(b-1) Ti is used for a base layer by spattering a titan target in an argon gas to form a film.

(b-2) Pt is used for a spacer electrode by spattering a platinum target in an argon gas to form a film.

Titan used for a base layer has the function of improving the adhesion between the glass (including an oxide) spacer substrate and platinum which hardly become oxidized. Since the platinum low resistance film (spacer electrode) touches the high resistance film, the material has been selected because the quality deterioration hardly occurs in the high resistance film and its boundary portion in the display panel producing process (especially in a heating process) and the high voltage applying process.

The above mentioned low resistance film (spacer electrode) has the function of maintaining the electric connection between the spacer, the anode on the face plate, and the wiring on the rear plate for the entire spacer, the function of perform a desired controlling process on the electron orbit around the vicinity of the spacer, and the function of providing antistatic properties for the spacer by controlling the secondary electron emission on the surface of the spacer using a low resistance material having a low secondary electron emission coefficient.

Then, a high resistance film having the antistatic properties is formed on the spacer surface exposed in the display panel forming a vacuum container. In the high resistance film forming process, the spattering film forming device is first evacuated. When a desired vacuum is obtained, the desired target material is spattered by an ionized gas, and the surface of the spacer is covered with a film of a desired material. For example, aluminum nitride is used as a base layer, and an aluminum target is spattered in a nitrogen gas to form a film (200 to 500 Å) Then, a tungsten target and a germanium target are simultaneously spattered in a nitrogen gas, thereby forming a film (500 to 3000 Å) using a tungsten nitride and germanium alloy composite (WGeN) as a high resistance film.

This high resistance film has the function of controlling the amount of the secondary electron generated on the surface of the spacer by the crash of the electron emitted from an electron source on the rear plate, an electron reflected by the anode of the face plate, other ionized substances, or the ultraviolet and X-ray based on the secondary electron emission properties of a high resistance film, and the surface structure, and suppressing the accumulation of electric charge. Furthermore, by appropriately controlling the resistance value of a high resistance film, and a generated electric charge can be quickly removed, thereby appropriately reducing the heat by the electric current at a high electric field.

(10th Configuration)

Figure 63A:
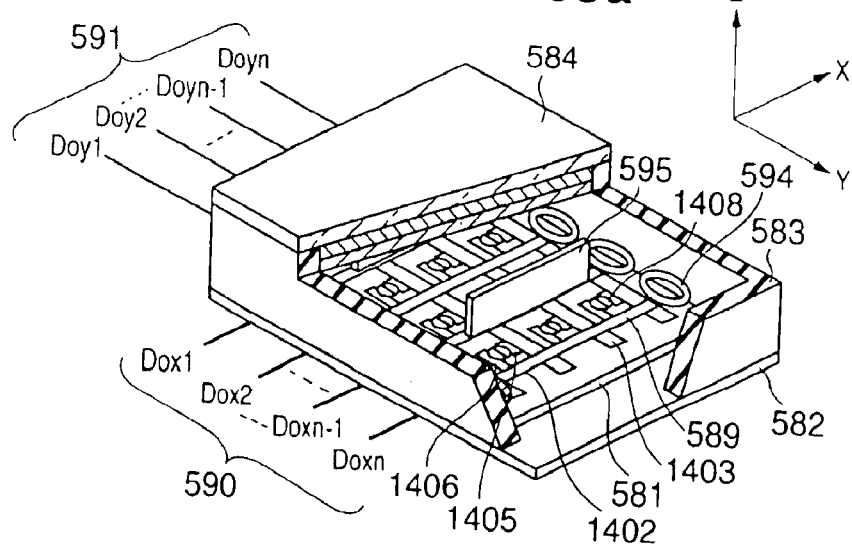
FIG. 63a is a partially cut out perspective view of the display panel section of the image formation apparatus, another example of the present invention.
Figure 63B:
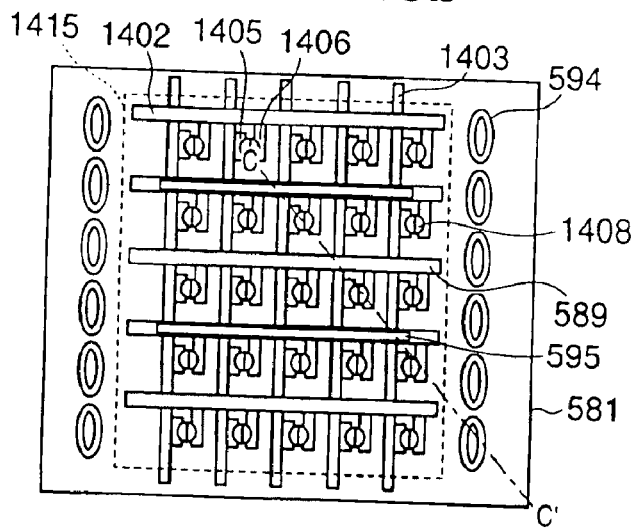
FIG. 63b is a schematic diagram showing an exemplar arrangement of getters and spacers.
Figure 63C:
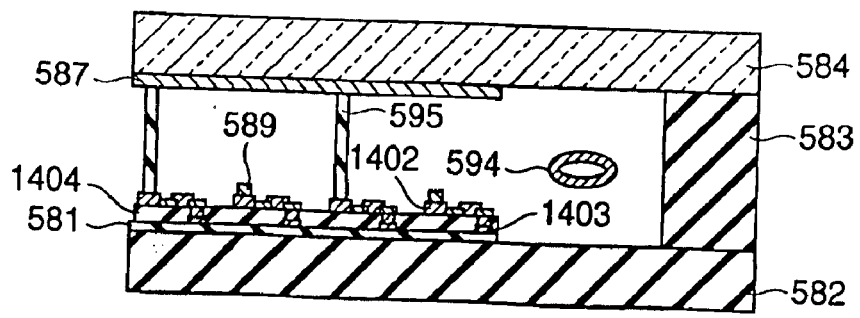
FIG. 63c is a C–C' cross-sectional view of FIG. 63b.

When a getter is provided in a container as means for maintaining a vacuum in the vacuum container of a display panel using a spacer, a type of getter can be included in the configuration between spacers. FIG. 63 shows an example of the configuration. FIG. 63a is a perspective view of an image forming device. FIG. 63b shows a type of the arrangement of the getter and the spacers. FIG. 63c is a sectional view along C–C' shown in FIG. 63b.

In FIG. 63, reference numeral 581 denotes an electron source provided by arranging a plurality of electron emission devices on a substrate with wiring appropriately set. Reference numeral 582 denotes a rear plate. Reference numeral 583 denotes a support frame. Reference numeral 584 denotes a face plate. Reference numeral 589 and 594 denote getters. Reference numeral 595 denotes a plate spacer. The rear plate 582, the support frame 583, the face plate 584, and the plate spacer 595 are adhered to each other with frit glass, etc. applied on each joint portion, thereby forming an enclosure. Inside the face plate 584, a metal back and a fluorescent object 587 are mounted.

On the above mentioned face plate and an electron source substrate, the getter 589 is mounted between spacers on the metal back or the black conductive material on the face plate side, or on the wiring in the x direction on the electron source substrate. A getter can be mounted on either side or on both sides. It is desired that the getter mounting areas are distributed evenly in the whole image display area. Furthermore, the are on which the getter 589 is mounted is desired to be larger than the mounting area of the plate spacer 595, electron source 581, and the image forming material.

On the other hand, the position of the getter 594 can be either on the face plate 584 or the rear plate 582 or on both plates if it is insulated from the metal back and an electron source inside the image forming device and outside the image display area.

It is desired that the spacer is located on the wiring from the viewpoint of the setting area and the electro-optical viewpoint. Thus, the settings do not affect the arrangement of electron emission devices. when the getter 589 is arranged on the electron source substrate side, it is preferably arranged on the wiring as in case of the spacers. When the getter is arranged on the wiring, for example, as shown in FIG. 63, it is desired to set it at an area other than the area where the spacers are arranged because a part of the getter can be covered with the spacers if the spacers are arranged on the getter located on the wiring, thereby reducing the area for the getter.

When a plurality of spacers are provided, it is desired to arrange them on the wiring between the plurality of spacers such that a part of the getters cannot covered with the spacers.

When the wiring is a matrix wiring as the row direction wiring and the column direction wiring, the wiring on which the getter is arranged can be either the row direction wiring or the column direction wiring, or the getter can be arranged on both of them.

The material of the getters 589 and 594 can be one or more kinds of metal among Ti, Zr, Cr, Al, V, Nb, Ta, W, Mo, Th, Ni, Fe, or Mn, or an alloy of them. Otherwise, the getter can be Ba covered with an appropriate mask, and can be processed in the vacuum vapor deposition method, the spattering method, the getter flash method. Now, an example indicating a feature in arranging a getter will be described.

EXAMPLE 1

With the configuration shown in FIGS. 63a to 63c, a getter layer 1409 comprising a Zr—V—Fe alloy is formed on an upper wiring 1402 in an image display area in the spattering method using a metal mask. The getter layer 589 is adjusted to be 2 μm thick and 400 μm wide, that is, wider and longer than the plate spacer which is 200 μm width. In this example, a non-evaporation getter is formed. The composition of the adopted spattering target is Zr for 70%, V for 25%, and Fe for 5% in weight ratio.

EXAMPLE 2

Figure 64A:
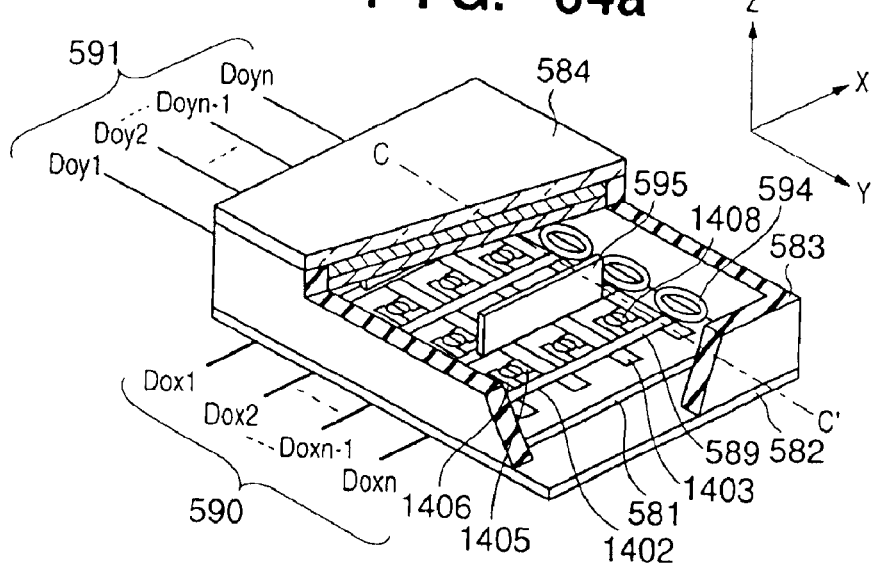
FIG. 64a is a partially cut out perspective view of the display panel section of the image formation apparatus, another example of the present invention.
Figure 64B:
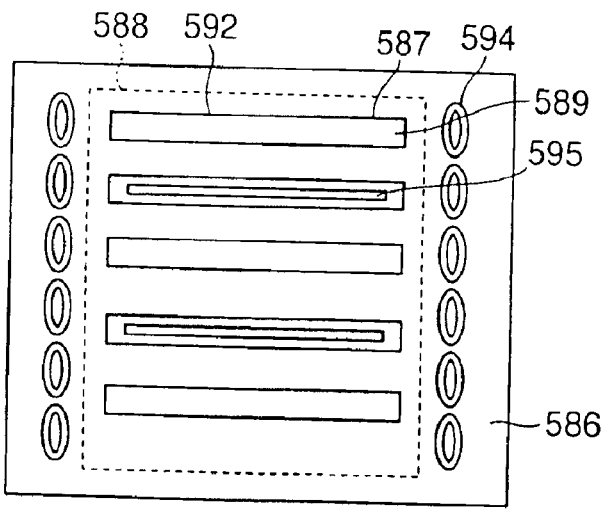
FIG. 64b is a schematic diagram showing an exemplar arrangement of getters and spacers.
Figure 64C:
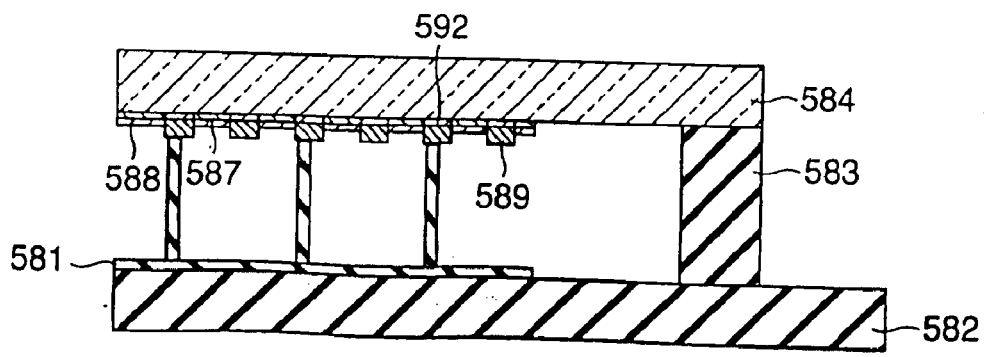

FIG. 64 shows another example of this configuration. FIG. 64a is a perspective view of an image forming device. FIG. 64b shows a type of the arrangement of the getter and the spacers. FIG. 64c is a sectional view along C–C' shown in FIG. 64a. In FIG. 64, the configuration also appearing in FIG. 63 is assigned the same reference numerals.

In this example, the getter layer 589 of Ti—Al alloy is formed in the spattering method on all black matrixes 592 of the face plate 584. The getter layer 1409 of the Ti—Al alloy is 5 μm thick, and is wider and longer than the plate spacer of 150 μm width. The composition of the alloy target in the spattering process is Ti for 85% and Al for 15%.

EXAMPLE 3

Figure 65A:
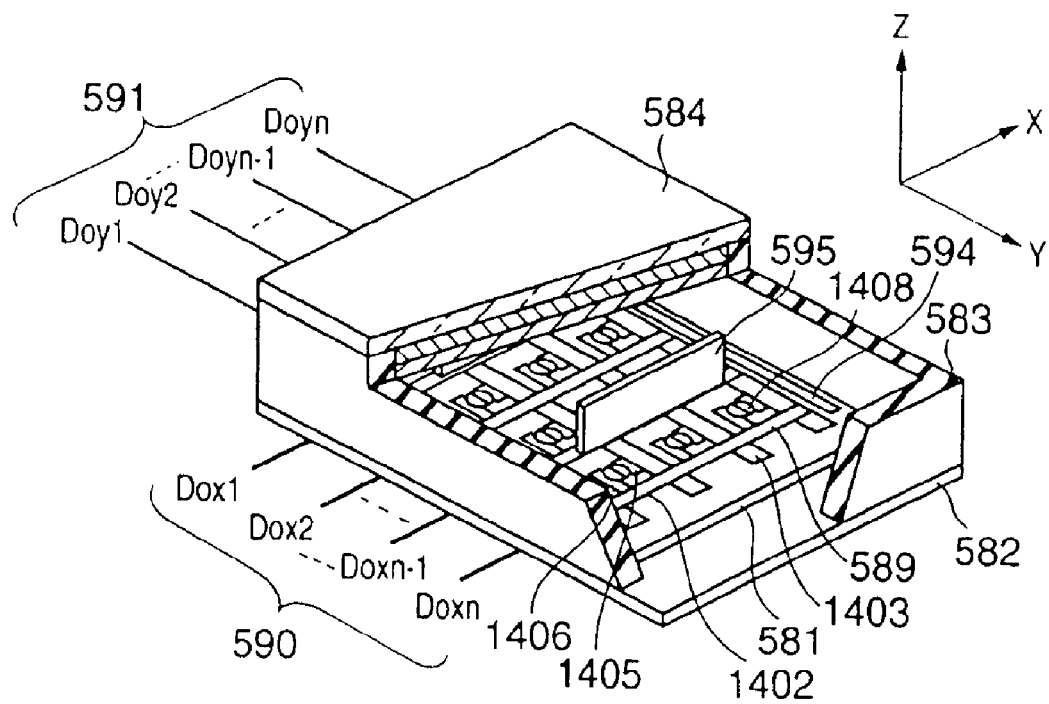
FIG. 65a is a partially cut out perspective view of the display panel section of the image formation apparatus, another example of the present invention.
Figure 65B:
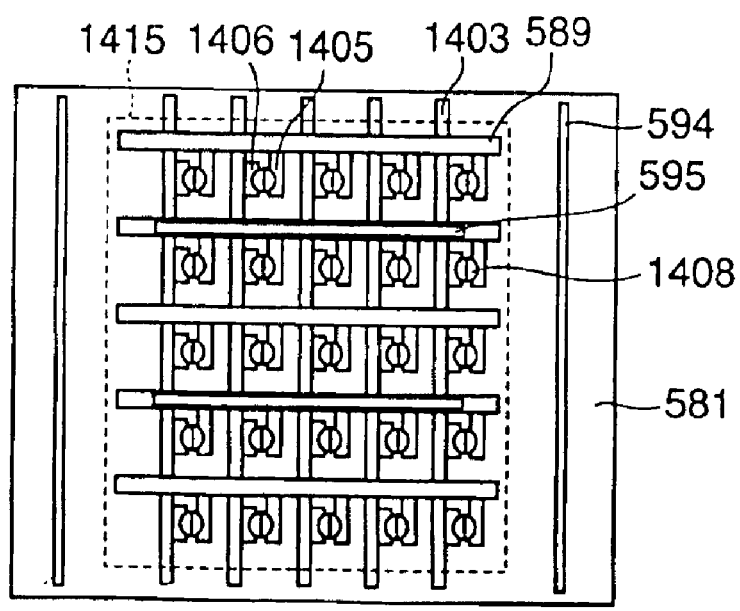
FIG. 65b is a schematic diagram showing an exemplar arrangement of getters and spacers.

FIG. 65 shows another example of this configuration. FIG. 65a is a perspective view of an image forming device. FIG. 65b shows a type of the arrangement of the getter and the spacers. In FIG. 65, the configuration also appearing in FIG. 63 is assigned the same reference numerals.

In this example, the image forming device is the same as that according to the first example with the above mentioned configuration except that the evaporation getter is in a wire form and the getter flash is performed in a resister heating process.

EXAMPLE 4

Figure 66A:
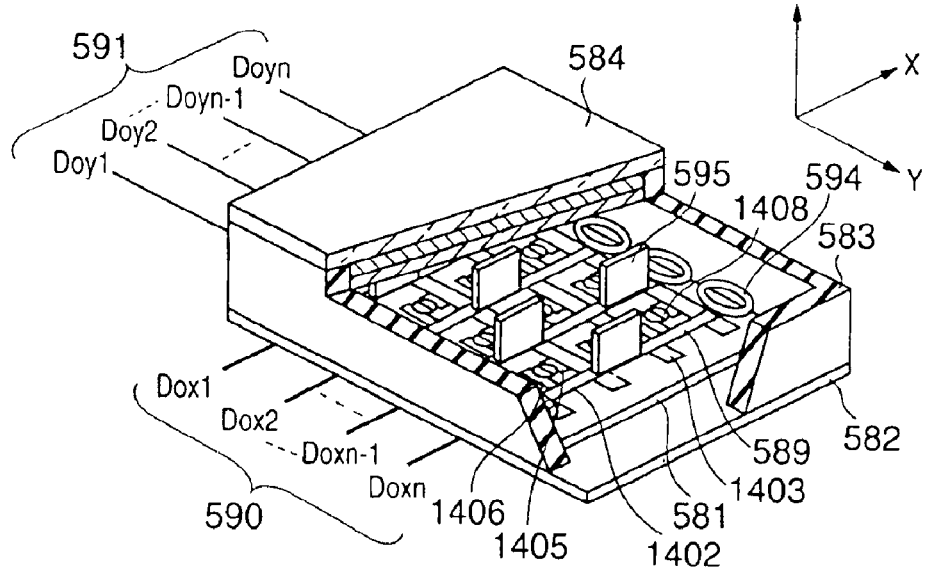
FIG. 66a is a partially cut out perspective view of the display panel section of the image formation apparatus, another example of the present invention.
Figure 66B:
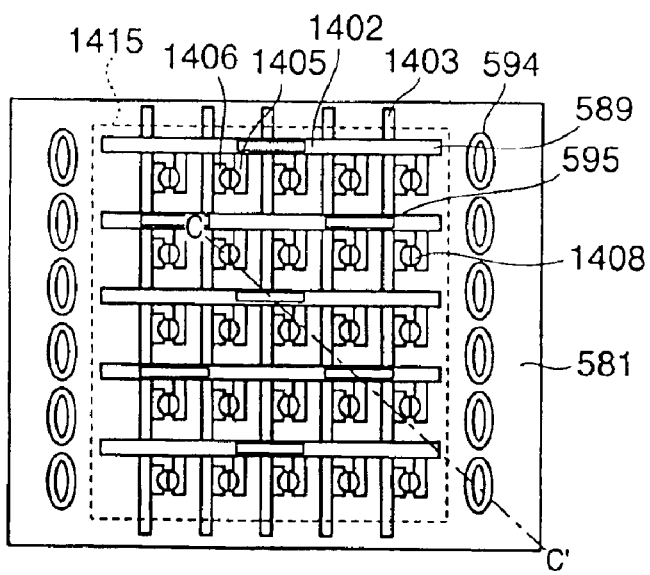
FIG. 66b is a schematic diagram showing an exemplar arrangement of getters and spacers.
Figure 66C:
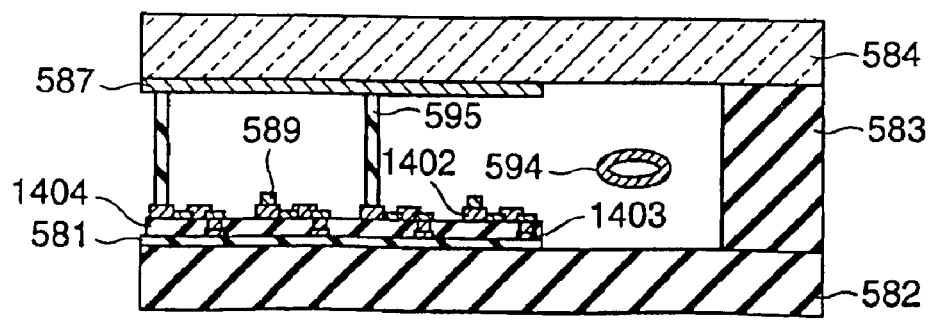
FIG. 66c is a C–C' cross-sectional view of FIG. 66b.

FIG. 66 shows another example of this configuration. FIG. 66a is a perspective view of an image forming device. FIG. 66b shows a type of the arrangement of the getter and the spacers. FIG. 66c is a sectional view along C–C' shown in FIG. 66b. In FIG. 66, the configuration also appearing in FIG. 63 is assigned the same reference numerals.

In this example, the plate spacer of 20 mm long is arranged on the wiring in the image display area in a checkered form at intervals of 50 mm, and the getter 589 is formed between spacers. Otherwise, the image forming device has the same configuration as the first example.

EXAMPLE 5

Figure 67A:
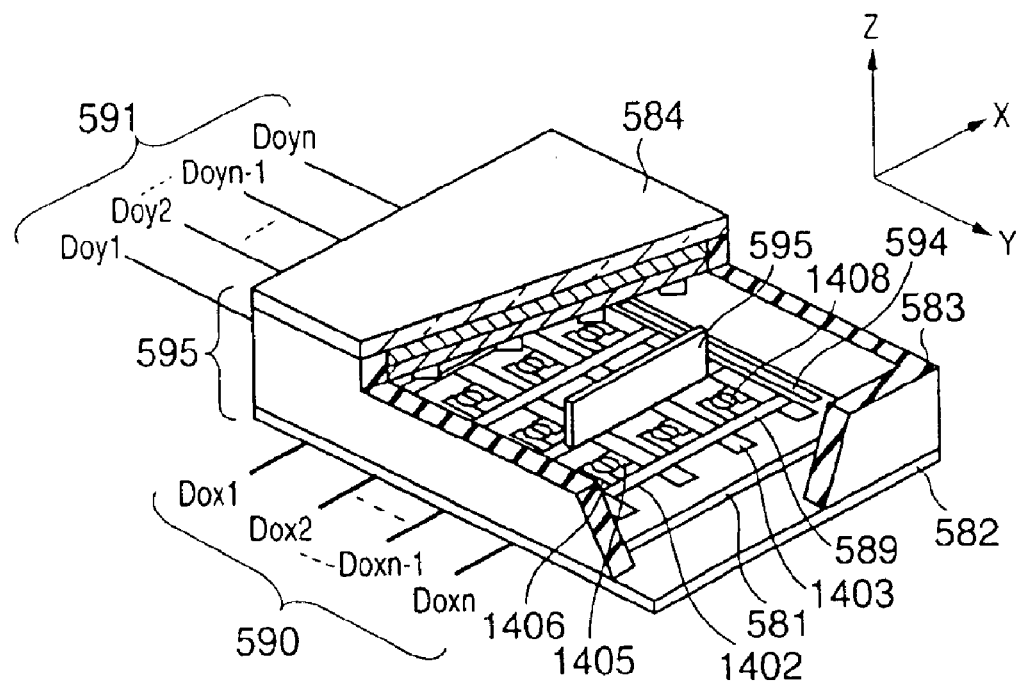
FIG. 67a is a partially cut out perspective view of the display panel section of the image formation apparatus, another example of the present invention.
Figure 67B:
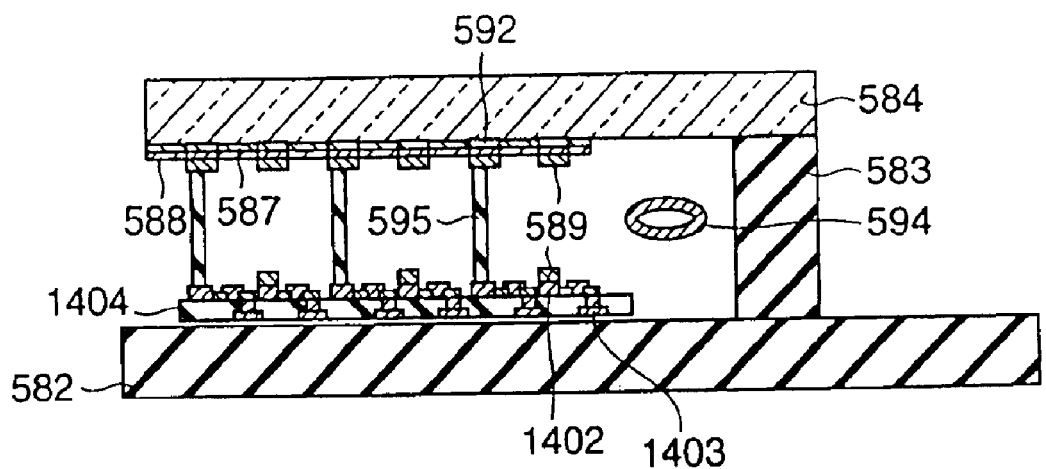

FIG. 67 shows another example of this configuration. FIG. 67a is a perspective view of the image forming device. FIG. 67b shows the sectional view of the image forming device.

According to this example, the image forming device is the same as that in the first example except that the getter 589 is formed on the upper wiring 1402 and the black matrix 592 in combination use of the processes in the first and second examples of the above mentioned configurations.

According to the above mentioned tenth configuration, the mounting area of the getter material is set larger than the mounting areas of the plate spacer, the electron source substrate, and the image forming material. Therefore, the getter material can be mounted in a larger area and near the area in which a gas is discharged. As a result, a gas emitted in an enclosure is quickly adsorbed by the getter material, a vacuum in an enclosure is well maintained, and the amount of emitted electrons from the electron emission device can be stabilized. Therefore, the deterioration of the features can be reduced, and the reduction of the intensity when a long term operation is performed, especially around the outside the image display area, can be lowered, and the uneven intensity can be reduced.

(11th Configuration)

The arrangement of the getter can be designed as follows. That is, (1) First, in a display panel having an electron source substrate, a plurality of electron emission devices arranged in a matrix form on a substrate, connected through wiring with an opposite electrode, and, in an enclosure, an image forming material having a fluorescent film provided face to face with the substrate, wherein a non-evaporation getter is formed on the wiring of the electron source substrate, and the electric resistance between arbitrary two points of the continuous non-evaporation getters is higher than the electric resistance of the wiring on which the non-evaporation getter between the two points is formed.

(2) Second, the simple matrix wiring method applied to the above mentioned electron source substrate is realized by a scanning side wiring connecting one of the opposite electrodes and a signal side wiring connecting the other, the wiring on which the non-evaporation getter is formed is a scanning side wiring of the electron source substrate.

With this configuration, if the wiring portion forming the non-evaporation getter (NEG) and the wiring portion not forming the NEG coexist, the uneven voltage drop for each wiring portion can be reduced. Therefore, the uneven intensity by forming non-evaporation getter can be minimized, so the getter material can be arranged on the wiring near the gas emitting portion as well. As a result, the gas generated in the enclosure after the sealing process can be quickly adsorbed by the getter material, and the vacuum in the enclosure can be well maintained, thereby stabilizing the amount of emitted electrons from the electron emission devices. In the case of the electron source substrate of the simple matrix wiring, the getter material can be designed to be formed on both scanning side wiring and signal side wiring, or on only one wiring side. When it is formed on one side, it is desired that the getter is formed on the scanning side wiring because, in the case of the simple matrix drive, it is desired that a larger amount of electric current flows in the X direction wiring, which is a scanning wiring, than in the Y direction wiring which is a signal wiring, thereby making a wider X direction wiring, and a larger NEG forming area.

Figure 68:
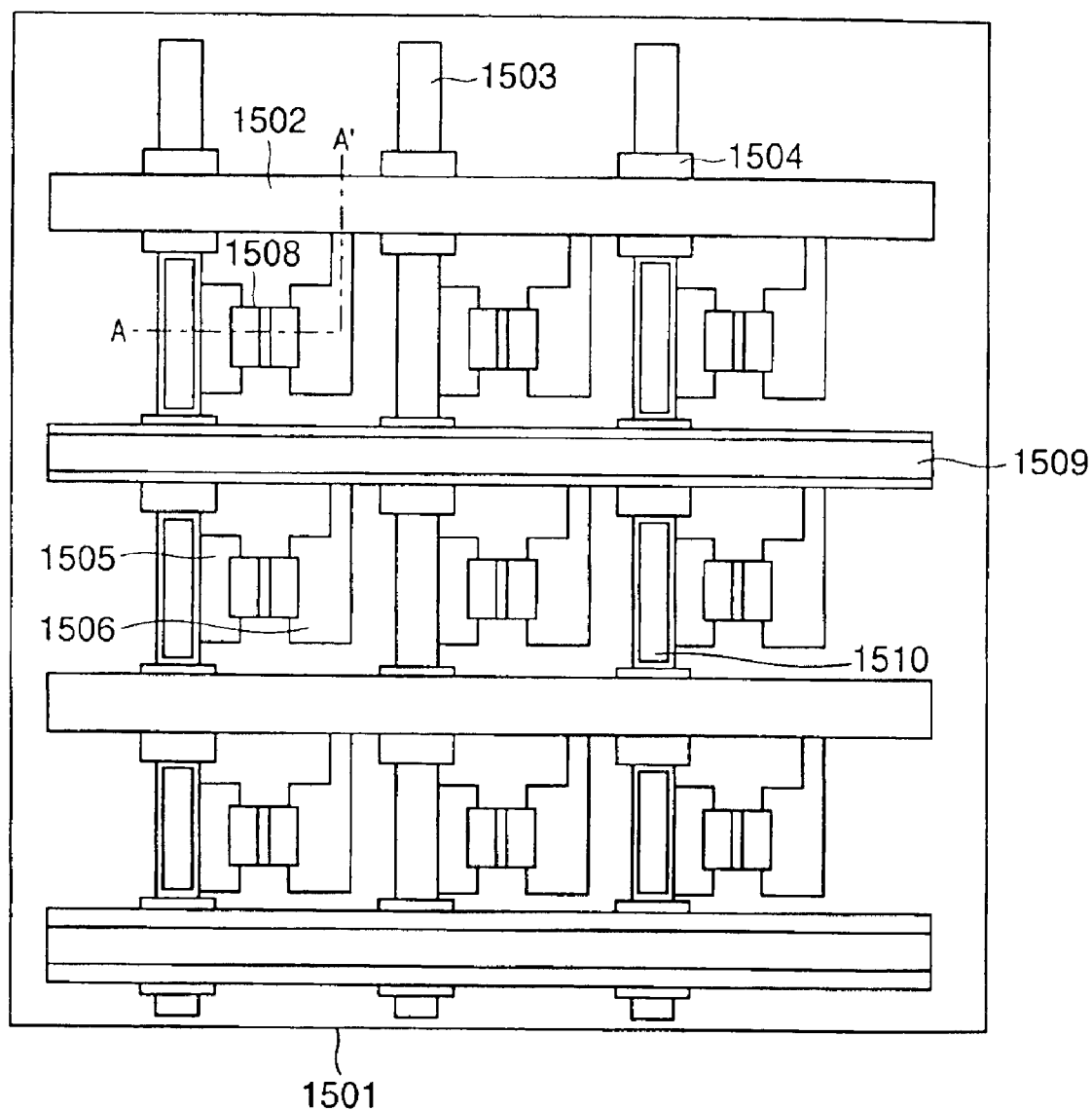
FIG. 68 is a plan view schematically showing a wired in matrix configuration of two-dimensionally placed electron beam sources applied to the image formation apparatus of the present invention.
Figure 69:
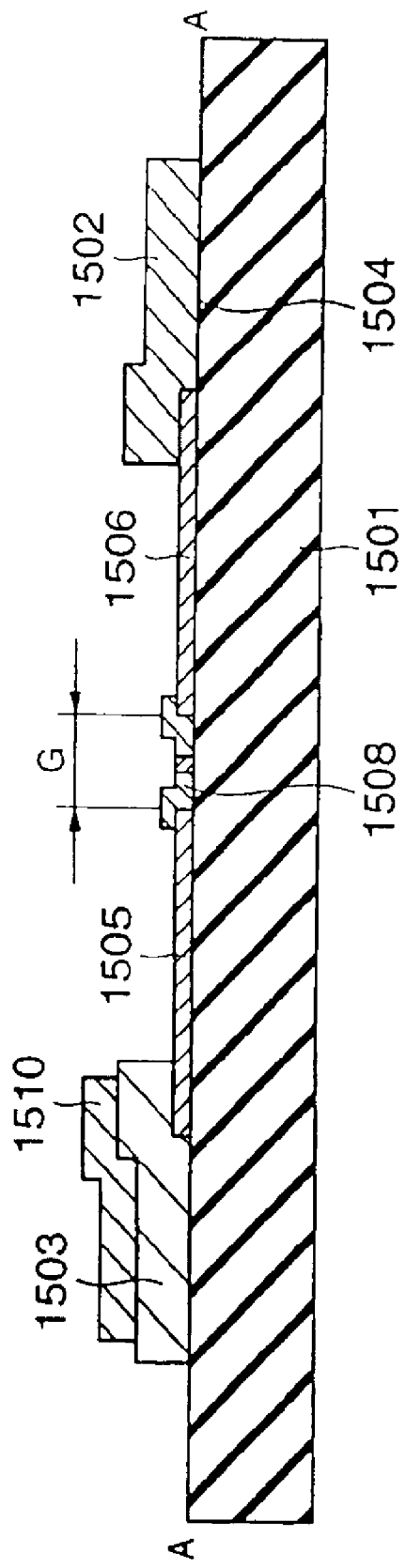
FIG. 69 is an A–A' cross-sectional view of FIG. 68.

FIGS. 68 and 69 show a type of the configuration in which two-dimensional array of electron sources are connected through matrix wiring. FIG. 68 is a plan view. FIG. 69 is a sectional view along A–A' shown in FIG. 68. Reference numeral 1502 denotes an X direction wiring (scanning side wiring, upper wiring), and reference numeral 1503 denotes a Y direction wiring (signal side wiring, lower wiring). They are respectively connected to an electron emission device 1508 through device electrodes 1505 and 1506. The interconnection between the Y direction wiring 1503 and the X direction wiring 1502 has an insulation layer 1504 formed on the Y direction wiring 1503. The X direction wiring 1502 is formed on them. The X direction wiring 1502, the Y direction wiring 1503, the device electrodes 1505 and 1506, and the electron emission device 1508 are formed by the combination of the photolitho process and the vacuum vapor deposition method, the planting method, the printing method, the method of resolving metal in a solution, providing a drop of the solution, and sintering it, etc.

Non-evaporation getters (NEG) 1509 and 1510 are formed on the wiring of the electron source substrate. The non-evaporation getter can be formed in both X direction (scanning side wiring, upper wiring) and Y direction (signal side wiring, lower wiring), and can be formed only in one direction. When it is formed on one direction, it is desired to be formed on the X direction wiring because, in the case of the simple matrix drive, it is desired that a larger amount of electric current flows in the X direction wiring, which is a scanning wiring, than in the Y direction wiring which is a signal wiring, thereby making a wider X direction wiring, and a larger NEG forming area. It is desired that it is evenly distributed in the entire image display area (therefore, the present getter is referred to as an internal display area getter).

The material of the non-evaporation getter (NEG) formed on the wiring can be one or more kinds of metal among Ti, Zr, Cr, Al, V, Nb, Ta, W, Mo, Th, Ni, Fe, or Mn, or an alloy of them. The getter can be produced by the patterning through the photolitho process, the vacuum vapor deposition method, or the spattering method. The non-evaporation getter (NEG) can also be produced using one or more kinds of metal selected from the above mentioned getter materials, or the alloy of them, or by mixing them with another kind of metal, non-metal material, etc. by printing process in the screen method and the offset method, and using the plating method, etc.

The electric resistance between continuous arbitrary two points of a non-evaporation getter is set to be higher than the electric resistance between the two points of the wiring below the non-evaporation getter. It is thus designed because a larger electric current flows through the non-evaporation getter than through the wiring, thereby changing the voltage dropping substantially, and generating uneven intensity of the image forming device when the electric current flows through the non-evaporation getter mainly made of metal at the upper portion when the electric current flows through the wiring when it is driven in the energization forming process and the activating process in the device forming process described later in the image forming device containing a wiring portion forming the non-evaporation getter and the wiring portion not forming the non-evaporation getter. When the electric resistance between continuous arbitrary two points of a non-evaporation getter is set to be higher than the electric resistance between the two points of the wiring below the non-evaporation getter, there is small unevenness of voltage drop between the wiring portion forming a non-evaporation getter and the wiring portion not forming it, and the uneven intensity can be reduced.

Next, an example of the eleventh configuration will be described.

EXAMPLE 1

Figure 70A:
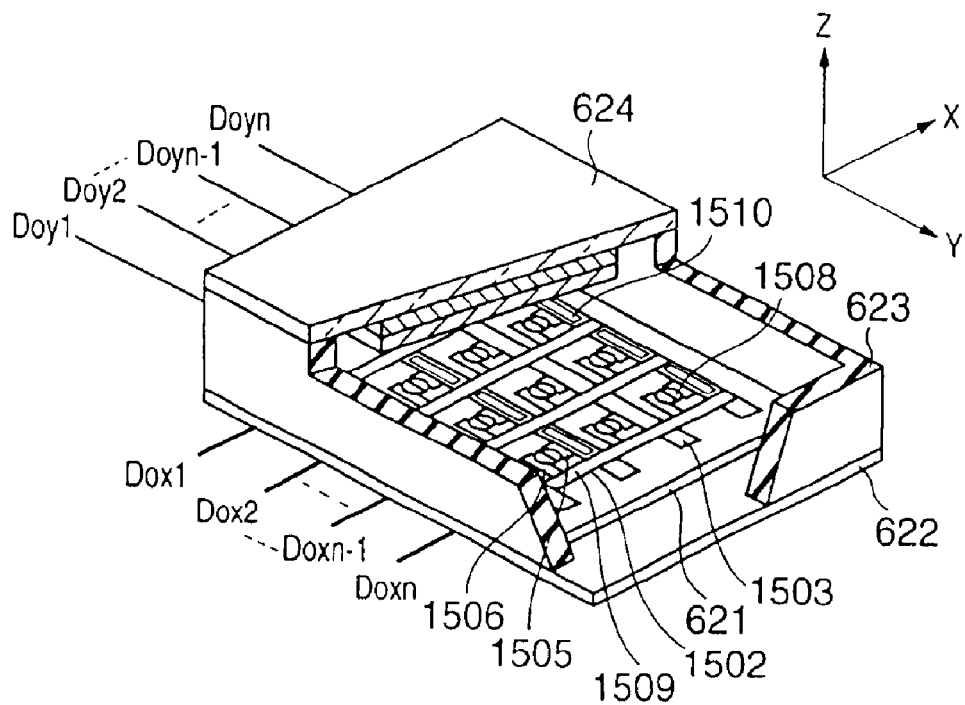
FIG. 70a is a partially cut out perspective view of the display panel section of the image formation apparatus, another example of the present invention.
Figure 70B:
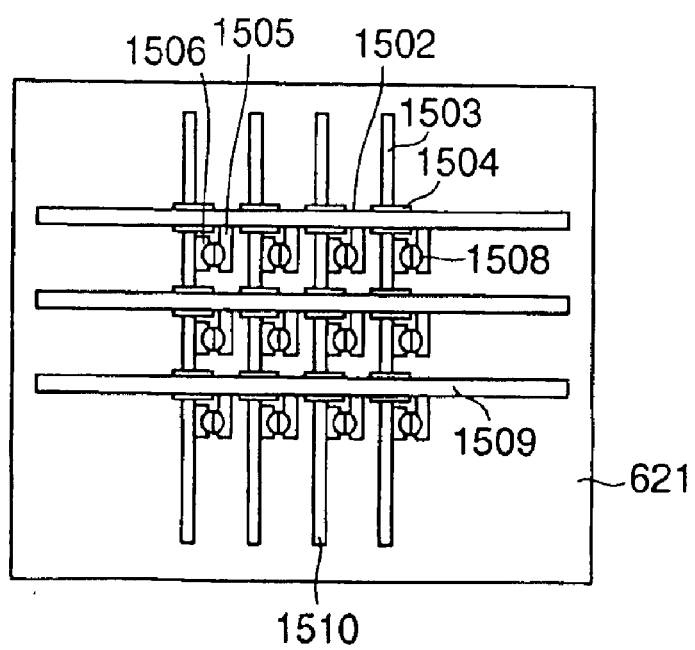

FIG. 70 shows the configuration of the image forming device to which the eleventh configuration is applied. FIG. 70*a* is a perspective view. FIG. 70*b* is a top view. In these figures, the units also shown in FIG. 68 are assigned the same reference numerals.

Reference numeral 621 denotes an electron source, and is obtained by arranging a plurality of electron emission devices on a substrate with appropriate wiring. Reference numeral 622 denotes a rear plate. Reference numeral 623 denotes a support frame. Reference numeral 624 denotes a face plate. These units are adhered to each other using a frit glass, etc. at respective joint portions, thereby forming an enclosure. A metal back and a fluorescent object are arranged inside the face plate 624.

The display panel according to this example includes non-evaporation getters (NEG) on the X direction wiring (upper wiring) and the Y direction wiring (lower wiring) every second position as shown in FIGS. 70*a* and 70*b*. The display panel according to this example also includes on the substrate an electron source containing a plurality of (100 rows×300 columns) surface conductive electron emission devices in a simple matrix wiring. FIGS. 68 and 69 show partial plan views of the electron source.

An electron source substrate 1501 comprises the X direction wiring 1502 (upper wiring, also referred to as a scanning side wiring) provided corresponding to Dox1 to Doxn, the Y direction wiring 1503 (lower wiring, also referred to as a signal side wiring) provided corresponding to Doy1 to Doyn, the electron emission device 1508, the device electrodes 1505 and 1506, the inter-layer insulation layer 1504, the non-evaporation getters 1509 and 1510. Each of the non-evaporation getters 1509 and 1510 is adjusted to be 2 $\mu$m thick. Using the thickness of the film, the resistance value of the non-evaporation getter between the arbitrary two points on the film of the continuous non-evaporation getters is higher than the resistance of the wiring between the lower two points.

The resistance ratio (volume resistance ratio) of the lower and upper wiring is $5\times10^{-8}$ $\Omega$m, and the volume resistance ratio of one getter is $4.1\times10^{-7}$ $\Omega$m. The sectional area of the lower wiring at a given point is 1000 $\mu$m$^2$, the sectional area of the getter is 100 $\mu$m$^2$, and the resistance values at intervals of 1 cm are 0.5 $\Omega$ and 20.5 $\Omega$. With the configuration, the resistance value of the getters is sufficiently larger than the resistance value of the lower wiring. In addition, the sectional area of the upper wiring at a given point is 1500 $\mu$m$^2$, the sectional area of the getter is 100 $\mu$m$^2$, and the resistance values at intervals of 1 cm are 0.33 $\Omega$ and 20.5 $\Omega$. With the above mentioned configuration, the resistance value of the getter can be sufficiently larger than the resistance value of the upper wiring.

In this example, the method of forming a non-evaporation getter can be the photolitho process, and the spattering film forming method. However, the present invention is not limited to these methods. That is, similar effects can be obtained by the patterning method using a metal mask, a method of drawing with adhesives using a dispenser and printing, and adhering the powder of a non-evaporation getter, the plating method, etc. The similar methods can be used with the effect described below when an arbitrary pattern is to be formed in addition to the pattern of arranging the NEGs at every second position.

EXAMPLE 2

Figure 71A:
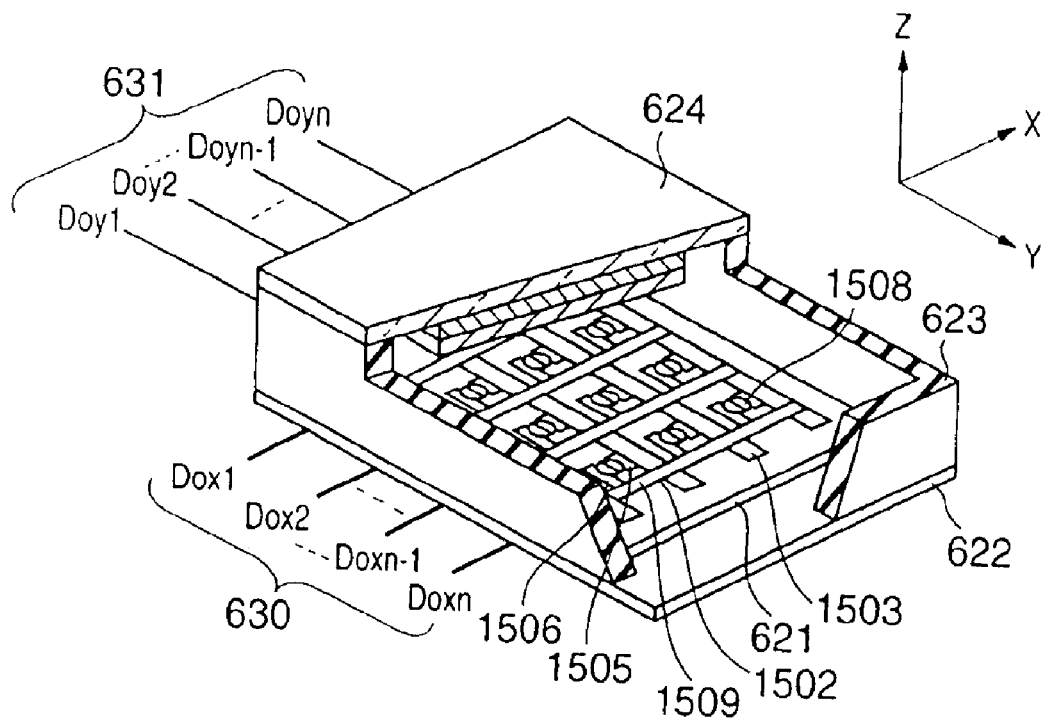
FIG. 71a is a partially cut out perspective view of the display panel section of the image formation apparatus, another example of the present invention.
Figure 71B:
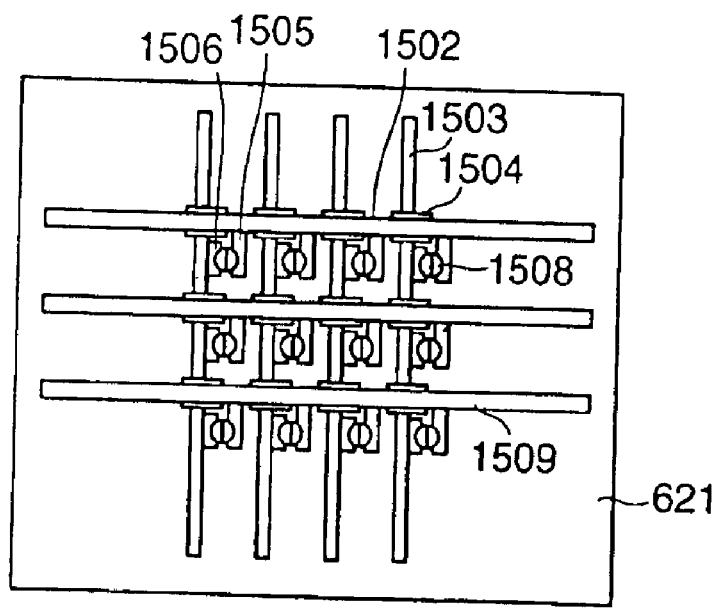

FIG. 71 shows another example of the image forming device to which the eleventh configuration is applied. FIG. 71a is a perspective view, and FIG. 71b is a top view. In these figures, the components also shown in FIGS. 68 and 70a, and 70b are assigned the same reference numerals. The configuration is different from the above mentioned first example of this configuration in that the non-evaporation getter is formed at every second position only on the X direction wiring (upper wiring).

According to the above mentioned eleventh configuration, in the image forming device having an electron source substrate on which a plurality of electron emission devices are arranged in a matrix form on the substrate and wired, and a fluorescent film provided opposite to the substrate, a getter material is mounted near the gas emitting portion in a large range by forming a non-evaporation getter on the wiring of the electron source substrate of the image forming device. In this case, since it is not necessary to provide a vaporizing source of the getter material above the wiring, the electronic orbit is not affected when the system is driven, the gas generated in the enclosure after the sealing process can be quickly adsorbed, and the vacuum in the enclosure can be well maintained, thereby stabilizing the amount of emitted electrons from the electron emission devices, and reducing the deterioration of the features. Therefore, the reduction of the intensity when a long time operation is performed, especially the reduction of the intensity near outside the image display area, and the uneven intensity can be suppressed.

When a non-evaporation getter is formed, the electric resistance of the non-evaporation getter is set to higher than the electric resistance of the wiring so that the uneven voltage drop can be reduced even when there are some wiring portions on which a non-evaporation getter is formed and others on which a non-evaporation getter is not formed. As a result, the uneven intensity of the image forming device can be reduced.

In the activating process of a getter, there is no need of performing the vaporizing getter incorporating process and the getter flash process, thereby performing only the heating process to produce an image forming device with good yield.

(12th Configuration)

The following configuration can be designed as an aspect of arranging a getter. That is, in a display panel forming an enclosure by arranging the electron source substrate having a plurality of electron emission devices, and the emission display substrate having an image forming material face to face, a non-evaporation getter (NEG) can be continually provided on the wiring formed for the electron source substrate.

With the configuration, the length of one NEG unit provided on the wiring, etc. is rather short to make a continuous body. Therefore, the stress occurring in the film is not large. As a result, the NEG can be prevented from being peeled off, and there are no destruction in the even distribution of the NEG over the image display area. As a result, the pressure distribution in the image display device can be evenly maintained. In addition, not only the NEG, but also each wiring arranged thereunder can be prevented from being peeled off or disconnected. Furthermore, the peeled-off NEG or the portion where an NEG film is not fully peeled off but partially detached can be prevented from being a trigger of break down discharge or short-circuit. Thus, the yield of forming an image display device can be enhanced.

Furthermore, the length of the continually set NEG unit can be shorter than the pitch of picture elements of the electron emission devices, or can be equal to the pitch of the picture elements of the electron emission devices.

Figure 72A:
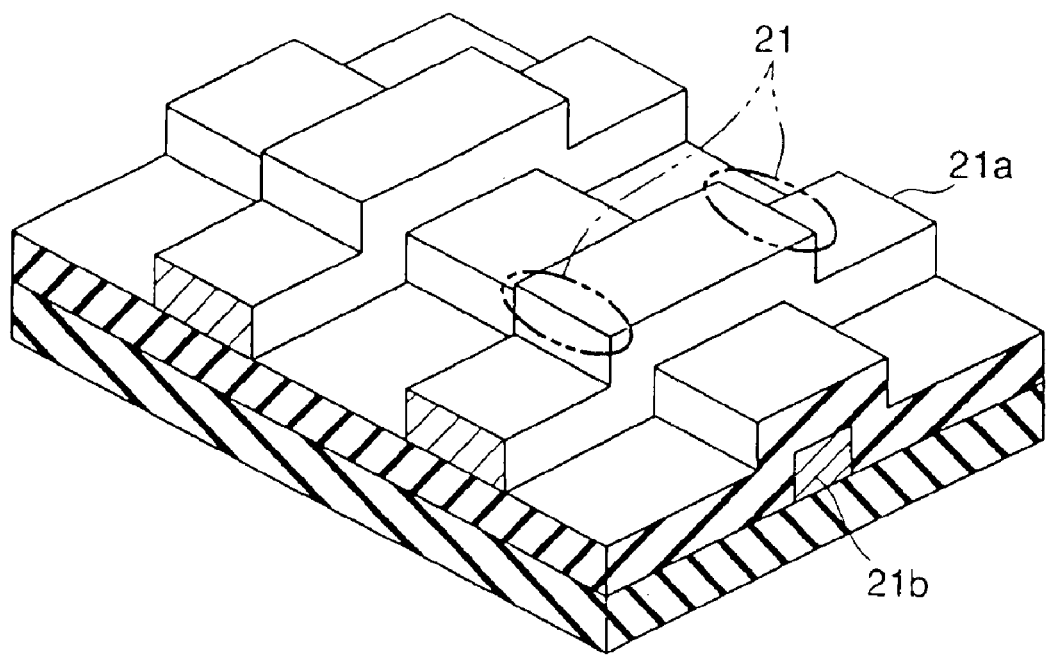
FIG. 72a is a perspective view showing a exemplar structure of an intersection of a lower wire and an upper wire.
Figure 72B:
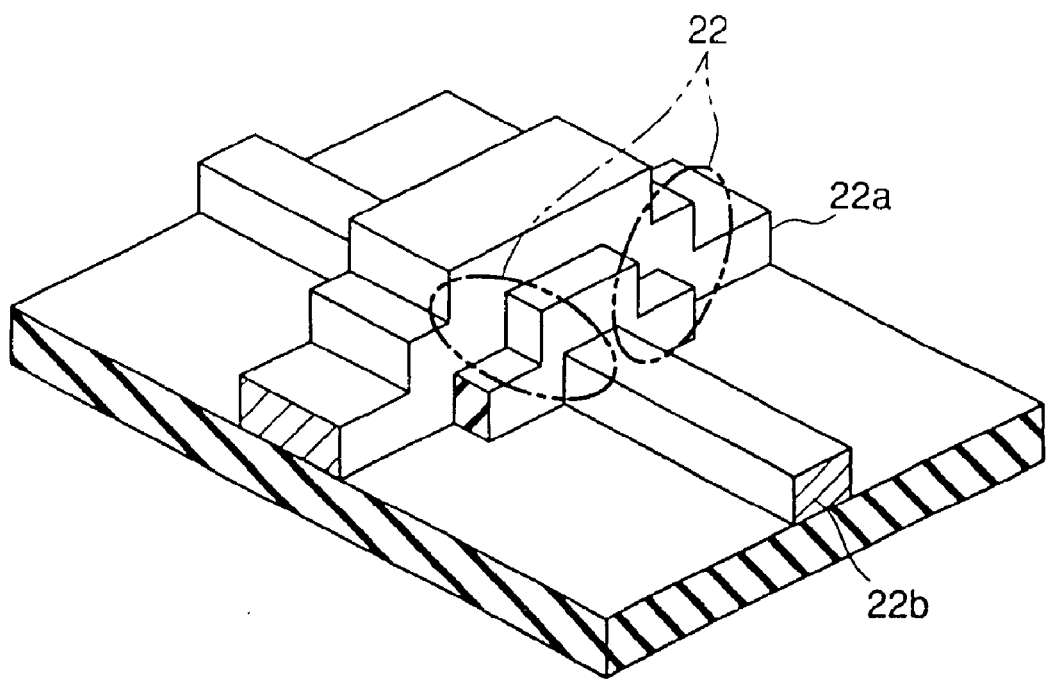
FIG. 72b is a perspective view showing another exemplar structure of an intersection of a lower wire and an upper wire.

Since the display panel has electron emission devices arranged in a two-dimensional array, the wiring for providing electric energy or a signal can have a number of intersecting portions of layer wiring as represented by the matrix wiring. The intersecting portions have a gap without a smoothing process. For example, as shown in FIG. 72a, the portion 21 at the intersection between the lower wiring 21b and the upper wiring (including the NEG) 21a is subject to a disconnection by the stress of the film. In addition, as shown in FIG. 72b, there is the possibility that the insulation is lost at a non-contact portion such as a portion 22 at the intersection portion between the lower wiring 22b and the upper wiring (including the NEG) 22a. Especially, each time a conductive material is increased and laid at the intersection point, there arises the strong possibility described above. The NEG is metal, and is desired to be thicker. Therefore, mounting the NEG on the wiring intersection portion invites a disconnection and a short circuit between the upper and lower wiring.

Figure 73A:
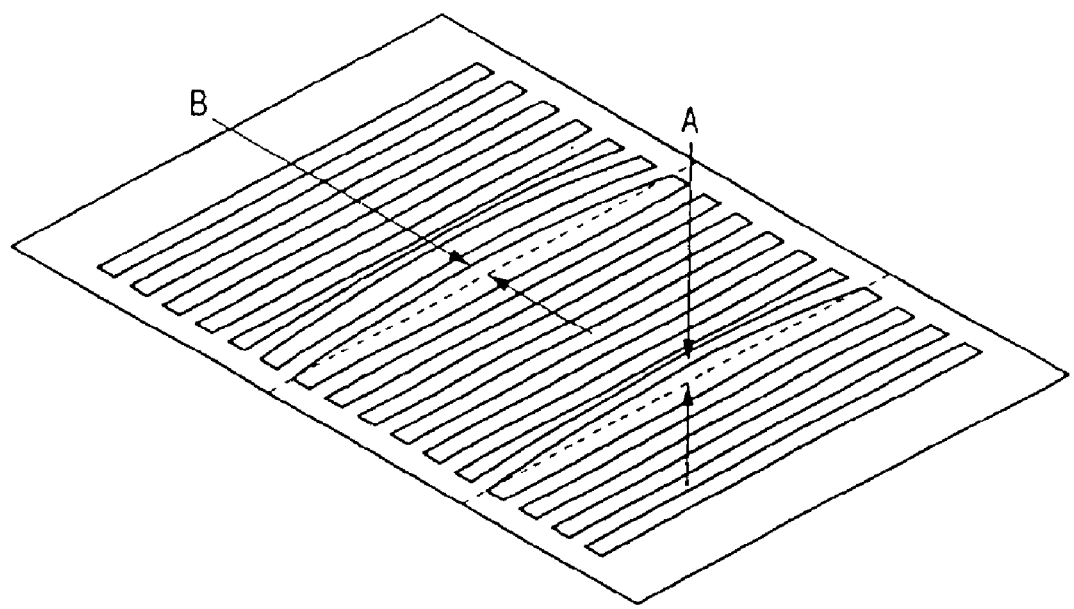
FIG. 73a is a schematic view showing floating or distortion of a mask.

In addition, when the NEG is continuously mounted on a long pattern as wiring in the NEG film generating process, the turn-over of the NEG material can be predicted if a mask depo using a metal mask is assumed (refer to FIG. 73a). In FIG. 73a, A indicates a mask being peeled-off, and B indicates the distortion of the mask.

Figure 73B:
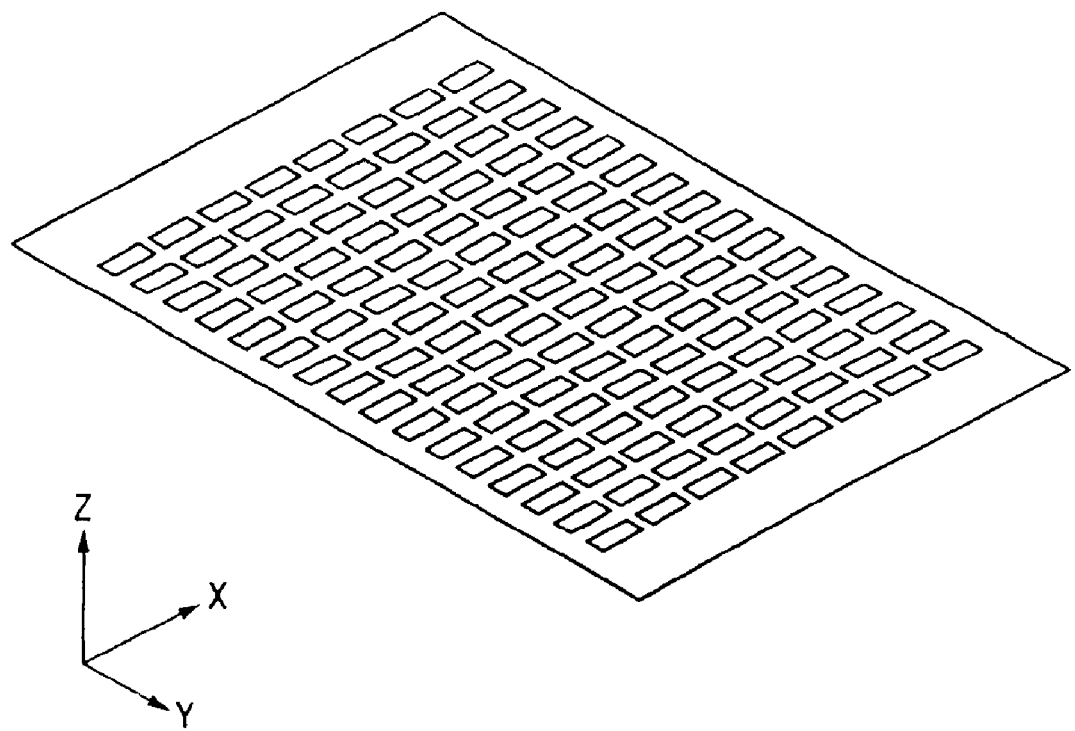
FIG. 73b is a schematic view to explain diffraction of a non-evaporation type getter.

With the above mentioned configuration, the length of the NEG is equal to or shorter than the pitch of the picture element. Therefore, it can be mounted as not overlapping the above mentioned intersection of the wiring, thereby easily avoiding the possibility of a disconnection or a short circuit. In addition, when a metal mask is used, the effect obtained when a reinforcing pattern for a mask is provided in corresponding to the discontinuous portion of the NEG film can be obtained, thereby avoiding the turn-over of the NEG material (refer to FIG. 73b). As a result, the yield of forming an image forming device can be enhanced. Now, an example of this configuration will be described.

EXAMPLE 1

Figure 74:
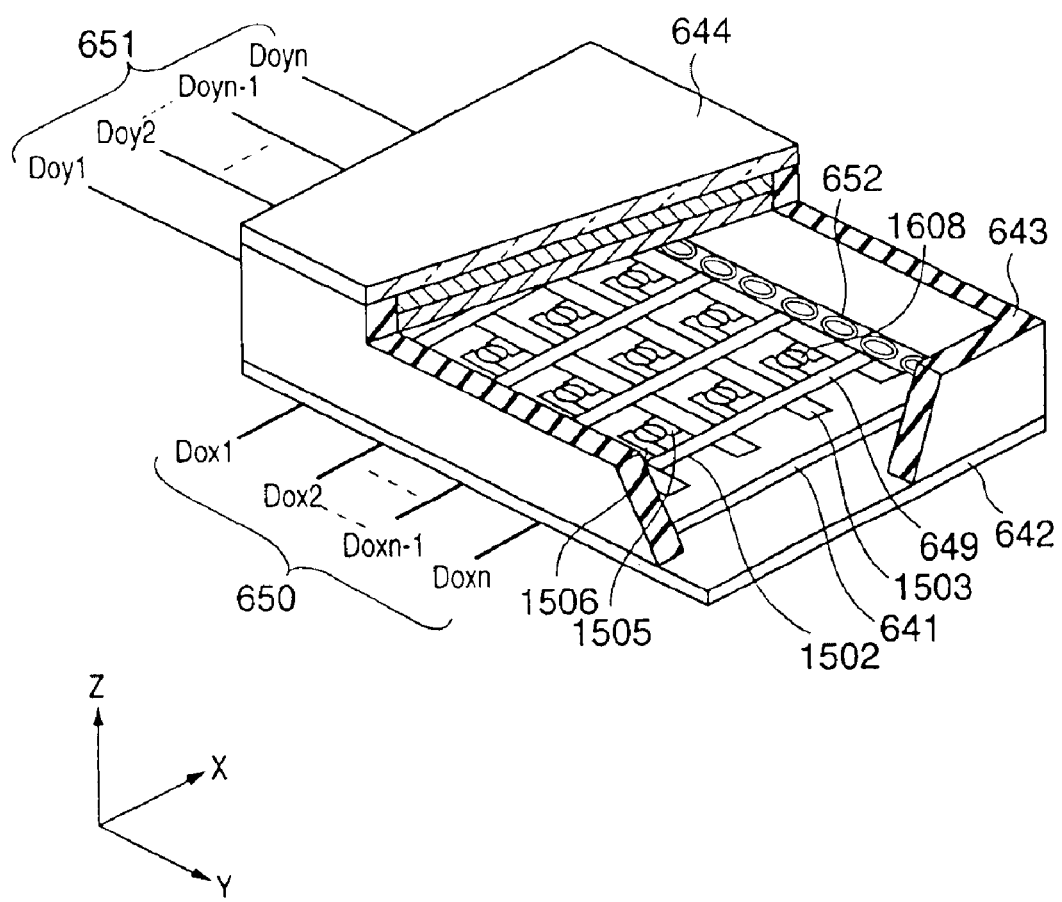
FIG. 74 is a partially cut out perspective view of the display panel section of the image formation apparatus, another example of the present invention.

FIG. 74 is a perspective view of a type of an example of the image forming device to which the twelfth configuration is applied. Reference numeral 641 denotes an electron source obtained by arranging a plurality of electron emission devices on a substrate with appropriate wiring. Reference numeral 642 denotes a rear plate. Reference numeral 643 denotes a support frame. Reference numeral 644 denotes a face plate. They are adhered to each other using frit glass, etc. at respective joint portions, and form an enclosure.

Reference numeral 652 denotes a getter. An NEG film 649 is divided and mounted on the entire area of the X direction wiring (upper wiring) in the image display area. Inside the face plate 644 are arranged a metal back and a fluorescent object.

Figure 75:
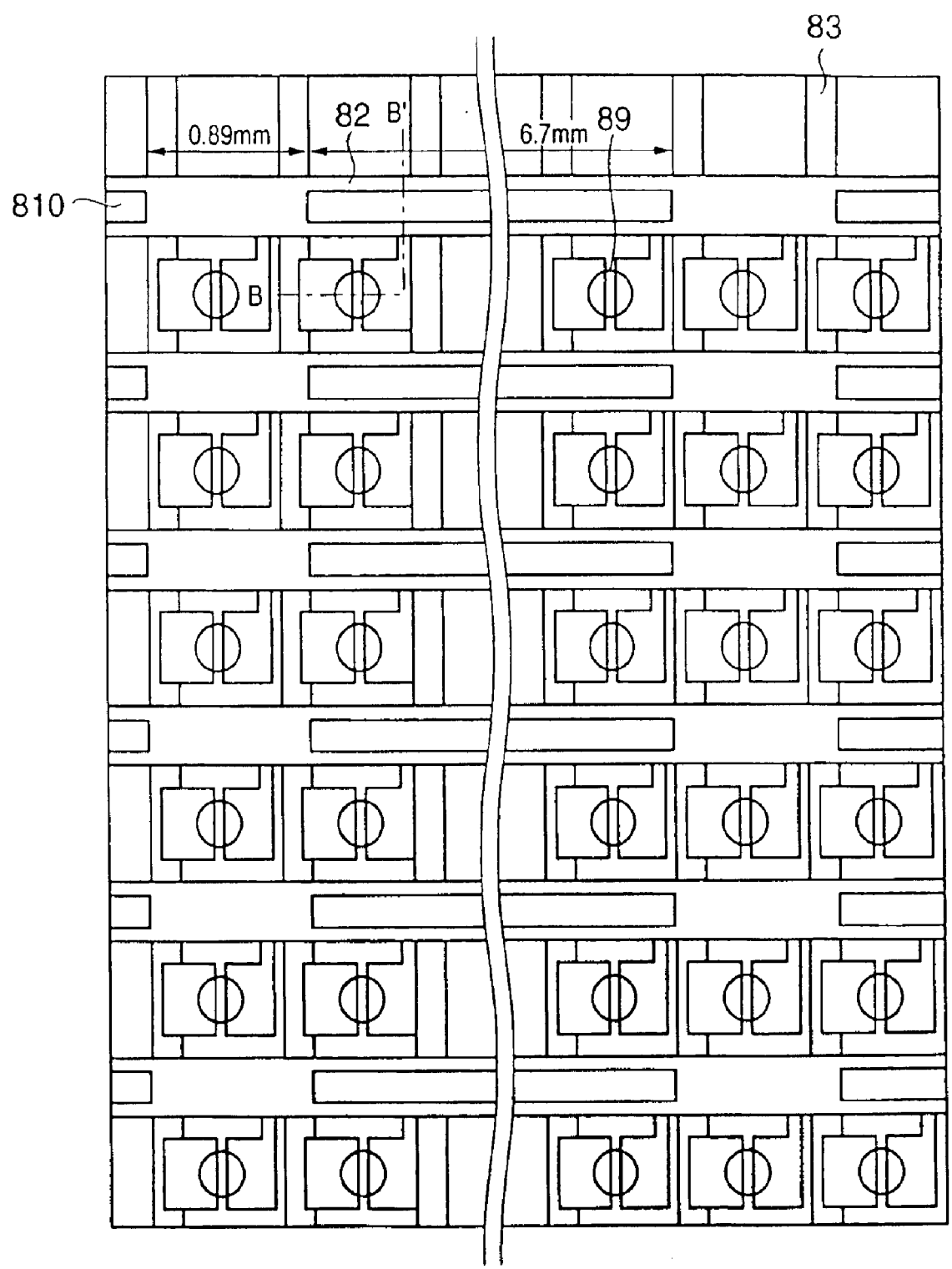
FIG. 75 is a partial plan view of electron beam sources.
Figure 76:
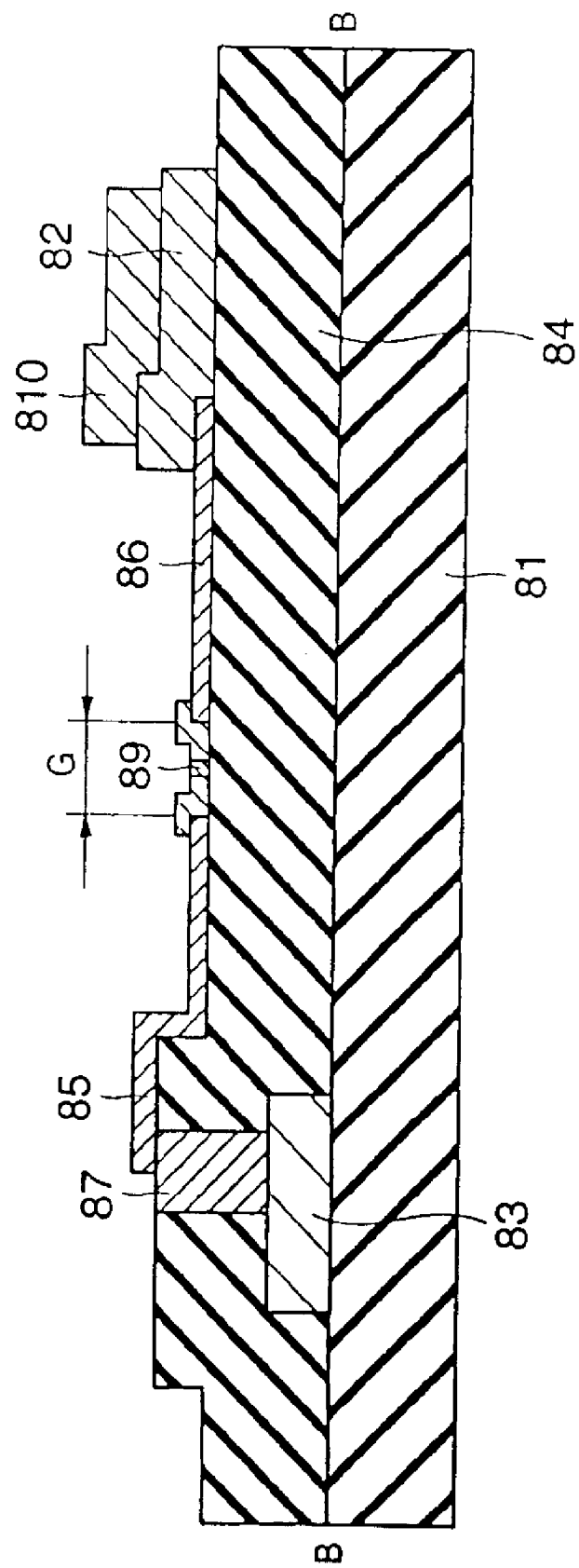
FIG. 76 is a B–B' cross-sectional view of FIG. 75.

FIG. 75 shows a partial plan view of the electron source 641. FIG. 76 is a sectional view along B–B' shown in FIG. 75. The components also shown in FIGS. 75 and 76 are assigned the same reference numerals.

Reference numeral 81 denotes an electron source substrate. Reference numeral 82 denotes an X direction wiring (also referred to as upper wiring) corresponding to Dox1 to Doxn shown in FIG. 74. Reference numeral 83 denotes a Y direction wiring (also referred to as lower wiring) corresponding to Doy1 to Doyn shown in FIG. 74. Reference numeral 88 denotes a conductive film containing an electron emission unit. Reference numeral 89 denotes an electron emission unit. Reference numerals 85 and 86 denote device electrodes. Reference numeral 84 denotes an inter-layer insulating layer. Reference numeral 87 denotes a contact hole for electrically connecting the device electrode 85 with the lower wiring 83.

In this example, a metal mask whose plural openings are formed in each row is aligned along the X direction wiring (upper wiring) and fixed on the electron source substrate 81. The openings are 6.7 mm long and 240 $\mu$m wide, and arranged at intervals of 0.89 mm in the X direction wiring for full length. The masked electron source substrate 81 is mounted in the spattering device. A target is an alloy of Zr—V—Fe=70 wt %: 25 wt %: 5 wt %, and an alloy layer of 1 $\mu$m thick is formed in the spattering method as an NEG film 810.

EXAMPLE 2

Figure 77:
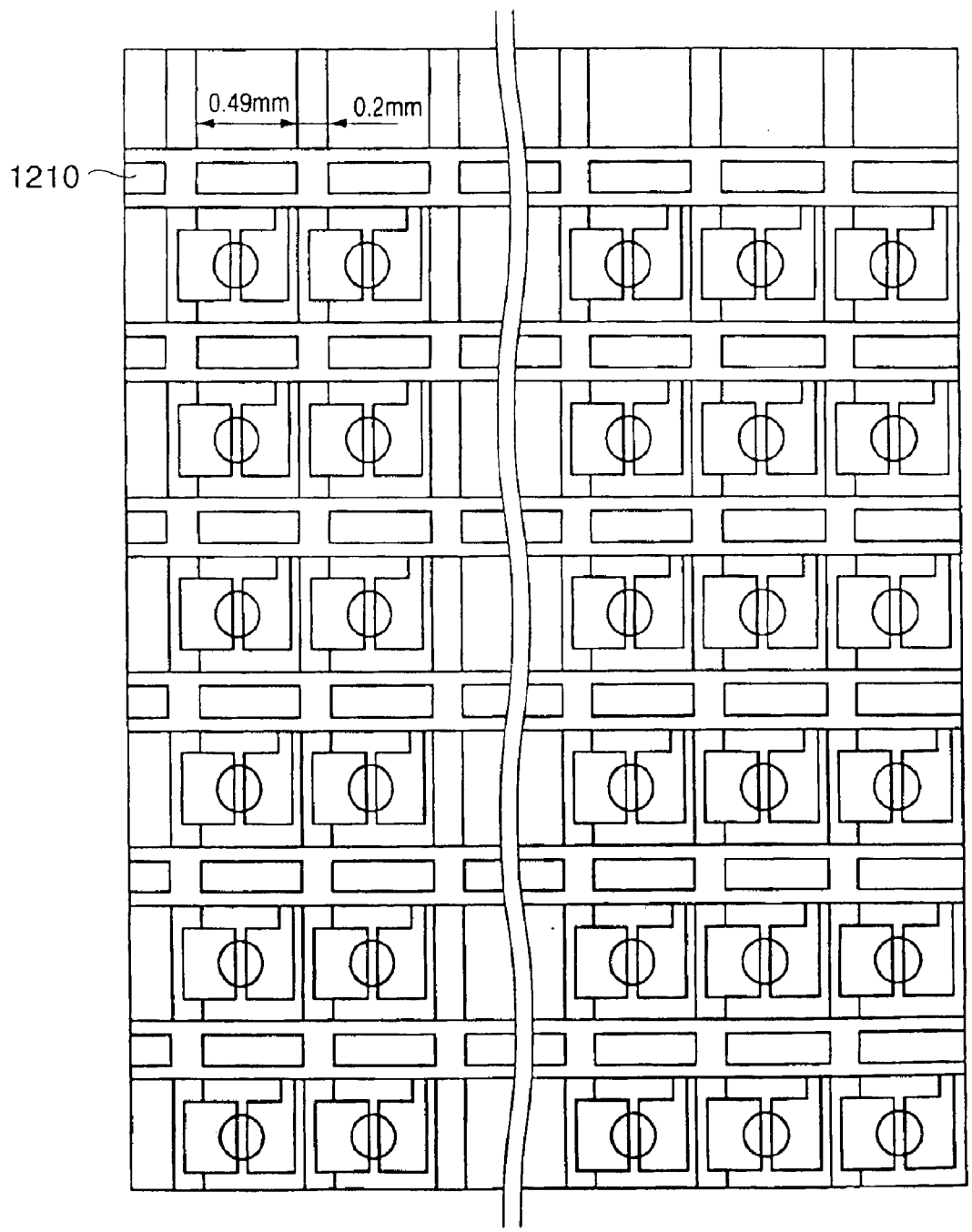
FIG. 77 is a partial plan view of electron beam sources.

In this example, a metal mask whose plural openings are formed in each row is aligned along the X direction wiring (upper wiring) and fixed on the electron source substrate 81. The openings are 490 $\mu$m long and 240 $\mu$m wide, and arranged at intervals of 200 $\mu$m in the X direction wiring for full length. The masked electron source substrate 81 is mounted in the spattering device. A target is an alloy of Zr—V—Fe=70 wt %: 25 wt %: 5 wt %, and an alloy layer of 1 $\mu$m thick is formed in the spattering method as an NEG film 1210 (refer to FIG. 77).

EXAMPLE 3

In the following process, an electron source for a display panel is produced based on the configuration shown in FIG. 74.

Step-A

First, the electron source substrate 641 is sufficiently cleaned using a cleaner, pure water, and organic solvent. In the sputtering method, Pt is piled for 0.1 $\mu$m, and is processed by the photolithography technology to form an device electrode of L=2 $\mu$m in electrode intervals, W=300 $\mu$m long on the electron source substrate 641.

Step-B

Then, Ag paste ink is printed and sintered to form a Y direction wiring 1503 of 270 $\mu$m wide and 8 $\mu$m thick.

Step-C

Next, glass paste is printed and sintered (at 550° C. sintering temperature) to form an SiO$_2$ inter-layer insulating film of 20 $\mu$m thick.

Step-D

Furthermore, Ag paste is printed and sintered to form the X direction wiring 1502 of 340 $\mu$m wide and 12 $\mu$m thick.

Step-E

The same as the process according to the first example of the above mentioned configuration.

Step-F

After applying the-photo-resist (AZ4620 of Hoechst) to the electron source substrate 641 while turning it with a spinner, a metal mask whose plural openings are formed in each row and column is aligned along the X direction wiring (upper wiring) and the Y direction wiring (lower wiring), and provisionally fixed on the electron source substrate 641. The openings are 6.7 mm long and 240 $\mu$m wide, and arranged at intervals of 0.89 mm in the X direction wiring for full length. After baking it for 30 minutes at 90° C., the metal-masked electron source substrate 641 is exposed and developed, and the resist at the openings is removed.

Step-G

The masked electron source substrate 641 is set in the plasma solution injecting device. At the powder providing unit (hopper) of the device is loaded with the getter powder ST707 (SAYES) of Zr—V—Fe=70 wt %: 25 wt %: 5 wt %, and the powder is provided for the Ar plasma using a flow gas as Ar to form an NEG layer of 50 $\mu$m thick.

Step-H

The electron source substrate 641 covered with the NEG film is put in the resist peeling solution (microposit remover) to remove the NEG with the metal mask except at the opening, thus performing the NEG patterning process.

Thus, the electron source 641 provided with internal display area getter is formed.

EXAMPLE 4

After applying the photo-resist (AZ4620 of Hoechst) to the electron source substrate while turning it with a spinner, a metal mask whose plural openings are formed in each row is aligned along the X direction wiring (upper wiring), and provisionally fixed on the electron source substrate. The openings are 490 $\mu$m long and 240 $\mu$m wide, and arranged at intervals of 200 $\mu$m in the X direction wiring, and 250 $\mu$m long and 100 $\mu$m wide, and arranged at intervals of 440 $\mu$m in the Y direction wiring. After baking it for 30 minutes at 90° C., the metal-masked electron source substrate is exposed and developed, and the resist at the openings is removed.

According to the above mentioned twelfth configuration, there are substantially no peeled-off film or short circuit between upper and lower wiring, and the uneven intensity can be reduced in the image forming area. In addition, a fault due to break down discharge, etc. can be suppressed, thereby improving the yield of a display panel.

(13th Configuration)

Now, another example of an aspect of arranging getters will be described. This configuration is featured by the arc-shaped section of the non-evaporation getter. It is desired that the non-evaporation getter is arranged on the scanning side wiring or the signal side wiring to apply a voltage to an electron emission device, and is arranged within a range smaller than any wiring width. Furthermore, it is featured by the non-evaporation getter positioned closer to the anode side than the insulation layer for insulation between the scanning side wiring (upper wiring) and the signal side wiring (lower wiring), and by the non-evaporation getter positioned lower than the anode in the enclosure.

According to this configuration, when a gas discharged from and around an electron emission device crashes against an electron, the gas emitted from the image forming material can be efficiently absorbed. Therefore, a local raise in pressure can be avoided. In addition, the sectional shape of the arranged non-evaporation getter does not physically affect the orbit of an electronic beam, and the influence on the orbit of the electronic beam by charging of non-evaporation getter can be minimized. Furthermore, even if there is subtle positional discrepancy of the non-evaporation getter, the influence on the orbit of the electronic beam can be reduced.

Additionally, a getter has preferably an arc-shaped sectional form, so that the projection on the surface of the getter can be reduced, thereby mitigating the local concentration of the electric field on the surface of the getter.

Furthermore, in addition to the getter having an arc-shaped section, the wiring on which the getter is arranged also has preferably the arc-shaped section.

Thus, by having arch-shaped sections of the getter and the wiring, the projection on the surfaces of the getter and the wiring can be reduced. Therefore, the local concentration of the electric field on the surface of the getter and the wiring can be reduced.

Furthermore, when the shapes of the sections are thus controlled, it is desired that an available getter is a non-evaporation getter which excels in formability.

It is also desired that the width of the getter is smaller than the width of the wiring because a getter is formed after the wiring is formed, and the alignment precision of the getter should be easily obtained.

In this example, a non-evaporation getter made of an alloy mainly containing Zr is arranged for the wiring for applying a voltage to drive an electron emission device of an electron source substrate, and the section is arc-shaped. Such configuration will be described below.

Figure 78A:
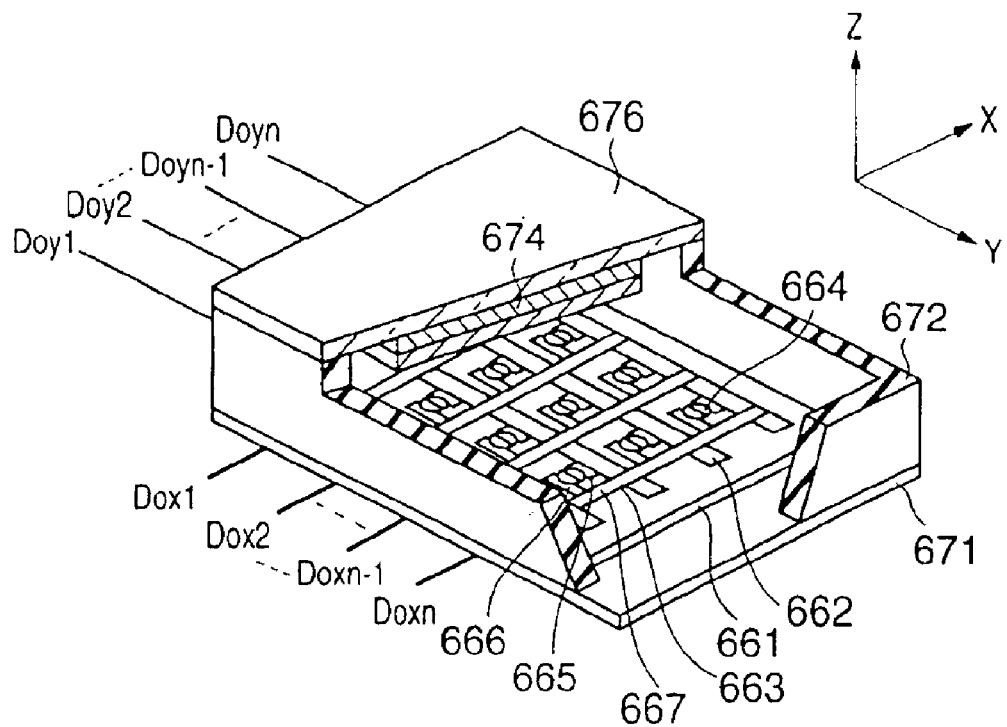
FIG. 78a is a partially cut out perspective view of the display panel section of the image formation apparatus, another example of the present invention.

The configuration is specifically explained below with reference to FIG. 78. FIG. 78a is a perspective view of a type of an example of the configuration of the image forming device to which the thirteenth configuration is applied. Reference numeral 661 denotes an electron source substrate (also referred to as a rear plate), can be obtained by arranging a plurality of electron emission devices on an insulating substrate such as a glass, etc., and is provided with the wiring described later. Reference numeral 662 denotes an X direction wiring (lower wiring). Reference numeral 663 denotes a Y direction wiring (upper wiring). Reference numeral 664 denotes an electron emission device, and is formed between device electrodes 665 and 666. Reference numeral 667 denotes a non-evaporation getter arranged on the upper wiring. A metal back and a fluorescent object is arranged inside a face plate 676.

Figure 78B:
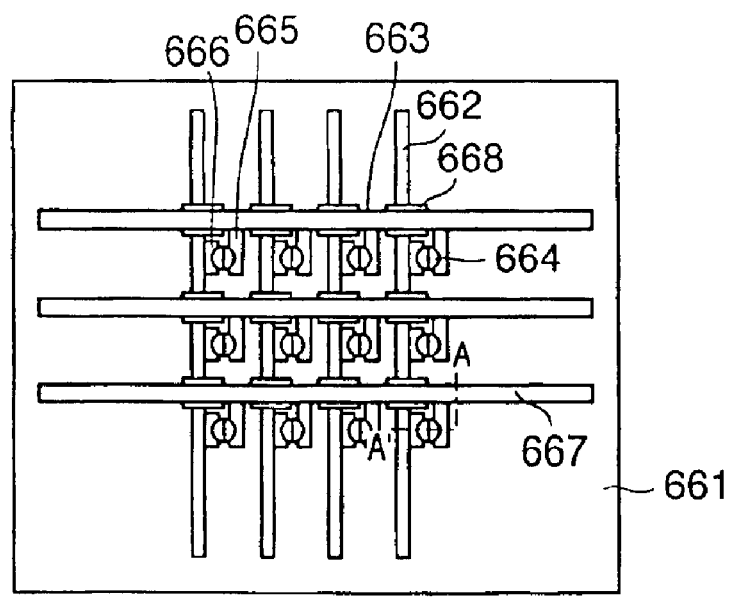

The electron source substrate 661 is described in detail with reference to FIG. 78b. FIG. 78b is a top view showing a type of the electron source substrate shown in FIG. 78a. An inter-layer insulating layer 6688 is arranged between the X direction wiring 662 and the Y direction wiring 663 for insulation.

Figure 79A:
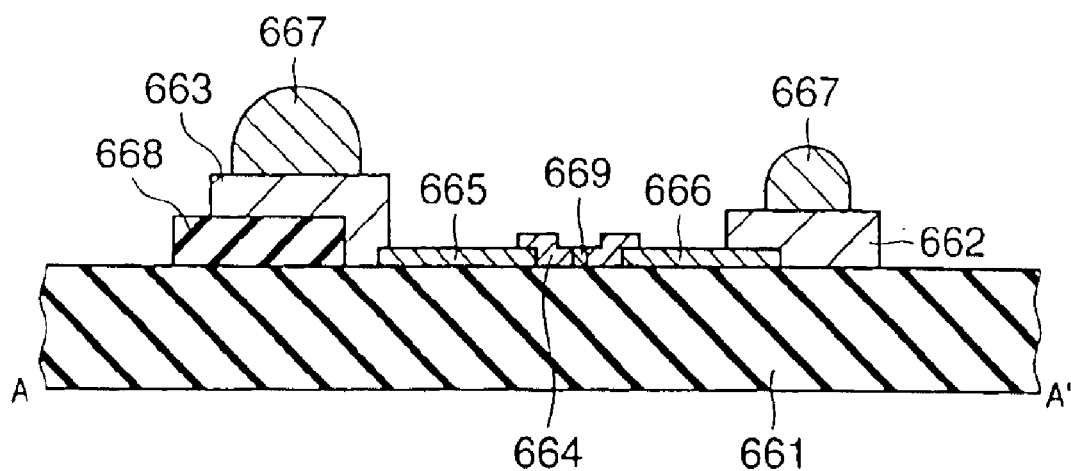
FIG. 79a is an A–A' cross-sectional view of FIG. 78b.
Figure 79B:
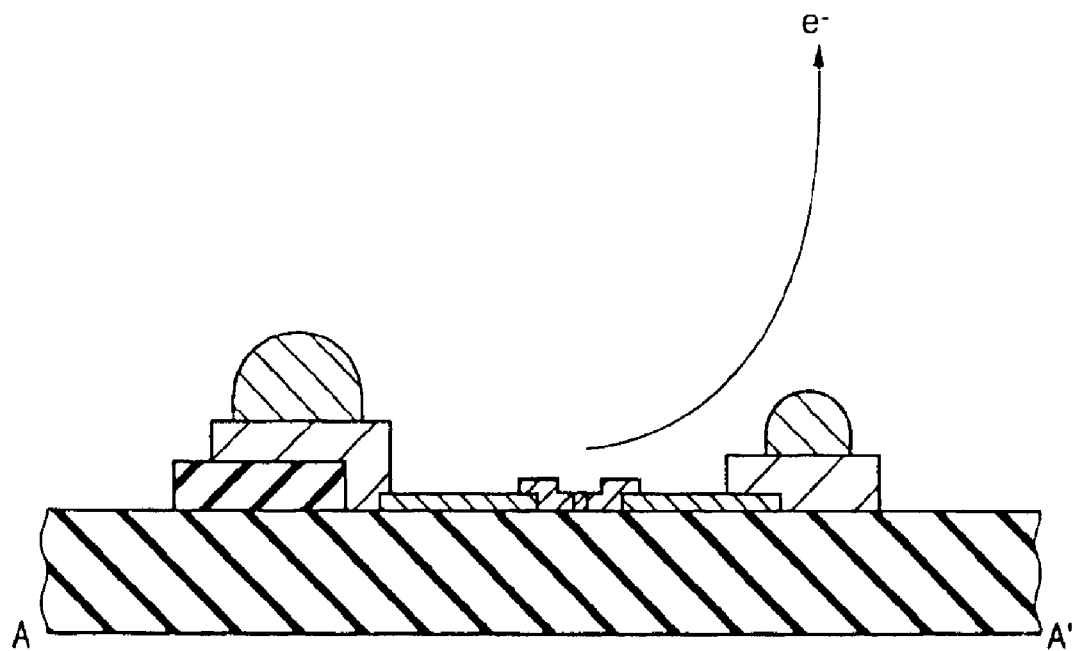
FIG. 79b is a schematic view showing a trajectory of an electron beam.

FIG. 79a is a sectional view along A–A' shown in FIG. 78b. FIG. 79b shows a characteristic of the orbit of an electron beam obtained when an accelerating voltage is applied to the face plate 676 under the assumption that the electron emission device is driven as the X direction wiring 662 would be a relatively positive electrode. It is known an electron emitted from an electron emission portion 669 of the electron emission device 664 is attracted toward the X direction wiring which is applied a positive signal voltage, and draws a orbital curve as shown in FIG. 79b. At this time, if the cross section of the non-evaporating getter 667 has rectangular shape, then the orbital of the electron beam is interrupted by the edge of the getter, and electron can not reach the face plate 676 so as not to emit light by a fluorescent film 674. In addition, if the cross section of the non-evaporating getter 667 has rectangular shape, then the distance between the orbital of the electron beam and the edge portion of non-evaporating getter 667 having positive potential become very short, and it electrically warps the orbital of the electron beam, and electron can not reach the face plate 676 so that the fluorescent film 674 does not emit light. Furthermore, in the case an electron source substrate 661 has a plurality of electron emission devices, all orbits of the electron beam emitted from all devices have to be protected from being interfered by the non-evaporating getter 667. In the production process, if the non-evaporating getters 667 are simultaneously disposed, and if there arises a discrepancy in an arrangement position of any one of non-evaporating getters 667, then there arise discrepancies in the arrangement positions of all non-evaporating getters 667, and it is difficult to achieve the production system with high precision. Therefore, if the cross section of the non-evaporating getter 667 is arch-shaped, then the yield rate of the production can be improved as compared with a rectanglar-shaped section.

A non-evaporating getter is disposed on the X direction wiring and the Y direction wiring. The cross section of the non-evaporating getter is arch-shaped with a little round at the edge portion as shown in FIG. 79a. As a non-evaporating getter, a marketed Zr type alloy (for example, HS-405 powder (product of Japan Getters), St-707 (product of SAES), etc. can be applied, and the section become arch-shaped when the getter is disposed.

EXAMPLE 1

The image forming device according to this example has the configuration similar to that of the device which is shown in FIG. 78a, and has a non-evaporating getter (NEG) disposed on the X direction wiring (lower wiring) 662 and the Y direction wiring (upper wiring) 663 formed by the printing method.

A metal mask having an opening to the shape of the upper and lower wiring is prepared and sufficiently aligned, and then a film of a Zr—V—Fe alloy is disposed by the sputtering method. The opening portion of the prepared mask has inversely tapered shape, and it makes possible to obtain the arch-shaped section of the non-evaporating getter disposed. The thickness of the non-evaporating getter 667 is adjusted to be 50 $\mu$m. As described above, the electron source substrate 661 having the non-evaporating getter is disposed. The composition of the sputtering target used is Zr for 70%, V for 25%, and Fe for 5% (weight ratio).

According to this example, the non-evaporating getter of 240 $\mu$m width is disposed on the wiring of 280 $\mu$m width. On the point A on the surface of the getter having a tangent crossing one point of the electron emission portion of electron emission devices closest to the getter, the intersections B and C between the circle having a radius of 2.4 $\mu$m (1% of the getter width) and the getter are obtained, and the inner angle made by B-A-C is measured as 174 degrees. With the radius is 12 $\mu$m (5% of the getter width), the inner angle is 150 degrees. According to this example, the points B and C are the intersections between the section of the getter and the circle. However, when the layer of the getter is thin, and the points B and C do not cross the getter, the intersections between the tangent at the end of the getter and the circle having the above mentioned radius are set as the points B and C, and the inner angle is obtained.

According to this example, the method of forming a non-evaporating getter is used with a metal mask. However, the present invention is not limited to this application. That is, a combination of a patterning using photolithography and oblique evaporation, a process of drawing with an adhesive using a dispenser or printing process and to which adhere the powder of a non-evaporating getter, and an electroplating process, etc. can be used to obtain an arch-shaped section.

EXAMPLE 2

A getter with a configuration shown in FIG. 79a is produced in the following procedure.

A metal mask having an opening in the shape of the upper wiring is prepared, correctly aligned, and provided with a film of a Zr—V—Fe alloy by the sputtering. The opening portion of the prepared mask is processed in an inversely tapered shape so that the cross section of the produced non-evaporating getter can be arch-shaped. The getter layer is 2 $\mu$m thick. The composition of the used sputtering target is 70% of Zr, 25% of V, and 5% of Fe (weight ratio)

EXAMPLE 3

According to this example, the image forming device shown in FIG. 67a is produced. The cross section of the getter according to this example is still arch-shaped as in the Example 2 of the 13th Configuration, and the producing method is similar to that of the Example 2. The image forming device according to this example has spacers. The wiring for driving each electron emission device is obtained by arranging the upper wiring and the lower wiring in a matrix form. Then, the getters and spacers are arranged together on the upper wirings. A getter of the same shape and same process as the getter arranged on the wiring is also arranged on the face plate side. The getters on the face plate side are arranged on the black materials to avoid color mixing between fluorescent films with various colors. On the other hand, the spacers also touch the face plate, and the touching positions are set on the black materials. The arrangement positions of the getters and the spacers are set such that the positions do not overlap each other on the face plate and the rear plate.

According to this example, a larger area image forming device can be realized by placing spacers. One reason why the getters are arranged on an area other than non-occupied area by the spacer is that, the area not occupied by the getters becomes smaller by the spacers covering a part of the getter when a spacer is provided on the getter arranged on the wiring.

Figure 35:
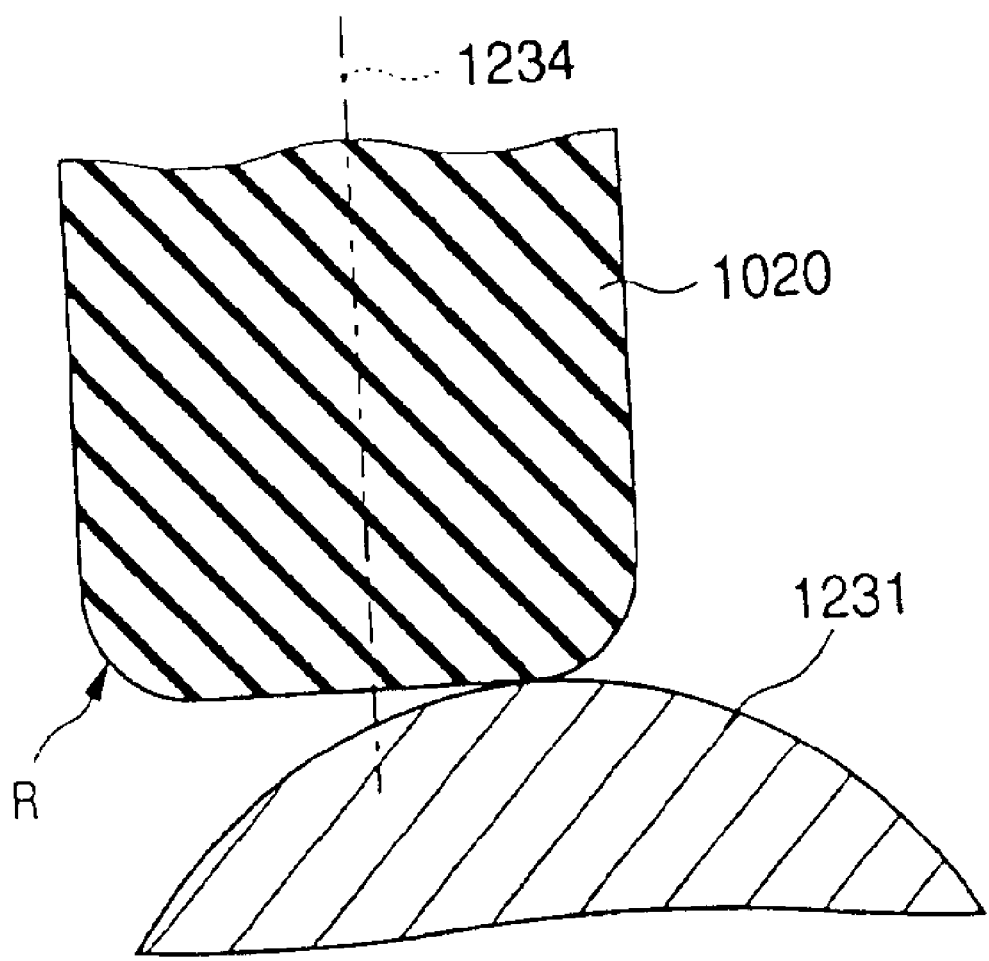
FIG. 35 is a schematic diagram showing a shape exemplar spacer.

Furthermore, according to the present invention, the corner of the spacer is rounded as shown in FIG. 35. This is for preventing from accidental break due to the concentration of the electric field at the corner, the stress concentration against the corner, etc.

By operating the image forming device according to this example with the above mentioned structure, a good image is obtained with high brightness for a long period.

(14th Configuration)

Figure 80A:
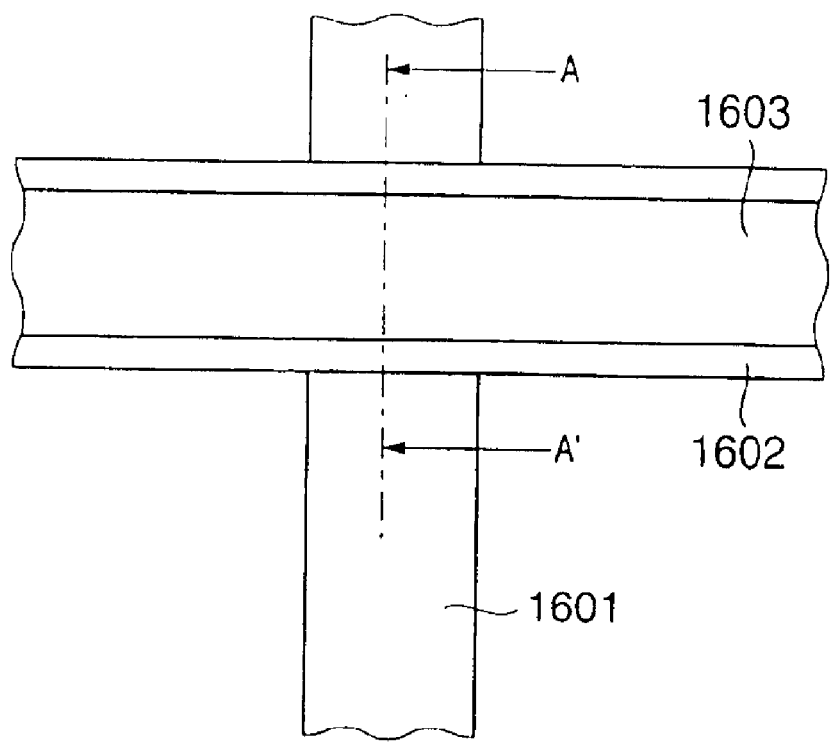
FIG. 80a is a partially enlarged plan view schematically showing a wiring structure of an electron beam source used in the image formation apparatus of the present invention.
Figure 80B:
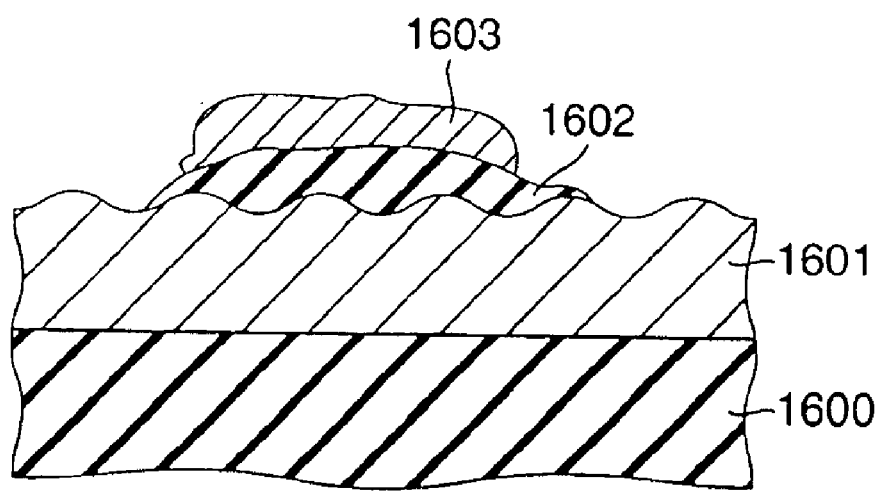

FIG. 80a shows a characteristic of wiring structure for the 14th Configuration, and FIG. 80b shows the cross sectional view along A–A' shown in FIG. 80a. A lower wiring 1601 and an upper wiring 1603 are provided in a way having a intersection with each other on a rear plate 1600. The upper wiring 1603 is formed on an inter-layer insulating film 1602, and is insulated from the lower wiring 1601.

The row (horizontal) direction wiring (upper wiring 1603) and the column (vertical) direction wiring (lower wiring 1601) provided on the electron source substrate have the layer stacking structure through an insulating layer (inter-layer insulating film 1602) at the intersection portion. If the vertical direction wiring (lower wiring 1601) and the horizontal direction wiring (upper wiring 1603) do not have good surface shapes, it can be possible that the convex portion arising on the lower wiring makes a short circuit with the upper wiring by piercing through the inter-layer insulating film, and it cause an undesired electric discharge arises between the face plate and the rear plate. Then, it is desired that the surface shapes of the upper and lower wiring have a surface roughness expressed by Ra of 0.5 $\mu$m or less, a desired value of 0.3 $\mu$m or less, and a more desired value of 0.2 $\mu$m or less, and the roughness Rz of 0.5 $\mu$m or less, a desired value of 3 $\mu$m or less, and a more desired value of 2 $\mu$m or less.

According to the study by the present inventors, the defect of inter-layer insulation (short circuit between upper and lower wiring) at the intersection portion between the lower wiring and the upper wiring, and the discharge phenomenon between the face plate and the rear plate can be possible to occur if there is a large projection on the surface of the wiring. However, it is practically impossible to check the existence of a projection on all of several millions of intersections. Therefore, various checks are made to adopt the method of using any substitutional parameter, and it proves that the above mentioned problems can be significantly reduced by an electrode satisfying the above mentioned roughness of the surface. Ra is the average roughness of the center line indicating the roughness of the surface of an industrial product, and Rz is the parameter indicating the ten point average roughness showing the roughness of the surface of an industrial product.

To satisfy the surface roughness, the particle size of a conductive particle used for a conductive paste is approximately 0.1 $\mu$m to 2 $\mu$m, and a more desired value of 0.3 $\mu$m to 1.0 $\mu$m. It is desired that a ball-shaped particle is used.

Table 3 shows the paste used in this example.

TABLE 3

|  | Example 1 | Example 2 | Example 3 | Example 4 |
|---|---|---|---|---|
| Shape of particle | Ball | Ball | Ball | Ball |
| Ra ($\mu$m) | 0.292 | 0.268 | 0.198 | 0.177 |
| Rz ($\mu$m) | 2.854 | 2.571 | 1.916 | 1.884 |
| Number of short circuits | 1 | 1 | 0 | 0 |
|  | Example 5 | Example 6 | Example 7 | Example 8 |
| Shape of particle | Ball | Flake | Ball | Ball |
| Ra ($\mu$m) | 0.161 | 0.355 | 0.467 | 0.367 |
| Rz ($\mu$m) | 1.818 | 3.353 | 4.122 | 3.45 |
| Number of short circuits | 0 | 3 | 5 | 4 |

The wiring is formed by the screen printing method. SX 300 mesh is used as a screen printing. The emulsion is 15 $\mu$m thick, and is a product by Tokyo Process Service. The pitch of the wiring in the vertical direction of the produced pattern is 230 $\mu$m, 720 lines with 110 $\mu$m width, and the pitch of the wiring in the horizontal direction is 690 $\mu$m, 480 lines with 240 $\mu$m width. Then the product is baked at the temperature of 400 to 520° C.

As an inter-layer insulating layer, NP-7730 paste of Noritake Company Limited is used, and the printing and baking processes are repeated three times. At the intersection portion between the wiring, the film is about 16 to 20 $\mu$m thick. In the structure of the produced wiring, the number of intersections between wirings in the vertical and horizontal directions are 345,600. The reliability of the insulating layer, that is, the check of the short circuit between the upper and lower wiring is confirmed by an original matrix checker, and scanned the all intersection points, and checked the existence of short circuit for about 30 minutes. As shown on the table, in the case of Ra is 0.3 $\mu$m or less and Rz is 3 $\mu$m and less, there is few short circuits between the upper and lower wiring, in the case of Ra is 0.2 $\mu$m or less and Rz is 2 $\mu$m and less, there is no short circuit, thereby it can be recognized that the reliability of the inter-layer insulation of the wiring is improving.

On the other hand, a glass substrate is prepared, on which platinum device electrodes are disposed by photolithography method, a predetermined paste is used to form the vertical direction wiring, the inter-layer insulating layer, and the horizontal direction wiring in this order. Ra of the vertical and horizontal direction wiring obtained by said process is 0.211, and Rz is 2.286.

According to the configuration by controlling the roughness of the surface of the wiring, the reliability of the wirings which drive electron emission devices can be improved, that is, non short circuit is not made between the upper and lower wiring so that the yield rate of the production without can be improved. In addition, an anode voltage (Va) can be raised to enhance the light intensity of a display panel.

(15th Configuration)

As an electron emission device provided on the electron source substrate, the configuration in which an electron emission portion is formed on a conductive thin film connected to a couple of paired device electrodes, is preferably applied. The couple of device electrodes are connected to the respective wiring, for example, one is connected to the column direction wiring, and the other is connected to the row direction wiring. As such configuration of an electron source substrate, all electron emission devices can be surrounded by the row direction wirings and the column direction wirings. The amount of electrical charge on the electron source substrate can be uniformed.

In this example, an area in which the row direction wiring is surrounded by a plurality of column direction wirings, and the column direction wiring is surrounded by a plurality of row direction wirings is defined as an intersection area.

The amount of electric charge of an electron source substrate can be furthermore uniform by making the width of at least one of the row direction wirings and the column direction wirings arranged on an area other than the above mentioned intersection area wider than the width of the row direction wiring or the column direction wiring within the above mentioned intersection area.

Figure 98:
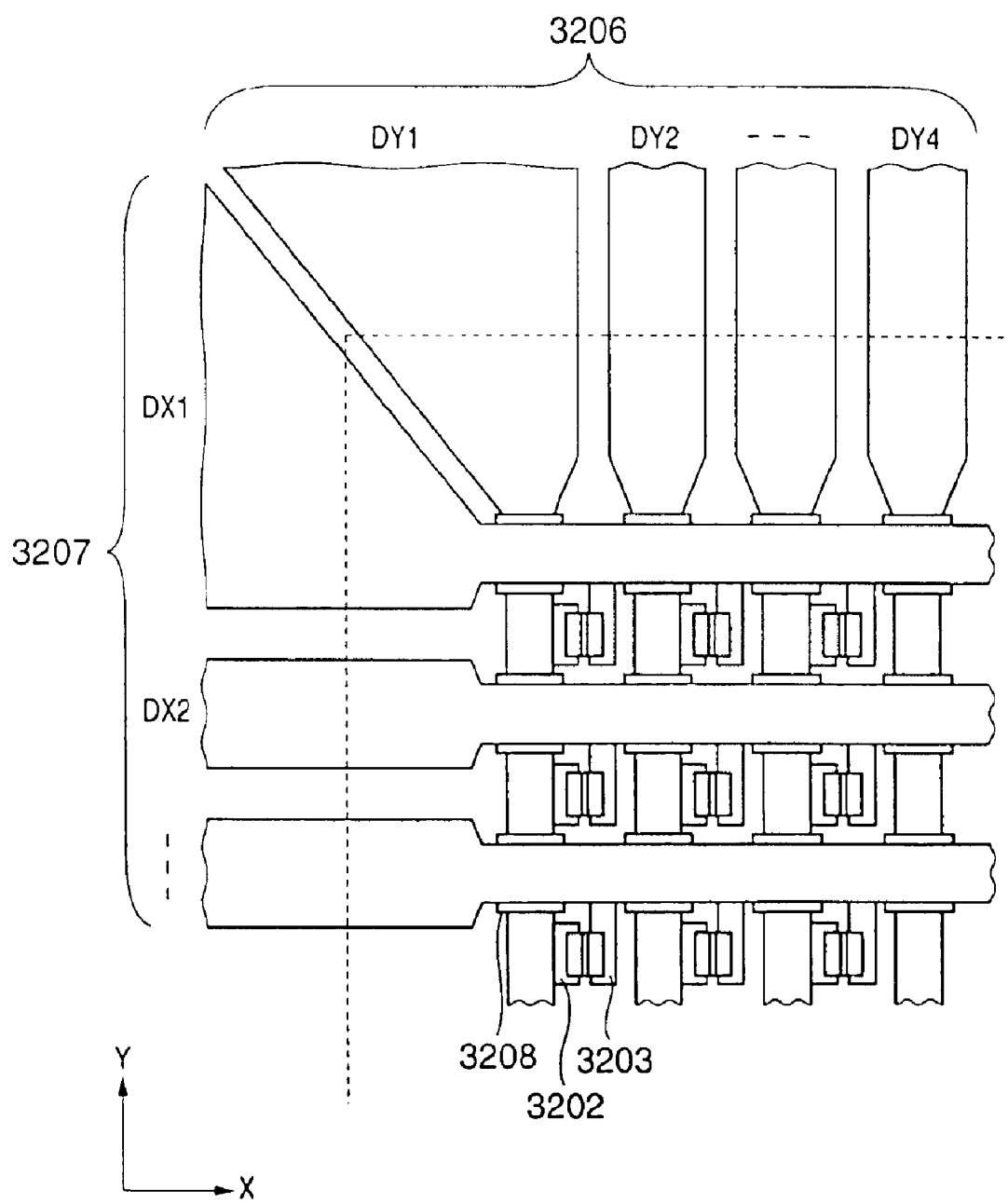
Figure 99:
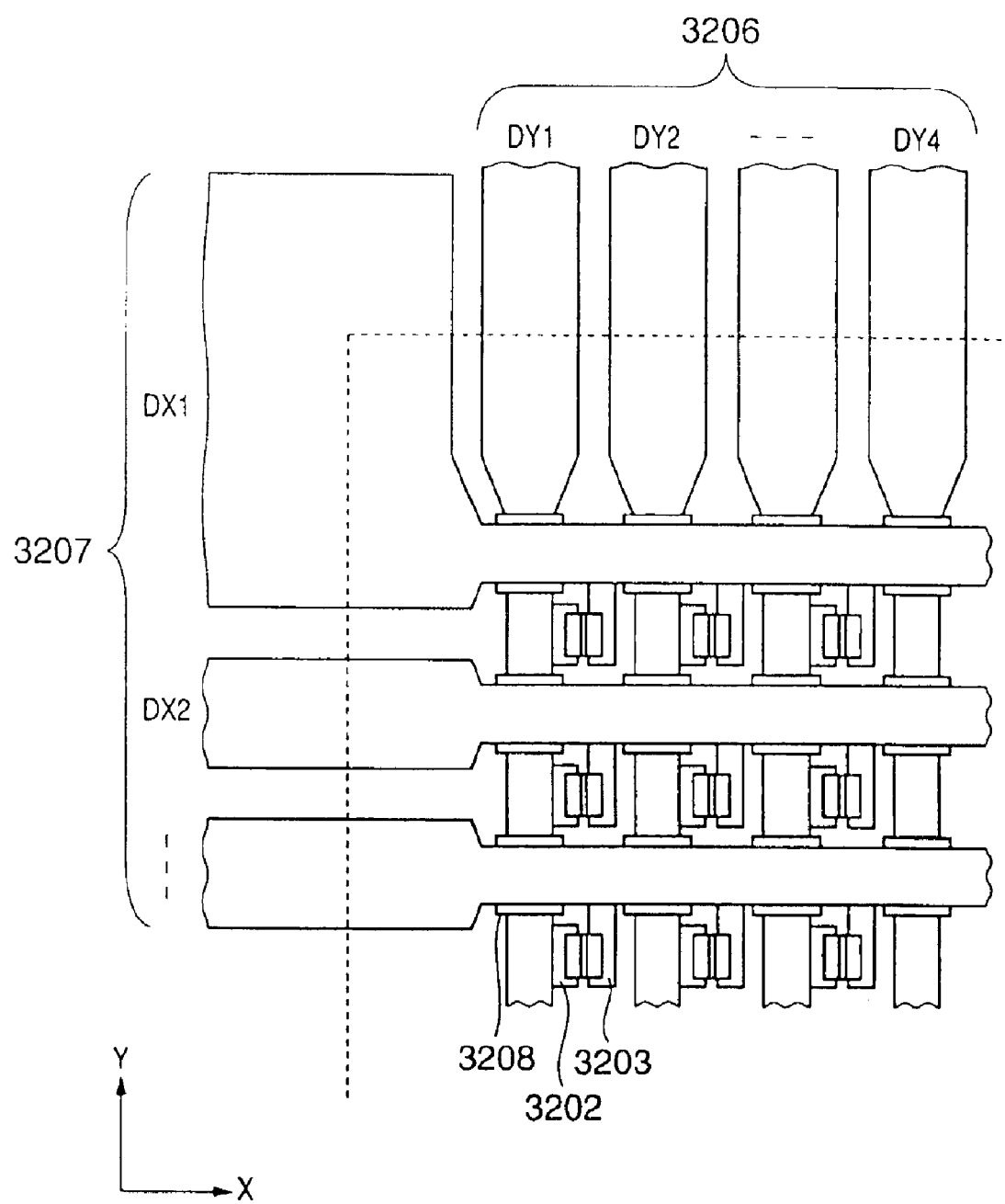

In addition, as shown in FIGS. 98 and 99 described later, it is furthermore desired to make the widths of both row and column direction wirings in an area other than the above mentioned intersection area wider than the width of the row or column direction wiring within the above mentioned intersection area.

Figure 81:
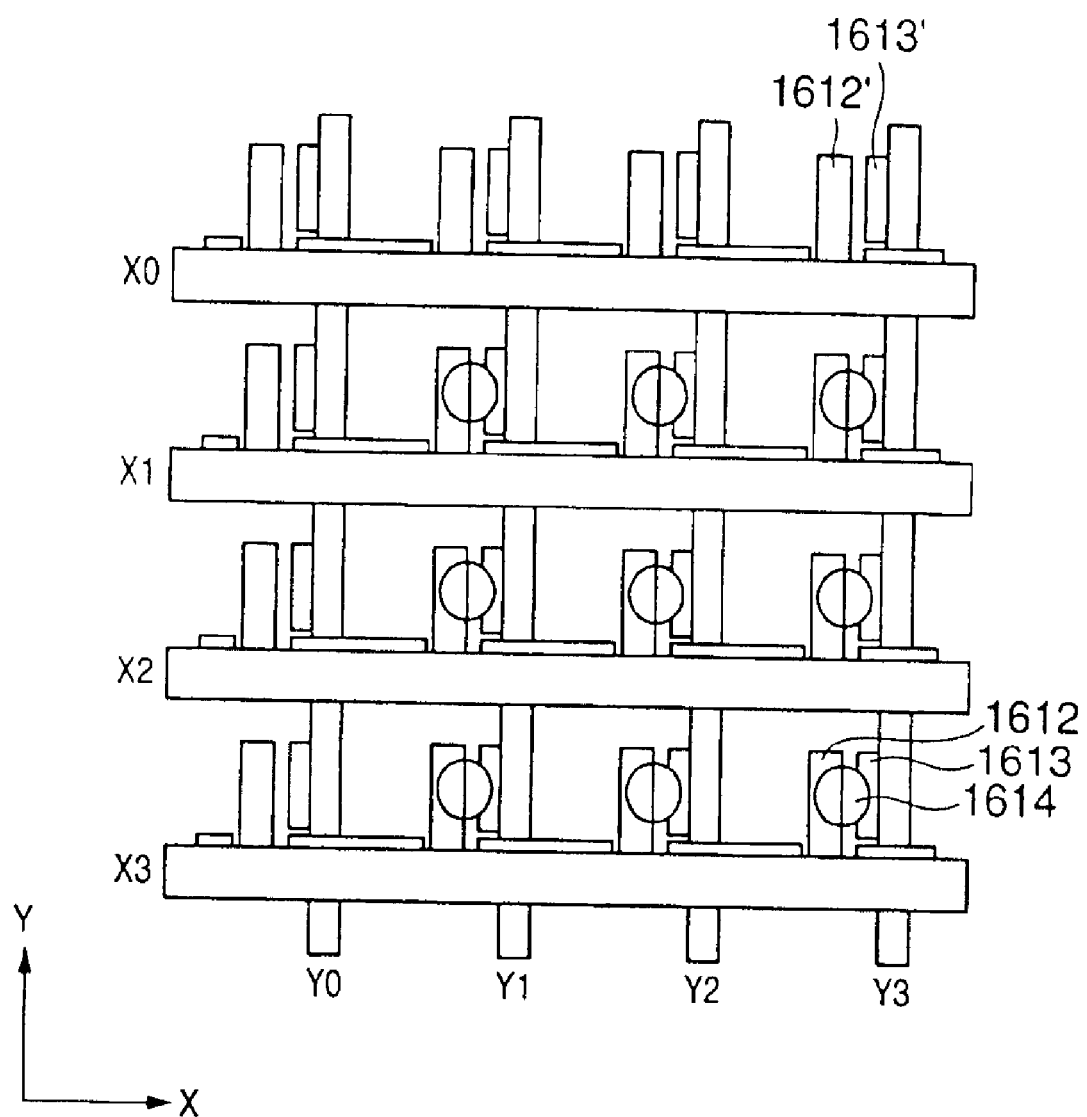
FIG. 81 is a partially enlarged plan view of the electron beam sources.

As shown in FIG. 81, electron sources in this configuration can be obtained by arranging a plurality of surface conductive electron emission devices and connecting them through the wirings in a matrix form (in this example, only nine unspecified electron sources are shown).

With this configuration, redundant row direction wiring X0, column direction wiring Y0, and electrodes 1612 and 1613 are provided such that, in an electron emission device connected to the row direction wiring X1 and the column direction wiring Y1, the amount of electric charge of the substrate exposure unit outside the device can be equal to that of the electron emission device connected to the X2, X3, Y2, and Y3 inside the device, and it is characteristic that all electron emission devices are surrounded by the row direction wirings and the column direction wirings. In this example, it is desired that the electrode connected to a redundant wiring is not provided with a conductive thin film having an electron emission portion to avoid waste on an excess device current. Furthermore, it is desired that a redundant wiring Y0 is designed to be the same in shape as the wiring Y1, Y2, and Y3 such that the orbital of an electron emitted from adjacent electron emission devices can be the same as those of two other devices, thereby setting the electric potential distribution around the devices in an uniform state. Similarly, a redundant wiring X0 has also the same shape as the wiring X1, X2 and X3.

An example of the producing process of this configuration is described below by referring to the attached drawings.

FIGS. 82a through 82f show the process of producing this configuration. In the producing process, 3×3 electron sources, 9 in total are provided for the substrate not shown in the figures in matrix form. In these figures, reference number 202 and 203 denote a couple of device electrodes, reference number 204 denotes an electron emission portion forming film, reference number 206 denotes a column direction wiring which is the first wiring layer, reference number 207 denotes a row direction wiring which is the second wiring layer, reference number 208 denotes an inter-layer insulation film provided between the column direction wiring 206 and the row direction wiring 207. Reference numeral 209 denotes a window between the inter-layer insulation films 208 for connecting the second wiring layer 207 with the device electrode 202.

Figure 82A:
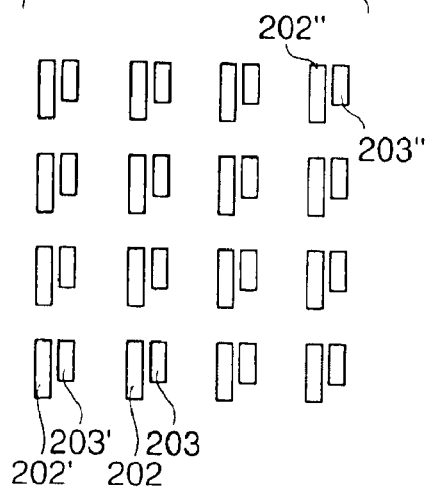
FIGS. 82a–82f are manufacturing process diagrams to explain the procedure for manufacturing the electron beam sources used in the image formation apparatus of the present invention.

First, a pattern of an device electrode material is printed using an offset printing method on a substrate cleaned in advance, and is then baked, thereby forming the couples of device electrodes 202 and 203 (FIG. 82a). These device electrodes are provided for better ohmic contact between the thin film of the electron emission portion and the wiring. Normally, since the thin film of the electron emission portion is much thinner than the wiring conductive layer, these device electrodes are used to avoid the problems of wetting property, gap retainment, etc. As the method of forming device electrodes, it is useful like that, vapor deposition, the sputtering method, the plasma CVD method, etc., and the printing method using a thick film past containing metal components and glass components as a catalyst. In this example, for a conductive thin film which form an electron emission portion on an electrode, it is desired that the device electrode near the electron emission portion is thin to improve the step coverage of an electrode edge. When a thick film printing method is used, an preferable available paste can be a MOD paste composed of an organic metal compound. Obviously, other deposition method can be still useful, and any conductive material can be used as a component in the configuration.

Figure 82B:
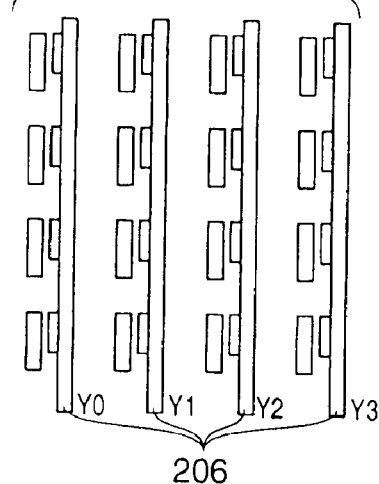

The first wiring layer 206 featuring the present invention, the terminal portion (column end portion) of the first wiring layer 206 which is a lower wiring, and the terminal portion (row end portion) of the second wiring layer 207 which is the upper wiring, are simultaneously formed (FIG. 82b). In forming the first wiring layer 206, the column direction wiring is provided with that connected to the device electrode 203 of an electron emission device, and redundant wiring Y0 and redundant electrodes 202' and 203' in an area (a column line of leftmost devices) on one side of which wiring is not formed. The redundant wiring is not limited to one column, but there can be a plurality of columns.

Differing form the formation of the device electrode portion, a thicker film is advantageous because it reduces electric resistance. Especially, in an image forming device with a number of electron emission devices, a thick film printing method using a thick film paste which produce a relatively thick film in a single layer is appropriate. It is obvious that thin film wiring can be applied depending on the number of electron emission devices, density, etc. When the screen printing method is used as a thick film printing method, it is possible that device electrodes connected to the column wiring Y0 are formed under the above mentioned redundant column wiring Y0 in a form of a series of electrodes in a linear line.

Figure 82C:
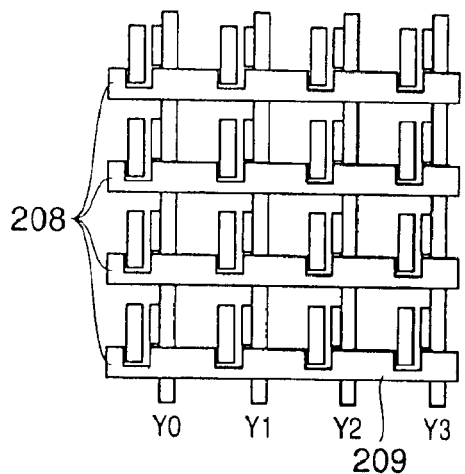

Then, the inter-layer insulation film 208 is formed (FIG. 82c). The inter-layer insulation film 208 is formed at the intersection between the column direction wiring and the row direction wiring. The components material of the inter-layer insulation film 208 can be anything that can maintains normal insulation, for example, a film of a thick film paste, etc. mainly containing an $SiO_2$ thin film, PbO not containing a metal device.

Figure 82D:
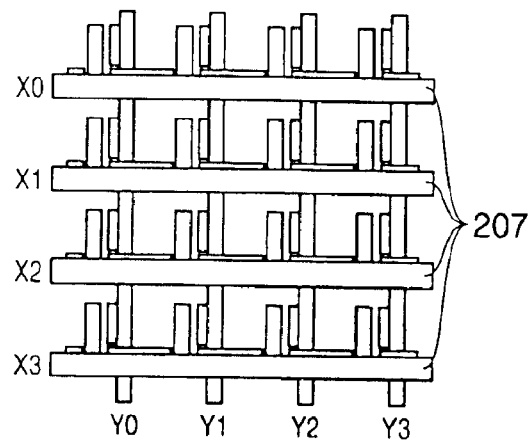
Figure 82E:
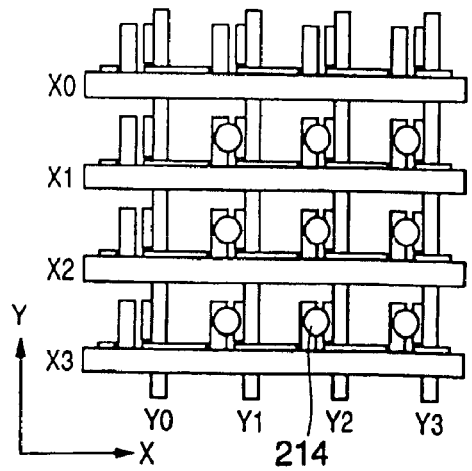

Then, the second wiring layer featuring the present invention is formed (FIG. 82d). In forming the second wiring layer 207, the row direction wiring is provided with that connected to the device electrode 203 of an electron emission device, and redundant wiring X0 and redundant electrodes in an area (a column of uppermost devices) on one side of which wiring is not formed. The redundant wiring is not limited to one row, but there can be a plurality of rows. Furthermore, when an electron source is driven in a method in which a scanning signal is sequentially applied for each row in a surface conductive electron source group wired in a matrix form by row and column as described later, at least the above mentioned redundant wiring is connected to the wiring other than the adjacent wiring X1.

Figure 82F:
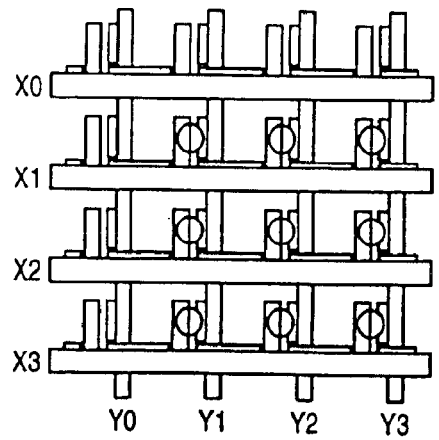

Then, the conductive electron emission portion forming film 204 is disposed to connect the device electrode 202 with the device electrode 203 (FIG. 82e) and obtain the electron source substrate as shown in FIG. 82f. The conductive film is disposed by the inkjet method of an organic metal complex solution and baked. The ink jet method is disclosed by, for example, Japanese Patent Laid-Open No. 8-273521, No. 8-277294, No. 9-69334, etc.

In the above mentioned process, a pre-forming electron source substrate is produced (FIG. 177). FIG. 177 shows a row direction wiring terminal portion 205a and a column direction wiring terminal portion 205b, not shown in FIG. 82. Thus, the production can be realized at a lower cost by forming each material on the electron source substrate in the printing method.

The redundant wiring X0 with this configuration is connected to any one of the above mentioned Dox1 through Doxm, and the redundant wiring Y0 is, in one case connected to any one of the above mentioned Doy1 through Doyn, and in another case connected to external terminals Dox0 and Doy0 to fix the electrical potential.

Figure 83:
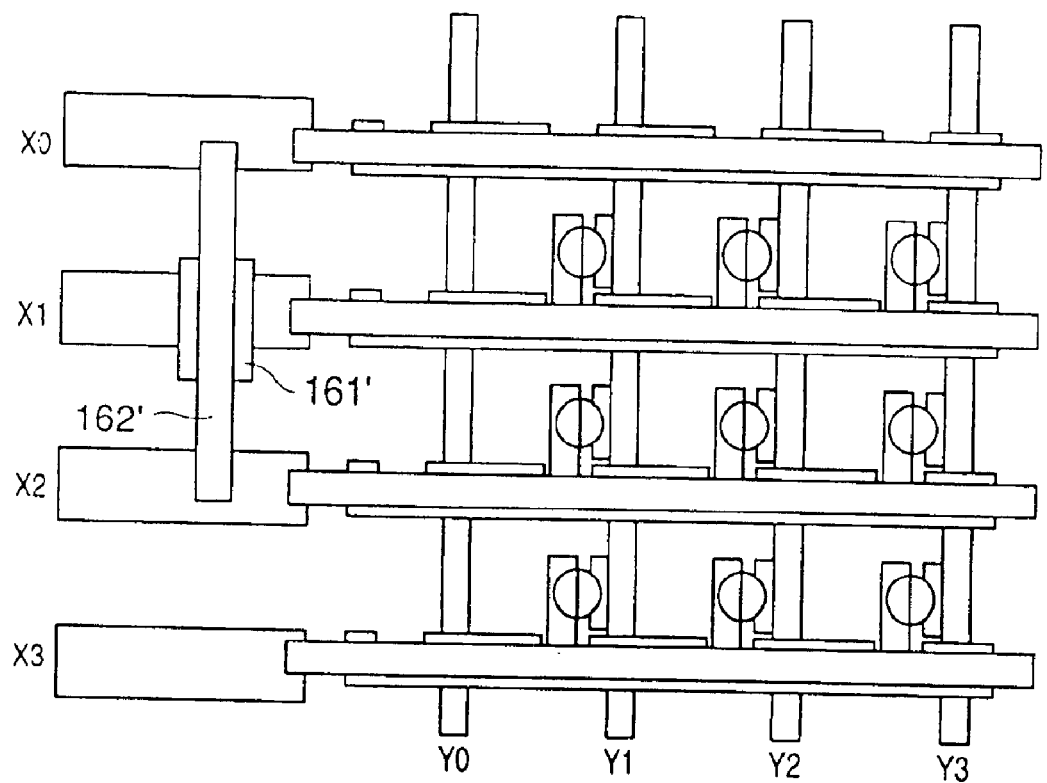
FIG. 83 is a partially enlarged plan view showing a exemplar structure of the wiring terminal section of electron beam sources used in the image formation apparatus of the present invention.

Furthermore, as shown in FIG. 83, each electron emission device is arranged in an area sectioned by the wirings, the terminal portion of the X direction wiring is simultaneously printed and formed with the Y direction wiring, and the insulation layer is provided at the intersection. Then, a wiring 162' connecting every second wiring (X0 and X2 in FIG. 83) in the X direction wiring can be simultaneously formed when it is printed and formed in the X direction wiring. In this case, the wiring 162' is insulated from the wiring X1 by an insulation layer 161'.

As described above, the electrical potential prescription material such as redundant electrodes 102', 103', or an terminal portion (drawing electrode) for connection of each wiring to the drive circuit external to the display device as shown in FIG. 83 are preferably arranged on the substrate surface outside the intersection area for prescribing the electrical potential of the surface of the substrate.

Furthermore, the above mentioned potential prescribed material is more preferably connected to each wiring, eliminating the necessity of a power supply dedicated to a potential definition member.

The examples with this configuration, etc. are described below.

EXAMPLE 1

Figure 84:
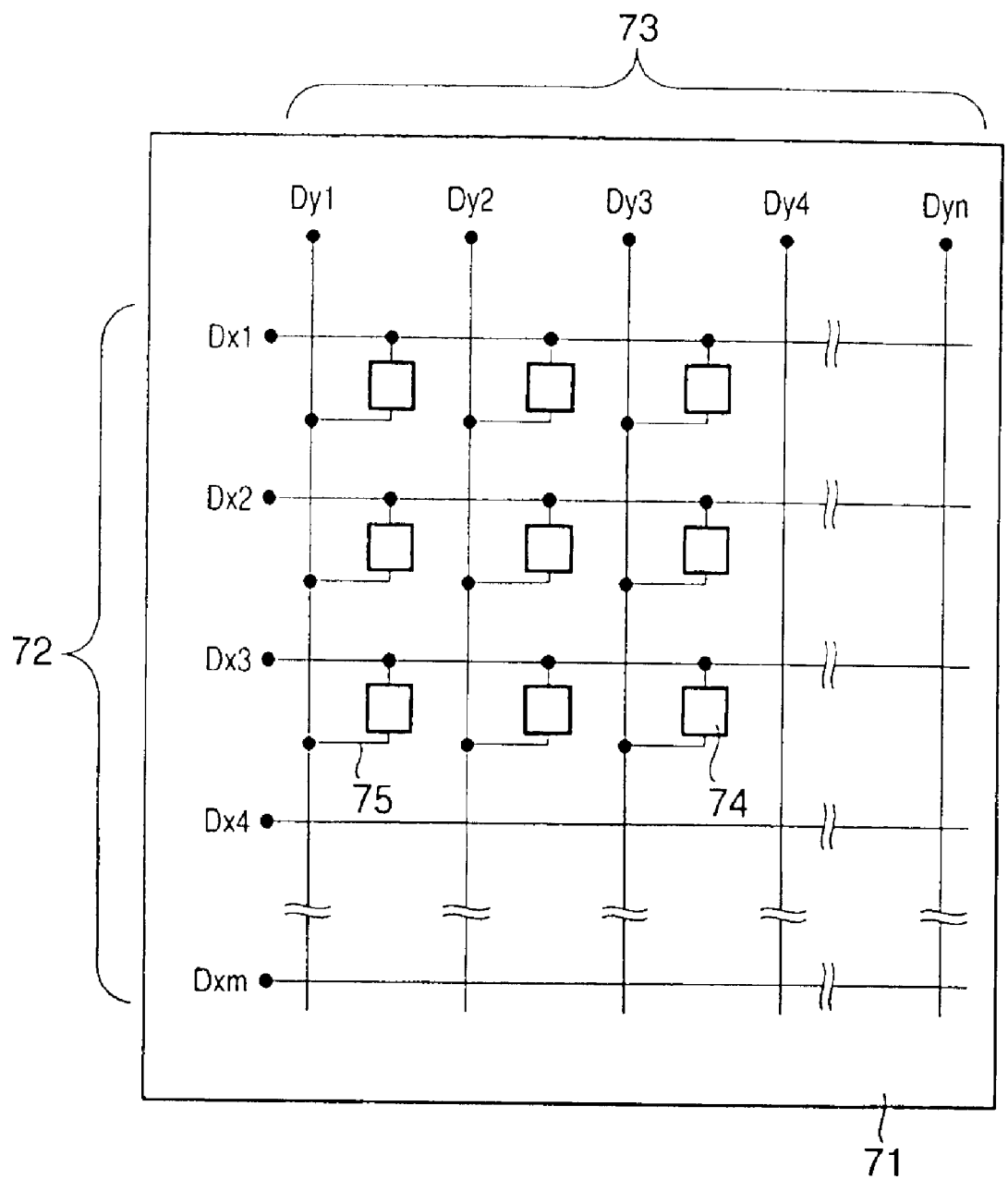
FIG. 84 is a plan view schematically showing a configuration of an electron beam source substrate of the electron beam sources used in the image formation apparatus of the present invention.

As the Example 1 of the present invention, an electron source is configured using the configuration of the electron source substrate as shown in FIG. 84 in which a number of flat surface conduction emission devices are arranged in a simple matrix form. According to this example, an electron source substrate 71 in which 120 devices 74 are arranged for each line of a row direction wiring (X wiring) 72, and 80 devices 74 are arranged for each column direction wiring (Y wiring) 73 is used, thereby producing an image forming device. Therefore, m in 'Dxm' is 80, and n in 'Dyn' is 120. In FIG. 84, reference number 75 denotes a device electrode.

Figure 85:
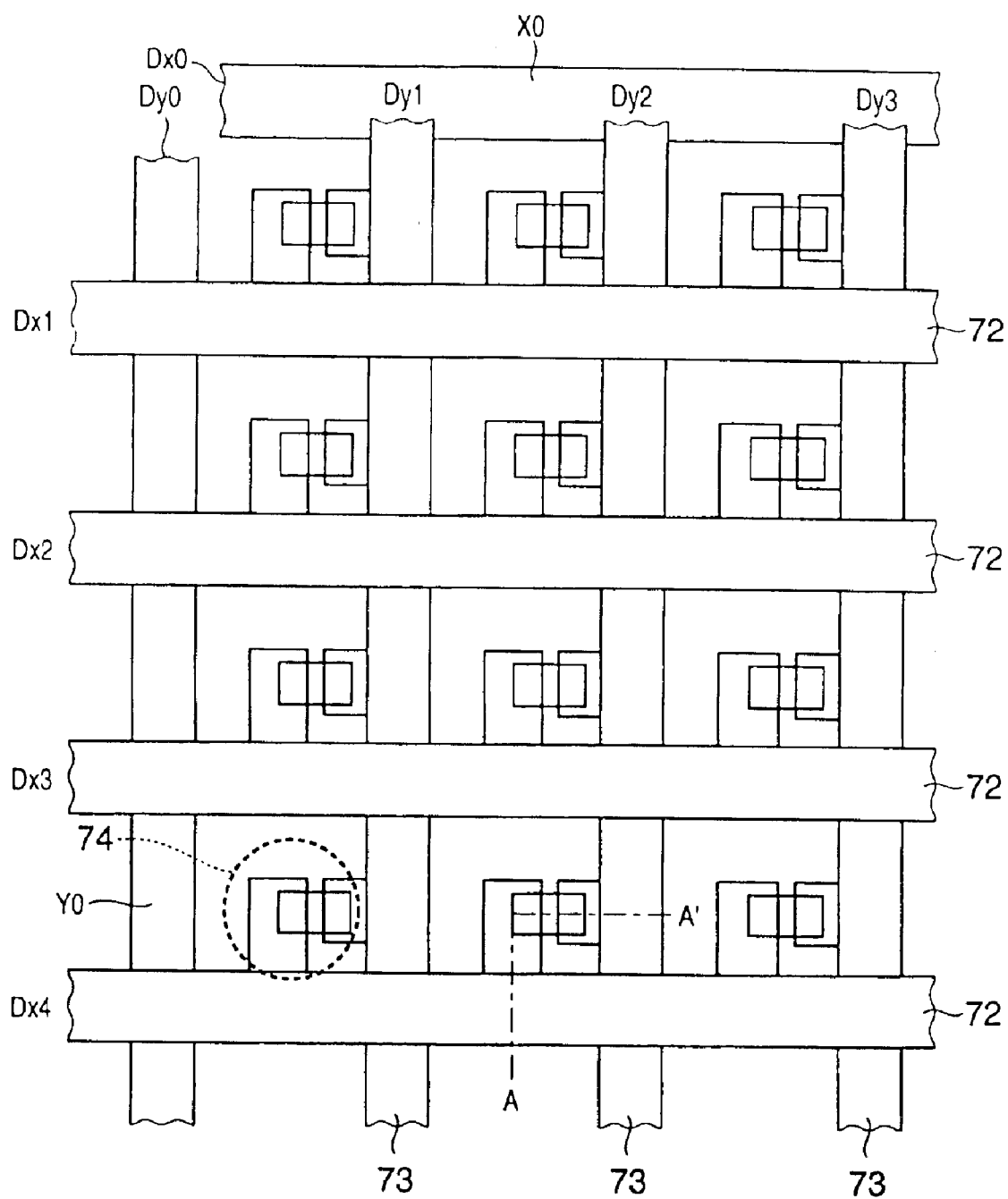
FIG. 85 is a plan view showing part of the wired in matrix substrate of the electron beam sources used in the image formation apparatus of the present invention.
Figure 86:
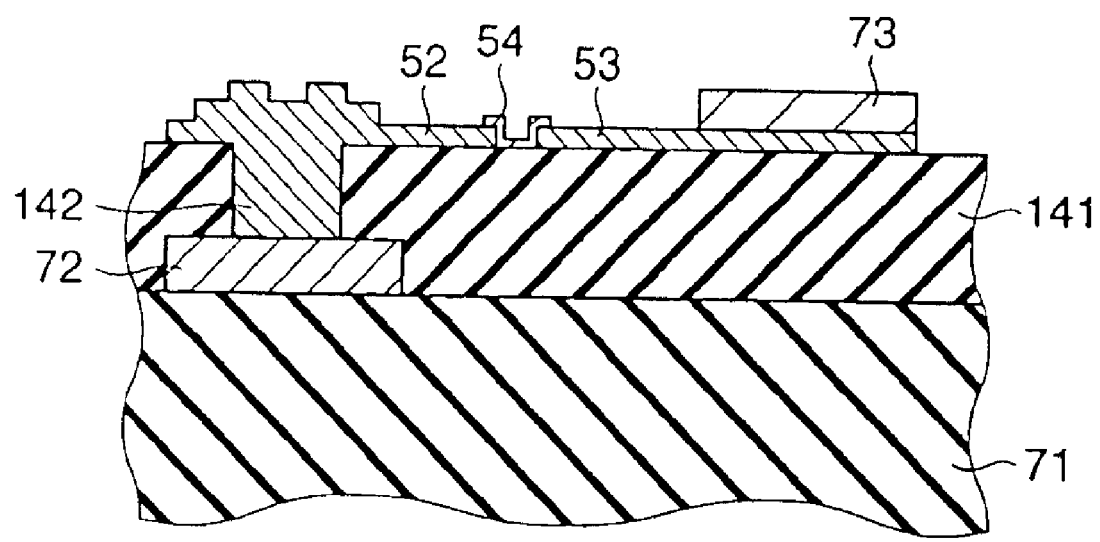
FIG. 86 is an A–A' cross-sectional view of FIG. 85.

FIG. 85 is a plan view of a part of the substrate on which a plurality of electron emission devices 74 according to this example are arranged in a matrix form, and FIG. 86 is a sectional view along A–A' shown in FIG. 85 (an electron emission portion 75 is omitted in FIG. 86). FIGS. 87a through 87g show the production process of the electron source according to this example. The units commonly appearing in these figures are assigned the same reference numbers. In these figures, reference number 141 denotes an inter-layer insulation layer, reference number 142 denotes a contact hole, reference numbers 52 and 53 denote device electrodes, and reference number 54 denotes a conductive thin film. Each process is described below.

Figure 87A:
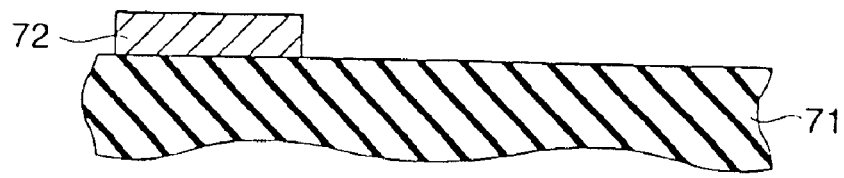
FIGS. 87a–87g are manufacturing process diagrams to explain a manufacturing procedure of the electron beam sources used in the image formation apparatus of the present invention.

Step-a:

On a substrate obtained by forming a silicon oxide film of 0.5 μm thick in the sputter method on a cleaned soda lime glass, Cr of 5 nm thick and Au of 600 nm thick are sequentially siapoaws in the vacuum vaporific method, and then a photo-resist (AZ 1370 of Hoechst) is applied by spinner method. After the baking process, a photo-mask image is exposed and developed to form a resist pattern of the lower wiring 72, and an Au/Cr disposed film is wet-etched to form the lower wiring 72 of a desired shape (FIG. 87a)

Y0 is provided as redundant wiring featuring the present invention.

Figure 87B:
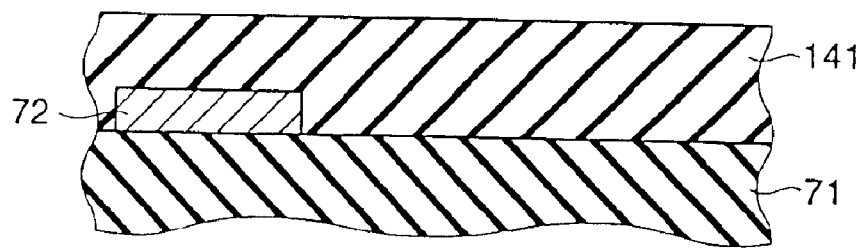

Step-b:

Then, the inter-layer insulation layer 141 of a 1.0 μm silicon oxide film is deposited in the RF sputtering method (FIG. 87b).

Figure 87C:
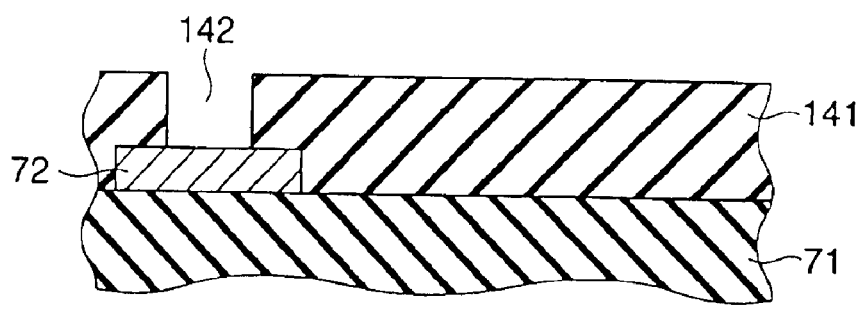

Step-c:

A photo-resist pattern for forming the contact hole 142 is formed on the silicon oxide film deposited in the above mentioned process b, and using this as a mask, the inter-layer insulation layer 141 is etched to form the contact hole 142. The etching method is performed by the RIE (reactive ion etching) method using $CF_4$ and $H_2$ gas (FIG. 87c).

Figure 87D:
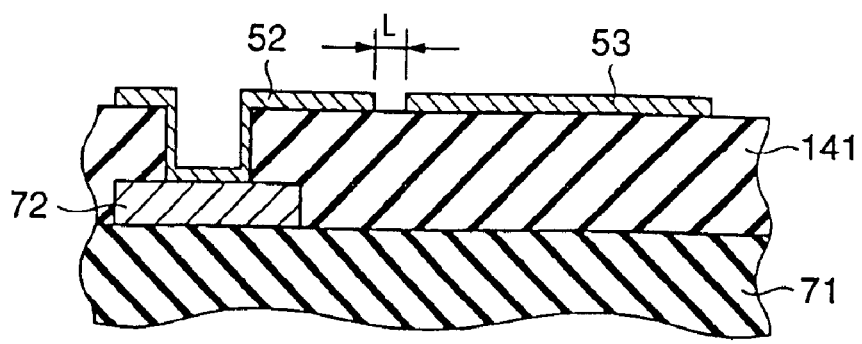

Step-d:

Then, the device electrodes 52 and 53, and a pattern of gap between the electrodes is formed using the photo-resist (RD-2000N-41 of Hitachi Chemicals), and the 5 nm thick Ti and the 100 nm thick Ni are sequentially disposed in the vacuum vapor deposition. The above mentioned photo-resist pattern is solved with an organic solvent, the Ni/Ti disposed film is lifted off, and the device electrodes 52 and 53 of 20 µm interval L of device electrodes and 300 µm width W are formed (FIG. 87d).

Figure 87E:
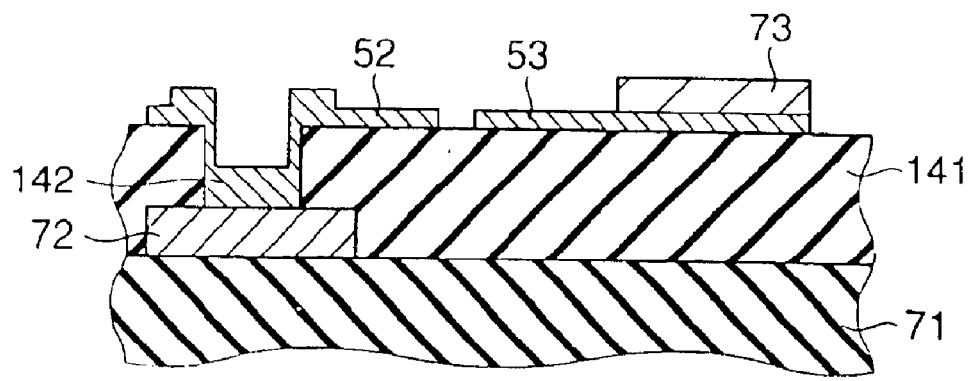

Step-e:

After forming a photo-resist pattern for the upper wiring 73 as the X direction wiring on the device electrodes 52 and 53, Ti of 5 nm thick and Au of 500 nm thick are sequentially disposed in the vacuum vapor deposition method, an unnecessary portion is removed by the lifting-off process to form the upper wiring 73 in a desired shape (FIG. 87e). The redundant wiring X0 featuring the present invention is provided.

Figure 87F:
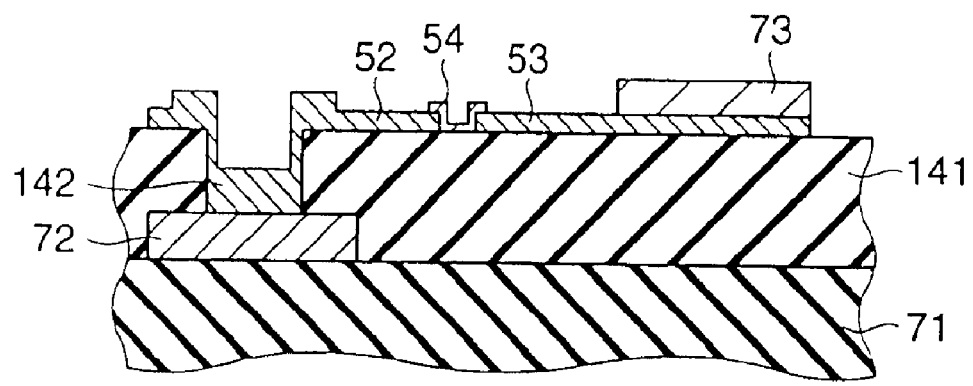

Step-f:

The Cr film of 100 nm thick is disposed and patterned in the vacuum vapor deposition method. On the film, an organic Pd solution (ccp 4230 of Okuno Pharmacy) is applied by spinner, and a heating and baking process is performed at 300° C. for 10 minutes. Thus, the formed conductive thin film 54 is 10 nm thick, and $5 \times 10^4$ Ω/❏ in sheet resistance value. Then, the Cr film and the baked conductive thin film 54 are etched with an oxide etchant to form a desired pattern (FIG. 87f).

Figure 87G:
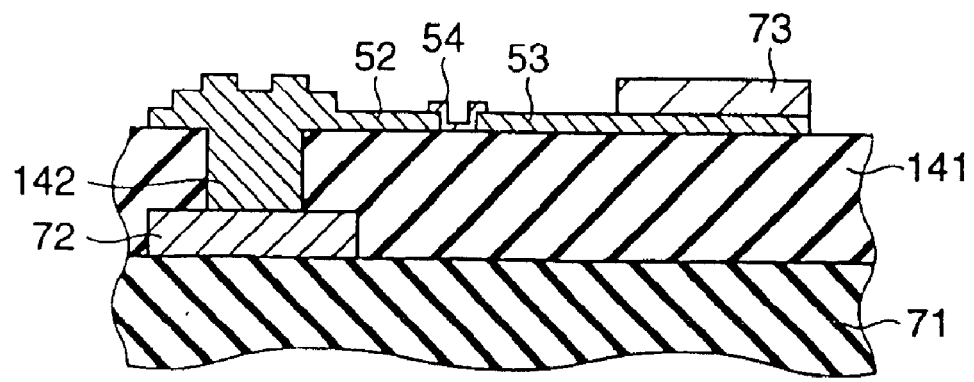

Step-g:

A resist pattern is formed at a portion other than the contact hole 142, and Ti of 5 nm thick and Au of 500 nm thick are sequentially disposed in the vacuum vapor deposition method. The contact hole 142 is embedded by removing an unnecessary portion by the lifting-off process (FIG. 87g).

Next, an electron source is configured using the above mentioned pre-formed electron source. The process is described by referring to FIG. 84.

First, the lower wiring 72, the inter-layer insulation layer (not shown in the drawings), the upper wiring 73, the device electrode 75, and the conductive film 74 are formed on the substrate 71. As described above, an electron source substrate provided with a number of surface conductive 4, electron emission device 74 is mounted in a vacuum container.

Figure 88:
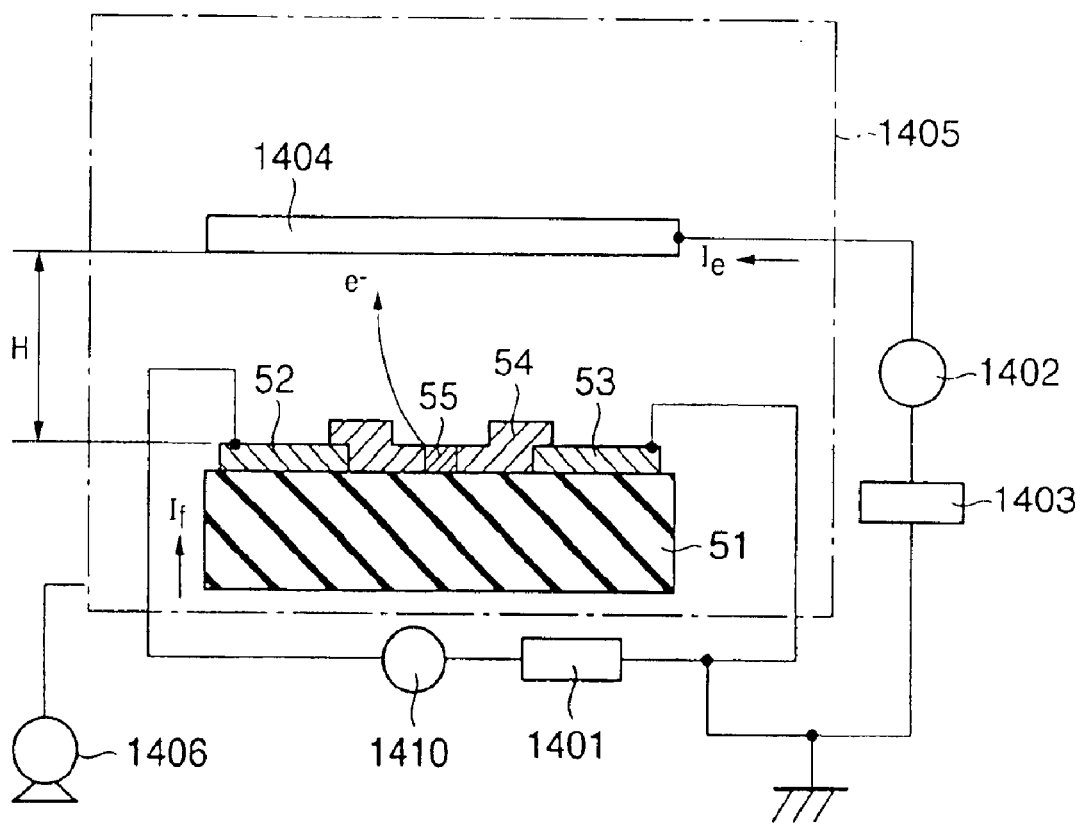
FIG. 88 is a configuration diagram schematically showing an outlined configuration of a vacuum processing apparatus.

Step-h:

In the forming process according to this example, the vacuum system shown in FIG. 88 is used. In a vacuum container 1405 whose pressure can be reduced by a vacuum pump 1406, an electron source substrate in which the device electrodes 52 and 53, and the conductive thin film 54, and the X and Y direction wiring are formed on the substrate 51 is mounted. The Y direction wiring is connected to a common electrode connected to the ground, and a predetermined voltage pulse is applied from a power supply 1401 to each X direction wiring (upper wiring). The flowing electric current therefrom is measured by an ammeter 1410. In this example, the pulse width of the voltage pulse applied to the X direction wiring (upper wiring) from the power supply 1401 is 1 msec, and 240 msec in pulse interval. A pulse of 1 msec in pulse width and 3.3 msec in pulse interval is generated, and using a switching device, the X direction wiring for applying a voltage is switched to an adjacent line.

The pulse voltage height is 11V, the pulse waveform is a rectangular wave. In addition, in the forming process, the entire display panel is maintained at 50° C., while pulse voltage is applied, mixed gas of $H_2$ and $N_2$ is introduced.

In this forming process, a crack arises in a part of the conductive thin film 54 by a current (If) flowing through the conductive thin film 54. The crack portion can be electron emission portion 55 for emitting electron.

In FIG. 88, reference number 1404 denotes an anode substrate opposite the electron source substrate at a predetermined interval H, and a voltage is applied (an anode current Ie flows) at a predetermined timing from the power supply 1403 to the anode electrode of the anode substrate 1404. The anode current is measured by the ammeter 1402.

Step-I:

Then an activating process is performed. benzonitrile is used as an organic gas forming the atmosphere, a partial pressure is controlled at $1 \times 10^{-6}$ Torr, and the method of applying a pulse is the same as in the above mentioned forming process. However, since a process cannot be simultaneously performed in all X direction wiring, 10 X direction wiring lines are grouped as 1 block, 1 pulse is applied to 1 line, that is, 10 applying operations are performed, thereby terminating an activating process on 1 block. The process is sequentially performed on the other blocks. The width of the pulse applied to the line is 1 msec, the pulse interval is 10 msec, the pulse waveform is a rectangular wave, and the wave height value is 16 V.

Then, the entire substrate is maintained at 300° C., and then exhausted. When the pressure in the vacuum chamber is equal to or lower than $1 \times 10^{-5}$ Pa, the temperature drops to the room temperature, 1 KV is applied to the anode electrode through a high voltage terminal, a drive pulse of 15V is applied to each device, the amount of electron emission Ie and the standard deviation σ of dispersion are measured on the device connected to the target redundant wiring and to its adjacent wiring, and the following results are obtained.

COMPARATIVE EXAMPLE 1

Except that the above redundant wiring X0 and Y0 are not provided, the constitution of this comparative example is identical to Example 1 and an electron beam source was made using the same procedure.

TABLE 4

|  | Average Ie in Y1 line | σy1 | Average Ie in X1 line | σx1 |
| --- | --- | --- | --- | --- |
| Example 1 | 1.8 µA | 0.1 | 1.8 µA | 0.1 |
| Comparative Example 1 | 2.0 µA | 0.4 | 2.1 µA | 0.5 |

From the above result, it is found that redundant wiring brought about an enhanced uniformity in electron emission quantity.

EXAMPLES 2 and 3

As Examples 2 and 3, an electron source with many plane type surface-conduction emission devices arranged in a simple matrix as shown in FIG. 18 was formed using printed wiring and combined with an image forming member to make up an image forming apparatus.

Referring to FIG. 89, the configuration and the production procedure of this example will be described below.

Examples 1 and 2 will be described.

FIGS. 89a to 89f are process drawings showing the production procedure of this example (here, a portion wired in matrix of 3×3, total 9, of devices situated at a corner of the image formation area as part of electron source on unillustrated substrate is shown). In FIGS. 89a to 89f, Numerals 212 and 213, denote a pair of device electrodes, 214 a conductive film for the formation of an electron emission part, 216 a first wiring layer, 217 a second layer and 218 an interlayer insulating film provided between the first wiring layer 216 and the second wiring layer 217. All the total devices are set in a configuration of 720 devices arranged in row and 240 devices arranged in column.

Figure 89A:
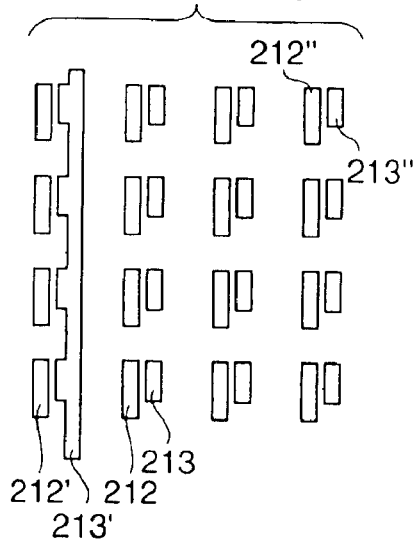
FIGS. 89a–89f are manufacturing process diagrams to explain a manufacturing procedure of the electron beam sources used in the image formation apparatus of the present invention.

First, on a previously washed substrate (here, a soda lime glass substrate is used), printing and baking of device electrodes is performed to form a pair of electrodes 212 and 213 (FIG. 89a). In this example, a thick-film print method was used as a method for forming a film. The thick-film paste material used here is a MOD paste, the main metal ingredient of which is Au. In printing, the screen print method was used. After printing elements in a desired pattern, drying is carried out at 70° C. for 10 min., then executing the burning. The baking temperature is 550° C. and the peak retention time is about 8 min. The pattern after the print and burning was formed by setting one group of device electrodes 213 to 350×200 μm and another group of device electrodes 212 to 500×150 μm. A pattern of sideways anisometric was formed at a film thickness of about 0.3 μm and at intervals of individual electrodes 212 and 213 of 20 μm.

Figure 89B:
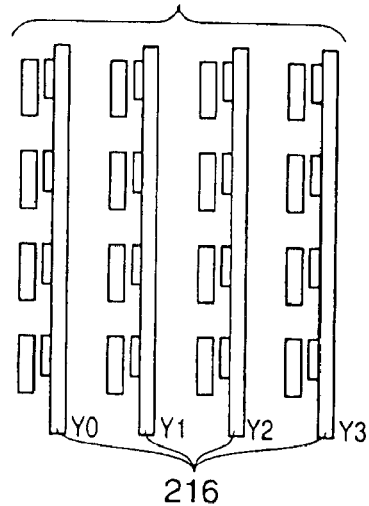

Next, a first wiring layer is formed (FIG. 89b). In forming a first wiring layer 216, Y-direction wires are formed in all patterns and that in connection to device electrodes 213. In this example, a thick-film screen print method was used as the method for forming first wiring layers 216. As paste materials, a mixture of fine-grained powder of a conductive material with a lead oxide-based glass binder was used. In addition as a conductive material Ag-paste was used. Besides, screen print was performed in a desired pattern and then burned at 550° C. for a peak retention time of 15 min after the drying at 110° C. for 20 min to provide 100 μm wide and 12 μm thick Y-direction wires serving for a first wiring layer 216. Herein, the first wiring layer 216 characterizing the present invention is formed (FIG. 89b). In addition to those formed in connection to electron emission device electrodes 213, redundant wires Y0 and redundant electrodes 212' and 213' were provided adjacently to the left-end device column at which no wiring was formed of end devices to one side as column wires in the formation of a first wiring layer 216. Furthermore, below the above redundant column wires Y0, those to the side of connection to the column wires Y0 among the above electrode devices were linked and formed in the shape of a single continuous line as shown in FIG. 89a.

Figure 89C:
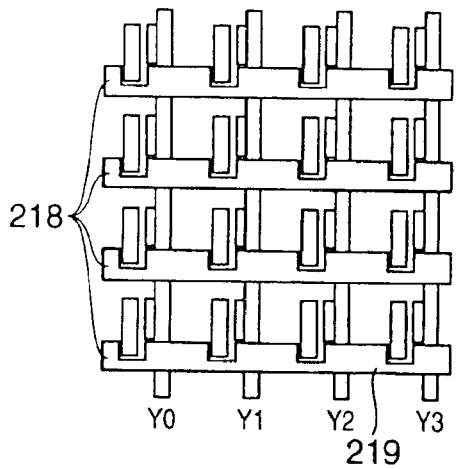

Here, an interlayer insulating film 218 was formed (FIG. 89c).

This interlayer insulating layer 218 was formed at intersecting portions between X-direction wires and Y-direction wires. As constituents of this interlayer insulating film 218, a PbO-based thick-film past containing no metallic component was used.

In the formation of an interlayer 218, a thick-film screen method was used. Screen print was performed in a desired pattern and then burned at 550° C. for a peak retention time of 15 min after the drying at 110° C. for 20 min to provide 500×500 μm sized and 30 μm thick interlayer insulating layer 218.

Figure 89D:
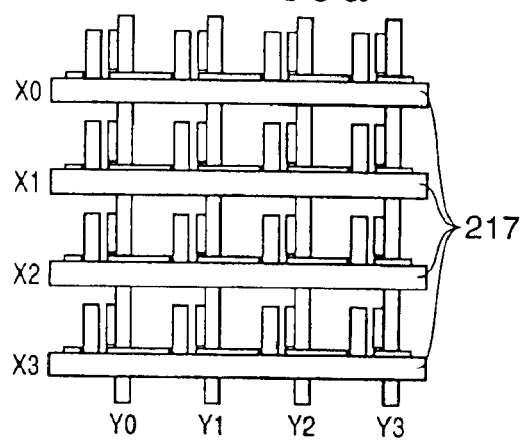

Next, a second wiring layer 217 will be formed (FIG. 89d). In the formation of a second wiring layer 217, the X-direction wires are formed in all patterns in contrast to a first wiring layer 216. The X-direction wires are formed in connection to respective device electrodes 212. In this wiring formation, a thick-film screen printing method was used as the method for forming first wiring layers 216. The thick-film paste material used was the same Ag paste as with the first wiring layer 216 and its metallic component is Ag. Screen print was performed in a desired pattern and then baked at 550° C. for a peak retention time of 15 min after the drying at 110° C. for 20 min to provide 100 μm wide and 12 μm thick X-direction wires serving for a second wiring layer 217 on the first wiring layer 216. In this manner, with the formation of the second wiring layer, the matrix wiring comprising multiple (two) layers of the X-directional wiring and the Y-directional wiring insulated to each other was completed (FIG. 89d).

According to the above procedure, the portion of the matrix wiring was completed, but the paste material, print method and the like are not limited to those mentioned here.

Figure 89E:
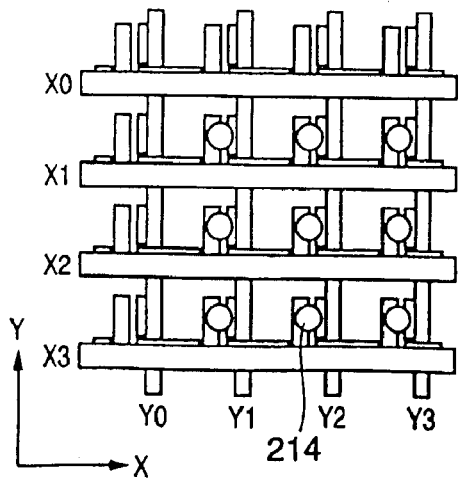
Figure 89F:
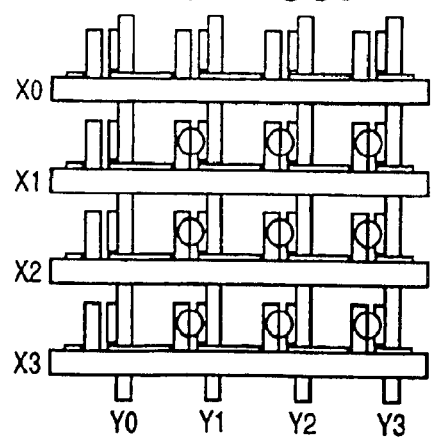

Finally, a thin conductive film 214 for the formation of an electron emission part (surface-conduction electron source) will be formed (FIG. 89e). In the formation of a thin conductive film 214, the liquid droplet giving method described below was formed.

When liquid droplets are given onto device electrodes by a liquid droplet giving device, a solution made of water, a metallic compound and an organic solvent and having a viscosity enough to make a droplet is used to basically form liquid droplets. In this example, Pd was used as the metallic element of the metallic compound. As the liquid droplet giving device, an ink-jet device or a bubble jet process device was used. Burning was performed at 300° C. for 10 min, the discharged quantity of liquid droplets was so regulated as to make a film of thickness of 100 Å and a film indicating a sheet resistance of $4 \times 10^4$ was formed.

In FIGS. 89a to 89b, only the portion of 9 devices is illustrated, but such devices at a sequence of 720 in the X-direction and at a sequence of 240 in the Y-direction were simultaneously formed to complete the configuration of an electron source board comprising multiple layers in the simple matrix type.

Next, an electron source substrate with the surface-conduction electron source produced as mentioned above was used to a display panel. Furthermore, redundant row wires X0 and redundant column wires Y0 characterizing Example 2 are connected via out-of-vessel terminals Dx0 and Dy0 to the ground to determine the electric potential.

Next, Example 3 will be described.

Figure 90:
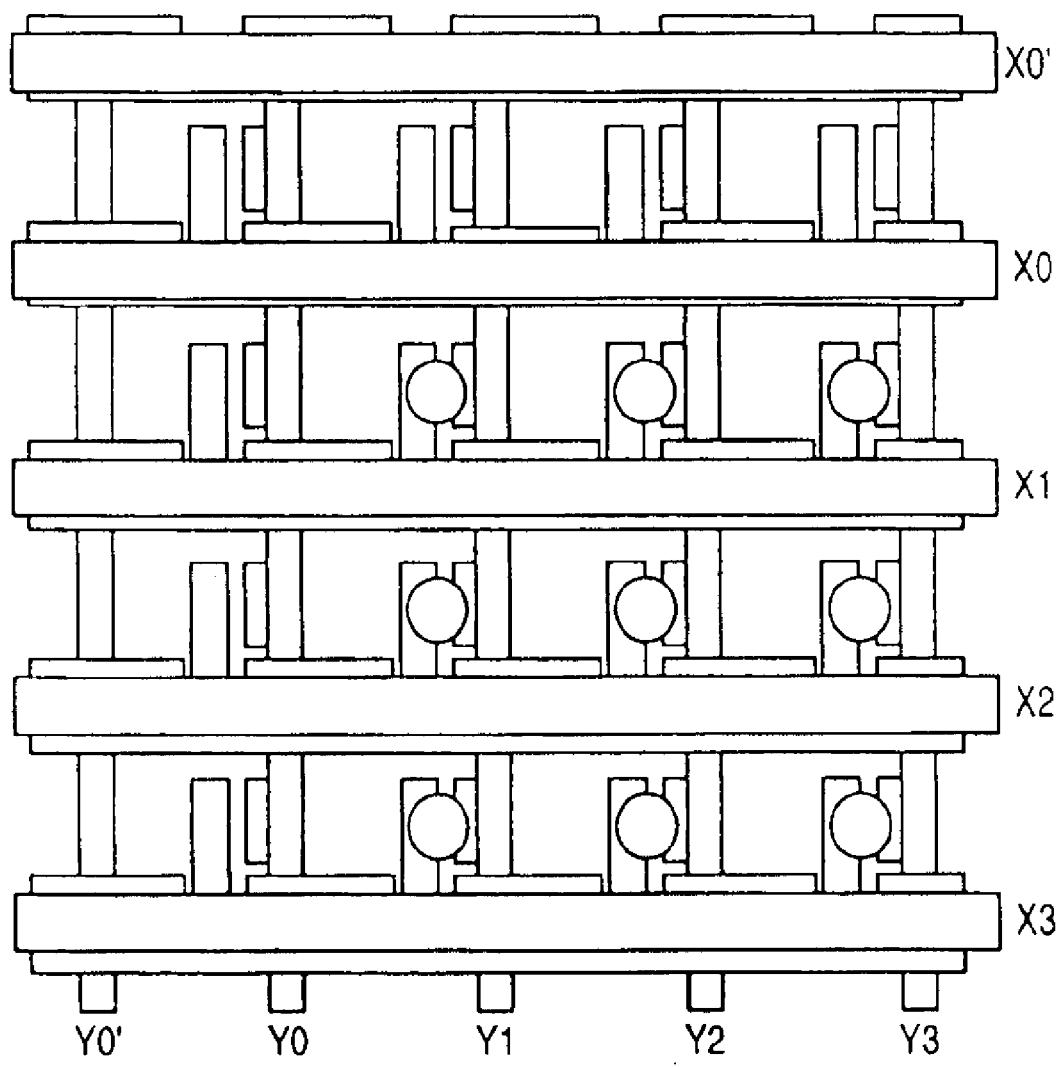
FIG. 90 is a partially enlarged plan view showing another exemplar structure of the wiring terminal section of the electron beam sources used in the image formation apparatus of the present invention.

In this example as shown in FIG. 90, since as many redundant wires as two are provided so as to reduce the influence of any printed wire disconnection and the production procedure and the constituent member was set to the same as with Example 2 of 15th Configuration. However, except that electrodes below redundant wires were linked to provide a linear pattern. The redundant wires X0 and X0' as well as Y0 and Y0' are connected in the vessel and are connected via the out-of-vessel terminals Dx0 and Dy0 to the ground to determine the electric potential.

COMPARATIVE EXAMPLE 2

This comparative example is an image forming apparatus constructed without the provision of redundant wires in which the production process proceeded under the same conditions as with Example 2 of 15th Configuration.

The results obtained in case of using the constructions of Examples 1, 2 and the Comparative Example 2 are shown in Table 5.

TABLE 5

|  | Ie (Y1) | σy1 | Ie (X1) | σx1 |
| --- | --- | --- | --- | --- |
| Example 2 | 1.7 μA | 0.1 | 1.7 μA | 0.1 |
| Example 3 | 1.6 μA | 0.1 | 1.6 μA | 0.1 |
| Comparative Example 2 | 1.9 μA | 0.35 | 2.0 μA | 0.4 |
|  | Luminance (Y1) | σy1 | Luminance (X1) | σx1 |
| Example 2 | 4000 cd | 150 | 4100 cd | 160 |
| Example 3 | 3900 cd | 130 | 3900 cd | 145 |
| Comparative Example 2 | 3700 cd | 500 | 3800 cd | 540 |

As found from Table 5, the provision of redundant wires near devices promotes the uniformity as an electron source and reduces the variations of luminance. Here, a decrease in the average of luminance is attributable to a deformation in the form of an electron beam due to the potential distribution, thus leading to an increase in the ratio of electron radiated to the black stripe of a face plate and a fall in the efficiency of conversion into light.

EXAMPLE 4

Figure 91:
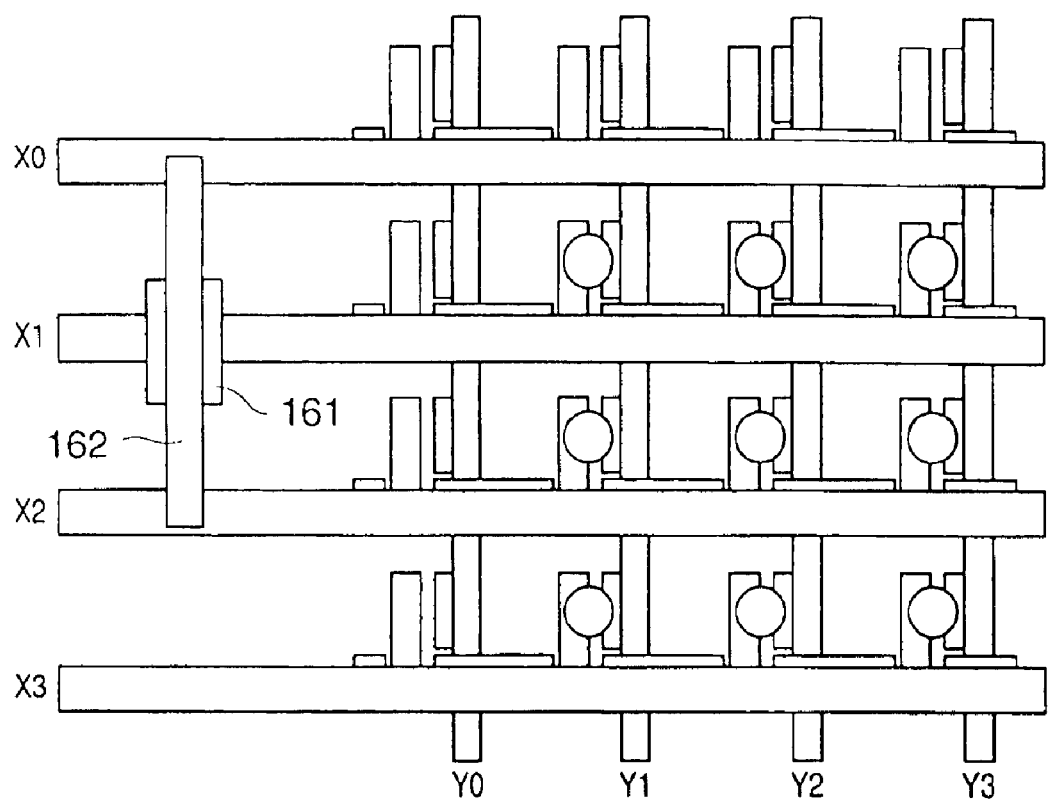
FIG. 91 is a partially enlarged plan view showing another exemplar structure of the wiring terminal section of the electron beam sources used in the image formation apparatus of the present invention.

In the above individual examples of 15th Configuration, redundant wires were specified in potential via the out-of-vessel terminal, but this example is characterized in that row-direction redundant wires were connected to any one of the row wires connected to electron emission devices, here, to the second neighboring wire and column-direction redundant wires were connected to neighboring column wires. As shown in FIG. 91, an insulating layer 161 was formed at part of the row wire adjacent to the redundant row wire X0 and then the third wire 162 was formed in the shape of connecting the redundant wire X0 to the second neighboring row wire X2.

By adopting the above configuration, the provision of the above redundant wire eliminated the electron emission devices not sandwiched by wires and the charged state near a device became equivalent to all other devices, so that the following effects were obtained as electron sources corresponding to the above phenomenon:

(1) Enhancement in the uniformity of electron emission characteristics;

(2) Enhancement in the shape uniformity of electron beams;

(3) Reduction of time fluctuation in electron emission characteristics and the shape of electron beams; and (4) Reduction in charged quantity and eliminated deterioration of electron sources due to electric breakdown with an electrode or wiring.

In brief, in the image forming apparatus using electron sources as mentioned above, an increased uniformity of luminance and a higher image characteristic was implemented.

(16th Configuration)

The construction of the wire lead part in a display panel can be taken as follows. In other words, this example provides a construction with the length of the row-directional or column-direction lead wire part optimized and the periphery of the image display section to be narrowed as much as possible. An example according to this construction will be mentioned below.

EXAMPLE 1

Figure 92:
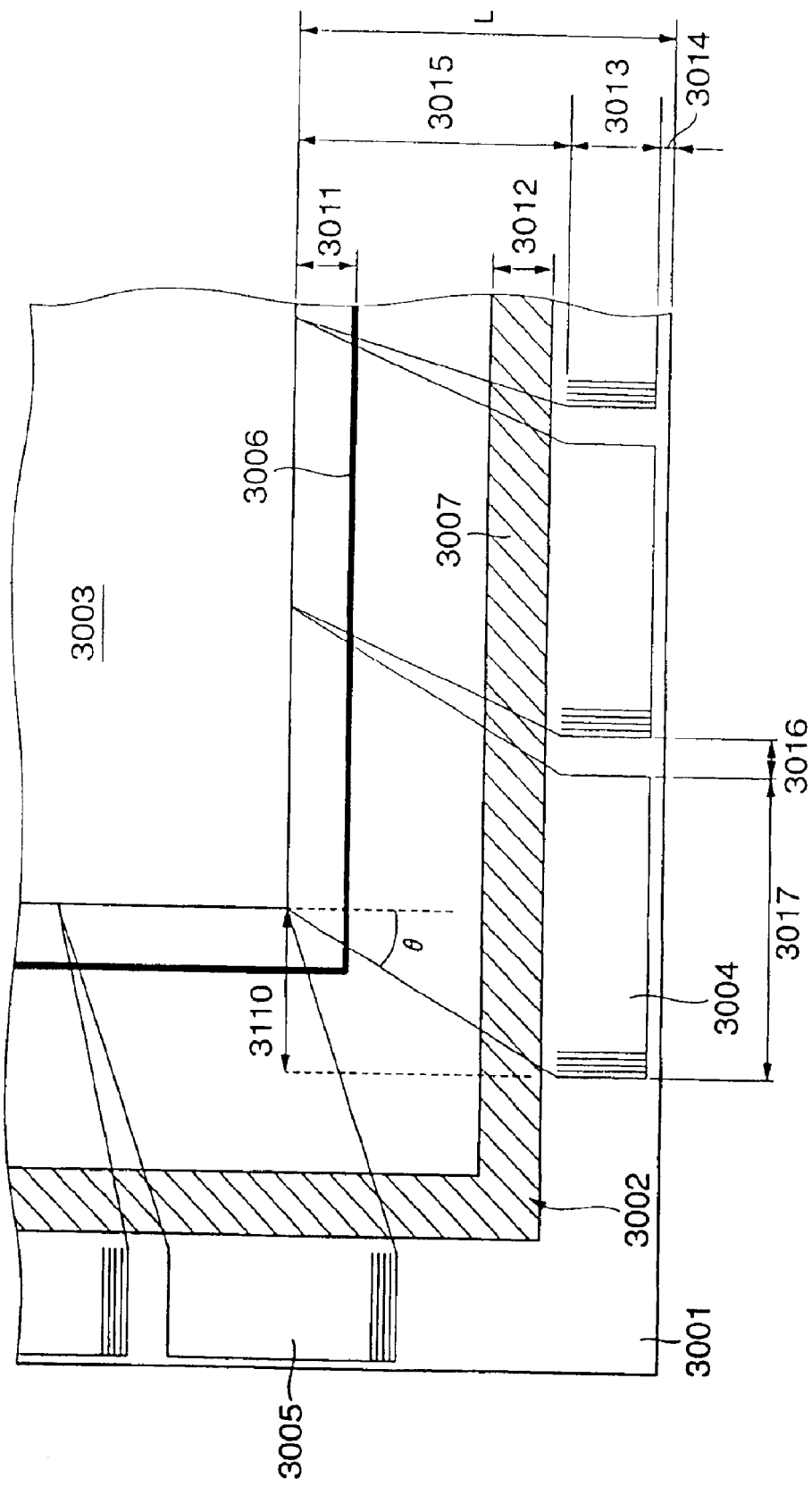
FIG. 92 is a partially enlarged plan view of the display panel section of the image formation apparatus, another example of the present invention.

FIG. 92 is a plan view showing a part of a display panel (image display apparatus) to which to apply this 16th Configuration. The display panel shown in FIG. 92 is a display panel using surface-conduction electron emission devices according to one aspect of 16th Configuration and a part of the panel prior to packaging a flexible cable is shown to specifically describe the length of the lead wire part in FIG. 92.

In FIG. 92, Numeral 3001 denotes a device board of the image display apparatus comprising surface-conduction emission devices and row-direction and column-direction wires formed by the print wiring, numeral 3002 denotes a face plate with fluorescent materials and positive electrodes placed in a plane opposite the device board 3001, numeral 3003 denotes a pixel section with surface-conduction emission devices placed at intersections on the matrix wiring, numeral 3004 denotes one-block lead wires at the column-direction side printed for butting against a flexible cable (unillustrated) after dividing the column-direction wires into blocks, numeral 3005 denotes one-block lead wires at the row-direction side printed for butting against a flexible cable (unillustrated) after dividing the row-direction wires into blocks as with lead wire 3004, numeral 3006 denotes a getter member for absorbing the gas released from the pixel section during the display of images and numeral 3007 denotes a frame used for the vacuum sealing of the face plate 3002 and the device board 3001.

Symbol L denotes the length of lead wiring evaluated in this example, while numeral 3011 denotes a distance to the getter 3006 placed in consideration of creeping discharge from the pixel section 3003, numeral 3012 denotes the width of a frame constructed for the vacuum sealing. The outline part of the frame becomes an outline of the face plate 3002. Numeral 3013 denotes the length of a flexible junction part for the direct packaging with a flexible cable, numeral 3014 denotes the distance from the outline part of the device board to the portion with printed wiring, numeral 3015 denotes the length determined from the printing angle at the time of print wiring on the device board, the one-block length 3017 obtained when dividing the lead wiring into multiple blocks and the quantity of clearance 3016 between the blocks.

With this example, in optimizing the length of a lead wire, the length of a lead wire at the side of column direction wires and at the side of row direction wires was equated. This is because equating the width from the pixel section 3003 to the device board 3001 enables panel constructing members and the like after the packaging of a flexible cable to be constructed at one and the same specifications, thus leading to saving the cost and the like. Thus, the length of a lead wire is to be described at the side of column direction wires. Incidentally, the length of a lead wire at the side of column direction wires and at the side of row direction wires is not limited to one and the same length, but individual length may be changed in light of the design of a panel.

Next, a manner of determining the length L of a lead wire will be described in details. The length L of a lead wire is determined by factors 3011 to 3017.

First, referring to 3011. Numeral 3011 denotes the distance from the pixel section 3003 to the getter part 3006 as mentioned above. The getter 3006 is a member for absorbing the gas released from the pixel section during the display of images and absorbs the gas generated when electrons emitted from a surface conduction emission device collides against a fluorescent material of the face plate 3002 in case of driving the display. Thereby, the panel interior is always kept constant in vacuum degree (near 1×10$^{-5}$ torr). The getter member is generally made of metallic material or the like and, for example, constructed in the form of a wire disposed on a lead wire on the device board 3001 and on the space of the face plate 3002. A problem in disposing a metallic member in the panel is the creeping discharge with a high-voltage (anode voltage) applied to the face plate 3002. The creeping discharge is more likely to occur the nearer the getter member comes to the pixel section 3003 and depends upon a value of anode voltage. Thus, to avoid the creep discharge at the lowermost, it is necessary to keep the getter 3006 at a certain distance from the pixel section 3003.

In this example the value experimentally established is adopted for 3011, keeping the getter 3006 at least 4 mm or more (anode voltage 12 kV) from the pixel section 3003.

Secondly, 3012 is to be at issue. First, the frame 3007 used for the vacuum sealing of the face plate 3002 and the device board 3001 will be described. The frame 3007 is provided to prevent the slow leak from the outside (atmosphere) in favor of the vacuum degree in the panel and to prevent the deformation due to a thermal stress of the panel during the heat treatment such as baking in the panel manufacturing process. For the frame member, those of adhesive type are principally used. The slow leak is considered to originate in the interface between the face plate 3002 and the adhesive and the frame part is found to need a width of about 3 mm to 10 mm in order to avoid the slow leak. Thus, in this example, the width 3012 of the frame 3007 was set to at least 5 mm or greater in consideration of preventing the deformation due to a thermal stress.

Next, flexible joints 3013 with the flexible cable will be described. For flexible joints for the connection to an external display circuit as the display device, the contact resistance with the flexible cable becomes important. In particular, at the row direction wire side, since multiple surface-conduction emission devices are connected, current flows at a value of several A. Thus, in case the deviation of the contact position due to an alignment fault between a lead wire and the flexible cable leads to an unstable contact resistance or an elevated value of contact resistance, a problem of disconnection or voltage drop at the contact part takes place, thereby resulting in the deterioration of image quality or line defects. To eliminate these problems and promote the reliability, a contact with the flexible cable is made using a technique such as ACF (anisotropic conductive film) in this example.

Furthermore, in this example, a construction that can cope with the process using a probe or the like in the panel manufacturing step is prepared on the flexible junction 3013. Accordingly, when checking the neighboring short-circuit of both row and column direction wired, for example at the end of manufacturing step in the shape of FIG. 2, measurement is performable by contact of a contact part needle such as probe with any position on flexible joints. As mentioned above, flexible joints 3013 are set to 5 mm in length including the checking contact part in another step in consideration of contact stability with the flexible cable. The length 3014 is related to the quantity of clearance extending from the outline part of the device board to the printed wiring portion and determined by a printing device. In this example, the length 3014 is set to 2 mm.

As mentioned above, the length 3015 is determined by the length 3017 of a lead wire in one block, the quantity of clearance 3016 between the blocks. and the print angle in the print direction during the print wiring. To explain these specifically, FIGS. 93a and 93b will be referred to.

Figures 93A, 93B:
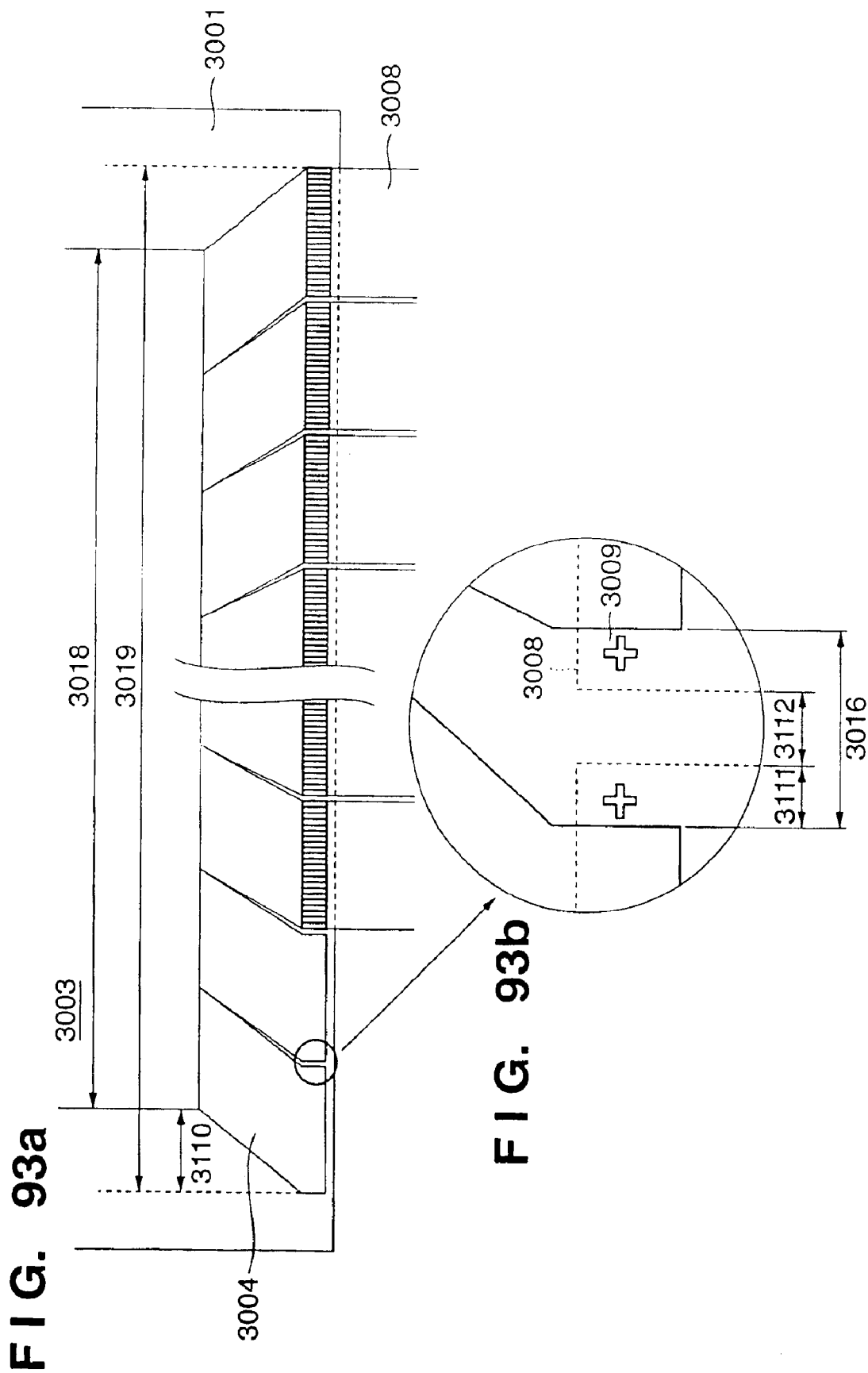

FIG. 93a is an enlarged view of part of the panel of FIG. 92 for the column direction wire part and in particular shows a packaged flexible cable in the portion of a column direction lead wire 3004. Besides, to be understandable, a package drawing of the flexible cable is omitted and an enlarged view of the clearance part between 2 blocks of the left lead wire is shown in FIG. 93b. In FIGS. 93a and 93b, Numeral 3008 denotes the flexible cable corresponding to one block of a lead wire, numeral 3018 denotes the total length in column of the pixel section, numeral 3019 denotes the total length in column of flexible joints, and numeral 3110 denotes the one-side length of flexible joints when its length 3019 exceeds the length of the pixel section 3018. Besides, 3111 denotes the one-side unconfined length of a flexible cable 3008 at the pressure contact after registration with the alignment mark 3009 of a lead wire. In this example, the unconfined quantity was set to 2.5 mm. Numeral 3112 represents the margin quantity of flexible cables at the pressure contact between them. This margin quantity is determined from the apparatus at the packaging of flexible cables to a certain degree and required to be on the order of several mm. In this example, the margin quantity 3112 was set to 3 mm or longer. Usually, when joining the wiring by means of flexible cables, it is general to make the wiring pitch thinner in the flexible joints than in the pixel section and promote the packaging density. Besides, because the total length 3019 of flexible joints is determined by flexible junctions and the clearance 3016 of flexible cables between all individual blocks, 3019>3018 holds for a high precision apparatus such as XGA, whereas 3019<3018 holds mostly for a relatively small number of pixels. In FIGS. 93a and 93b, joints in case of 3019>3018 are shown.

First in evaluating the quantity 3015, the quantities 3019 and 3018 must be calculated. The quantity 3019 can be calculated as follows.

On letting X and P be the number of wires in a one-block interval and the wiring pitch, respectively, the pitch Bp in a one-block interval is calculated as $$Bp = X*P + 16 \quad (1).$$

The number Bn of all blocks on letting Dyn be the number of column direction wires is calculated as $$Bn = Dyn/X \quad (2).$$

In accordance with Formulae (1) and (2), the quantity 3019 is found as Bn×Bp (number of blocks×inter-block pitch).

Besides, the quantity 3018 can be calculated as follows. From the pixel pitch Pn in the pixel section and the number Dyn of column directional wires, the quantity 3018 is found as Pn×Dyn.

Next, based on the above calculation, the quantity 3110 will be evaluated. The quantity 3110 is found as 3110= 3019−3018/2. Both ends of the flexible joints are not confined within the pixel section 3003 if 3110 is positive, and is disposed within the pixel section 3003 if 3110 is negative.

Usually, since the inter-block wiring pitch P is more minutely formed than the pitch Pn in the pixel section, such construction as 3019 is nearly equal to or smaller than 3018 can be performed by increasing the length 3017 of the flexible joint. In fact, on taking into consideration the inter-pitch precision of flexible cables, the alignment accuracy of flexible cables at the pressure contact, problems of a pressure contact device and further the restriction of number of pins in a connector or the like used when connecting a flexible cable to the display circuit system forces the length of 3017 to be actually restricted to a certain extent under present circumstances.

If an extremely positive or negative value of 3110 is obtained from the above calculation, i.e. if the wiring pitch is set under conditions that the total length of the flexible joints differs greatly from the length of the pixel section 3003, it is preferred to calculate a optimal value of 3015 by changing a value of clearance 3016 or changing the number X of wires in one-block so that 3018 and 3019 approach to each other as closely as possible.

Next, the quantity 3015 can be evaluated from the print angle θ in the print direction during the print wiring and the above quantity 3110. The print angle θ is determined by the angle of the mesh used during the print. When an attempt is made to print a wiring pattern with a greater angle than the mesh angle, for example, disconnection of wires takes place on account of a poor discharge from on the mesh or an interference. In this example, the print angle is set to about 25 degrees from the above conditions. From these, 3015 can be found from the following calculation:

$$3015 = 3110/\tan \theta (\theta = 25 \text{ degrees}) \quad (3).$$

In the formulae (1) to (3) mentioned above, the number X of wires in one-block of the flexible junction part and the quantity 3016 of clearance between the blocks are dominant in (1) and the size of an image display apparatus and the number of pixels are dominant in (2), so that optimal values of 3015 for varied specifications of individual image display apparatus and lead wire parts were evaluated. Incidentally, the value of 3015 is computed at the side of wiring in column here, but can be evaluated by a similar calculation also at the side of wiring in row. θ can be set below 45 degrees.

TABLE 6

Image Display Specifications

| Image display specifications | Number of devices (column*row) | Wiring pitch (column*row) mm | I8 (mm) |
|---|---|---|---|
| 30" VGA | 2556*480 | 0.29*0.87 | 742 |
| 42" XGA | 4068*768 | 0.23*0.69 | 932 |
| 60" HD | 5760*1080 | 0.23*0.69 | 1324 |

1. 30" VGA Specifications
   Number of In-Pixel Wires Dyn 2560
   In-Pixel Wiring Pitch Pn 0.29
   Between Flexible 16 = 8
   In-Block Wiring Pitch P 0.2
   Print Angle θ = 25

| Number of in-block wires X | Inter-block pitch Bp (mm) | Number of all blocks Bn | I9 (mm) | I8 (mm) | I10 (mm) | I5 (mm) |
|---|---|---|---|---|---|---|
| 40 | 16 | 64 | 1024 | 742 | 141 | 302 |
| 80 | 24 | 32 | 768 | 742 | 13 | 28 |
| 160 | 40 | 16 | 640 | 742 | −51 | −109 |
| 320 | 72 | 8 | 576 | 742 | −83 | −178 |
| 640 | 136 | 4 | 544 | 742 | −99 | −212 |

Between Flexible 16 = 15

| Number of in-block wires X | Inter-block pitch Bp (mm) | Number of all blocks Bn | I9 (mm) | I8 (mm) | I10 (mm) | I5 (mm) |
|---|---|---|---|---|---|---|
| 40 | 23 | 64 | 1472 | 742 | 365 | 783 |
| 80 | 31 | 32 | 992 | 742 | 125 | 268 |
| 160 | 47 | 16 | 752 | 742 | 5 | 11 |
| 320 | 79 | 8 | 632 | 742 | −55 | −118 |
| 640 | 143 | 4 | 572 | 742 | −85 | −182 |

TABLE 6-continued 2. 42" XGA Specifications
   Number of In-Pixel Wires Dyn 4068
   In-Pixel Wiring Pitch Pn 0.23
   Between Flexible 16 = 8
   In-Block Wiring Pitch P 0.2
   Print Angle θ = 25

| Number of in-block wires X | Inter-block pitch Bp (mm) | Number of all blocks Bn | I9 (mm) | I8 (mm) | I10 (mm) | I5 (mm) |
|---|---|---|---|---|---|---|
| 40 | 16 | 102 | 1672 | 932 | 348 | 745 |
| 80 | 24 | 51 | 1220 | 932 | 144 | 309 |
| 160 | 40 | 25 | 1017 | 932 | 43 | 91 |
| 320 | 72 | 13 | 915 | 932 | −8 | −18 |
| 640 | 136 | 6 | 864 | 932 | −34 | −72 |

Between Flexible 16 = 15

| Number of in-block wires X | Inter-block pitch Bp (mm) | Number of all blocks Bn | I9 (mm) | I8 (mm) | I10 (mm) | I5 (mm) |
|---|---|---|---|---|---|---|
| 40 | 23 | 102 | 2339 | 932 | 704 | 1509 |
| 80 | 31 | 51 | 1576 | 932 | 322 | 691 |
| 160 | 47 | 25 | 1195 | 932 | 131 | 282 |
| 320 | 79 | 13 | 1004 | 932 | 36 | 78 |
| 640 | 143 | 6 | 909 | 932 | −12 | −25 |

The above table shows the values of 3015 evaluated at values of clearance 3016 between the flexible joints set to 8 mm and 15 mm for image display sizes of 30, 42 and 60 inches. When actually determining 3015 from the above table, for example, on referring to the 60" HD specifications, 3015 amounts to 30 mm at the clearance 3016 set to 8 mm and the number of inter-block wires set to 320, which is found to be minimized. In contrast, in case of 30" VGA, 3015 amounts to 11 mm at the clearance 3016 set to 15 mm and the number of inter-block wires set to 160, which is found to be minimized. As shown above, calculation was performed at varied numbers of inter-block wires in a flexible joint for each image display size, thereby an optimal value of 3015 to be set. Incidentally, the number of wires in one block is not limited to the above, but may be varied if necessary. Furthermore, a minus value indicated by 3015 originates in the fact that the total length of a flexible joint becomes shorted than the total length of the image section 3003 and is not especially at issue in determining 3015.

Next, the added value of the creepage distance of insulation 3011 and the frame width 3012 (for 11=4 mm and 12=5 mm, 11+12=9 mm) is compared with the determined value of 3015. In other words, for the optimal value of 3015 found from the above individual tables, the creepage distance of insulation 3011 for the disposition of a getter 3006 and the width of the frame 3012 provided on the face plate 3002 are required at the lowest. Thus, in case of the value of 3015 equal to or less than 9 mm, i.e. in case of '3011+3012>3015', a value of '3011+3012' is employed in place of 3015 and 3015 is taken as the value determining the L value of a lead wire in case of '3011+3012<3015.

Besides, in case of '3011+3012>3015', the frame of a width 3012 may be installed just near the creepage distance of insulation 3011. By adding the above determined value of 3015 or '3011+3012' to 3013 and 3014, the length of a lead wire L is evaluated.

After all, in this example, an optimal value was shown for the length distance L of a lead wire in case of construction from a getter 3006 and a frame 3007 in the face plate part. Thereby, implementing the panel aiming a narrowed frame of the image display panel became possible.

EXAMPLE 2

Figure 94:
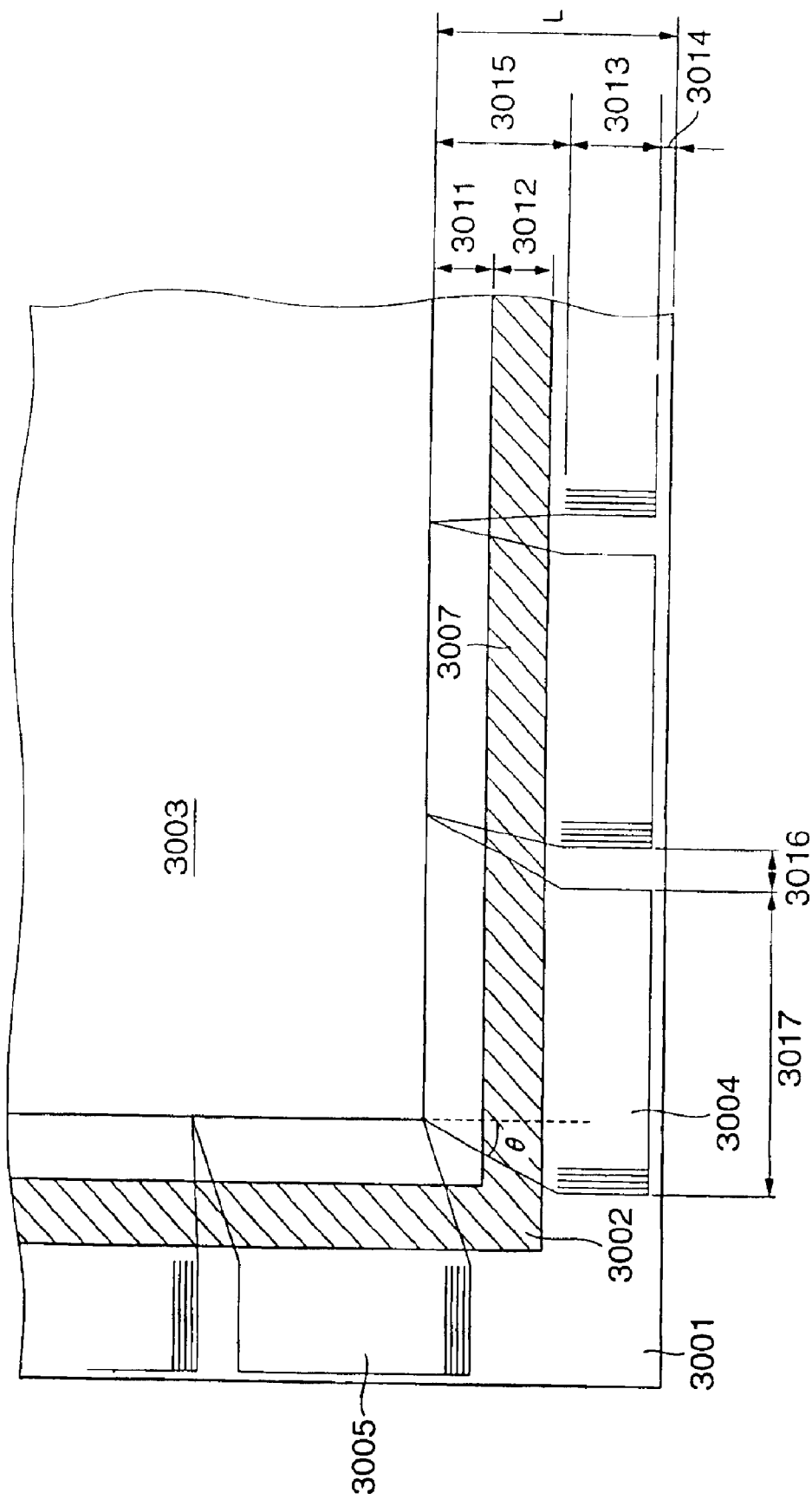
FIG. 94 is a partially enlarged plan view showing part of the display panel section of the image formation apparatus, another example of the present invention.

FIG. 94 shows part of the display panel of Example 2 to which 16th Configuration is applied. In FIG. 94, like symbols are attached to those similar to constituents shown in FIG. 92.

Example 2 greatly differs from Example 1 of 16th Configuration in that a getter is formed on the matrix wires in the pixel section 3003 with the getter member excluded. Like Example 1 using a nonevaporation getter material, a getter in the matrix is used to adsorb the gas emitted from the pixel section at the time of displaying an image. In FIG. 94, 3001, 3002, 3003, 3004, 3005, 3007, 3012, 3013, 3014 and 3015 are omitted from the description because they are similar to those of the Example 1. Numeral 3011 denotes the distance therefrom when the pixel section 3003 constitutes the frame 3007 of the face plate, which is a distance enough to avoid the creep discharge with a high voltage (anode voltage) like 3011 in FIG. 93. Here, 3011 was set to 4 mm. As with Example 1 of 16th Configuration, the length L of a lead wire depends upon how to set a value of wiring length 3015. As shown in Example 1 of 16th Configuration, 3015 is determined by the length 3017 of a lead wire in one block, the clearance 3016 in one block and such others and all computing formulae for finding a lead wire may be the same as with Example 1. Besides, a value of 3015 may be determined on the basis of the table shown in Example 1. Furthermore, the angle θ of printed wiring may be also the same as with Example 1.

Next, the added value of the creepage distance of insulation 3011 and the frame width 3012 (l1=4 mm and l2=5 mm, then l1+l2=9 mm) will be compared with the determined 3015. To be specific, for the same reason as with Example 1 of 16th Configuration as mentioned above, in case of '3011+3012>3015', a value of '3011+3012' is determined in place of 3015 and 3015 is taken as the value determining the value L of a lead wire length in case of '3011+3012<3015. And, by adding the above determined value of 3015 or '3011+3012' to 3013 and 3014, the length of a lead wire L is evaluated. Besides, also in this example, a value of '3011+3012' is required at the lowest in determining the length L of a lead wire.

After all, an optimal value was shown for the length distance L of a lead wire in case of construction from a frame 3007 in the face plate part. Thereby, implementing the panel aiming a narrowed frame of the image display panel became possible.

As described above, with 16th Configuration, the length of a lead wiring part is enabled to be computable under several setup conditions in determining the length of a lead wire for the display of an image by an image forming apparatus. Thus, also in the case of a large-sized display panel and of accompanying an increase in the number of wires, the panel corresponding to a narrowed frame of the image forming apparatus can be implemented. Besides, the weight-lightening of a panel can be achieved also by implementing a narrowed frame.

(17th Configuration)

With respect to the lead part of wiring on an electron source substrate, the following construction can be further adopted. Namely, such a construction that the width of X-direction wires and Y-direction wires has a more widely formed area outside the image forming area approaching the relevant image forming area than within the above image forming area Example 1 mentioned later) can be taken. Furthermore, a construction of an area with the width of the above X-direction wires or Y-direction wires widely formed at outer four corners of an image forming area approaching the relevant image forming area can be also taken.

Figure 95:
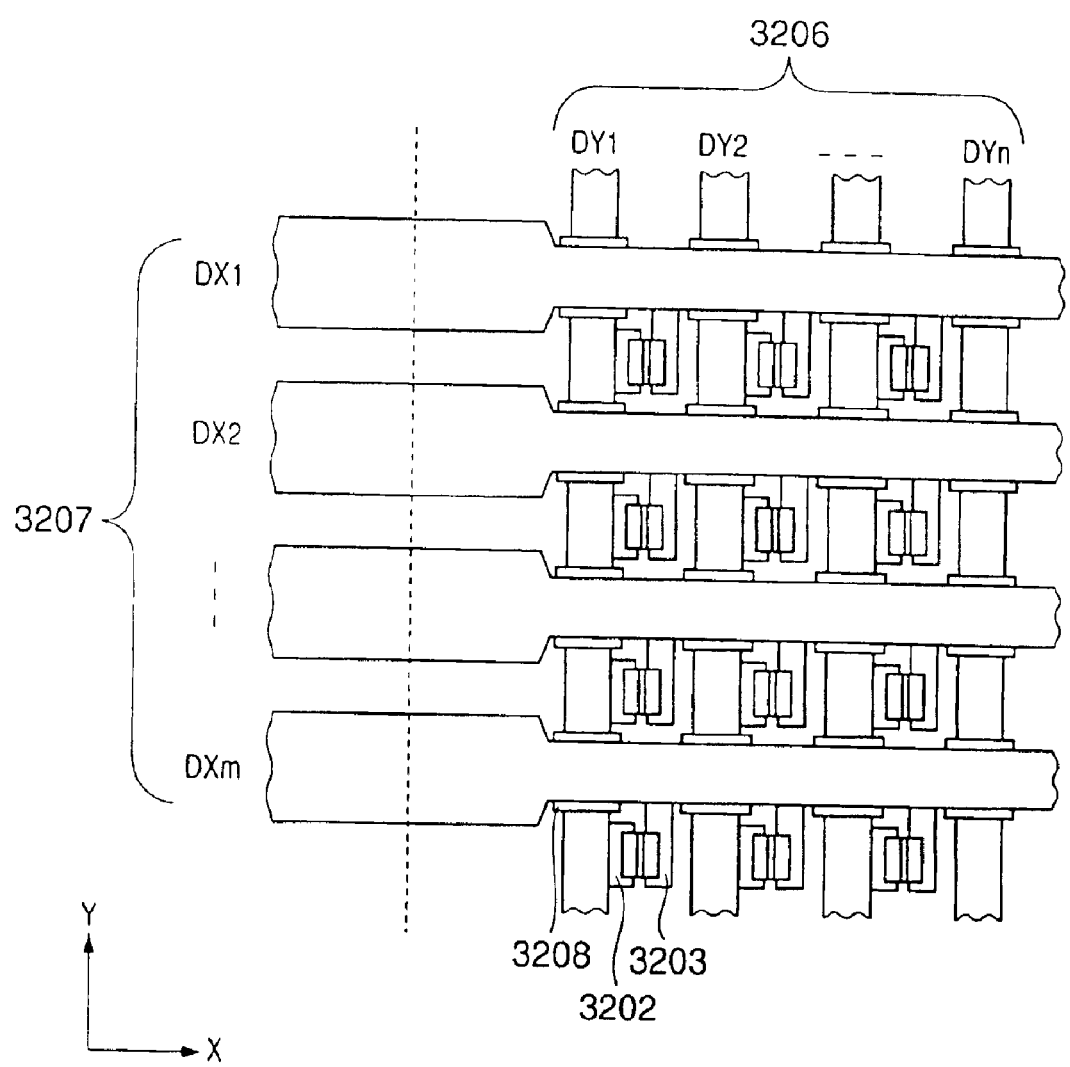
FIG. 95 is an enlarged plan view showing another exemplar structure of the wiring terminal section of the electron beam sources used in the image formation apparatus of the present invention.
Figure 96:
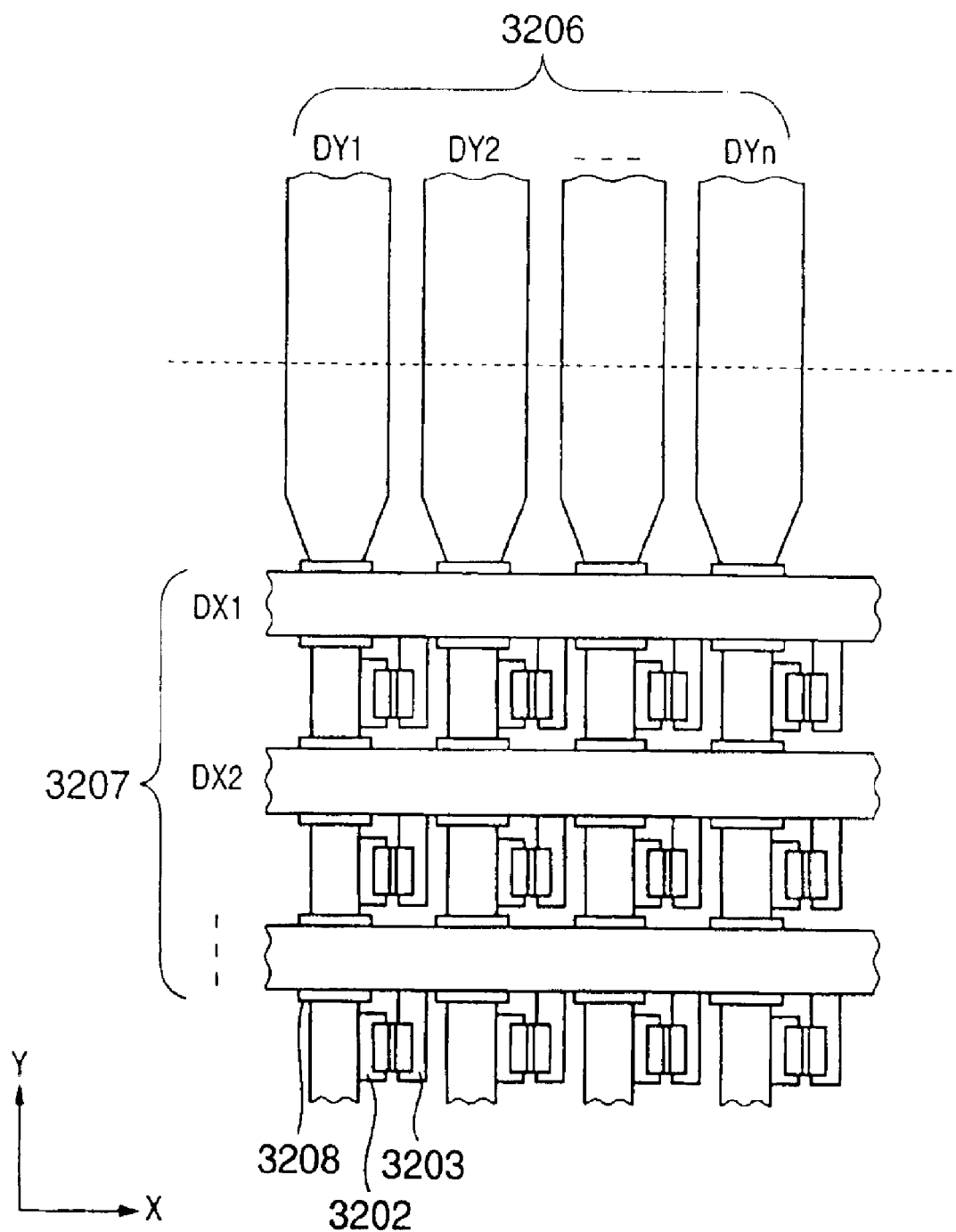
FIG. 96 is an enlarged plan view showing another exemplar structure of the wiring terminal section of the electron beam sources used in the image formation apparatus of the present invention.

FIGS. 95 and 96 are schematic structural drawings (plan views) of an Example 1 of image forming apparatus according to 17th Configuration, using an electron source substrate with election emission devices disposed in a matrix. FIGS. 95 and 96 show the enlargement of the left-end margin part of an image forming area and the top-end margin part of an image forming area, respectively. Incidentally, in these FIGS. 95 and 96, the right end of an image forming area and the bottom end of an image forming area are shaped symmetrically.

Numerals 3202 and 3203, 3206 and 3207, and 3208 denote an device electrode, wiring and an inter-layer insulating film, respectively. The wiring 3206 and 3207 are led out to outside the image forming area, i.e. to a position where no electron emission device is formed, respectively and are formed so as to become wider in this position. This aims to reduce the exposed area of the substrate surface outside the image forming area, thereby making difficult the occurrence of charging in this district.

Figure 97:
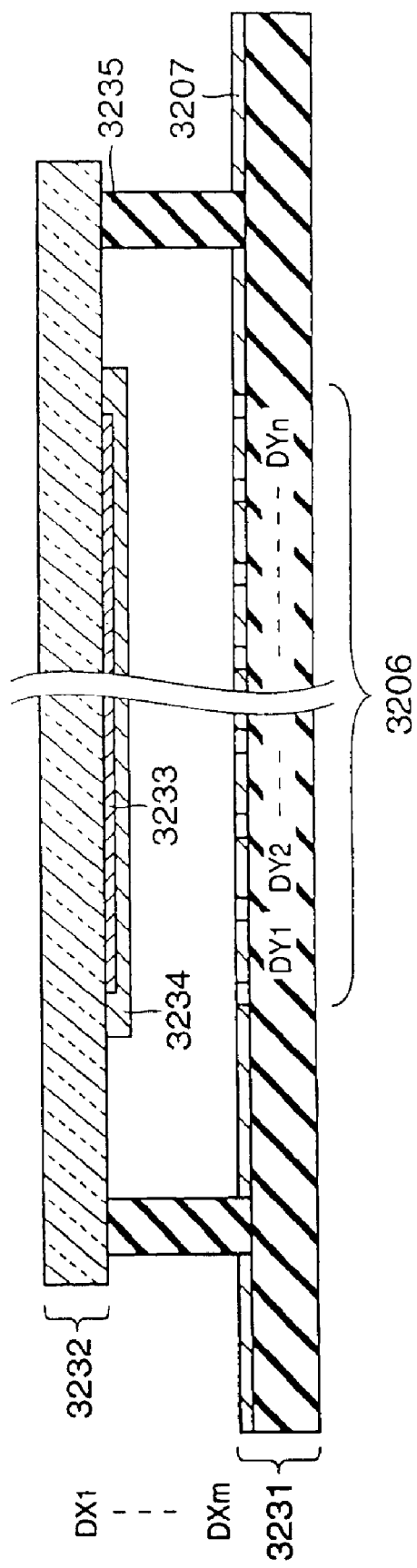

FIG. 97 is a sectional view of an image forming apparatus with the wiring structure shown in FIGS. 95 and 96. In FIG. 97, Numerals 3231 and 3232 denote a rear plate serving for the base body with an electron source formed and a face plate with a fluorescent film 3233, a metal back 3234 and the like formed. The rear plate 3231 and the face plate 3232 are supported by a frame 3235 at a fixed interval.

In Example 1, as mentioned above, the wiring 3206 and 3207 are led out to outside the image forming area, i.e. to a position where no electron emission device is formed, respectively and are formed so as to become wider in this position. By such a construction, the exposed area of a high resistance surface outside the image forming area can be reduced and the disturbance of an image in the end of the image forming area can be prevented.

Figure 100:
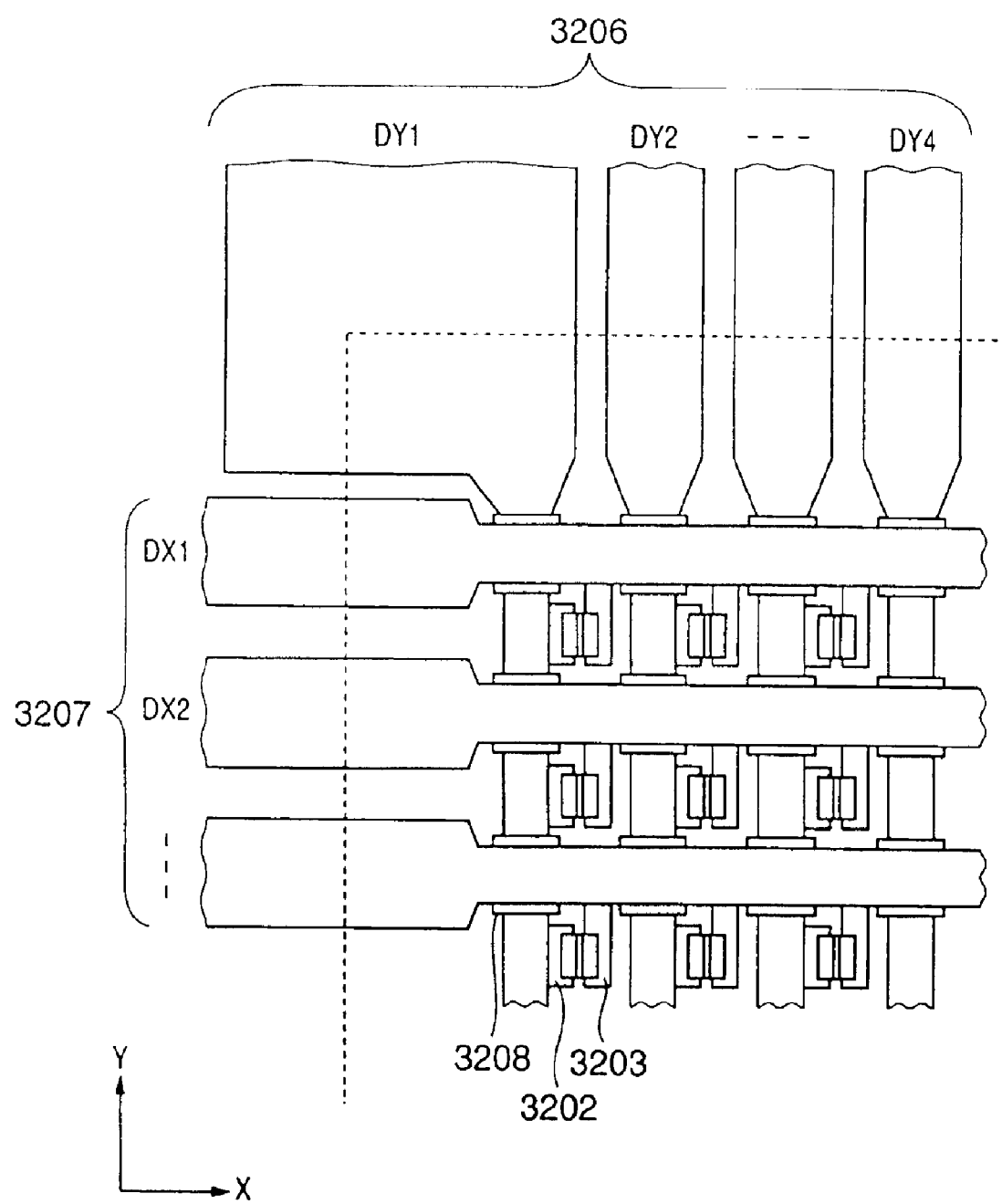

FIGS. 98 to 100 are schematic structural drawings (plan views) of Example 2 and show the enlargement of the top left end part among four corners of an image forming area, but the other three corners also have a similar shape. Incidentally, like symbols are attached to those similar to constituents shown in FIGS. 96 and 97.

The wiring 3207 comprises m X-direction wires DX1, DX2, . . . DXm and the wiring 3206 comprises n Y-direction wires DY1, DY2, . . . DYn. In this Example 2, these wiring 3206 and 3207 is widely deformed in the shape of DX1 and DY1 at the top left end corner as shown in FIG. 98. This aims to reduce the exposed area of the substrate surface at an outer corner part of the image forming area, thereby making difficult the occurrence of charging in this district. Like this, DXm and DY1 at the bottom left end (unillustrated), DX1 and DYn at the top right end (unillustrated) and DXm and DYn at the bottom right end are widely deformed respectively, thereby reducing the exposed area of the substrate surface at outer corner parts of the image forming area.

Since it is object of Example 2 to reduce the exposed area of the substrate surface at outer corner parts of the image forming area, only the X-direction wires (DX1 at the top left end) may be widely deformed as shown in FIG. 99 or only the Y-direction wires (DY1 at the top left end) may be widely deformed as shown in FIG. 100.

Figure 101:
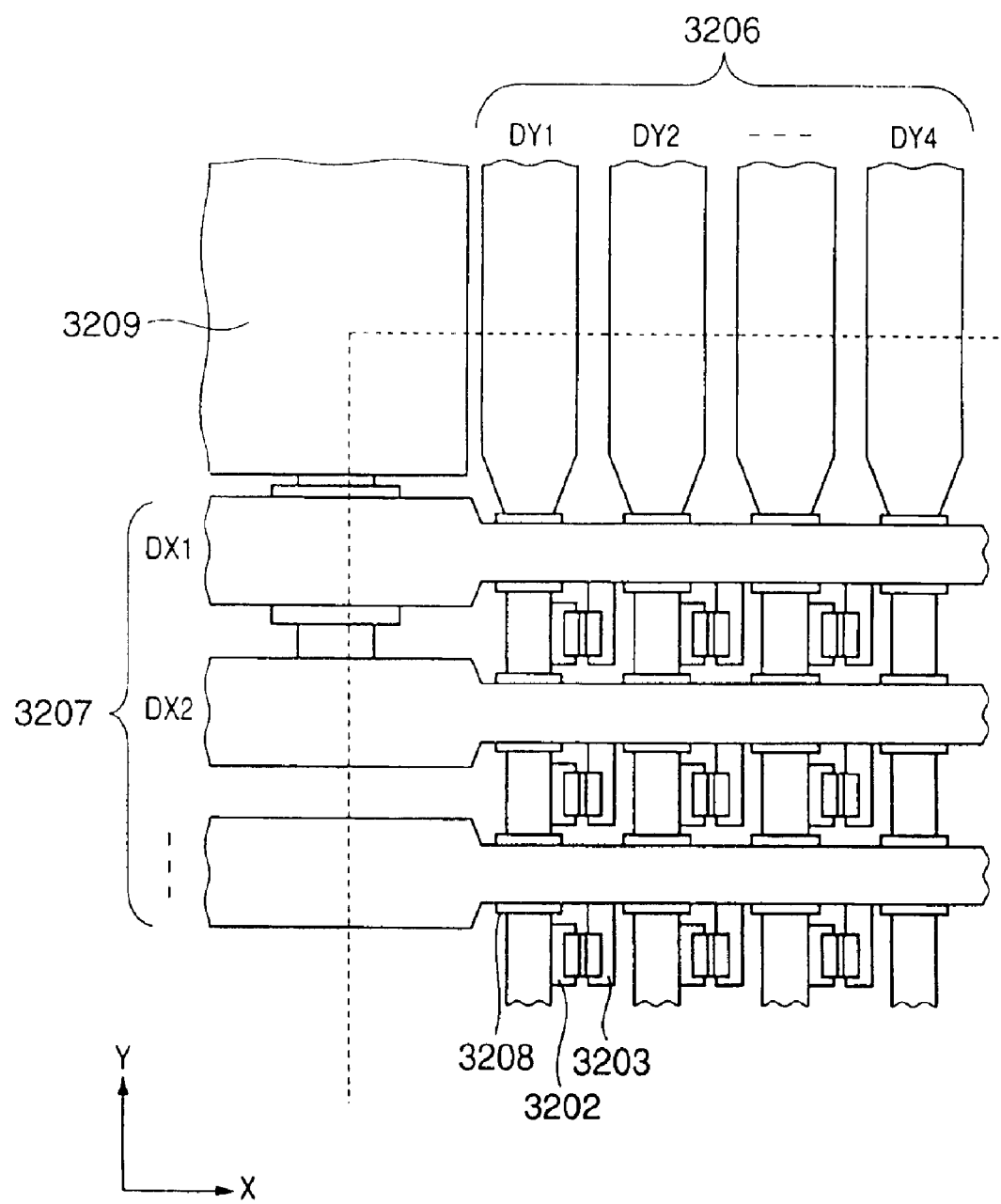

FIG. 101 is a schematic structural drawing (plan view) showing Example 3, using an electron source substrate with electron emission devices disposed in the shape of a matrix. In FIG. 101, the top left end part among the four corners of an image display area is shown in enlarged dimension, but the other three corners have a similar shape. Incidentally, Numerals in FIG. 101 denote parts similar to those designated with like Numerals in FIGS. 98 to 100.

In FIG. 101, Numeral 3209 denotes a conductive member disposed at an outside corner of the image forming area. The conductive member 3209 is disposed to reduce the exposed area of the substrate surface at a corner part of the image forming area and can use the same material as with the wiring 3206 and 3207. Here, by connecting the conductive material to either one of the wiring 3206 and 3207 so as to equate in potential thereto, the electric potential can be specified.

Next, examples of 17th Configuration will be mentioned.

EXAMPLE 1

The fundamental construction of an image forming apparatus according to this example is similar to those of FIGS. 98 to 100. The width of the wiring 3206a nd the mutual distance between the wiring 3206 are set to approx. 70 $\mu$m within the image forming area and to approx. 220 $\mu$m. Besides, outside the image forming area, i.e. in the outside region of device electrodes situated at the outermost end, the width of the wiring 3206 was widened to 150 $\mu$m and the mutual distance between the wiring 3206, i.e. the exposed width of the substrate surface is set to approx. 140 $\mu$m. Incidentally, the wiring 3206 was formed to the end of the base body so as to become a lead electrode as it is.

The width of the wiring 3207 and the mutual distance between the wiring 3207 are set to approx. 280 $\mu$m within the image forming area and to approx. 340 $\mu$m. Besides, outside the image forming area, i.e., in the outside region of device electrodes situated at the outermost end, the width of the wiring 3207 was widened to 440 $\mu$m and the mutual distance between the wiring 3207, i.e., the exposed width of the substrate surface is set to approx. 180 $\mu$m. Incidentally, the wiring 3207 was formed to the end of the base body so as to become a lead electrode as it is.

EXAMPLE 2

In this example, wires 3206 are formed as with Example 1 of 17th Configuration. Incidentally, here, out of wires 3206, DY1 and DYn are formed in a widened shape at outer four corners of the image forming area so as to become similar to those of FIG. 98. Next, as with Example 1, an inter-layer insulating layer 3208 is formed and further the upper wires 3207 are formed. Incidentally, here, out of wires 3207, DX1 and DXm were formed in a widened shape at outer four corners of the image forming area so as to become similar to those of FIG. 98. Here, they were formed so that the distance between DY1 and DX1 in a widely formed region becomes approx. 200 $\mu$m or smaller.

In a display panel constructed thus, a high quality image, free of image disturbance and stable for a long time, was obtained at four corner parts.

EXAMPLE 3

In this example, the wiring is formed as with Example 2 of 17th Configuration, but the wiring 3207 was formed like FIG. 99. Also on a display panel according to this example, a high quality image, free of image disturbance and stable for a long time, was obtained at four corner parts.

EXAMPLE 4

In this example, the wiring is formed as with Example 2 of 17th Configuration, but the wiring 3206 was formed like FIG. 100. Also on a display panel according to this example, a high quality image, free of image disturbance and stable for a long time, was obtained at four corner parts.

EXAMPLE 5

An image forming apparatus according to this example is fundamentally characterized in that the wiring is constructed by the screen print like FIGS. 97 and 101. One procedure of a method for manufacturing an image forming apparatus according to this example is shown in FIGS. 102a to 102d. Referring to FIG. 97, FIG. 100 and FIGS. 102a to 102d, a fundamental construction method and a manufacturing method of an image forming apparatus according to this example will be described below.

Figure 102A:
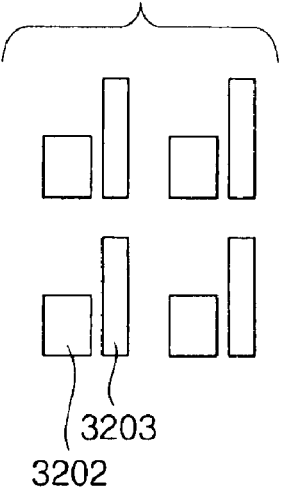

Step-a:

As with Example 1 of 17th Configuration, device electrodes 3202 and 3203 are formed on a cleaned glass substrate (FIG. 102a).

Figure 102B:
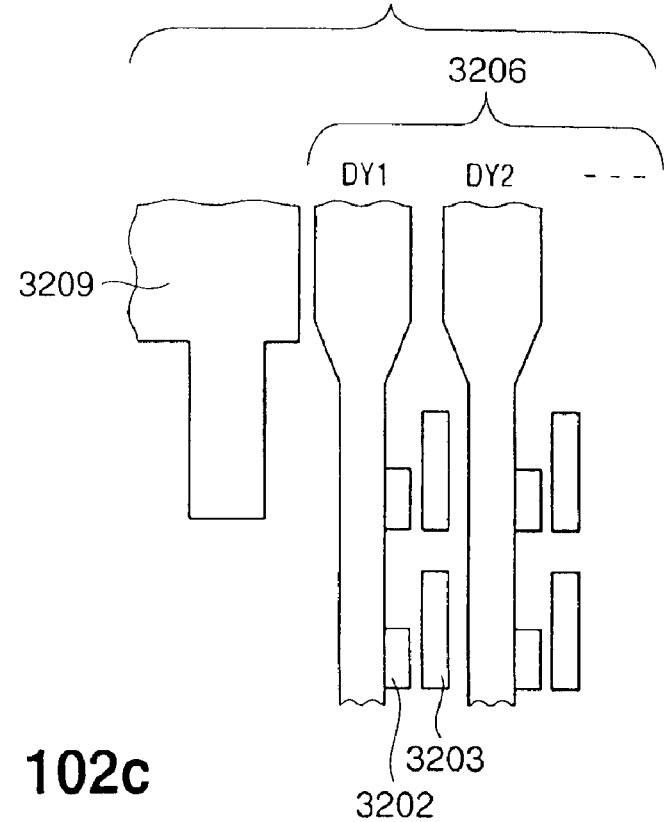

Step-b:

As with Example 1 of 17th Configuration, the wiring 3206 is formed. Here, a conductive member 3209 is simultaneously formed at a given position, i.e. at outer four corners of the image forming area (FIG. 102b). Incidentally, the distance between the conductive member 3209 and wires 3206 was set to approx. 200 $\mu$m or less.

Figure 102C:
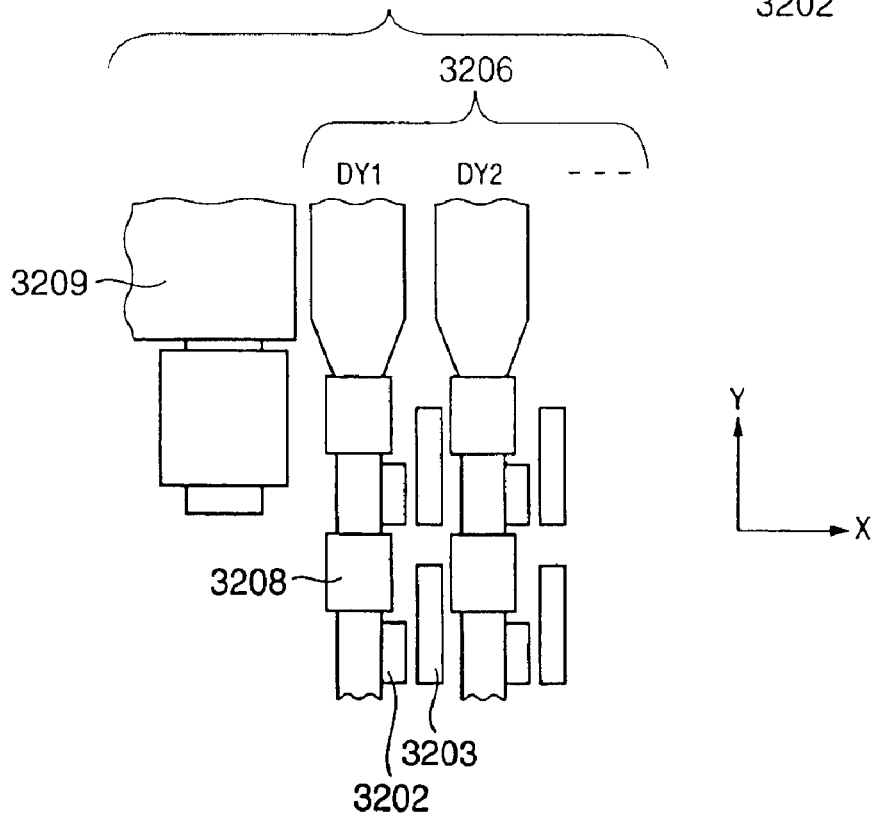

Step-c:

Next, as with Example 1 of 17th Configuration, an inter-layer insulating layer 3208 is formed. Here, so that the conductive member 3209 is not connected to the nearest upper wiring at the forming time of the subsequent wiring, the inter-layer insulating layer 3208 is formed also on the conductive member 3209 (FIG. 102c).

Figure 102D:
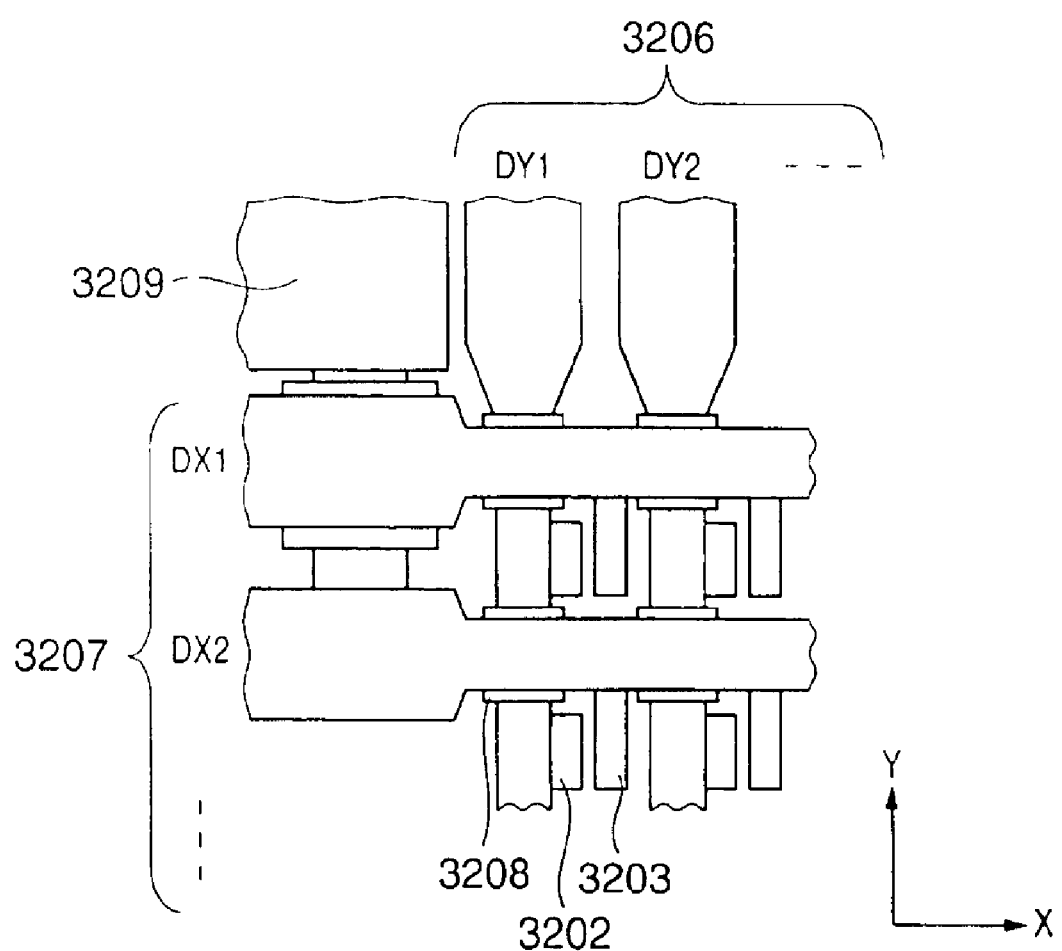
Figure 103:
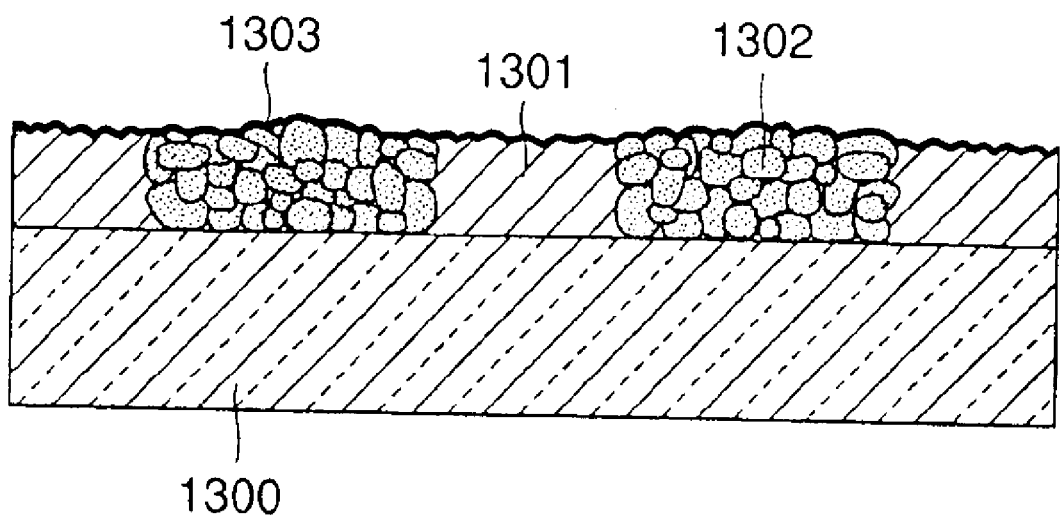

Step-d:

With Example 1 of 17th Configuration, the upper wiring 3207 is formed. Here, the conductive member 3209 is formed so as to be connected to the nearest next wiring 3207 (FIG. 102d). Incidentally, the distance between the conductive member.3209 and the nearest next wiring of the wiring 3207 was set to approx. 200 $\mu$m or less.

By the above steps, there can be formed a substrate with the device electrodes 3202 and 3203 connected in the form of a matrix by the wiring 3206 and 3207.

Step-e:

At and after this step, the electric external lead was carried out in the form of connecting the wiring through an anisotropic conductive film (ACF) as with Example 1 of 17th Configuration to manufacture an image forming apparatus according to this example and display an image. As a result, a good image can be stably displayed at a brightness (approx. 150 fL) enough to be satisfied as a TV receiver for a long time and a high quality image free from image disturbance was obtained even at four corner parts.

According to this construction, charging on a high electric resistance surface exposed to the surface of an electric source substrate can be suppressed to eliminate any influence on the orbit of electron emitted from electron emission devices, so that a large-screen planar-type image forming apparatus, e.g. a color flat TV set, capable of retaining a good image for a long time can be implemented.

(18th Configuration)

Regarding a display part such as a fluorescent material layer, metal back and black matrix provided on the face plate, the thickness of an image display panel must be thinned to implement a thinner display panel (image display apparatus). In that case, the distance between the rear plate 4005 and the face plate 4000 shown in FIG. 18 must be reduced. In case of such a construction, a considerably high electric field is generated between the rear plate 4005 and the face plate 4000. Here, the metal back 4006 is preferably a continuous film because of aiming to apply a high voltage Va to the entire fluorescent material film, prevent the charging of a fluorescent material and take out a ray emitted backward (in a rear direction) from the fluorescent material to the front by means of the mirror effect. Besides, since accelerated electrons have to excite a fluorescent material through the metal back 4006, the metal back 4006 is preferably in the shape of a thin film. However, the fluorescent material is powdery and accordingly the fluorescent material film becomes porous, on the surface of which a considerable degree of ruggedness is present. Besides, on a black matrix provided to prevent the color mixture of a fluorescent material, eliminate the color discrepancy even for a somewhat deviation of beam positions and further promote the contrast of an image by absorbing the outer light, a considerable degree of ruggedness is present like the above fluorescent material film. For these reasons and also because no continuous film is formed by depositing a metal directly on the fluorescent material film, a filming step is employed generally as a step of manufacturing a metal back.

A construction of a metal back in contact with the face plate in which two or more contact spots are present within limits of 20 $\mu$m×20 $\mu$m for any spot or the contact area occupies 50% or more can be adopted. By adopting such a construction, since the contact part between the metal back and the face plate is present to a moderate extent even for a higher electric field between the rear plate and the face plate of a display panel (an image forming apparatus) than 1 kV/mm, a force imposed on the contact part is reduced when a Coulomb attraction force acts and the possibility of peeling off in the metal pack markedly decreases, thus leading to the excellency in durability and reliability.

Besides, by setting an arrangement that in any place of the above metal back, three spots or more of above contact parts are present within limits of 20 $\mu$m×20 $\mu$m or the contact area is 50% or more, a force imposed on the contact part by the Coulomb attraction is further reduced and the possibility of peeling off in the metal pack markedly decreases, thus leading to the excellency in durability and reliability.

As mentioned above, the provision of a black matrix in the above face plate makes it possible to absorb the outer light, promote the contrast and prevent the color mixture of a fluorescent material in the neighboring pixel. In addition to this, since the metal back is in contact with the black matrix, the metal back does not float in a wide extent. Thus, under action of the Coulomb attraction, a force imposed on the contact parts between the metal back, a fluorescent material and the black matrix can be reduced and the possibility of peeling off in the metal pack under action of the Coulomb force markedly decreases.

Besides, in a step of manufacturing a metal back, a large height difference between the fluorescent material film and the black matrix brings about the accumulation of a great amount of a resin material in a lower part of the fluorescent material or black matrix during the filming process, thus making the film thicker. When an attempt is made to remove the resin material by burning after manufacturing a metal film thereon, the quantity of a gas generated by pyrolysis increases at the thick film portion and the floating of the metal back ends in occurring. To prevent this, here, letting tp ($\mu$m), tb ($\mu$m) and rp ($\mu$m) be the average thickness of a fluorescent material film in one pixel, the average thickness of the black matrix adjacent thereto and the average grain size of fluorescent materials, the average thickness tb is set as tp−rp<tb<tp+rp. Thereby, the accumulation of a resin material at a lower portion of the fluorescent material film or the black matrix disappears and the possibility of peeling off in the metal pack under action of the Coulomb force lowers.

Besides, by caving the glass substrate in the fluorescent material-film making region of the above face plate so as to fill this concave portion with a fluorescent material and making a difference between the average height of the top surface of a fluorescent material film per pixel and the average height of the black matrix adjacent thereto equal to or less than the average grain size of fluorescent materials, such a problem becomes unlikely to occur that a resin material is accumulated in the lower portion of the fluorescent material film and the black matrix during the filming process, the film is thickened and the metal back floats during the baking.

Furthermore, the face plate has a black matrix and may be so constructed that a substance of other material than the metal back is stacked on the black matrix and brought into contact with the metal back. According to this construction, the metal back is in contact with the material provided on the black matrix, so that the metal back ends in no floating in a wide extent. Thus, a force imposed during the action of the Coulomb attraction on the contact parts between the metal back, a fluorescent material and the black matrix is reduced and accordingly the possibility of peeling off in the metal pack under action of the Coulomb attraction markedly decreases.

Besides, when the film with a metal film manufactured is in contact on the bulk or a screen comprising particles of a very small grain size in a step of manufacturing a metal back, a gas generated by the pyrolysis during the baking is hardly degassed and the floating of the metal back becomes likely to occur. Besides, by contraries, when the film with a metal film manufactured is in contact on a screen comprising particles of a very large grain size, the contact portion between the metal back and the face plate becomes very small after the baking for a high flatness of the film and the metal back becomes likely to peel off. Such being the case, on letting rz ($\mu$m) and rp ($\mu$m) be the average grain size of a material stacked on the above black matrix and the average grain size of a fluorescent material, the relation rp÷2<rz<3 rp÷2 is set up. Thereby, the floating of the metal back becomes unlikely to occur during the baking and the contact portion between the metal back and the face plate does not decrease, so that the metal back becomes unlikely to peel off under action of the Coulomb attraction.

Besides, by making the diffusive reflectance of the material stacked on the above black matrix greater than 70%, a ray emitted from a fluorescent material is not absorbed by the material on the black matrix and can be taken out efficiently forward. As a result, the brightness of the image forming apparatus is elevated.

Besides, by setting the material stacked on the above black matrix to the above fluorescent material, a metal back having the contact portion at a great ratio as the essence to the present invention becomes easier to manufacture and further the step of manufacturing a face plate is simplified, thereby enabling the production cost to be saved.

Besides, on the above face plate, three colors of fluorescent materials are painted separately to display a color image, where by making one of the fluorescent materials stacked on the above black matrix occupy 80% or more, a metal back having the contact portion at a great ratio as the essence to the present invention becomes easier to manufacture and further the step of manufacturing a face plate is simplified, thereby enabling the production cost to be saved.

Besides, on the above face plate, three colors of fluorescent materials are painted separately to display a color image, where by choosing the fluorescent materials stacked on the above black matrix to be two adjacent colors of fluorescent materials, a metal back having the contact portion at a great ratio as the essence to the present invention becomes easier to manufacture and further the step of manufacturing a face plate is simplified, thereby enabling the production cost to be saved.

Besides, by setting the ratio of areas in the black matrix occupied by two colors of fluorescent materials stacked on the above black matrix to (4~6): (6~4), a metal back having the contact portion at a great ratio as the essence to the present invention becomes easier to manufacture and further the step of manufacturing a face plate is simplified, thereby enabling the production cost to be saved.

Besides, by setting the ratio of areas in the black matrix occupied by two colors of fluorescent materials stacked on the above black matrix to (9.5~6):(0.5~4), a metal back having the contact portion at a great ratio as the essence to the present invention becomes easier to manufacture and further the step of manufacturing a face plate is simplified, thereby enabling the production cost to be saved.

Besides, the glass substrate in the black matrix manufacturing region of the above face plate is concave, where by filling this concave portion with a material of black matrix to make a difference between the average height of the top surface of a fluorescent material film per pixel and the average height of the black matrix adjacent thereto equal to or less than the average grain size of fluorescent materials, a metal back having the contact portion at a great ratio as the essence to the present invention becomes easier to manufacture.

Besides, when the convexo-concave difference of the metal back is great, the surface area of the metal back for one site of contact increases and the Coulomb attraction applied to the contact part increases. Accordingly, the convexo-concave, difference of the metal back within limits of 20$\mu$m×20$\mu$m is made equal to or less than the average grain size of fluorescent materials. Thereby, on application of the Coulomb attraction to the metal back, the force imposed on the contact portion decreases and the possibility of peeling off for the metal back decreases.

Hereinafter, examples of this Configuration will be referred to.

EXAMPLE 1

Referring to FIGS. 103, 104*a* to 104*d*, and 107*a* and 107*b*, the construction of a face plate and a metal backing as subject of 18th Configuration will be described.

Figure 104A:
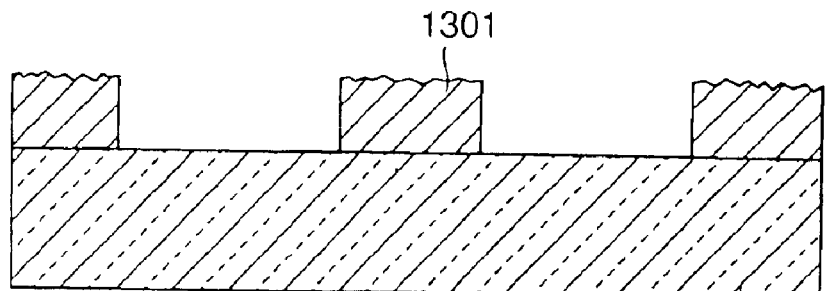
Figure 107A:
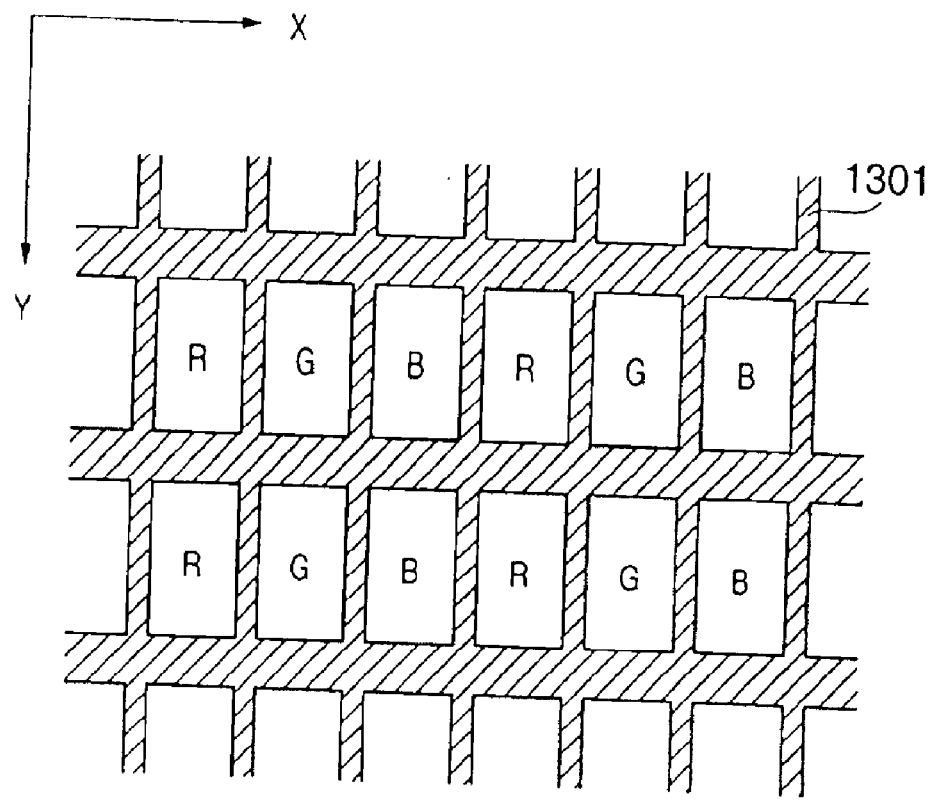

After washing/drying a 2.8 mm thick soda lime glass (base 1300), using a black pigment paste containing a glass paste and a black pigment a pattern comprising 240 longitudinal stripes, 100 $\mu$m in width and 290 $\mu$m in pitch, and 720 transverse stripes, 300 $\mu$m in width and 650 $\mu$m in pitch was produced commonly at a thickness of 20 $\mu$m by the screen print method as shown in FIG. 107*a* to make a black matrix 1301 (FIG. 104*a*). In this example, a black matrix was produced by the screen print method, but needless to say, the production method is not limited this and by way of example, the photolithography method may be used for production; nevertheless, use of the screen method is preferable in view of a thick film and cost-saving. Besides, as the material of a black matrix, a black pigment paste containing a glass paste and a black pigment was used, but needless to say, the material is not limited to this and carbon black, for example, may be used. Here, under circumstances of production by the screen printing and in view of as thick a film as 20 $\mu$m, the above black pigment paste was used. Besides, in this example, the black matrix was produced in the shape of a matrix as shown in FIG. 107*a*, but needless to say, is not limited to this and a stripe-shaped array, a delta-shaped array or other arrays may be adopted.

Figure 104B:
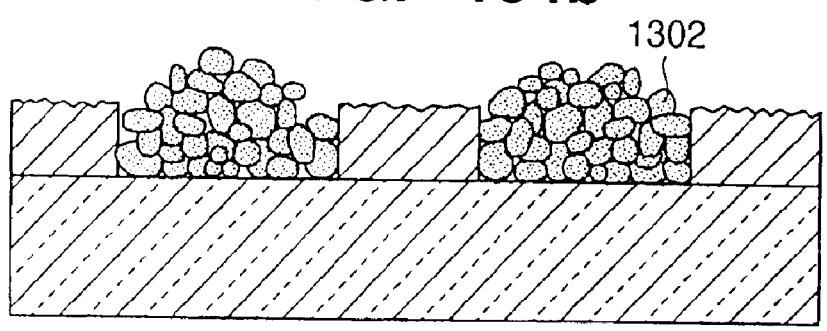
Figure 104C:
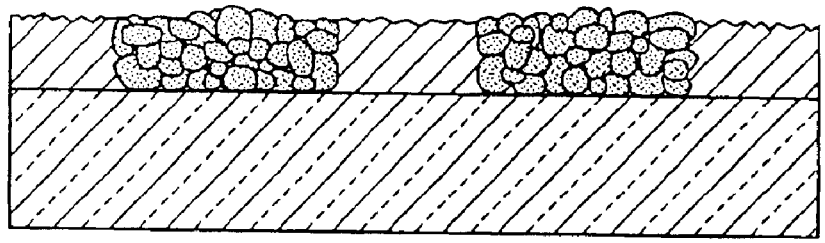
Figure 104D:
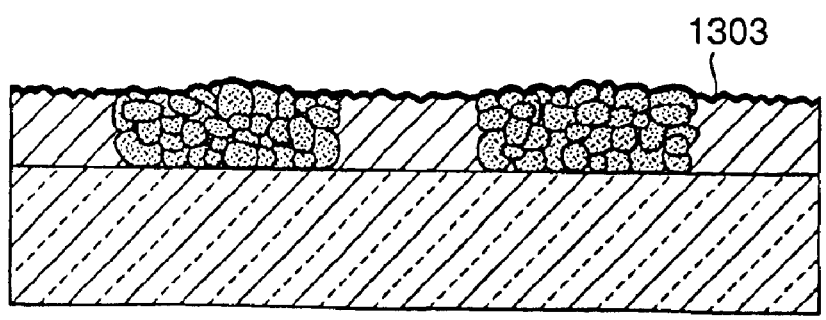

Next, as shown in FIG. 107*a*, three colors of fluorescent materials are applied at the opening of the black matrix 1301 at three times for each one color by using red, blue and green fluorescent material pastes 1302 (FIG. 104*b*). In this example, a fluorescent material film was made up using the screen printing, but needless to say, is not limited to this method and may be made by the photo lithography, by way of example. Besides, fluorescent materials are chosen to be P22 fluorescent materials used in the field of CRT, comprising red color (P22-RE3; Y2O2S: Eu3+), blue color (P22-B2; ZnS:Ag, Al) and green color (P22-GN4; ZnS:Cu, Al) and 7 $\mu$m of median diameter Dmed in average grain size, but needless to say, are not limited to this and other fluorescent materials may be used. Besides, a fluorescent material film was made up so as to become 20 $\mu$m in mean (FIG. 104*c*). Here, if the thickness is not sufficiently flattened, an nonwoven fabric with isopropyl alcohol (IPA) absorbed may be provided on a sufficiently flat planar glass to increase the flatness by pressurizing the fluorescent material film and the black matrix on the face plate through aids thereof. Then, by baking this substrate at 450° C. for 4 hr, the resin component in the paste was pyrolyzed and removed to obtain a face plate of a diagonal screen size of 10 inches and a aspect ration of 4:3, comprising 720×240 dots. Here, on measuring the thickness of the fluorescent material film and the black matrix by using a touch-needle type surface roughometer, no greater difference between the average thickness of the fluorescent material film per pixel and the average thickness of the black matrix adjacent thereto than 7 $\mu$m, average grain size of fluorescent materials, was observed anywhere.

Next, a method for fabricating a metal backing on this face plate will be described.

With the face plate prepared as mentioned above placed on a spin coater, a solution of colloidal silica dissolved in pure water was applied on a substrate while rotating to wet the convexo-concave portion of the fluorescent material film. Subsequently, a solution of polymethacrylate dissolved in toluene was applied by a spray on the substrate while rotating so as to uniquely adhere on the whole surface and dried by blowing a warm wind to the substrate to make a resin film on the fluorescent material film and the black matrix, thereby flattening the surface. Here, as a step of flattening, the solution of polymethacrylate dissolved in toluene was applied after the wetting the fluorescent material film, but needless to say, another solvent type lacquer liquid may be used or a step of applying and drying an acryl emulsion to the fluorescent material film, by way of example, may be also carried out as another method. Thereafter, on the flattened face plate, a 1000 Å thick Aluminum film was made by the vacuum deposition. And, this face plate was conveyed into a baking furnace and heated to 450° C. to remove the resin film by pyrolysis.

The contact portion of the metal backing 1303 obtained thus (FIG. 104*d*) of the face plate with the fluorescent material film and the black matrix was observed under a scanning electron microscope (SEM). At this time, because of being difficult to observe on observation at a high-acceleration voltage at this time, a 1000 Å thick metal backing was observed at an acceleration voltage of 2 kV. On observing the metal backing under SEM, the metal backing at a contact portion is shaped along the fluorescent material film or the black matrix and the above contact portion can be well observed. By SEM observation, the number of contact portions within limits of 20 μm×20 μm and their contact area were measured. Measurement from the selected black matrix opening was made at 8 sites of the black matrix opening adjacent thereto and at an extent surrounded by them and such a measuring process proceeded at 10 sites randomly sampled from the whole face plate. The obtained result is shown in Table 7. As a result of measurement, it was observed that there was no case where the number of contact portions of the metal backing within limits of 20 μm×20 μm was less than two and the metal backing was in good contact with the face plate.

Figure 107B:
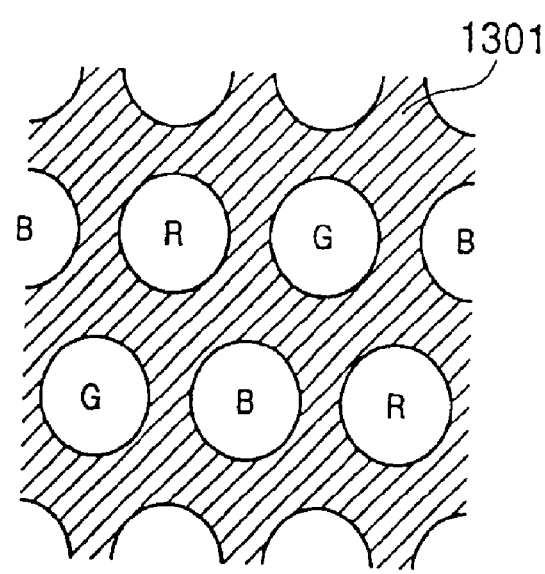

Furthermore, with the above face plate fixed a given gap apart opposite a sufficiently large electrode than the face plate in the vacuum chamber, a high DC voltage was applied to the metal back and gradually raised, the voltage at the start of discharge was measured and the corresponding electric field strength (hereinafter, referred to as discharge start electric field strength) was evaluated. Incidentally, here, the electric field strength is defined as the voltage, applied to the metal backing, divided by the gap distance between the rear plate and the face plate. As a result of measurement, the discharge start electric field strength was 7.7 kV/mm (the result is shown in Table 7). In this manner, a face plate with a metal backing well contacting could be obtained, thereby enabling the reliability of an image forming apparatus to be promoted. Incidentally, by taking the black matrix 1301 as an example in FIG. 107a, a description was made, but the mask material is not limited to this construction. For example, in conformity to the delta-shaped array of a fluorescent material, such a pattern as shown in FIG. 107b may be adopted. Besides, its opening may be set to such a circular opening as shown in FIG. 107b.

EXAMPLE 2

Referring to FIGS. 106a to 106d, 107a and 107b, Example 2 according to 18th Configuration will be described.

Figure 106A:
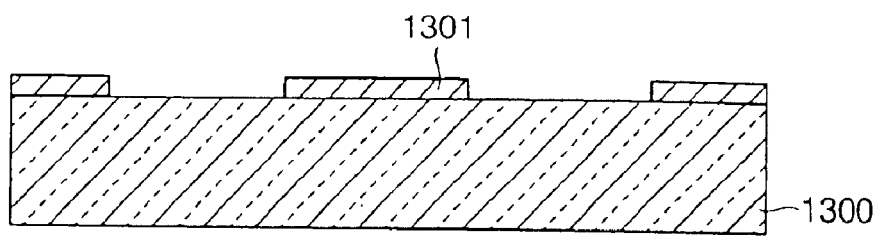

After washing/drying a 2.8 mm thick soda lime glass (substrate 1300) similar to that of Example 1 of 18th Configuration, a 3 μm thick black matrix 1301 was prepared as with Example 1 (FIG. 106a). Next, by using three colors of fluorescent materials at the opening of the black matrix 1301 as with Example 1, a 20 μm thick fluorescent material film was made in such an arrangement as shown in FIG. 107a. Here, even if fluorescent materials are stacked on the black matrix to a larger or smaller extent, no color mixture occurs because the black matrix absorbs light.

Next, a step of having a stacked matter provided to reduce the ruggedness of the face plate will be described. Since any ruggedness of the face plate allows the metal back likely to float, the ruggedness must be reduced. The principal objective of this stacked matter is to increase the contact portion of the metal backing for a decrease in such ruggedness. Besides, if the surface of the stacked matter is too smooth in the step of having a stacked matter provided, the close adherence of the black matrix and the metal backing remains possible to grow poor after the baking of a film in a filming step, whereas the contact portion of the metal back decreases and the metal backing is possible to make no continuous film if too rugged. Thus, the average grain size of the material to be used for a stacked matter is preferably taken into consideration. Besides, since the light emitted from a fluorescent material are absorbed and the efficiency of light taken out forward lowers if the stacked matter is absorbent of light, the diffusive reflectance of the above material is preferably 70% or greater.

Figure 106B:
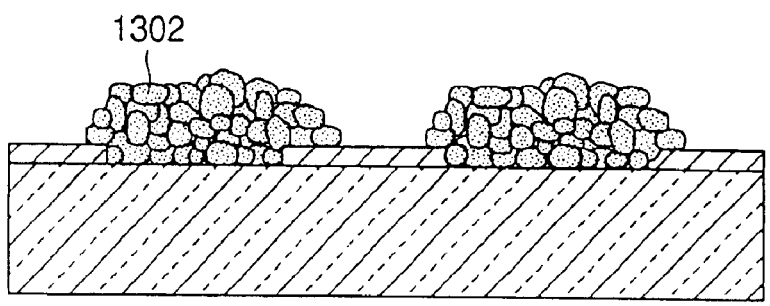
Figure 106C:
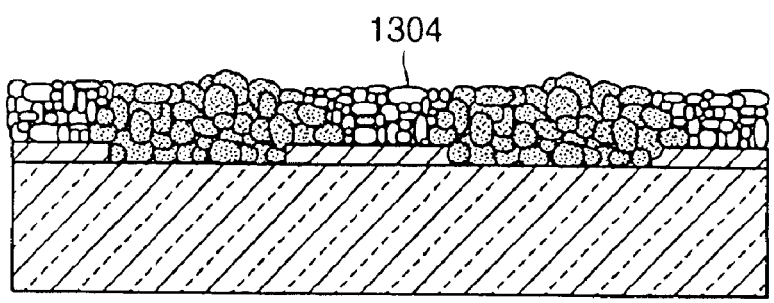

In consideration of the above reasons, this example used magnesium oxide powder, 4 μm in average grain size. This was dispersed into a resin binder to make a magnesium oxide paste, a 20 μm thick film was produced on a glass substrate and its reflectance was measured to show as good a value as about 85%. In this example, magnesium oxide powder, 4 μm in average grain size, was used as a material of the above stacked matter, but needless to say, this construction is not limited to this and any material, say, boron nitride, may be used if only satisfies requirements as mentioned above. Using the above mentioned magnesium oxide paste, a stacked matter 1304 was prepared on the black matrix by the screen printing (FIG. 106c). In this example, the above stacked matter was prepared by the screen printing, but needless to say, the preparing method is not limited to this and it may be prepared by the photolithography, by way of example. Here, as with Example 1 of 18th Configuration, an nonwoven fabric with isopropyl alcohol (IPA) absorbed may be provided on a sufficiently flat planar glass to increase the flatness also by pressurizing the fluorescent material film and the black matrix on the face plate through aids thereof if the thickness of a stacked matter and a fluorescent material is not sufficiently flattened. Subsequently, by baking this substrate at 450° C. for 4 hr, the resin component was pyrolyzed and removed to obtain a face plate. On measuring the thickness/surface roughness of the prepared face plate by using a touch-needle type surface roughometer, no greater difference between the average thickness of the fluorescent material film per pixel and the average thickness of the black matrix adjacent thereto than 7 μm, average grain size of fluorescent materials, was observed anywhere.

Next, on the face plate, a metal backing 1303 was fabricated by the same method as with Example 1 of 18th Configuration to obtain the finished face plate (FIG. 107D).

The face plate prepared thus was observed under SEM as with Example 1 of 18th Configuration to measure the number of contact portions and the contact area within limits of 20 μm×20 μm. The result is shown in Table 7. As a result of measurement, it was observed that there was no case where the number of contact portions of the metal backing within limits of 20 μm×20 μm was less than two and the metal backing was in good contact with the face plate. Besides, the discharge start electric field strength was measured as with Example 1, which measurement provided a value of 7.3 kV/mm.

Using the above face plate and a rear plate provided with a multiple electron beam source similar to that used in Example 1 of 18th Configuration, an image forming apparatus was manufactured, thus enabling the durability and the reliability of the image forming apparatus to be promoted. Besides, by promoting the utility efficiency of light with a stacked matter of magnesium oxide provided on the black matrix, the luminance of the image forming apparatus was elevated on the order of 10%.

Incidentally, the black matrix 1301 may be made up also in a pattern having a circular opening as shown in FIG. 107b.

EXAMPLE 3

Next, referring to FIGS. 108a to 108d, 107a and 107b, Example 3 according to 18th Configuration will be described.

Figure 108A:
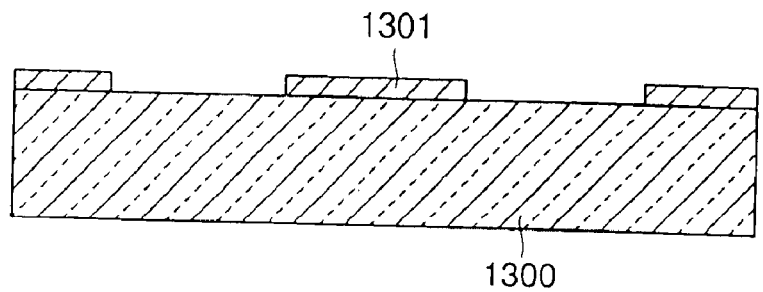
Figure 108B:
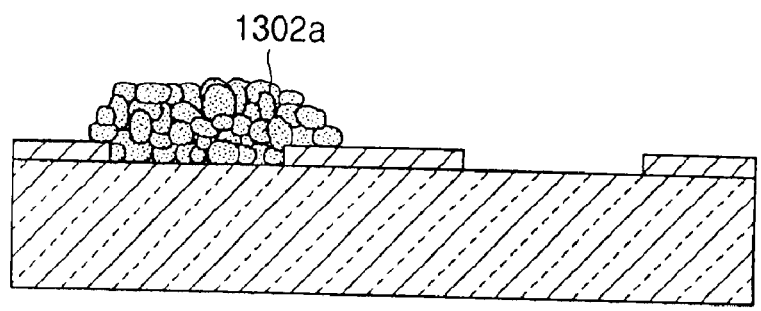
Figure 108C:
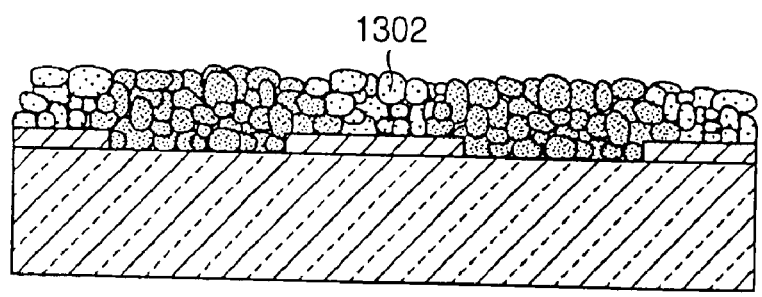
Figure 108D:
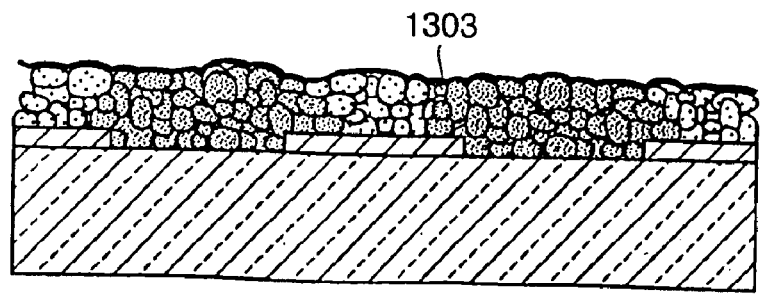

After washing/drying a 2.8 mm thick soda lime glass (substrate 1300) similar to that of Example 1 of 18th Configuration, a 3 μm thick black matrix 1301 was prepared as with Example 1 (FIG. 108*a*). Next, a tricolor fluorescent material film was produced at the opening of the black matrix in such an array as shown in FIG. 107*a*. Producing a fluorescent material film is performed by the screen printing and that separately for each color out of three colors of fluorescent materials at three times. Here, the film made of first and second colors of fluorescent materials (fluorescent material film 1302*a*) was produced as with Example 1 (FIG. 108*b*). A third color of fluorescent material (fluorescent material film 1302*b*) was stacked also on the black matrix in such a manner as to reduce the ruggedness of the face plate. Here, as with Example 1 of 18th Configuration, an nonwoven fabric with isopropyl alcohol (IPA) absorbed may be provided on a sufficiently flat planar glass to increase the flatness also by pressurizing the fluorescent material film and the black matrix on the face plate through aids thereof if the thickness of a fluorescent material is not sufficiently flattened.

Subsequently, by baking this substrate at 450° C. for 4 hr, the resin component was pyrolyzed and removed to obtain a face plate. On measuring the thickness/surface roughness of the face plate obtained thus by using a touch-needle type surface roughometer, no greater difference between the average thickness of the fluorescent material film per pixel and the average thickness of the black matrix adjacent thereto than 7 μm, average grain size of fluorescent materials, was observed anywhere. Besides, this face plate was observed under SEM, which observation revealed that the last printed fluorescent material occupying 80% or more of the whole surface area was present on the black matrix.

Next, on the face plate, a metal backing 1303 was fabricated by the same method as with Example 1 of 18th Configuration described above to obtain the finished face plate (FIG. 108*d*).

The face plate prepared thus was observed under SEM as with Example 1 of 18th Configuration to measure the number of contact portions and the contact area within limits of 20 μm×20 μm. The result is shown in Table 7. As a result of measurement, it was observed that there was no case where the number of contact portions of the metal backing within limits of 20 μm×20 μm was less than two and the metal backing was in good contact with the face plate. Besides, the discharge start electric field strength was measured as with Example 1, which measurement provided a value of 6.5 kV/mm.

Using the above face plate and a rear plate provided with a multiple electron beam source similar to that used in Example 1 of 18th Configuration, an image forming apparatus was manufactured, thus enabling the durability and the reliability of the image forming apparatus to be promoted.

Incidentally, the black matrix 1301 maybe made up also in a pattern having a circular opening as shown in FIG. 107*b*.

EXAMPLE 4

Next, referring to FIGS. 105*a* to 105*d*, 107*a* and 107*b*, Example 4 according to 18th Configuration will be described.

Figure 105A:
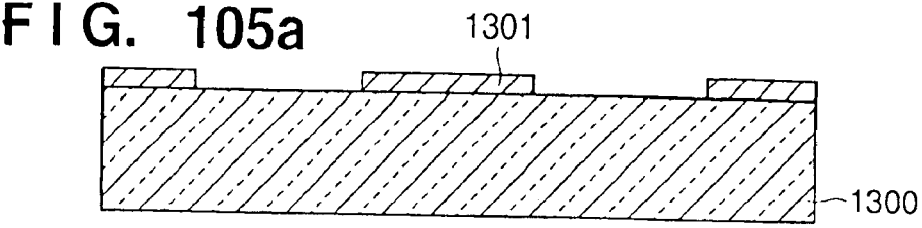
Figure 105B:
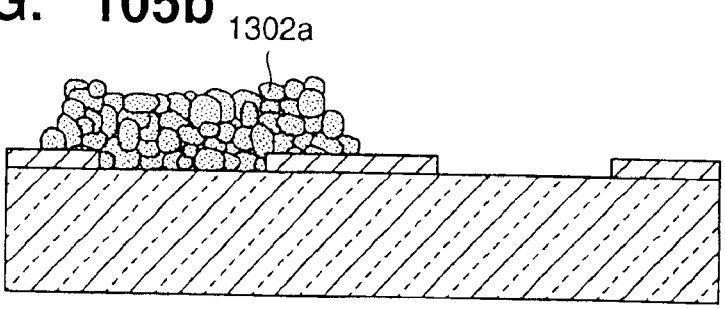
Figure 105C:
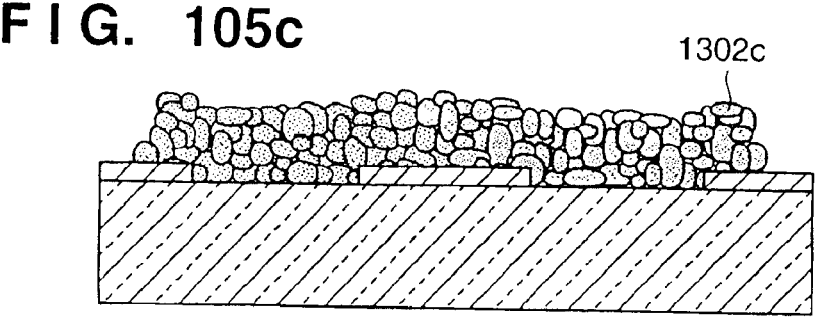
Figure 105D:
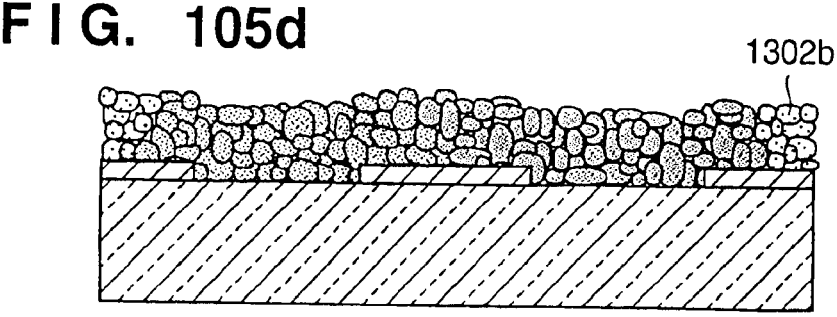

After washing/drying a 2.8 mm thick soda lime glass (substrate 1300) similar to that of Example 1 of 18th Configuration, a 3 μm thick black matrix 1301 was prepared as with Example 1 (FIG. 105*a*).

Figure 106D:
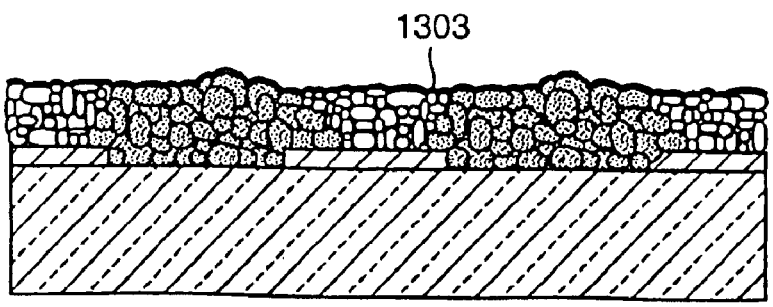

Next, a tricolor fluorescent material film was produced at the opening of the black matrix 1301 in such an array as shown in FIG. 107*a*. Producing a fluorescent material film is performed by the screen printing and that separately for each color out of three colors of fluorescent materials at three times. Besides, a fluorescent material is printed not in a pattern comprising dots printed at positions of individual opening of the black matrix but so as to make longitudinal stripes as shown in FIG. 107*a*. First, a first color of fluorescent material 1302*a* was printed so as to allow each printed stripe to bulge to its adjacent longitudinal stripes of the black matrix (longitudinal pattern of the black matrix) to about a half (FIG. 106*b*). Subsequently, a second color of fluorescent material 1302*c* was printed so as allowed to overlie on the portion to which the first color of fluorescent material 1302*a* was applied out of the adjacent longitudinal stripes and to bulge to another longitudinal stripe to about a half (FIG. 106*c*). Subsequently, a third color of fluorescent material 1302*b* was printed so as allowed to overlie on the adjacent longitudinal stripes (FIG. 106*d*). Here, as with Example 1 of 18th Configuration, an nonwoven fabric with isopropyl alcohol (IPA) absorbed may be provided on a sufficiently flat planar glass to increase the flatness also by pressurizing the fluorescent material film on the face plate through aids thereof if the thickness of a stacked matter is not sufficiently flattened.

Then, by baking this substrate at 450° C. for 4 hr, the resin component was pyrolyzed and removed to obtain a face plate. On measuring the thickness/surface roughness of the prepared face plate by using a touch-needle type surface roughometer, no greater difference between the average thickness of the fluorescent material film per pixel and the average thickness of the black matrix adjacent thereto than 7 μm, average grain size of fluorescent materials, was observed anywhere. Besides, this face plate was observed under microscope, which observation revealed that the top surface of the black matrix was covered with both adjacent pixel fluorescent materials.

Figure 105E:
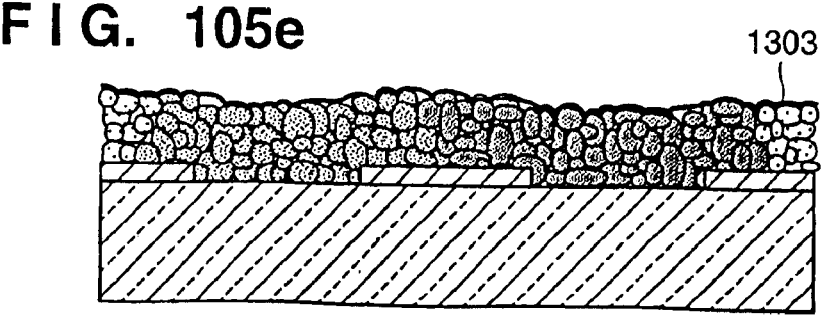

Next, on the face plate, a metal backing 1303 was fabricated by the same method as with Example 1 of 18th Configuration to obtain the finished face plate (FIG. 105*e*).

The face plate prepared thus was observed under SEM as with the Example 1 of 18th Configuration to measure the number of contact portions and the contact area within limits of 20 μm×20 μm. The result is shown in Table 7. As a result of measurement, it was observed that there was no case where the number of contact portions of the metal backing within limits of 20 μm×20 μm was less than two and the metal backing was in good contact with the face plate. Besides, the discharge start electric field strength was measured as with Example 1, which measurement provided a value of 6.7 kV/mm.

Using the above face plate and a rear plate provided with a multiple electron beam source similar to that used in Example 1 of 18th Configuration, an image forming apparatus was manufactured, thus enabling the durability and the reliability of the image forming apparatus to be promoted.

TABLE 7

|  | Example 1 | Example 2 | Example 3 | Example 4 |
|---|---|---|---|---|
| Number of contacts, Min. (points/20 μm × 20 μm) | 5 | 4 | 2 | 3 |
| Number of contacts, Average (points/20 μm × 20 μm) | 11.4 | 10.2 | 6.8 | 8.3 |
| Ratio of contact area (%) | 55 | 39 | 19 | 25 |

TABLE 7-continued

|  | Example 1 | Example 2 | Example 3 | Example 4 |
|---|---|---|---|---|
| Discharge start electric-field strength (kV/mm) | 7.7 | 7.3 | 6.5 | 6.7 |

Incidentally, the black matrix 1301 may be made up also in a pattern having a circular opening as shown in FIG. 107*b*.

(19th Configuration)

For joining of a face plate, a frame member and a rear plate constituting the vacuum vessel section in a display panel, a thermoplastic polymer adhesive containing a polyphenyl compound can be used. Hereinafter, examples of 19th Configuration will be enumerated.

EXAMPLE 1

FIGS. 109*a* and 109*b* are a perspective view showing the schematic configuration of a display panel according to the Examples 1 of 19th Configuration and a sectional view taken on line C–C' of FIG. 109*a*. In FIG. 109, reference numeral 5001 denotes an electron source, comprising multiple electron emission devices disposed on a substrate and wired appropriately, 5002, a rear plate, 5003, an outer frame, 5004, a face plate, and 5009, 5014, adhesives, respectively. Reference numeral 5010 denotes a row selective terminal, 5011, a signal input terminal, 5102, an upper wiring, 5103, a lower wiring and 5104, an insulating film, respectively.

As shown in the C–C' sectional view of FIG. 109*b*, the rear plate 5002 and the face plate 5004 are joined via thermoplastic polymer adhesives 5009 and 5614 containing a polyphenyl compound at their joints with the outer frame 5003. Inside the face plate 5004, the metal backing and the fluorescent material film 5007 are disposed and further the interior is coated with a metal backing.

Adhesion using adhesives proceeded as follows: after molding and installing the polyether ketone-based sheet-shaped thermoplastic polymer adhesives 5009 and 5014 (Techno-Alpha, Ltd.; Product Name: Stay-Stick 451) into the shape of an outer frame, soften the adhesives in an inert gas such as Ar by 350° C. heating treatment to perform the pressure contact (0.3 kg/cm$^2$) and then harden the adhesives in temperature-lowering process to fulfill the adhesion. Fixing the inner structures such as an electron source 5001 was also performed similarly. Besides, in disposing a rear plate 5002 and a face plate 5004, a ring-shaped getter 5016 of Ba-based evaporation type getter was simultaneously disposed outside the image display area.

Incidentally, as polyphenyl compounds to be contained in the adhesives, polybisphenol A, carbonate, polysulfone, polyether ketone and the like are mentioned.

EXAMPLE 2

This example used polysulfone-based sheet-shaped thermoplastic polymer adhesives 5009 and 5014 (Techno-Alpha, Ltd.; Product Name: Stay-Stick 415) as adhesives in the Example 1 of 19th Configuration and set the heating treatment temperature to 300° C. In these points, this example differs from Example 1.

EXAMPLE 3

This example used polyether-based sheet-shaped thermoplastic polymer adhesives 5009 and 5014 (Techno-Alpha, Ltd.; Product Name: Stay-Stick 401) as adhesives in the Example 1 of 19th Configuration and set the heating treatment temperature to 250° C. In these points, this example differs from Example 1.

EXAMPLE 4

This example used polysulfone-based pasty thermoplastic polymer adhesives 5009 and 5014 (Techno-Alpha, Ltd.; Product Name: Stay-Stick 301) as adhesives in Example 1 of 19th Configuration to apply coating to a glass member in an arbitrary shape by the dispenser coating method, performed the defoaming, volatilized the solvent at 150° C. and thereafter treated the joints at a heating treatment temperature of 300° C. In these points, this example differs from Example 1.

Use of polyphenyl compound contained adhesives to joints of members for the forming of an enclosure like these allowed the adhesion process to be accomplished by one step of adhesion at a heating treatment temperature of 350° C. or lower and therefore makes it possible to provide a vacuum enclosure principally for an image forming apparatus, low in electric power cost.

(20th Configuration)

In joining for the formation of an enclosure, the joint part can be formed of two types of adhesives. For example, by use of a material functioning to principally sealing the enclosure and a material functioning to adhere, joints can be adhesively formed. In such objectives, a seal material provided with sealing function for joints can be selected from materials made of metals such as In, Al, Cu, Au, Ag, Pt, Ti and Ni or their alloys and organic or inorganic adhesives whose surface coated with metals such as In, Al, Cu, Au, Ag, Pt, Ti and Ni or their alloys, while adhesives having the adhesive function include an organic adhesive such as a thermoplastic polymer adhesive comprising a polyphenyl compound or a polybenz imidazole resin-based adhesive or polyimide resin-based adhesive and an inorganic adhesive based on alumina, silica, zirconia, carbon or the like.

In as sealing materials and inorganic adhesives based on zirconia and silica as adhesives are mentioned to be the most preferable. When using In wire as sealing materials, an In wire is molded in an arbitrary shape, softened by heating at 160° C. or higher and brought into pressure contact to seal a joint during the temperature falling process, then an alumina-based pasty adhesive is applied to and around the sealing material by using a dispenser or the like, the moisture is evaporated at 100° C. or lower and adhesion is made on the order of 150° C., which procedure can satisfy the following conditions (1) to (6). The joining material using an inorganic adhesive based on In and alumina is preferred especially in that the maximum thermal treatment temperature is low, as compared with other joints.

Besides, as sealing materials, an inorganic pasty adhesive based on zirconia and silica is molded by using a dispenser or the like in an arbitrary shape to form a coating film made of In on the surface of an inorganic adhesive with the moisture vaporized at 100° C. or lower by a publicly-known vacuum deposition such as EB or sputtering, then In is softened by heating at 160° C. or higher, an alumina-based pasty adhesive is applied to and around the sealing material by using a dispenser or the like after the pressure contact and the sealing during the temperature-falling process, the moisture is evaporated at 100° C. or lower and adhesion is made on the order of 150° C., which procedure can satisfy the following conditions (1) to (6).

(1) Thermal Resistance: in the vacuum baking (high-vacuum formation) process;

(2) Sealing property: high vacuum (minimized vacuum leakage and minimized gas transmittance) maintainable (however, only for sites in need of vacuum maintenance);

(3) Adhesiveness: with a glass member;

(4) Released Gas Characteristics: low pressure released gas (high degree vacuum maintenance) characteristics;

(5) Thermal Treatment Temperature: its maximum is lower than about 400° C. of the frit adhesion (sealing) process; and (6) Moldability: Conformable to an arbitrary frame shape and not fluidized near the adhesion temperature.

Furthermore, as a sealing material, Al is usable and organic thermoplastic polymer polyether ketone-based adhesives can be used as adhesives. Al as a sealing material and an organic polyether ketone-based thermoplastic polymer adhesives are molded in an arbitrary shape, the adhesive is softened by heating to 330° C. or higher and then is hardened in the temperature-falling process for the fulfillment of adhesion after the pressure contact and the sealing, thereby enabling the conditions (1) to (6) to be satisfied.

Since joints using at least two members of a sealing material having the above sealing function and adhesives having adhesive function are formed in the adhesion process at a maximum thermal treatment temperature of 400° C. or lower, a vacuum enclosure principally for an image forming apparatus hardly related to luminance drop and life shortage, further high in display grade and abundant in getter effect can be provided at a low power cost.

Besides, to promote the close adhesion between joints and a glass substrate, it is effective to vacuum deposit a metal or alloy similar to the sealing material on the joint surface in advance or to coat a coating agent containing a similar metal or alloy by a publicly-known coating method such as screen printing, dipping, spray or dispenser in advance.

Examples of 20th Configuration will be described below.

EXAMPLE 1

FIG. 110a is a perspective view showing the general configuration of a display panel according to Example 1 of 20th Configuration and FIG. 110b is a sectional view taken on line C–C' of FIG. 110a. Except that the structure of connection of an outer frame to a face plate and a rear plate is different, other configurations of this example are similar to those shown in FIGS. 109a and 109b and like symbols are attached to like constituents.

In FIG. 110, reference numeral 5214 denotes a sealing material and 5209, an adhesive, by both of them an outer frame 5003 is joined to a rear plate 5002 and a face plate 5004 at the respective joints.

In joining, In wires were employed as a sealing material 5214, molded in an arbitrary shape and softened by heating to 160° C. or higher, joints were sealed in the temperature-falling process after the pressure contact, then a pasty adhesive (Three Bond, Ltd.; Product Name: 3715) based on zirconia and silica was applied to and around the sealing material in the shape of an outer frame and adhesion was performed on the order of 150° C. after the moisture was vaporized at 100° C. or lower. The fixation of an internal structure such as electron source 5001 is performed similarly. Besides, when installing a rear plate 5002 and a face plate 5004, a Ba-based ring-shaped getter 5016 of a evaporation-type getter was simultaneously installed outside the image display area.

EXAMPLE 2

As a sealing material for joints, use was made of a product obtained from the molding of an inorganic pasty adhesive (Three Bond, Ltd.; Product Name: 3715) based on zirconia and silica by using a dispenser or the like in an arbitrary shape and formation of a coating film 5015 by the publicly-known vacuum deposition such as EB or sputtering on the surface of the inorganic adhesive whose moisture was vaporized at 100° C. or lower. Next, by heating the sealing material at 160° C. or higher, the coating film 5015 made of In was softened to perform the pressure contact and joints were sealed in the temperature-falling process, then a pasty adhesive (Three Bond, Ltd.; Product Name: 3715) based on zirconia and silica was applied to and around the sealing material 5214 in the shape of an outer frame and adhesion was performed on the order of 150° C. after the moisture was vaporized at 100° C. or lower.

EXAMPLE 3

Except that at contacting portions of the rear plate 5002 and the face plate 5004 with the sealing material of the outer frame 5003, In was deposited by a publicly-known vacuum deposition such as EB or sputtering and the following joints were used in place of the joints of Example 1 of 20th Configuration, this example was carried out like the process of Example 1. Namely, for joints of this example, Al as a sealing material and polyether ketone-based thermoplastic polymer organic adhesives as adhesives were employed. Al of a sealing material and sheet-shaped organic polyether ketone-based thermoplastic polymer adhesives were molded in an arbitrary shape, the adhesives were softened by heating to 330° C. or higher to perform the pressure contact and the sealing and hardened in the temperature-falling process to fulfill the adhesion. Also by this approach, the above conditions (1) to (6) can be satisfied.

EXAMPLE 4

Except that the following joints were used in place of the joints of Example 1 of 20th Configuration, this example was carried out like the process of Example 1. Namely, for joints of this example, In as a sealing material and polysulfone-based thermoplastic polymer pasty adhesives (Techno-Alpha, Ltd.; Product Name: Stay Stick 301) as adhesives are employed. In wires are adopted as a sealing material 5214, molded in an arbitrary shape, softened by heating to 160° C. or higher to perform the pressure contact and the sealing in the temperature-falling process, a polysulfone-based thermoplastic polymer pasty adhesive (Techno-Alpha, Ltd.; Product Name: Stay Stick 301) employed as adhesives 5209 is coated on a glass member in an arbitrary shape by using a dispenser and defoamed to vaporize the solvent at 150° C., then is heated to 300° C. and higher to perform the pressure contact, adhesion is fulfilled by hardening the adhesive in the temperature-falling process and this approach also can satisfy the above conditions (1) to (6).

(21th Configuration)

Usually, the metal backing provided on a face plate is so provided as to cover many fluorescent material layers neighboring through the black matrix and a relatively narrow gap between the face plate and the rear plate caused a problem the metal backing was pulled to the side of the rear plate and peeled off under certain configurations or driving conditions of a display panel. Accordingly, in this configuration, such a problem is avoided by the provision of transparent electrodes at the outside portion of a face plate.

FIG. 111 is a perspective view of a display panel according to this configuration, where part of the panel is cut away to show the internal structure. In FIG. 111, symbols similar to those of FIG. 27 are attached to individual constituents.

Formed of a rear plate 1015, a side wall 1016 and a face plate 1017, is a hermetic vessel for maintaining the interior of the panel in vacuum. In fabricating a hermetic vessel, the sealing is necessary to allow the joints of individual members to retain a sufficient strength and air-tightness, while the sealing was achieved, for example, by coating frit glass to joints and baking them at 400 to 500° C. for 10 minutes or longer in the atmosphere or in the atmosphere of nitrogen. Besides, since the interior of the above hermetic vessel is retained in vacuum on the order of $10^{-6}$ Torr., a spacer 1020 is provided as the atmospheric pressure structure to prevent the fracture of a hermetic vessel due to the atmospheric pressure or an expected shock. On the underside of the face plate 1017, a fluorescent material film 1018 is formed. Since this example is a color display apparatus, portions of the fluorescent material film 1018 are distinctively coated with fluorescent materials of three primary colors comprising red (R), green (G) and blue (B) used in the field of CRT technology. The fluorescent material of each color is distinctively applied in the shape of stripes, for example, as shown in FIG. 112a, and a black conductor 1010' is provided between the respective fluorescent material stripes.

Incidentally, in this example, the average thickness of each color fluorescent material (luminous member) and that of the black conductor (black member or non-luminous member) are set to 20 $\mu$m and to 6 $\mu$m, respectively.

Black conductors 1010' are provided in order to assure that there occur no shift in the display colors even if there is a slight deviation in the position irradiated with electron beams, to eliminate a decline in display contrast by preventing the reflection of external light, and to prevent a fluorescent material film to be charged up by electron beams. Though graphite is mainly used to make a black conductor 1010', but any other material may be used in so far as suited to the objectives mentioned above. Besides, the distinctive application of the fluorescent materials of the three primary colors is not limited to the stripe-shaped array shown in FIG. 112a, but a delta-shaped array, for example, as shown in FIG. 112b or a grid-shaped array, for example, as shown in FIG. 114 is available.

Incidentally, the sectional shape of a face plate is typically shown in FIG. 175. Like this, the respective fluorescent materials of individual colors, luminous member, differ in average thickness from the black conductor 1010', non-luminous member. Incidentally, in case of manufacturing a monochromatic display panel, a monochromatic fluorescent material has only to be used for the fluorescent material film 1018 and the black conductor does not necessarily need using.

Besides, on the rear plate side surface of a fluorescent material film 1018, a metal backing 1019 publicly known in the field of CRT technology is provided. The metal backing 1019 has as its objectives an improvement in the utilization factor by reflecting a part of the light emitted from the fluorescent material film 1018, a protection of the fluorescent material film 1018 against damages due to bombardment by negative ions, an action as an electrode for applying an electron beam acceleration voltage and an action as a conduction path for electrons that have excited the fluorescent material film 1018. A method for producing a metal backing 1019 comprises forming a fluorescent material film 1018 on the face plate substrate 1017, then smoothing the surface of the fluorescent material film and vacuum depositing aluminum on this surface. Incidentally, any other material than Al may be available if it has the above functions.

On the top surface of the face plate (atmosphere side surface), as shown in FIG. 114, a transparent electrode 1022 made of ITO is provided, at least, in the existent region of the metal backing. This transparent electrode 1022 is connected to the ground. Thereby, even if a higher voltage than several kV (i.e., high field above 2 kV/mm) is applied between the multi-beam electron source and the metal back 1019 on the face plate 1017, no metal backing is peeled off and the break down discharge during the display of an image is prevented because the Coulomb force from the transparent electrode 1022 at the topside of the face plate acts on the metal backing, so that a good display image can be obtained.

Besides, in an image display apparatus using a display panel as shown in FIGS. 111 and 115, electrons are emitted by applying a scanning signal and a modulation signal respectively from unillustrated signal generator means through out-of-vessel terminals Dx1 to Dxm and Dy1 to Dyn to individual cold cathode devices (surface-conduction emission device) 1012, the emitted election beams are accelerated by applying a high voltage to the metal backing 1019 through a high-voltage terminal Hv to make electrons collide with the fluorescent material film 1018 and individual fluorescent materials (R, G and B) are excited so as to irradiate the respective colors of light, thereby resulting in the display of a color image. The applied voltage Vf to between the wires 1013 and 1014 was set to 14 [V] and the applied voltage Va to the high-voltage terminal Hv was set to 10 [kV].

Among display panels having no ground connection as mentioned above on the surface of a face plate, there were some case where the metal backing was peeled off under conditions of application voltages Va of 8 [kV] to 10 [kV] on the high-voltage terminal Hv at a distance of 2 mm between the face plate and the rear plate.

Like this, according to 21th Configuration, the objectives of the metal backing comprising a prevention of the potential drop, its action as the acceleration electrode, an improvement in luminance by a mirror reflection of the light emitted from the fluorescent material film 1018 and a protection of the fluorescent material film against damages due to bombardment by negative ions can be well attained. Furthermore, since the surface of the face plate is connected to the ground via a transparent electrode, the metal backing was prevented from being peeled off from the face plate.

Besides, especially by exposing a transparent conductive material on the utmost surface of the face plate, unnecessary charging can be suppressed. As such a transparent conductive material, film-shaped transparent electrode can be used. To this transparent conductive material, a potential enough to prevent unnecessary charging has only to given, but a configuration of connecting the transparent conductive material to the ground as shown in FIG. 114 is quite preferable.

(22th Configuration)

As a configuration related to a lead wire from the face plate to the a high-voltage electron source, use can be made of the following configuration. This configuration will be described using FIGS. 116 to 119. FIG. 116 is an exploded perspective view typically showing one example of configuration of an image forming apparatus according to 22th Configuration. FIG. 117 is a partly sectional view showing a section of an anode terminal part viewed from the direction of the arrowhead A in FIG. 116. FIGS. 118a to 118e are process drawings typically showing the preparing procedure of a rear plate substrate and show a part of the electron source region. FIG. 119 is a plan view showing the periphery of the anode terminal part of the rear plate.

Reference numeral 7001 denotes a rear plate also used as a substrate on which an electron source is formed, reference numeral 7002 denotes an electron source area provided with multiple electron emission devices such as electric-field emission devices and surface-conduction, wired to connect the devices so as to be driven according to purposes, led through a driving wire lead parts 7031 and 7032 to outside the image forming apparatus for driving the electron source and connected to the driver circuit (not shown). Reference numeral 7011 denotes a face plate with an image forming member formed, 7012, an image forming member comprising fluorescent materials for giving forth light by the collision of electrons emitted from the electron source area 7002, 7100, lead wires consisting of Ag or the like led for supplying a voltage to the image forming member 7012 and 7004, an outer frame to be held between the rear plate 7001 and the face plate 7011, while the electron source driving lead part 7003 is a joint between the outer frame 7004 and the rear plate 7001, embedded in a low-melting-point glass (frit glass 201) and led outward. For materials of a rear plate 7001, a face plate 7011 and an outer frame 7004, soda lime glass, soda lime glass with a $SiO_2$ coat formed on the surface, glass with a reduced content of Na, quartz glass or the like is used according to the conditions. Reference numeral 7101 denotes a lead-in wire for leading in the voltage supplied from an external high-voltage electron source and 7102, an insulating member with an lead wire 7101 previously subjected to the airtight seal treatment by use of a wax material such as Ag—Cu or Au—Ni and integrally formed at the center of a pillar shape. For materials of an insulating member 7102, materials such as ceramics containing alumina or the like and glass with a low content of Na, near in thermal expansion coefficient to the material of a rear plate 1 and insulating against a high voltage are employed. Thereby, cracking between the insulating member 7102 and the rear plate 7001 due to thermal expansion difference is prevented at high temperatures. Incidentally, any such other configuration than a high-voltage terminal may be available and the present invention is not limited to this configuration. Besides, to assure the connection between a lead-in wire 7101 and lead wires 7100, a connection member such as Ag paste or mechanical spring configuration may be disposed for the configuration. Reference numeral 7104 denotes a hole, penetrating the air-tight lead-in terminal 7103, formed in the rear plate 7001. Between the air-tight lead-in terminal 7103 and the through hole 7104 formed in the rear plate 7001, an adhesive member such as frit glass 7201 having the air-tight capability is used to fix the terminal. Incidentally, the through holes 7104 are formed at four corners of the rear plate 7001 at which no lead-in wire 7031 or 7032 is formed and insides the outer frame 7004. Furthermore, as countermeasures against discharge during the application of a high voltage of several kV through a lead-in wire 7101, such a configuration can be implemented by forming guard wires 7105 outside the driving lead wires 7031 and 7032 that any discharge occurring inside is guarded by guard wires 7105 and the devices are protected against damages such as deterioration due to the flow of the discharge current through the driving lead wires 7031 and 7032 to the electron source area. However, the creepage distance of insulation from the guard wires 7105 to the lead-in wires 7101 should be taken to be equal to or larger than 1 mm. This is because an extreme approach to the guard wires will increase the occurring frequency of a discharge.

Reference numeral 7005 denotes an exhaust hole for the evacuation and 7006, a glass tube disposed at the position corresponding to the exhaust hole 7005 and connected to an unillustrated outer vacuum forming device for sealing the electron emission devices after the completion of evacuation in the forming process. Incidentally, if a method for fabricating an image forming apparatus is adopted in a vacuum facility, the above glass tube 7006 and exhaust 7005 becomes unnecessary.

Next, referring to FIG. 118, one example of a method for manufacturing a multiple electron beam source according to 22th Configuration will be described.

Figure 118A:
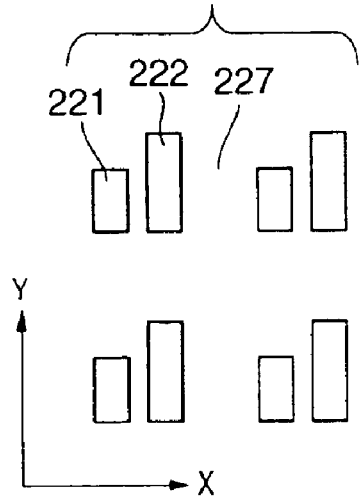
Figure 118B:
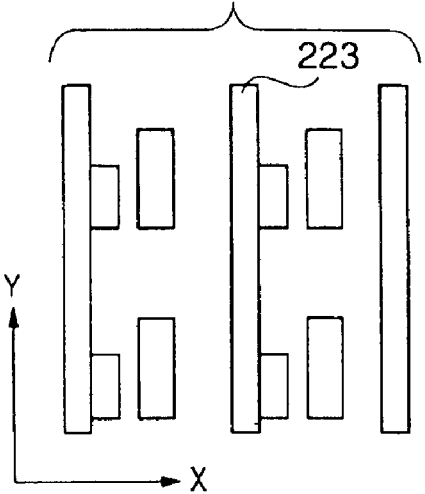
Figure 118C:
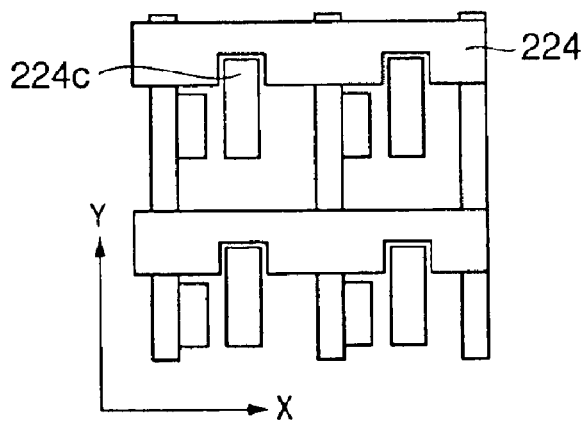
Figure 118D:
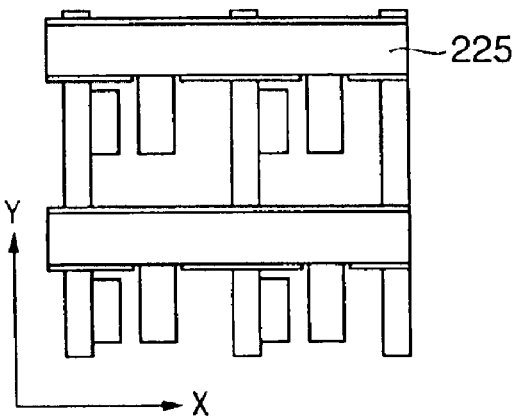
Figure 118E:
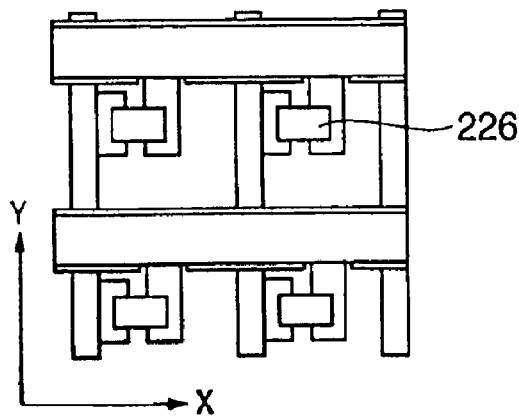

First, a conductive film made of a metal material is formed on well-washed substrate and its pattern is finely machined by the lithography to form many pairs of device electrodes 221 and 222 (FIG. 118*a*). Next, column direction wires 224 are formed (FIG. 118*b*) and further an interlayer insulating film 224 with notches 224*c* is formed (FIG. 118*c*) Subsequently, row direction wires 225 are formed (FIG. 118*d*) and finally a conductive film 226 is formed (FIG. 118*e*).

Hereinafter, examples of 22th Configuration will be enumerated.

EXAMPLE 1

Example 1 to which 21th Configuration is applied will be described.

On part of a face plate 7011 made of a soda lime glass material with an image forming member 7012 loaded, printed lead wires 7100 made of an Ag material led from one corner of the image forming member 7012 is formed. The formed position of this lead wire 7100 is set to a position capable of butting against the lead wire of a high-voltage terminal to be lead in from the through hole formed on the rear plate 7001. A lead wire 7100 ensures the electric conduction by such a printed formation as to lie on the image forming member 7012. Besides, the image forming member 7012 comprises stripe-shaped fluorescent materials, black stripes and metal backing, while fluorescent materials and black stripes are formed by printing, on which an Al film was formed as metal backing by vacuum deposition.

Between the rear plate land the face plate 11, an outer frame 7004 made of a soda lime glass material is retained. The driving wire lead parts 7031 and 7032 are embedded in the LS 3081 frit glass 201 made by Nippon Denki Glass at the joint between the outer frame 7004 and the rear plate 7001. The lead-in wire 7101, formed of 426 alloy material, is brazed in advance with Ag—Cu and subjected to vacuum air-tight seal treatment to integrally form an insulating member 7102 made of alumina ceramic at the center of a pillar shape. The through hole 7104 is provided for leading in the insulating member 102 integrally air-tight-formed with the lead-in wire 7101, whose disposing position will be described below.

As shown in FIGS. 116 and 119, the rear plate 7001 has places where no wire is formed at four corners alone, in one of which guard wires 7105 are placed at the outermost of the driving wire lead parts 7031 and 7032, and a through hole 7104 is provided 7 mm apart from the guard wires 7105. Such a configuration is made that the lead-in wires 7100 of the face plate 7011 is positioned opposite this through hole 7104. In its assembling, a careful alignment is made so that unillustrated fluorescent materials of the image forming member 7012 of the face plate 7011 and electron emission devices of the rear plate 7001 correspond to each other. Besides, under circumstances that the air-tight lead-in terminal 7103 and the glass tube 7006 were installed and the above alignment was completed, this assembly is thrown into a heating furnace not shown and a temperature of 420° C. is given to melt the frit glass 7201 installed at the butt contact position of the face plate 7011, the rear plate 7001 and the outer frame 7004. Then, cooling is allowed to proceed and the assemblage ends. In this condition, the face plate 7011, the rear plate 7001, the outer frame 7004, the glass tube 7006 and the air-tight lead-in terminal 7103 could be formed into a panel that can be constructed air-tight. Thereafter, with the panel connected to an unillustrated vacuum exhauster via a glass tube 7006, its interior is exhausted and individual conductive films 226 (fine particle films) are subjected to the energization forming and activation treatment. Subsequently, the exhaustion of the panel interior continues and the baking treatment is performed to remove the organic molecules remaining in the vacuum panel. Finally, the glass tube 7006 is heated, molten together and sealed. In the above process, the vacuum panel is finished.

Next, to connect the driving wire lead parts 7031 and 7032 to the driving board and the guard wires 7105 to an external ground terminal, an electric connection and a fixation of FPC (flexible printing circuit) 7401 is accomplished at such a position as shown in FIG. 119 by using an external FPC packaging device. Thereafter, incorporating the vacuum panel into a casing, connecting an electric board and the FPC and the like are performed to finish an image forming apparatus. At this time, the wiring guide of the lead-in wire 7101 of the air-tight lead-in terminal 7103 and the high-voltage power source can be packaged smoothly without interference with the FPC 7401 because of leading from a corner of the back face of the vacuum panel.

In the above image forming apparatus, on supplying a high voltage to an image driving circuit and inputting an external picture to display an image, it was confirmed that a stable image display was performable for a long time without any influence of a breakdown discharge or the like.

According to this configuration, (1) Cabling (wiring guide) of a high-voltage terminal at the casing modularization of a vacuum panel is easily performable. When an electric board for the driving is disposed at the back side of a vacuum panel, a contrivance of spacing in view of a discharge prevention is necessary in the layout of a high voltage cable, but its disposition at a corner facilitates the assurance of spacing and can promote the degree of freedom in the design.

(2) Since in constructing an MTX wiring on the rear plate, a symmetrical design becomes possible, a design is easy to make and the MTX wiring is convenient to a device for the configuration also.

(3) Since no driving wire is absent at a corner and guard wires are provided, this configuration is advantageous also for a discharge.

An image forming apparatus which has these advantages has been successfully provided.

EXAMPLE 2

Referring to FIGS. 120 to 123, this Example 2 will be described. FIG. 120 is an exploded perspective view typically showing a configuration example of an image forming apparatus according to 22th Configuration. FIGS. 121a to 121c are a typical drawing showing forming examples of lead wires of a face plate. FIG. 122 is a block diagram showing the configuration of a high-voltage electron source section for supplying a high voltage. FIGS. 123a to 123c are illustrations of the internal structure of a casing. In FIG. 120 and FIGS. 121a to 121c, symbols similar to those shown in FIG. 116 are attached to individual constituents.

This example is the provision of multiple high-voltage terminals. As shown in FIG. 120, two air-tight lead-in terminals 7103 are so constructed to pass through the through holes 7104 at two corners of the rear plate 7011. The configuration of a face plate 7011 in this case assumes a pattern of lead wires being led from two corners as shown in FIG. 121a. Besides, the lead wire pattern of two corners is not limited to this, but, for example, a configuration of disposing the lead wires at three or four corners is allowable as shown in FIGS. 121b and 121c. Incidentally, with respect to those similar in the configuration of FIG. 120 to the above examples, their description, configurations, manufacturing methods and the like will be omitted.

To supply a high voltage to the above air-tight lead-in terminal 7103 and form an image, a high-voltage electron source is required and will be described referring to FIGS. 122 and 123.

In FIG. 122, reference numeral 701 denotes a high-voltage electron source, 702, a control circuit, 703, a driving circuit, 704, a transformer and 705, a voltage feedback for stabilizing the output voltage. FIG. 123 is a view for explaining the casing configuration and FIG. 123a is an external view of a display panel with the members shown in FIGS. 121 and 122 incorporated inside the apparatus, FIG. 123b is a sectional view showing the configuration of the casing interior of the display panel viewed from the direction of the arrowhead A and FIG. 123c is a structural drawing of the display panel after the removal of the back plate of the casing viewed from the direction of the arrowhead B. Reference numeral 802 denotes a vacuum panel of a display device according to FIG. 122, 803, a driving board for driving the vacuum panel 802, 804, the FPC for electrically connecting the vacuum panel 802 and the driving board 803, and 805, high-voltage wires for connecting the high-voltage electron source 701 and the air-tight lead-in terminal 7103.

From an unillustrated DC electron source in an image forming device, a voltage is inputted to the transformer 704 in the high-voltage electron source 701. The input DC is boosted to a desired voltage value in the transformer 704 and the high voltage is outputted from the transformer 704. To suppress a voltage fluctuation at the voltage output, the voltage is fed back (705) and controlled in the control circuit 702 and the controlled voltage is sent to the transformer 704 via the driving circuit 703. The voltage used in this example is set to a voltage output of 10 mA at 10 kV. In preparing a high-voltage power supply 701 for outputting this voltage value, the diameter of a core becomes on the order of 50 mm if the transformer 704 of the electron source 701 is composed of a single transformer, whereas the diameter of a core can be reduced if this power supply employs a transformer 704 composed of multiple transformers. If the transformer 704 is composed of two transformers, for example, the outline diameter of a core can be reduced to the order of 30 mm because a value of current to be undertaken by one transformer becomes a half. Similarly, if it is composed of four transformers, a value of current to be undertaken by one transformer becomes a quarter and its diameter amounts to the order of 25 mm. In brief, downsizing the diameter of a core enables a thinner implementation of a transformer 704 and accordingly a high-voltage power supply 701. In the sectional structure of an image forming apparatus 801 shown in FIG. 123b, for example, a thinner high-voltage power supply 701 makes it possible to thin down the depth of the whole image forming apparatus 801. Since air-tight lead-in terminals 7103 are located at corners of the casing 801, count must be taken of the guide of wires in determining the place of disposing a high-voltage power source 701. Here, as shown in FIGS. 123b and 123c, a high-voltage power source 701 was located near the air-tight lead-in terminal 7103 at a corner of the casing 801.

As described above, location of high-voltage terminals at multiple corners of a vacuum panel and further composition of multiple high-voltage power supplies could contribute to a thinner implementation of the whole apparatus. Besides, the disposition of multiple air-tight lead-in terminals reduced the gradient of luminance. This can be said to a configuration advantageous for the implementation of a larger area.

EXAMPLE 3

Using FIGS. 124*a* and 124*b*, Example 3 according to 22th Configuration will be described. FIG. 124*a* is a plan view of a vacuum panel viewed from the side of a face plate and FIG. 124*b* is a sectional structural view near the high-voltage terminal structure part viewed from the A–A' direction of FIG. 124*a*. Incidentally, like symbols are attached to individual parts similar to those of the above respective examples, while the description thereof and their configurations and manufacturing methods are omitted.

In this example, a high-voltage output part is so arranged as to be formed at the side of a face plate. As shown in FIGS. 124*a* and 124*b*, a 1 mm diameter through hole is formed at the position of the wiring width center of lead wires 7100 on the face plate 900 to assure the electric conduction to the lead wires 7100 and at the same time an Ag paste of conductive member 901 is applied to the inner periphery of the through hole, then the vacuum air-tightness is assured by embedding the output part with a frit glass serving as the sealing material 902. According to this configuration, the creepage distance of insulation to an electrode body such as printed wires formed at the side of the rear plate 7001 can be assured, so that this is advantageous to a discharge prevention.

(23th Configuration)

With respect to the configuration of leads in use for the high-voltage power supply, there is a problem that a high resistance in the connection part with a high-voltage lead wire would induce a secondary discharge due to the degassing by heating in case of occurrence of a discharge. As countermeasures against this problem, lowering the resistance in the contact part suppresses heat generation, thus enabling the secondary discharge to be eliminated. By increasing the connection length between a high-voltage lead wire and an interconnection conductive film or between a metal backing and an interconnection conductive film or by lowering the sheet resistance of an interconnection conductive film, the resistance in the connection part can be reduced. From an estimate of the occurring frequency of a secondary discharge for varied connection length, both the connection length W1 [mm] between the interconnection conductive film layer and a high-voltage lead wire and the connection length W2 [mm] between the interconnection conductive film layer and a metal backing layer satisfying a relation for the sheet resistance r [Ω/□] of the interconnection conductive film:

$$W1, W2 > (2.5 \times r)^{1/2} \quad (1)$$

(1) enables a secondary discharge to be suppressed. Hereinafter, examples of 23th Configuration will be shown.

EXAMPLE 1

FIGS. 125*a* to 125*g* show the fabricating process of a lead wire in use for the high-voltage power supply.

Figure 125A:
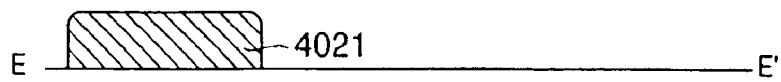
Figure 125B:
Figure 125C:
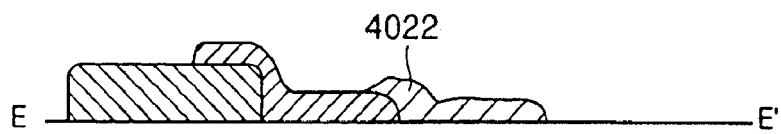
Figure 125D:
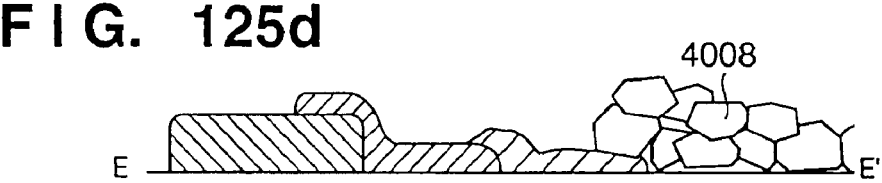
Figure 125E:
Figure 125F:
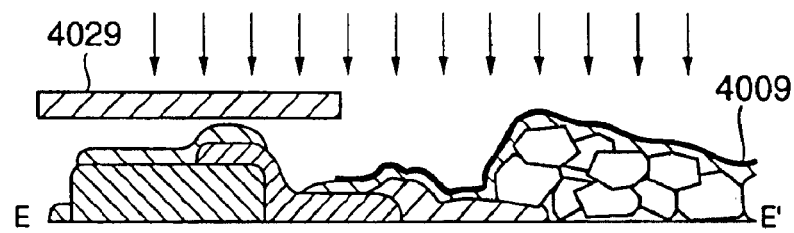
Figure 125G:
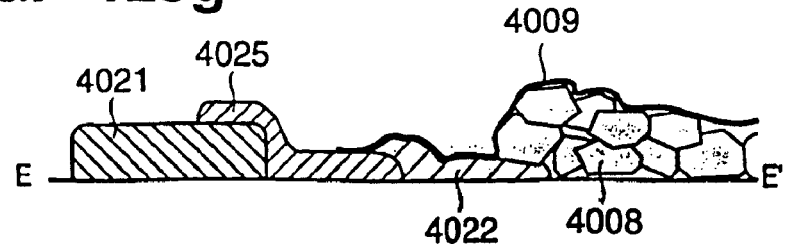

First, lead wires 4021 are prepared by the printing process (FIG. 125*a*). Wires were prepared using silver paste so that the sheet resistance is equal to or lower than 0.1 Ω/□. Next, an interconnection conductive film 4025 was prepared similarly by the printing process (FIG. 125*b*). For the conductive film, a mixture of carbon to the glass paste is used to prepare it at a thickness of 2 µm. At that time, the sheet resistance of an interconnection conductive film 4025 was 50 Ω/□. The connection length W of a relay conductive film was set at W=150 mm in such a manner as to fully satisfy the relation (1). Next, an insulating black stripe 4022 was prepared similarly by the printing method (FIG. 125*c*). The thickness of the insulating black stripe 4022 was set to 3 µm. Thirdly, fluorescent material layers RGB 4008 were prepared similarly by the printing process (FIG. 125*d*). The fluorescent materials used are of P22 type, a fluorescent material of an average grain size of 5 µm was used for each of R, G and B to make a 15 µm fluorescent material layer 4008. Fourthly, an aqueous solution containing colloidal silica, surfactant and the like was applied onto the fluorescent material layer surface, first to wet the convexo-concave part of a fluorescent material layer, then to spray the solution of a polymethacrylate-based resin with a plasticizer dissolved in a non-polar solvent such as toluene and xylene onto the fluorescent material surface. After spreading o/w type droplets put on the convexo-concave fluorescent material surface by using a spin coater, the moisture and the solvent constituent are dried and removed to prepare a 3 µm filming film 4028 (FIG. 125*e*). Next, with a mask 4029 in use for the aluminum evaporation having an opening only in the image area covering over the filming film 4028, a 1000 Å thick aluminum was deposited thereon (FIG. 125*f*) Finally, this substrate was heated to 450° C. at a temperature-rising rate of 1° C. /min in a baking furnace and cooled at a temperature-falling rate of −2.5° C. /min after maintaining the above high temperature for 30 min, thereby removing the resin intermediate layer by the pyrolisis (FIG. 125*g*). After a removal of the filming resin 4028, the metal backing layer 4009 is in contact with the fluorescent material layer 4008, the black stripe layer 4022 and the interconnection conductive layer 4025 as covering them.

EXAMPLE 2

FIG. 126A is a plan view of an electrode part and FIG. 126*b* is a sectional view taken on line F–F' of FIG. 126A. In FIGS. 126A and 126*b*, like symbols are attached to constituents similar to those shown in FIGS. 125*a* to G.

The interconnection conductive layer 4025 comprises 3 µm thick black-silver type wires and its sheet resistance is 0.5 Ω/□. The connection length W2 between the interconnection conductive film 4025 and the metal backing 4009 is adopted to be 5 mm long so as to fully satisfy the equation (1). The high-voltage lead wire 4021 is a 2 mm diameter tungsten wire and penetrates an electron source substrate 4004 to butt against the interconnection conductive film 4021, so that the contact is ensured. Since the diameter of the connection part is 1.8 mm, the connection length W1 between the high-voltage lead wire 4021 and the interconnection conductive film 4025 amounts to the corresponding circumference, i.e. 5.7 mm, which fully satisfies the equation (1). The distance L from the image area and the spacer 4020 to the interconnection conductive film 4025 was set to 12 mm.

A method for preparing on the interconnection conductive film 4025, insulating black stripes 4022, a fluorescent material layer 4008 and a metal backing layer 4009 are similar to that of Example 1 of 23th Configuration.

EXAMPLE 3

Next, another example will be described. In this example, a relay conductive film 4025 was prepared using white-silver wires. Besides, in this example, an insulating black stripes 4022 was extended to the interconnection conductive film 4025 as the underlying film thereof. Thereby, even when using white-silver wires, only the margin of a black band was visible and no feeling of hindering an image was provoked. As the interconnection conductive film material, not only those used in the above examples, but a conductive film containing ruthenium oxide can be also used.

EXAMPLE 4

In this example, an image forming apparatus was manufactured in which the face plate formed as with Example 1 according to 23th Configuration were opposed to the electron source on which are placed electron emission devices formed in an array on a substrate. FIG. 176a is a plan view of an electrode part of this example and FIG. 176b is a sectional view taken on line F–F' of FIG. 176a. In FIGS. 176a and 176b, like symbols are attached to constituents similar to those shown in FIGS. 125a to G. In this example, the interconnection conductive film 4025 formed on a transparent substrate 4023 was made into the shape of a band and made equal in length nearly to one side of the metal backing 4009. Symbols W1 and W2 denote the connection length between the lead wire 4021 and the interconnection conductive film 4025 and the connection length between the metal backing 4009 and the interconnection conductive film 4025, respectively. As seen from FIG. 176a, in this example, the connection length W2 between the metal backing 4009 and the interconnection conductive film 4025 was chosen to be a little longer. As a result, even if a discharge occurs, no secondary discharge was observed near the interconnection conductive film.

(24th Configuration)

In a relation of the face plate to the rear plate, especially to the electron source substrate, the following configuration can be used.

First, the following tasks have been present regarding these relations. In a conventional image forming apparatus, use is made of a light generation phenomenon due to the collision of electrons emitted from an electron source with fluorescent materials of an image forming member, but the following issues have been involved in this.

Issue 1: Electric field concentration associated with the layout of an electrode in the cathode vicinity area;

Issue 2: Charging of an insulating member in the anode vicinity area (Charging due to reflected electrons); and Issue 3: Charging of an insulating member in the cathode vicinity area (Charging due to positively charged particles).

The above disturbing actions caused a local charging in the vicinal area so as to distort the beam orbital or induce a break down discharge, thereby leading to a decline in the dielectric withstanding voltage of electron emission devices. The above issues will be specifically described below.

Issue 1:

The electron beam emission apparatus can be macroscopically regarded as a parallel planar capacitor comprising a pair of cathode and anode. Except for the peripheral region of a gap between the cathode and the anode, a parallel electric field is formed in a great majority part. The electric field strength is basically uniform, but a parallel electric field is broken in the peripheral region of a cathode and an anode and an electric field concentration point takes place at the metal-insulator boundary, that is, at the potential base-substrate.

Based on the computation result of electric fields, the electric field strength at the potential base-substrate boundary is found to be approx. 1.3 times that of the internal space in the cathode-anode gap for the configuration in which the area of cathode is the same as that of anode. The electric field emission is generally not symmetric and electrons are likely to emit from the cathode side. The electric field concentration associated with the geometric layout mentioned above is understood as electric field emission of electrons from the cathode-substrate boundary. If the above electric field emission is induced, this electric field concentration in this boundary region, forming one of the occurring causes of a deviation of the beam orbital and a local discharge associated with the substrate charging of an electron beam emission apparatus, entailed a problem that moderation by the non-selection period of an electron source is impossible, because of appearing under application of an accelerating voltage to the anode regardless of whether emission or non-emission of electron beam emission devices on the cathode.

Issue 2:

Referring to FIG. 127, Issue will be described. In FIG. 127, the image forming apparatus is so constructed that a metal backing 610 is formed as the anode and an image forming member 606 comprising fluorescent materials and black stripes is formed in the image forming area. In such an image forming apparatus comprising planar-type electron emission devices, as shown in FIG. 127, about 5 to 20% are scattered backward (backscattered electron beams e$^-$) out of the electron beams irradiated onto the image forming member 606 comprising fluorescent materials for generating visible rays by the collision of electron beams and black stripes and the aluminum-made metal backing 610 serving for a light reflection layer and intrude again into the metal backing 610 to which a high voltage is applied by the electric field. Furthermore, part of this backscattered electron beam strikes the face plate 605 and the side wall 609 made of an insulator such as glass to produce the gas emission by adsorbed gas release and the secondary electron emission. In conformity with the emission efficiency of secondary electrons in the insulator, positive electric charges ($\delta$-1) times the quantity of incident electron current are generated in the insulator glass. On account of a low conductivity, electric charges generated in the insulator are accumulated to cause a local charging of the face plate, thus disturbing the electric field. By this disturbance of the electric field, a desired electron beam orbital becomes unobtainable, so that color mismatching or the like occurs in some cases. Besides, when adsorbed gases are released, a break down discharge becomes likely to occur by the electron avalanche, thus leading to damages to the electrode or wires (603 and 604) at the side of the rear plate 601 and further to electron emission devices 602.

Issue 3:

By a reaction at the collision of electrons with an image forming member and ionization of atmospheric gases inside the apparatus, positive ions are generated. These positive ions are accelerated in a direction opposed to the flow of electrons emitted from the electron source by the electric field created between the electron source and the image forming member by the accelerating electrode and reach onto the electron source. On the other hand, in the electron source, plenty of insulating portions necessary for the patterning of device electrodes of electron emission devices are present. For this reason, when the positive ions having arrived at the electron source charges insulating portions of the electron source, electrons emitted from electron emission devices are curved toward the charged insulator portions, the orbital deviates, thus entailing problems such as shift in light emitting position. Besides, a probability of a discharge or the like arising from charged charges is raised, thereby damaging the reliability and life of the apparatus.

The disturbance of an electric field or discharges springing from problems as mentioned above was a great issue related to the high fineness/high color purity and further the reliability for a planar-type image forming apparatus.

As a method for implementing an image forming apparatus using surface-conduction electron emission devices in a simpler configuration, the present inventors invent a system constituting a simple-matrix type electron source composed of many surface-conduction electron emission devices arranged in an array by respectively connecting a pair of opposed device electrodes with row direction wires and column direction wires, which can give an appropriate driving signal in row direction and in column direction to select many surface-conduction electron emission devices and to control the emission quantity of electrons. Also in such a simple-matrix type image forming apparatus using surface-conduction electron emission devices, there is a fear that charging occurs similarly on the surface of an insulator member and the electron orbital is affected. The above problem of a shift in the electron orbital takes place also in an electron beam emission device using no fluorescent material as electron irradiated member as with the image forming apparatus.

Then, it is the object of this configuration to provide a high withstanding voltage electron beam emission device and image forming apparatus in which the charging of the cathode side insulating part, the electric field emission of the marginal part and charging of the anode insulating part are prevented, the emitted electron orbital is stabilized and a discharge is suppressed by specifying the electric potential within a minimum extent. By employing the configuration mentioned below, the electric field emission of the cathode-second substrate boundary in the utmost periphery is suppressed, no local charging is also present and further even when driving electron emission devices in utmost periphery edge, the electron beam scattered backward by image forming members such as fluorescent materials never enter outside the image forming section such as face plate and side wall of insulators. Furthermore, the charging of the cathode associated with the release of positive charged particles from the fluorescent material under an accelerating electrode is suppressed. Thereby, the charging disturbing the electric field and discharges damaging electrodes or electron emission devices are drastically reduced and the high fineness/high color purity and further the reliability/safety of a planar-type image forming apparatus are improved.

One example of 24th Configuration will be described referring to FIG. 128. FIG. 128 is a perspective view of an image forming apparatus to which the electron beam emission device of this configuration is applied and shows a partly cut away panel to disclose the internal structure. FIG. 129 typically shows a section of the image forming apparatus in FIG. 128 viewed from the Y direction.

In FIG. 129, an electron source 11001 with surface-conduction electron emission devices 11015 arranged in the shape of a matrix is fixed to the rear plate 11002. Opposite the electron source 11001, a face plate 11003 with fluorescent material film 11007 and metal backing 11008 as an accelerating electrode inside the glass substrate 11006, as an image forming member, is disposed via a support frame 11004 made of an insulating material, while a high voltage is applied between the electron source 11001 and the metal backing 11008 from an unillustrated power supply. These rear plate 11002, support frame 11004 and face plate 11003 are sealed to each other with frit glass or the like and an enclosure comprises the rear plate 11002, the support frame 11004 and the face plate 11003. Besides, on the surface of the cathode side substrate, or electron source 11001, a potential specifying film made of a $SiO_2$ film is formed within a given extent (extent designated with a broken line in FIG. 128) of the district excepting individual electron emission devices 11015 and the wires eclectically connecting them and this extent is a potential specifying part 11009. On letting d, A, B and C be the distance between the metal backing 11008 and the electron source 11001, the maximum region actually irradiated by electrons emitted from individual electron emission devices 11015 on the metal backing 11008 as the anode-side potential specifying part, the anode-side potential specifying part, i.e. laid-on region of the metal backing and the cathode-side potential specifying part as shown in FIG. 129, perpendicular lines are dropped from the utmost extremities of the region B towards the electron source 11001 and on a region C, d greater in either direction than the region enclosed by these perpendicular lines in parallel to the surface of the electron source 11001, the cathode-side potential specifying part 11009 is situated. Namely, the X-direction and Y-direction length of the region E shown in FIG. 129 is equal to d (regions A, B, C, E and F are individually indicated by X-direction line segments in FIG. 128, but are considered similarly also in Y direction). Furthermore, the anode-side potential specifying part 1108 is situated on a region $2\alpha d$ greater in either direction parallel to the surface potential-specified as the anode than the utmost extremities of the maximum region A actually irradiated by electrons emitted from individual electron emission devices 11015. Namely, the X-direction and Y-direction length of the region F shown in FIG. 129 is equal to $2\alpha d$. In this example, the distance d between the electron source 11001 and the metal backing 11008 was set to 5 mm and $\alpha$ was set to 0.6 mm.

Next, the operation of this example will be described.

On applying a voltage to individual electron emission devices 11015 through the out-of-vessel terminals Dox1 to Doxm and Doy1 to Doyn, electrons are emitted from electron emission devices 11015. Simultaneously to this, a high voltage of 5 kV is applied to the metal backing 11008 (or unillustrated transparent electrode) through the high-voltage terminal Hv to accelerate electrons emitted from electron emission devices 11015, thus forcing them to strike the inner surface of the face plate 11003. Thereby, fluorescent materials of the fluorescent material film 11007 are excited and emit light, so that an image is displayed.

As shown in FIG. 130a, for example, the fluorescent material film 11007 may be so arranged as to have fluorescent materials 11007a in a stripe pattern comprising red (R), green (G) and blue (B) placed in sequence and black conductive materials 11007b placed between them. Besides, as shown in FIG. 130b, fluorescent materials 11007a corresponding to individual colors of red (R), green (G) and blue (B) may be so arranged as to be placed in individual openings of the black conductive member 11007b with circular openings provided in zigzag shape.

Meanwhile, in a planar-type image forming apparatus with an accelerated electrode provided at the anode including this example, raising the accelerating voltage is required to assure the light emission luminance. Thus, the voltage applied between the anodic metal backing 11008 and the cathodic potential specifying part 11009 amounts to the order of 20 kV in a greater case and the electric field in the region where a parallel electric field at the anode-cathode gap is formed amounts even to 1 kV/cm to several tens of kV/cm. In such an outermost shell anode-cathode region, however, the spatial symmetry is broken as in the gap between both electrodes and accordingly the electric field becomes a status of deviating from parallelism and being curved. In particular, at the boundary between the anode-cathode and the insulating member, the electric field concentration takes place and locally about 1.3 times the inner gap. Besides, it is almost electron emission from the cathode side when the electron emission associated with the electric field concentration becomes usually at issue. Thus, if the voltage application part of the anode viewed from the cathode final end side is not just above, the anode is so arranged as to be smaller than the cathode, the electric field concentration of the cathode-side extremity is lightened. Furthermore, if the anode final end is so arranged as to recede by at least the anode-cathode distance d to the inner side, i.e. the electric field application region side in the projection surface to the cathode from the cathode extremity, the anode final end cathode distance is substantially suppressed by $1/\sqrt{2}$ and the electric field concentration at the cathode side can be lightened to a negligible level. Needless to say, even securing a larger difference of projection boundary of the anode-cathode extremity than d is allowable if the electric field concentration at the cathode side is lightened.

Next, a more preferred anode-cathode arrangement of this example will be described referring to FIG. 131. FIG. 131 is an enlarged sectional view of the main part of a face plate.

In FIG. 131, numeral 12005 denotes a face plate comprising soda lime glass with an ITO film 12011, a transparent conductive film provided for improving the conductivity, a fluorescent material 12006 provided inside the panel which is covered with a metal backing 12010 of an aluminum film. The situation that primary electrons emitted from electron emission devices 12002 of the outermost periphery are scattered backward at an angle of θ from the incident direction and backscattered electrons are re-accelerated by a parallel electric field, is typically represented. Symbol d denotes a space between the face plate 12005 and the rear plate 12001, which is substantially equal to the anode-cathode distance. Symbol F denotes a distance from the periphery of the fluorescent material 12006 to which primary electron beams are irradiated to the end of the conductor metal backing 12010 and the ITO film 12011.

Setting the origin to an incident point of a primary electron emission beam on the aluminum metal backing 12010 as shown in FIG. 131 and considering the x-axis and the y-axis as illustrated, the orbital of the electron beam backscattered at a backscattering angle of θ is as follows:

$x = v_0 t \sin\theta$, and $$y = \frac{eE_y}{2m} t^2 - v_0 t \cos\theta.$$

Here, v0 is an absolute value of velocity of the backscattered electron beam just after the backscattering and e and m are respectively the charge and the mass of an electron. Ey and t are the field intensity in the y-direction and the time. Incidentally, a parallel electric field is assumed here and the field intensity in the x-direction, Ex is set to 0.

Next, the distance x (θ)=F of the electron beam accelerated again by the electric field to the arrival (y=0) will be evaluated. For this purpose, the following relations are used and substituted into the above equations, then after the transformation, one obtains $$V_0 = \sqrt{\frac{2\alpha e V_a}{m}}$$

$$E_y = \frac{V_a}{d}$$

$F(\theta) = 2\alpha d \sin 2\theta.$

Here, α an Va are the energy ratio of the primary electron beam to the backscattered electron beam and the accelerating voltage of the primary electron beam applied to the face plate, respectively. α greatly depends upon the material quality, shape, configuration and the like of the incident member of the primary electron beam and generally, α=0.6 to 1. F takes a maximum expressed in the following expression at θ=π/4: F=2αd. Namely, the backscattered electron beam generated at the peripheral part is found to land again at a maximum distance of 2αd from the peripheral part.

By disposing a conductor more than 2αd apart from the peripheral part of the image forming section and further by disposing the side wall part outside it based on the above consideration, the crash of the backscattered electron beam to the insulating part or the side wall part such as glass outside the image display area is eliminated. And, charging or break down discharge associated with the emission of secondary electrons or gases is reduced and highly fining/highly color purifying of a planar-type image forming apparatus and the reliability as device advances.

Next, a further preferred anode-cathode arrangement of this example will be described referring to FIG. 131 as an enlarged detail of a rear plate configuration. By the crash of electrons emitted from the electron emission part 12002 onto the inner surface of the face plate 12005, the fluorescent material 12006 emits light, but phenomena of particles deposited on the fluorescent material film 12006 or the metal backing 12010 to be ionized/scattered takes place in addition to this light-emitting phenomenon. Among these scattered particles, positive ions are accelerated toward the side of the electron source 12003 by a voltage applied to the metal backing 12010 and flies in a parabolic orbital corresponding to an initial velocity perpendicular to the electric field.

Here, let Va be a potential difference between the electron source 12003 and the metal backing 12010, eVi [eV] a maximum value of horizontal-direction initial kinetic energy of positive ions, m [kg] the mass of a positive ion, +q [C] the quantity of a charge, $V_{in}$ the vertical initial velocity, and $V_{it}$ the horizontal inial velocity, the time t needed till a positive ion generated on the surface of the metal backing 12010 arrives at the electron source 12003, a distance of d apart and the horizontal move distance ΔS in the direction parallel to the surface of the electron source 12001 are expressed in terms of:

$$V_{in} t + \frac{qVa}{2md} t^2 = d, \tag{1}$$

$$Vi = \frac{V_{in}^2 + V_{it}^2}{2m} \tag{2}$$

and $$\Delta S = V_{it} t \tag{3}.$$

At this time, the maximum arrival extent as conditions of a positive ion is given by the following conditions (4) and (5):

$$q = +1e \ [C] \quad (4)$$

and $$v_{in} = 0 \ [m/S] \quad (5).$$

Then, $$\Delta S\max = 2d \times \sqrt{\frac{V_{it}}{V_a}}. \quad (6)$$

Incidentally, in this example, since the total thickness of the metal backing 12010 and the fluorescent material 12006 is not greater than approx. 50 μm, it is allowable in practical use to employ the distance d between the electron source 12001 and the metal backing 12010 as the distance between the rear plate 12001 and the face plate 12006.

Assuming that a positive ion generated on the surface of the metal backing 12010 jumps out in a direction parallel to the surface of the electron source 12003 on receipt of all the energy obtained by the voltage applied to the metal backing 12010, the moving distance AS till this positive ion arrives at the electron source 12003 becomes $$\Delta S\max = 2d \quad (7),$$

on substituting Va for Vi in the equation (6).

Namely, from the actual colliding position of electrons on the metal backing 12010 to the surface of the electron source 12003, a perpendicular is drawn and the extent of a radius 2d around the foot of the perpendicular on the inner surface of the electron source 12003 is a district at which positive ions generated on the surface of the metal backing 12010 can arrive.

Thus, if the extent satisfying at least Eq. (7) is potential-specified, there is no field indefinite surface in the flight direction of positive ions generated on the surface of the metal backing 12010 and the charging of the electron source 12001 is eliminated. In this example, since the potential specifying part at the cathode side is disposed at least d apart horizontally and outward from the potential specifying part at the anode side and further the potential specifying part at the anode side is disposed at least 1.2 d apart similarly horizontally and outward from the electron beam irradiated region as mentioned above, the potential specifying part at the cathode side is disposed to 2.2 d apart outward from the irradiated region and as a result, this potential specifying part satisfies the Eq. (7). Needless to say, even if the size of the potential specifying part is enlarged than the above extent, it follows that the extent satisfying Eq. (7) is potential-specified and therefore the enlargement is allowable.

Besides, a resistance value of the potential-specifying film constituting the potential-specifying part is relatively high, but the area ratio of the potential-specifying film to the whole potential-specifying part is within 30% and satisfactory for specifying the potential because the other part is covered with a conductive material of a sufficiently low resistivity such as an electrode made of a metal. Namely, the potential-specifying part need not to all comprise a conductive material of a low resistivity and may comprises a combination of high and low resistivity. In this case, it preferably comprises a conductive material not greater than $1 \times 10^5$ Ω/□ in surface resistivity for not less than 50% of the whole area and a conductive material not greater than $1 \times 10^{12}$ Ω/□ in surface resistivity for the rest.

Since the provision of a potential-specifying part on the cathode-side substrate eliminates the occurrence of charging the inner surface of the face plate 12005 as described above, the orbital of an electron emitted from the electron emission part 12002 was stabilized and a good image free from positional discrepancy was obtained. Besides, a probability of caused discharges becomes extremely low and a highly reliable image forming apparatus was obtained.

Ordinarily, the applied voltage between a pair of device electrodes 12016 and 12017 of an electron emission device is on the order of 12 to 16V, the distance d between the metal backing 12010 and the electron source 12001 is on the order of 2 mm to 8 mm and the applied voltage Va to the metal backing 12008 is on the order of 1 kV to 10 kV. In this example, the applied voltage between a pair of device electrodes 12016 and 12017 of an electron emission device, the distance between the metal backing 12010 and the electron source 12001 and the applied voltage Va to the metal backing 12008 were set to 14 V, 5 mm as mentioned above and 5 kV, respectively.

Incidentally, the potential-specifying part in this configuration is smaller in resistance than the substrate in a minute region comprising the arrangement pitch of device electrodes, e.g. in the x-direction and the y-direction and the ratio of the specified region of potential can be recognized as not smaller than 30%.

(25th Configuration)

With respect to a relation between the face plate and the rear plate, a configuration with the latter greater than the former can be taken. For example, a rear plate of 900 mm×580 mm size and a face plate of 850 mm×530 mm size can be used.

A plurality of surface-conduction electron emission devices are on a rear plate jointly serving for a substrate and wired in the shape of a matrix to form an electron source, then an image forming apparatus was manufactured using this. In FIG. 132, Numeral 13101 denotes a rear plate made of soda lime glass making up electron emission devices, 13105, an electron emission section, 13109, a face plate comprising soda lime glass with a metal backing and a fluorescent material formed, 13111, an outer frame, 13403, X-direction wires, 13406, Y-direction wires, 13316, a driving printed circuit board for driving the image display device and 13206, an FPC for connecting the X- and Y-direction wires 13403 and 13406 and a printed board 13316, respectively. Incidentally, leading of wires can be done, for example, from three directions for a 10 inch square image display section or from four directions for a 30 inch square image display section. Next, examples of this configuration will be described.

EXAMPLE 1

In FIG. 132, an image forming apparatus with the FPC and the printed board connected is shown in a separated arrangement of the FPC, but a unified arrangement is allowable.

First, the ACF is stuck to a connection position of the FPC 13206 to the X-direction electrode wires 13403, as external lead wires of the rear plate 13101. Next, the X-direction electrode wires 13403 of the rear plate 13101 and the FPC 13206 needed for connecting to the printed board therefrom are set to the joining position and the X-direction electrode wires 13403 is registered to make them into concordance. When the FPC electrode 13207 of the FPC 13206 coincides with the X-direction electrode wires 13403 of the rear plate 13101, the FPC 13206 and the image forming apparatus are moved under a thermo-press sticking tool. Thereafter, the therm-press sticking tool was brought down to thermo-press stick the FPC 13206 and the X-direction electrode wires 13403 to each other by using the ACE and the joining of the FPC 13206 and the X-direction electrode wires 13403 was completed. In this manner, the joining of the FPC 13206 and the X-direction electrode wires 13403 was completed to join one side thereof. A similar joining was accomplished regarding four necessary sides of the X-direction electrode wires 13403 and the Y-direction electrode wires 13406. Afterward, a connector (unillustrated) attached to the FPC 13206 joined to the rear plate 13101 is inserted in the connector part of the printed substrate 13316 and the connection of the rear plate 13101 and the printed substrate 13316 was completed. On giving any 14 V voltage signal to the X-direction wire and 7 V voltage signal to the Y-direction wire to apply a 5 kV anode voltage to the metal backing of the face plate, any good quality image free from discharges was obtained.

In the image forming apparatus manufactured thus, since its external lead electrode is present only on the rear plate, a prober or the like could be dropped from above only down to the rear plate to perform an electrification treatment, thereby enabling a voltage or current to easily flow through the electrodes. According to this approach, a poor contact of the electrode part is almost eliminated and consequently a uniform image can be produced.

Besides, since the joining of the FPC is performable without turning over an image forming apparatus, there is no trouble of holding nor fear of cracking involved in turning over the image forming apparatus and the time taken for the joining can be shortened. Besides, as compared with the joining without inversion, the joining device is simple and easy to handle and accordingly the joining can be accomplished almost free of defective products.

EXAMPLE 2

Example 2 according to 25th Configuration will be described below.

The dimension used in this example was 900 mm×580 mm for a face plate and 850 mm×530 mm for a rear plate. This face plate, an outer frame and this rear plate are used to prepare a panel, but a method for preparing a panel is partly similar to that of Example 1 according to this configuration and therefore only different parts will be described here.

FIG. 133 is a front view of one example of image forming apparatus. In FIG. 133, like symbols are attached to constituents similar to those of FIG. 132. In FIG. 133, Numerals 13201 and 13105 denote a rear plate comprising soda lime glass making up electron emission devices and an electron emission section.

First, on a substrate, the above electron emission section 13105 is formed in advance. Besides, to the inside surface of the face plate of the image forming apparatus, a fluorescent material is applied in advance and further a conductive metal backing is formed on the fluorescent material surface.

To these face plate, outer frame and rear plate 13201 and an exhaust pipe (unillustrated) and so on, low-melting point glass is applied. After the alignment of the face plate and the rear plate, they are fixed with a jig or the like, put into an electric furnace, heated to above the melting point of the low melting point glass and joined to complete a hermetic vessel. Thereafter, an electrification treatment is carried out through wires by using a prober and finally the exhaust pipe is sealed.

Next, a method for connecting the external lead wire of the image forming apparatus manufactured thus and the FPC will be described.

In FIG. 133, the status of connecting the FPC and the printed board to the image forming apparatus is shown. First, with the face plate kept downward, the hermetic vessel is set on a press sticking device. Next, the ACF is stuck to the position of connecting the FPC 13206 to the X-direction electrode wires 13403, as external lead wires of the rear plate 13201. Then, the X-direction electrode wires 13403 of the rear plate 13201 and the FPC 13206 needed for connecting to the printed board therefrom are set to the joining position and the X-direction electrode wires 13403 is registered to make them into concordance. When the FPC electrode 13207 of the FPC 13206 coincides with the X-direction electrode wires 13403 of the rear plate 13201, the FPC 13206 and the image forming apparatus are moved under a thermo-press sticking tool. Thereafter, the thermpress sticking tool was brought down to thermo-press stick the FPC 13206 and the X-direction electrode wires 13403 to each other by using the ACF and the joining of the FPC 13206 and the X-direction electrode wires 13403 was completed. In this manner, the joining of the FPC 13206 and the X-direction electrode wires 13403 was completed to join one side thereof. A similar joining was accomplished regarding four necessary sides of the X-direction electrode wires 13403 and the Y-direction electron wires 13406 of the rear plat 13201. Afterward, a connector (unillustrated) attached to the FPC 13206 joined to the rear plate 13201 is inserted in the connector part of the printed substrate 13316 and the connection of the rear plate 13201 and the printed substrate 13316 was completed. On giving any 14 V voltage signal to the X-direction wire and 7 V voltage signal to the Y-direction wire to apply a 5 kV anode voltage to the metal backing of the face plate, any good quality image free from discharges was obtained.

With the image forming apparatus manufactured thus, different from Example 1 according to 25th Configuration, an electrification treatment and a FPC joining is carried out with the face plate set downward, but only the difference between the rear plate and the face plate coming downward at the setting causes no difference especially in the process. Since its external lead electrode is present only on the face plate like this, a prober or the like can be dropped from above only down to the face plate to perform an electrification treatment, thereby enabling a voltage or current to easily flow through the electrodes. According to this approach, a poor contact of the electrode part is almost eliminated and consequently a uniform image can be produced.

Besides, since the joining of the FPC is performable without turning over an image forming apparatus, there is no trouble of holding nor fear of cracking involved in turning over the image forming apparatus and the time taken for the joining can be shortened. Besides, as compared with the joining without inversion, the joining device is simple and easy to handle and accordingly the joining can be accomplished almost free of defective products.

EXAMPLE 3

Third example adapting the 25th configuration of the present invention will be described below.

The face plate size and the rear plate size of the present embodiment were 300 mm×250 mm and 350 mm×300 mm, respectively. In the same manner as that in the foregoing first example of the 25th configuration of the present invention, an electron emitting part 13105 and electrodes were previously formed in the rear plate 13101. Also, fluorescent materials were previously applied to the inner side surface of the face plate 13109 of an image display apparatus and a metal backing having conductivity was formed on the surface of the fluorescent materials. Low melting point glass was applied to the thus prepared face plate 13109, an outer frame 13111, the rear plate 13101, and an exhaust pipe (not shown in the figure) and the face plate 13109 was aligned with the rear plate 13101. The rear plate and the face plate were aligned so that their end face of one sides or two sides were matched to each other and fixed by jigs. The FIG. 134a illustrates that end face of the rear plate and the face plate were matched to each other in one sides and the FIG. 134b illustrates that end face of the rear plate and the face plate were matched to each other in two sides. After being fixed by jigs or the like, the resulting body was heated in an electrical furnace to the melting point of the low melting point glass or higher to join those plates and other members and complete an air-tight container.

Next, a panel was manufactured using the face plate, the outer frame, and the rear plate. Since the method for manufacturing the panel was almost the same as the above described manufacturing method for the first embodiment of the 25th configuration, description only for different points of the manufacturing method will be given below.

The FIG. 135 is a front view of an image display apparatus, which is one example. In the figure, the same reference numbers are assigned to the constituent parts same as those of examples described above. After the respective constituent parts were manufactured in the same manner as described before for the first example of the 25th configuration, electrification treatment was carried out through the wiring by a prover and finally the exhaust pipe was sealed. Lead wires led out the thus manufactured image display apparatus and FPC were connected by the following method.

The FIG. 135 shows the image display apparatus being connected with the FPC and a printed substrate. At first, an ACF was attached to the x-direction electrode lead 13403, which was a led-out wiring of the face plate 13201, at the position where the FPC 13206 would be connected. Then, the FPC 13206 necessary to connect from the x-direction electrode lead 13403 of the rear plate 13001 to the printed substrate was set at the joint position and the x-direction electrode lead 13403 was aligned and made matched. Once the FPC electrode 13207 of the FPC 13206 and the x-direction electrode lead 13403 of the face plate 13201 matched, the FPC 13206 and the image display apparatus were moved to the position under a thermo-compression bonding tool. After that, the thermo-compression bonding tool was lowered to thermally bond the FPC 13206 and the x-direction electrode lead 13403 by the ACF and joining of the FPC 13206 and the x-direction electrode lead 13403 was completed.

In such a manner, joining of the FPC 13206 and the x-direction electrode lead 13403 was completed and joining of one side was done. Joining for other necessary three sides of the x-direction electrode lead 13403 and the y-direction electrode lead 13406 of the face plate 13201 was carried out. As illustrated in the FIG. 136, FPC joining might be carried out only for respective one sides (total two sides) of the x-direction electrode lead 13403 and the y-direction electrode lead 13406. After that, a connector (not shown in the figure) attached to the FPC 13206 joined to the face plate 13201 was inserted into a connector part of the printed substrate 13316 to complete connection of the face plate 13201 and the printed substrate 13316.

Any image with excellent quality could be displayed without electric breakdown on the resulting image display apparatus by applying any voltage signal of 14 V to the x-direction electrode and 7 V to the y-direction electrode, and an anode voltage of 5 kV to the metal backing of the face plate.

Since the image display apparatus manufactured in the above described manner had lead-out electrodes only in the face plate, processing such as electrification forming, activating could be carried out only by dropping the prover only to the face plate and consequently voltage and current could easily be applied to the electrodes. As a result, contact failure of electrode parts scarcely occurred and uniform images could be produced. Further, since the joining sides were limited to two or three sides and thus the contact parts of the electrode parts were lessened, the contact failure was further lessened as compared with that of the foregoing first and second examples of the present configuration.

Moreover, at the time of joining of the FPC which was done without requiring the image displaying apparatus to be turned over, the any risk due to the turning over could be eliminated and the time taken to carry out the joining could be shortened. As compared with the case of joining without requiring the turning over, the joining apparatus could be simple and easy, so that the joining could be carried out with scarce failure. Since the joining sides were limited to two or three sides, the joining time could be shortened as compared with that for the first and second examples of the present configuration.

In accordance with the above described configuration, the manufacturing process was made easy, the connection reliability in FPC joining was enhanced, FPC processing was easily carried out owing to the same joining direction of the FPC, safety was also improved owing to that the substrate was not required to be turned over, and manufacturing time could be shortened. A highly reliable image display apparatus capable of providing images with improved uniformity at high efficiency could stably be supplied by lessening the connection failure at the time of manufacturing of the apparatus in such a manner and thus an image display apparatus was provided at high productivity.

(26th Configuration)

As the configuration related to the assembly of the image display apparatus illustrated in the foregoing FIG. 2, the following configuration can be used.

EXAMPLE 1

The FIG. 137 is a perspective view of an image display apparatus to which the present 26th configuration is applied. In the figure, the reference number 121 denotes an electron source substrate in which a multi-electron beam source is formed, the reference number 122 denotes a substrate for display provided with fluorescent materials capable of emitting light rays by electron beam radiation, and the reference number 123 denotes a driving IC directly connected to the wiring end part of the electron source substrate 121. The FIG. 138 illustrates a cross-section figure of a part connecting the driving IC to the wiring end part. The reference number 126 denotes the led out electrode part, which is a part of a column or row wiring formed on the electron source substrate 121, the reference number 123a denotes driving IC chips, the reference number 124 denotes bumps made of a metal (e.g. gold) and formed as connection terminals of the driving IC chips 123a, the reference number 125 is a conductive adhesive, and the reference number 127 is a sealing material.

The column or row wiring 126 was formed using a conductive paste by printing. It was advantageous for the wiring to have a thicker thickness in order to lower the electric resistance. For that, a thick film printing method, especially a screen printing method was preferable to be employed and a conductive paste of silver, gold, copper, nickel or the like might be employed. In the case highly precise patterning was required, a rough pattern was formed using a photosensitive paste by a screen printing method and then exposed and developed to obtain an excellent wiring pattern. Additionally, after a desired pattern was formed, in order to remove the vehicle components of the paste, the obtained pattern was fired at a temperature (400 to 650° C.) corresponding to the thermal properties of the glass substrate and the paste employed.

As the technique of forming a thick film wiring, for example, the technique described in Japanese Patent Laid-Open No. 8-227656 might be employed. That is, an undercoating metal layer was formed on a substrate by electroless plating, an insulating layer with a prescribed pattern was formed on the undercoating metal layer, and a metal layer was formed on gaps of the insulating layer, in other words, the exposed parts of the undercoating metal layer by electroplating, and after the insulating layer was removed and the exposed undercoating metal layer was removed by etching to form a desired conductive pattern. The configuration just like the FIG. 138 is one embodiment so-called COG (chip-on-glass) and a series of the processes of mounting the driving IC on the column or row wiring as illustrated in the figure was carried out as following.

After the conductive adhesive 125 was transferred to the bumps 124 on the driving IC chips 123a and aligned with the led-out electrode part 126 wired on the electron source substrate 121, the driving IC chips 123 were moved down and mounted on the electron source substrate 121. After that, the conductive adhesive was hardened by heating or ultraviolet beam radiation and a protective coating 127 of a proper resin material was formed on the IC chips 123 to complete the mounting.

The layout of a practical led-out electrode part to carry out the above described embodiment on the electron source substrate 121 is illustrated in the FIG. 139. In the same figure, the reference number 126a denotes the lead-out electrode part of the column side wiring and the reference number 126b denotes the lead-out electrode part of the row side wiring. Also, the reference numbers 128, 129 denote electrode parts connecting the driving IC and other driving circuit parts to be connected with the driving IC. In the same figure, the electrode part in the inside of the rectangular defined by dotted lines is the connection part with the driving IC and the M part is a matrix part.

A packaged example of the electrode part 128 (or 129) is illustrated in the FIG. 140. The reference numbers 121, 123 to 128 denote the same parts as those to which the same reference numbers are assigned in the driving IC mounted part of the foregoing FIG. 138. The reference number 131 denotes an electrode part made of a conductive material of a flexible cable for connecting the driving IC 123 to another driving circuit part and the reference number 132 denotes a resin film. The electrode 131 of the flexible cable and the electrode part 128 were connected with each other by a conductive adhesive in the same manner as that for the driving IC.

Additionally, the size of the connection faces of the connection parts of led-out electrodes was different between the column side and the row side. That is, in the row side, since the total driving current of all of devices flowed if the row was selected, electric current of about 0.05 A to 0.2 A and about 1 to 10 A instantaneously flowed in the case of FE type electron mission devices and in the case of surface conduction type electron emission devices used, respectively. In consideration of the electric current capacity 0.5 $A/mm^2$ of a general conductive adhesive, the surface area of the connection part was required to be about 0.1 $mm^2$ to 20 $mm^2$.

On the other hand, in the column side, driving current of the subjected device flowed, about effective current of 5 $\mu A$ to 20 $\mu A$ and about 0.2 mA to 2 mA flowed in a subjected FE type electron emission device and in a subjected surface conduction type electron emission device, respectively. For the same reason, the surface area of the connection part was required to be about 0.00001 $mm^2$ to 0.04 $mm^2$. However, since the minimum mounting surface area was limited attributed to the size of the conductive filler of the conductive adhesive, the mounting surface area as narrow as 0.00001 $mm^2$, was supposedly limited to be practically about 40 $\mu m$ square, that is 0.00016 $mm^2$.

The capacity component of the wiring crossing part of the multi beam electron source was measured by LCR meter to find 154 pF at 0.05 pF for a crossing part in the case n=3072. On the other hand, the induced component in a led-out electrode part of about 30 mm was found 30 nH and the induced component in a matrix part was found 320 nH by measurement. Consequently, the resonance frequency was computed to be 22 MHz. Further, the rise time of Vs and Ve were investigated and found to be about 60 nsec and 80 nsec, respectively, and the maximum frequency component was found to be about 17 MHz. As a result, the resonance frequency could be made higher than the maximum frequency of the driving signals and occurrence of ringing waveform could sufficiently be suppressed. In the case a conventional mounting method in which a led-out electrode part and a driving IC part were connected with a flat cable, the induction component in an electric circuit pattern from the led-out electrode part, the 80 mm flat cable part, to the driving IC was about 170 nH and the resonance frequency was 18 MHz and owing to the similar frequency to the resonance frequency, possibility of occurrence of ringing waveform was increased.

As described above, the induction component in a connection part of a led-out part and a driving IC could be suppressed to the minimum by directly mounting the driving IC to a column or row wiring terminal part and consequently the resonance frequency could be set sufficiently high owing to the capacity components formed in the matrix wiring and images with high quality could be displayed while avoiding ringing waveform addition to driving signals.

EXAMPLE 2

In this example, since the driving IC mounting in the row wiring end part was same as that of the first example of the foregoing configuration, its description was omitted. The mounting of the driving IC in the column wiring end part of this example will be described in accordance with the FIG. 139 and the FIGS. 141a and 141b. This example had the different configuration of the column wiring end part of Apart illustrated in the FIG. 139 from that of the foregoing first example. The FIG. 141 is a magnified illustration of that part. The FIG. 141a is a magnified illustration of the A part in the foregoing first example. Reference numeral 136 denotes a lead-out electrode part formed by thick film wiring and reference numeral 137 denotes the connection part to the driving IC. The FIG. 141b is a magnified illustration of the A part in the present embodiment. Reference numeral 136a denotes a lead-out electrode part formed by thick film wiring and reference numeral 136*b* denotes an auxiliary electrode part formed by a thin film wiring. Reference numeral 138 denotes the connection part to the driving IC formed on the auxiliary electrode part 136*b*.

Next, the role of the auxiliary electrode part 136*b* will be described. Generally, a thick film wiring method is possible to easily form a low resistant wiring by screen printing or plating but difficult to provide sufficient surface flatness and sometimes requires a polishing process or a sufficiently wide surface area for the connection part. On the other hand, a thin film wiring method is possible to form a sufficiently smooth electrode part in a fine region in the case of employing a photolithography or an off-set printing method. Practically, the method can be selected from the following methods; a method involving patterning by a lithographic method and then etching after film formation in vacuum system of such as a vacuum vapor deposition method, a sputtering method, a plasma CVD method, or the like and a method involving an off-set printing of a MO paste containing organometals using a glass concave late. As a material for the electrode part 136*b*, any material having conductivity may be used and examples available for the material are a metal or an alloy of such as Ni, Cr, Au, Mo, W, Pt, Ti, Al, Cu, Pd, and the likes; printing conductors containing glass together with a metal or a metal oxide such as Pd, Ag, Au, $RuO_2$, Pd—Ag, and the likes; a semiconductor material such as polysilicon; and a transparent conductor such as $In_2O_3$—$SnO_2$. Consequently, driving IC mounting can be carried out in the necessary minimum surface area of the connection part. In this example, a soda lime glass was employed as a multi electron beam source substrate and a Ni thin film formed by an off-set printing method was employed for the electrode part 136*b*. The thickness, the width, and the length of the electrode part 136*b* was controlled to be 0.1 $\mu$m, 100 $\mu$m, and 400 $\mu$m.

Further, as described before, the induction component L possibly relating to occurrence of ringing signal waveform can de defined as Lc+(Lc/n). That is equivalent to the electron emitting operation state for a large number of electron emitting devices produced if selective row driving is carried out. On the other hand, in case of displaying a specified image and in case a few of devices of selected rows are in electron emission state, the number represented as the reference character n of the equation L is substantially small and the component Lc can not be neglected. In that case, it sometimes occurs that the reference character L which is estimated to be 30 nH before is estimated to be at maximum 60 nH, two times as high as the foregoing estimation. To deal with that, as the R component in a series resonance circuit of LCR, a wiring resistance is actively supplied to the auxiliary electrode 14 as to effectively keep the damping coefficient $\zeta=2R/\sqrt{(L/C)}$ be 1 or higher, so that occurrence of ringing can be suppressed, that is, so-called damping effect can be provided.

If an abnormal potential is applied to the wiring by some cause or other, the potential is applied also to the driving IC in the column and it is possible for the driving IC to be broken. To deal with such a problem, resistance is actively supplied to the auxiliary electrode 136*b* in the same manner as described above, so that the auxiliary electrode 136*b* can work as a protection resistance. For example, in the case 3 V abnormal potential is applied to the wiring side, no potential application to the driving IC is caused by adjusting the possible flow-in current to the driving IC to be 10 mA and the resistance of the auxiliary electrode to be 300 $\Omega$. The auxiliary electrode part 136*b* formed by the foregoing off-set printing method was provided with about 300 $\Omega$ as a resistance value from the thick film wiring end part to the driving IC mounting part 138.

As described above, in the present example, an auxiliary electrode was formed in a lead-out electrode part by thin film forming method, so that image display with higher density could more stably be carried out.

(27th Configuration)

The following configuration can also be a configuration related to the apparatus assembly.

EXAMPLE 1

The FIG. 142 illustrates the substrate layout of an electric circuit substrate constituting a driving electric circuit part of an image display apparatus to which this 27th Configuration was applied. FIG. 142 shows a schematic rear side of the electric circuit substrate in an opposite side view of an image display screen.

The image display apparatus of this example was formed of an image display part 14103 comprising a face plate 14101 and a rear plate 14102, a driving electric circuit part 14104 for image display, a supporting structure member 14105 for supporting them, and further an outer member (a cover not illustrated) and an electric power unit 14110. Reference numeral 14000 denotes a flexible cable.

The driving electric circuit part 14104 could roughly be divided into a scanning circuit substrate (14106*a*, 14106*b*), a modulation circuit substrate (14107*a*, 14107*b*), an image data generating circuit substrate 14108, and an input interface (I/F) substrate 14109. The scanning circuit substrate generated pulsed scanning signals successively selecting the scanning wiring of the image display part 14103 of the rear plate 14102 substrate. Since the scanning circuit substrate simultaneously drove right and left scanning wiring of the rear plate 14102, it was formed of the scanning circuit substrate 14106*a* and the scanning circuit substrate 14106*b*. The modulating circuit substrate generated pulsed modulation signals for carrying out pulse width modulation driving of a multi-electron source through a modulation side wiring rectangularly crossing the scanning wiring of the rear plate 14102. In this example, since the size of the image display apparatus was large, the modulation circuit substrate was divided into two modulation circuit substrates 14107*a*, 14107*b*.

The image data generating circuit substrate 14108 converted image data into modulated data to the modulation circuit substrates (14107*a*, 14107*b*). The input interface (I/F) substrate 14109 has a decoder part which gave output of R, G, R component signals from input image signals A and separate synchronous signals (SYNC) superposed on input image signals and generate various types of timing signals. In this example, among the electric circuit substrates constituting the driving electric circuit part 14104, the modulation circuit substrates (14107*a*, 14107*b*) emitting a large quantity of heat were laid out in an upper part and the image data generating circuit substrate 14108 for outputting signals to the modulation circuit substrates were laid out in the lower part. The pair of the scanning circuit substrates (14106*a*, 14106*b*) were laid out in the right and left ends of the image display apparatus.

The FIG. 143 illustrates the functional block figure of the driving electric circuit of the image display apparatus of this example and the FIG. 144 illustrates a timing chart of the apparatus. Reference numeral P2000 denotes an image display part (hereafter called as display panel for short) comprising a rear plate on which a multi-electron source formed of surface conduction type electron emitting devices in a simple matrix structure is arranged and a face plate. In this example, surface conduction type devices P2001 in number of 480×2556 were arranged and connected with row wiring of vertical 480 rows and column wiring of horizontal 2556 columns of a matrix, and emitted electron beam from each surface conduction type device P2001 was accelerated by high voltage applied from a high voltage power source P30 and radiated to the fluorescent materials, which were not illustrated, in the face plate side to emit light rays. The not-illustrated fluorescent materials might be arranged in various color arrangements corresponding to the use purposes and in this case color arrangement in RGB vertical stripes was employed.

In this example, an application example for displaying television images equivalent to those of HDTV on a display panel having the number of pixels of horizontal 852 (RGB trio) x vertical 480 lines will be described below and it is no need to say the application of a display panel with approximately the same configuration is possible not only to a HDTV but also to image signals with different resolution and frame rate, such highly precise images of such as NTSC, output images of a computer, and the likes.

In this example, electrons were emitted from respective devices for a duration corresponding to the pulse width by carrying out pulse width modulation and driving the devices on row P2002 selected by scanning circuits (14106a, 14106b). Two-dimensional images were formed by successively scanning lines selected by the scanning circuits.

Description will be given in accordance with the image signal flow below. Image signals were sent to the input I/F substrate 14109. The input I/F substrate 14109 was formed of P1, P2 blocks. The P1 block was the HDTV-RGB decoder part to receive the composite video inputs of HDTV and to output the RGB component signals (shown as T101 of the FIG. 144). In this unit, the synchronous signals (SYNC, shown as T102 of the FIG. 144) superposed on the input video signals were separated and sampling CLK signals (CLK1) were generated and outputted. The P2 block was the timing generation part to generate the following timing signals necessary to convert the analog RGB signals decoded in the P1 block into digital gradation signals for luminance modulation of the display panel:

(a) clamp pulses for d.c. regeneration of the RGB analog signals from the P1 block in the analog processing part P3, (b) blanking pulses for addition of blank periods to the RGB analog signals from the P1 block in the analog processing part P3, (c) sample pulses (not shown in the figure) for conversion of RGB analog signals to digital signals in the A/D part P6, (d) timing signals for writing in and reading out the line memories P10 and the luminance line memories P22, and (e) scanning control signals Yscan.

The RGB component signals were sent to the image data generating substrate 14108. The image data generating substrate 14108 was formed of P3 to P10 blocks. The P3 block was an analog processing part for each outputted primary color signal from the P1 block and carried out the following operation:

(a) receiving the clamp pulses from the P2 block and carrying out d.c. regeneration, (b) receiving blanking pulses from the P2 block and adding blanking periods, and (c) carrying out amplitude control of primary color signals sent from the P1 block and black level control of the primary color signals sent from the P1 block.

LPF P5 was a pre-filter means installed in the prior stage to the A/D part P6. The A/D part P6 was an A/D converter means to quantize the analog primary color signals passed through LPF P5 in necessary number of gradations. The reverse γ table P7 was a gradation characteristic conversion means installed to convert the input video signals to meet light emitting characteristics of the display panel. In the case the luminance gradation is expressed by pulse width modulation just like this example, an image display apparatus often has a linear property that the quantity of light emission is proportional to the degree of the luminance data. On the other hand, since the video signals are subjected to a TV picture tube employing a CRT, they are processed by γ-processing in order to correct the non-linear light emission characteristics of the CRT. For that, in the case TV images are to be displayed in a panel having linear light emission characteristics just like this example, the effect of the γ-processing has to be canceled by the gradation property conversion means like P7. P10 was horizontal line memory means for each primary color signal and gave outputs of luminance data of RGB to the modulation circuit substrate 107 (T105 of the FIG. 144).

The scanning circuit substrates 14106a, 14106b were formed of Y-shift resistor parts P1002, pre-drivers P1003, and switch transistors. Each Y-shift resistor part P1002 received horizontally periodic shift clocks and vertically periodic trigger signals to give row scanning starting triggers and output selective signals for successively scanning the row wiring P2002 to each pre-driver part P1003 installed for each row wiring. Each output part for driving each row wiring was constituted, for example, of FET means P1004, P1006. Each pre-driver part P1003 was for driving each output part with excellent responding property. The FET means P1004 were switch means which selectively applied −Vss=−7 V potential to each row wiring electrically communicated at the time of row selection. The FET means P1006 was a switching means to carry out electric communication at the time of no row selection and applied GND potential to the row wiring at the time of non-selection. Reference numeral T112 of the FIG. 144 shows one example of row wiring-driving waveforms.

Next, the following is the description of the flow of signals after RGB luminance data, which is line memory outputs P10 from the image data generating circuit 14108, is input to the modulation circuit substrate 14107. RGB luminance signals in number of 2556 corresponding to the number of devices (R1 to R852, G1 to G852, and B1 to B852) in horizontal direction were outputted during one horizontal period. When those signals were transmitted to 2556 drivers connected to the modulation side wiring during one horizontal period, the respective drivers had to generate pulse width modulation output. In order to carry out data transmission to the modulation side drivers at high speed, the line memories P10 were, therefore, once transmitted to the luminance line memories P22 each formed of 16 blocks and each line memory P22 was so configured as to simultaneously transmit modulation driver data in number of 160. In other words, the output of each RGB line memory of P10 was re-arranged in order corresponding to the fluorescent material colors of the panel connected through P2003 and converted to be series signals and transmitted to each line memory P22 for luminance signals.

The shift resistor latch circuit P1101 read lines of luminance data (image data) in column wiring number of 2556 from line memories P22 in every horizontal period by shift clocks (T107 of the FIG. 144), latched the data in parallel in latch circuits P11101b of the shift resistor latch circuit P1101 by LD pulses like T108 of the FIG. 144, and transmitted the data of one horizontal column of 2556 signals as a whole to the PWM generator parts P1102.

The PWM generator parts P1102 installed for each column wiring received luminance data (image data) from the latch circuits of the shift resistor latch circuit P1101 and generated pulsed signals having pulse width proportional to the degree of the data for every horizontal period just like the waveform shown as T110 of the FIG. 144.

P1104 was switching means comprising transistors and applied +Vs=7 V voltage output to column wiring during the period in which the outputs of the PWM generator parts P1102 were valid and earthed the column wiring during the period in which the outputs of the PWM generator parts P1102 were invalid. One example of the column wiring driving waveforms is shown as reference numeral T111 of the FIG. 144.

Images were formed on the display panel P2000 by successively scanning row wiring and driving the column wiring with signals of the values of pulse width modulation of the image data corresponding to the row wiring scanning in a manner described above. In the modulation circuit substrate 14107, the driver stages for generating pulse width modulation driving signals from the luminance line memories were made to be IC (integrated circuits). Each driver IC comprised modulation drivers for 160 ch and a shift resistor circuit for transmitting and latching the pulse width modulation data of each driver, a latch circuit, and PWM generator. In this example, since shift resistors for shifting luminance data signals of 160 in number to horizontal 2556 columns of column wiring, the number of shifts was 320× 8=2560 and the PWM generator part and others were formed of 2560 components each. Respectively two right and left lines of the output ends of 2560 of switching means P1104 were not connected with the column wiring.

As described below, the quantity of heat generation in each board was estimated. To calculate the estimation, the number of devices was presupposed to be of horizontal 852 (RGB trio)× vertical 480 lines and image signals of 60 Hz progressive scanning were presupposed as input signals. Regarding the device characteristics, the device current flowing in one device at the time of driving at 14 V was presupposed to be 1 mA.

(1) Modulation Circuit Substrate

The heat generation in the modulation circuit substrate is attributed to A: the power loss in the output transistors and B: the power consumption in the logic parts.

Regarding A: the power loss in the output transistors, in the case the ON resistance of one transistor was presupposed to be 100 Ω and full white image display was carried out, the power loss would be as following:

$$PlosA = Ron \times (If)^2 \times 2556$$
$$= 100 \times (1 \text{ mA})^2 \times 2556$$
$$= 0.3 \text{ W}.$$

Regarding B: logic, as described above, 8-bit luminance data had to be transmitted to 2556 PWM generators P1102 during a 1H period (about 30 μs in 480 scanning lines and 60 Hz progressive scanning) and the logic consumption power for data transmission became the maximum, that is, the logic consumption power to be consumed in the driver IC became the maximum.

That is, the shift operation for transmitting 8-bit data signals in number of 160 and PWM counter circuit operation were carried out for each driver IC. Generally, the power consumption of one logic is $$Plogic = (1/2) \times f \times C \times (Vlogic)^2$$

wherein the reference character f denotes the operational frequency; the reference character C denotes the logic gate capacity; and the reference character Vlogic denotes the logic operational voltage. In this example, when operation was carried out with shift counter, PWM counter clock=9 MHz, 1 W electric power was consumed for every driver IC. The power loss of the driver IC as a whole was $$PlosB = 1 W \times 16 = 16 \text{ W}.$$

(2) Scanning Circuit Substrate

The heat generation in the modulation circuit substrate is attributed to

A: the power loss in the output transistors and B: the power consumption in the logic parts.

Regarding B, the operation frequency of the logic of the scanning circuit substrate was low enough to be neglected.

Regarding A: the power loss in the output transistors (in the case the ON resistance of one transistor was presupposed to be 0.2 Ω, and per one substrate), the power loss would be as following:

$$PlosA = Ron \times (\text{line } If/2)^2$$
$$= 0.2 \times (2556 \text{ mA}/2)^2$$
$$= 0.3 \text{ W}.$$

(3) Image Data Generation Circuit

The heat generation in the modulation circuit is attributed to mainly B: the power consumption in the logic parts. The power consumption of the logic parts was about 10 W in the case of operation at 3.3 V of logic operation voltage.

According to the results of the above described (1) to (3), the modulation circuit substrate 14107 which emitted the highest quantity of heat was arranged in the upper end of the image display part and the image data conversion circuit substrate was arranged under the modulation circuit substrate. On the other hand, the pair of the scanning circuit substrates were installed in the right and left ends of the image display part. Consequently, the image display apparatus was enabled to efficiently release heat emitted from the driving electric circuit part and to be stably operated.

In this example, the heat emitted from the electric circuit substrates constituting the driving electric circuit part could sufficiently be released by spontaneous convection of air taken through air intake inlets formed in the upper and lower parts of the outer frame.

Subsequently, fan-free configuration was made possible and an extremely calm image display apparatus was materialized. Especially, in the case the resolution degree of an image display apparatus was heightened, the heat emission of the logic parts of the modulation circuit substrate was highest and thus such layout of this example would be highly effective. For example, in the case of progressive scanning of 1920 (×3 device numbers) of horizontal pixels and 1080 of scanning lines at 60 Hz, the foregoing PWM counter and the shift clock had to be operated at >20 MHz. In that case, even if the operation voltage of the logic could be lowered, the size of the logic IC determined by the output voltage of the IC could not be changed, so that the logic gate capacity could not be changed and 2 W electric power was consumed per every driver IC and the quantity of the heat emitted out of the modulation circuit substrate was increased.

(28th Configuration)

The following configuration can also be a configuration related to the apparatus assembly of the present invention.

The FIG. 145 is a schematic view illustrating the arrangement of the connector in the rear plate side of a display panel to which the 28th Configuration is applied. Reference numeral 15001 denotes a vacuum-sealed display panel. The detailed structure and the manufacturing method of the display panel will be described later. Reference numeral 15002 denotes flexible cables and connectors to be column wiring terminals. Reference numeral 15003 denotes flexible cables and connectors to be row wiring terminals. Reference numeral 15004 denotes an accelerating voltage terminals.

The FIG. 146 is a layout figure of the above described display panel in which a control part, a driving part, an electric power part, and others are mounted. Reference numeral 15005 denotes a modulation driving part. Reference numeral 15006 denotes a scanning driving part. Reference numeral 15007 denotes an accelerating voltage generation part. Reference numeral 15008 denotes a control part for the whole apparatus body. Reference numeral 15009 denotes the wiring for accelerating voltage. Reference numeral 15010 denotes an electric power source for the apparatus.

The FIG. 150 is a perspective view illustrating the installation structure of the above described accelerating voltage terminal and positioning relations with the row wiring, the column wiring, and the accelerating electrode. Reference numeral 15101 denotes a rear plate which is the rear side structure member of the display panel 15001. Reference numeral 15111 denotes a face plate which is the front side structure member of the display panel 15001. Reference numeral 15104 denotes a supporting frame which is supporting structure member for supporting the face plate 15111 and the rear plate 15101. Reference numeral 15131 denotes a cable for supplying accelerating voltage. Reference numeral 15116 denotes an accelerating voltage terminal. Reference numeral 15132 denotes a rubber cap. Reference numeral 15122 denotes a through hole formed in the rear plate. Reference numeral 15121 denotes a hollow member for supporting the accelerating voltage terminal region. Reference numeral 15120 denotes a lead wire of the accelerating voltage. Reference numeral 15112 denotes an accelerating electrode formed on the face plate 15111 and electrically connected to the accelerating voltage terminal 15116 through the lead wire 15120. Reference numeral 15102 denotes an electron source region in which the row wiring, the column wiring, and the electron sources are arranged and which is formed on the rear plate 15101.

The FIG. 149 is a block figure illustrating the outline structure of the processing part to display images. The reference number 15031 denotes an image input part. The reference number 15032 denotes an A/D converting part. The reference number 15033 denotes a timing control part. The reference number 15034 denotes a signal processing part. The reference character S1 denotes an inputted composite video signal. The reference character S2 denotes a synchronously separated video signal. The reference character S3 denotes a synchronizing signal separated from the composite video signal S1. The reference character S4 denotes an video signal made to be digital. The reference character S5 denotes a modulation signal. The reference character S6 denotes a timing signal to the modulation driving part. The reference character S7 denotes a scanning signal. The reference character S8 denotes a timing signal to the scanning driving part. The reference character S8 denotes an accelerating voltage.

The video signal input part 31 receives an input of the composite video signal S1 and separates it into the video signal S2 and the synchronizing signal S3. The A/D converting part 15032 makes the video signal S2 digital and outputs the resultant digital video signal S4. The timing control part 15033 outputs a driving timing signal for the whole apparatus based on the synchronizing signal S3. The image signal processing part 15034 processes the digital image signal S4 and outputs the scanning signal S7 and the modulation signal S5. The scanning driving part 15006 drives the row wiring of the display panel 15001 at a voltage as low as ±10 V or lower through the row wiring terminals 15003 following the scanning timing signal S8 and the scanning signal S7. The modulation driving part drives the column wiring of the display panel 15001 at a voltage as low as ±10 V or lower through the column wiring terminals 15002 following the modulation timing signal S6 and the modulation signal S5. The accelerating voltage generation part 15007 generates high voltage and supplies the accelerating voltage S8 to the display panel 1. An electron source not shown in the figure is arranged at the crossing point of the row wiring and the column wiring, which are not shown in the figure, of the display panel 15001 and electron beam is generated by simple matrix driving of the row wiring and the column wiring to emit light from fluorescent materials, which are not shown in the figure, of the display panel 15001 and display an image. The structure of the display panel 15001 and the electron source will be described in detail later.

The method exemplified for the high voltage generation method for the accelerating voltage generation means 15007 is a fly-back method or a forward converter method, or the like.

The row wiring terminals 15003 are connected to both sides of row wiring, which is not shown in the figure, of the display panel 1 and driven by perfectly same signals by two pairs of scanning driving parts 15006. Consequently, the electric current flowing in the row wiring is dispersed in both sides and the partial electric voltage decrease in the row wiring can be suppressed.

In the apparatus, the accelerating voltage terminal 15004, the electric power source 15007, and the wiring 15009 for accelerating voltage were high voltage parts at several kV to 20 kV and other parts were low voltage parts at 5 to 15 V. The distance L between the high voltage part and the low voltage part was desirable to be 1 mm/kV or wider in terms of safety relevant to discharge withstand voltage. The distance L of the low voltage part and the high voltage part could easily be kept 20 mm or wider by arranging the respective parts in the layout as the FIG. 146, so that the discharge withstand voltage could be improved and the safety could be heightened.

Further, since the radiation of noise in the high voltage parts owing the high voltage generation circuit was high, the low voltage parts such as the control part 15008, driving parts 15005, 15006 of the apparatus were enabled to be arranged at positions parted from the high voltage parts and consequently, possibility of erroneous driving of the circuit by the radiated noise of the high voltage parts could be suppressed.

The FIG. 151 is a front view of the rear plate of the foregoing display panel. In this figure, flexible cable, which is not shown in the figure (shown as 15002, 15003 in the FIG. 145 and the FIG. 146) is thermally crimped to electrode parts in the ends of the column wiring 15105 and the row wiring 15106 by ACF. Also in the rear plate, the distance L between the electron source region 15102 of low voltage parts comprising the column wiring 15105, the row wiring 15106, the electron source, which is not shown, and the likes and a hollow part 15122 of the accelerating voltage terminal in the high voltage parts is preferably 0.5 mm/kV or wider in order to keep safety relevant to the discharge withstand voltage and the capability of the display panel 15001 and further preferably 1 mm/kV or wider. The distance L between the electron source region of low voltage parts and the hollow part 15122 of the accelerating voltage terminal in the high voltage parts could easily be kept 20 mm or wider by arranging the row wiring terminals, the column wiring terminals, and the accelerating voltage terminal in the layout shown as the FIG. 145, so that the discharge withstand voltage in the inside of the display panel 15001 could be improved and the safety of the apparatus could be heightened and at the same time the performance of the panel could easily be kept for a long duration.

Further, in the case the enough distance (20 mm or wider distance between the high voltage parts and the low voltage parts) was kept between the high voltage parts and the low voltage part, the accelerating voltage terminal 15004 did not necessarily have to be positioned in the center of the side of the display panel 15001. Moreover, though being not shown in the figure, the column wiring terminals 15012 and the row wiring terminals 15013 might be positioned also at any parts in the side.

The present invention can be applied with approximately the same configuration even in the case of application to a vertical oblong type display apparatus. The apparatus may be constituted as shown in the FIG. 148 as to have the gravity center in a lower side. The layout is the same as that of the above described example except that the electric power source parts 15007, 15010 are arranged in a lower part of the apparatus and the layout of the apparatus inside is slightly changed.

Especially, since the weight of the high voltage power sources is heavy, it is preferable for the power sources to be installed lower than the gravity center of the display panel for improving the stability of the display apparatus installation.

Further, it is preferable that the heat radiating parts of respective power sources and the likes are kept from the direct contact with the rear plate constituting the display panel. That is for avoiding the display panel being affected with unintentional stress of the heat from the power sources.

(29th Configuration)

The following configuration can be employed in the case of electric charge elimination from an image forming apparatus.

EXAMPLE 1

The FIG. 152 is a block figure illustrating the configuration of an image display apparatus of the first example to which this 29th Configuration is applied. A method for electrostatic elimination in the case of actual drive of the image display apparatus will be described below.

The image display part 16001 is same as the foregoing example. As a driving method, a line-sequential scanning method is employed and gradation display is basically carried out in order to give gradation to the display images by controlling the total quantity of the light emission of fluorescent materials by controlling the electron emission duration within one horizontal scanning duration (1 H) with the time duration of the modulation signals.

In the FIG. 152, the signal separating circuit 16012 is a circuit for producing horizontally synchronizing signals S2, vertically synchronizing signals S3, digital image signals S4, and the likes from image signals S1 such as NTSC. The circuit comprises a video signal intermediate frequency circuit, a video signal detection circuit, a synchronously separating circuit, a low pass filter, an A/D conversion circuit, a timing control circuit, and the likes. The reference number 16014 denotes a scanning signal side driver for driving row-direction wiring of the image display part and outputs a scanning signal based on the horizontally synchronizing signals 52 separated and produced by the signal separating circuit 16012. The reference number 16013 denotes a modulation signal side driver for driving the column-direction wiring of the image displaying part and outputs a modulation signal based on the horizontally synchronizing signal S2, the vertically synchronizing signal S3, and the digital video signal S4 separated and produced in the signal separation circuit 16012.

The reference number 16016 denotes a circuit for detecting the electric power source state of the present image display apparatus and outputs a signal S5 corresponding to ON/OFF of the power source SW. Further, the reference number 16017 denotes a timer circuit to output the signal S6 based on the Off signal of SW for electrostatic elimination of the display apparatus to the controller 16011. At the time when the signal S6 from the timer circuit 16017 is in the active state, a signal corresponding to Va=0 V is to be outputted. Other than that, the image display apparatus comprises a high voltage power source 16008 and an anode current detection circuit 16007. Those applied to the foregoing configuration example may be employed for the high voltage power source 16008 and the anode current detection circuit 16007.

The FIG. 157 illustrates the driving timing of the image display part of the image display apparatus of this example. The FIG. 157 illustrates one example of driving timing of the voltage to be applied to the lead wires of the row-direction wiring (that is, the wiring in the side where scanning signals are supplied) and the column-direction wiring (that is, the wiring in the side where modulation signals are supplied). The timing chart of this figure illustrates the voltage applied to the row-direction wiring of I, I+1, I+2 lines at the time of successively operating the lines I, I+1, I+2 of the foregoing image display apparatus and the voltage applied to the column-direction wiring J, J+1, J+2 which are in the modulation signal side. In this case, 1<I<M−2, 1<JN−2 wherein the reference character M denotes the number of the row wiring wires and the reference character N denotes the number of the column wiring wires. In reference with the figure, one horizontal scanning duration K indicates the display of the I line, K+1 the display of I+1 line, and K+2 the display of I+2 line. The row wiring wires, which are in the scanning side at the time of successive line scanning, are successively selected in order for everyone horizontal scanning duration (hereafter denoted as 1 H) and scanning signals with crest value −½Vf (Vf means the driving voltage here and approximately Vf=2 Vth) having the pulse width approximately equivalent to 1 H are successively applied to the selected wires of row-direction wiring. After the scanning is carried out for all lines of the row-direction wiring, the scanning is repeated again successively from the first row wire. In the column-direction wiring, modulation signals having the crest value of ½ Vf corresponding to the video signals to be displayed on the selected rows and synchronized with the scanning signals to be applied to the row-direction wiring are applied to all wires of the column-direction wiring. The modulation signals rise up synchronously with the rise up of the driving signals and rise up after being kept at the crest value of ½ Vf for duration corresponding to the video signals (hereafter, the duration from the rise up of a modulation signal to the time of rise up is called simply as pulse width of the modulation signal). The pulse width of a modulation signal is made to correspond to each luminance of RGB three colors into which a video signal to be displayed on a selected row is decomposed and actually, it does not have a simple proportional relation to the luminance since correction is variously carried out in order to display images with high quality. In such a manner, driving voltage Vf is applied to surface conduction type emission devices of a selected row for the pulse width of a modulation signal. Since the emission electric current Ie of a surface conduction type emission device has the above described clear threshold characteristic, an image corresponding to a desired video signal can therefore be displayed on the selected row. Further, by successively carrying out line driving, an image can be displayed on all of the surface conduction type emission devices in the image display apparatus.

Next, the electrostatic elimination function of this example will be described. As a method for electrostatic elimination driving of an image display apparatus, it is impossible for an image display apparatus to employ a method involving a step of stopping Va for a certain period on detection of alteration ratio of Ie during image display. A detection circuit 16016 for detecting the alteration of the power source state is therefore installed to detect the SW of the image display apparatus is turned off and to output the signal of the detection to the timer circuit 16015. The timer circuit 16015 recognizes OFF of the SW signal and outputs the instruction signal S6 (Va=0 V) to carry out electrostatic elimination driving to the controller circuit 16011 for a prescribed period. The controller circuit 16011 sets the Va control of the high voltage power source 16008 at 0 V by a high voltage control signal based on the timer circuit 16015.

A timing chart corresponding to the above described control is illustrated in the FIG. 153. At first, in the case the SW is turned off at the time of T1 in the image display apparatus, a logic level signal of OFF is outputted from the SW-ON/OFF detection circuit. The timer circuit 16015 detects the alteration, for example, fall of the signal from the H level to the L level in this example, of the signal at the OFF time and drives the timer counter. The timer counter outputs a logic signal corresponding to Va=0 (in this example, from the L to the H level) for the duration denoted as the reference character Ta determined by the counter circuit set in the timer circuit inside to the controller circuit 16011. The controller circuit 16011 detects an alteration of the signal of the timer circuit 16013 and starts electrostatic elimination driving.

The electrostatic elimination driving is carried out for the Ta duration, the controller circuit 16011 carries out setting of high voltage control signal Va=0 to the high voltage power source 16008 and on the other hand, only device driving is carried out, so that the scanning side driver 16014 and the modulation signal side driver 16013 are driven as they are. At the time of ending the Ta duration by the timer counter, the output signal of the timer counter is changed from the H level to the L level and the controller circuit 16011 releases the electrostatic elimination driving on detection of the alteration of the signal and the device driving is also stopped. In the above described control, the electrostatic elimination driving is carried out without detecting the anode electric current Ie from the anode current detection circuit 16007, however electrostatic elimination driving may be carried out while taking the anode electric current value Ie into consideration. Substantially, at the time of outputting a signal of the Ta duration of a timer counter, the controller circuit 16011 detects the anode electric current Ie value and may determine whether electrostatic elimination driving should be carried out or not for the value. The determination method to be employed involves steps of comparing the Ie value with a prescribed Ie value using the comparator circuit and determining performance of electrostatic elimination driving in the case the Ie is the prescribed Ie value or higher set in the comparator circuit. Then at the time when the Ie value lowers to the prescribed value within the Ta duration, the electrostatic elimination driving is completed at that moment. On the other hand, the Ie value is the prescribed value or higher even after Ta duration, the electrostatic elimination operation is continuously carried out. In this case, the anode current Ie is converted into an electric signal (an analog signal or a digital signal through the A/D converter) and sent to the comparator circuit. Further, the set Ie value set in the comparator circuit is changed corresponding to the Va value to be applied at the time of display driving on the image display apparatus.

Further, another method involving a step of setting the Ta duration corresponding to the state duration of the SW may be employed. In this case, the timer circuit 16013 counts ON time based on the signal from the SW-ON/OFF detection circuit 16016. If the ON time of the image display apparatus is short, the Ta duration is shortened and if the On time is long, the Ta duration is prolonged. Also in this case, control just like the above described control method using the comparator circuit may be carried out by detecting the anode electric current Ie. Consequently, electrostatic elimination driving corresponding to the driving duration of the image display is made possible.

Moreover, the other method involving sequential processing by CPU or sequencer or the like installed in the inside of the controller may be employed for electrostatic elimination driving. The flow chart in the case of sequential processing is illustrated in the FIG. 154. The driving will be described below in reference with the figure.

The ON/OFF state of the SW is determined in the step S10. In the case the SW is in OFF state, whether electrostatic elimination driving is necessary or not is detected by detecting the value of the anode electric current Ie in the step S11 and if the value is an allowable value or higher, it proceeds to the step S12. Next, in the case electrostatic elimination driving is carried out, the timer setting is carried out in the step S12. The electrostatic elimination duration is equivalent to the Ta duration. Next, electrostatic elimination driving is carried out in the step S13. The electrostatic elimination driving is carried out for a duration set in the step S12 at the electrostatic elimination condition Va=0 V and in device driving ON state. When the electrostatic elimination driving is determined to be completed in the step S14, the value of Ie is again detected in the step S15 and whether the electrostatic elimination driving is stopped or not is judged. In the case it is determined to stop the electrostatic elimination driving, the device operation is turned off in the step S16.

As described above, in this example, the electrostatic elimination driving was made controllable by detecting ON/Off signal of the SW. By this example, the electrostatic elimination driving could be carried out corresponding to the display duration of the image display apparatus and the electrostatic elimination effect was heightened and the surface potential increase, which is one factor of break down discharge in vacuum, was prevented and thus the reliability of the display apparatus was improved. Further, in the case ON/OFF of the SW were repeated in a short time (for example in the case of switching the image display apparatus for TV use to a game use), the electrostatic elimination driving could be carried out by the method of this example.

EXAMPLE 2

The second example to which the 29th Configuration is applied will be described below. This example enables the electrostatic elimination driving during image display. Since the configuration of the image display circuits and the control circuits of the image display are all same as those of the above described second example, description of them is omitted. In the control method of this example, the duration Ta for carrying out electrostatic elimination driving is set by a timer circuit in the case the value of Ie detected by the anode electric current detection circuit 16007 exceeds a set value of Ie. From the starting of the signal of the set Ta, high voltage control signals of Va=0 are outputted once for several frames while being synchronized with the horizontally synchronizing signals to carry out electrostatic elimination. Its timing chart is illustrated in the FIG. 155. The driving will practically be described in reference with the figure.

At first, anode current Ie is constantly taken in the controller circuit 16011 from the anode current detection circuit 16007. A comparator circuit is employed in the controller circuit 16011 as same as that in the above described first example of the present configuration and in the case the detected value of Ie is a set value or higher, the signal for it is sent to the timer circuit 16015 through the controller circuit 16011 from the comparator circuit. On detection of the input signal, the timer circuit 16015 outputs a timer signal Ta. A Ta outputting method is same as that of the above described first example of the present configuration. When the timer signal Ta is outputted, the controller circuit 16011 detects the alteration of the signal (alteration from L level to H level) and outputs a signal of Va=0 while synchronizing with the horizontally synchronizing signals. Since image signals are outputted at 60 Hz frequency in the case the image signals are NTSC signals, the above mentioned counter setting is so done as to output signals Va=0 V to the high voltage power source 16008 once for 2 field (1 frame) by the counter which counts the horizontally synchronizing signals and by a synchronizing circuit which synchronizes the signals of Ta and the horizontally synchronizing signals in this example.

Consequently, the high voltage power source 16008 is so controlled as to keep Va=0 V for about 16 msec and the duration of electrostatic elimination driving during which only device driving is carried out exists once for 1 frame. By carrying out such control described above, electrostatic elimination driving for the display apparatus can be performed even during image display. Additionally, regarding the setting of the electrostatic elimination driving, the setting can be changed by changing the set value of the counter which counts the horizontally synchronizing signals. In the case flicker effect or the like of the frequency of the electrostatic elimination driving set in this example affects the display of images, the cycle of the electrostatic elimination driving can be prolonged by increasing the set value of the counter. In that case, the set duration of Ta is better to be prolonged. Further, also in this example, it is made possible to release electrostatic elimination driving in the case the value of Ie is detected and found that the detected value of Ie is a set Ie value or lower within the duration of Ta. Also, in the case the value of Ie is found to be a set Ie value or higher, electrostatic elimination driving is continuously continued even if the duration of Ta is up. Moreover, as same as the above described first example of the present configuration, another method involving sequential processing by CPU or sequencer or the like installed in the inside of the controller may be employed for electrostatic elimination driving.

The flow chart in the case of sequential processing is illustrated in the FIG. 156. The drive of the sequential processing will be described below in reference with the figure.

At first, anode current Ie is determined in the step S17 and in the case the detected value of Ie is the set Ie value or higher, a timer setting Ta for electrostatic elimination driving is performed in the step S18. Next, after prescribed horizontally synchronizing signals are counted based on the count value previously set from the horizontally synchronizing signals in the step S19, electrostatic elimination driving at Va=0 only for the device driving is carried out in the step S 20. The electrostatic elimination driving control is same as the above described control. Then, whether the set duration Ta is up or not is determined in the step S 21. If the set time is up, the anode current Ie is again detected in the step S22 and if the detected current is the set value or lower, the Va is set to be a prescribed voltage in the step S23 and normal image display driving is carried out while the horizontally synchronizing counter being put in disable state. In the case the detected Ie value is the set value or higher and electrostatic elimination driving is required, the electrostatic elimination driving is continuously continued until the Ie value is lowered to the set value or lower.

As described above, this example enabled the electrostatic elimination driving to be carried out even during image display and just like the above described first example of the present configuration, surface potential increase, which is one factor for break down discharge in vacuum, could be prevented and the reliability of the display apparatus was improved.

(30th Configuration)

Description regarding the split driving of an image display screen will be given below in reference with examples.

EXAMPLE 1

The FIG. 158 is the perspective view of a display panel employed for this example and a part of the panel is cut out in order to illustrate the inner structure. In the figure, the reference number 1005 denotes a rear plate, the reference number 1006 denotes side walls (a supporting frame), the reference number 1007 denotes a face plate, and the rear plate 1005, the side walls 1006, and the face plate 1007 compose the enclosure(an air-tight container) for keeping the inside of the display panel vacuum.

A fluorescent material film 1008 and a metal backing 1009 are formed on the face plate 1007. A substrate 1001 is fixed in the rear plate 1005 and on the substrate 1001, cold cathode devices 1002 in number of N×M are formed. The surface conduction type emission devices in number of N×M are arranged in simple matrix wiring of row-direction wiring wires 1003 in number of M and column-direction wiring wires 1004 in number of N electrically divided into two sections.

Next, the method for producing a multiple electron beam source employed for the above described display panel will be described.

As long as the multiple electron source to be employed for the image display apparatus of this example is an electron source in which surface conduction type emission devices are so arranged as to be connected through simple matrix wiring, any material or shape of the surface conduction type emission devices and any production method of the devices can be employed. However, inventors of the present invention have found that it is easy to produce the emission devices having electron emission parts or their peripheral parts produced from a fine particle film and that such emission devices are excellent in electron emission properties. For that, it can be said that such emission devices are most suitable to be employed for the multiple electron beam source of the image display apparatus with a wide screen and high luminance. In this example, surface conduction type emission devices having electron emission parts or their peripheral parts produced from a fine particle film were therefore employed for above described display panel.

One example of production methods of the multiple electron beam source of this example will be described below in reference with the FIG. 159. The FIGS. 159a to 159e are process figures illustrating a series of the procedure of producing the multiple electron beam source. The magnified figure of a part of an electron source is diagrammatically illustrated in the figure.

At first, a large number of pairs of device electrodes 2301, 2302 are formed by forming a conductive thin film of a metal material on a well washed substrate 2309 and finely patterning the thin film by a photolithographic method. Examples of the materials for the substrate 2309 include quartz glass, glass with suppressed contents of impurities such as Na, soda lime glass, a glass substrate produced by forming a $SiO_2$ film on a soda lime glass by a sputtering method or a CVD method, and ceramics such as alumina. Formation methods of the electrodes 2301, 2302 may be selected from methods involving a process of forming the film by a vacuum system of such as a vacuum vapor deposition method, a sputtering method, a plasma CVD method, or the like and then a process of patterning the film by a lithographic method followed by etching and an off-set printing method using a glass concave plate and an organometal-containing MO paste. Any conductive material can be used may be used as the material for the device electrodes 2301, 2302 and, for example, the following are examples; metals or alloys of such as Ni, Cr, Au, Mo, W, Pt, Ti, Al, Cu, Pd, and so on; printed conductors constituted of glass, and metals or metal oxides of such as Pd, Ag, Au, $RuO_2$, Pd—Ag; semiconductor materials such as polysilicon; and transparent conductors such as $In_2O_3$—$SnO_2$. In this example, a soda lime glass was employed for the substrate 2309 and a Ni thin film was employed for the device electrodes 2301, 2302. The thickness of the device electrodes was controlled to be 1000 [Å] and the gap between the electrodes was controlled to be 2 [$\mu$m] (in the FIG. 159a).

Figure 159A:
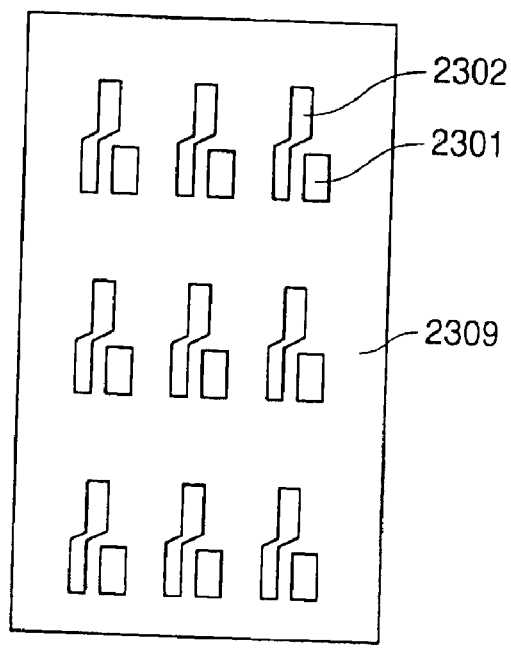
Figure 159B:
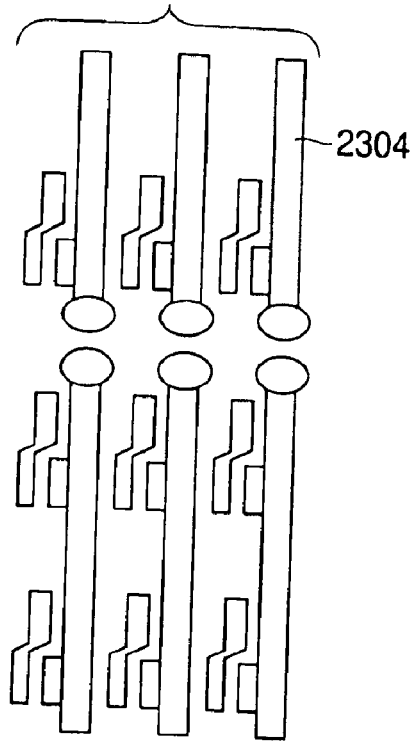

Next, a conductive paste is patterned by printing to form the column-direction wiring 2304. At that time, the column-direction wiring 2304 is so formed as to be connected with the device electrodes 2301. The wiring is advantageous to be thick since the electric resistance can be lowered. For that, a thick film printing method, especially a screen printing method, is preferable to be employed and a conductive paste of silver, gold, copper, nickel or the like can be used. The FIG. 159b illustrates that a column-direction wiring wire is disconnected in the center part of an electron source and electrically divided into two sections. The edges of the column-direction wiring wire at the disconnected point is formed to be circular by patterning as illustrated in the figure. By forming in such a manner, the potential distribution is prevented from becoming sharp in the edge parts of the disconnected part by high voltage applied to the metal backing, so that occurrence of electric discharge to the metal backing from the disconnected part of the wiring wire can be avoided. Additionally, in the case further precise patterning is required, an excellent wiring wire shape can be formed by forming a rough pattern using a photosensitive paste by a screen printing and then carrying out exposure and development. After the formation of a desired pattern, firing at a temperature (400 to 650° C.) corresponding to the thermal properties of the used paste and used glass substrate is carried out in order to remove the vehicle components from the paste (the FIG. 159b).

Figure 159C:
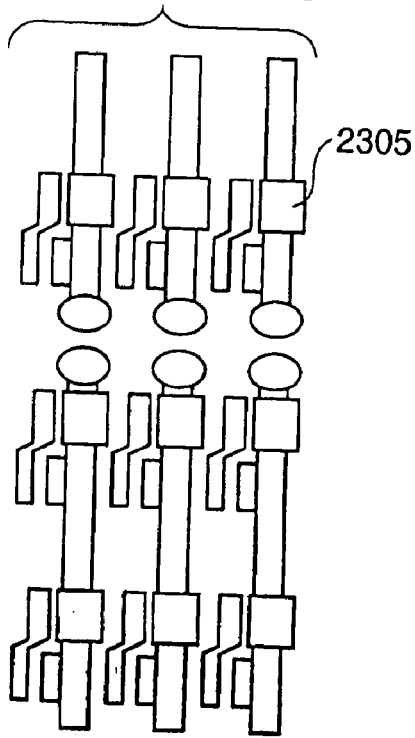

Then, interlayer insulating films 2305 are formed in the crossing parts of the row-direction wiring wires and the column-direction wiring wires. The interlayer insulating films 2305 are produced from a mixture of components properly selected from; for example, glass substances mainly containing lead oxide, PbO, Pb, $B_2O_3$, ZnO, $Al_2O_3$, $SiO_2$, and the likes. The thickness is not specifically restricted as long as insulation property is surely retained, and normally it is 10 to 100 $\mu$m and preferably 20 to 50 $\mu$m. The interlayer insulating films are formed by applying a paste produced by mixing frit glass mainly containing lead oxide, a proper polymer such as ethyl cellulose, and a vehicle selected from organic solvents to prescribed positions by a screen printing method and then firing the paste. Since it is required for the interlayer insulating films only to cover the crossing points of the column-direction wiring wires and the row-direction wiring wires, the shapes of the films are not limited to the illustrated ones and may properly be selected (FIG. 159c)

Figure 159D:
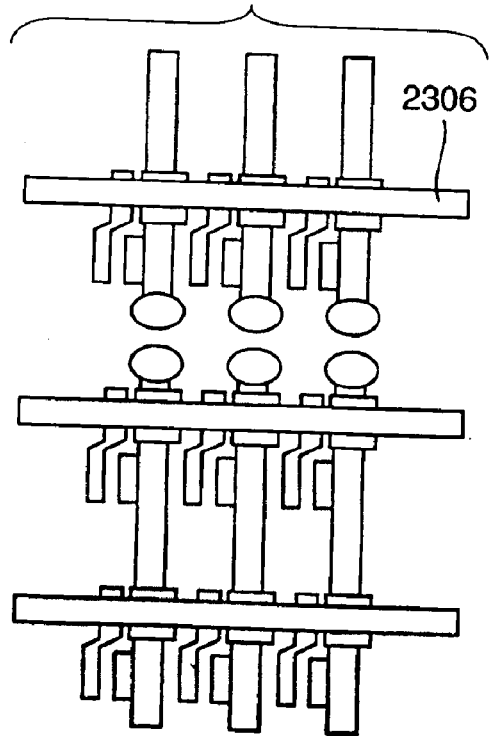
Figure 159E:
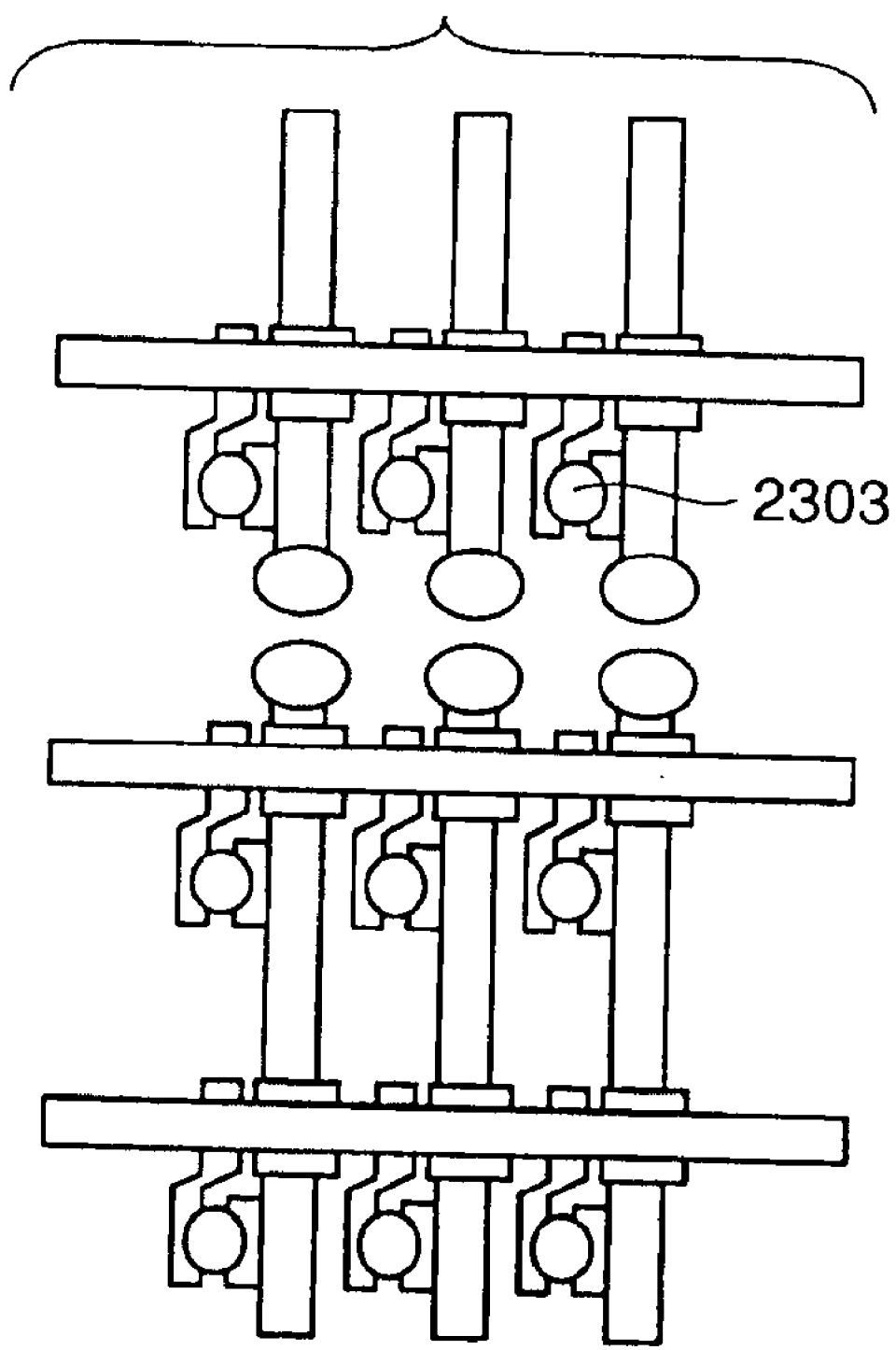

The row-direction wiring 2306 is formed on the interlayer insulating film. Since the wiring is advantageous to have a lowered electric resistance, the thick film printing method capable of thickening the film thickness is preferable to be employed. Therefore, as same as the column-direction wiring formation, wiring is carried out by forming wiring wires using a conductive paste by screen printing and then firing the paste. At that time, the respective wiring wires are so formed as to be connected with the device electrodes 2302 (FIG. 159d). Finally, the conductive thin film 2303 of the surface conduction type electron emission devices is formed (FIG. 159e).

The following is detailed description of a driving method of the multiple electron beam source.

In this case, the description in details will be of a driving method for image formation by so-called screen split driving method wherein groups of surface conduction type electron emission devices are divided into upper and lower sections in the column direction and line scanning is carried out simultaneously in both sections to form images.

The FIG. 160 is a block figure illustrating the configuration example of the driving circuit for driving the display panel. In the figure, the image data 17000 to be displayed is generated from, for example, TV signals such as NTSC signals or generated in a personal computer, inputted, and housed in the image memory 17109. To simplify the description, the image memory 17109 is set to be VRAM, a common dual port RAM type, and enabled to read the housed content even during the development of images by CPU which is not shown in the figure. Also to control the driving of the devices in the upper half section of the display panel 17108, a line memory 17105a, a modulation signal generator 17107a, and a scanning circuit 17102a are installed and to control the driving of the devices in the lower half section, a line memory 17105b, a modulation signal generator 17107b, and a scanning circuit 17102b are installed.

The control circuit 17103 generates address signals to take image data of every one line out of the image memory 17109 for the upper screen and the lower screen in this order and at the same time outputs read signals to the image memory 17109 and outputs reciprocally writing signals to the line memories 17105*a*, 17105*b*. Since the connection of the image memory 17109 to the respective line memories 17105*a*, 17105*b* is made in common, it is required to carry out writing reciprocally to the line memories 17105*a*, 17105*b*. The control circuit 17103 outputs memory load timing signals Tmry-a and Tmry-b when the respective data of every one line is housed in the respective line memories 17105*a*, 17105*b* and then reads out the data of the next line.

The modulation signal generator 17107*a* outputs driving signals corresponding to the data housed in the line memory 17105*a* to the column-direction wiring terminals Dy1 to Dyn and the scanning circuit 17102*a* outputs driving signals to the row wires on which display is to be done among the row-direction wiring wires connected to the terminal Dx1 to Dx(m/2) based on the Tscan-a signals sent from the control circuit 17103. Simultaneously, the modulation signal generator 17107*b* outputs driving signals corresponding to the data housed in the line memory 17105*b* to the column-direction wiring terminals Dz1 to Dzn and the scanning circuit 17102*b* outputs driving signals to the row wires on which display is to be done among the row-direction wiring wires connected to the terminal Dx((m/2)+1)) to Dxm based on the Tscan-b signals sent from the control circuit 17103. That is, images are displayed while two lines of the display panel 17108 are simultaneously being driven under control.

In such a manner, the display panel 17108 is driven under control by the screen split driving method, so that light emission can simultaneously be carried out on two lines of the display panel 17108 and the scanning frequency of the line can be lowered to ½ and thus the emission duration for every one line can be two-fold to give two-fold luminance.

As described above, by employing the multiple electron beam source and dividing the column-direction wiring wires of this example, image display with high luminance and high quality could be carried out without causing unnecessary electron emission.

EXAMPLE 2

This example described below is also an application example using employing the multiple electron beam source of which the column-direction wiring wires are divided into two sections. Since this example differs from the above described first example of the present configuration in the disconnection part of the column-direction wiring, only the points different from those of the first example will be described below.

The following is the description of one example of the multiple electron beam source production method of the present example in reference with the FIG. 161. The FIGS. 161*a* to 161E are process charts illustrating a series of procedure of producing the multiple electron beam source. In the FIG. 161, a magnified figure of a part of the electron source is diagrammatically illustrated.

The FIG. 161*a* illustrates the electron source at the time when the device electrodes 2301, 2302 and the column-direction wiring wires 2304' are formed. The device electrodes 2301, 2302 are formed from the same material and have the same structure as described for the foregoing first example of the present configuration. The column-direction wiring wires 2304' are those produced from the same material as described in the first example. The different point from the first example is that no patterning is carried out in the disconnection part. The FIG. 161*b* illustrates the electron source at the time of the interlayer insulating films 2305' are formed in the crossing points of the column-direction wiring and the row-direction wiring. The different point from the first example is that the interlayer insulating films 2305' are so formed as to cover the disconnection part of the column-direction wiring 2304'. By forming such a manner, the edges of the disconnection part are prevented from being electrically exposed to the high voltage of the face plate. In other words, electric discharge to the face plate from the disconnection part owing to the electric field concentration upon the edge parts of the disconnection part can be prevented. Further, it is another advantageous point that the shape patterning can be eliminated in such a disconnection part of the column-direction wiring of this example.

Moreover, since the disconnection part is formed in the wire crossing parts, arrangement on the matrix wiring can be simplified and the wiring density to satisfy the demand of heightening image quality can easily be increased.

The material and the formation method of the interlayer insulating films 2305' are same as those of the first example. The FIG. 161*c* illustrates the row-direction wiring 2306' formed in the interlayer insulating films 2305'. The material and the formation method of the column-direction wiring are also same as those of the first example.

Same methods and processes of the foregoing first example were employed for the formation method of the conductive thin film of the surface conduction type emission devices, electrification forming process, activation process, the driving method of the multiple electron beam source, and the likes.

As described above, by driving the image display apparatus in the same manner as the first example using a multiple electron beam source, in which column-direction wiring is split, of this invention, image display with high luminance and high quality could be carried out without causing unnecessary electron emission.

(31st Configuration)

The following are the configurations as the connection configuration of the mounting part and the lead wires.

EXAMPLE 1

The FIG. 162*a* is a perspective view illustrating the wiring connection structure of the first example to which the 31th configuration is applied and the FIG. 162*b* is the cross-section figure. The reference number 2321 denotes an electron source substrate on which a multiple electron beam source is formed, the reference number 2322 denotes a substrate for display provided with fluorescent materials emitting light rays by electron beam radiation, the reference number 2323 denotes a cable connecting the wiring part of the electron source substrate 2321 and the driving electric power source, and the reference number 2324 denotes the driving power source. The length of the flat cable in the row-direction wiring side and the length of the flat cable in the column-direction wiring side were controlled to be about 100 mm and 50 mm, respectively, in this example and the induction components of the respective cables were controlled to be about 100 nH and 50 nH, respectively.

The capacity component of wire crossing parts of the multiple electron beam source was measured by a LCR meter and found to be 0.04 pF for every crossing part and 154 pF (=c) in the case of n=3072. The FIG. 163 is an equivalent circuit figure of the multiple electron beam source of the display panel. In the FIG. 163, the reference number 25002 denotes an electric power source for supplying the pulsed signal Vs to the row-direction wiring wires 25004 and the reference number 25003 denotes an electric power source for supplying the pulsed signal Ve to the column-direction wiring wires 25005. Devices 25009 exist in respective crossing points of the row-direction wiring wires 25004 and the column-direction wiring wires 25005 and respectively have capacitor Cm and inductance Lm for respective crossing points. The reference character Lr denotes the induction component of the connection cable parts of the lead parts of the row wires and the electric power source 25002 and the reference character Lc denotes the induction component of the connection cable parts of the lead parts of the column wires and the electric power source 25003. In this example, the induction component Lr was composed of about 30 nH induction component in a lead electrode part of about 30 mm and about 100 nH induction component in the flat cable (about 100 mm) connecting a driving electrode and a lead electrode part. The induction component Lr was thus estimated to be 130 nH. The induction component in the matrix part (induction components Lm×n of wires connecting the devices) was about 280 nH. The induction component Lc of the connection parts of the column wire lead parts and the electric power source was composed of about 30 nH induction component in an about 30 mm electrode lead part and about 50 nH induction component in the flat cable (about 50 mm) connecting a driving power source and a lead electrode part. Lc/n was thus estimated to be 0.08 nH. Accordingly, L=130+280+0.08=410.08 nH, C=154 pF and the panel characteristic frequency was calculated to be 22 MHz.

On the other hand, the rise time of Vs and Ve illustrated in the FIG. 163 was measured and found to be about 60 nsec and 80 nsec, respectively, and the highest frequency component was found to be about 17 MHz. Consequently, the resonance frequency could be heightened more than the highest frequency of the driving signals, so that occurrence of ringing could sufficiently be suppressed. The foregoing description is of the electron emission driving state of a large number of electron emission devices in the case of line-selection driving.

In the case a specified image was displayed, in other words, in the case only a few devices of selected rows were in electron emission state, the number denoted as n in the expression L became small, so that Lc component could sometimes not be neglected. At the maximum, Lc/n component was 80 nH (the induction component of one column-direction wiring) and the resonance frequency was computed to be 18.3 MHz. In this case also, the resonance frequency could be heightened more than the highest frequency of the driving signals, so that occurrence of ringing could sufficiently be suppressed.

In this example, flat cables were employed for the connection parts of the row- and column wiring terminal parts and the driving electric power sources, however no restriction is imposed and tabs and flexible wires may be employed.

EXAMPLE 2

In this example, an example employing an electron source substrate whose matrix wiring part is divided into two groups will be described. The surface conduction type electron emission devices in number of N×M are divided into two groups and each group is connected in the form of a simple matrix through row-direction wiring wires in number of M/2 and row direction wiring wires in number of n. The FIG. 164 is a perspective view of a display panel of this example. The same reference characters and numbers are assigned to the same constituent parts as those of the foregoing FIG. 158. Since the respective constituent parts are as described in the FIG. 158, description of them is omitted in this case.

The length of the flat cable of the row-direction wiring and the length of the flat cable of the column-direction wiring were controlled to be about 100 mm and 50 mm, respectively, in this example. The induction components of the respective cables were controlled to be about 100 nH and 50 nH, respectively. In this case, the capacity component of wire crossing parts of the multiple electron beam source was measured by a LCR meter and found to be 0.04 pF for every crossing part and 154 pF (=c) in the case of n=3072. As illustrated in the FIG. 163, the induction component Lr of the connection cable parts of the lead parts of the row wiring and the electric power source 25002 was composed of about 30 nH induction component in a lead electrode part of about 30 mm and about 100 nH induction component in the flat cable (about 100 mm) connecting a driving electrode and a lead electrode part. The induction component Lr was thus estimated to be 130 nH. The induction component (induction components Lm×n of the wiring connecting devices) in the matrix part was about 280 nH. The induction component Lc of the connection cable parts of the lead parts of the column wires and the electric power source 25003 was composed of about 30 nH induction component in an about 30 mm electrode lead part and about 50 nH induction component in the flat cable (about 50 mm) connecting a driving source and a lead electrode part. Lc/n was thus estimated to be 0.08 nH. Accordingly, L=130+280+0.08=410.08 nH, C=154 pF and the panel characteristic frequency was calculated to be 22 MHz.

On the other hand, the rise time of Vs and Ve illustrated in the FIG. 163 was measured and found to be about 60 nsec and 80 nsec, respectively, and the highest frequency component was found to be about 17 MHz. Consequently, the resonance frequency could be heightened more than the highest frequency of the driving signals, so that occurrence of ringing could sufficiently be suppressed. The foregoing description is of the electron emission driving state of a large number of electron emission devices in the case of row-selection driving.

In the case a specified image was displayed, in other words, in the case only a few devices of selected rows were in electron emission state, the number denoted as n in the expression L became small, so that Lc component could sometimes not be neglected. At the maximum, Lc/n component was 80 nH (the induction component of one column-direction wiring) and the resonance frequency was computed to be 18.3 MHz. In this case also, the resonance frequency could be heightened more than the highest frequency of the driving signals, so that occurrence of ringing could sufficiently be suppressed.

In this example, flat cables were employed for the connection parts of the row- and column wiring terminal parts and the driving electric power sources, however no restriction is imposed and tabs and flexible wires may be employed.

Accordingly, this configuration is effective even in the case the matrix is split in just like the foregoing manner.

(32nd Configuration)

The following configuration can be employed for arrangement of the respective parts of an image display apparatus.

EXAMPLE 1

An image display apparatus of this example to which the 32nd configuration is applied will be described in reference with the FIG. 165. The FIG. 165 is a diagrammatically illustrated cross-section figure of the image display apparatus.

The image display apparatus is constituted by housing a display panel 4100 in an outer casing 4115. The display panel 4100 is constituted by installing a face plate 4107 on which fluorescent materials are arranged and a rear plate 4105 on which electron emission devices are arranged on the opposite to each other. The reference number 4101 denotes an air outlet for ventilating the warmed air in the panel to the outside by spontaneous convection and 4102 denotes an air inlet. The reference number 4103 is a front plate made of a transparent resin and installed as to protect and prevent the face plate 4107 from damages. The front plate 4103 may additionally be provided with a function of improving the contrast by inserting an optical filter. The reference number 4104 denotes a driving circuit part for electrically driving the display panel 4100 and electrically connected to lead wires of the display panel through flexible wiring (not shown in the figure).

The temperature control of the face plate 4107 and the rear plate 4105 composing the display panel 4100 of this example will be described below in reference with the FIG. 165 and the FIG. 166.

At first, electron beam emitted out of an electron source of the rear plate 4105 is accelerated by high voltage (anode voltage: Va) applied to the metal backing on the face plate 4107 and comes into collision against fluorescent materials formed on the face plate 4107. Though a part of fluorescent materials emit light owing to the collision, the collision of electron beam mostly generates heat. The quantity of the heat generation depends on the types of the images, however, the time series average can be supposed to be almost constant and it is set to be Qf (W/m$^2$) per unit surface area. On the other hand, the electric current turns back to the driving circuit 4104 through the matrix wiring in the rear plate 4105 and during that time, heat is generated in the wires, device electrodes, and the electron emitting parts on the rear plate. As same in the face plate, the quantity of the heat generation is supposed to be almost constant in terms of the time series average and set to be Qr (W/m$^2$)

In the driving circuit part 4104, electric current is applied to drive the electron source of the rear plate 4105. To apply the electric current, inner loss is caused in the driving circuit and it becomes heat generation source. In respect of that too, the heat generation quantity is supposed to be almost constant in terms of the time series average and set to be Qd (W/m$^2$). The relations of those values is illustrated in the diagrammatically illustrated circuit figure in the FIG. 166. In this example, Qf=100 (W/m$^2$), Qr=20 (W/m$^2$), and Qd=40 (W/m$^2$) and in this case, by setting d=5 mm, the temperature of the face plate 4107 and of the rear plate 4105 was found to be almost same (about 40° C. at the time when the ambient temperature was 20° C.). That is, since the face plate 4107 and the rear plate 4105 respectively have mutually different heat generation quantities, it is clear that these plates respectively have different temperature if the temperature is determined based only on those relations, however by positioning the driving circuit part 4104, which is another heat generation source at position satisfying d=5 mm, especially the temperature of the rear plate 4105 is supposed to be affected (more specifically is increased) to make the temperature of the face plate 4107 and the rear plate 4105 same. Consequently, the difference of the thermal expansion of both plates was lessened and the thermal stress was suppressed and no image torsion and color shift was practically caused. Since no movable part, such as a fan, exists in such configuration of this example, the image display apparatus is suitable for a display for household use and a display of a computer which are required to be calm.

EXAMPLE 2

The configuration including the outer casing of this example is the same as the foregoing first example of the present configuration. The different point of this example is that the device current (If, Ie) is made possible to be increased by elongating the device length in order to maintain the same luminance under the decreased Va in relation to the design of the display panel. In the case of this example, Qf=100 (W/m$^2$), Qr=80 (W/m$^2$), and Qd=40 (W/m$^2$) and in this case, by setting d=30 mm, the temperature of the face plate 4107 and the rear plate 4105 was found to be almost same (about 40° C. at the time when the ambient temperature was 20° C.). Like that, in the case of a display panel employing surface conduction type electron emission devices, the ratio of the heat generation quantity of the face plate and the heat generation quantity of the rear plate is changed by altering the design value of the panel. Accordingly, just like the case of the foregoing first example, the difference of the thermal expansion of both plates could be lessened and the thermal stress could be suppressed and no image torsion and color shift was practically caused.

EXAMPLE 3

The configuration of this example is illustrated in the FIG. 167. In the FIG. 167, the different point from that of the foregoing first example of the present configuration (refer to the FIG. 165) is that fans 4301, 4302 for forcible convection generation are installed in the air ports 4101, 4102 formed in the outer casing 4115. The fan 4301 is a fan for taking air out and so made as to generate axial flow in the upper direction of the figure. On the other hand, the fan 302 is a fan for taking air in and so made as to generate axial flow same in the upper direction of the figure. By these two fans, flow rate of average 0.9 m/s to the cross-section surface area in the outer casing was obtained.

The respective heat generation quantities were Qf=100 (W/m$^2$), Qr=20 (W/m$^2$), and Qd=40 (W/m$^2$) and in this case, by setting d=10 mm, the temperature of the face plate 4107 and the rear plate 4105 was found to be same (about 30° C. at the time when the ambient temperature was 20° C.). The reason for that was supposedly attributed to that the temperature of the face plate was considerably lowered by the forcible convection and that the arrangement of the driving circuit part 4104 is made so as to suppress the effect of the generated heat thereof on the rear plate 4105.

Accordingly, in this example just like the case of the foregoing first example, the difference of the thermal expansion of both plates could be lessened and the thermal stress could be suppressed and no image torsion and color shift was practically caused. Since such configuration of this example is capable of suppressing the panel temperature increase even in the environments where the ambient temperature is increased, the display apparatus with the configuration is suitable to be used in places such as plants and outdoors where the outer air can not be shut out.

EXAMPLE 4

The configuration of this example is illustrated in the FIG. 168. In the FIG. 168, the different point from that of the foregoing example 1 of the present configuration (refer to the FIG. 167) is that a dust-proof filter 4401 is installed in the air port in the outer casing 4115.

In this example, the respective heat generation quantities were same as those of the foregoing example 1 of the present configuration; Qf=100 (Wm$^2$), Qr=20 (W/m$^2$), and Qd=40 (W/m$^2$). Owing to the installation of the filter, the conductance was deteriorated and the average flow rate was decreased to about 0.45 m/s, about a half of that of the example 3. In this case, by setting d=7.5 mm, the temperature of the face plate 4107 and the rear plate 4105 was found to be almost the same (about 35° C. at the time when the ambient temperature was 20° C.). Accordingly, as same as the foregoing the first example, the difference of the thermal expansion of both plates could be lessened and the thermal stress could be suppressed and no image torsion and color shift was practically caused.

Since such configuration of this example is capable of blocking dust by the filter even in the environments more or less containing dust, the display apparatus is suitable to be used in places similar to outdoors.

Besides the above described examples, displays of various types of designs were actually produced and thermal simulation based on the actually measured data was carried out to examine the arrangement of the driving circuit part 4104 as to eliminate the temperature difference of the face plate 4107 and the rear plate 4105 and it was found that the temperature difference was almost eliminated by arrangement at the d value within 5 to 30 mm in an image forming apparatus with the screen surface area of 30 to 100 inch.

(33rd Configuration)

One embodiment of driving of an apparatus related to the present invention will be described below.

A block figure of a driving circuit of a SED panel is illustrated in the FIG. 169. The reference number H100 denotes a display panel wherein a plurality of electron emission devices are matrix wired by row wiring and column wiring and the electron beam emitted from the electron emission devices is accelerated by high voltage applied from a high voltage electric power source H103 and radiated to the fluorescent materials, which are not shown in the figure, to give light emission. The not-shown fluorescent materials may be arranged in various color arrangements corresponding to the use purposes and color arrangement in three-color vertical stripes of red, green, and blue colors (hereafter referred to RGB) is employed in this case.

In this example, the configuration of displaying video signal inputs is illustrated and the same configuration can deal with not only the video signals but also various types of image signals, for example, output signals of a computer.

The reference number H104 denotes a decoder part for receiving the video signal inputs modulated in TV manner and separating the synchronizing signals superposed on the video signal inputs and outputting them. In the case of dealing with various types of TV manners, it is proper to install decoders exclusive for the object TV manners.

The reference number H105 denotes the scanning conversion part for adjusting the scanning signals corresponding to the number of the effective scanning lines of the video signal inputs and the number of the scanning lines of the display panel H100 and generating effective scanning signals in the same number of that of the scanning lines of the display panel H100. For example, in the case the input signals are video signals in NTSC manner and the number of lines of the display panel is 480, the scanning conversion part H105 outputs 480 effective scanning lines of 1 field=1 frame as to enable line-sequential driving in a non-interlaced way, from the NTSC signals which has about 240 effective scanning beam lines for one field and produces one frame from 2 fields.

In this example, at the time of converting the interlace signals to the progressive signals in the scanning conversion part, an interlace progressive conversion (IP conversion) circuit with configuration of converting the frame rate is employed.

In this example, in the case the input signals are interlace signals, the conversion to the progressive signals is carried out using such a circuit. The actual configuration for the IP conversion is illustrated in the FIG. 178. In this example, both of inter-field interpolation and inner field interpolation are employed for generation of the scanning interpolating signals at the time of conversion of the interlace signals to the progressive signals. In the FIG. 178, the reference number 17801 is a signal movement detection part. At the time when the movement of image signals is wide, it is preferable to carry out inner field interpolation and at the time when the movement of the image signals is narrow, it is preferable to carry out inter-field interpolation, so that the movement of the image signals is detected by the movement detection part 17801 to determine the ratio of the blending the inter-field interpolating signals and the inner field interpolating signals. The reference number 17807 is an interfield interpolation circuit, which is a circuit to determine scanning signals in the intervals of every the other scanning signals based on the scanning signals of a prior field, for example, of a field immediate before. More practically, the circuit employs signals of relevant scanning of the field immediate before as the scanning signals in the intervals of every the other scanning signals. The reference number 17802 denotes a delay circuit for delaying and outputting the image signals to carry out inter-field interpolation. The reference number 17803 denotes an interpolation circuit, which is a circuit for generating the scanning signals for interpolation from signals of the delayed prior field sent from a delay circuit 17802. The reference number 17808 denotes an inner field interpolation circuit, which is a circuit for generating the scanning signals in the intervals of every the other scanning signals by blending computation of a plurality of other scanning signals, for example, of the foregoing every the other scanning signals. The reference number 17804 denotes a delay circuit for delaying and outputting the image signals to carry out inner field interpolation. The reference number 17805 is an interpolation circuit for producing the scanning signals for interpolation by blending the prior scanning signals outputted from the delay circuit 17804 and scanning with different delayed degrees, for example, scanning signals which are inputted without being delayed. The reference number 17806 is a blending circuit for determining the blending ratio of interpolation signals from the interpolation circuit 17803 and the interpolation circuit 17805 based on the signals from the movement detection circuit 17801 and outputting the progressive signals. At the time of carrying out the conversion, the signals may be digital signals and a memory may be employed for the delay circuit. Further, the configuration of the IP conversion is not limited to a hardware configuration but may be performed by a software using a computation circuit. Also, only either of the inter-field interpolation and the inner field interpolation may be carried out.

In this example, the scanning conversion part H105 includes a matrix circuit to convert the decoded signals into RGB primary color signals, which are fluorescent material-emitting colors.

The luminance data sampling part H106 receives RGB primary color signals from the scanning conversion part H105 and carries out sampling of luminance data in the same number as that of pixels in every one line of the display panel H100 for RGB parallel 3-systems for every scanning line. In this example, since the color arrangement of the fluorescent materials is made to be RGB vertical stripes, the number of the pixels for every one line of the display panel H100 is ⅓ of the column-direction wires.

The gamma conversion part H107 is correction means of gradation properties installed in the RGB parallel 3-systems and turns the non-linearity (gamma correction of CRT) which the video signal inputs previously have back to linear property or corrects the non-linearity of the luminance modulation signals generated by the column-direction wiring modulation part and the luminescence quantity of the display panel H100. In the case the same correction degree is sufficient for the RGB 3-systems, it is not necessarily required to install the part in 3-systems and correction may be carried out for signals of 1 system, for example, luminance data to the column wire modulation part H101 which will be described later.

The primary data re-arrangement part H108 re-arranges luminance data of respective RGB 3-primary colors sent from the gamma conversion part H107 in color arrangement order of the fluorescent materials of the display panel H100 and outputs the data as luminance data of 1-system to the column wire modulation part H101. For the luminance data output to the column wire modulation part H101, ON/OFF control to determine whether the output is performed or not is carried out based on the control signals EN0 from the system control part H111.

In order to display the image signals, in this example, the display panel H100 is driven by line-sequential scanning driving. That is, the luminance data is transferred to shift resistor means constituted of resistors in the same number as that of the column wiring wires, which the column wire modulation part H101 comprises, during one scanning period of the image signals (it means the scanning period after conversion of the signals in the same number as that of the lines of the display panel H100 by the foregoing scanning conversion part and, hereafter, named as horizontal one cycle) and reads out the luminance data from the shift resistor by the column wire drivers installed in respective column wires before transfer of the luminance data of the next horizontal one cycle is started and applies the driving intensity corresponding to the luminance data to the respective column wiring wires simultaneously with all of the column wiring wires in the next horizontal one cycle.

By the shift resistor means, so-called serial-parallel conversion to transmit serial luminance data to respective column wire drivers in parallel is carried out.

Loading the luminance data in the shift resistor is carried out by a shift clock TM1 from the timing generation part H110 and loading the data to the column wire driver part and the control of the output timing to the column wiring wires are carried out by trigger signals TM2 set in the phase avoiding to the luminance data transferring timing to the shift resistor. Also, upon reception of the horizontal cycle clock TM3 and the scanning starting trigger TM4 from the timing generation part H110, the row wire scanning part H102 successively supplies the selective voltage pulses almost equivalent to the horizontal one cycle to row wires one by one. That can be performed by installing, for example, 1 bit shift resistors in the same number of that of the row wiring wires.

The timing generation part H110 generates driving timing signals for the row wire scanning part H102 and the column wire modulation part H101 and, other than that, generates timing signals necessary to operate the scanning conversion part H105 and luminance data sampling part H106, which are not shown in the figure. By the synchronizing signals from the video decoder part H104, various types of timing signals synchronized with the input video signals can be generated.

Since electron emitting devices of the line to which the row wire selective voltage pulses are applied emit electron beam corresponding to the driving intensity applied from the column wires, excellent image display is made possible by setting the scanning starting trigger TM4 as to conform the luminance data of one horizontal cycle to be inputted to the column wire modulation part H101 to the phase of the row wire selective voltage pulses.

The following four means may be performed as the method for applying the driving intensity to each column wire corresponding to the luminance data.

(1) to carry out pulse width (application duration) modulation of constant voltage corresponding to the luminance data.

(2) to carry out pulse width (application duration) modulation of constant current corresponding to the luminance data.

(3) to carry out amplitude modulation of voltage source output corresponding to the luminance data.

(4) to carry out amplitude modulation of current source output corresponding to the luminance data.

The following is description of these 4 means.

The method (1) employs a voltage power source means to apply column wire driving potential to respective column wires and a pulse width modulation means (hereafter referred to PWM means) to change the duration of the time of applying the driving potential corresponding to the luminance data for respective column wires.

The PWM means comprises, for example, a down-counter and counts to the extent of the luminance data read from the shift resistor means by a count clock whose one cycle is determined by dividing the duration of approximately one horizontal cycle or shorter by the number of desired gradations and outputs the pulses from the starting count to the finishing count, so that the method (1) can be performed.

The driving intensity corresponding to the luminance data can be applied to the respective column wires by connecting the voltage source to the column wires during the intervals of output pulses from the PWM means and earthing it during the time beside the intervals.

By using SW means which switches ON/OFF application of the d.c. potential for constituting the voltage source, the driving driver part can be materialized with a simple circuit and therefore, an economical driving circuit can be provided.

The method (2) is carried out by replacing the voltage source means for the respective column wires for the method (1) with a current source means and the driving intensity corresponding to the luminance data can be applied to the respective column wires by connecting the current source to the column wires during the intervals of output pulses from the PWM means and earthing it during the time beside the intervals.

This method is effective in the case the display panel H100 is made to have high resolution and to be a wide screen. In the case the display panel H100 is made to have high resolution, the number of electron emission devices is increased and subsequently, in the driving method requiring line-sequential scanning driving, high electric current (the total of driving current of the electron emission devices of one line) flows in row wires at the time of selection. Depending on the resistance value of the row wires, the voltage drop due to the electric current sometimes occurs. That is, in the driving by the voltage power source, the driving voltage to be applied to the electron emitting devices is decreased owing to the effect of the wire voltage drop and consequently the luminance decrease is possibly caused. In the case of driving by the electric current source, even if the wire voltage drop occurs, the driving voltage to be applied to the electron emission devices is not changed and thus this method is provided with an advantage that the luminance does not fluctuate.

In the method (1), the luminance gradation is performed by the PWM means. On the other hand in the method (3) the duration (the pulse width) during which the voltage power source is connected to the column wires is set to be constant in stead of changing the pulse width corresponding to the luminance data, and the output voltage amplitude of the voltage power source is changed corresponding to the luminance data.

As the means for changing the output voltage amplitude, for example, D/A converters are installed in respective column wires and luminance data transmitted to the shift resistor part for every horizontal cycle is transmitted to the D/A converters to be outputted.

In the case of employing the PWM means, the output pulse width is counted by the frequency calculated by dividing approximately one horizontal cycle period by the number of the luminance gradations, however in the case the display panel H100 is made to have a large screen and high resolution and number of lines is increased, one horizontal cycle is shortened and the PWM operation frequency is heightened. Also in the case the number of the gradations is increased in order to improve the image quality, the PWM operation frequency is heightened, too.

On the other hand, in the method involving a process of changing the output voltage amplitude corresponding to the luminance data, the duration of driving the column wires is constant, so that the driving frequency of the column wire modulation part can considerably be lowered.

The method (4) is carried out by replacing the voltage source means for the respective column wires for the method (3) with a current source means and involves a process of changing the output current amplitude of the current source corresponding to the luminance data.

As same as the method (2), the method is effective in the case voltage drop of the row wires is possible to occur.

In the foregoing methods (1) to (4), the relation of the driving intensity corresponding to the respective luminance data and the luminescence quantities of the display panel H100 is possibly changed, the conversion characteristic of the gamma conversion part H107 is required to be changed corresponding to the luminescence characteristics of the respective driving methods.

For example, in the case of PWM modulation, the luminance data and the luminescence quantity have an approximately linear relation and therefore it is proper to provide the gamma conversion part H107 with a conversion characteristic as to cancel the gamma characteristic added to the video signals.

Further, the electron emission devices of the display panel H100 has driving voltage-electron emission quantity characteristic as shown in the FIG. 173 and the driving voltage-luminescence quantity characteristic is almost similar. For that, in the case of the luminance gradation is performed by the voltage amplitude modulation by the method (3), it is proper to provide the gamma conversion part H107 with a conversion characteristic in consideration of such a characteristic.

The characteristic curves illustrated in the FIG. 173 are typical curves of (emission current Ie) vs. (device application voltage Vf) and (device current If) vs. (device application voltage Vf) of the electron emission devices. The emission current Ie is remarkably small as compared with the device current If and since it is difficult to show in the same scale and these characteristics are changed by altering the design parameters such as the size and the shape of the devices, two graphs are illustrated based on respective arbitrary unit.

The devices employed for the display apparatus has the following three characteristics relevant to the emission current Ie.

At first, when a certain voltage (named it as threshold voltage Vth) or higher is applied to an device, emission current Ie sharply increases, whereas when voltage lower than the threshold voltage Vth is applied, emission current Ie is scarcely detected. In other words, the devices are non-linear devices having a clear threshold voltage Vth in terms of emission current Ie.

Secondly, since the emission current Ie changes depending on the voltage Vf applied to the devices, the extent of the emission current Ie can be controlled by the voltage Vf.

Thirdly, since the response speed of the current Ie emitted from the devices in relation to the voltage Vf applied to the device is quick, the charge quantity of the electrons emitted out of the devices can be controlled by duration of the voltage Vf application.

Owing to the above described characteristics, the surface conduction type electron emission devices are preferably employed for the display apparatus. For example, in a display apparatus in which a large number of devices are formed corresponding to the pixels of the display screen, display is enabled by sequential scanning of the display screen by utilizing the first characteristic. That is, voltage not lower than the threshold voltage Vth corresponding to the desired luminescence luminance is properly applied to driving devices, whereas voltage lower than the threshold voltage Vth is applied to devices in non-selected state. By sequentially changing the devices to be driven, display can be carried out by sequential scanning of the display screen. The gradation display can also be carried out by utilizing the second or the third characteristic, based on which the luminescence luminance can be controlled.

Further, besides the driving methods (1) to (4), driving methods employing these methods in combination may also be carried out. For example, for performing gradation display, both of the PWM means and the amplitude modulation means are installed as to partly carry out the gradation display by amplitude modulation to increase the number of the gradations possible to be displayed or to be slower the PWM clock frequency. Or, both of the PWM means and the amplitude modulation means are installed as to carry out the gradation display corresponding to the luminance data and as to carry out brightness adjustment and color adjustment by amplitude modulation. Contrary, the gradation display may be carried out by the amplitude modulation and brightness adjustment and color adjustment by the PWM modulation. Moreover, both of the voltage source output and the current source output are installed and driving may be carried out by the voltage source until the potential determined by the voltage source output voltage and then by the current source. By such a driving method, the temporarily rise up characteristic at the time of driving application can be improved.

This example is further provided with an average luminance level detection part H109 for carrying out automatic brightness control function (hereafter named as ABL). The function is for controlling the average luminance of the display panel not to exceed a certain level in order to suppress the power consumption of the image display apparatus or suppressing the temperature increase of the light emitting face. The average luminance level detection part H109 detects the average luminance level during one frame displayed on the display panel H100 from the luminance data outputs outputted from the gamma conversion part H107 and transmits the detection signals DT5 to a system control part H111. The system control part 111 is a part controlling the system of the panel driving part illustrated in the FIG. 169 and comprises CPU, a reset means for stably raising CPM, ROM programmed with CPU driving regulation programs, an IO means for regulating the respective driving states, for example, controlling ON/OFF control of the outputs of the column wire modulation part H101 with binary values and taking instruction data from the user I/F in the CPU, D/A conversion means for regulating the operating states of respective parts from wide ranges, RAM for saving the data of the D/A conversion means, a back-up memory for saving the data after power source OFF and regenerating the prior state at the time of next power source ON as it was before reading out, and an A/D conversion means for monitoring the ABL and the respective operating states.

In this example, the system control part H111 outputs a control signal CNT1 for varying the respective column wire driving quantities from the column wire modulation part H101 and also outputs EN1, which is an ON/OFF signal for controlling whether the column wire driving output is outputted or not. The column wire modulation part H101 detects the amplitude value of the pulsed voltage generated in the column wires owing to the column wire driving quantities and transmits the detection signal DT1 to the system control part H111.

In this case, the control signal CNT1 alters the output voltage of the voltage source simultaneously to all of the column wires in the case of connecting the column wires to the current source and alters the output current of the current source simultaneously to all of the column wires in the case of connecting the column wires to the current source. Alternatively, not simultaneously to all of the column wires, the alteration may be carried out separately for column wires of R, column wires of G, and column wires of B by system of CNTI for three primary color RGB.

Further, the system control part H111 outputs a control signal CNT2 for varying the respective row wire selective potential from the row wire modulation part H102 and beside that, outputs EN2, which is an ON/OFF signal for controlling whether the row wire selective voltage pulses is outputted or not. The row wire modulation part H102 detects the row wire selective potential and transmits the detection signal DT2 to the system control part H111. In this case, the control signal CNT2 controls the potential to be applied to the row wires at the time of selection and the potential to the row wires is made controllable also at non-selection time by installation of 2 systems for generating CNT2.

Furthermore, the system control part H111 outputs a control signal CNT3 for varying the degree of high voltage output voltage from the high voltage generation part H103. The high voltage generation part H103 detects the high voltage output voltage and transmits the detection signal DT3 to the system control part H111. ABL driving can be performed by utilizing CNT1 which varies the column wire driving quantities. That is, the average luminance quantity of the display panel H100 is suppressed by monitoring the detection signal DT5 from the average luminance level detection part H109 by the system control part H111 and carrying out no control of the column wire driving quantity in the case the average luminance level is low and decreasing the column wire driving quantity by CTN1 in the case the average luminance level is at a certain level or higher.

Also in the case the column wire driving part comprises a voltage source, the ABL driving can be achieved in the same manner by utilizing the control signal CNT2 which varies the row wire selective potential.

The method how the detection signal DT5 from the average luminance level detection part H109 is utilized for the ABL driving is described above and the method is not restricted to that but may be carried out by utilizing the detection value of the average current flowing in the display panel H100 from the high voltage generation part H103.

An example employing the method of controlling the driving quantity of electron emission devices of the display panel H100 as the luminance suppressing means is also described and the method is not restricted to that and luminance suppression can be carried out, for example, by controlling the outputs of the high voltage generation part H103 or controlling the extent of the luminance data to be inputted to the column wire modulation part.

The image display apparatus illustrated in the FIG. 169 is further provided with a main power source part H121, a S power source part H122, and a K power source part H123. The main power source part H121 is provided with a power switching means not shown in the figure and at the time of ON of the switching means, receiving AC input, the main power source part outputs a power output PS0 to the S power source part H122, the K power source part H123 and the high voltage generation part H103. The power output PS0 is ON/OFF-controlled as to be sent or not by the control signal PCN0 from the system control part H111. The main power source part H121 also outputs the detection signal DT4 for monitoring the AC input and transmits it to the system control part H111.

The main power source part H121 further outputs the power output PSS which is one power supply line to a block S constituted of the system control part H111 and the user I/F part H112. The power output PSS supplied electricity enough to drive the user I/F part H112 and the minimum part of the system control part H111 which receives the input from the user I/F part H112 and is capable of processing the input from the user I/F part H112. In this case, the state that driving is carried out only by the power output PSS is named as a standby mode. In the standby mode, the remote control reception part included in the user I/F part H112 is active and the system can be driven by user instruction.

The S power source part H122 outputs the power output PS1, which is a power supply line to a block B1 constituted of the video decoder part H104, the scanning conversion part H105, the luminance data sampling part H106, the gamma conversion part H107, the primary color data rearrangement part H108, the average luminance level detection part H109, and the timing generation part H110 and to the block S. The power output PS1 is ON/OFF-controlled as to be sent or not by the control signal PCN1 from the system control part H111.

The K power source part H123 outputs the power output PS2, which is a power supply line, to the block B2 constituted of the column wire modulation part H101 and the row wire scanning part H102. The power output PS2 is ON/OFF-controlled as to be sent or not by the control signal PCN2 from the system control part H111.

The output PS3 from the high voltage generation part H103 is ON/OFF-controlled as to be sent or not by the control signal PCN3 from the system control part H111.

The system control part H111 regulates the driving procedure at the time of rise up of the power source, the driving procedure at the time of fall of the power source, and the driving procedure at the time of abnormality. The display panel H100 is provided with a rated value of the high voltage application and rated value of application voltage to the electron emission device in the display panel H100. If the voltage exceeds the rated values, the display panel H100 is possibly broken, so that the voltage is prevented from exceeding even at the time of power rise up or power fall or occurrence of unexpected incidents.

The processing procedure at the time of power rise up is illustrated in the FIG. 170.

At the time of power rise up, there are a mode which is started by turning on the power source SW in the main power source part H121 and a mode which is turned on from the standby mode. When the power source SW is turned on, AC power is supplied to the main power source part H121 and the main power source part H121 supplies the power output PSS to the block S. The reset means in the system control part H111 drives the CPU after stabilization of the power output PSS. The CPU down-loads programs from the ROM housing the driving programs and initializes the system according to the programs.

At the time of initialization, the system control part H111 sets the power output control signals PCN0 to PCN3 in OFF state, sets the luminance data output enabling signal EN0 to the column wire modulation part H101, the driving quantity output enabling signal EN1 from the column wire modulation part H101, and selective pulse output enabling signal EN2 from the row wire scanning part in OFF state, and sets the signals CNT1 to CNT3 for controlling the high voltage output values, column wire driving quantity, row wire selective potential in the minimum output value state (step S100).

In the standby mode, the initialization is already finished. On completion of the initialization, the system control part H111 turns the power output control signals PCN0, PCN1 on to start the block S and block B1. Consequently, the main electricity supply line PS0 is outputted from the main power source part H121 and the power output PS1 is outputted from the S power supply part H122. After the PS1 is supplied, the system control part H111 reads out the driving condition data (the high voltage output value setting data, the column wire driving quantity setting data, the row wire selective potential setting data, etc.) of the display panel H100 from the back-up memory built therein. By inputting the PS1 to the block B1, the part for processing the inputted video signals is started for driving (step S101).

The system control part H111 turns the power output control signal PCN2 on to drive the block B2 after waiting that the block B1 driving is stabilized and also outputs CNT1, CNT2 signals to make outputs of the column wire driving quantity and the row wire selective potential ready by transmitting the signal to the D/A converter means containing the column wire driving quantity setting data and the row wire selective potential setting data and further initializes data of all of the shift resistors in the column wire modulation part H101 and the row wire scanning part H102 to be zero (step S102).

After it is confirmed that the output preparation of the column wire driving quantity and the row wire selective potential is normally carried out by the column wire potential abnormality monitoring signal DT1 and the row wire potential abnormality monitoring signal DT2, the system control part H111 puts the luminance data output enabling signal EN0 to the column wire modulation part H101 in output state, and then puts the driving quantity output enabling signal EN1 from the column wire modulation part H101 in output state, and finally the selective pulse output enabling signal EN2 from the row wire modulation part H101 in output state (step S103).

The system control part H111 turns the power output control signal PCN2 on, transmits the high voltage output value setting data to the D/A converter means to output a desired high voltage, and sets the CNT3 at a prescribed value. In order to softly start the rise up of the high voltage, the data transmission to the D/A converter means is carried out to set CNT3 at a prescribed value in steps by moderately increasing the voltage to the prescribed value from the minimum value at a certain time constant but not instantaneously to the prescribed value (step S104).

By above describe procedure, the rise up is completed. After that, DT1 to DT4 are monitored and if abnormality occurs, the mode is shifted to the abnormality processing mode (step S105). Also, if electric power OFF demand is instructed, the mode is shifted to the power OFF mode (step S106). In the FIG. 170, the description is restricted only to the power rise up sequence and therefore the contents are limited to the matter relevant to the power rise up sequence and it is no need to say that the system control part H111 can carry out image adjustment corresponding to the demands of a user and has other functions.

The processing procedure at the time of fall is illustrated in the FIG. 171. When the system control part H111 receives an instruction signal of power OFF from a user by a remote controller through a user I/F part H112, the system control part H111 is puts in power OFF mode. At first in order to carry out fall of the high voltage power source, the high voltage output value setting control signal CNT3 is made to be the minimum and turn off the power output control signal PCN3 (step S200).

The system control part H111 puts the selective pulse output enabling signal EN2 from the row wire scanning part in OFF state and then puts the driving quantity output enabling signal EN1 from the column wire modulation H101 in OFF state and next the luminance data output enabling signal EN0 to the column wire modulation part H101 in OFF state (step S201).

Following that, to carry out fall of the block B2, the system control part H111 sets two signals of column wire driving quantity and the row wire selective potential control signals CNT1, CNT2 to be the minimum and turns the power output control signal PCN2 off (step S202).

After the instruction of fall of the high voltage power source and the display panel driving part, the mode is put in a standby mode, so that the system control part H111 turns the power output control signal PCN1 and power output control signal PCN0 off (step S203). If power ON demand is instructed, the mode is shifted to the power ON mode (step S106).

By the foregoing procedure, the mode can be put in a standby mode by receiving only a restarting signal from a remote controller of a user or the like.

The processing procedure at the time of abnormality is illustrated in the FIG. 172. In this case the time of abnormality means the following three cases.

(A) in the case of absence of AC input;
(B) high power source abnormality; and (C) driving voltage abnormality of electron emission devices.

At first, occurrence of the above described abnormality is distinguished (step S300). The following will successively describe the driving to deal with the respective cases of abnormality.

(A) regarding the processing procedure in the case of absence of AC input:

Originally, it is desirable for the image display apparatus to fall according to the regulated sequence as described above by the instruction of power OFF by a user, however sometimes the apparatus is put in fall in undesirable situation, for example, power failure and coming off of an AC cable.

In the FIG. 169, the system control part H111 monitors the AC input alteration by the input AC potential detection signal DT4 from the main power source part H121. In the case the input AC potential is lowered less than a prescribed value, it is determined that abnormal state occurs by DT4 before the driving of the main power source H121 is stopped and the system control part H111 instructs the shift to the standby mode.

At first, the system control part turns the power output control signal PCN3 off in order to swiftly turn off the high voltage power source (step S301) and simultaneously puts the enabling signals EN0 to EN2 in OFF state in order to swiftly turn off the outputs of the row wire scanning part and the column wire part (step S302).

Secondly, the system control part makes the high voltage output value setting control signal CNT3, which is the remaining of the falling process of the high voltage generation part H103 and the block B2, to be minimum and sets the column wire driving quantity and the row wire selection potential control signal CNT1, CNT2 to be minimum. Then turns the power output control signal PCN2 off (step 5303).

At that time, the system control part H111 again confirm the input AC potential before the shift to the standby mode (step S304). If the input AC is restored to a normal state, re-starting process is carried out(steps S305, S306) and if the AC input to the main power source part H121 is not restored, the shift to the standby mode is done (step S307). In this case, a user has to require restarting to put the apparatus in ON state again.

(B) regarding the processing procedure in the case of high voltage power abnormality:

In the FIG. 169, the system control part H111 monitors the voltage potential alteration by the high voltage potential detection signal DT3 from the high voltage generation part H103. In the case the high voltage potential is increased higher than the prescribed value or the difference from the instructed value by CNT3 becomes wide, it is determined that the high voltage generation part H103 is in abnormal state and the system control part H111 carried out processing for dealing with the abnormality.

At first, the system control part turns the power output control signal PCN3 off in order to swiftly turn off the high voltage power source (step S308) and simultaneously puts the enabling signals EN0 to EN2 in OFF state in order to swiftly turn off the outputs from the row wire scanning part and the column wiring part (step S309).

Next, the system control part makes the high voltage output value setting control signal CNT3, which is the remaining of the falling process of the high voltage generation part H103 and the block B2, be the minimum and sets the column wire driving quantity and row wire selective potential control signal CNT1, CNT2 to be the minimum and then turns the power output control signal PCN2 off (step S310).

Since this abnormality is an apparatus disorder, the system control part H111 writes the abnormality mode data for informing that the high voltage generation part H103 falls into abnormal state in the back-up memory before the mode is shifted to the standby mode (step S311). Then, the mode is shifted to the standby mode. Consequently, at the time of the restoration, the trouble mode can be known by confirming the back-up memory.

(C) driving voltage abnormality of the electron emission devices:

The driving voltage abnormality of the electron emission devices can be supposed to be derived from either row wire selective potential (in the case of regulating the potential of non-selective time, the non-selective potential is included) or the column wire application potential (in the case of regulating the potential of non-application time, the non-application potential is included).

In the FIG. 169, the system control part H111 monitors the driving voltage abnormality by the amplitude value detection signal DT1 of the pulsed voltage generated in the column wires from the column wire modulation part H101 and the row wire selective potential detection signal DT2 from the row wire modulation part H102.

In the case the column wire driving voltage amplitude value is increased higher than the prescribed value or in the case the difference from the instruction value by the CNT1 becomes wide, it is determined that the column wire modulation part H101 is in abnormal state and the system control part H111 carries out processing for dealing with the abnormality.

Further, in the case the row wire selective potential is increased higher than the prescribed value or in the case the difference from the instruction value by the CNT2 becomes wide, it is determined that the row scanning modulation part H102 is in abnormal state and the system control part H111 carries out processing for dealing with the abnormality. In the case of abnormality of the column wire modulation part H101 and abnormality of the row wire scanning part H102, the processing procedure for dealing with the abnormality is same and the system control part simultaneously puts the enabling signals EN0 to EN2 in OFF state in order to swiftly turn off the outputs from the row wire scanning part and the column wiring part (step S312) and turns the power output control signal PCN3 off in order to swiftly turn off the high voltage power source (step S313).

Next, the system control part makes the high voltage output value setting control signal CNT3, which is the remaining of the falling process of the high voltage generation part H103 and the block B2, be the minimum and sets the column wire driving quantity and row wire selective potential control signal CNT1, CNT2 to be the minimum and then turns the power output control signal PCN2 off (step S310).

Since this abnormality is an apparatus disorder, the system control part H111 writes the abnormality mode data for informing that either column wire modulation part H101 or the row wire scanning part H102 falls into abnormal state in the back-up memory before the mode is shifted to the standby mode (step S311). Then, the mode is shifted to the standby mode. Consequently, at the time of the restoration, the trouble mode can be known by confirming the back-up memory.

As described above, application of high voltage out of the rated value to the display panel H100 and application of driving application voltage out of the rated value to the electron emission devices of the display panel H100 can be prevented by the driving procedure of rise time of the power source, the driving procedure of fall time of the power source, and the driving procedure at the time of abnormality.

(34th Configuration)

An application example of the present invention to various types of apparatus will be described below.

The FIG. 174 is a block figure illustrating an example of a multifunctional display apparatus constituted in such a manner that image information supplied from various image information sources, the foremost of which is a television broadcast, can be displayed on a display panel employing the surface conduction type electron emission devices as electron beam sources according to the foregoing respective configurations. In the figure, the reference number 2100 denotes a display panel, the reference number 2101 denotes a driving circuit of the display panel, the reference number 2102 denotes a display controller, the reference number 2103 denotes a multiplexer, the reference number 2104 denotes a decoder, the reference number 2105 denotes an input/output interface circuit, the reference number 2106 denotes a CPU, the reference numbers 2108, 2109, and 2110 denote image-memory interface circuits, the reference number 2111 denotes an image-input interface circuit, the reference numbers 2112 and 2113 denote TV signal receiving circuits, and the reference number 2114 denotes an input/output part.

In the case this display apparatus receives a signal containing both video information and the audio information as in the manner of, for example, television signal, audio is of course reproduced simultaneously with the video display and those which are widely used in relevant fields may be employed for circuits and speakers related to the reception, separation, reproduction, processing and storage of the audio information.

The functions of respective parts will be described in line with the flow of the image signal.

At first, the TV signal receiving circuit 2113 is for receiving TV image signals transmitted using a wireless transmission system of, for example, radio waves and spatial optical communication. The system of the TV signal reception is not specifically limited and examples of the system include NTSC system, PAL system, SECAM system, etc. TV signals comprising a greater number of scanning lines (e.g. so-called high definition TV employing MUSE system) are signal source suitable for exploiting the advantages of the above described display panel suited to enlargement of the screen surface area and increase in the number of pixels. The TV signals received by the TV signal receiving circuit 2113 are outputted to the decoder 2104.

TV signal receiving circuit 2112 is for receiving TV image signals transmitted by a cable transmission system using coaxial cables or optical fibers. As in the case of the TV signal receiving circuit 2113, the systems of TV signals to be received is not specifically limited and the TV signals received by this circuit are also outputted to the decoder 2104.

The image-input interface circuit 2111 is for accepting the image signals supplied from an image-input apparatus such as a TV camera, an image reading scanner, and the likes and the accepted image signals are outputted to the decoder 2104. The image-memory interface circuit 2110 is for accepting the image signals stored in a video tape recorder (hereafter abbreviated to VTR) and the accepted image signals are outputted to the decoder 2104. The image-memory interface circuit 2109 is for accepting the image signals stored in a video camera and the accepted image signals are outputted to the decoder 2104.

The image-memory interface circuit 2108 is for accepting the image signals from an apparatus storing still-picture data such as so-called still-picture disk and the accepted still-picture data is outputted to the decoder 2104. The input/output interface circuit 2105 is a circuit for connecting this display apparatus and an external computer, computer network, or an output apparatus such as a printer. It is of course possible to input/output image data, character data and graphic information and, depending on the case, it is possible to input/output control signals and numerical data between the CPU 2106, with which this display apparatus is equipped, and an external unit.

The image generating circuit 2107 is for generating display image data based on image data and character/graphic information sent from an external unit through the input/output interface circuit 2105 or based on image data and character/graphic information outputted by the CPU 2106. The circuit is internally provided with, for example, rewritable memory for accumulating image data or character/graphic information, a read-only memory in which image patterns corresponding to character codes are stored and circuits necessary for generating images, such as a processor for executing image processing. The display image data generated by the circuit is outputted to the decoder 2104 and, in some cases, the display image data may be outputted to external computer network or a printer through an input/output interface circuit 2105. The image information processing circuit employed for this example comprises the decoder 2104, the multiplexer 2103, and the image generating circuit 2107.

The CPU 2106 mainly carries out operation relevant to driving control of the display apparatus, producing, selecting and editing of display images, and the likes. For example, the CPU outputs control signals to the multiplexer 2103 to suitably select or combine image signals to be displayed on the display panel. At that time, the CPU generates control signals for the display panel controller 2102 corresponding the image signals to be displayed and suitably controls the driving of the display apparatus, such as the screen display frequency, the scanning method (e.g. interlaced or non-interlaced) and the number of the scanning lines of one screen. Further, the CPU 2106 outputs image data and character/graphic information directly to the image generating circuit 2107 or makes access to the external computer or a memory through the input/output interface circuit 2105 to input image data and character/graphic information directly to the image generating circuit 2107.

It is no need to say that the CPU 2106 may also be used for purposed other than these. For example, the CPU may directly be applied to a function for generating and processing information as in the manner of a personal computer or a word processor. Alternatively, the CPU may be connected to an external computer network through the input/output interface circuit 2105, as described above, so as to perform an operation such as numerical computation in cooperation with the external equipment.

The input unit 2114 is for allowing a user to enter instructions, programs or data into the CPU 2106 and examples are a keyboard and a mouse, various other input devices such as a joystick, a bar code reader, a voice recognition unit, and the likes.

The decoder 2104 is a circuit for decoding various image signals sent from 2107, or 2113 into three primary color signals or into luminance signals and I signals and Q signals. It is desirable for the decoder 2104 to be internally equipped with an image memory as indicated by the dashed line in the figure. That is for the purpose of handling television signals which require an image memory when performing the decoding, as in a MUSE system, by way of example. Providing the image memory is advantageous in that display of a still picture is facilitated and in that, in cooperation with the image generating circuit 2107 and the CPU 2106, editing and image processing such as thinning out of pixels, interpolation, enlargement, reduction and synthesis are facilitated.

The multiplexer 2103 is for suitably selecting the display image based on control signals sent from the CPU 2106. More specifically, the multiplexer 2103 selects desired image signals among the decoded image signals sent from the decoder 2104 and outputs the selected signals to the drive circuit 2101. In that case, by changing over and selecting the image signals within the display time of one screen, one screen can be divided into a plurality of areas and images differing depending on the areas can be displayed as in the manner of so-called split-screen television.

The display panel controller 2102 is a circuit for controlling operation of the drive circuit 2101 based on the control signals sent from the CPU 2106. With regard to the basic operation of the display panel, for example, the display panel controller outputs signals for controlling the operating sequence of a driving power source (not shown in the figure) for the display panel to the drive circuit 2101. In relation to the method of driving the display panel, the display panel controller outputs signals for controlling, say, the screen display frequency or the scanning method (interlaced or non-interlaced) to the drive circuit 2101. Further, in some cases, the display panel controller outputs control signals relating to adjustment of image quality such as luminance of displayed images, contrast, tone, and sharpness to the drive circuit 2101.

The drive circuit 2101 is for generating driving signals to be applied to the display panel 2101 and is driven based on the image signals sent from the multiplexer 2103 and the control signals sent from the display panel controller 2102.

The functions of respective parts are described above and using the configuration exemplified in the FIG. 174, image information sent from a variety of image information sources can be displayed on the display panel 2100 in the present display apparatus. In other words, various image signals, the foremost of which are television broadcast signals, are decoded by the decoder 2104, suitably selected by the multiplexer 2103, and transmitted to the drive circuit 2101. On the other hand, the display controller 2102 generates control signals for controlling the operation of the drive circuit 2101 corresponding to the image signals to be displayed.

The drive circuit 2101 applies drive signals to the display panel 2100 based on the image signals and the control signals. Consequently, an image is displayed on the display panel 2100. The series of the operations are under the overall control of the CPU 2106.

Further, in this display apparatus, attributed to the contribution of the image memory built in the decoder 2104, the image generating circuit 2107, and the CPU 2106, it is made possible not only to display image information selected from a plurality of items of image information but also to perform image processing such as enlargement, reduction, rotation, movement, edge emphasis, thinning-out, interpolation, color conversion, and aspect ratio conversion and image editing such as synthesis, elimination, connection, replacement, and fitting.

Furthermore, though not specifically mentioned in the description of this example, it is permissible to provide a circuit for exclusive use for performing processing and editing with regard also to the audio information in the same manner as the foregoing image processing and the image editing.

Accordingly, the display apparatus of the present invention is capable of being provided with various functions in a single unit, such as the functions of TV broadcast display equipment, office terminal equipment such as television conference terminal equipment, image editing equipment for dealing with still pictures and motion pictures, computer terminal equipment, and word processors, games, and the likes. Thus, the display apparatus has a wide range of application for industrial and civil use.

The illustrated figure merely shows an example of the configuration of the display apparatus employing a display panel for which surface conduction type electron emission devices are used as electron beam sources and the apparatus is not limited to this configuration. For example, circuits related to functions unnecessary for the particular purpose of use may be eliminated from the constituent devices illustrated in the figure. Contrary, depending on the purpose of use, constituent devices may be added. For example, in the case the display apparatus of the present invention is applied to a television telephone, it would be suitable to add a transmitting/receiving circuit comprising a television camera, an audio microphone, a luminaire, and a modem to the constituent devices.

In the display apparatus of the present invention, especially the display panel comprising the surface conduction type electron emission devices as electron beam sources can easily be thinned, so that the depth of the whole display apparatus body can be thin. In addition to that, the display panel comprising the surface conduction type electron emission devices as electron beam sources is easily made to be a wide screen, provided with high luminance, and excellent in angular properties of visual field, so that the display apparatus is capable of displaying vivid and impressive images with excellent visibility.

As described above, the present invention can provide an image forming apparatus capable of dealing with the screen enlargement and comprising configuration giving excellent display quality.

What is claimed is:

1. An image formation apparatus comprising:
   a first substrate on which a plurality of wires connecting electron emission devices are provided;
   a second substrate on which an image formation material for forming images by radiation of electrons emitted from the electron emission devices is provided; and
   a plurality of spacers placed between said first and second substrates, wherein each spacer is placed on a corresponding one of the plurality of wires,
   wherein said plurality of wires include wires on which the spacers are placed and wires on which no spacers are placed, and a number of wires on which no spacers are placed between neighboring spacers falls within the range of 5 to 50.

2. The image formation apparatus according to claim 1, wherein an enclosure is configured by said first and second substrates and an external frame placed between said first and second substrates, and a ratio (S/A) of a total cross-sectional area S of said plurality of spacers to an internal area A of the enclosure on a cross section horizontal to one of said first and second substrates, is within a range of 0.018% to 7.8%.

3. The image formation apparatus according to claim 1, wherein an enclosure is configured by said first and second substrates and an external frame placed between said first and second substrates, and a ratio (W/T) of width W to thickness T of said external frame is within a range of 1.5 to 30.

4. An image formation apparatus comprising:
   a. an electron source substrate comprising a first substrate, an array of electrode pairs on the first substrate configured by pairs of device electrodes placed along a plurality of rows and a plurality of columns, an electron source placed between each pair of electrodes, a plurality of column wires on the first substrate made up of column wires commonly connecting one of each electrode pair on the column provided for each electrode pair on each column, and a plurality of row wires on the substrate commonly connecting another of each electrode pair on a row, which are insulated from the column wires, provided for each electrode pair on each row;
   b. an image formation substrate comprising a second substrate and an image formation material placed on the second substrate;
   c. an enclosure configured by said first and second substrates and an external frame placed between said first and second substrates; and
   d. a plurality of spacers inserted between the electron source substrate and said image formation substrate and placed on the row wires,
   wherein each row wire has a width larger than that of an individual one of the column wires and a ratio (S/A) of a total cross-sectional area S of said plurality of spacers to an internal area A of said enclosure on a cross section horizontal to one of said first and second substrates, is within a range of 0.018% to 7.8%.

5. An image formation apparatus comprising:
   a first substrate on which a plurality of electron emission devices and a plurality of row directional wires and column directional wires are provided, wherein the plurality of electron emission devices are wired in a matrix formation using the plurality of row directional wires and column directional wires;
   a second substrate on which an image formation material for forming images by radiation of electrons emitted from the electron emission devices is provided; and
   a plurality of spacers placed between said first and second substrates,
   wherein said plurality of row directional wires include wires on which the spacers are placed and wires on which no spacers are placed, and a number of row directional wires on which no spacers are placed between neighboring spacers falls within the range of 5 to 50.

6. An apparatus according to claim 5, wherein an enclosure is configured by said first and second substrates and an external frame placed between said first and second substrates, and a ratio (S/A) of a total cross-sectional area S of said plurality of spacers to an internal area A of the enclosure on a cross section horizontal to one of said first and second substrates, is within a range of 0.018% to 7.8%.

7. An apparatus according to claim 5, wherein an enclosure is configured by said first and second substrates and an external frame placed between said first and second substrates, and a ratio (W/T) of a width W to a thickness T of said external frame is within a range of 1.5 to 30.

8. An image formation apparatus comprising:
   a first substrate on which a plurality of electron emission devices and a plurality of row directional wires and column directional wires are provided, wherein the plurality of electron emission devices are wired in a matrix formation using the plurality of row directional wires and column directional wires;
   a second substrate on which an image formation material for forming images by radiation of electrons emitted from the electron devices is provided;
   an enclosure configured by said first and second substrates and an external frame placed between said first and second substrates; and
   a plurality of spacers placed between said first and second substrates,
   wherein each row directional wire has a width larger than that of a column directional wire and a ratio (S/A) of a total cross-sectional area S of said plurality of spacers to an internal area A of the enclosure on a cross section horizontal to one of said first and second substrates, is within a range of 0.018% to 7.8%.

* * * * *

UNITED STATES PATENT AND TRADEMARK OFFICE
CERTIFICATE OF CORRECTION

| | |
|---|---|
| PATENT NO. | : 6,879,096 B1 |
| APPLICATION NO. | : 09/705957 |
| DATED | : April 12, 2005 |
| INVENTOR(S) | : Toshihiko Miyazaki et al. |

It is certified that error appears in the above-identified patent and that said Letters Patent is hereby corrected as shown below:

ON THE TITLE PAGE ITEM (56) REFERENCES CITED

Foreign Patent Document, "1-1031332" should read --11-31332--.

COLUMN 4

Line 2, "Another" should read --¶ Another--.

COLUMN 6

Line 13, "insulate" should read --insulated--.

COLUMN 7

Line 41, "Kv" should read --kV--.

COLUMN 17

Line 51, "matters" should read --matter--.

COLUMN 18

Line 21, "508 FIG. 7" should read --508. ¶ FIG. 7--.

COLUMN 21

Line 47, "toward outside" should read --toward the outside of--.

COLUMN 24

Line 56, "is" should read --are--.

COLUMN 30

Line 32, "First," should read --¶ First,--;
Line 44, "40x2and" should read --40x2 and--;
Line 52, "spat-" should read --sput--; and
Line 65, "1022chaving" should read --1022c having--.

UNITED STATES PATENT AND TRADEMARK OFFICE
CERTIFICATE OF CORRECTION

| | | |
|---|---|---|
| PATENT NO. | : 6,879,096 B1 | |
| APPLICATION NO. | : 09/705957 | |
| DATED | : April 12, 2005 | |
| INVENTOR(S) | : Toshihiko Miyazaki et al. | |

It is certified that error appears in the above-identified patent and that said Letters Patent is hereby corrected as shown below:

COLUMN 33

Line 3, "interferes" should read --interfere with--;
      Line 34, "any" should read --with any--;
      Line 48, "a" should be deleted; and
      Line 60, "bombard" should read --bombards--.

COLUMN 34

Line 4, "bombard" should read --bombards--; and
      Line 14, "by" should read --with by--.

COLUMN 36

Line 37, ".1041" should read --1041--;
      Line 40, "is" should read --is,--; and
      Line 41, "is" should read --are--.

COLUMN 37

Line 65, "pass" should read --passes--.

COLUMN 38

Line 12, "a" should read --for a--.

COLUMN 39

Line 49, "curvature," should read --curvatures,--; and
      Line 63, "is" should read --are--.

COLUMN 40

Line 6, "inch" should read --inches--;
      Line 45, "is" should read --are--; and
      Line 47, "inch" should read --inches--.

UNITED STATES PATENT AND TRADEMARK OFFICE
CERTIFICATE OF CORRECTION

PATENT NO. : 6,879,096 B1
APPLICATION NO. : 09/705957
DATED : April 12, 2005
INVENTOR(S) : Toshihiko Miyazaki et al.

It is certified that error appears in the above-identified patent and that said Letters Patent is hereby corrected as shown below:

COLUMN 41

Line 41, "First" should read --Frit--.

COLUMN 43

Line 2, "the" should read --of the--; and
Line 12, "inch in diagonal," should read --inches measured diagonally,--.

COLUMN 44

Line 12, "a conductive" should read --a conductive element--.

COLUMN 45

Line 41, "spattering" should read --sputtering--; and
Line 62, "grand" should read --ground--.

COLUMN 46

Line 18, "On one" should read --One--; and
Line 24, "material," should read --material that--.

COLUMN 47

Line 28, "small" should read --smaller--;
Line 41, "spattering" should read --sputtering--;
Line 43, "spattering" should read --sputtering--;
Line 45, "spattered" should read --sputtered--;
Line 47, "spattering" should read --sputtering--; and "titan" should read --titanium--;
Line 49, "spattering" should read --sputtering--;
Line 51, "Titan" should read --Titanium--; and
Line 65, "perform" should read --performing--.

COLUMN 48

Line 7, "spattering" should read --sputtering--;
Line 8, "spattered" should read --sputtered--;

UNITED STATES PATENT AND TRADEMARK OFFICE
CERTIFICATE OF CORRECTION

PATENT NO. : 6,879,096 B1
APPLICATION NO. : 09/705957
DATED : April 12, 2005
INVENTOR(S) : Toshihiko Miyazaki et al.

It is certified that error appears in the above-identified patent and that said Letters Patent is hereby corrected as shown below:

COLUMN 48 (CONT)

Line 11, "spattered" should read --sputtered--;
    Line 12, "Å)" should read --Å).--;
    Line 13, "spattered" should read --sputtered--;
    Line 26, "and" should be deleted; and
    Line 58, "are" should read --area--.

COLUMN 49

Line 4, "when" should read --When--;
    Line 15, "covered" should read --be covered--; and
    Line 28, "spattering" should read --sputtering--.

COLUMN 51

Line 30, "resolving" should read --dissolving--.

COLUMN 54

Line 5, "are" should read --is--;
    Line 46, "as not overlapping" should read --so as not to overlap--; and
    Line 51, "sponding" should read --spondence--.

COLUMN 56

Line 21, "At the" should read --The--; and
    Line 49, "are" should read --is--.

COLUMN 57

Line 4, "raise" should read --rise--; and
    Line 20, "arch-shaped" should read --arc-shaped--.

COLUMN 58

Line 1, "which" should read --to which--;
    Line 2, "a" should read --an--;

UNITED STATES PATENT AND TRADEMARK OFFICE
CERTIFICATE OF CORRECTION

PATENT NO. : 6,879,096 B1
APPLICATION NO. : 09/705957
DATED : April 12, 2005
INVENTOR(S) : Toshihiko Miyazaki et al.

It is certified that error appears in the above-identified patent and that said Letters Patent is hereby corrected as shown below:

COLUMN 58 (CONT)

Line 11, "become" should read --becomes--;
    Line 17, "by" should read --with by--;
    Line 25, "arch-shaped" should read --arc-shaped--;
    Line 30, "arch-shaped" should read --arc-shaped--;
    Line 34, "become" should read --becomes--;
    Line 49, "arch-" should read --arc- --; and
    Line 64, "With" should read --When--.

COLUMN 59

Line 10, "adhere" should read --adheres--; and
    Line 56, "from" should read --an--.

COLUMN 60

Line 12, "cause" should read --causes--; and
    Line 13, "arises" should read --to arise--.

COLUMN 61

Line 5, "are" should read --is--;
    Line 7, "and" should read --which--;
    Line 8, "the all" should read --all the--;
    Line 11, "is" should read --are--;
    Line 26, "non short circuit is not" should read --no short circuit is--; and
    Line 27, "without" should be deleted.

COLUMN 62

Line 16, "an" should read --a--;
    Line 36, "an" should read --a--;
    Line 46, "like that," should read --to perform--;
    Line 49, "past" should read --paste--;
    Line 51, "form" should read --forms--;
    Line 54, "an" should read --a--; and
    Line 60, "The" should read --As regards--.

UNITED STATES PATENT AND TRADEMARK OFFICE
CERTIFICATE OF CORRECTION

PATENT NO.      : 6,879,096 B1
APPLICATION NO. : 09/705957
DATED           : April 12, 2005
INVENTOR(S)     : Toshihiko Miyazaki et al.

It is certified that error appears in the above-identified patent and that said Letters Patent is hereby corrected as shown below:

COLUMN 63

Line 9, "produce" should read --produces--; and
Line 22, "maintains" should read --maintain--.

COLUMN 64

Line 6, "an" should read --a--; and
Line 49, "siapoaws" should read --disposed--.

COLUMN 65

Line 8, "solved" should read --dissolved--; and
Line 28, "Ω/&" should read --Ω/□--.

COLUMN 66

Line 16, "benzonitrile" should read --Benzonitrile--; and
Line 32, "KV" should read --kV--.

COLUMN 67

Line 49, "Furthermore," should read --¶ Furthermore,--; and
Line 59, "past" should read --paste--.

COLUMN 69

Line 24, "electron" should read --electrons--; and
Line 33, "to" should be deleted.

COLUMN 74

Line 44, "shorted" should read --shorter--; and
Line 57, "3015." should read --3015'.--.

COLUMN 75

Line 37, "3015." should read --3015'.--; and
Line 65, "Example" should read --(Example--.

UNITED STATES PATENT AND TRADEMARK OFFICE
CERTIFICATE OF CORRECTION

PATENT NO.       : 6,879,096 B1
APPLICATION NO.  : 09/705957
DATED            : April 12, 2005
INVENTOR(S)      : Toshihiko Miyazaki et al.

It is certified that error appears in the above-identified patent and that said Letters Patent is hereby corrected as shown below:

COLUMN 76

Line 14, "denote an" should read --denote a--;
    Line 45, "wiring" should read --wirings--; and
    Line 46, "is" should read --are--.

COLUMN 78

Line 40, "member.3209" should read --member 3209--; and
    Line 52, "satisfied" should read --satisfactory--.

COLUMN 81

Line 64, "this" should read --to this--.

COLUMN 82

Line 59, "Aluminum" should read --aluminum--.

COLUMN 83

Line 32, "Incidentally," should read --¶ Incidentally,--.

COLUMN 84

Line 3, "are" should read --is--; and
    Line 23, "an" should read --a--.

COLUMN 85

Line 15, "an" should read --a--; and
    Line 54, "maybe" should read --may be--.

COLUMN 86

Line 12, "as" should read --as to be--;
    Line 17, "as" should read --as to be--; and
    Line 19, "an" should read --a--.

UNITED STATES PATENT AND TRADEMARK OFFICE
CERTIFICATE OF CORRECTION

| | |
|---|---|
| PATENT NO. | : 6,879,096 B1 |
| APPLICATION NO. | : 09/705957 |
| DATED | : April 12, 2005 |
| INVENTOR(S) | : Toshihiko Miyazaki et al. |

It is certified that error appears in the above-identified patent and that said Letters Patent is hereby corrected as shown below:

COLUMN 88

Line 38, "In as sealing materials" should read --Indium as a sealing material--; and
Line 40, "sealing materials," should read --a sealing material,--.

COLUMN 89

Line 15, "an" should be deleted.

COLUMN 90

Line 57, "problem" should read --problem such that--.

COLUMN 91

Line 26, "occur" should read --occurs--;
Line 32, "but" should be deleted;
Line 43, "Incidentally," should read --¶ Incidentally,--; and
Line 47, "using." should read --to be used.--.

COLUMN 92

Line 47, "to" should read --to be--.

COLUMN 93

Line 4, "a" should be deleted; and
Line 48, "insides" should read --inside--.

COLUMN 94

Line 5, "becomes" should read --become--;
Line 38, "land" should read --1 and--; and
Line 58, "is" should read --are--.

UNITED STATES PATENT AND TRADEMARK OFFICE
CERTIFICATE OF CORRECTION

PATENT NO. : 6,879,096 B1
APPLICATION NO. : 09/705957
DATED : April 12, 2005
INVENTOR(S) : Toshihiko Miyazaki et al.

It is certified that error appears in the above-identified patent and that said Letters Patent is hereby corrected as shown below:

COLUMN 97

Line 13, "$22^{th}$" should read --$22^{nd}$--;
Line 36, "($23^{th}$" should read --($23^{rd}$--; and
Line 63, "$23^{th}$" should read --the $23^{rd}$--.

COLUMN 98

Line 37, "pyrolisis" should read --pyrolysis--;
Line 66, "are" should read --is--; and
Line 67, "$23^{th}$" should read --the $23^{rd}$--.

COLUMN 99

Line 5, "stripes" should read --stripe--; and
Line 15, "$23^{th}$" should read --the $23^{rd}$--.

COLUMN 100

Line 21, "Issue" should read --Issue 2--.

COLUMN 101

Line 36, "By" should read --¶ By--.

COLUMN 102

Line 2, "These" should read --The--;
Line 5, "Besides," should read --¶ Besides,--;
Line 10, "electically" should read --electrically--; and
Line 16, "the anode-side potential specifying part," should be deleted.

COLUMN 103

Line 57, "vO" should read --$v_o$--.

COLUMN 104

Line 10, "an" should read --and--; and
Line 48, "inial" should read --initial--.

UNITED STATES PATENT AND TRADEMARK OFFICE
CERTIFICATE OF CORRECTION

PATENT NO.         : 6,879,096 B1
APPLICATION NO. : 09/705957
DATED                 : April 12, 2005
INVENTOR(S)       : Toshihiko Miyazaki et al.

It is certified that error appears in the above-identified patent and that said Letters Patent is hereby corrected as shown below:

COLUMN 105

Line 59, "to" should be deleted.

COLUMN 106

Line 61, "is" should read --are--; and
Line 66, "therm-press" should read --thermo-press--.

COLUMN 107

Line 1, "ACE" should read --ACF--; and
Line 54, "these" should read --the--.

COLUMN 108

Line 8, "is" should read --are--;
Line 13, "therm-" should read --thermo- --; and
Line 23, "plat" should read --plate--.

COLUMN 109

Line 9, "sides" should read --side--; and
Line 57, "one" should read --individual--.

COLUMN 110

Line 18, "the" (first occurrence) should be deleted.

COLUMN 111

Line 23, "The" should read --¶ The--;
Line 24, "so-called" should read --of so-called--;
Line 27, "following." should read --follows.--; and
Line 46, "rectangular" should read --rectangle--.

UNITED STATES PATENT AND TRADEMARK OFFICE
CERTIFICATE OF CORRECTION

| | |
|---|---|
| PATENT NO. | : 6,879,096 B1 |
| APPLICATION NO. | : 09/705957 |
| DATED | : April 12, 2005 |
| INVENTOR(S) | : Toshihiko Miyazaki et al. |

It is certified that error appears in the above-identified patent and that said Letters Patent is hereby corrected as shown below:

COLUMN 112

Line 1, "mission" should read --emission--; and
Line 59, "Apart" should read --A part--.

COLUMN 113

Line 37, "de" should read --be--.

COLUMN 115

Line 22, "likes." should read --like.--.

COLUMN 119

Line 16, "terminals." should read --terminal.--; and
Line 63, "an" should read --a--.

COLUMN 121

Line 3, "likes" should read --like,--;
Line 19, "the" should read --that--;
Line 24, "being" should be deleted; and
Line 31, "as to" should read --so as to--.

COLUMN 122

Line 2, "likes" should read --like--;
Line 5, "likes." should read --like.--;
Line 9, "52" should read --S2--; and
Line 22, "Off" should read --OFF--.

COLUMN 123

Line 3, "as" should read --the--;
Line 27, "the" should read --whether the--; and
Line 46, "as" should read --by--.

UNITED STATES PATENT AND TRADEMARK OFFICE
CERTIFICATE OF CORRECTION

PATENT NO. : 6,879,096 B1
APPLICATION NO. : 09/705957
DATED : April 12, 2005
INVENTOR(S) : Toshihiko Miyazaki et al.

It is certified that error appears in the above-identified patent and that said Letters Patent is hereby corrected as shown below:

COLUMN 124

Line 12, "the Ie" should read --if the Ie--; and
Line 26, "On" should read --ON--.

COLUMN 125

Line 25, "as same" should read --in the same manner--;
Line 40, "field" should read --fields--; and
Line 54, "changing-the" should read --changing the--.

COLUMN 126

Line 1, "as same" should read --in the same manner--; and
Line 25, "being put in" should read --is put into a--.

COLUMN 127

Line 40, "and, for example" should read --and--.

COLUMN 128

Line 18, "likes." should read --like.--; and
Line 34, "as same" should read --in the same manner--.

COLUMN 129

Line 45, "using" should be deleted; and
Line 56, "procedure of" should read --procedures for--.

COLUMN 130

Line 3, "of" should read --that--;
Line 8, "such" should read --in such--;
Line 32, "likes." should read --like--;
Line 40, "configurations as the connection" should read --connection configurations--;
Line 41, "configuration" should be deleted; and
Line 45, "31th" should read --31st--.

UNITED STATES PATENT AND TRADEMARK OFFICE
CERTIFICATE OF CORRECTION

| | |
|---|---|
| PATENT NO. | : 6,879,096 B1 |
| APPLICATION NO. | : 09/705957 |
| DATED | : April 12, 2005 |
| INVENTOR(S) | : Toshihiko Miyazaki et al. |

It is certified that error appears in the above-identified patent and that said Letters Patent is hereby corrected as shown below:

COLUMN 131

Line 8, "capacitor" should read --capacitance--.

COLUMN 133

Line 7, "on the" should be deleted;
    Line 12, "as to protect and prevent" should read --to protect--; and
    Line 57, "temperature" should read --temperatures--.

COLUMN 134

Line 35, "302" should read --4302--.

COLUMN 135

Line 9, "as same" should read --in the same manner--;
    Line 10, "the foregoing the first" should read --that of the foregoing--;
    Line 22, "as" should read --so as--;
    Line 53, "exclusive" should read --exclusively--; and
    Line 65, "has" should read --have--.

COLUMN 136

Line 25, "immediate" should read --immediately--; and
    Line 27, "immediate" should read --immediately--.

COLUMN 137

Line 61, "of that" should read --as that--.

COLUMN 138

Line 7, "emit" should read --emit an--; and
    Line 58, "beside" should read --not corresponding to--.

COLUMN 139

Line 17, "in stead" should read --instead--;

UNITED STATES PATENT AND TRADEMARK OFFICE
CERTIFICATE OF CORRECTION

PATENT NO. : 6,879,096 B1
APPLICATION NO. : 09/705957
DATED : April 12, 2005
INVENTOR(S) : Toshihiko Miyazaki et al.

It is certified that error appears in the above-identified patent and that said Letters Patent is hereby corrected as shown below:

COLUMN 139 (CONT)

Line 46, "As same as the" should read --In the same manner as that of--; and
Line 66, "of" should read --wherein--.

COLUMN 140

Line 13, "has" should read --have--; and
Line 16, "(named it as" should read --(designated as the--.

COLUMN 144

Line 20, "above describe" should read --the above-described--;
Line 35, "puts" should read --put--;
Line 38, "turn off" should be deleted; and
Line 39, "S200)." should read --S200) is turned off--.

COLUMN 145

Line 35, "minimum. Then" should read --minimum, and then it--;
Line 36, "5303)." should read --S303).--;
Line 37, "confirm" should read --confirms--;
Line 43, "require restarting" should read --initiate a restart process in order--; and
Line 54, "carried" should read --is caused to carry--.

COLUMN 147

Line 65, "the a" should read --a--.

COLUMN 148

Line 36, "likes." should read --like.--;
Line 41, "the image" should read --to the image--; and
Line 52, "purposed" should read --purposes--.

UNITED STATES PATENT AND TRADEMARK OFFICE
CERTIFICATE OF CORRECTION

PATENT NO. : 6,879,096 B1
APPLICATION NO. : 09/705957
DATED : April 12, 2005
INVENTOR(S) : Toshihiko Miyazaki et al.

It is certified that error appears in the above-identified patent and that said Letters Patent is hereby corrected as shown below:

<u>COLUMN 150</u>

Line 13, "likes." should read --like.--.

Signed and Sealed this

Thirty-first Day of March, 2009

JOHN DOLL
*Acting Director of the United States Patent and Trademark Office*